US012501942B2

(12) United States Patent
Ferrie et al.

(10) Patent No.: US 12,501,942 B2
(45) Date of Patent: Dec. 23, 2025

(54) SMOKING SUBSTITUTE SYSTEM

(71) Applicant: Imperial Tobacco Limited, Bristol (GB)

(72) Inventors: Kate Ferrie, Liverpool (GB); Ross Shenton, Liverpool (GB); Chris Lord, Liverpool (GB); Samantha Murray, Liverpool (GB); Med Benyezzar, Liverpool (GB); Tom Sudlow, Liverpool (GB); David Jones, Liverpool (GB); Pete Lomas, Liverpool (GB)

(73) Assignee: Imperial Tobacco Limited, Bristol (GB)

( * ) Notice: Subject to any disclaimer, the term of this patent is extended or adjusted under 35 U.S.C. 154(b) by 1122 days.

(21) Appl. No.: 17/481,864

(22) Filed: Sep. 22, 2021

(65) Prior Publication Data

US 2022/0061399 A1 Mar. 3, 2022

Related U.S. Application Data

(63) Continuation of application No. PCT/EP2020/056803, filed on Mar. 13, 2020, and a
(Continued)

(30) Foreign Application Priority Data

Mar. 22, 2019 (EP) ..................................... 19020139
Mar. 22, 2019 (EP) ..................................... 19020144
(Continued)

(51) Int. Cl.
*A24F 40/90* (2020.01)
*A24F 40/20* (2020.01)
(Continued)

(52) U.S. Cl.
CPC .............. *A24F 40/90* (2020.01); *A24F 40/20* (2020.01); *A24F 40/51* (2020.01); *A24F 40/53* (2020.01);
(Continued)

(58) Field of Classification Search
CPC .......... A24F 40/90; A24F 40/20; A24F 40/51; A24F 40/53; A24F 40/57; A24F 40/60;
(Continued)

(56) References Cited

U.S. PATENT DOCUMENTS 6,810,883 B2 11/2004 Felter et al.
8,714,150 B2 5/2014 Alelov
(Continued)

FOREIGN PATENT DOCUMENTS

CA 3037654 A1 8/2018
CN 101116542 A 2/2008
(Continued)

OTHER PUBLICATIONS

European Patent Office, Extended Examination and Search Report regarding European Patent Application No. 19020226.7, Oct. 7, 2019.
(Continued)

*Primary Examiner* — Travis S Chambers
(74) *Attorney, Agent, or Firm* — DUNLAP CODDING, P.C.

(57) ABSTRACT

The present disclosure relates to a smoking substitute system and particularly, although not exclusively, to a smoking substitute device. The smoking substitute device is adapted to operate in a smoking operation while receiving power from an external power source. The smoking substitute device in particular comprises a rechargeable battery and a
(Continued)

port to receive power for charging the rechargeable battery, wherein the device is adapted to operate while receiving power from the port.

9 Claims, 125 Drawing Sheets

Related U.S. Application Data continuation of application No. PCT/EP2020/056804, filed on Mar. 13, 2020, and a continuation of application No. PCT/EP2020/056812, filed on Mar. 13, 2020, and a continuation of application No. PCT/EP2020/056817, filed on Mar. 13, 2020, and a continuation of application No. PCT/EP2020/056833, filed on Mar. 13, 2020, and a continuation of application No. PCT/EP2020/056795, filed on Mar. 13, 2020, and a continuation of application No. PCT/EP2020/056810, filed on Mar. 13, 2020, and a continuation of application No. PCT/EP2020/056801, filed on Mar. 13, 2020, and a continuation of application No. PCT/EP2020/056835, filed on Mar. 13, 2020, and a continuation of application No. PCT/EP2020/056783, filed on Mar. 13, 2020, and a continuation of application No. PCT/EP2020/056798, filed on Mar. 13, 2020, and a continuation of application No. PCT/EP2020/056827, filed on Mar. 13, 2020, said application No. PCT/EP2020/056810 is a continuation of application No. PCT/EP2020/056841, filed on Mar. 13, 2020, application No. 17/481,864 is a continuation of application No. PCT/EP2020/056794, filed on Mar. 13, 2020, and a continuation of application No. PCT/EP2020/056800, filed on Mar. 13, 2020, and a continuation of application No. PCT/EP2020/056834, filed on Mar. 13, 2020, and a continuation of application No. PCT/EP2020/056852, filed on Mar. 13, 2020, and a continuation of application No. PCT/EP2020/056790, filed on Mar. 13, 2020.

(30) Foreign Application Priority Data

| Mar. 22, 2019 | (EP) | 19020145 |
|---|---|---|
| Mar. 22, 2019 | (EP) | 19020146 |
| Mar. 22, 2019 | (EP) | 19020162 |
| Mar. 22, 2019 | (EP) | 19020174 |
| Mar. 22, 2019 | (EP) | 19020192 |
| Mar. 22, 2019 | (EP) | 19020196 |
| Mar. 22, 2019 | (EP) | 19020198 |
| Mar. 22, 2019 | (EP) | 19020202 |
| Mar. 22, 2019 | (EP) | 19020215 |
| Mar. 22, 2019 | (EP) | 19020217 |
| Mar. 22, 2019 | (EP) | 19020221 |
| Mar. 22, 2019 | (EP) | 19020222 |
| Mar. 22, 2019 | (EP) | 19020224 |
| Mar. 22, 2019 | (EP) | 19020226 |
| Mar. 22, 2019 | (EP) | 19020227 |
| Mar. 22, 2019 | (EP) | 19020228 |

(51) Int. Cl.

| A24F 40/51 | (2020.01) |
|---|---|
| A24F 40/53 | (2020.01) |
| A24F 40/57 | (2020.01) |
| A24F 40/60 | (2020.01) |
| A24F 40/65 | (2020.01) |
| H02J 7/00 | (2006.01) |
| A61M 15/06 | (2006.01) |

(52) U.S. Cl.
CPC .............. *A24F 40/57* (2020.01); *A24F 40/60* (2020.01); *A24F 40/65* (2020.01); *H02J 7/0047* (2013.01); *A61M 15/06* (2013.01)

(58) Field of Classification Search
CPC ........ A24F 40/65; A24F 40/50; H02J 7/0047; A61M 15/06; A61M 11/042; A61M 15/008; A61M 2016/0021; A61M 2016/0027; A61M 2016/003; A61M 2205/14; A61M 2205/18; A61M 2205/276; A61M 2205/332; A61M 2205/3368; A61M 2205/3375; A61M 2205/3553; A61M 2205/3584; A61M 2205/3592; A61M 2205/3606; A61M 2205/502; A61M 2205/581; A61M 2205/582; A61M 2205/583; A61M 2205/6072; A61M 2205/609; A61M 2205/75; A61M 2205/8206; A61M 2205/8243; A61M 2205/8262; A61M 2209/086

See application file for complete search history.

(56) References Cited

U.S. PATENT DOCUMENTS

| 8,928,277 | B2 | 1/2015 | Xiang et al. |
| 8,973,587 | B2 | 3/2015 | Liu |
| 9,072,321 | B2 | 7/2015 | Liu |
| 9,996,735 | B2 | 6/2018 | Steiner |
| 9,999,250 | B2 | 6/2018 | Minskoff et al. |
| 10,574,072 | B2 * | 2/2020 | Tagtow .................. H02J 7/342 |
| 2004/0129280 | A1 | 7/2004 | Woodson et al. |
| 2009/0107492 | A1 | 4/2009 | Ooida |
| 2011/0036346 | A1 | 2/2011 | Cohen et al. |
| 2011/0220112 | A1 | 9/2011 | Connor |
| 2012/0048266 | A1 | 3/2012 | Alelov |
| 2012/0199146 | A1 | 8/2012 | Marangos |
| 2013/0042865 | A1 | 2/2013 | Monsees et al. |
| 2013/0193911 | A1 * | 8/2013 | Miller .................... H02J 7/0047 320/107 |
| 2013/0340775 | A1 | 12/2013 | Juster et al. |
| 2013/0341218 | A1 | 12/2013 | Liu |
| 2014/0053857 | A1 | 2/2014 | Liu |
| 2014/0057495 | A1 | 2/2014 | Liao et al. |
| 2014/0123989 | A1 | 5/2014 | Lamothe |
| 2014/0202477 | A1 | 7/2014 | Qi et al. |
| 2014/0224267 | A1 | 8/2014 | Levitz et al. |
| 2014/0246035 | A1 | 9/2014 | Minskoff et al. |
| 2014/0299137 | A1 | 10/2014 | Kieckbusch et al. |
| 2014/0366894 | A1 | 12/2014 | Liu |
| 2015/0020825 | A1 | 1/2015 | Galloway et al. |
| 2015/0101623 | A1 | 4/2015 | Liu |
| 2015/0128974 | A1 | 5/2015 | Hon |
| 2015/0164144 | A1 | 6/2015 | Liu |
| 2015/0237918 | A1 | 8/2015 | Liu |
| 2015/0245658 | A1 | 9/2015 | Worm et al. |
| 2015/0257445 | A1 | 9/2015 | Liu et al. |
| 2015/0258289 | A1 | 9/2015 | Henry, Jr. et al. |
| 2015/0272220 | A1 | 10/2015 | Spinka et al. |
| 2015/0305409 | A1 | 10/2015 | Verleur et al. |
| 2015/0333561 | A1 | 11/2015 | Alarcon |
| 2016/0091194 | A1 * | 3/2016 | Liu ........................ A24F 40/95 206/265 |
| 2016/0100633 | A1 | 4/2016 | Gao |
| 2016/0106156 | A1 | 4/2016 | Qiu |
| 2016/0137395 | A1 | 5/2016 | Fernando et al. |
| 2016/0158782 | A1 | 6/2016 | Henry, Jr. et al. |
| 2016/0189216 | A1 | 6/2016 | Liu |
| 2016/0205998 | A1 | 7/2016 | Matsumoto et al. |
| 2016/0206003 | A1 | 7/2016 | Yamada et al. |
| 2016/0227840 | A1 | 8/2016 | Xiang |

(56) References Cited

U.S. PATENT DOCUMENTS

| | | |
|---|---|---|
| 2016/0374397 A1 | 12/2016 | Jordan et al. |
| 2017/0013876 A1 | 1/2017 | Schennum et al. |
| 2017/0020197 A1 | 1/2017 | Cameron |
| 2017/0027229 A1 | 2/2017 | Cameron |
| 2017/0119049 A1 | 5/2017 | Blandino et al. |
| 2017/0119053 A1 | 5/2017 | Henry, Jr. et al. |
| 2017/0135400 A1 | 5/2017 | Liu |
| 2017/0196263 A1 | 7/2017 | Sur |
| 2017/0207499 A1 | 7/2017 | Leadley |
| 2017/0214261 A1 | 7/2017 | Gratton |
| 2017/0238617 A1 | 8/2017 | Scatterday |
| 2017/0258135 A1 | 9/2017 | Yerkic-Husejnovic et al. |
| 2017/0258142 A1 | 9/2017 | Hatton et al. |
| 2017/0259170 A1 | 9/2017 | Bowen et al. |
| 2017/0273358 A1 | 9/2017 | Batista et al. |
| 2017/0318861 A1 | 11/2017 | Thorens |
| 2017/0354180 A1 | 12/2017 | Fornarelli |
| 2017/0360103 A1 | 12/2017 | Li et al. |
| 2018/0020735 A1 | 1/2018 | Bilat et al. |
| 2018/0043114 A1 | 2/2018 | Bowen et al. |
| 2018/0077967 A1 | 3/2018 | Hatton et al. |
| 2018/0098570 A1 | 4/2018 | Hon |
| 2018/0098571 A1 | 4/2018 | Watson |
| 2018/0110262 A1 | 4/2018 | Batista et al. |
| 2018/0132528 A1 | 5/2018 | Sur et al. |
| 2018/0160734 A1 | 6/2018 | Batista et al. |
| 2018/0177230 A1 | 6/2018 | Hawes et al. |
| 2018/0184711 A1 | 7/2018 | Dickens et al. |
| 2018/0206551 A1 | 7/2018 | Liu |
| 2018/0295886 A1 | 10/2018 | Freeman et al. |
| 2018/0368474 A1 | 12/2018 | Bache et al. |
| 2019/0021400 A1 | 1/2019 | Fornarelli |
| 2020/0154779 A1* | 5/2020 | Novak, III .................. H02J 7/00 |
| 2025/0007318 A1* | 1/2025 | He .................. H01M 10/667 |

FOREIGN PATENT DOCUMENTS

| | | |
|---|---|---|
| CN | 103338663 A | 10/2013 |
| CN | 203722296 U | 7/2014 |
| CN | 104049550 A | 9/2014 |
| CN | 104055227 A | 9/2014 |
| CN | 203859549 U | 10/2014 |
| CN | 204146336 U | 2/2015 |
| CN | 104432537 A | 3/2015 |
| CN | 204317508 U | 5/2015 |
| CN | 105361250 A | 3/2016 |
| CN | 107666837 A | 2/2018 |
| CN | 107708456 A | 2/2018 |
| CN | 207626554 U | 7/2018 |
| CN | 208192124 U | 12/2018 |
| DE | 102009029768 A1 | 1/2011 |
| EP | 0905014 A2 | 3/1999 |
| EP | 0951219 B1 | 11/2002 |
| EP | 2770454 A1 | 8/2014 |
| EP | 2857960 A1 | 4/2015 |
| EP | 2870888 A1 | 5/2015 |
| EP | 2820963 A1 | 7/2015 |
| EP | 2915443 A1 | 9/2015 |
| EP | 3316562 A1 | 5/2018 |
| EP | 3402225 A1 | 11/2018 |
| GB | 2507103 A | 4/2014 |
| GB | 2524851 A | 10/2015 |
| GB | 2534213 A | 7/2016 |
| JP | H07506008 A | 7/1995 |
| JP | H11105758 A | 4/1999 |
| JP | 2014524313 A | 9/2014 |
| JP | 2014524616 A | 9/2014 |
| JP | 2014525237 A | 9/2014 |
| JP | 2018148899 A | 1/2017 |
| JP | 2017506901 A | 3/2017 |
| JP | 2017509339 A | 4/2017 |
| JP | 2017510270 A | 4/2017 |
| JP | 2017514463 A | 6/2017 |
| JP | 2017522876 A | 8/2017 |
| JP | 3213257 U | 10/2017 |
| JP | 2018520663 A | 8/2018 |
| JP | 2018139588 A | 9/2018 |
| TW | 201817255 A | 5/2018 |
| WO | WO 9418860 A1 | 9/1994 |
| WO | WO 2012085205 A1 | 6/2012 |
| WO | WO 2012117376 A1 | 9/2012 |
| WO | WO2013/022936 A1 | 2/2013 |
| WO | WO2013/025921 A1 | 2/2013 |
| WO | WO2013/093469 A2 | 6/2013 |
| WO | WO 2013098397 A2 | 7/2013 |
| WO | WO 2013118061 A1 | 8/2013 |
| WO | WO 2013147492 A1 | 10/2013 |
| WO | WO 2014076618 A1 | 5/2014 |
| WO | WO2014/150247 A1 | 9/2014 |
| WO | WO 2014150704 A2 | 9/2014 |
| WO | WO2015/009838 A2 | 1/2015 |
| WO | WO2015/013950 A1 | 2/2015 |
| WO | WO2015/130598 A2 | 9/2015 |
| WO | WO2015/138589 A1 | 9/2015 |
| WO | WO 2015140012 A1 | 9/2015 |
| WO | WO2015/165747 A1 | 11/2015 |
| WO | WO 2015177304 A2 | 11/2015 |
| WO | WO 2016009202 A1 | 1/2016 |
| WO | WO2016/020675 A1 | 2/2016 |
| WO | WO2016/023809 A1 | 2/2016 |
| WO | WO 2016026810 A1 | 2/2016 |
| WO | WO 2016091658 A1 | 6/2016 |
| WO | WO2016/198266 A1 | 12/2016 |
| WO | WO 2017001817 A1 | 1/2017 |
| WO | WO2017/077466 A1 | 5/2017 |
| WO | WO 2017118553 A1 | 7/2017 |
| WO | WO 2017144191 A1 | 8/2017 |
| WO | WO 2017144374 A1 | 8/2017 |
| WO | WO 2017205838 A1 | 11/2017 |
| WO | WO2018/029186 A1 | 2/2018 |
| WO | WO2018/138749 A1 | 2/2018 |
| WO | WO 2018027189 A2 | 2/2018 |
| WO | WO 2018041850 A1 | 3/2018 |
| WO | WO 2018127484 A1 | 7/2018 |
| WO | WO 2018154286 A1 | 8/2018 |
| WO | WO2018/201426 A1 | 11/2018 |
| WO | WO2018/216961 A1 | 11/2018 |
| WO | WO 2019020151 A1 | 1/2019 |
| WO | WO 2019037881 A1 | 2/2019 |
| WO | WO 2019037882 A1 | 2/2019 |
| WO | WO 2019048379 A1 | 3/2019 |
| WO | WO2019/162157 A1 | 8/2019 |

OTHER PUBLICATIONS

European Patent Office acting as the International Searching Authority, International Search Report and Written Opinion regarding Patent Cooperation Treaty Application No. PCT/EP2020/056798, mail date Jul. 16, 2020.
Taiwan Intellectual Property Office; Office Action with English translation regarding Taiwan Patent Application No. 109109141 filed Mar. 19, 2020; dated Jun. 9, 2023.
Taiwan Intellectual Property Office; Office Action with English translation regarding Taiwan Patent Application No. 109109150 filed Mar. 19, 2020; dated Jul. 26, 2023.
European Patent Office; Examination Report regarding EP20715712.4 filed Mar. 13, 2020; dated Oct. 19, 2023.
Japan Patent Office, Office Action regarding Japanese Patent Application No. 2021-556986, Mar. 26, 2024; 8 pages. (English Translation attached, 9 pages).
China National Intellectual Property Administration, First Office Action regarding 202080034636.1, Jan. 20, 2024; 7 pages. (English Translation attached).
European Patent Office, Examination Report regarding Application No. 20715740.5, dated Dec. 20, 2023; pages.
International Search Report and Written Opinion (PCT/EP2020/056783); May 11, 2020; 11 pgs.
International Search Report and Written Opinion (PCT/EP2020/056790); Aug. 3, 2020; 9 pgs.
International Search Report and Written Opinion (PCT/EP2020/056794); Jun. 15, 2020; 8 pgs.

(56) References Cited

OTHER PUBLICATIONS

International Search Report and Written Opinion (PCT/EP2020/056795); Jun. 25, 2020; 8 pgs.
International Search Report and Written Opinion (PCT/EP2020/056800); Aug. 6, 2020; 11 pgs.
International Search Report and Written Opinion (PCT/EP2020/056801); Jul. 9, 2020; 11 pgs.
International Search Report and Written Opinion (PCT/EP2020/056803); Jul. 9, 2020; 10 pgs.
International Search Report and Written Opinion (PCT/EP2020/056804); Jul. 15, 2020; 11 pgs.
International Search Report and Written Opinion (PCT/EP2020/056810); Jul. 17, 2020; 8 pgs.
International Search Report and Written Opinion (PCT/EP2020/056812); Jul. 16, 2020; 11 pgs.
International Search Report and Written Opinion (PCT/EP2020/056817); Aug. 20, 2020; 14 pgs.
International Search Report and Written Opinion (PCT/EP2020/056827); Jun. 15, 2020; 10 pgs.
International Search Report and Written Opinion (PCT/EP2020/056833); Jul. 17, 2020; 8 pgs.
International Search Report and Written Opinion (PCT/EP2020/056834); Jul. 17, 2020; 10 pgs.
International Search Report and Written Opinion (PCT/EP2020/056835); Jul. 9, 2020; 12 pgs.
International Search Report and Written Opinion (PCT/EP2020/056841); May 11, 2020; 10 pgs.
International Search Report and Written Opinion (PCT/EP2020/056852); Jul. 2, 2020; 9 pgs.
International Search Report and Written Opinion (PCT/GB2015/052045); Oct. 20, 2020; 14 pgs.
Japan Patent Office, Office Action regarding Japanese Patent Application No. 2021-556986, Dec. 17, 2024, 6 pages; with English Machine Translation, 7 pages.
Japan Patent Office, Office Action regarding Japanese Patent Application No. 2021-556987, Apr. 25, 2024; with English Machine Translation.
European Patent Office, Notice of Opposition regarding Application No. 20715705.8-1105 / 3941262; Aug. 2, 2024.
Japan Patent Office, Office Action regarding Japanese Patent Application No. 2021-556992, Apr. 18, 2024; with English Machine Translation.
Japan Patent Office, Office Action regarding Japanese Patent Application No. 2021-556988, Apr. 11, 2024; with English Machine Translation.
Broun, John Allan, Esq.; Transactions of the Royal Society of Edinburgh, vol. 18, "Observations in Magnetism and Meteorology", Published by Robert Grant & Son, London, 1843.
Williams et al.; "Variability Among Electronic Cigarette in the Pressure Drop, Airflow Rate, and Aerosol Production"; Nicotine & Tobacco Research Advance Access; published by Oxford University Press on behalf of the Society for Research on Nicotine and Tobacco; Oct. 12, 2011.
Japan Patent Office, Office Action regarding Japanese Patent Application No. 2021-556986, dated Jul. 9, 2024; with English Machine Translation.
European Patent Office, Examination Report regarding Application No. 20715708.2, dated Oct. 1, 2024.
English Translation for WO2018/201426A1, dated Nov. 8, 2018, 14 pgs.
English Translation for WO2018/216961A1, dated Nov. 29, 2018, 31 pgs.
European Patent Office, Extended Search Report, dated Feb. 28, 2025 for European Application No. 24207053.0, 9 pages.
European Patent Office, Examination Report for Application No. 20715701.7, dated May 9, 2025.

\* cited by examiner

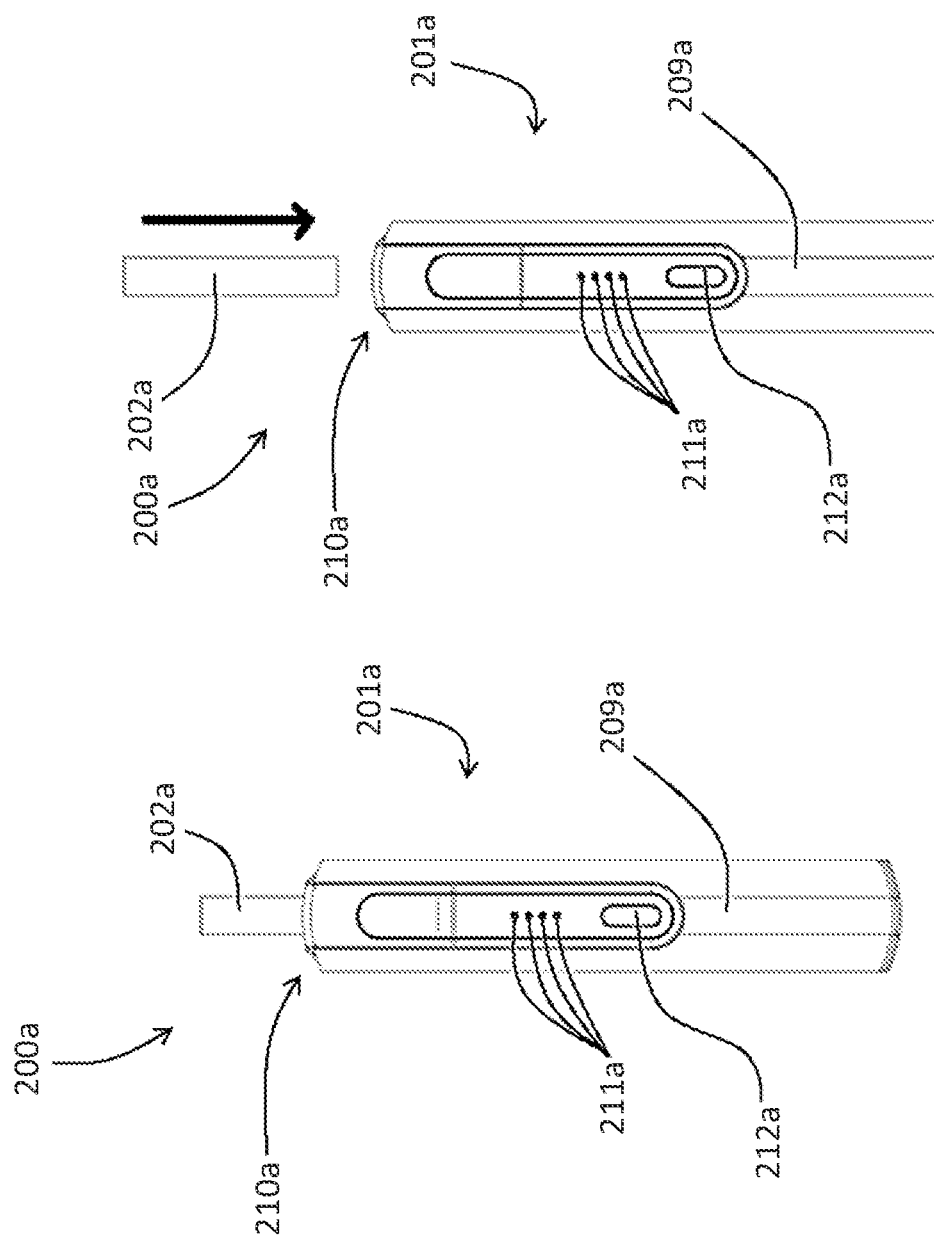

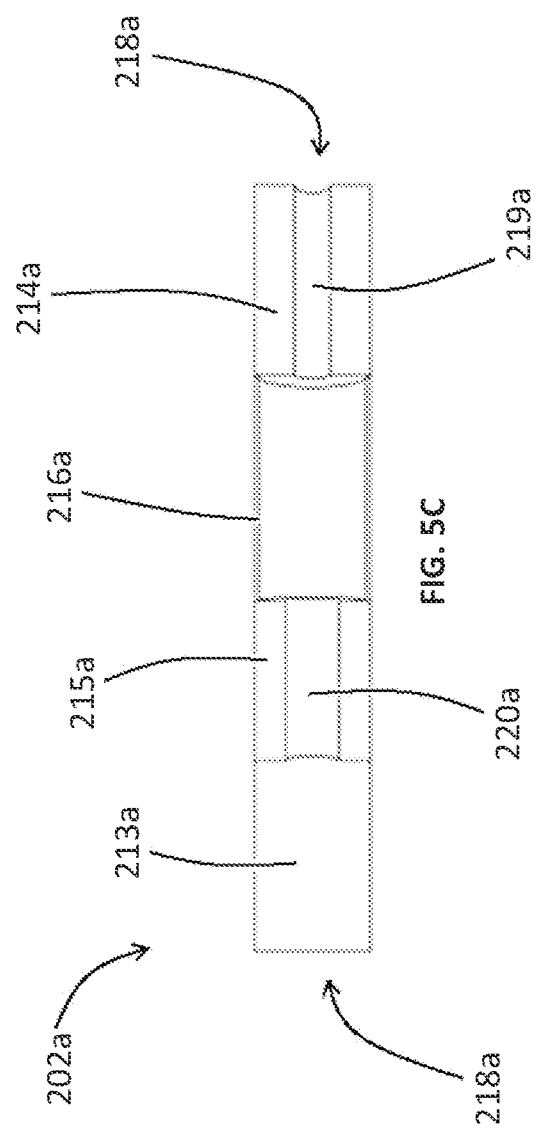

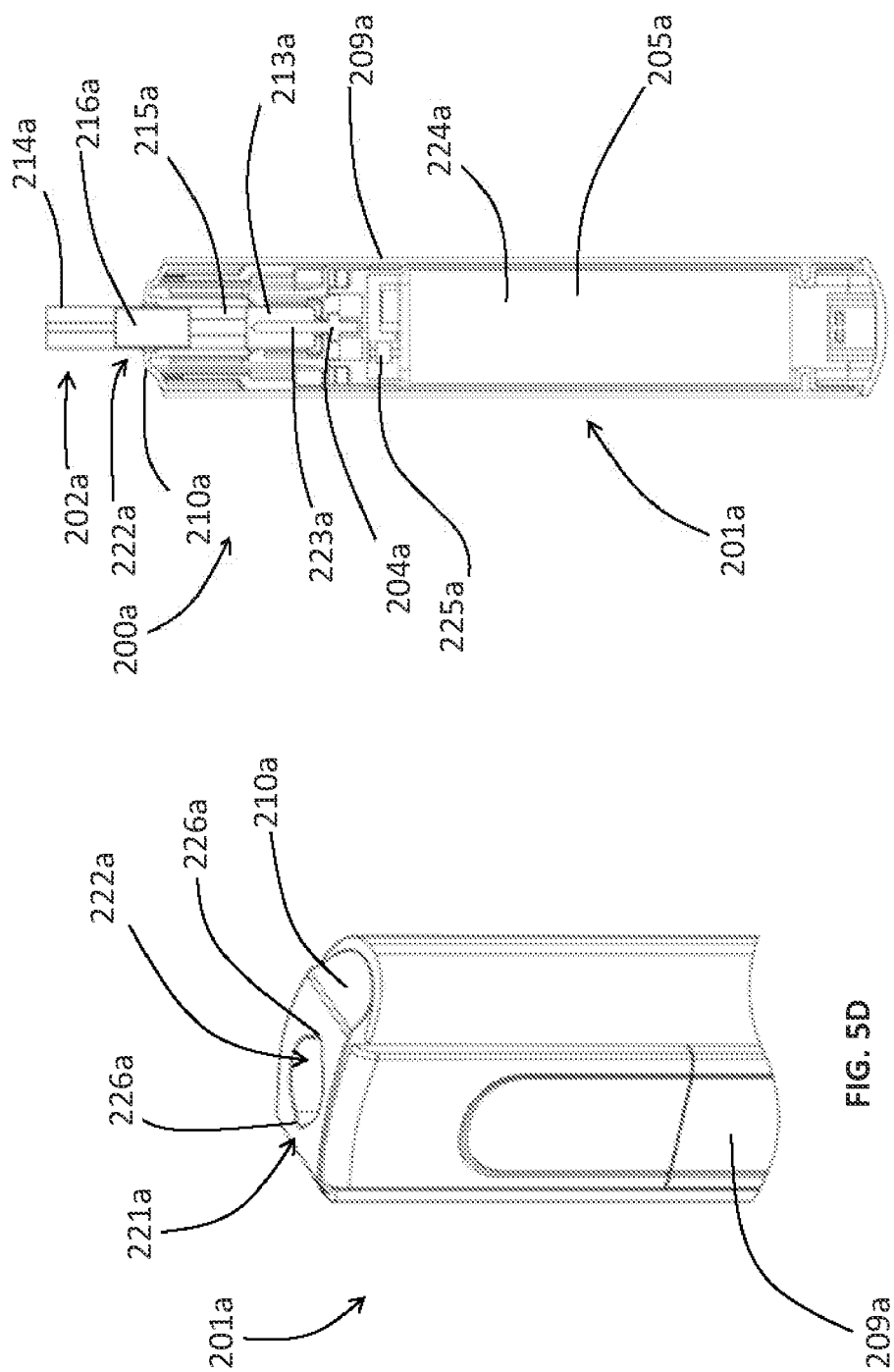

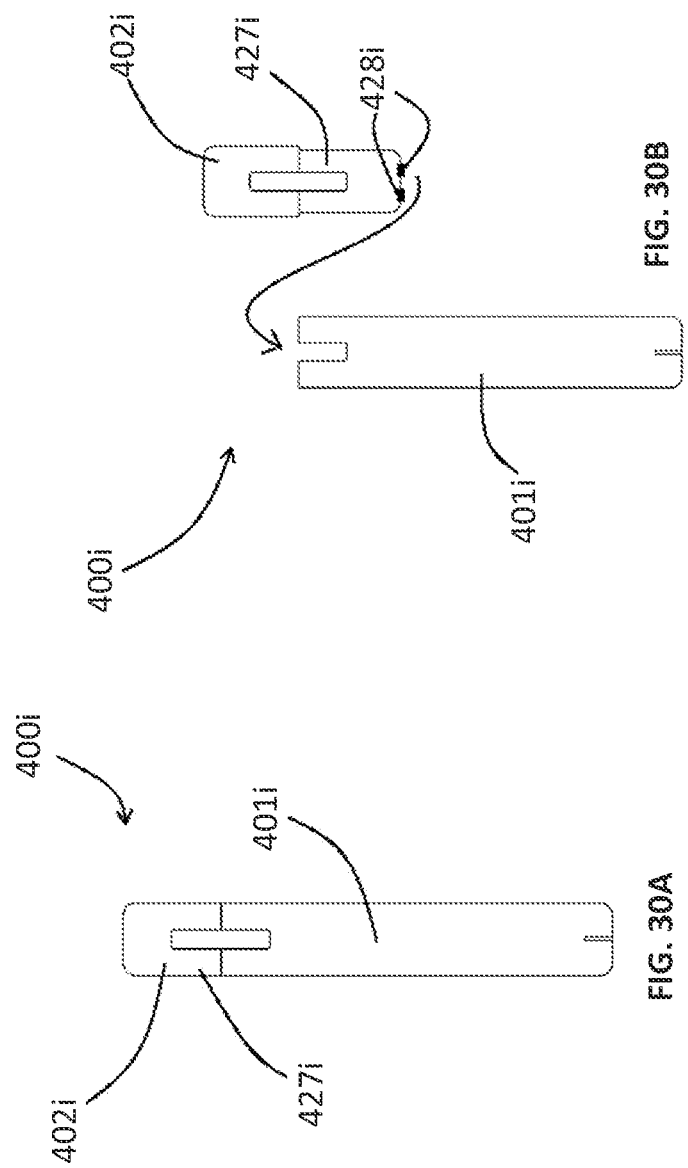

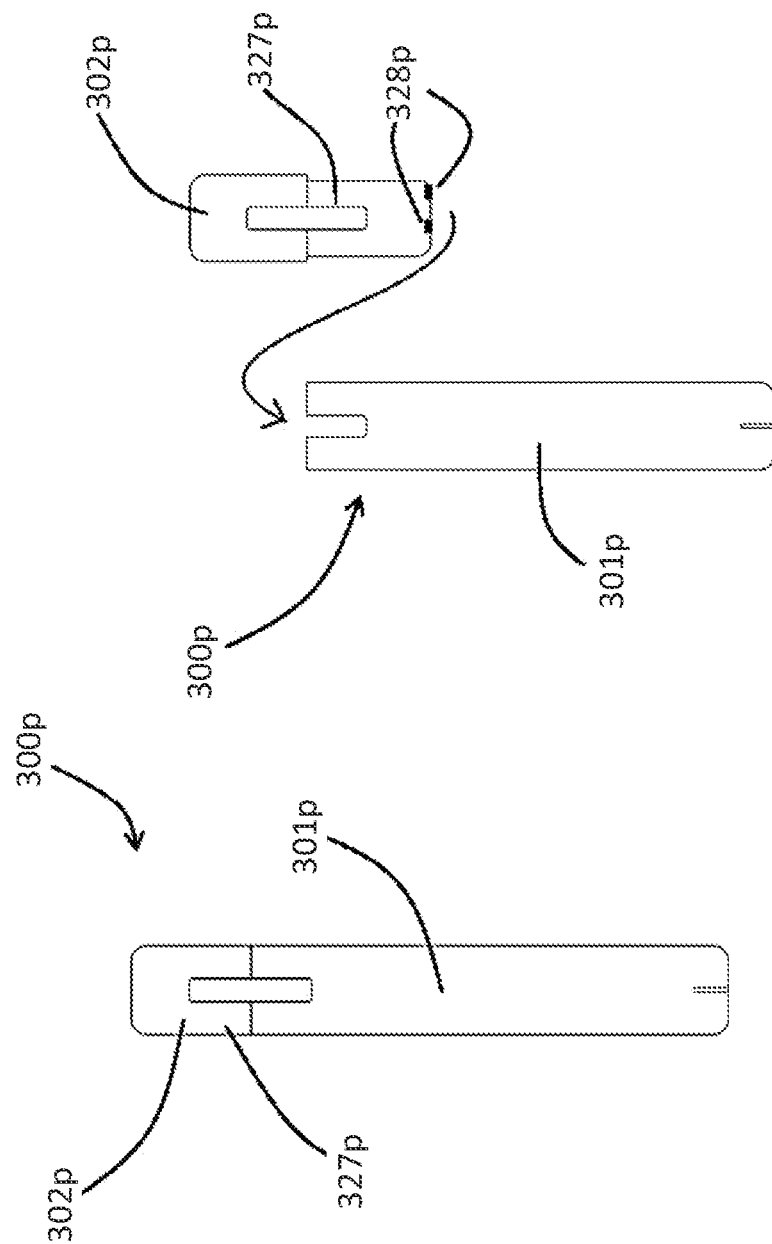

SMOKING SUBSTITUTE SYSTEM

CROSS REFERENCE TO RELATED APPLICATIONS/INCORPORATION BY REFERENCE STATEMENT

This application is a non-provisional application claiming benefit to the international application no. PCT/EP2020/056783 filed on Mar. 13, 2020, which claims priority to EP 19020145.9 filed on Mar. 22, 2019. This application also claims benefit to the international application no. PCT/EP2020/056794 filed on Mar. 13, 2020, which claims priority to EP 19020215.0 filed on Mar. 22, 2019. This application also claims benefit to the international application no. PCT/EP2020/056812 filed on Mar. 13, 2020, which claims priority to 19020146.7 filed on Mar. 22, 2019. This application also claims benefit to the international application no. PCT/EP2020/056795 filed on Mar. 13, 2020, which claims priority to EP 19020222.6 filed on Mar. 22, 2019. This application also claims benefit to the international application no. PCT/EP2020/056798 filed on Mar. 13, 2020, which claims priority to EP 19020226.7 filed on Mar. 22, 2019. This application also claims benefit to the international application no. PCT/EP2020/056800 filed on Mar. 13, 2020, which claims priority to EP 19020228.3 filed on Mar. 22, 2019. This application also claims benefit to the international application no. PCT/EP2020/056790 filed on Mar. 13, 2020, which claims priority to EP 19020162.4 filed on Mar. 22, 2019. This application also claims benefit to the international application no. PCT/EP2020/056817 filed on Mar. 13, 2020, which claims priority to EP 19020144.2 filed on Mar. 22, 2019. This application also claims benefit to the international application no. PCT/EP2020/056827 filed on Mar. 13, 2020, which claims priority to EP 19020192.1 filed on Mar. 22, 2019. This application also claims benefit to the international application no. PCT/EP2020/056803 filed on Mar. 13, 2020, which claims priority to EP 19020139.2 filed on Mar. 22, 2019. This application also claims benefit to the international application no. PCT/EP2020/056833 filed on Mar. 13, 2020, which claims priority to 19020198.8 filed on Mar. 22, 2019. This application also claims benefit to the international application no. PCT/EP2020/056801 filed on Mar. 13, 2020, which claims priority to EP 19020196.2 filed on Mar. 22, 2019. This application also claims benefit to the international application no. PCT/EP2020/056834 filed on Mar. 13, 2020, which claims priority to EP 19020217.6 filed on Mar. 22, 2019. This application also claims benefit to the international application no. PCT/EP2020/056804 filed on Mar. 13, 2020, which claims priority to EP 19020174.9 filed on Mar. 22, 2019. This application also claims benefit to the international application no. PCT/EP2020/056810 filed on Mar. 13, 2020, which claims priority to EP 19020202.8 filed on Mar. 22, 2019. This application also claims benefit to the international application no. PCT/EP2020/056835 filed on Mar. 13, 2020, which claims priority to EP 19020224.2 filed on Mar. 22, 2019. This application also claims benefit to the international application no. PCT/EP2020/056841 filed on Mar. 13, 2020, which claims priority to EP 19020227.5 filed on Mar. 22, 2019. This application also claims benefit to the international application no. PCT/EP2020/056852 filed on Mar. 13, 2020, which claims priority to EP 19020221.8 filed on Mar. 22, 2019. The entire contents of each of the above-referenced applications are hereby incorporated herein by reference in their entirety.

FIELD OF THE DISCLOSURE

In one aspect, the present disclosure relates to a smoking substitute system and particularly, although not exclusively, to a smoking substitute device adapted to operate while receiving power from an external power source. In another aspect, the present disclosure relates to an aerosol delivery device such as heated tobacco ("HT") device and particularly, although not exclusively, to a heated tobacco device configured to wirelessly communicate with a user compute device. In another aspect, the present disclosure relates to a smoking substitute system and particularly, although not exclusively, to a heated tobacco device with wireless charging capability and a system for enabling the wireless charging capability of the heated tobacco device. In another aspect, the present disclosure relates to a smoking substitute system and particularly, although not exclusively, to a smoking substitute system comprising a device having a user input means at a second end of the device and an aerosol-forming article. In another aspect, the present disclosure relates to a smoking substitute system and particularly, although not exclusively, to a smoking substitute device and a method of controlling operation of the smoking substitute device. In another aspect, the present disclosure relates to a smoking substitute system and particularly, although not exclusively, to a smoking substitute device and a method of operating the smoking substitute device. In another aspect, the present disclosure relates to a smoking substitute device and a method of controlling operation of the smoking substitute device. In another aspect, the present disclosure relates to a smoking substitute system and particularly, although not exclusively, to a smoking substitute device. In another aspect, the present disclosure relates to a smoking substitute system and particularly, although not exclusively, to a smoking substitute system comprising a heated tobacco device. In another aspect, the present disclosure relates to a smoking substitute system and particularly, although not exclusively, to a system having a smoking substitute device and a method of operating the device. In another aspect, the present disclosure relates to a heated tobacco device and method of operating a heated tobacco device. In another aspect, the present disclosure relates to a smoking substitute system and particularly, although not exclusively, to a smoking substitute system comprising a heat-not-burn device, and method of operating said device in different operating modes. In another aspect, the present disclosure relates to a smoking substitute system and particularly, although not exclusively, to a smoking substitute system comprising a smoking substitute device and a rechargeable power source. In another aspect, the present disclosure relates to a smoking substitute system and particularly, although not exclusively, to a smoking substitute system comprising a device and a method for detecting the presence or insertion of a consumable in the device. In another aspect, the present disclosure relates to a smoking substitute system and particularly, although not exclusively, to a smoking substitute system comprising a device and a method for detecting the presence or insertion of a consumable in the device. In another aspect, the present disclosure relates to a smoking substitute system and particularly, although not exclusively, to a smoking substitute system comprising a heat-not-burn device and an aerosol-forming article. In another aspect, the present disclosure relates to a smoking substitute system and particularly, although not exclusively, to a smoking substitute system comprising a device configured to detect an error event of the device and an event of user misuse of the device, and methods of detecting an error event and an event of user misuse of the device. In another aspect, the present disclosure relates to a smoking substitute system and particularly, although not exclusively, to a smoking substitute system comprising a smoking substitute device, and method of operating the device. In another aspect, the present disclosure relates to a smoking substitute system and particularly, although not exclusively, to a smoking substitute system comprising a smoking substitute device and method of indicating remaining usable lifetime of a consumable in a smoking session.

BACKGROUND

The smoking of tobacco is generally considered to expose a smoker to potentially harmful substances. It is generally thought that a significant amount of the potentially harmful substances is generated through the heat caused by the burning and/or combustion of the tobacco and the constituents of the burnt tobacco in the tobacco smoke itself.

Conventional combustible smoking articles, such as cigarettes, typically comprise a cylindrical rod of tobacco comprising shreds of tobacco which is surrounded by a wrapper, and usually also a cylindrical filter axially aligned in an abutting relationship with the wrapped tobacco rod. The filter typically comprises a filtration material which is circumscribed by a plug wrap. The wrapped tobacco rod and the filter are joined together by a wrapped band of tipping paper that circumscribes the entire length of the filter and an adjacent portion of the wrapped tobacco rod. A conventional cigarette of this type is used by lighting the end opposite to the filter and burning the tobacco rod. The smoker receives mainstream smoke into their mouth by drawing on the mouth end or filter end of the cigarette.

Combustion of organic material such as tobacco is known to produce tar and other potentially harmful by-products. There have been proposed various smoking substitute systems (or "smoking substitute systems") in order to avoid the smoking of tobacco.

Such smoking substitute systems can form part of nicotine replacement therapies aimed at people who wish to stop smoking and overcome a dependence on nicotine.

Smoking substitute systems include electronic systems that permit a user to simulate the act of smoking by producing an aerosol (also referred to as a "vapor") that is drawn into the lungs through the mouth (inhaled) and then exhaled. The inhaled aerosol typically bears nicotine and/or flavorings without, or with fewer of, the odor and health risks associated with traditional smoking.

In general, smoking substitute systems are intended to provide a substitute for the rituals of smoking, whilst providing the user with a similar experience and satisfaction to those experienced with traditional smoking and with combustible tobacco products. Some smoking substitute systems use smoking substitute articles (also referred to as a "consumables") that are designed to resemble a traditional cigarette and are cylindrical in form with a mouthpiece at one end.

The popularity and use of smoking substitute systems has grown rapidly in the past few years. Although originally marketed as an aid to assist habitual smokers wishing to quit tobacco smoking, consumers are increasingly viewing smoking substitute systems as desirable lifestyle accessories.

There are a number of different categories of smoking substitute systems, each utilizing a different smoking substitute approach.

One approach for a smoking substitute system is the so-called Heated Tobacco ("HT") approach in which tobacco (rather than an "e-liquid") is heated or warmed to release vapor. HT is also known as "heat-not-burn" ("HNB"). The tobacco may be leaf tobacco or reconstituted tobacco. The vapor may contain nicotine and/or flavorings. In the HT approach the intention is that the tobacco is heated but not burned, i.e., the tobacco does not undergo combustion.

A typical HT smoking substitute system may include a device and a consumable. The consumable may include the tobacco material. The device and consumable may be configured to be physically coupled together. In use, heat may be imparted to the tobacco material by a heating element of the device, wherein airflow through the tobacco material causes components in the tobacco material to be released as vapor. A vapor may also be formed from a carrier in the tobacco material (this carrier may for example include propylene glycol and/or vegetable glycerin) and additionally volatile compounds released from the tobacco. The released vapor may be entrained in the airflow drawn through the tobacco.

As the vapor passes through the consumable (entrained in the airflow) from the location of vaporization to an outlet of the consumable (e.g., a mouthpiece), the vapor cools and condenses to form an aerosol for inhalation by the user. The aerosol will normally contain the volatile compounds.

In HT smoking substitute systems, heating as opposed to burning the tobacco material is believed to cause fewer, or smaller quantities, of the more harmful compounds ordinarily produced during smoking. Consequently, the HT approach may reduce the odor and/or health risks that can arise through the burning, combustion, and pyrolytic degradation of tobacco.

A limitation associated with existing HT smoking substitute systems is that, due to the physical contact between the heating element and tobacco material, residue from the heating of tobacco may form on the heating element with every use of the device, e.g., loose tobacco material accumulates or sticks to the surface of the heating element of the device. Such residue formation and build-up may result in undesired burnt smell when using the device, and therefore negatively affecting the user experience. Therefore, currently available HT smoking systems often require the user to remove a cap from the device to expose the heating element before carrying out a cleaning procedure with a dedicated cleaning tool or an alcohol swab. For example, the user may be required to clean the heating element with the use of a brush or a disposable solvent swap. However, currently available HT systems may only provide access to the heating element through an opening towards at the end of the cavity. Further, the user may require removing a cap covering said opening to gain access to the heating element prior to cleaning. Such arrangement may be inconvenient. In some currently available HT devices, the cap may be easily removed from the device and thus present a risk by exposing the heating element inadvertently.

Therefore, some users may only clean the heating element once the device has consumed a given number of consumables, e.g., 20 consumables, when the residue built up becomes detrimental to the experience, e.g., when a burnt taste is perceivable.

There may be a need for improved design of smoking substitute systems, in particular HT smoking substitute systems, to enhance the user experience and improve the function of the HT smoking substitute system.

The present disclosure has been devised in the light of the above considerations.

SUMMARY OF THE DISCLOSURE

First Mode: A Smoking Substitute Device Adapted to Operate while Receiving Power from an External Rechargeable Power Source Device.

At its most general, the first mode relates to smoking substitute device adapted to operate while receiving power from an external rechargeable power source device.

According to a first aspect of the first mode, there is provided a smoking substitute device comprising a rechargeable battery and a port to receive power for charging the rechargeable battery, wherein the device is adapted to operate while receiving power from the port.

Optional features will now be set out. These are applicable singly or in any combination with any aspect.

Optionally, operating the device includes consumption of a consumable by a user of the device. The device enables consumption of the consumable by the user during the charging process, thus making it more convenient for the user to have continuous vaping experience.

Advantageously, the power received while operating the device is used for device operation or charging the rechargeable battery or both. It is more advantageous to allow the device to operate while receiving power for charging the device, thereby providing extended vaping experience.

Conveniently, the smoking substitute device is a heat-not-burn device.

Optionally, the device further comprises a controller configured to allow extended operation of the device during charging of the device. The controller allows continuous power supply to the heater without any interruption due to charging process, thus enabling continued usage of the device without affecting user experience.

Advantageously, the controller is further configured to determine if the received power is sufficient to permit usage of the device and allow extended operation of the device during charging, based on the determination. The controller monitors the received power and enables usage of the device only when the received power is sufficient for any device operation. By continuous monitoring of the received power during the charging process, the controller is able to determine the possibility of usage of the device for device operation and allow the device to operate only if there is sufficient power, thereby preventing any short circuit within the device components due to insufficient power.

Conveniently, the device further comprises a feedback output means capable of providing one of a haptic feedback, an audio feedback, and a visual feedback to indicate usage of the device during charging, or to indicate availability of power required for usage of the device. This would provide intuitive user experience.

The device may comprise an elongate body. An end of the elongate body may be configured for engagement with an aerosol-forming article (e.g., a heated tobacco (HT) consumable. The device may comprise a cavity that is configured for receipt of at least a portion of the consumable (i.e., for engagement with the consumable). The other end of the body may be configured to receive power from the port. The aerosol-forming article may be of the type that comprises an aerosol former (e.g., carried by an aerosol-forming substrate).

The device may comprise a heater for heating the aerosol-forming article. The heater may comprise a heating element, which may be in the form of a rod that extends from the body of the device. The heating element may extend from the end of the body that is configured for engagement with the aerosol-forming article.

The heater (and thus the heating element) may be rigidly mounted to the body. The heating element may be elongate so as to define a longitudinal axis and may, for example, have a transverse profile (i.e., transverse to a longitudinal axis of the heating element) that is substantially circular (i.e., the heating element may be generally cylindrical). Alternatively, the heating element may have a transverse profile that is rectangular (i.e., the heater may be a "blade heater"). The heating element may alternatively be in the shape of a tube (i.e., the heater may be a "tube heater"). The heating element may take other forms (e.g., the heating element may have an elliptical transverse profile). The shape and/or size (e.g., diameter) of the transverse profile of the heating element may be generally consistent for the entire length (or substantially the entire length) of the heating element.

The heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 μm and 220 μm, e.g., between 170 μm and 190 μm, e.g., around 180 μm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 μm.

The heating element may be located in the cavity (of the device), and may extend (e.g., along a longitudinal axis) from an internal base of the cavity towards an opening of the cavity. The length of the heating element (i.e., along the longitudinal axis of the heater) may be less than the depth of the cavity. Hence, the heating element may extend for only a portion of the length of the cavity. That is, the heating element may not extend through (or beyond) the opening of the cavity.

The heating element may be configured for insertion into an aerosol-forming article (e.g., a HT consumable) when an aerosol-forming article is received in the cavity. In that respect, a distal end (i.e., distal from a base of the heating element where it is mounted to the device) of the heating element may comprise a tapered portion, which may facilitate insertion of the heating element into the aerosol-forming article. The heating element may fully penetrate an aerosol-forming article when the aerosol-forming article is received in the cavity. That is, the entire length, or substantially the entire length, of the heating element may be received in the aerosol-forming article.

The heating element may have a length that is less than, or substantially the same as, an axial length of an aerosol-forming substrate forming part of an aerosol-forming article (e.g., a HT consumable). Thus, when such an aerosol-forming article is engaged with the device, the heating element may only penetrate the aerosol-forming substrate, rather than other components of the aerosol-forming article. The heating element may penetrate the aerosol-forming substrate for substantially the entire axial length of the aerosol forming-substrate of the aerosol-forming article. Thus, heat may be transferred from (e.g., an outer circumferential surface of) the heating element to the surrounding aerosol-forming substrate, when penetrated by the heating element. That is, heat may be transferred radially outwardly (in the case of acylindrical heating element) or, e.g., radially inwardly (in the case of a tube heater).

Where the heater is a tube heater, the heating element of the tube heater may surround at least a portion of the cavity. When the portion of the aerosol-forming article is received in the cavity, the heating element may surround a portion of the aerosol-forming article (i.e., so as to heat that portion of the aerosol-forming article). In particular, the heating element may surround an aerosol forming substrate of the aerosol-forming article. That is, when an aerosol-forming article is engaged with the device, the aerosol forming substrate of the aerosol-forming article may be located adjacent an inner surface of the (tubular) heating element. When the heating element is activated, heat may be transferred radially inwardly from the inner surface of the heating element to heat the aerosol forming substrate.

The cavity may comprise a (e.g., circumferential) wall (or walls) and the (tubular) heating element may extend around at least a portion of the wall(s). In this way, the wall may be located between the inner surface of the heating element and an outer surface of the aerosol-forming article. The wall (or walls) of the cavity may be formed from a thermally conductive material (e.g., a metal) to allow heat conduction from the heating element to the aerosol-forming article. Thus, heat may be conducted from the heating element, through the cavity wall (or walls), to the aerosol-forming substrate of an aerosol-forming article received in the cavity.

In some embodiments the device may comprise a cap disposed at the end of the body that is configured for engagement with an aerosol-forming article. Where the device comprises a heater having a heating element, the cap may at least partially enclose the heating element. The cap may be moveable between an open position in which access is provided to the heating element, and a closed position in which the cap at least partially encloses the heating element. The cap may be slidably engaged with the body of the device and may be slidable between the open and closed positions.

The cap may define at least a portion of the cavity of the device. That is, the cavity may be fully defined by the cap, or each of the cap and body may define a portion of the cavity. The cap may comprise an opening to the cavity. The opening may be configured for receipt of at least a portion of an aerosol-forming article. That is, an aerosol-forming article may be inserted through the opening and into the cavity (so as to be engaged with the device).

The cap may be configured such that when an aerosol-forming article is engaged with the device (e.g., received in the cavity), only a portion of the aerosol-forming article is received in the cavity. That is, a portion of the aerosol-forming article (not received in the cavity) may protrude from (i.e., extend beyond) the opening. This (protruding) portion of the aerosol-forming article may be a terminal (e.g., mouth) end of the aerosol-forming article, which may be received in a user's mouth for the purpose of inhaling aerosol formed by the device.

The device may comprise a power source or may be connectable to a power source (e.g., a power source separate to the device). In one aspect of the first mode, the device may be connectable to a rechargeable power source device, separate to the device, to receive power for charging the power source of the device and allow the usage of the device while still receiving the power in addition to charging the power source. The power source may be electrically connectable to the heater. In that respect, altering (e.g., toggling) the electrical connection of the power source to the heater may affect a state of the heater. For example, toggling the electrical connection of the power source to the heater may toggle the heater between an on state and an off state. The power source may be a power store. For example, the power source may be a battery or rechargeable battery (e.g., a lithium-ion battery).

The device may comprise an input connection such as port (e.g., a USB port, Micro USB port, USB-C port, etc.) to receive power for charging the rechargeable battery of the device. The input connection may be configured for connection to an external source of electrical power, such as a mains electrical supply outlet. The input connection may, in some cases, be used as a substitute for an internal power source (e.g., battery or rechargeable battery). That is, the input connection may be electrically connectable to the heater (for providing power to the heater). Hence, in some forms, the input connection may form at least part of the power source of the device.

Where the power source comprises a rechargeable power source (such as a rechargeable battery), the input connection may be used to charge and recharge the power source.

The device may comprise a user interface (UI). In some embodiments the UI may include input means to receive operative commands from the user. The input means of the UI may allow the user to control at least one aspect of the operation of the device. In some embodiments the input means may comprise a power button to switch the device between an on state and an off state. In one aspect of the first mode, the input means may comprise at least one button, which when pressed indicate the charging level or charging state of the device. The button may also, when pressed, indicate the amount of received power, sufficient power needed for usage of the device, and time to charge the sufficient needed power.

In some embodiments the UI may additionally or alternatively comprise output means to convey information to the user. In some embodiments the output means may comprise a light to indicate a condition of the device (and/or the aerosol-forming article) to the user. The condition of the device (and/or aerosol-forming article) indicated to the user may comprise a condition indicative of the operation of the heater. For example, the condition may comprise whether the heater is in an off state or an on state. In some embodiments, the UI unit may comprise at least one of a button, a display, a touchscreen, a switch, a light, and the like. In another example, the condition may comprise what is charge level or charging status or is the device is being charged with sufficient power for usage. In yet another example, the light may indicate the beginning, progressing, and ending of the charging operation. For example, the output means may comprise one or more (e.g., two, three, four, etc.) light-emitting diodes ("LEDs") that may be located on the body of the device.

The device may further comprise a feedback means to generate one of a haptic feedback, an audio feedback, and a visual feedback to indicate the user about one of beginning, progressing, and ending of the charging operation. In some aspects of the first mode, the feedback means generate feedback to indicate the state of the device when receiving power from the rechargeable power source device. Example feedback means include one or more of haptic sensor, microphone, and touch screen display.

The device may further comprise a puff sensor (e.g., airflow sensor), which form part of the input means of the UI. The puff sensor may be configured to detect a user drawing on an end (i.e., a terminal (mouth) end) of the aerosol-forming article. The puff sensor may, for example, be a pressure sensor or a microphone. The puff sensor may be configured to produce a signal indicative of a puff state. The signal may be indicative of the user drawing (an aerosol from the aerosol-forming article) such that it is, e.g., in the form of a binary signal. Alternatively or additionally, the signal may be indicative of a characteristic of the draw (e.g., a flow rate of the draw, length of time of the draw, etc.).

The device may comprise a controller or may be connectable to a controller that may be configured to control at least one function of the device. The controller may comprise a microcontroller that may, e.g., be mounted on a printed circuit board (PCB). The controller may also comprise a memory, e.g., non-volatile memory. The memory may include instructions, which, when implemented, may cause the controller to perform certain tasks or steps of a method. Where the device comprises an input connection, the controller may be connected to the input connection.

The controller may be configured to control the operation of the heater (and, e.g., the heating element). Thus, the controller may be configured to control vaporization of an aerosol forming part of an aerosol-forming article engaged with the device. The controller may be configured to control the voltage applied by power source to the heater. For example, the controller may be configured to toggle between applying a full output voltage (of the power source) to the heater and applying no voltage to the heater. Alternatively or additionally, the control unit may implement a more complex heater control protocol.

The device may further comprise a voltage regulator to regulate the output voltage supplied by the power source to form a regulated voltage. The regulated voltage may subsequently be applied to the heater.

In some embodiments, where the device comprises a UI, the controller may be operatively connected to one or more components of the UI. The controller may be configured to receive command signals from an input means of the UI. The controller may be configured to control the heater in response to the command signals. For example, the controller may be configured to receive "on" and "off" command signals from the UI and, in response, may control the heater so as to be in a corresponding on or off state.

The controller may be configured to send output signals to a component of the UI. The UI may be configured to convey information to a user, via an output means, in response to such output signals (received from the controller). For example, where the device comprises one or more LEDs, the LEDs may be operatively connected to the controller. Hence, the controller may be configured to control the illumination of the LEDs (e.g., in response to an output signal). For example, the controller may be configured to control the illumination of the LEDs according to (e.g., an on or off) state of the heater.

Where the device comprises a sensor (e.g., a puff/airflow sensor), the controller may be operatively connected to the sensor. The controller may be configured to receive a signal from the sensor (e.g., indicative of a condition of the device and/or engaged aerosol-forming article). The controller may be configured to control the heater, or an aspect of the output means, based on the signal from the sensor.

In some aspects of the first mode, the controller may be configured to allow extended usage of the device while receiving power from the rechargeable power device via the port.

The device may comprise a wireless interface configured to communicate wirelessly (e.g., via Bluetooth (e.g., a Bluetooth low-energy connection) or Wi-Fi) with an external device. Similarly, the input connection may be configured for wired connection to an external device so as to provide communication between the device and the external device.

The external device may be a mobile device. For example, the external device may be a smart phone, tablet, smart watch, or smart car. An application (e.g., app) may be installed on the external device (e.g., mobile device). The application may facilitate communication between the device and the external device via the wired or wireless connection.

The wireless or wired interface may be configured to transfer signals between the external device and the controller of the device. In this respect, the controller may control an aspect of the device in response to a signal received from an external device. Alternatively or additionally, an external device may respond to a signal received from the device (e.g., from the controller of the device).

In a second aspect of the first mode, there is provided a system (e.g., a smoking substitute system) comprising a device according to the first aspect of the first mode and an aerosol-forming article. The aerosol-forming article may comprise an aerosol-forming substrate at an upstream end of the aerosol-forming article. The article may be in the form of a smoking substitute article, e.g., heated tobacco (HT) consumable (also known as a heat-not-burn (HNB) consumable).

As used herein, the terms "upstream" and "downstream" are intended to refer to the flow direction of the vapor/aerosol, i.e., with the downstream end of the article/consumable being the mouth end or outlet where the aerosol exits the consumable for inhalation by the user. The upstream end of the article/consumable is the opposing end to the downstream end.

The aerosol-forming substrate is capable of being heated to release at least one volatile compound that can form an aerosol. The aerosol-forming substrate may be located at the upstream end of the article/consumable.

In order to generate an aerosol, the aerosol-forming substrate comprises at least one volatile compound that is intended to be vaporized/aerosolized and that may provide the user with a recreational and/or medicinal effect when inhaled. Suitable chemical and/or physiologically active volatile compounds include the group consisting of nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius*, *Arctostaphylos uva-ursi* (Bearberry), *Argemone mexicana*, *Amica, Artemisia vulgaris*, Yellow Tees, *Galea zacatechichi*, *Canavalia maritima* (Baybean), *Cecropia mexicana* (Guamura), *Cestrum noctumum, Cynoglossum virginianum* (wild comfrey), *Cytisus scoparius*, Damiana, *Entada rheedii*, *Eschscholzia californica* (California Poppy), *Fittonia albivenis, Hippobroma longiflora, Humulus japonica* (Japanese Hops), *Humulus lupulus* (Hops), *Lactuca virosa* (Lettuce Opium), *Laggera alata, Leonotis leonurus, Leonurus cardiaca* (Motherwort), *Leonurus sibiricus* (Honeyweed), *Lobelia cardinalis, Lobelia inflata* (Indian-tobacco), *Lobelia siphilitica, Nepeta cataria* (Catnip), *Nicotiana* species (Tobacco), *Nymphaea alba* (White Lily), *Nymphaea caerulea* (Blue Lily), Opium poppy, *Passiflora incamata* (Passionflower), *Pedicularis densiflora* (Indian Warrior), *Pedicularis groenlandica* (Elephant's Head), *Salvia divinorum, Salvia dorrii* (Tobacco Sage), *Salvia* species (Sage), *Scutellaria*

*galericulata, Scutellaria lateriflora, Scutellaria nana, Scutellaria* species (Skullcap), *Sida acuta* (Wireweed), *Sida rhombifolia, Silene capensis, Syzygium aromaticum* (Clove), *Tagetes lucida* (Mexican Tarragon), *Tarchonanthus camphoratus, Turnera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above-mentioned tobaccos.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, and aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the article/consumable may comprise an aerosol-cooling element which is adapted to cool the aerosol generated from the aerosol-forming substrate (by heat exchange) before being inhaled by the user.

The article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

According to a third aspect of the first mode, there is provided a method of using the system according to the second aspect, the method comprising inserting the aerosol-forming article into the device; and heating the article using the heater of the device.

In some embodiments the method may comprise inserting the article into a cavity within a body of the device and penetrating the article with the heating element of the device upon insertion of the article.

According to a fourth aspect of the first mode, there is provided a rechargeable power source device for charging the smoking substitute device according to the first aspect of the first mode. The rechargeable power source device is being adapted to be connectable to a port of the smoking substitute device, wherein the rechargeable power source device is adapted to abut with a surface of the smoking substitute device when connected with the port. By adapting the rechargeable power source device with the smoking substitute device, the stability of the connection of the rechargeable power source device with the port is maintained.

Conveniently, the rechargeable power source device further comprising a connector extendable from a cavity formed in an end wall of the rechargeable power source device, and connectable in a docking port located on the smoking substitute device. The connector is configured as an extendable connector so as to extend from the cavity only when needed to connect with port and retain within the cavity when not connected, thereby preventing exposure to the environment, wear and tear stresses and external actions.

Optionally, the rechargeable power source device further comprising a switch located on outer surface of the cavity and coupled with the connector to facilitate the extension of the connector for engaging with the smoking substitute device. It is advantageous to include the switch so as to effectively control the extension of the connector, thereby preventing accidental extension when not required.

Advantageously, the rechargeable power source device is adapted to provide a sealed alignment with the device, so that there is more stability to the engagement of the connector with the port. The sealed alignment also would enable the rechargeable power source device to aesthetically fit with the smoking substitute device so that the connector and port do not get disengaged during the charging process or device operation or both. This would also enable user to enjoy the smoking experience without any interruption due to lack of power and without being unaware that the smoking substitute device is being charged. Sealed alignment or sealed contact may in particular be understood as providing a connection between the device and the rechargeable power source device so that dust, debris or even liquids cannot enter the space between the rechargeable power source device and the device. To achieve this, the shapes of the housing of the device and the rechargeable power source device may be complementary and match one another. A seal element may be provided between the device and the rechargeable power source device. The outer shape of the housing of the device and the rechargeable power source device may likewise conform, so that a user holding a combined device and rechargeable power source device may not immediately perceive holding two devices, but substantially perceives holding only one (combined) device. The connector and port may be arranged so to provide a rugged and/or tight and/or stiff connection so that no or only neglectable movement between the device and the rechargeable power source device is perceived by the user. In other words, the device and the liquid-tight may abut.

According to a fifth aspect of the first mode, there is provided a smoking substitute system comprising a smoking substitute device according to the first aspect of the first mode and a rechargeable power source device according to the fourth aspect of the first mode.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Second Mode: An Aerosol Delivery Device or Smoking Substitute Device Configured to Wirelessly Communicate with a User Compute Device.

At its most general, the present disclosure relates to an aerosol delivery device or smoking substitute device configured to wirelessly communicate with a user compute device. The device may be a heated tobacco device.

According to a first aspect of the second mode, there is provided a heated tobacco device including: a wireless interface configured to wirelessly communicate with a user compute device, and; a controller configured to control one or more functions of the heated tobacco device based on information received wirelessly from the user compute device.

By providing a device according to the first aspect of the second mode, a smart and user-friendly device may be provisioned which can be controlled with the user interface of a user compute device. Operating of the HT device may be made easier using the user compute device, which may have a more comprehensive user interface than the HT device.

The term "wirelessly communicate" is intended to refer to any communication means provisioning connection and communication between two devices using wireless signal, without a physical connection.

The term "user compute device" is intended to refer to any device used by the user and is configured establish wireless connection with the heated tobacco device of the present disclosure.

According to another aspect of the second mode, there is provided a heated tobacco device including: a wireless interface configured to wirelessly communicate with a user compute device comprising a heated tobacco related application, and; a controller configured to control one or more functions of the heated tobacco device based on information received wirelessly from the user compute device. The device may be configured such that the one or more functions include changing an operating temperature of a heating element of the heated tobacco device, and wherein a user is provisioned to control said operating temperature of a heating element using the heated tobacco related application on said compute device via said and said wireless interface.

Optional features will now be set out. These are applicable singly or in any combination with any aspect.

Optionally, the controller is configured to send output information from the heated tobacco device to the compute device via the wireless interface.

Optionally, the output information comprises at least one of fault data, usage data, and real-time performance data relating to the heated tobacco device.

Optionally, the output information includes measured temperature data for a heater of the device.

Optionally, the output information includes an identifier for the heated tobacco device.

Optionally, the one or more functions include changing an operating temperature of a heating element of the heated tobacco device.

Optionally, the one or more functions include changing an operating mode of the heated tobacco device.

Optionally, the one or more functions include toggling the heated tobacco device between a locked state and an unlocked state.

Optionally, the one or more functions include changing an aspect of user feedback provided by the heated tobacco device via a user interface of the heated tobacco device.

Optionally, the user compute device includes an application relating to the heated tobacco device.

Optionally, the application is configured to send at least a portion of the output information received from the heated tobacco device to a remote server.

Optionally, the wireless interface is a Bluetooth interface.

According to a third aspect of the second mode, there is provided a heated tobacco system including a device according to the first aspect, or the second aspect, and the user compute device.

According to a fourth aspect of the second mode, there is provided a method of operating a heated tobacco device: including wirelessly receiving information from a user compute device via a wireless interface of the heated tobacco device; controlling one or more functions of the heated tobacco device based on information received wirelessly from the user compute device.

Optionally, the method further comprises providing output information to the user compute device from the heated tobacco device via the wireless interface.

Optionally, the information received may be instructions to control the one or more functions.

Optionally, the one or more functions may be associated with at least one of a heating element, a battery and locking/unlocking of the device.

Optionally, the device information may comprise at least one of analytical data, fault data, statistical data, monitored data and real-time performance data relating to the device.

Optionally, the user compute device may include with an application relating to the device.

Optionally, the device information comprises at least one of analytical data, fault data, statistical data, monitored data and real-time performance data relating to the device.

The device may comprise an elongate body. An end of the elongate body may be configured for engagement with an aerosol-forming article. For example, the body may be configured for engagement with a heated tobacco (HT) consumable (or heat-not-burn (HNB) consumable). The terms "heated tobacco" and "heat-not-burn" are used interchangeably herein to describe a consumable that is of the type that is heated rather than combusted (or are used interchangeably to describe a device for use with such a consumable). The device may comprise a cavity that is configured for receipt of at least a portion of the consumable (i.e., for engagement with the consumable). The aerosol-forming article may be of the type that comprises an aerosol former (e.g., carried by an aerosol-forming substrate).

The device may comprise a heater for heating the aerosol-forming article. The heater may comprise a heating element, which may be in the form of a rod that extends from the body of the device. The heating element may extend from the end of the body that is configured for engagement with the aerosol-forming article.

The heater (and thus the heating element) may be rigidly mounted to the body. The heating element may be elongate so as to define a longitudinal axis and may, for example, have a transverse profile (i.e., transverse to a longitudinal axis of the heating element) that is substantially circular (i.e., the heating element may be generally cylindrical). Alternatively, the heating element may have a transverse profile that is rectangular (i.e., the heater may be a "blade heater"). The heating element may alternatively be in the shape of a tube (i.e., the heater may be a "tube heater"). The heating element may take other forms (e.g., the heating element may have an elliptical transverse profile). The shape and/or size (e.g., diameter) of the transverse profile of the heating element may be generally consistent for the entire length (or substantially the entire length) of the heating element.

The heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 µm and 220 µm, e.g., between 170 µm and 190 µm, e.g., around 180 µm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 µm.

The heating element may be located in the cavity (of the device), and may extend (e.g., along a longitudinal axis) from an internal base of the cavity towards an opening of the cavity. The length of the heating element (i.e., along the longitudinal axis of the heater) may be less than the depth of the cavity. Hence, the heating element may extend for only a portion of the length of the cavity. That is, the heating element may not extend through (or beyond) the opening of the cavity.

The heating element may be configured for insertion into an aerosol-forming article (e.g., a HT consumable) when an aerosol-forming article is received in the cavity. In that respect, a distal end (i.e., distal from a base of the heating element where it is mounted to the device) of the heating element may comprise a tapered portion, which may facilitate insertion of the heating element into the aerosol-forming article. The heating element may fully penetrate an aerosol-forming article when the aerosol-forming article is received in the cavity. That is, the entire length, or substantially the entire length, of the heating element may be received in the aerosol-forming article.

The heating element may have a length that is less than, or substantially the same as, an axial length of an aerosol-forming substrate forming part of an aerosol-forming article (e.g., a HT consumable).

Thus, when such an aerosol-forming article is engaged with the device, the heating element may only penetrate the aerosol-forming substrate, rather than other components of the aerosol-forming article. The heating element may penetrate the aerosol-forming substrate for substantially the entire axial length of the aerosol forming-substrate of the aerosol-forming article. Thus, heat may be transferred from (e.g., an outer circumferential surface of) the heating element to the surrounding aerosol-forming substrate, when penetrated by the heating element. That is, heat may be transferred radially outwardly (in the case of a cylindrical heating element) or, e.g., radially inwardly (in the case of a tube heater).

Where the heater is a tube heater, the heating element of the tube heater may surround at least a portion of the cavity. When the portion of the aerosol-forming article is received in the cavity, the heating element may surround a portion of the aerosol-forming article (i.e., so as to heat that portion of the aerosol-forming article). In particular, the heating element may surround an aerosol forming substrate of the aerosol-forming article. That is, when an aerosol-forming article is engaged with the device, the aerosol forming substrate of the aerosol-forming article may be located adjacent an inner surface of the (tubular) heating element. When the heating element is activated, heat may be transferred radially inwardly from the inner surface of the heating element to heat the aerosol forming substrate.

The cavity may comprise a (e.g., circumferential) wall (or walls) and the (tubular) heating element may extend around at least a portion of the wall(s). In this way, the wall may be located between the inner surface of the heating element and an outer surface of the aerosol-forming article. The wall (or walls) of the cavity may be formed from a thermally conductive material (e.g., a metal) to allow heat conduction from the heating element to the aerosol-forming article. Thus, heat may be conducted from the heating element, through the cavity wall (or walls), to the aerosol-forming substrate of an aerosol-forming article received in the cavity.

In some embodiments the device may comprise a cap disposed at the end of the body that is configured for engagement with an aerosol-forming article. Where the device comprises a heater having a heating element, the cap may at least partially enclose the heating element. The cap may be moveable between an open position in which access is provided to the heating element, and a closed position in which the cap at least partially encloses the heating element. The cap may be slidably engaged with the body of the device and may be slidable between the open and closed positions.

The cap may define at least a portion of the cavity of the device. That is, the cavity may be fully defined by the cap, or each of the cap and body may define a portion of the cavity. Where the cap fully defines the cavity, the cap may comprise an aperture for receipt of the heating element into the cavity (when the cap is in the closed position). The cap may comprise an opening to the cavity. The opening may be configured for receipt of at least a portion of an aerosol-forming article. That is, an aerosol-forming article may be inserted through the opening and into the cavity (so as to be engaged with the device).

The cap may be configured such that when an aerosol-forming article is engaged with the device (e.g., received in the cavity), only a portion of the aerosol-forming article is received in the cavity. That is, a portion of the aerosol-forming article (not received in the cavity) may protrude from (i.e., extend beyond) the opening. This (protruding) portion of the aerosol-forming article may be a terminal (e.g., mouth) end of the aerosol-forming article, which may be received in a user's mouth for the purpose of inhaling aerosol formed by the device.

The device may comprise a power source or may be connectable to a power source (e.g., a power source separate to the device). The power source may be electrically connectable to the heater. In that respect, altering (e.g., toggling) the electrical connection of the power source to the heater may affect a state of the heater. For example, toggling the electrical connection of the power source to the heater may toggle the heater between an on state and an off state. The power source may be a power store. For example, the power source may be a battery or rechargeable battery (e.g., a lithium-ion battery).

The device may comprise an input connection (e.g., a USB port, Micro USB port, USB-C port, etc.). The input connection may be configured for connection to an external source of electrical power, such as a mains electrical supply outlet. The input connection may, in some cases, be used as a substitute for an internal power source (e.g., battery or rechargeable battery). That is, the input connection may be electrically connectable to the heater (for providing power to the heater). Hence, in some forms, the input connection may form at least part of the power source of the device.

Where the power source comprises a rechargeable power source (such as a rechargeable battery), the input connection may be used to charge and recharge the power source.

The device may comprise a user interface (UI). In some embodiments the UI may include input means to receive operative commands from the user. The input means of the UI may allow the user to control at least one aspect of the operation of the device. In some embodiments the input means may comprise a power button to switch the device between an on state and an off state.

In some embodiments the UI may additionally or alternatively comprise output means to convey information to the user. In some embodiments the output means may comprise a light to indicate a condition of the device (and/or the aerosol-forming article) to the user. The condition of the device (and/or aerosol-forming article) indicated to the user may comprise a condition indicative of the operation of the heater. For example, the condition may comprise whether the heater is in an off state or an on state. In some embodiments, the UI unit may comprise at least one of a button, a display, a touchscreen, a switch, a light, and the like. For example, the output means may comprise one or more (e.g., two, three, four, etc.) light-emitting diodes ("LEDs") that may be located on the body of the device.

The device may further comprise a puff sensor (e.g., airflow sensor), which form part of the input means of the UI. The puff sensor may be configured to detect a user drawing on an end (i.e., a terminal (mouth) end) of the aerosol-forming article. The puff sensor may, for example, be a pressure sensor or a microphone. The puff sensor may be configured to produce a signal indicative of a puff state. The signal may be indicative of the user drawing (an aerosol from the aerosol-forming article) such that it is, e.g., in the form of a binary signal. Alternatively or additionally, the signal may be indicative of a characteristic of the draw (e.g., a flow rate of the draw, length of time of the draw, etc.).

The device may comprise a controller or may be connectable to a controller that may be configured to control at least one function of the device. The controller may comprise a microcontroller that may, e.g., be mounted on a printed circuit board (PCB). The controller may also comprise a memory, e.g., non-volatile memory. The memory may include instructions, which, when implemented, may cause the controller to perform certain tasks or steps of a method. Where the device comprises an input connection, the controller may be connected to the input connection.

The controller may be configured to control the operation of the heater (and, e.g., the heating element). Thus, the controller may be configured to control vaporization of an aerosol forming part of an aerosol-forming article engaged with the device. The controller may be configured to control the voltage applied by power source to the heater. For example, the controller may be configured to toggle between applying a full output voltage (of the power source) to the heater and applying no voltage to the heater. Alternatively or additionally, the control unit may implement a more complex heater control protocol.

The device may further comprise a voltage regulator to regulate the output voltage supplied by the power source to form a regulated voltage. The regulated voltage may subsequently be applied to the heater.

In some embodiments, where the device comprises a UI, the controller may be operatively connected to one or more components of the UI. The controller may be configured to receive command signals from an input means of the UI. The controller may be configured to control the heater in response to the command signals. For example, the controller may be configured to receive "on" and "off" command signals from the UI and, in response, may control the heater so as to be in a corresponding on or off state.

The controller may be configured to send output signals to a component of the UI. The UI may be configured to convey information to a user, via an output means, in response to such output signals (received from the controller). For example, where the device comprises one or more LEDs, the LEDs may be operatively connected to the controller. Hence, the controller may be configured to control the illumination of the LEDs (e.g., in response to an output signal). For example, the controller may be configured to control the illumination of the LEDs according to (e.g., an on or off) state of the heater.

Where the device comprises a sensor (e.g., a puff/airflow sensor), the controller may be operatively connected to the sensor. The controller may be configured to receive a signal from the sensor (e.g., indicative of a condition of the device and/or engaged aerosol-forming article). The controller may be configured to control the heater, or an aspect of the output means, based on the signal from the sensor.

The device may comprise a wireless interface configured to communicate wirelessly (e.g., via Bluetooth (e.g., a Bluetooth low-energy connection) or Wi-Fi) with an external device. The external device may be a user compute device.

Similarly, the input connection may be configured for wired connection to an external device so as to provide communication between the device and the external device.

The external device or the user compute device may be a mobile device. For example, the user compute device may be a smart phone, tablet, smart watch, or smart car. An application (e.g., app) may be installed on the user compute device (e.g., mobile device). The application may facilitate communication between the device and the user compute device via the wired or wireless connection.

The wireless or wired interface may be configured to transfer signals between the user compute device and the controller of the device. In this respect, the controller may control an aspect of the device in response to a signal received from the user compute device. Alternatively or additionally, an external device may respond to a signal received from the device (e.g., from the controller of the device).

In some embodiments, the controller of the device may be configured to wirelessly communicate with the user compute device. The controller may therefore be able to control the one or more functions based on the information received wirelessly from the user compute device.

In a further aspect of the second mode, there is provided a system (e.g., a smoking substitute system) comprising a device according to the first aspect or a system according to the second aspect, and an aerosol-forming article. The aerosol-forming article may comprise an aerosol-forming substrate at an upstream end of the aerosol-forming article. The article may be in the form of a smoking substitute article, e.g., heated tobacco (HT) consumable (also known as a heat-not-burn (HNB) consumable).

As used herein, the terms "upstream" and "downstream" are intended to refer to the flow direction of the vapor/aerosol, i.e., with the downstream end of the article/consumable being the mouth end or outlet where the aerosol exits the consumable for inhalation by the user. The upstream end of the article/consumable is the opposing end to the downstream end.

The aerosol-forming substrate is capable of being heated to release at least one volatile compound that can form an aerosol. The aerosol-forming substrate may be located at the upstream end of the article/consumable.

In order to generate an aerosol, the aerosol-forming substrate comprises at least one volatile compound that is intended to be vaporized/aerosolized and that may provide the user with a recreational and/or medicinal effect when inhaled. Suitable chemical and/or physiologically active volatile compounds include the group consisting of nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius*, *Arctostaphylos uva-ursi* (Bearberry), *Argemone mexicana*, *Arnica*, *Artemisia vulgaris*, Yellow Tees, *Galea zacatechichi*, *Canavalia maritima* (Baybean), *Cecropia mexicana* (Guamura), *Cestrum noctumum*, *Cynoglossum virginianum* (wild comfrey), *Cytisus scoparius*, Damiana, *Entada rheedii*, *Eschscholzia californica* (California Poppy), *Fittonia albivenis*, *Hippobroma longiflora*, *Humulus japonica* (Japanese Hops), *Humulus lupulus* (Hops), *Lactuca virosa* (Lettuce Opium), *Laggera alata*, *Leonotis leonurus*, *Leonurus cardiaca* (Motherwort), *Leonurus sibiricus* (Honeyweed), *Lobelia cardinalis*, *Lobelia inflata* (Indian-tobacco), *Lobelia siphilitica*, *Nepeta cataria* (Catnip), *Nicotiana* species (Tobacco), *Nymphaea alba* (White Lily), *Nymphaea caerulea* (Blue Lily), Opium poppy, *Passiflora incamata* (Passionflower), *Pedicularis densiflora* (Indian Warrior), *Pedicularis groenlandica* (Elephant's Head), *Salvia divinorum*, *Salvia dorrii* (Tobacco Sage), *Salvia* species (Sage), *Scutellaria galericulata*, *Scutellaria lateriflora*, *Scutellaria nana*, *Scutellaria* species (Skullcap), *Sida acuta* (Wireweed), *Sida rhombifolia*, *Silene capensis*, *Syzygium aromaticum* (Clove), *Tagetes lucida* (Mexican Tarragon), *Tarchonanthus camphoratus*, *Tumera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above-mentioned tobaccos.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, and aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the article/consumable may comprise an aerosol-cooling element which is adapted to cool the aerosol generated from the aerosol-forming substrate (by heat exchange) before being inhaled by the user.

The article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

According to a fifth aspect of the second mode, there is provided a method of using the system according to the fourth aspect, the method comprising inserting the aerosol-forming article into the device; and heating the article using the heater of the device.

In some embodiments the method may comprise inserting the article into a cavity within a body of the device and penetrating the article with the heating element of the device upon insertion of the article.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Third Mode: A Heated Tobacco Device with Wireless Charging Capability.

At its most general, the third mode relates to heated tobacco device with wireless charging capability.

According to a first aspect of the third mode, there is provided a heated tobacco device comprising a rechargeable battery and a wireless charging module configured to wirelessly receive energy for charging the rechargeable battery.

Optional features will now be set out. These are applicable singly or in any combination with any aspect.

Optionally, the device comprises a device controller, coupled to the rechargeable battery, and configured to control an output power from the wireless charging module. By controlling the output power from the wireless charging module, accidental excessive charging of the replaceable battery can be avoided.

Advantageously, the wireless charging module comprises a first plurality of coils and at least one of the first plurality of coils is located adjacent to the rechargeable battery so as to efficiently charge the rechargeable battery without any power loss.

Conveniently, the wireless charging module is located on an inner surface of the heated tobacco device. Alternatively, the wireless charging module is located within an electronic compartment located on the inner surface of the heated tobacco device. By placing the wireless charging module within the electronic compartment, the wireless charging module can be protected from heat generated during the heating process.

Optionally, the at least one of the first plurality of coils is located at a predetermined distance from the outer surface of the device so as to efficiently and wirelessly receive the energy for charging the rechargeable battery.

Advantageously, the outer surface of the device is geometrically shaped for increasing coupling alignment between the first and the second plurality of coils during charging. By increasing coupling alignment the coupling if beneficially influenced, e.g., by arranging the outer surface flat with regard to the charging surface to reduce or minimize energy transfer loss. The device may be configured to wirelessly receive abundant amount of energy in less time.

Conveniently, the device does not comprise a power input port, and capable of receiving energy only wirelessly for charging the rechargeable battery. The absence of power input port may reduce the weight and overall cost of the device.

Advantageously, the device further comprises at least one light, located on a side opposite to the first plurality of coils, for indicating charge level or charging status to a user or when the device is in a preferred charging orientation. This would enhance intuitive user experience.

Conveniently, the device further comprises at least one button, located on a side opposite to the first plurality of coils, for user interaction. User interaction may be related to know about the charging level or charging state of the device. This would enhance intuitive user experience.

Optionally, the device further comprises at least one feedback means to generate one of a haptic feedback, an audio feedback, and a visual feedback to indicate the user about one of beginning, progressing, and ending of the wireless charging operation. This would keep the user informed about the progress of charging and restrict the user from using the device while using.

The device may comprise an elongate body. An end of the elongate body may be configured for engagement with an aerosol-forming article (e.g., a heated tobacco (HT) consumable. The device may comprise a cavity that is configured for receipt of at least a portion of the consumable (i.e., for engagement with the consumable). The other end of the body may be configured for engagement with a wireless charging dock or a wireless charging system that enables wireless transmission of power to charge the device. Outer surface of the other end of the body may be configured to be flat with increased surface density so as to wirelessly receive abundant energy in less charging time. The aerosol-forming article may be of the type that comprises an aerosol former (e.g., carried by an aerosol-forming substrate).

The device may comprise a heater for heating the aerosol-forming article. The heater may comprise a heating element, which may be in the form of a rod that extends from the body of the device. The heating element may extend from the end of the body that is configured for engagement with the aerosol-forming article.

The heater (and thus the heating element) may be rigidly mounted to the body. The heating element may be elongate so as to define a longitudinal axis and may, for example, have a transverse profile (i.e., transverse to a longitudinal axis of the heating element) that is substantially circular (i.e., the heating element may be generally cylindrical). Alternatively, the heating element may have a transverse profile that is rectangular (i.e., the heater may be a "blade heater"). The heating element may alternatively be in the shape of a tube (i.e., the heater may be a "tube heater"). The heating element may take other forms (e.g., the heating element may have an elliptical transverse profile). The shape and/or size (e.g., diameter) of the transverse profile of the heating element may be generally consistent for the entire length (or substantially the entire length) of the heating element.

The heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 μm and 220 μm, e.g., between 170 μm and 190 μm, e.g., around 180 μm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 μm.

The heating element may be located in the cavity (of the device), and may extend (e.g., along a longitudinal axis) from an internal base of the cavity towards an opening of the cavity. The length of the heating element (i.e., along the longitudinal axis of the heater) may be less than the depth of the cavity. Hence, the heating element may extend for only a portion of the length of the cavity. That is, the heating element may not extend through (or beyond) the opening of the cavity.

The heating element may be configured for insertion into an aerosol-forming article (e.g., a HT consumable) when an aerosol-forming article is received in the cavity. In that respect, a distal end (i.e., distal from a base of the heating element where it is mounted to the device) of the heating element may comprise a tapered portion, which may facilitate insertion of the heating element into the aerosol-forming article. The heating element may fully penetrate an aerosol-forming article when the aerosol-forming article is received in the cavity. That is, the entire length, or substantially the entire length, of the heating element may be received in the aerosol-forming article.

The heating element may have a length that is less than, or substantially the same as, an axial length of an aerosol-forming substrate forming part of an aerosol-forming article (e.g., a HT consumable). Thus, when such an aerosol-forming article is engaged with the device, the heating element may only penetrate the aerosol-forming substrate, rather than other components of the aerosol-forming article. The heating element may penetrate the aerosol-forming substrate for substantially the entire axial length of the aerosol forming-substrate of the aerosol-forming article. Thus, heat may be transferred from (e.g., an outer circumferential surface of) the heating element to the surrounding aerosol-forming substrate, when penetrated by the heating element. That is, heat may be transferred radially outwardly (in the case of a cylindrical heating element) or, e.g., radially inwardly (in the case of a tube heater).

Where the heater is a tube heater, the heating element of the tube heater may surround at least a portion of the cavity. When the portion of the aerosol-forming article is received in the cavity, the heating element may surround a portion of the aerosol-forming article (i.e., so as to heat that portion of the aerosol-forming article). In particular, the heating element may surround an aerosol forming substrate of the aerosol-forming article. That is, when an aerosol-forming article is engaged with the device, the aerosol forming substrate of the aerosol-forming article may be located adjacent an inner surface of the (tubular) heating element. When the heating element is activated, heat may be transferred radially inwardly from the inner surface of the heating element to heat the aerosol forming substrate.

The cavity may comprise a (e.g., circumferential) wall (or walls) and the (tubular) heating element may extend around at least a portion of the wall(s). In this way, the wall may be located between the inner surface of the heating element and an outer surface of the aerosol-forming article. The wall (or walls) of the cavity may be formed from a thermally conductive material (e.g., a metal) to allow heat conduction from the heating element to the aerosol-forming article. Thus, heat may be conducted from the heating element, through the cavity wall (or walls), to the aerosol-forming substrate of an aerosol-forming article received in the cavity.

In some embodiments the device may comprise a cap disposed at the end of the body that is configured for engagement with an aerosol-forming article. Where the device comprises a heater having a heating element, the cap may at least partially enclose the heating element. The cap may be moveable between an open position in which access is provided to the heating element, and a closed position in which the cap at least partially encloses the heating element. The cap may be slidably engaged with the body of the device and may be slidable between the open and closed positions.

The cap may define at least a portion of the cavity of the device. That is, the cavity may be fully defined by the cap, or each of the cap and body may define a portion of the cavity. The cap may comprise an opening to the cavity. The opening may be configured for receipt of at least a portion of an aerosol-forming article. That is, an aerosol-forming article may be inserted through the opening and into the cavity (so as to be engaged with the device).

The cap may be configured such that when an aerosol-forming article is engaged with the device (e.g., received in the cavity), only a portion of the aerosol-forming article is received in the cavity. That is, a portion of the aerosol-forming article (not received in the cavity) may protrude from (i.e., extend beyond) the opening. This (protruding) portion of the aerosol-forming article may be a terminal (e.g., mouth) end of the aerosol-forming article, which may be received in a user's mouth for the purpose of inhaling aerosol formed by the device.

The device may comprise a power source or may be connectable to a power source (e.g., a power source separate to the device). In one aspect of the third mode, the device may be configured to wirelessly receive power from power source separate to the device. The power source may be electrically connectable to the heater. In that respect, altering (e.g., toggling) the electrical connection of the power source to the heater may affect a state of the heater. For example, toggling the electrical connection of the power source to the heater may toggle the heater between an on state and an off state. The power source may be a power store. For example, the power source may be a battery or rechargeable battery (e.g., a lithium-ion battery).

The device may comprise an input connection (e.g., a USB port, Micro USB port, USB-C port, etc.). The input connection may be configured for connection to an external source of electrical power, such as a mains electrical supply outlet. The input connection may, in some cases, be used as a substitute for an internal power source (e.g., battery or rechargeable battery). That is, the input connection may be electrically connectable to the heater (for providing power to the heater). Hence, in some forms, the input connection may form at least part of the power source of the device.

Where the power source comprises a rechargeable power source (such as a rechargeable battery), the input connection may be used to charge and recharge the power source.

The device may comprise a wireless charging module configured to wirelessly receive energy for charging the rechargeable battery. In one aspect of the third mode, the wireless charging module is located on an inner surface of the heated tobacco device. The wireless charging module comprises a first plurality of coils located adjacent to the power source, with at least one of the first plurality of coils being located at a predetermined distance from the outer surface of the device.

In another aspect of the third mode, the device is adapted for receiving energy only wirelessly for charging the rechargeable battery, and wherein the device in particular does not comprise a dedicated power input port. In other words, the device receives energy wirelessly from the external power source separate to the device. For example, the device does not include the input connection or input power ports such as USB port, Micro USB port, USB-C port, etc., and directly receives energy from the external power source via the first plurality of coils without receiving through the input connection or input power ports.

The device may comprise a user interface (UI). In some embodiments the UI may include input means to receive operative commands from the user. The input means of the UI may allow the user to control at least one aspect of the operation of the device. In some embodiments the input means may comprise a power button to switch the device between an on state and an off state. In another aspect of the third mode, the input means may comprise at least one button located on side opposite to the first plurality of coils, for user interaction.

In some embodiments the UI may additionally or alternatively comprise output means to convey information to the user. In some embodiments the output means may comprise a light to indicate a condition of the device (and/or the aerosol-forming article) to the user. The condition of the device (and/or aerosol-forming article) indicated to the user may comprise a condition indicative of the operation of the heater. For example, the condition may comprise whether the heater is in an off state or an on state. In some embodiments, the UI unit may comprise at least one of a button, a display, a touchscreen, a switch, a light, and the like. In another example, the condition may comprise what is charge level or charging status or when the device is in a preferred charging orientation. In yet another example, the light may indicate the beginning, progressing, and ending of the wireless charging operation. For example, the output means may comprise one or more (e.g., two, three, four, etc.) light-emitting diodes ("LEDs") that may be located on the body of the device. In one aspect of the third mode, the LEDs may be located on a side opposite to the first plurality of coils.

The device may further comprise a feedback means to generate one of a haptic feedback, an audio feedback, and a visual feedback to indicate the user about one of beginning, progressing, and ending of the wireless charging operation. Example feedback means include one or more of haptic sensor, microphone, and touch screen display.

The device may further comprise a puff sensor (e.g., airflow sensor), which form part of the input means of the UI. The puff sensor may be configured to detect a user drawing on an end (i.e., a terminal (mouth) end) of the aerosol-forming article. The puff sensor may, for example, be a pressure sensor or a microphone. The puff sensor may be configured to produce a signal indicative of a puff state. The signal may be indicative of the user drawing (an aerosol from the aerosol-forming article) such that it is, e.g., in the form of a binary signal. Alternatively or additionally, the signal may be indicative of a characteristic of the draw (e.g., a flow rate of the draw, length of time of the draw, etc.).

The device may comprise a controller or may be connectable to a controller that may be configured to control at least one function of the device. The controller may comprise a microcontroller that may, e.g., be mounted on a printed circuit board (PCB). The controller may also comprise a memory, e.g., non-volatile memory. The memory may include instructions, which, when implemented, may cause the controller to perform certain tasks or steps of a method. Where the device comprises an input connection, the controller may be connected to the input connection.

The controller may be configured to control the operation of the heater (and, e.g., the heating element). Thus, the controller may be configured to control vaporization of an aerosol forming part of an aerosol-forming article engaged with the device. The controller may be configured to control the voltage applied by power source to the heater. For example, the controller may be configured to toggle between applying a full output voltage (of the power source) to the heater and applying no voltage to the heater. Alternatively or additionally, the control unit may implement a more complex heater control protocol.

The device may further comprise a voltage regulator to regulate the output voltage supplied by the power source to form a regulated voltage. The regulated voltage may subsequently be applied to the heater.

In some embodiments, where the device comprises a UI, the controller may be operatively connected to one or more components of the UI. The controller may be configured to receive command signals from an input means of the UI. The controller may be configured to control the heater in response to the command signals. For example, the controller may be configured to receive "on" and "off" command signals from the UI and, in response, may control the heater so as to be in a corresponding on or off state.

The controller may be configured to send output signals to a component of the UI. The UI may be configured to convey information to a user, via an output means, in response to such output signals (received from the controller). For example, where the device comprises one or more LEDs, the LEDs may be operatively connected to the controller. Hence, the controller may be configured to control the illumination of the LEDs (e.g., in response to an output signal). For example, the controller may be configured to control the illumination of the LEDs according to (e.g., an on or off) state of the heater.

Where the device comprises a sensor (e.g., a puff/airflow sensor), the controller may be operatively connected to the sensor. The controller may be configured to receive a signal from the sensor (e.g., indicative of a condition of the device and/or engaged aerosol-forming article). The controller may be configured to control the heater, or an aspect of the output means, based on the signal from the sensor.

In some aspects of the third mode, the controller may be configured to control output power from the wireless charging module for charging the rechargeable battery.

The device may comprise a wireless interface configured to communicate wirelessly (e.g., via Bluetooth (e.g., a Bluetooth low-energy connection) or Wi-Fi) with an external device. Similarly, the input connection may be configured for wired connection to an external device so as to provide communication between the device and the external device.

The external device may be a mobile device. For example, the external device may be a smart phone, tablet, smart watch, or smart car. An application (e.g., app) may be installed on the external device (e.g., mobile device). The application may facilitate communication between the device and the external device via the wired or wireless connection.

The external device may also be a wireless dock capable of wirelessly charging the device.

The wireless or wired interface may be configured to transfer signals between the external device and the controller of the device. In this respect, the controller may control an aspect of the device in response to a signal received from an external device. Alternatively or additionally, an external device may respond to a signal received from the device (e.g., from the controller of the device).

In a second aspect of the third mode, there is provided a system (e.g., a smoking substitute system) comprising a device according to the first aspect and an aerosol-forming article. The aerosol-forming article may comprise an aerosol-forming substrate at an upstream end of the aerosol-forming article. The article may be in the form of a smoking substitute article, e.g., heated tobacco (HT) consumable (also known as a heat-not-burn (HNB) consumable).

As used herein, the terms "upstream" and "downstream" are intended to refer to the flow direction of the vapor/aerosol, i.e., with the downstream end of the article/consumable being the mouth end or outlet where the aerosol exits the consumable for inhalation by the user. The upstream end of the article/consumable is the opposing end to the downstream end.

The aerosol-forming substrate is capable of being heated to release at least one volatile compound that can form an aerosol. The aerosol-forming substrate may be located at the upstream end of the article/consumable.

In order to generate an aerosol, the aerosol-forming substrate comprises at least one volatile compound that is intended to be vaporized/aerosolized and that may provide the user with a recreational and/or medicinal effect when inhaled. Suitable chemical and/or physiologically active volatile compounds include the group consisting of nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius, Arctostaphylos uva-ursi* (Bearberry), *Argemone mexicana, Amica, Artemisia vulgaris*, Yellow Tees, *Galea zacatechichi, Canavalia maritima* (Baybean), *Cecropia mexicana* (Guamura), *Cestrum noctumum, Cynoglossum virginianum* (wild comfrey), *Cytisus scoparius*, Damiana, *Entada rheedii, Eschscholzia californica* (California Poppy), *Fittonia albivenis, Hippobroma longiflora, Humulus japonica* (Japanese Hops), *Humulus lupulus* (Hops), *Lactuca virosa* (Lettuce Opium), *Laggera alata, Leonotis leonurus, Leonurus cardiaca* (Motherwort), *Leonurus sibiricus* (Honeyweed), *Lobelia cardinalis, Lobelia inflata* (Indian-tobacco), *Lobelia siphilitica, Nepeta cataria* (Catnip), *Nicotiana* species (Tobacco), *Nymphaea alba* (White Lily), *Nymphaea caerulea* (Blue Lily), Opium poppy, *Passiflora incamata* (Passionflower), *Pedicularis densiflora* (Indian Warrior), *Pedicularis groenlandica* (Elephant's Head), *Salvia divinorum, Salvia dorrii* (Tobacco Sage), *Salvia species* (Sage), *Scutellaria galericulata, Scutellaria lateriflora, Scutellaria nana, Scutellaria species* (Skullcap), *Sida acuta* (Wireweed), *Sida rhombifolia, Silene capensis, Syzygium aromaticum* (Clove), *Tagetes lucida* (Mexican Tarragon), *Tarchonanthus camphoratus, Tumera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above-mentioned tobaccos.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, and aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the article/consumable may comprise an aerosol-cooling element which is adapted to cool the aerosol generated from the aerosol-forming substrate (by heat exchange) before being inhaled by the user.

The article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

According to a third aspect of the third mode, there is provided a method of using the system according to the second aspect, the method comprising inserting the aerosol-forming article into the device; and heating the article using the heater of the device.

In some embodiments the method may comprise inserting the article into a cavity within a body of the device and penetrating the article with the heating element of the device upon insertion of the article.

According to a fourth aspect of the third mode, there is provided a system comprising a heated tobacco device and a wireless charging dock configured to wirelessly charge the device. The system further comprises a system controller, coupled to the device, and configured to control an output power from the wireless charging dock.

Conveniently, the wireless charging dock comprises a power supply and a second plurality of coils coupled to the power supply.

Optionally, at least one of the second plurality of coils is positioned proximate to the device to wirelessly connect during a charging operation. By placing the second plurality of coils proximate to the device, maximum coupling between the device and second plurality of coils is established thereby, the device may be configured to wirelessly receive abundant amount of energy in less time.

Advantageously, the wireless charging dock is configured in a predetermined shape to arrange the heated tobacco device in preferred orientation for wireless charging. The wireless charging dock is geometrically shaped to receive the heated tobacco device in required orientation or alignment so as to enhance stability to the engagement between the heated tobacco device and the wireless charging dock.

Conveniently, the wireless charging dock comprises an engagement means to provide engagement of the heated tobacco device at the correct location of the heated tobacco device on the wireless charging dock. In one aspect of the third mode, the engagement means is a magnetic means capable of providing engagement of the heated tobacco device at the correct location on the wireless charging dock. The engagement means would provide the necessary engagement of the device with the wireless charging dock so as to arrange the device in the preferred orientation for wireless charging, e.g., magnetic elements may be provided in the wireless charging dock and the heated tobacco device. The magnetic elements may interact with one another, e.g., attract or repel each other. Thus, a preferred charging position or orientation of the wireless charging dock and the heated tobacco device may be assumed by the attracting and repelling forces of the magnetic elements of the wireless charging dock and the heated tobacco device. In other words, when a user brings the wireless charging dock and the heated tobacco device in close proximity, the forces may turn the wireless charging dock and the heated tobacco device relative to one another to arrive at a preferred alignment for preferred charging. At the same time, the position may be held against external forces by the magnetic elements.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Fourth Mode: A Location of a User Input Means in a Smoking Substitute Device.

At its most general, the fourth mode relates to the location of a user input means in a smoking substitute device.

According to a first aspect of the fourth mode, there is provided a heat-not-burn device comprising: a longitudinal body having a first end and a second opposite end, wherein the first end of the body is configured to receive an aerosol forming article; a user input means located at the second end of the body, wherein the user input means is configured to control an aspect of the operation of heat-not-burn device.

By providing a heat-not-burn device comprising a user input means at the second end of the body, reduction of inadvertent user interaction with the user input means may be achieved, along with consequent potentially inadvertent operation of the device.

Optional features will now be set out. These are applicable singly or in any combination with any aspect.

Optionally, the first end of the body includes a detachable cap, wherein the cap includes a cavity to receive the aerosol forming article for the heat-not-burn device.

Optionally, the user input means is located in a recess in the second end of the longitudinal body.

Optionally, the user input means includes at least one of push button, switch, keypad, and toggle switch.

Optionally, the user input means is covered by a flexible cover.

Optionally, the flexible cover is a silicone cover.

Optionally, the longitudinal body has a longitudinal length to permit a user to simultaneously push the aerosol forming article into the cavity in the cap and actuate the user input means in the second end.

Optionally, the longitudinal body has a longitudinal length of less than 14 cm.

In second aspect of the fourth mode, a method of using the heat-not-burn device comprises steps of, initially inserting an aerosol forming article into the device through a first end of the device. Secondly, operating a user input means in the second end, to control an aspect of heating an aerosol-forming article using a heating element of the device.

Optionally, the method comprises steps of inserting the aerosol forming article in a cavity within the body of the device and step of penetrating at least a portion of the aerosol forming article with the heating element upon insertion of the article.

The device may comprise an elongate body. An end of the elongate body may be configured for engagement with an aerosol-forming article. For example, the body may be configured for engagement with a heated tobacco (HT) consumable (or heat-not-burn (HNB) consumable) or an e-cigarette consumable. The terms "heated tobacco" and "heat-not-burn" are used interchangeably herein to describe a consumable that is of the type that is heated rather than combusted (or are used interchangeably to describe a device for use with such a consumable). The device may comprise a cavity that is configured for receipt of at least a portion of the consumable (i.e., for engagement with the consumable). The aerosol-forming article may be of the type that comprises an aerosol former (e.g., carried by an aerosol-forming substrate).

The device may comprise a heater for heating the aerosol-forming article. The heater may comprise a heating element, which may be in the form of a rod that extends from the body of the device. The heating element may extend from the end of the body that is configured for engagement with the aerosol-forming article.

The heater (and thus the heating element) may be rigidly mounted to the body. The heating element may be elongate so as to define a longitudinal axis and may, for example, have a transverse profile (i.e., transverse to a longitudinal axis of the heating element) that is substantially circular (i.e., the heating element may be generally cylindrical). Alternatively, the heating element may have a transverse profile that is rectangular (i.e., the heater may be a "blade heater"). The heating element may alternatively be in the shape of a tube (i.e., the heater may be a "tube heater"). The heating element may take other forms (e.g., the heating element may have an elliptical transverse profile). The shape and/or size (e.g., diameter) of the transverse profile of the heating element may be generally consistent for the entire length (or substantially the entire length) of the heating element.

The heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 µm and 220 µm, e.g., between 170 µm and 190 µm, e.g., around 180 µm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 µm.

The heating element may be located in the cavity (of the device), and may extend (e.g., along a longitudinal axis) from an internal base of the cavity towards an opening of the cavity. The length of the heating element (i.e., along the longitudinal axis of the heater) may be less than the depth of the cavity. Hence, the heating element may extend for only a portion of the length of the cavity. That is, the heating element may not extend through (or beyond) the opening of the cavity.

The heating element may be configured for insertion into an aerosol-forming article (e.g., a HT consumable) when an aerosol-forming article is received in the cavity. In that respect, a distal end (i.e., distal from a base of the heating element where it is mounted to the device) of the heating element may comprise a tapered portion, which may facilitate insertion of the heating element into the aerosol-forming article. The heating element may fully penetrate an aerosol-forming article when the aerosol-forming article is received in the cavity. That is, the entire length, or substantially the entire length, of the heating element may be received in the aerosol-forming article.

The heating element may have a length that is less than, or substantially the same as, an axial length of an aerosol-forming substrate forming part of an aerosol-forming article (e.g., a HT consumable). Thus, when such an aerosol-forming article is engaged with the device, the heating element may only penetrate the aerosol-forming substrate, rather than other components of the aerosol-forming article. The heating element may penetrate the aerosol-forming substrate for substantially the entire axial length of the aerosol forming-substrate of the aerosol-forming article. Thus, heat may be transferred from (e.g., an outer circumferential surface of) the heating element to the surrounding aerosol-forming substrate, when penetrated by the heating element. That is, heat may be transferred radially outwardly (in the case of a cylindrical heating element) or, e.g., radially inwardly (in the case of a tube heater).

Where the heater is a tube heater, the heating element of the tube heater may surround at least a portion of the cavity. When the portion of the aerosol-forming article is received in the cavity, the heating element may surround a portion of the aerosol-forming article (i.e., so as to heat that portion of the aerosol-forming article). In particular, the heating element may surround an aerosol forming substrate of the aerosol-forming article. That is, when an aerosol-forming article is engaged with the device, the aerosol forming substrate of the aerosol-forming article may be located adjacent an inner surface of the (tubular) heating element. When the heating element is activated, heat may be transferred radially inwardly from the inner surface of the heating element to heat the aerosol forming substrate.

The cavity may comprise a (e.g., circumferential) wall (or walls) and the (tubular) heating element may extend around at least a portion of the wall(s). In this way, the wall may be located between the inner surface of the heating element and an outer surface of the aerosol-forming article. The wall (or walls) of the cavity may be formed from a thermally conductive material (e.g., a metal) to allow heat conduction from the heating element to the aerosol-forming article. Thus, heat may be conducted from the heating element, through the cavity wall (or walls), to the aerosol-forming substrate of an aerosol-forming article received in the cavity.

In some embodiments the heater may form part of an aerosol-forming article for use with the device. In such cases the device may not comprise a heater. Rather, the aerosol-forming article may comprise a heater. Such arrangements may, for example, be suited to e-cigarette systems in which the aerosol-forming article comprises a tank containing an aerosol former (e.g., in liquid form). In such embodiments, the device may comprise means for connecting the device the heater of an aerosol-forming article engaged with the device. For example, the device may comprise one or more device connectors for (e.g., electrically) connecting the device to a corresponding heater connector of the aerosol-forming article. The connectors (i.e., of both the device and the aerosol-forming article) may be in the form of electrically conductive elements (e.g., plates) that contact when the aerosol-forming article is engaged with the device.

In some embodiments the device may comprise a cap disposed at the end of the body that is configured for engagement with an aerosol-forming article. Where the device comprises a heater having a heating element, the cap may at least partially enclose the heating element. The cap may be moveable between an open position in which access is provided to the heating element, and a closed position in which the cap at least partially encloses the heating element. The cap may be slidably engaged with the body of the device and may be slidable between the open and closed positions.

The cap may define at least a portion of the cavity of the device. That is, the cavity may be fully defined by the cap, or each of the cap and body may define a portion of the cavity. Where the cap fully defines the cavity, the cap may comprise an aperture for receipt of the heating element into the cavity (when the cap is in the closed position). The cap may comprise an opening to the cavity. The opening may be configured for receipt of at least a portion of an aerosol-forming article. That is, an aerosol-forming article may be inserted through the opening and into the cavity (so as to be engaged with the device).

The cap may be configured such that when an aerosol-forming article is engaged with the device (e.g., received in the cavity), only a portion of the aerosol-forming article is received in the cavity. That is, a portion of the aerosol-forming article (not received in the cavity) may protrude from (i.e., extend beyond) the opening. This (protruding) portion of the aerosol-forming article may be a terminal (e.g., mouth) end of the aerosol-forming article, which may be received in a user's mouth for the purpose of inhaling aerosol formed by the device.

The device may comprise a power source or may be connectable to a power source (e.g., a power source separate to the device). The power source may be electrically connectable to the heater. In that respect, altering (e.g., toggling) the electrical connection of the power source to the heater may affect a state of the heater. For example, toggling the electrical connection of the power source to the heater may toggle the heater between an on state and an off state. The power source may be a power store. For example, the power source may be a battery or rechargeable battery (e.g., a lithium-ion battery).

The device may comprise an input connection (e.g., a USB port, Micro USB port, USB-C port, etc.). The input connection may be configured for connection to an external source of electrical power, such as a mains electrical supply outlet. The input connection may, in some cases, be used as a substitute for an internal power source (e.g., battery or rechargeable battery). That is, the input connection may be electrically connectable to the heater (for providing power to the heater). Hence, in some forms, the input connection may form at least part of the power source of the device.

Where the power source comprises a rechargeable power source (such as a rechargeable battery), the input connection may be used to charge and recharge the power source.

The device may comprise a user interface (UI). In some embodiments the UI may include input means to receive operative commands from the user. The input means of the UI may allow the user to control at least one aspect of the operation of the device. In some embodiments the input means may comprise a power button to switch the device between an on state and an off state.

In some embodiments the UI may additionally or alternatively comprise output means to convey information to the user. In some embodiments the output means may comprise a light to indicate a condition of the device (and/or the aerosol-forming article) to the user. The condition of the device (and/or aerosol-forming article) indicated to the user may comprise a condition indicative of the operation of the heater. For example, the condition may comprise whether the heater is in an off state or an on state. In some embodiments, the UI unit may comprise at least one of a button, a display, a touchscreen, a switch, a light, and the like. For example, the output means may comprise one or more (e.g., two, three, four, etc.) light-emitting diodes ("LEDs") that may be located on the body of the device.

The device may further comprise a puff sensor (e.g., airflow sensor), which form part of the input means of the UI. The puff sensor may be configured to detect a user drawing on an end (i.e., a terminal (mouth) end) of the aerosol-forming article. The puff sensor may, for example, be a pressure sensor or a microphone. The puff sensor may be configured to produce a signal indicative of a puff state. The signal may be indicative of the user drawing (an aerosol from the aerosol-forming article) such that it is, e.g., in the form of a binary signal. Alternatively or additionally, the signal may be indicative of a characteristic of the draw (e.g., a flow rate of the draw, length of time of the draw, etc.).

The device may comprise a controller or may be connectable to a controller that may be configured to control at least one function of the device. The controller may comprise a microcontroller that may, e.g., be mounted on a printed circuit board (PCB). The controller may also comprise a memory, e.g., non-volatile memory. The memory may include instructions, which, when implemented, may cause the controller to perform certain tasks or steps of a method. Where the device comprises an input connection, the controller may be connected to the input connection.

The controller may be configured to control the operation of the heater (and, e.g., the heating element). Thus, the controller may be configured to control vaporization of an aerosol forming part of an aerosol-forming article engaged with the device. The controller may be configured to control the voltage applied by power source to the heater. For example, the controller may be configured to toggle between applying a full output voltage (of the power source) to the heater and applying no voltage to the heater. Alternatively or additionally, the control unit may implement a more complex heater control protocol.

The device may further comprise a voltage regulator to regulate the output voltage supplied by the power source to form a regulated voltage. The regulated voltage may subsequently be applied to the heater.

In some embodiments, where the device comprises a UI, the controller may be operatively connected to one or more components of the UI. The controller may be configured to receive command signals from an input means of the UI. The controller may be configured to control the heater in response to the command signals. For example, the controller may be configured to receive "on" and "off" command signals from the UI and, in response, may control the heater so as to be in a corresponding on or off state.

The controller may be configured to send output signals to a component of the UI. The UI may be configured to convey information to a user, via an output means, in response to such output signals (received from the controller). For example, where the device comprises one or more LEDs, the LEDs may be operatively connected to the controller. Hence, the controller may be configured to control the illumination of the LEDs (e.g., in response to an output signal). For example, the controller may be configured to control the illumination of the LEDs according to (e.g., an on or off) state of the heater.

Where the device comprises a sensor (e.g., a puff/airflow sensor), the controller may be operatively connected to the sensor. The controller may be configured to receive a signal from the sensor (e.g., indicative of a condition of the device and/or engaged aerosol-forming article). The controller may be configured to control the heater, or an aspect of the output means, based on the signal from the sensor.

The device may comprise a wireless interface configured to communicate wirelessly (e.g., via Bluetooth (e.g., a Bluetooth low-energy connection) or Wi-Fi) with an external device. Similarly, the input connection may be configured for wired connection to an external device so as to provide communication between the device and the external device.

The external device may be a mobile device. For example, the external device may be a smart phone, tablet, smart watch, or smart car. An application (e.g., app) may be installed on the external device (e.g., mobile device). The application may facilitate communication between the device and the external device via the wired or wireless connection.

The wireless or wired interface may be configured to transfer signals between the external device and the controller of the device. In this respect, the controller may control an aspect of the device in response to a signal received from an external device. Alternatively or additionally, an external device may respond to a signal received from the device (e.g., from the controller of the device).

In a third aspect of the fourth mode, there is provided a system (e.g., a smoking substitute system) comprising a device according to the first aspect and an aerosol-forming article. The aerosol-forming article may comprise an aerosol-forming substrate at an upstream end of the aerosol-forming article. The article may be in the form of a smoking substitute article, e.g., heated tobacco (HT) consumable (also known as a heat-not-burn (HNB) consumable).

As used herein, the terms "upstream" and "downstream" are intended to refer to the flow direction of the vapor/aerosol, i.e., with the downstream end of the article/consumable being the mouth end or outlet where the aerosol exits the consumable for inhalation by the user. The upstream end of the article/consumable is the opposing end to the downstream end.

The aerosol-forming substrate is capable of being heated to release at least one volatile compound that can form an aerosol. The aerosol-forming substrate may be located at the upstream end of the article/consumable.

In order to generate an aerosol, the aerosol-forming substrate comprises at least one volatile compound that is intended to be vaporized/aerosolized and that may provide the user with a recreational and/or medicinal effect when inhaled. Suitable chemical and/or physiologically active volatile compounds include the group consisting of nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius, Arctostaphylos uva-ursi* (Bearberry), *Argemone mexicana, Amica, Artemisia vulgaris,* Yellow Tees, *Galea zacatechichi, Canavalia maritima* (Baybean), *Cecropia mexicana* (Guamura), *Cestrum noctumum, Cynoglossum virginianum* (wild comfrey), *Cytisus scoparius,* Damiana, *Entada rheedii, Eschscholzia californica* (California Poppy), *Fittonia albivenis, Hippobroma longiflora, Humulus japonica* (Japanese Hops), *Humulus lupulus* (Hops), *Lactuca virosa* (Lettuce Opium), *Laggera alata, Leonotis leonurus, Leonurus cardiaca* (Motherwort), *Leonurus sibiricus* (Honeyweed), *Lobelia cardinalis, Lobelia inflata* (Indian-tobacco), *Lobelia siphilitica, Nepeta cataria* (Catnip), *Nicotiana* species (Tobacco), *Nymphaea alba* (White Lily), *Nymphaea caerulea* (Blue Lily), Opium poppy, *Passiflora incamata* (Passionflower), *Pedicularis densiflora* (Indian Warrior), *Pedicularis groenlandica* (Elephant's Head), *Salvia divinorum, Salvia dorrii* (Tobacco Sage), *Salvia* species (Sage), *Scutellaria galericulata, Scutellaria lateriflora, Scutellaria nana, Scutellaria species* (Skullcap), *Sida acuta* (Wireweed), *Sida rhombifolia, Silene capensis, Syzygium aromaticum* (Clove), *Tagetes lucida* (Mexican Tarragon), *Tarchonanthus camphoratus, Tumera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above-mentioned tobaccos.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, and aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the article/consumable may comprise an aerosol-cooling element which is adapted to cool the aerosol generated from the aerosol-forming substrate (by heat exchange) before being inhaled by the user.

The article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

In some embodiments the system may be in the form of an e-cigarette system (i.e., rather than a heated tobacco system as described above). In such a system, the consumable may be in the form of an e-cigarette consumable. The e-cigarette system may be configured such that the consumable can be received and retained in the cavity of the device (i.e., so as to be engaged with the device). The consumable may be retained by way of, e.g., an interference fit, screwing one onto (or onto) the other, a bayonet fitting, or by way of a snap engagement mechanism.

The consumable may comprise a tank, which may define a reservoir for the storage of an aerosol former. The aerosol former may be in the form of an e-liquid (stored in the reservoir).

The consumable may be a "single-use" consumable. That is, upon exhausting the e-liquid in the tank, the intention may be that the user disposes of the entire consumable. Alternatively, the e-liquid may be the only part of the system that is truly "single-use". For example, the tank may be refillable with e-liquid or another component of the system (internal to the device or external to the device, e.g., a refillable cartomizer) may define a reservoir for the e-liquid.

As set forth above, the consumable may comprise a heater (i.e., instead of the heater forming part of the device) configured to heat and vaporize the e-liquid. The consumable may comprise a porous wick that conveys e-liquid from the tank to a heating element of the heater. The heating element may be a heating filament that is wound (e.g., helically) around at least a portion of the porous wick, such that when the heating element is heated (e.g., by the action of electrical current passing through the heating element), heat may be transferred from the heating element to the e-liquid conveyed by the wick. This transfer of heat may vaporize the e-liquid and the resultant vapor may be entrained in an airflow passing through the consumable.

The consumable may further comprise one or more heater connectors for connecting the heater (of the consumable) to the device. The heater connectors may be in the form of electrically conductive element or contacts (e.g., metal plates) and may be disposed on an in-use device-facing surface of the consumable. The heater connectors may be electrically connected to the heater of the consumable, such that electricity supplied via the heater connectors may pass to the heater. In other words, a voltage applied across the heater connectors may generally correspond to a voltage applied across the heating element of the heater.

The heater connectors may be arranged such that they contact corresponding device connectors of the device when the consumable is engaged with the device. The device connectors may be connected (e.g., electrically) to a power source (e.g., battery) of the device. Thus, electricity may be supplied from the power source to the heating element, via in-contact heater and device connectors. In this way, the heater forming part of the consumable may operate (and interact with, e.g., a controller) as otherwise described above with respect to a heater forming part of the device.

According to fourth aspect of the fourth mode, there is described a smoking substitute device comprising: a toggle switch positioned at a second end of the device, the second end being opposite to a first end of the device, the first end of the device being configured for receiving an aerosol forming article, wherein the toggle switch is configured to control an aspect of the operation of the smoking substitute device.

Optionally, the toggle switch is disposed within a recess formed at the second end of the device.

Optionally, the toggle switch is covered by a flexible cover.

Optionally, the longitudinal body has a longitudinal length to permit a user to simultaneously push the aerosol forming article into the first end of the device and to actuate the toggle switch.

Optionally, the smoking substitute device is an e-cigarette device.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Fifth Mode: Operating a Smoking Substitute System Switchable Between Different States.

At its most general, the fifth mode relates to operating a smoking substitute system switchable between different states.

According to a first aspect of the fifth mode, there is provided a smoking substitute device comprising: a user input means; a controller coupled to the user input means, wherein the controller is configured to: identify an actuation sequence of input actuations provided by a user via the user input means, the actuation sequence having at least one input actuation of longer actuation duration and at least one input actuation of shorter actuation duration; and switch the device from a first state to a second state in response to completion of the actuation sequence.

A device according to the first aspect may provide a safer device with mitigation of inadvertent activation and child proofing being improved.

Optional features will now be set out. These are applicable singly or in any combination with any aspect.

Optionally, each actuation is a button press.

Optionally, the first state is an ON state and the second state is an OFF state.

Optionally, each of the first state and the second state is an operational mode of the device.

Optionally, the first state is a first operational mode during which a heater of the device is heated to a first target temperature and the second state is a second operational mode during which a heater of the device is heated to a second target temperature, wherein the first target temperature is different from the second target temperature.

Optionally, the controller is configured to switch the device from the first state to the second state, and from the second state to the first state, in response to a common actuation sequence.

Optionally, the controller is configured to switch the device from the first state to the second state in response to a first actuation sequence and to switch the device from the second state to the first state in response to a second actuation sequence, wherein the first actuation sequence is different from the second actuation sequence.

Optionally, the device further comprising an output means for providing one or more of a haptic feedback, an audio feedback, and a visual feedback in response to completion of the actuation sequence.

By using an actuation sequence of presses as user command to switch between ON and OFF states, the device may be able to determine when the user has completed the sequence and to know when the device is ready for use.

The device may comprise an elongate body. An end of the elongate body may be configured for engagement with an aerosol-forming article (e.g., a heated tobacco (HT) consumable. The device may comprise a cavity that is configured for receipt of at least a portion of the consumable (i.e., for engagement with the consumable). The aerosol-forming article may be of the type that comprises an aerosol former (e.g., carried by an aerosol-forming substrate).

The device may comprise a heater for heating the aerosol-forming article. The heater may comprise a heating element, which may be in the form of a rod that extends from the body of the device. The heating element may extend from the end of the body that is configured for engagement with the aerosol-forming article.

The heater (and thus the heating element) may be rigidly mounted to the body. The heating element may be elongate so as to define a longitudinal axis and may, for example, have a transverse profile (i.e., transverse to a longitudinal axis of the heating element) that is substantially circular (i.e., the heating element may be generally cylindrical). Alternatively, the heating element may have a transverse profile that is rectangular (i.e., the heater may be a "blade heater"). The heating element may alternatively be in the shape of a tube (i.e., the heater may be a "tube heater"). The heating element may take other forms (e.g., the heating element may have an elliptical transverse profile). The shape and/or size (e.g., diameter) of the transverse profile of the heating element may be generally consistent for the entire length (or substantially the entire length) of the heating element.

The heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 µm and 220 µm, e.g., between 170 µm and 190 µm, e.g., around 180 µm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 µm.

The heating element may be located in the cavity (of the device), and may extend (e.g., along a longitudinal axis) from an internal base of the cavity towards an opening of the cavity. The length of the heating element (i.e., along the longitudinal axis of the heater) may be less than the depth of the cavity. Hence, the heating element may extend for only a portion of the length of the cavity. That is, the heating element may not extend through (or beyond) the opening of the cavity.

The heating element may be configured for insertion into an aerosol-forming article (e.g., a HT consumable) when an aerosol-forming article is received in the cavity. In that respect, a distal end (i.e., distal from a base of the heating element where it is mounted to the device) of the heating element may comprise a tapered portion, which may facilitate insertion of the heating element into the aerosol-forming article. The heating element may fully penetrate an aerosol-forming article when the aerosol-forming article is received in the cavity. That is, the entire length, or substantially the entire length, of the heating element may be received in the aerosol-forming article.

The heating element may have a length that is less than, or substantially the same as, an axial length of an aerosol-forming substrate forming part of an aerosol-forming article (e.g., a HT consumable).

Thus, when such an aerosol-forming article is engaged with the device, the heating element may only penetrate the aerosol-forming substrate, rather than other components of the aerosol-forming article. The heating element may penetrate the aerosol-forming substrate for substantially the entire axial length of the aerosol forming-substrate of the aerosol-forming article. Thus, heat may be transferred from (e.g., an outer circumferential surface of) the heating element to the surrounding aerosol-forming substrate, when penetrated by the heating element. That is, heat may be transferred radially outwardly (in the case of a cylindrical heating element) or, e.g., radially inwardly (in the case of a tube heater).

Where the heater is a tube heater, the heating element of the tube heater may surround at least a portion of the cavity. When the portion of the aerosol-forming article is received in the cavity, the heating element may surround a portion of the aerosol-forming article (i.e., so as to heat that portion of the aerosol-forming article). In particular, the heating element may surround an aerosol forming substrate of the aerosol-forming article. That is, when an aerosol-forming article is engaged with the device, the aerosol forming substrate of the aerosol-forming article may be located adjacent an inner surface of the (tubular) heating element. When the heating element is activated, heat may be transferred radially inwardly from the inner surface of the heating element to heat the aerosol forming substrate.

The cavity may comprise a (e.g., circumferential) wall (or walls) and the (tubular) heating element may extend around at least a portion of the wall(s). In this way, the wall may be located between the inner surface of the heating element and an outer surface of the aerosol-forming article. The wall (or walls) of the cavity may be formed from a thermally conductive material (e.g., a metal) to allow heat conduction from the heating element to the aerosol-forming article. Thus, heat may be conducted from the heating element, through the cavity wall (or walls), to the aerosol-forming substrate of an aerosol-forming article received in the cavity.

In some embodiments the device may comprise a cap disposed at the end of the body that is configured for engagement with an aerosol-forming article. Where the device comprises a heater having a heating element, the cap may at least partially enclose the heating element. The cap may be moveable between an open position in which access is provided to the heating element, and a closed position in which the cap at least partially encloses the heating element. The cap may be slidably engaged with the body of the device and may be slidable between the open and closed positions.

The cap may define at least a portion of the cavity of the device. That is, the cavity may be fully defined by the cap, or each of the cap and body may define a portion of the cavity. The cap may comprise an opening to the cavity. The opening may be configured for receipt of at least a portion of an aerosol-forming article. That is, an aerosol-forming article may be inserted through the opening and into the cavity (so as to be engaged with the device).

The cap may be configured such that when an aerosol-forming article is engaged with the device (e.g., received in the cavity), only a portion of the aerosol-forming article is received in the cavity. That is, a portion of the aerosol-forming article (not received in the cavity) may protrude from (i.e., extend beyond) the opening. This (protruding) portion of the aerosol-forming article may be a terminal (e.g., mouth) end of the aerosol-forming article, which may be received in a user's mouth for the purpose of inhaling aerosol formed by the device.

The device may comprise a power source or may be connectable to a power source (e.g., a power source separate to the device). The power source may be electrically connectable to the heater. In that respect, altering (e.g., toggling) the electrical connection of the power source to the heater may affect a state of the heater. For example, toggling the electrical connection of the power source to the heater may toggle the heater between an on state and an off state. The power source may be a power store. For example, the power source may be a battery or rechargeable battery (e.g., a lithium-ion battery).

The device may comprise an input connection (e.g., a USB port, Micro USB port, USB-C port, etc.). The input connection may be configured for connection to an external source of electrical power, such as a mains electrical supply outlet. The input connection may, in some cases, be used as a substitute for an internal power source (e.g., battery or rechargeable battery). That is, the input connection may be electrically connectable to the heater (for providing power to the heater). Hence, in some forms, the input connection may form at least part of the power source of the device.

Where the power source comprises a rechargeable power source (such as a rechargeable battery), the input connection may be used to charge and recharge the power source.

The device may comprise a user interface (UI). In some embodiments the UI may include input means to receive operative commands from the user. The input means of the UI may allow the user to control at least one aspect of the operation of the device. In some embodiments the input means may comprise a power button to switch the device between an on state and an off state.

In some embodiments the UI may additionally or alternatively comprise output means to convey information to the user. In some embodiments the output means may comprise a light to indicate a condition of the device (and/or the aerosol-forming article) to the user. The condition of the device (and/or aerosol-forming article) indicated to the user may comprise a condition indicative of the operation of the heater. For example, the condition may comprise whether the heater is in an off state or an on state. In some embodiments, the UI unit may comprise at least one of a button, a display, a touchscreen, a switch, a light, and the like. For example, the output means may comprise one or more (e.g., two, three, four, etc.) light-emitting diodes ("LEDs") that may be located on the body of the device.

The device may further comprise a puff sensor (e.g., airflow sensor), which form part of the input means of the UI. The puff sensor may be configured to detect a user drawing on an end (i.e., a terminal (mouth) end) of the aerosol-forming article. The puff sensor may, for example, be a pressure sensor or a microphone. The puff sensor may be configured to produce a signal indicative of a puff state. The signal may be indicative of the user drawing (an aerosol from the aerosol-forming article) such that it is, e.g., in the form of a binary signal. Alternatively or additionally, the signal may be indicative of a characteristic of the draw (e.g., a flow rate of the draw, length of time of the draw, etc.).

The device may comprise a controller or may be connectable to a controller that may be configured to control at least one function of the device. The controller may comprise a microcontroller that may, e.g., be mounted on a printed circuit board (PCB). The controller may also comprise a memory, e.g., non-volatile memory. The memory may include instructions, which, when implemented, may cause the controller to perform certain tasks or steps of a method. Where the device comprises an input connection, the controller may be connected to the input connection.

The controller may be configured to control the operation of the heater (and, e.g., the heating element). Thus, the controller may be configured to control vaporization of an aerosol forming part of an aerosol-forming article engaged with the device. The controller may be configured to control the voltage applied by power source to the heater. For example, the controller may be configured to toggle between applying a full output voltage (of the power source) to the heater and applying no voltage to the heater. Alternatively or additionally, the control unit may implement a more complex heater control protocol.

The device may further comprise a voltage regulator to regulate the output voltage supplied by the power source to form a regulated voltage. The regulated voltage may subsequently be applied to the heater.

In some embodiments, where the device comprises a UI, the controller may be operatively connected to one or more components of the UI. The controller may be configured to receive command signals from an input means of the UI. The controller may be configured to control the heater in response to the command signals. For example, the controller may be configured to receive "on" and "off" command signals from the UI and, in response, may control the heater so as to be in a corresponding on or off state.

The controller may be configured to send output signals to a component of the UI. The UI may be configured to convey information to a user, via an output means, in response to such output signals (received from the controller). For example, where the device comprises one or more LEDs, the LEDs may be operatively connected to the controller. Hence, the controller may be configured to control the illumination of the LEDs (e.g., in response to an output signal). For example, the controller may be configured to control the illumination of the LEDs according to (e.g., an on or off) state of the heater.

Where the device comprises a sensor (e.g., a puff/airflow sensor), the controller may be operatively connected to the sensor. The controller may be configured to receive a signal from the sensor (e.g., indicative of a condition of the device and/or engaged aerosol-forming article). The controller may be configured to control the heater, or an aspect of the output means, based on the signal from the sensor.

The device may comprise a wireless interface configured to communicate wirelessly (e.g., via Bluetooth (e.g., a Bluetooth low-energy connection) or Wi-Fi) with an external device. Similarly, the input connection may be configured for wired connection to an external device so as to provide communication between the device and the external device.

The external device may be a mobile device. For example, the external device may be a smart phone, tablet, smart watch, or smart car. An application (e.g., app) may be installed on the external device (e.g., mobile device). The application may facilitate communication between the device and the external device via the wired or wireless connection.

The wireless or wired interface may be configured to transfer signals between the external device and the controller of the device. In this respect, the controller may control an aspect of the device in response to a signal received from an external device. Alternatively or additionally, an external device may respond to a signal received from the device (e.g., from the controller of the device).

In a second aspect of the fifth mode, there is provided a system (e.g., a smoking substitute system) comprising a device according to the first aspect and an aerosol-forming article. The aerosol-forming article may comprise an aerosol-forming substrate at an upstream end of the aerosol-forming article. The article may be in the form of a smoking substitute article, e.g., heated tobacco (HT) consumable (also known as a heat-not-burn (HNB) consumable).

As used herein, the terms "upstream" and "downstream" are intended to refer to the flow direction of the vapor/aerosol, i.e., with the downstream end of the article/consumable being the mouth end or outlet where the aerosol exits the consumable for inhalation by the user. The upstream end of the article/consumable is the opposing end to the downstream end.

The aerosol-forming substrate is capable of being heated to release at least one volatile compound that can form an aerosol. The aerosol-forming substrate may be located at the upstream end of the article/consumable.

In order to generate an aerosol, the aerosol-forming substrate comprises at least one volatile compound that is intended to be vaporized/aerosolized and that may provide the user with a recreational and/or medicinal effect when inhaled. Suitable chemical and/or physiologically active volatile compounds include the group consisting of nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius, Arctostaphylos uva-ursi* (Bearberry), *Argemone mexicana, Amica, Artemisia vulgaris,* Yellow Tees, *Galea zacatechichi, Canavalia maritima* (Baybean), *Cecropia mexicana* (Guamura), *Cestrum noctumum, Cynoglossum virginianum* (wild comfrey), *Cytisus scoparius*, Damiana, *Entada rheedii, Eschscholzia californica* (California Poppy), *Fittonia albivenis, Hippobroma longiflora, Humulus japonica* (Japanese Hops), *Humulus lupulus* (Hops), *Lactuca virosa* (Lettuce Opium), *Laggera alata, Leonotis leonurus, Leonurus cardiaca* (Motherwort), *Leonurus sibiricus* (Honeyweed), *Lobelia cardinalis, Lobelia inflata* (Indian-tobacco), *Lobelia siphilitica, Nepeta cataria* (Catnip), *Nicotiana* species (Tobacco), *Nymphaea alba* (White Lily), *Nymphaea caerulea* (Blue Lily), Opium poppy, *Passiflora incamata* (Passionflower), *Pedicularis densiflora* (Indian Warrior), *Pedicularis groenlandica* (Elephant's Head), *Salvia divinorum, Salvia dorrii* (Tobacco Sage), *Salvia* species (Sage), *Scutellaria galericulata, Scutellaria lateriflora, Scutellaria nana, Scutellaria species* (Skullcap), *Sida acuta* (Wireweed), *Sida rhombifolia, Silene capensis, Syzygium aromaticum* (Clove), *Tagetes lucida* (Mexican Tarragon), *Tarchonanthus camphoratus, Turnera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above-mentioned tobaccos.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, and aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the article/consumable may comprise an aerosol-cooling element which is adapted to cool the aerosol generated from the aerosol-forming substrate (by heat exchange) before being inhaled by the user.

The article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

According to a third aspect of the fifth mode, there is provided a method of using the system according to the second aspect, the method comprising inserting the aerosol-forming article into the device; and heating the article using the heater of the device.

In some embodiments the method may comprise inserting the article into a cavity within a body of the device and penetrating the article with the heating element of the device upon insertion of the article.

According to a fourth aspect of the fifth mode, there is provided a method of controlling operation of a smoking substitute device, the method comprising: identifying an actuation sequence of input actuations provided by a user via a user interface of the device, the actuation sequence having at least one input actuation of longer actuation duration and at least one input actuation of shorter actuation duration; and switching the device from a first state to a second state in response to completion of the actuation sequence.

Optionally, the first state is an ON state and the second state is an OFF state.

Optionally, each of the first state and the second state is an operational mode of the device.

Optionally, the first state is a first operational mode during which a heater of the device is heated to a first target temperature and the second state is a second operational mode during which a heater of the device is heated to a second target temperature, where the first target temperature is different from the second target temperature.

Optionally, the method includes switching the device from the first state to the second state, and from the second state to the first state, in response to a common actuation sequence.

Optionally, the method includes switching the device from the first state to the second state in response to a first actuation sequence and switching the device from the second state to the first state is in response to a second actuation sequence, wherein the first actuation sequence is different from the second actuation sequence.

Optionally, the method further includes providing one or more of a haptic feedback, an audio feedback, and a visual feedback in response to completion of the actuation sequence.

Optionally, the first state or the second state is a child-safe mode.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Sixth Mode: Operating a Smoking Substitute System Providing User Feedback.

At its most general, the sixth mode relates to operating a smoking substitute system providing user feedback.

According to a first aspect of the sixth mode, there is provided A smoking substitute device comprising: a haptic feedback means; a controller coupled to the haptic feedback means; wherein the controller is configured to: detect a first predetermined condition and a second predetermined condition of the device; activate the haptic feedback means with a first intensity in response to detection of the first predetermined condition; and activate the haptic feedback means with a second intensity in response to detection of the second predetermined condition, wherein the first intensity is different from the second intensity.

Optional features will now be set out. These are applicable singly or in any combination with any aspect.

Optionally, the device further comprising one or more of audio feedback means and visual feedback means.

Optionally, each of the first intensity and second intensity is defined according to one or more of an amplitude of haptic feedback, a frequency of haptic feedback, and a number of haptic feedback vibrations generated by the haptic feedback means.

Optionally, the first intensity is greater than the second intensity.

Optionally, the first intensity is lower than the second intensity.

Optionally, the first predetermined condition includes entry into a first operational mode of the device, and the second predetermined condition includes entry into a second operational mode of the device.

Optionally, the first predetermined condition includes detection of a normal operation mode of the device, and the second predetermined condition includes detection of an error state of the device.

Optionally, the first operational mode includes heating a heater of the device to a first target temperature, and the second operational mode includes heating a heater of the device to a second target temperature, wherein in the first target temperature is lower than the second target temperature.

The device may comprise an elongate body. An end of the elongate body may be configured for engagement with an aerosol-forming article (e.g., a heated tobacco (HT) consumable. The device may comprise a cavity that is configured for receipt of at least a portion of the consumable (i.e., for engagement with the consumable). The aerosol-forming article may be of the type that comprises an aerosol former (e.g., carried by an aerosol-forming substrate).

The device may comprise a heater for heating the aerosol-forming article. The heater may comprise a heating element, which may be in the form of a rod that extends from the body of the device. The heating element may extend from the end of the body that is configured for engagement with the aerosol-forming article.

The heater (and thus the heating element) may be rigidly mounted to the body. The heating element may be elongate so as to define a longitudinal axis and may, for example, have a transverse profile (i.e., transverse to a longitudinal axis of the heating element) that is substantially circular (i.e., the heating element may be generally cylindrical). Alternatively, the heating element may have a transverse profile that is rectangular (i.e., the heater may be a "blade heater"). The heating element may alternatively be in the shape of a tube (i.e., the heater may be a "tube heater"). The heating element may take other forms (e.g., the heating element may have an elliptical transverse profile). The shape and/or size (e.g., diameter) of the transverse profile of the heating element may be generally consistent for the entire length (or substantially the entire length) of the heating element.

The heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 μm and 220 μm, e.g., between 170 μm and 190 μm, e.g., around 180 μm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 μm.

The heating element may be located in the cavity (of the device), and may extend (e.g., along a longitudinal axis) from an internal base of the cavity towards an opening of the cavity. The length of the heating element (i.e., along the longitudinal axis of the heater) may be less than the depth of the cavity. Hence, the heating element may extend for only a portion of the length of the cavity. That is, the heating element may not extend through (or beyond) the opening of the cavity.

The heating element may be configured for insertion into an aerosol-forming article (e.g., a HT consumable) when an aerosol-forming article is received in the cavity. In that respect, a distal end (i.e., distal from a base of the heating element where it is mounted to the device) of the heating element may comprise a tapered portion, which may facilitate insertion of the heating element into the aerosol-forming article. The heating element may fully penetrate an aerosol-forming article when the aerosol-forming article is received in the cavity. That is, the entire length, or substantially the entire length, of the heating element may be received in the aerosol-forming article.

The heating element may have a length that is less than, or substantially the same as, an axial length of an aerosol-forming substrate forming part of an aerosol-forming article (e.g., a HT consumable). Thus, when such an aerosol-forming article is engaged with the device, the heating element may only penetrate the aerosol-forming substrate, rather than other components of the aerosol-forming article. The heating element may penetrate the aerosol-forming substrate for substantially the entire axial length of the aerosol forming-substrate of the aerosol-forming article. Thus, heat may be transferred from (e.g., an outer circumferential surface of) the heating element to the surrounding aerosol-forming substrate, when penetrated by the heating element. That is, heat may be transferred radially outwardly (in the case of a cylindrical heating element) or, e.g., radially inwardly (in the case of a tube heater).

Where the heater is a tube heater, the heating element of the tube heater may surround at least a portion of the cavity. When the portion of the aerosol-forming article is received in the cavity, the heating element may surround a portion of the aerosol-forming article (i.e., so as to heat that portion of the aerosol-forming article). In particular, the heating element may surround an aerosol forming substrate of the aerosol-forming article. That is, when an aerosol-forming article is engaged with the device, the aerosol forming substrate of the aerosol-forming article may be located adjacent an inner surface of the (tubular) heating element. When the heating element is activated, heat may be transferred radially inwardly from the inner surface of the heating element to heat the aerosol forming substrate.

The cavity may comprise a (e.g., circumferential) wall (or walls) and the (tubular) heating element may extend around at least a portion of the wall(s). In this way, the wall may be located between the inner surface of the heating element and an outer surface of the aerosol-forming article. The wall (or walls) of the cavity may be formed from a thermally conductive material (e.g., a metal) to allow heat conduction from the heating element to the aerosol-forming article. Thus, heat may be conducted from the heating element, through the cavity wall (or walls), to the aerosol-forming substrate of an aerosol-forming article received in the cavity.

In some embodiments the device may comprise a cap disposed at the end of the body that is configured for engagement with an aerosol-forming article. Where the device comprises a heater having a heating element, the cap may at least partially enclose the heating element. The cap may be moveable between an open position in which access is provided to the heating element, and a closed position in which the cap at least partially encloses the heating element. The cap may be slidably engaged with the body of the device and may be slidable between the open and closed positions.

The cap may define at least a portion of the cavity of the device. That is, the cavity may be fully defined by the cap, or each of the cap and body may define a portion of the cavity. The cap may comprise an opening to the cavity. The opening may be configured for receipt of at least a portion of an aerosol-forming article. That is, an aerosol-forming article may be inserted through the opening and into the cavity (so as to be engaged with the device).

The cap may be configured such that when an aerosol-forming article is engaged with the device (e.g., received in the cavity), only a portion of the aerosol-forming article is received in the cavity. That is, a portion of the aerosol-forming article (not received in the cavity) may protrude from (i.e., extend beyond) the opening. This (protruding) portion of the aerosol-forming article may be a terminal (e.g., mouth) end of the aerosol-forming article, which may be received in a user's mouth for the purpose of inhaling aerosol formed by the device.

The device may comprise a power source or may be connectable to a power source (e.g., a power source separate to the device). The power source may be electrically connectable to the heater. In that respect, altering (e.g., toggling) the electrical connection of the power source to the heater may affect a state of the heater. For example, toggling the electrical connection of the power source to the heater may toggle the heater between an on state and an off state. The power source may be a power store. For example, the power source may be a battery or rechargeable battery (e.g., a lithium-ion battery).

The device may comprise an input connection (e.g., a USB port, Micro USB port, USB-C port, etc.). The input connection may be configured for connection to an external source of electrical power, such as a mains electrical supply outlet. The input connection may, in some cases, be used as a substitute for an internal power source (e.g., battery or rechargeable battery). That is, the input connection may be electrically connectable to the heater (for providing power to the heater). Hence, in some forms, the input connection may form at least part of the power source of the device.

Where the power source comprises a rechargeable power source (such as a rechargeable battery), the input connection may be used to charge and recharge the power source.

The device may comprise a user interface (UI). In some embodiments the UI may include input means to receive operative commands from the user. The input means of the UI may allow the user to control at least one aspect of the operation of the device. In some embodiments the input means may comprise a power button to switch the device between an on state and an off state.

In some embodiments the UI may additionally or alternatively comprise output means to convey information to the user. In some embodiments the output means may comprise a light to indicate a condition of the device (and/or the aerosol-forming article) to the user. The condition of the device (and/or aerosol-forming article) indicated to the user may comprise a condition indicative of the operation of the heater. For example, the condition may comprise whether the heater is in an off state or an on state. In some embodiments, the UI unit may comprise at least one of a button, a display, a touchscreen, a switch, a light, and the like. For example, the output means may comprise one or more (e.g., two, three, four, etc.) light-emitting diodes ("LEDs") that may be located on the body of the device.

The device may further comprise a puff sensor (e.g., airflow sensor), which form part of the input means of the UI. The puff sensor may be configured to detect a user drawing on an end (i.e., a terminal (mouth) end) of the aerosol-forming article. The puff sensor may, for example, be a pressure sensor or a microphone. The puff sensor may be configured to produce a signal indicative of a puff state. The signal may be indicative of the user drawing (an aerosol from the aerosol-forming article) such that it is, e.g., in the form of a binary signal. Alternatively or additionally, the signal may be indicative of a characteristic of the draw (e.g., a flow rate of the draw, length of time of the draw, etc.).

The device may comprise a controller or may be connectable to a controller that may be configured to control at least one function of the device. The controller may comprise a microcontroller that may, e.g., be mounted on a printed circuit board (PCB). The controller may also comprise a memory, e.g., non-volatile memory. The memory may include instructions, which, when implemented, may cause the controller to perform certain tasks or steps of a method. Where the device comprises an input connection, the controller may be connected to the input connection.

The controller may be configured to control the operation of the heater (and, e.g., the heating element). Thus, the controller may be configured to control vaporization of an aerosol forming part of an aerosol-forming article engaged with the device. The controller may be configured to control the voltage applied by power source to the heater. For example, the controller may be configured to toggle between applying a full output voltage (of the power source) to the heater and applying no voltage to the heater. Alternatively or additionally, the control unit may implement a more complex heater control protocol.

The device may further comprise a voltage regulator to regulate the output voltage supplied by the power source to form a regulated voltage. The regulated voltage may subsequently be applied to the heater.

In some embodiments, where the device comprises a UI, the controller may be operatively connected to one or more components of the UI. The controller may be configured to receive command signals from an input means of the UI. The controller may be configured to control the heater in response to the command signals. For example, the controller may be configured to receive "on" and "off" command signals from the UI and, in response, may control the heater so as to be in a corresponding on or off state.

The controller may be configured to send output signals to a component of the UI. The UI may be configured to convey information to a user, via an output means, in response to such output signals (received from the controller). For example, where the device comprises one or more LEDs, the LEDs may be operatively connected to the controller. Hence, the controller may be configured to control the illumination of the LEDs (e.g., in response to an output signal). For example, the controller may be configured to control the illumination of the LEDs according to (e.g., an on or off) state of the heater.

Where the device comprises a sensor (e.g., a puff/airflow sensor), the controller may be operatively connected to the sensor. The controller may be configured to receive a signal from the sensor (e.g., indicative of a condition of the device and/or engaged aerosol-forming article). The controller may be configured to control the heater, or an aspect of the output means, based on the signal from the sensor.

In some embodiments, the controller may be configured to provide haptic feedback based on the first and second predetermined condition of the device detected by the controller.

The device may comprise a wireless interface configured to communicate wirelessly (e.g., via Bluetooth (e.g., a Bluetooth low-energy connection) or Wi-Fi) with an external device. Similarly, the input connection may be configured for wired connection to an external device so as to provide communication between the device and the external device.

The external device may be a mobile device. For example, the external device may be a smart phone, tablet, smart watch, or smart car. An application (e.g., app) may be installed on the external device (e.g., mobile device). The application may facilitate communication between the device and the external device via the wired or wireless connection.

The wireless or wired interface may be configured to transfer signals between the external device and the controller of the device. In this respect, the controller may control an aspect of the device in response to a signal received from an external device. Alternatively or additionally, an external device may respond to a signal received from the device (e.g., from the controller of the device).

In a second aspect of the sixth mode, there is provided a system (e.g., a smoking substitute system) comprising a device according to the first aspect and an aerosol-forming article. The aerosol-forming article may comprise an aerosol-forming substrate at an upstream end of the aerosol-forming article. The article may be in the form of a smoking substitute article, e.g., heated tobacco (HT) consumable (also known as a heat-not-burn (HNB) consumable).

As used herein, the terms "upstream" and "downstream" are intended to refer to the flow direction of the vapor/aerosol, i.e., with the downstream end of the article/consumable being the mouth end or outlet where the aerosol exits the consumable for inhalation by the user. The upstream end of the article/consumable is the opposing end to the downstream end.

The aerosol-forming substrate is capable of being heated to release at least one volatile compound that can form an aerosol. The aerosol-forming substrate may be located at the upstream end of the article/consumable.

In order to generate an aerosol, the aerosol-forming substrate comprises at least one volatile compound that is intended to be vaporized/aerosolized and that may provide the user with a recreational and/or medicinal effect when inhaled. Suitable chemical and/or physiologically active volatile compounds include the group consisting of nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius, Arctostaphylos uva-ursi* (Bearberry), *Argemone mexicana, Arnica, Artemisia vulgaris*, Yellow Tees, *Galea zacatechichi, Canavalia maritima* (Baybean), *Cecropia mexicana* (Guamura), *Cestrum noctumum, Cynoglossum virginianum* (wild comfrey), *Cytisus scoparius*, Damiana, *Entada rheedii, Eschscholzia californica* (California Poppy), *Fittonia albivenis, Hippobroma longiflora, Humulus japonica* (Japanese Hops), *Humulus lupulus* (Hops), *Lactuca virosa* (Lettuce Opium), *Laggera alata, Leonotis leonurus, Leonurus cardiaca* (Motherwort), *Leonurus sibiricus* (Honeyweed), *Lobelia cardinalis, Lobelia inflata* (Indian-tobacco), *Lobelia siphilitica, Nepeta cataria* (Catnip), *Nicotiana* species (Tobacco), *Nymphaea alba* (White Lily), *Nymphaea caerulea* (Blue Lily), Opium poppy, *Passiflora incarnata* (Passionflower), *Pedicularis densiflora* (Indian Warrior), *Pedicularis groenlandica* (Elephant's Head), *Salvia divinorum, Salvia dorrii* (Tobacco Sage), *Salvia* species (Sage), *Scutellaria galericulata, Scutellaria lateriflora, Scutellaria nana, Scutellaria species* (Skullcap), *Sida acuta* (Wireweed), *Sida rhombifolia, Silene capensis, Syzygium aromaticum* (Clove), *Tagetes lucida* (Mexican Tarragon), *Tarchonanthus camphoratus, Turnera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above-mentioned tobaccos.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, and aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the article/consumable may comprise an aerosol-cooling element which is adapted to cool the aerosol generated from the aerosol-forming substrate (by heat exchange) before being inhaled by the user.

The article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

According to a third aspect of the sixth mode, there is provided a method of using the system according to the second aspect, the method comprising inserting the aerosol-forming article into the device; and heating the article using the heater of the device.

In some embodiments the method may comprise inserting the article into a cavity within a body of the device and penetrating the article with the heating element of the device upon insertion of the article.

According to a fourth aspect of the sixth mode, there is provided a method of operating a smoking substitute device, the method comprising: detecting one of a first predetermined condition and a second predetermined condition of the device; activating, a haptic feedback means of the device, with a first intensity in response to detection of the first predetermined condition; and activating the haptic feedback means with a second intensity in response to detection of the second predetermined condition, wherein the first intensity is different from the second intensity.

Optionally, the method further comprising activating one or more of audio feedback means and visual feedback means in response to detecting the first and/or second predetermined conditions.

Optionally, each of the first intensity and second intensity is defined according to one or more of an amplitude of haptic feedback, a frequency of haptic feedback, and a number of haptic feedback vibrations generated by the haptic feedback means.

Optionally, the first intensity is greater than the second intensity.

Optionally, the first intensity is lower than the second intensity.

Optionally, the first predetermined condition includes entry into a first operational mode of the device, and the second predetermined condition includes entry into a second operational mode of the device.

Optionally, the first operational mode includes heating a heater of the device to a first target temperature, and the second operational mode includes heating a heater of the device to a second target temperature, wherein in the first target temperature is lower than the second target temperature.

Optionally, the first predetermined condition includes detection of a normal operation mode of the device, and the second predetermined condition includes detection of an error state of the device.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Seventh Mode: A Method of Controlling the Operation of a Substitute Smoking Device.

At its most general, the seventh mode relates to a method of controlling the operation of a substitute smoking device.

According to a first aspect of the seventh mode, there is provided a smoking substitute device comprising a heater, the device being configured to: detect a user taking puff on an aerosol-forming article when power is not being supplied to the heater; and in response to detection of the puff activate a supply of power to the heater.

Accordingly, such a device is activated, i.e., switched from an OFF state (where no power is supplied to the heater such that it is at ambient temperature) to an ON state (where power is supplied to the heater such that it heats to above ambient temperature) upon detection of a puff. This accidental activation (e.g., in the pocket of a user) is avoided.

Optional features will now be set out. These are applicable singly or in any combination with any aspect.

Optionally, the device may further comprise a controller, wherein the controller triggers a vibration generator to provide haptic feedback indicating to the user about the activation of the heater in response to detection of puff.

The device may comprise a puff sensor for detecting a user taking a puff on the aerosol-forming article (e.g., a heated tobacco (HT)/Heat-not-burn (HNB) consumable). The device, e.g., the puff sensor, may be configured to generate a puff signal when the user takes a puff on the article/consumable.

Optionally, the device may be the device is a Heated Tobacco device configured to receive a consumable comprising tobacco.

The puff sensor (e.g., airflow sensor) may be configured to detect a user drawing on an end (i.e., a terminal (mouth) end) of the aerosol-forming article/consumable. The puff sensor may, for example, be a pressure sensor or a microphone. The puff sensor may be configured to produce a puff signal indicative of a puff state. The puff signal may be indicative of the user drawing (an aerosol from the aerosol-forming article/consumable) such that it is, e.g., in the form of a binary signal. Alternatively or additionally, the puff signal may be indicative of a characteristic of the draw (e.g., a flow rate of the draw, length of time of the draw, etc.).

The device may comprise a controller or may be connectable to a controller for receiving a signal (e.g., the puff signal from the puff sensor) when the user takes a puff on the article/consumable. The controller may be configured such that, upon receipt of the (puff) signal, an output signal is generated to activate the supply of power to the heater.

The controller may comprise a microcontroller that may, e.g., be mounted on a printed circuit board (PCB). The controller may also comprise a memory, e.g., non-volatile memory. The memory may include instructions, which, when implemented, may cause the controller to perform certain tasks or steps of a method.

The controller may be configured to control the voltage applied by power source to the heater. The device may further comprise a voltage regulator to regulate the output voltage supplied by the power source to form a regulated voltage. The regulated voltage may subsequently be applied to the heater. Prior to the activation of the power supply, there is no voltage applied to the heater such that it is at ambient temperature. Activation switches it to an ON state where the heater is heated to above ambient temperature.

Optionally, the device is further configured to detect at least one operative command from the user when power is not being supplied to the heater, i.e., when the device is in an OFF state where the heater is at ambient temperature.

Advantageously, the device further comprises a user interface (UI) for receiving at least one operative command from the user. The UI may be operatively coupled to the controller. In some embodiments the UI may include input means which may comprise a power button/switch/dial and the operative command may be generated by manual manipulation of the input means, e.g., depression of the power button.

In preferred embodiments, the device is configured to activate the supply of power to the heater upon simultaneous detection of the user taking a puff on the aerosol-forming article/consumable and the at least one operative command from the user.

For example, the controller may be configured to generate an output signal to activate the supply of power to the heater upon detection of the combination of the puff signal and the operative command, e.g., upon manual manipulation of the input means (such as depression of the button).

In some embodiments the device (e.g., the UI) may additionally or alternatively comprise output means to convey information to the user. In some embodiments the output means may comprise a visual feedback element, e.g., a light to indicate a condition of the device (and/or the aerosol-forming article/consumable) to the user. The condition of the device (and/or aerosol-forming article/consumable) indicated to the user may comprise a condition indicative of the operation of the heater. For example, the condition may comprise whether the heater is in the ON state or the OFF state. For example, the output means may comprise one or more (e.g., two, three, four, etc.) light-emitting diodes ("LEDs") that may be located on the body of the device.

Additionally or alternatively, the output means comprises a haptic feedback element and/or an audio feedback element to provide at least one feedback to the user to indicate active "ON" state of the device when the supply of power to the heater is activated.

The controller may be configured to send an output signal to the output means, e.g., the visual, haptic, or audio feedback elements. The device, e.g., the UI may be configured to convey information to a user, via the output means, in response to such output signals (received from the controller). For example, where the visual feedback element comprises one or more LEDs, the LEDs may be operatively connected to the controller. Hence, the controller may be configured to control the illumination of the LEDs (e.g., in response to an output signal). For example, the controller may be configured to control the illumination of the LEDs according to (e.g., an ON or OFF) state of the heater.

Advantageously, the controller is configured to verify the detected puff based on a predetermined test puff and activate the power supply to the heater in response to verification, wherein the predetermined test puff is a previously registered test puff of the user. The device may therefore be able to allow only an authorized activation of the device for receiving a consumable thereby avoiding accidental activation of the device by child user or when the device is inside the user's pocket or in transit.

The device comprises a heater for heating the article/consumable. The heater may comprise a heating element, which may be in the form of a rod, blade or tube that extends from the body of the device, e.g., within a cavity defined within the body of the device.

The heater (and thus the heating element) may be rigidly mounted to the body. The heating element may be elongate so as to define a longitudinal axis and may, for example, have a transverse cross-sectional profile (i.e., transverse to a longitudinal axis of the heating element) that is substantially circular (i.e., the heating element may be generally cylindrical "rod heater"). Alternatively, the heating element may have a transverse cross-sectional profile that is rectangular (i.e., the heater may be a "blade heater"). The heating element may alternatively be in the shape of a tube (i.e., the heater may be a "tube heater"). The heating element may take other forms (e.g., the heating element may have an elliptical transverse cross-sectional profile). The shape and/or size (e.g., diameter) of the transverse cross-sectional profile of the heating element may be generally consistent for the entire length (or substantially the entire length) of the heating element.

The heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 µm and 220 µm, e.g., between 170 µm and 190 µm, e.g., around 180 µm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 µm.

The heating element may be located in the cavity (of the device), and may extend (e.g., along a longitudinal axis) from an internal base of the cavity towards an opening of the cavity. The length of the heating element (i.e., along the longitudinal axis) may be less than the depth of the cavity. Hence, the heating element may extend for only a portion of the length of the cavity. That is, the heating element may not extend through (or beyond) the opening of the cavity.

The heating element may be configured for insertion into the aerosol-forming article/consumable when it is received in the cavity. In that respect, a distal end (i.e., distal from a base of the heating element where it is mounted to the device) of the heating element may comprise a tapered portion, which may facilitate insertion of the heating element into the aerosol-forming article/consumable. The heating element may fully penetrate the article/consumable when it is received in the cavity. That is, the entire length, or substantially the entire length, of the heating element may be received in the article/consumable.

The heating element may have a length that is less than, or substantially the same as, an axial length of an aerosol-forming substrate forming part of the article/consumable. Thus, when such the article/consumable is engaged with the device, the heating element may only penetrate the aerosol-forming substrate, rather than other components of the article/consumable. The heating element may penetrate the aerosol-forming substrate for substantially the entire axial length of the aerosol forming-substrate of the article/consumable. Thus, heat may be transferred from (e.g., an outer circumferential surface of) the heating element to the surrounding aerosol-forming substrate, when penetrated by the heating element. That is, heat may be transferred radially outwardly (in the case of a cylindrical heating element) or, e.g., radially inwardly (in the case of a tube heater).

Where the heater is a tube heater, the heating element of the tube heater may surround at least a portion of the cavity. When the portion of the article/consumable is received in the cavity, the heating element may surround a portion of the article/consumable (i.e., so as to heat that portion of the aerosol-forming article/consumable). In particular, the heating element may surround the aerosol-forming substrate of the article/consumable. That is, when the article/consumable is engaged with the device, the aerosol-forming substrate of the article/consumable may be located adjacent an inner surface of the (tubular) heating element. When the heating element is activated, heat may be transferred radially inwardly from the inner surface of the heating element to heat the aerosol-forming substrate.

The cavity may comprise a (e.g., circumferential) wall (or walls) and the (tubular) heating element may extend around at least a portion of the wall(s). In this way, the wall may be located between the inner surface of the heating element and an outer surface of the article/consumable. The wall (or walls) of the cavity may be formed from a thermally conductive material (e.g., a metal) to allow heat conduction from the heating element to the article/consumable. Thus, heat may be conducted from the heating element, through the cavity wall (or walls), to the aerosol-forming substrate of the article/consumable received in the cavity.

In some embodiments the device may comprise a cap disposed at an end of the body that is configured for engagement with the article/consumable. Where the device comprises a heater having a heating element, the cap may at least partially enclose the heating element. The cap may be moveable between an open position in which access is provided to the heating element, and a closed position in which the cap at least partially encloses the heating element. The cap may be slidably engaged with the body of the device and may be slidable between the open and closed positions.

The cap may define at least a portion of the cavity of the device. That is, the cavity may be fully defined by the cap, or each of the cap and body may define a portion of the cavity. The cap may comprise an opening to the cavity. The opening may be configured for receipt of at least a portion of an aerosol-forming article. That is, the aerosol-forming article/consumable may be inserted through the opening and into the cavity (so as to be engaged with the device).

The cap may be configured such that when the aerosol-forming article/consumable is engaged with the device (e.g., received in the cavity), only a portion of the article/consumable is received in the cavity. That is, a portion of the aerosol-forming article/consumable (not received in the cavity) may protrude from (i.e., extend beyond) the opening. This (protruding) portion of the article/consumable may be a terminal (e.g., mouth) end of the aerosol-forming article/consumable, which may be received in a user's mouth for the purpose of inhaling aerosol formed by the device.

The device may comprise a power source or may be connectable to a power source (e.g., a power source separate to the device). The power source may be electrically connectable to the heater. In that respect, altering (e.g., toggling) the electrical connection of the power source to the heater may affect a state of the heater. For example, toggling the electrical connection of the power source to the heater may toggle the heater between an ON state and an OFF state. The power source may be a power store. For example, the power source may be a battery or rechargeable battery (e.g., a lithium-ion battery).

The device may comprise an input connection (e.g., a USB port, Micro USB port, USB-C port, etc.). The input connection may be configured for connection to an external source of electrical power, such as a mains electrical supply outlet. The input connection may, in some cases, be used as a substitute for an internal power source (e.g., battery or rechargeable battery). That is, the input connection may be electrically connectable to the heater (for providing power to the heater). Hence, in some forms, the input connection may form at least part of the power source of the device.

Where the power source comprises a rechargeable power source (such as a rechargeable battery), the input connection may be used to charge and recharge the power source.

The device may comprise a wireless interface configured to communicate wirelessly (e.g., via Bluetooth (e.g., a Bluetooth low-energy connection) or Wi-Fi) with an external device. Similarly, the input connection may be configured for wired connection to an external device so as to provide communication between the device and the external device.

The external device may be a mobile device. For example, the external device may be a smart phone, tablet, smart watch, or smart car. An application (e.g., app) may be installed on the external device (e.g., mobile device). The application may facilitate communication between the device and the external device via the wired or wireless connection.

The wireless or wired interface may be configured to transfer signals between the external device and the controller of the device. In this respect, the controller may control an aspect of the device in response to a signal received from an external device. Alternatively or additionally, an external device may respond to a signal received from the device (e.g., from the controller of the device).

In a second aspect of the seventh mode, there is provided a system (e.g., a smoking substitute system) comprising a device according to the first aspect and an aerosol-forming article. The aerosol-forming article may comprise an aerosol-forming substrate at an upstream end of the aerosol-forming article. The article may be in the form of a smoking substitute article, e.g., heated tobacco (HT) consumable (also known as a heat-not-burn (HNB) consumable).

As used herein, the terms "upstream" and "downstream" are intended to refer to the flow direction of the vapor/aerosol, i.e., with the downstream end of the article/consumable being the mouth end or outlet where the aerosol exits the consumable for inhalation by the user. The upstream end of the article/consumable is the opposing end to the downstream end.

The aerosol-forming substrate is capable of being heated to release at least one volatile compound that can form an aerosol. The aerosol-forming substrate may be located at the upstream end of the article/consumable.

In order to generate an aerosol, the aerosol-forming substrate comprises at least one volatile compound that is intended to be vaporized/aerosolized and that may provide the user with a recreational and/or medicinal effect when inhaled. Suitable chemical and/or physiologically active volatile compounds include the group consisting of nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius*, *Arctostaphylos uva-ursi* (Bearberry), *Argemone mexicana*, *Arnica*, *Artemisia vulgaris*, Yellow Tees, *Galea zacatechichi*, *Canavalia maritima* (Baybean), *Cecropia mexicana* (Guamura), *Cestrum noctumum*, *Cynoglossum virginianum* (wild comfrey), *Cytisus scoparius*, Damiana, *Entada rheedii*, *Eschscholzia californica* (California Poppy), *Fittonia albivenis*, *Hippobroma longiflora*, *Humulus japonica* (Japanese Hops), *Humulus lupulus* (Hops), *Lactuca virosa* (Lettuce Opium), *Laggera alata*, *Leonotis leonurus*, *Leonurus cardiaca* (Motherwort), *Leonurus sibiricus* (Honeyweed), *Lobelia cardinalis*, *Lobelia inflata* (Indian-tobacco), *Lobelia siphilitica*, *Nepeta cataria* (Catnip), *Nicotiana* species (Tobacco), *Nymphaea alba* (White Lily), *Nymphaea caerulea* (Blue Lily), Opium poppy, *Passiflora incamata* (Passionflower), *Pedicularis densiflora* (Indian Warrior), *Pedicularis groenlandica* (Elephant's Head), *Salvia divinorum*, *Salvia dorrii* (Tobacco Sage), *Salvia* species (Sage), *Scutellaria galericulata*, *Scutellaria lateriflora*, *Scutellaria nana*, *Scutellaria species* (Skullcap), *Sida acuta* (Wireweed), *Sida rhombifolia*, *Silene capensis*, *Syzygium aromaticum* (Clove), *Tagetes lucida* (Mexican Tarragon), *Tarchonanthus camphoratus*, *Tumera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above-mentioned tobaccos.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, and aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the article/consumable may comprise an aerosol-cooling element which is adapted to cool the aerosol generated from the aerosol-forming substrate (by heat exchange) before being inhaled by the user.

The article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

According to a fourth aspect of the seventh mode, there is provided a method of operating a smoking substitute device according to the first aspect, the method comprising detecting a user taking puff on the article when power is not being supplied to the heater of the device and, in response to the detection of the puff, activating a power supply to the heater.

In preferred embodiments, the method comprises inserting the aerosol-forming article/consumable into the device prior to detecting the user taking a puff. The method also comprises heating the article/consumable after activating the power supply to the heater.

In some embodiments the method may comprise inserting the article/consumable into a cavity within a body of the device and penetrating the article with the heating element of the device upon insertion of the article/consumable.

The method may comprise detecting a user taking a puff on the aerosol-forming article (e.g., a heated tobacco (HT)/Heat-not-burn (HNB) consumable) using a puff sensor (e.g., airflow sensor). The method may comprise generating a puff signal when the user takes a puff on the article/consumable. The puff signal may be indicative of the user drawing (an aerosol from the aerosol-forming article/consumable) such that it is, e.g., in the form of a binary signal. Alternatively or additionally, the puff signal may be indicative of a characteristic of the draw (e.g., a flow rate of the draw, length of time of the draw, etc.).

The method may comprise receiving a signal (e.g., the puff signal from the puff sensor) at a controller (which may be as described above for the first aspect) when the user takes a puff on the article/consumable. The method may comprise, upon receipt of the (puff) signal, generating an output signal (e.g., from the controller) to activate the supply of power to the heater.

The method may further comprise detecting at least one operative command from the user. The method may comprise detecting an operative command comprising switching the device between from an OFF state to an ON state (e.g., by depressing a button, activating a switch, or turning a dial on the UI).

In preferred embodiments, the method comprises activating the supply of power to the heater upon simultaneous detection of the user taking a puff on the aerosol-forming article/consumable and the operative command from the user.

For example, the method may comprise generating an output signal (e.g., from the controller) to activate the supply of power to the heater upon detection of the combination of the puff signal and the operative command, e.g., upon switching to the ON state.

In some embodiments the method may comprise conveying information to the user to indicate a condition of the device (and/or the aerosol-forming article/consumable).

In some embodiments, the method comprises verifying the detected puff based on a predetermined test puff and activating the power supply to the heater in response to verification, wherein the predetermined test puff is a previously registered test puff of the user.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Eighth Mode: Operating a Smoking Substitute System to Convey a Current State of a Consumable Cycle.

At its most general, the eighth mode relates to operating a smoking substitute system to convey a current state of a consumable cycle.

According to a first aspect of the eighth mode, there is provided a smoking substitute device comprising: a user input means; and one or more lights for providing user feedback; a controller configured to control the one or more lights; wherein the controller is configured to: receive a user input to the device via the user input means; and in response to the user input, display a current progress of a consumable cycle via the one or more of lights of the device.

Optional features will now be set out. These are applicable singly or in any combination with any aspect.

Optionally, the current progress is indicated to be one of a beginning state, at least one middle state, and a concluding state of the consumable smoking cycle.

Optionally, the one or more lights including at least 3 lights.

Optionally, the controller is configured to display the current progress by illuminating a state number of the one or more lights, wherein the state number is proportional to an amount of consumable cycle remaining.

Optionally, the controller is configured to display the current state by illuminating a state number of the one or more lights, wherein the state number is proportional to an amount of consumable cycle used.

Optionally, the device is configured successively illuminate the state number of lights.

Optionally, the user input is a button press on a button of the device.

Optionally, the display of the current progress of the consumable cycle is maintained for a predetermined time period.

Optionally, the predetermined time period is between 0.5 and 10 seconds.

Optionally, the controller is configured to display a battery status of the device via the one or more lights.

Optionally, the controller is configured to display a battery status in response to receiving the user input to the user input means when the consumable cycle is not in progress.

Optionally, the device is a heated tobacco device.

Optionally, the controller is configured to display the battery status in response to receiving the user input to the user input means when the consumable cycle is not in progress.

According to a second aspect of the eighth mode, a smoking substitute device for engagement with a consumable, the device including: a user input means; and a haptic feedback means for providing haptic user feedback; a controller configured to control the haptic feedback means; wherein the controller is configured to, during a consumable cycle of the consumable, determine when a predetermined portion of the consumable remains to be consumed; and when the predetermined portion of the consumable remains, provide a haptic feedback output from the haptic feedback means.

Optionally, the device further includes a visual feedback means, and wherein the controller is further configured to, when the predetermined portion of the consumable remains, provide a visual feedback output from the visual feedback means.

Optionally, the visual feedback means includes one or more lights.

The device may comprise an elongate body. An end of the elongate body may be configured for engagement with an aerosol-forming article (e.g., a heated tobacco (HT) consumable. The device may comprise a cavity that is configured for receipt of at least a portion of the consumable (i.e., for engagement with the consumable). The aerosol-forming article may be of the type that comprises an aerosol former (e.g., carried by an aerosol-forming substrate).

The device may comprise a heater for heating the aerosol-forming article. The heater may comprise a heating element, which may be in the form of a rod that extends from the body of the device. The heating element may extend from the end of the body that is configured for engagement with the aerosol-forming article.

The heater (and thus the heating element) may be rigidly mounted to the body. The heating element may be elongate so as to define a longitudinal axis and may, for example, have a transverse profile (i.e., transverse to a longitudinal axis of the heating element) that is substantially circular (i.e., the heating element may be generally cylindrical). Alternatively, the heating element may have a transverse profile that is rectangular (i.e., the heater may be a "blade heater"). The heating element may alternatively be in the shape of a tube (i.e., the heater may be a "tube heater"). The heating element may take other forms (e.g., the heating element may have an elliptical transverse profile). The shape and/or size (e.g., diameter) of the transverse profile of the heating element may be generally consistent for the entire length (or substantially the entire length) of the heating element.

The heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 μm and 220 μm, e.g., between 170 μm and 190 μm, e.g., around 180 μm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 μm.

The heating element may be located in the cavity (of the device), and may extend (e.g., along a longitudinal axis) from an internal base of the cavity towards an opening of the cavity. The length of the heating element (i.e., along the longitudinal axis of the heater) may be less than the depth of the cavity. Hence, the heating element may extend for only a portion of the length of the cavity. That is, the heating element may not extend through (or beyond) the opening of the cavity.

The heating element may be configured for insertion into an aerosol-forming article (e.g., a HT consumable) when an aerosol-forming article is received in the cavity. In that respect, a distal end (i.e., distal from a base of the heating element where it is mounted to the device) of the heating element may comprise a tapered portion, which may facilitate insertion of the heating element into the aerosol-forming article. The heating element may fully penetrate an aerosol-forming article when the aerosol-forming article is received in the cavity. That is, the entire length, or substantially the entire length, of the heating element may be received in the aerosol-forming article.

The heating element may have a length that is less than, or substantially the same as, an axial length of an aerosol-forming substrate forming part of an aerosol-forming article (e.g., a HT consumable). Thus, when such an aerosol-forming article is engaged with the device, the heating element may only penetrate the aerosol-forming substrate, rather than other components of the aerosol-forming article. The heating element may penetrate the aerosol-forming substrate for substantially the entire axial length of the aerosol forming-substrate of the aerosol-forming article. Thus, heat may be transferred from (e.g., an outer circumferential surface of) the heating element to the surrounding aerosol-forming substrate, when penetrated by the heating element. That is, heat may be transferred radially outwardly (in the case of a cylindrical heating element) or, e.g., radially inwardly (in the case of a tube heater).

Where the heater is a tube heater, the heating element of the tube heater may surround at least a portion of the cavity. When the portion of the aerosol-forming article is received in the cavity, the heating element may surround a portion of the aerosol-forming article (i.e., so as to heat that portion of the aerosol-forming article). In particular, the heating element may surround an aerosol forming substrate of the aerosol-forming article. That is, when an aerosol-forming article is engaged with the device, the aerosol forming substrate of the aerosol-forming article may be located adjacent an inner surface of the (tubular) heating element. When the heating element is activated, heat may be transferred radially inwardly from the inner surface of the heating element to heat the aerosol forming substrate.

The cavity may comprise a (e.g., circumferential) wall (or walls) and the (tubular) heating element may extend around at least a portion of the wall(s). In this way, the wall may be located between the inner surface of the heating element and an outer surface of the aerosol-forming article. The wall (or walls) of the cavity may be formed from a thermally conductive material (e.g., a metal) to allow heat conduction from the heating element to the aerosol-forming article. Thus, heat may be conducted from the heating element, through the cavity wall (or walls), to the aerosol-forming substrate of an aerosol-forming article received in the cavity.

In some embodiments the device may comprise a cap disposed at the end of the body that is configured for engagement with an aerosol-forming article. Where the device comprises a heater having a heating element, the cap may at least partially enclose the heating element. The cap may be moveable between an open position in which access is provided to the heating element, and a closed position in which the cap at least partially encloses the heating element. The cap may be slidably engaged with the body of the device and may be slidable between the open and closed positions.

The cap may define at least a portion of the cavity of the device. That is, the cavity may be fully defined by the cap, or each of the cap and body may define a portion of the cavity. The cap may comprise an opening to the cavity. The opening may be configured for receipt of at least a portion of an aerosol-forming article. That is, an aerosol-forming article may be inserted through the opening and into the cavity (so as to be engaged with the device).

The cap may be configured such that when an aerosol-forming article is engaged with the device (e.g., received in the cavity), only a portion of the aerosol-forming article is received in the cavity. That is, a portion of the aerosol-forming article (not received in the cavity) may protrude from (i.e., extend beyond) the opening. This (protruding) portion of the aerosol-forming article may be a terminal (e.g., mouth) end of the aerosol-forming article, which may be received in a user's mouth for the purpose of inhaling aerosol formed by the device.

The device may comprise a power source or may be connectable to a power source (e.g., a power source separate to the device). The power source may be electrically connectable to the heater. In that respect, altering (e.g., toggling) the electrical connection of the power source to the heater may affect a state of the heater. For example, toggling the electrical connection of the power source to the heater may toggle the heater between an on state and an off state. The power source may be a power store. For example, the power source may be a battery or rechargeable battery (e.g., a lithium-ion battery).

The device may comprise an input connection (e.g., a USB port, Micro USB port, USB-C port, etc.). The input connection may be configured for connection to an external source of electrical power, such as a mains electrical supply outlet. The input connection may, in some cases, be used as a substitute for an internal power source (e.g., battery or rechargeable battery). That is, the input connection may be electrically connectable to the heater (for providing power to the heater). Hence, in some forms, the input connection may form at least part of the power source of the device.

Where the power source comprises a rechargeable power source (such as a rechargeable battery), the input connection may be used to charge and recharge the power source.

The device may comprise a user interface (UI). In some embodiments the UI may include input means to receive operative commands from the user. The input means of the UI may allow the user to control at least one aspect of the operation of the device. In some embodiments the input means may comprise a power button to switch the device between an on state and an off state.

In some embodiments the UI may additionally or alternatively comprise output means to convey information to the user. In some embodiments the output means may comprise a light to indicate a condition of the device (and/or the aerosol-forming article) to the user. The condition of the device (and/or aerosol-forming article) indicated to the user may comprise a condition indicative of the operation of the heater. For example, the condition may comprise whether the heater is in an off state or an on state. In some embodiments, the UI unit may comprise at least one of a button, a display, a touchscreen, a switch, a light, and the like. For example, the output means may comprise one or more (e.g., two, three, four, etc.) light-emitting diodes ("LEDs") that may be located on the body of the device.

The device may further comprise a puff sensor (e.g., airflow sensor), which form part of the input means of the UI. The puff sensor may be configured to detect a user drawing on an end (i.e., a terminal (mouth) end) of the aerosol-forming article. The puff sensor may, for example, be a pressure sensor or a microphone. The puff sensor may be configured to produce a signal indicative of a puff state. The signal may be indicative of the user drawing (an aerosol from the aerosol-forming article) such that it is, e.g., in the form of a binary signal. Alternatively or additionally, the signal may be indicative of a characteristic of the draw (e.g., a flow rate of the draw, length of time of the draw, etc.).

The device may comprise a controller or may be connectable to a controller that may be configured to control at least one function of the device. The controller may comprise a microcontroller that may, e.g., be mounted on a printed circuit board (PCB). The controller may also comprise a memory, e.g., non-volatile memory. The memory may include instructions, which, when implemented, may cause the controller to perform certain tasks or steps of a method. Where the device comprises an input connection, the controller may be connected to the input connection.

The controller may be configured to control the operation of the heater (and, e.g., the heating element). Thus, the controller may be configured to control vaporization of an aerosol forming part of an aerosol-forming article engaged with the device. The controller may be configured to control the voltage applied by power source to the heater. For example, the controller may be configured to toggle between applying a full output voltage (of the power source) to the heater and applying no voltage to the heater. Alternatively or additionally, the control unit may implement a more complex heater control protocol.

The device may further comprise a voltage regulator to regulate the output voltage supplied by the power source to form a regulated voltage. The regulated voltage may subsequently be applied to the heater.

In some embodiments, where the device comprises a UI, the controller may be operatively connected to one or more components of the UI. The controller may be configured to receive command signals from an input means of the UI. The controller may be configured to control the heater in response to the command signals. For example, the controller may be configured to receive "on" and "off" command signals from the UI and, in response, may control the heater so as to be in a corresponding on or off state.

The controller may be configured to send output signals to a component of the UI. The UI may be configured to convey information to a user, via an output means, in response to such output signals (received from the controller). For example, where the device comprises one or more LEDs, the LEDs may be operatively connected to the controller. Hence, the controller may be configured to control the illumination of the LEDs (e.g., in response to an output signal). For example, the controller may be configured to control the illumination of the LEDs according to (e.g., an on or off) state of the heater.

Where the device comprises a sensor (e.g., a puff/airflow sensor), the controller may be operatively connected to the sensor. The controller may be configured to receive a signal from the sensor (e.g., indicative of a condition of the device and/or engaged aerosol-forming article). The controller may be configured to control the heater, or an aspect of the output means, based on the signal from the sensor.

The device may comprise a wireless interface configured to communicate wirelessly (e.g., via Bluetooth (e.g., a Bluetooth low-energy connection) or Wi-Fi) with an external device. Similarly, the input connection may be configured for wired connection to an external device so as to provide communication between the device and the external device.

The external device may be a mobile device. For example, the external device may be a smart phone, tablet, smart watch, or smart car. An application (e.g., app) may be installed on the external device (e.g., mobile device). The application may facilitate communication between the device and the external device via the wired or wireless connection.

The wireless or wired interface may be configured to transfer signals between the external device and the controller of the device. In this respect, the controller may control an aspect of the device in response to a signal received from an external device. Alternatively or additionally, an external device may respond to a signal received from the device (e.g., from the controller of the device).

In a third aspect of the eighth mode, there is provided a system (e.g., a smoking substitute system) comprising a device according to the first or second aspect and an aerosol-forming article. The aerosol-forming article may comprise an aerosol-forming substrate at an upstream end of the aerosol-forming article. The article may be in the form of a smoking substitute article, e.g., heated tobacco (HT) consumable (also known as a heat-not-burn (HNB) consumable).

As used herein, the terms "upstream" and "downstream" are intended to refer to the flow direction of the vapor/aerosol, i.e., with the downstream end of the article/consumable being the mouth end or outlet where the aerosol exits the consumable for inhalation by the user. The upstream end of the article/consumable is the opposing end to the downstream end.

The aerosol-forming substrate is capable of being heated to release at least one volatile compound that can form an aerosol. The aerosol-forming substrate may be located at the upstream end of the article/consumable.

In order to generate an aerosol, the aerosol-forming substrate comprises at least one volatile compound that is intended to be vaporized/aerosolized and that may provide the user with a recreational and/or medicinal effect when inhaled. Suitable chemical and/or physiologically active volatile compounds include the group consisting of nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius, Arctostaphylos uva-ursi* (Bearberry), *Argemone mexicana, Arnica, Artemisia vulgaris,* Yellow Tees, *Galea zacatechichi, Canavalia maritima* (Baybean), *Cecropia mexicana* (Guamura), *Cestrum noctumum, Cynoglossum virginianum* (wild comfrey), *Cytisus scoparius,* Damiana, *Entada rheedii, Eschscholzia californica* (California Poppy), *Fittonia albivenis, Hippobroma longiflora, Humulus japonica* (Japanese Hops), *Humulus lupulus* (Hops), *Lactuca virosa* (Lettuce Opium), *Laggera alata, Leonotis leonurus, Leonurus cardiaca* (Motherwort), *Leonurus sibiricus* (Honeyweed), *Lobelia cardinalis, Lobelia inflata* (Indian-tobacco), *Lobelia siphilitica, Nepeta cataria* (Catnip), *Nicotiana* species (Tobacco), *Nymphaea alba* (White Lily), *Nymphaea caerulea* (Blue Lily), Opium poppy, *Passiflora incamata* (Passionflower), *Pedicularis densiflora* (Indian Warrior), *Pedicularis groenlandica* (Elephant's Head), *Salvia divinorum, Salvia dorrii* (Tobacco Sage), *Salvia* species (Sage), *Scutellaria galericulata, Scutellaria lateriflora, Scutellaria nana, Scutellaria species* (Skullcap), *Sida acuta* (Wireweed), *Sida rhombifolia, Silene capensis, Syzygium aromaticum* (Clove), *Tagetes lucida* (Mexican Tarragon), *Tarchonanthus camphoratus, Tumera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above-mentioned tobaccos.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, and aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the article/consumable may comprise an aerosol-cooling element which is adapted to cool the aerosol generated from the aerosol-forming substrate (by heat exchange) before being inhaled by the user.

The article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

According to a fourth aspect of the eighth mode, there is provided a method of using the system according to the third aspect, the method comprising inserting the aerosol-forming article into the device; and heating the article using the heater of the device.

In some embodiments the method may comprise inserting the article into a cavity within a body of the device and penetrating the article with the heating element of the device upon insertion of the article.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Ninth Mode: A Heated Tobacco Device that Uses a Motion Sensor.

At its most general, the ninth mode relates to a heated tobacco device that uses a motion sensor.

According to a first aspect of the ninth mode, there is provided a heated tobacco device, comprising: a motion sensor for detecting an input movement of the device; a controller operatively connected to the motion sensor; wherein, the controller is configured to enter the device into an active state from a standby or off state upon detection of the input movement.

By providing a device according to the first aspect user input to the device may be simplified.

Optional features will now be set out. These are applicable singly or in any combination with any aspect.

Optionally, the controller is configured to compare the input movement to a predetermined wake-up movement, and to enter the device into the active state if the input movement corresponds to the wake-up movement.

Optionally, the wake-up movement equates to upward lift of the device from a static position.

Optionally, entering the device into the active state includes activating a heater of the device.

Optionally, the controller is configured to detect a mode change movement of the device, and to change mode of operation in response to the mode change movement.

Optionally, the changing of the mode of operating is between a first operational mode in which a heater of the device is heated to a first temperature and a second mode operational mode with in which the device is heated to a second, different, temperature.

Optionally, the controller is configured to detect a battery status movement of the device, and to display a battery status to the user in response to the battery status movement.

Optionally, the controller is configured to detect a consumable cycle status movement of the device, and to display a consumable cycle status to the user in response to the consumable cycle status movement.

Conveniently, the device further comprising a controller configured to perform predetermined functions upon detecting the movement of the device.

Optionally, the controller is configured to set different functions for different movement patterns as defined by user.

Optionally, the device further comprising a memory for storing different movement patterns and corresponding function as defined by user.

According to a second aspect of the ninth mode, there is provided a heated tobacco device, comprising: a motion sensor for detecting an input movement of the device; a controller operatively connected to the motion sensor; wherein, the controller is configured to enter the device in to a standby or off state from an active state after a static period has elapsed since a last input movement was detected by the motion sensor.

Optionally, the controller is configured to start a timer when the input movement of the device is detected.

Optionally, the controller is configured to restart the timer when a subsequent movement of the device is detected.

Optionally, the controller is configured to enter the device into the standby or off mode when a time value of the timer is equal to the static period.

Optionally, entering the device into a standby or off state includes reducing a power level supplied to a heater of the device.

Optionally, reducing a power level supplied to the heater includes reducing the power supplied to the heater to zero.

The device may comprise an elongate body. An end of the elongate body may be configured for engagement with an aerosol-forming article. For example, the body may be configured for engagement with a heated tobacco (HT) consumable (or heat-not-burn (HNB) consumable). The terms "heated tobacco" and "heat-not-burn" are used interchangeably herein to describe a consumable that is of the type that is heated rather than combusted (or are used interchangeably to describe a device for use with such a consumable). The device may comprise a cavity that is configured for receipt of at least a portion of the consumable (i.e., for engagement with the consumable). The aerosol-forming article may be of the type that comprises an aerosol former (e.g., carried by an aerosol-forming substrate).

The device may comprise a heater for heating the aerosol-forming article. The heater may comprise a heating element, which may be in the form of a rod that extends from the body of the device. The heating element may extend from the end of the body that is configured for engagement with the aerosol-forming article.

The heater (and thus the heating element) may be rigidly mounted to the body. The heating element may be elongate so as to define a longitudinal axis and may, for example, have a transverse profile (i.e., transverse to a longitudinal axis of the heating element) that is substantially circular (i.e., the heating element may be generally cylindrical). Alternatively, the heating element may have a transverse profile that is rectangular (i.e., the heater may be a "blade heater"). The heating element may alternatively be in the shape of a tube (i.e., the heater may be a "tube heater"). The heating element may take other forms (e.g., the heating element may have an elliptical transverse profile). The shape and/or size (e.g., diameter) of the transverse profile of the heating element may be generally consistent for the entire length (or substantially the entire length) of the heating element.

The heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 µm and 220 µm, e.g., between 170 µm and 190 µm, e.g., around 180 µm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 µm.

The heating element may be located in the cavity (of the device), and may extend (e.g., along a longitudinal axis) from an internal base of the cavity towards an opening of the cavity. The length of the heating element (i.e., along the longitudinal axis of the heater) may be less than the depth of the cavity.

Hence, the heating element may extend for only a portion of the length of the cavity. That is, the heating element may not extend through (or beyond) the opening of the cavity.

The heating element may be configured for insertion into an aerosol-forming article (e.g., a HT consumable) when an aerosol-forming article is received in the cavity. In that respect, a distal end (i.e., distal from a base of the heating element where it is mounted to the device) of the heating element may comprise a tapered portion, which may facilitate insertion of the heating element into the aerosol-forming article. The heating element may fully penetrate an aerosol-forming article when the aerosol-forming article is received in the cavity. That is, the entire length, or substantially the entire length, of the heating element may be received in the aerosol-forming article.

The heating element may have a length that is less than, or substantially the same as, an axial length of an aerosol-forming substrate forming part of an aerosol-forming article (e.g., a HT consumable). Thus, when such an aerosol-forming article is engaged with the device, the heating element may only penetrate the aerosol-forming substrate, rather than other components of the aerosol-forming article. The heating element may penetrate the aerosol-forming substrate for substantially the entire axial length of the aerosol forming-substrate of the aerosol-forming article. Thus, heat may be transferred from (e.g., an outer circumferential surface of) the heating element to the surrounding aerosol-forming substrate, when penetrated by the heating element. That is, heat may be transferred radially outwardly (in the case of a cylindrical heating element) or, e.g., radially inwardly (in the case of a tube heater).

Where the heater is a tube heater, the heating element of the tube heater may surround at least a portion of the cavity. When the portion of the aerosol-forming article is received in the cavity, the heating element may surround a portion of the aerosol-forming article (i.e., so as to heat that portion of the aerosol-forming article). In particular, the heating element may surround an aerosol forming substrate of the aerosol-forming article. That is, when an aerosol-forming article is engaged with the device, the aerosol forming substrate of the aerosol-forming article may be located adjacent an inner surface of the (tubular) heating element. When the heating element is activated, heat may be transferred radially inwardly from the inner surface of the heating element to heat the aerosol forming substrate.

The cavity may comprise a (e.g., circumferential) wall (or walls) and the (tubular) heating element may extend around at least a portion of the wall(s). In this way, the wall may be located between the inner surface of the heating element and an outer surface of the aerosol-forming article. The wall (or walls) of the cavity may be formed from a thermally conductive material (e.g., a metal) to allow heat conduction from the heating element to the aerosol-forming article. Thus, heat may be conducted from the heating element, through the cavity wall (or walls), to the aerosol-forming substrate of an aerosol-forming article received in the cavity.

In some embodiments the device may comprise a cap disposed at the end of the body that is configured for engagement with an aerosol-forming article. Where the device comprises a heater having a heating element, the cap may at least partially enclose the heating element. The cap may be moveable between an open position in which access is provided to the heating element, and a closed position in which the cap at least partially encloses the heating element. The cap may be slidably engaged with the body of the device and may be slidable between the open and closed positions.

The cap may define at least a portion of the cavity of the device. That is, the cavity may be fully defined by the cap, or each of the cap and body may define a portion of the cavity. Where the cap fully defines the cavity, the cap may comprise an aperture for receipt of the heating element into the cavity (when the cap is in the closed position). The cap may comprise an opening to the cavity. The opening may be configured for receipt of at least a portion of an aerosol-forming article. That is, an aerosol-forming article may be inserted through the opening and into the cavity (so as to be engaged with the device).

The cap may be configured such that when an aerosol-forming article is engaged with the device (e.g., received in the cavity), only a portion of the aerosol-forming article is received in the cavity. That is, a portion of the aerosol-forming article (not received in the cavity) may protrude from (i.e., extend beyond) the opening. This (protruding) portion of the aerosol-forming article may be a terminal (e.g., mouth) end of the aerosol-forming article, which may be received in a user's mouth for the purpose of inhaling aerosol formed by the device.

The device may comprise a power source or may be connectable to a power source (e.g., a power source separate to the device). The power source may be electrically connectable to the heater. In that respect, altering (e.g., toggling) the electrical connection of the power source to the heater may affect a state of the heater. For example, toggling the electrical connection of the power source to the heater may toggle the heater between an on state and an off state. The power source may be a power store. For example, the power source may be a battery or rechargeable battery (e.g., a lithium-ion battery).

The device may comprise an input connection (e.g., a USB port, Micro USB port, USB-C port, etc.). The input connection may be configured for connection to an external source of electrical power, such as a mains electrical supply outlet. The input connection may, in some cases, be used as a substitute for an internal power source (e.g., battery or rechargeable battery). That is, the input connection may be electrically connectable to the heater (for providing power to the heater). Hence, in some forms, the input connection may form at least part of the power source of the device.

Where the power source comprises a rechargeable power source (such as a rechargeable battery), the input connection may be used to charge and recharge the power source.

The device may comprise a user interface (UI). In some embodiments the UI may include input means to receive operative commands from the user. The input means of the UI may allow the user to control at least one aspect of the operation of the device. In some embodiments the input means may comprise a power button to switch the device between an on state and an off state.

In some embodiments the UI may additionally or alternatively comprise output means to convey information to the user. In some embodiments the output means may comprise a light to indicate a condition of the device (and/or the aerosol-forming article) to the user. The condition of the device (and/or aerosol-forming article) indicated to the user may comprise a condition indicative of the operation of the heater. For example, the condition may comprise whether the heater is in an off state or an on state. In some embodiments, the UI unit may comprise at least one of a button, a display, a touchscreen, a switch, a light, and the like. For example, the output means may comprise one or more (e.g., two, three, four, etc.) light-emitting diodes ("LEDs") that may be located on the body of the device.

The device may further comprise a puff sensor (e.g., airflow sensor), which form part of the input means of the UI. The puff sensor may be configured to detect a user drawing on an end (i.e., a terminal (mouth) end) of the aerosol-forming article. The puff sensor may, for example, be a pressure sensor or a microphone. The puff sensor may be configured to produce a signal indicative of a puff state. The signal may be indicative of the user drawing (an aerosol from the aerosol-forming article) such that it is, e.g., in the form of a binary signal. Alternatively or additionally, the signal may be indicative of a characteristic of the draw (e.g., a flow rate of the draw, length of time of the draw, etc.).

The device may comprise a controller or may be connectable to a controller that may be configured to control at least one function of the device. The controller may comprise a microcontroller that may, e.g., be mounted on a printed circuit board (PCB). The controller may also comprise a memory, e.g., non-volatile memory. The memory may include instructions, which, when implemented, may cause the controller to perform certain tasks or steps of a method. Where the device comprises an input connection, the controller may be connected to the input connection.

The controller may be configured to control the operation of the heater (and, e.g., the heating element). Thus, the controller may be configured to control vaporization of an aerosol forming part of an aerosol-forming article engaged with the device. The controller may be configured to control the voltage applied by power source to the heater. For example, the controller may be configured to toggle between applying a full output voltage (of the power source) to the heater and applying no voltage to the heater. Alternatively or additionally, the control unit may implement a more complex heater control protocol.

The device may further comprise a voltage regulator to regulate the output voltage supplied by the power source to form a regulated voltage. The regulated voltage may subsequently be applied to the heater.

In some embodiments, where the device comprises a UI, the controller may be operatively connected to one or more components of the UI. The controller may be configured to receive command signals from an input means of the UI. The controller may be configured to control the heater in response to the command signals. For example, the controller may be configured to receive "on" and "off" command signals from the UI and, in response, may control the heater so as to be in a corresponding on or off state.

The controller may be configured to send output signals to a component of the UI. The UI may be configured to convey information to a user, via an output means, in response to such output signals (received from the controller). For example, where the device comprises one or more LEDs, the LEDs may be operatively connected to the controller. Hence, the controller may be configured to control the illumination of the LEDs (e.g., in response to an output signal). For example, the controller may be configured to control the illumination of the LEDs according to (e.g., an on or off) state of the heater.

Where the device comprises one or more sensors (e.g., a puff/airflow sensor), wherein one of the sensors is a motion sensor. The controller may be operatively connected to the sensors. The controller may be configured to receive a signal from the sensor (e.g., indicative of a condition of the device and/or engaged aerosol-forming article). The controller may be configured to control the heater, or an aspect of the output means, based on the signal from the sensor.

In some embodiments, the controller may be configured to activate the device based on detecting a movement by the sensor.

According to a second aspect of the ninth mode a heated tobacco device, comprising: a motion sensor for detecting a movement of the device; wherein, the device is configured to enter into a standby or OFF mode, or to deactivate the heater of the device if no movement is detected by the motion sensor for a pre-determined period of time.

In some embodiments, the controller may be configured to deactivate the device if no movement is detected for a predetermined period of time.

The controller may be configured to perform functions such as: switching on heater, changing mode of operation, display a battery status, display a consumable cycle status, or enter a child-safety or locked mode, upon detecting movement.

The device may comprise a wireless interface configured to communicate wirelessly (e.g., via Bluetooth (e.g., a Bluetooth low-energy connection) or Wi-Fi) with an external device. Similarly, the input connection may be configured for wired connection to an external device so as to provide communication between the device and the external device.

The external device may be a mobile device. For example, the external device may be a smart phone, tablet, smart watch, or smart car. An application (e.g., app) may be installed on the external device (e.g., mobile device). The application may facilitate communication between the device and the external device via the wired or wireless connection.

The wireless or wired interface may be configured to transfer signals between the external device and the controller of the device. In this respect, the controller may control an aspect of the device in response to a signal received from an external device. Alternatively or additionally, an external device may respond to a signal received from the device (e.g., from the controller of the device).

In a third aspect of the ninth mode, there is provided a system (e.g., a smoking substitute system) comprising a device according to the first and second aspects and an aerosol-forming article. The aerosol-forming article may comprise an aerosol-forming substrate at an upstream end of the aerosol-forming article. The article may be in the form of a smoking substitute article, e.g., heated tobacco (HT) consumable (also known as a heat-not-burn (HNB) consumable).

As used herein, the terms "upstream" and "downstream" are intended to refer to the flow direction of the vapor/aerosol, i.e., with the downstream end of the article/consumable being the mouth end or outlet where the aerosol exits the consumable for inhalation by the user. The upstream end of the article/consumable is the opposing end to the downstream end.

The aerosol-forming substrate is capable of being heated to release at least one volatile compound that can form an aerosol. The aerosol-forming substrate may be located at the upstream end of the article/consumable.

In order to generate an aerosol, the aerosol-forming substrate comprises at least one volatile compound that is intended to be vaporized/aerosolized and that may provide the user with a recreational and/or medicinal effect when inhaled. Suitable chemical and/or physiologically active volatile compounds include the group consisting of nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius, Arctostaphylos uva-ursi* (Bearberry), *Argemone mexicana, Arnica, Artemisia vulgaris*, Yellow Tees, *Galea zacatechichi, Canavalia maritima* (Baybean), *Cecropia mexicana* (Guamura), *Cestrum nocturnum, Cynoglossum virginianum* (wild comfrey), *Cytisus scoparius*, Damiana, *Entada rheedii, Eschscholzia californica* (California Poppy), *Fittonia albivenis, Hippobroma longiflora, Humulus japonica* (Japanese Hops), *Humulus lupulus* (Hops), *Lactuca virosa* (Lettuce Opium), *Laggera alata, Leonotis leonurus, Leonurus cardiaca* (Motherwort), *Leonurus sibiricus* (Honeyweed), *Lobelia cardinalis, Lobelia inflata* (Indian-tobacco), *Lobelia siphilitica, Nepeta cataria* (Catnip), *Nicotiana* species (Tobacco), *Nymphaea alba* (White Lily), *Nymphaea caerulea* (Blue Lily), Opium poppy, *Passiflora incarnata* (Passionflower), *Pedicularis densiflora* (Indian Warrior), *Pedicularis groenlandica* (Elephant's Head), *Salvia divinorum, Salvia dorrii* (Tobacco Sage), *Salvia* species (Sage), *Scutellaria galericulata, Scutellaria lateriflora, Scutellaria nana, Scutellaria* species (Skullcap), *Sida acuta* (Wireweed), *Sida rhombifolia, Silene capensis, Syzygium aromaticum* (Clove), *Tagetes lucida* (Mexican Tarragon), *Tarchonanthus camphoratus, Turnera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above-mentioned tobaccos.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, and aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the article/consumable may comprise an aerosol-cooling element which is adapted to cool the aerosol generated from the aerosol-forming substrate (by heat exchange) before being inhaled by the user.

The article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

According to a fourth aspect of the ninth mode, there is provided a method of using the system according to the third aspect, the method comprising inserting the aerosol-forming article into the device; and heating the article using the heater of the device.

In some embodiments the method may comprise inserting the article into a cavity within a body of the device and penetrating the article with the heating element of the device upon insertion of the article.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Tenth Mode: A Smoking Substitute Device Having a Safety Mode (e.g., a Child Safety Mode).

At its most general, the tenth mode relates to a smoking substitute device having a safety mode (e.g., a child safety mode).

According to a first aspect of the tenth mode, there is provided a smoking substitute device comprising a controller configured to receive a command to enter a safety mode and, in response, disable at least one function of the device.

By providing a device able to operate in a safety mode, the device may prevent inadvertent activation of functions of the device that could cause harm to, e.g., a child attempting to use the device. Further, the safety mode may prevent inadvertent activation of the device in situations where such activation could be dangerous (e.g., in a user's pocket or during transport).

Optional features will now be set out. These are applicable singly or in any combination with any aspect.

Disabling at least one function of the device may comprise disabling the operation one or more of a heater, display, light indicator, user input, battery level indicator, and a haptic feedback module of the device. The at least one function may be disabled for a predetermined period of time, or until a command is received to leave the safety mode. The function or plurality functions that are disabled in safety mode may be configurable by a user (e.g., via interaction with a user input module of the device).

The device may comprise a user input module operatively connected to the controller. The user input module may be configured to transmit the command to enter the safety mode to the controller based an interaction by a user with the user input module. The user input module may comprise a button. The command may comprise a signal indicative of a pattern of button presses. This may, for example, be a predetermined number of successive button presses (e.g., within a predetermined time period). For example, the command may comprise a signal indicative of four, five, or six button presses within a predetermined period of time.

Similarly, the command may comprise a signal indicative of the button being depressed for a predetermined time period. For example, the command may be in the form of a signal indicative of the button being pressed for more than, e.g., 2 seconds, or, e.g., 4 seconds, or, e.g., 5 seconds. The command may comprise a signal indicative of a pattern of button presses that includes both a plurality of successive button presses and one or more button presses for a predetermined period of time.

Alternatively, the user input module may comprise a touch screen, and the command may be in the form of a numerical code entered using the touchscreen.

The device may comprise a sensor for detecting a user inhalation from the device. The sensor may be a puff sensor. The puff sensor may, e.g., be a pressure sensor or an acoustic sensor. The command may comprise a signal (i.e., from the puff sensor) indicative of a pattern of user inhalation from the device. The pattern of user inhalation may comprise an inhalation for a predetermined period of time, or an inhalation having a predetermined airflow (e.g., which may be measured via pressure change). The pattern of user inhalation may comprise a series of inhalations (e.g., successive inhalations).

The command may be generated in response to an operating condition of the device. For example, the command may be generated in response to the absence of a consumable engaged with the device. That is, the device may comprise a sensor to detect the presence of a consumable engaged with the device and may enter safety mode when a consumable is not detected.

The device may comprise a heater, a body, a cap engageable with the body for at least partly enclosing the heater, and a cap sensor for detecting whether the cap is open. The command may comprise a signal from the cap sensor indicative of the cap being open. That is, the controller may be configured to enter the safety mode when the cap of the device is open (i.e., when the cap is detected as being open).

In some forms the cap may remain engaged with the body when in the open position (e.g., the cap may be slidably between a closed position and an open position). The cap may additionally or alternatively be fully removable from the body. In this respect, the command may be a signal indicative of the cap being fully removed from the body. In some embodiments a tool may be required to remove the cap from the device (e.g., fully). The device may comprise a sensor to detect use of the tool with the cap so as to be able to provide a signal indicative of the cap being removed.

The device may comprise a temperature sensor for measuring a temperature of a portion of the device. For example, the temperature sensor may be arranged to measure a temperature of the heater or a battery of the device. The temperatures sensor may alternatively be arranged to measure an ambient (i.e., external room) temperature. The command may be in the form of a signal indicative of the measured temperature (measured by the temperature sensor) being greater than a predetermined threshold temperature.

In some embodiments the command may comprise a signal indicative of an absence of user interaction or input for a predetermined time period. Such user input may comprise, e.g., button presses and/or inhalation. The predetermined time period may be, e.g., 5 minutes, 15 minutes, or 20 minutes.

The controller may be configured to enable the at least one function of the device upon receipt of a leave command to leave the safety mode. The leave command may be the same as the (enter) command as described above. For example, the leave command may comprise a signal indicative of a pattern of button presses, inhalation pattern, etc. Where (safety mode entering) command comprises a signal indicative of an operating condition of the device, the leave command may comprise a signal indicative of that operating condition no longer being present. For example, where the controller enters the safety mode in response to opening of the cap, closing the cap may cause the controller to leave the safety mode. The safety mode may be considered a child safety mode.

The device may comprise a user output module. The controller may be configured to control the user output module to provide a user output in response to entering and/or leaving the safety mode. For example, the user output module may comprise a haptic feedback module (e.g., comprising a vibration mechanism). The controller may control the haptic feed module to provide haptic feedback upon entering or leaving the safety mode. Similarly, the controller may be configured to control the user output module to provide a user output (e.g., haptic feedback) when a user attempts to activate a disabled function of the device in safety mode. Such an attempt may be in the form of an interaction with a user input component of the user input module (e.g., an inhalation from the device or a button press).

The device may comprise an elongate body. An end of the elongate body may be configured for engagement with an aerosol-forming article (e.g., a heated tobacco (HT) consumable. The device may comprise a cavity that is configured for receipt of at least a portion of the consumable (i.e., for engagement with the consumable). The aerosol-forming article may be of the type that comprises an aerosol former (e.g., carried by an aerosol-forming substrate).

As discussed above, the device may comprise a heater, which may be for heating the aerosol-forming article. The heater may comprise a heating element, which may be in the form of a rod that extends from the body of the device. The heating element may extend from the end of the body that is configured for engagement with the aerosol-forming article. The temperature sensor may be in the form of a thermocouple mounted to or forming part of the heating element.

The heater (and thus the heating element) may be rigidly mounted to the body. The heating element may be elongate so as to define a longitudinal axis and may, for example, have a transverse profile (i.e., transverse to a longitudinal axis of the heating element) that is substantially circular (i.e., the heating element may be generally cylindrical). Alternatively, the heating element may have a transverse profile that is rectangular (i.e., the heater may be a "blade heater"). The heating element may alternatively be in the shape of a tube (i.e., the heater may be a "tube heater"). The heating element may take other forms (e.g., the heating element may have an elliptical transverse profile). The shape and/or size (e.g., diameter) of the transverse profile of the heating element may be generally consistent for the entire length (or substantially the entire length) of the heating element.

The heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 μm and 220 μm, e.g., between 170 μm and 190 μm, e.g., around 180 μm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 μm.

The heating element may be located in the cavity (of the device), and may extend (e.g., along a longitudinal axis) from an internal base of the cavity towards an opening of the cavity. The length of the heating element (i.e., along the longitudinal axis of the heater) may be less than the depth of the cavity. Hence, the heating element may extend for only a portion of the length of the cavity. That is, the heating element may not extend through (or beyond) the opening of the cavity.

The heating element may be configured for insertion into an aerosol-forming article (e.g., a HT consumable) when an aerosol-forming article is received in the cavity. In that respect, a distal end (i.e., distal from a base of the heating element where it is mounted to the device) of the heating element may comprise a tapered portion, which may facilitate insertion of the heating element into the aerosol-forming article. The heating element may fully penetrate an aerosol-forming article when the aerosol-forming article is received in the cavity. That is, the entire length, or substantially the entire length, of the heating element may be received in the aerosol-forming article.

The heating element may have a length that is less than, or substantially the same as, an axial length of an aerosol-forming substrate forming part of an aerosol-forming article (e.g., a HT consumable). Thus, when such an aerosol-forming article is engaged with the device, the heating element may only penetrate the aerosol-forming substrate, rather than other components of the aerosol-forming article. The heating element may penetrate the aerosol-forming substrate for substantially the entire axial length of the aerosol forming-substrate of the aerosol-forming article. Thus, heat may be transferred from (e.g., an outer circumferential surface of) the heating element to the surrounding aerosol-forming substrate, when penetrated by the heating element. That is, heat may be transferred radially outwardly (in the case of a cylindrical heating element) or, e.g., radially inwardly (in the case of a tube heater).

Where the heater is a tube heater, the heating element of the tube heater may surround at least a portion of the cavity. When the portion of the aerosol-forming article is received in the cavity, the heating element may surround a portion of the aerosol-forming article (i.e., so as to heat that portion of the aerosol-forming article). In particular, the heating element may surround an aerosol forming substrate of the aerosol-forming article. That is, when an aerosol-forming article is engaged with the device, the aerosol forming substrate of the aerosol-forming article may be located adjacent an inner surface of the (tubular) heating element. When the heating element is activated, heat may be transferred radially inwardly from the inner surface of the heating element to heat the aerosol forming substrate.

The cavity may comprise a (e.g., circumferential) wall (or walls) and the (tubular) heating element may extend around at least a portion of the wall(s). In this way, the wall may be located between the inner surface of the heating element and an outer surface of the aerosol-forming article. The wall (or walls) of the cavity may be formed from a thermally conductive material (e.g., a metal) to allow heat conduction from the heating element to the aerosol-forming article. Thus, heat may be conducted from the heating element, through the cavity wall (or walls), to the aerosol-forming substrate of an aerosol-forming article received in the cavity.

In some embodiments the heater may form part of an aerosol-forming article for use with the device. In such cases the device may not comprise a heater. Rather, the aerosol-forming article may comprise a heater. Such arrangements may, for example, be suited to e-cigarette systems in which the aerosol-forming article comprises a tank containing an aerosol former (e.g., in liquid form). In such embodiments, the device may comprise means for connecting the device the heater of an aerosol-forming article engaged with the device. For example, the device may comprise one or more device connectors for (e.g., electrically) connecting the device to a corresponding heater connector of the aerosol-forming article. The connectors (i.e., of both the device and the aerosol-forming article) may be in the form of electrically conductive elements (e.g., plates) that contact when the aerosol-forming article is engaged with the device.

As discussed above the device may comprise a cap disposed at the end of the body that is configured for engagement with an aerosol-forming article. The cap may be moveable between an open position in which access is provided to the heating element, and a closed position in which the cap at least partially encloses the heating element. The cap sensor may be configured to detect whether the cap is in the open position or in the closed position (or between the open and closed positions). The cap may be slidably engaged with the body of the device and may be slidable between the open and closed positions.

The cap may define at least a portion of the cavity of the device. That is, the cavity may be fully defined by the cap, or each of the cap and body may define a portion of the cavity. The cap may comprise an opening to the cavity. The opening may be configured for receipt of at least a portion of an aerosol-forming article. That is, an aerosol-forming article may be inserted through the opening and into the cavity (so as to be engaged with the device).

The cap may be configured such that when an aerosol-forming article is engaged with the device (e.g., received in the cavity), only a portion of the aerosol-forming article is received in the cavity. That is, a portion of the aerosol-forming article (not received in the cavity) may protrude from (i.e., extend beyond) the opening. This (protruding) portion of the aerosol-forming article may be a terminal (e.g., mouth) end of the aerosol-forming article, which may be received in a user's mouth for the purpose of inhaling aerosol formed by the device.

The device may comprise a power source or may be connectable to a power source (e.g., a power source separate to the device). The power source may be electrically connectable to the heater. In that respect, altering (e.g., toggling) the electrical connection of the power source to the heater may affect a state of the heater. For example, toggling the electrical connection of the power source to the heater may toggle the heater between an on state and an off state. The controller may, for example, prevent supply of power from the power source to the heater when in the safety mode. The power source may be a power store. For example, the power source may be a battery or rechargeable battery (e.g., a lithium-ion battery).

The device may comprise an input connection (e.g., a USB port, Micro USB port, USB-C port, etc.). The input connection may be configured for connection to an external source of electrical power, such as a mains electrical supply outlet. The input connection may, in some cases, be used as a substitute for an internal power source (e.g., battery or rechargeable battery). That is, the input connection may be electrically connectable to the heater (for providing power to the heater). Hence, in some forms, the input connection may form at least part of the power source of the device.

Where the power source comprises a rechargeable power source (such as a rechargeable battery), the input connection may be used to charge and recharge the power source.

The device may comprise a user interface (UI), which may comprise the user input module. The user input module of the UI may allow the user to control at least one aspect of the operation of the device. The input module may comprise a power button to switch the device between an on state and an off state. The button may be the same button used to enter safety mode.

In some embodiments the UI may additionally or alternatively comprise an output module to convey information to the user. In some embodiments the output module may comprise a light to indicate a condition of the device (and/or the aerosol-forming article) to the user. The condition of the device (and/or aerosol-forming article) indicated to the user may comprise a condition indicative of the operation of the heater. For example, the condition may comprise whether the heater is in an off state or an on state or whether the device is in safety mode. In some embodiments, the UI unit may comprise at least one of a button, a display, a touchscreen, a switch, a light, and the like. For example, the output module may comprise one or more (e.g., two, three, four, etc.) light-emitting diodes ("LEDs") that may be located on the body of the device. Each of these may be configured to indicate (e.g., when controlled by the controller) that the device is in safety mode.

As above, the device may further comprise a puff sensor (e.g., airflow sensor), which may form part of the input module of the UI. The puff sensor may be configured to detect a user drawing on an end (i.e., a terminal (mouth) end) of the aerosol-forming article. The puff sensor may be configured to produce a signal indicative of a puff state. The signal may be indicative of the user drawing (an aerosol from the aerosol-forming article) such that it is, e.g., in the form of a binary signal. Alternatively or additionally, the signal may be indicative of a characteristic of the draw (e.g., a flow rate of the draw, length of time of the draw, etc.).

The controller may comprise a microcontroller that may, e.g., be mounted on a printed circuit board (PCB). The controller may also comprise a memory, e.g., non-volatile memory. The memory may include instructions, which, when implemented, may cause the controller to perform certain tasks or steps of a method. Where the device comprises an input connection, the controller may be connected to the input connection. The memory may store a state of the device. For example, the memory may store data indicative of whether the device is in a safety mode.

The controller may be configured to control the operation of the heater (and, e.g., the heating element). Thus, the controller may be configured to control vaporization of an aerosol forming part of an aerosol-forming article engaged with the device. The controller may be configured to control the voltage applied by power source to the heater. For example, the controller may be configured to toggle between applying a full output voltage (of the power source) to the heater and applying no voltage to the heater. Alternatively or additionally, the control unit may implement a more complex heater control protocol.

The device may further comprise a voltage regulator to regulate the output voltage supplied by the power source to form a regulated voltage. The regulated voltage may subsequently be applied to the heater.

The controller may be configured to send output signals to a component of the UI. The UI may be configured to convey information to a user, via an output means, in response to such output signals (received from the controller). For example, where the device comprises one or more LEDs, the LEDs may be operatively connected to the controller. Hence, the controller may be configured to control the illumination of the LEDs (e.g., in response to an output signal). For example, the controller may be configured to control the illumination of the LEDs according to (e.g., an on or off) state of the heater.

The device may comprise a wireless interface configured to communicate wirelessly (e.g., via Bluetooth (e.g., a Bluetooth low-energy connection) or Wi-Fi) with an external device. Similarly, the input connection may be configured for wired connection to an external device so as to provide communication between the device and the external device. The command may be in the form of a signal received form the external device.

The external device may be a mobile device. For example, the external device may be a smart phone, tablet, smart watch, or smart car. An application (e.g., app) may be installed on the external device (e.g., mobile device). The application may facilitate communication between the device and the external device via the wired or wireless connection.

The wireless or wired interface may be configured to transfer signals between the external device and the controller of the device. In this respect, the controller may control an aspect of the device in response to a signal received from an external device (e.g., the controller may enter safety mode in response to a signal received from the external device). Alternatively or additionally, an external device may respond to a signal received from the device (e.g., from the controller of the device).

In a second aspect of the tenth mode, there is provided a smoking substitute system comprising a device according to the first aspect described above, and an aerosol-forming substrate for engagement with the device.

The aerosol-forming article may comprise an aerosol-forming substrate at an upstream end of the aerosol-forming article. The article may be in the form of a smoking substitute article, e.g., heated tobacco (HT) consumable (also known as a heat-not-burn (HNB) consumable).

As used herein, the terms "upstream" and "downstream" are intended to refer to the flow direction of the vapor/aerosol, i.e., with the downstream end of the article/consumable being the mouth end or outlet where the aerosol exits the consumable for inhalation by the user. The upstream end of the article/consumable is the opposing end to the downstream end.

The aerosol-forming substrate is capable of being heated to release at least one volatile compound that can form an aerosol. The aerosol-forming substrate may be located at the upstream end of the article/consumable.

In order to generate an aerosol, the aerosol-forming substrate comprises at least one volatile compound that is intended to be vaporized/aerosolized and that may provide the user with a recreational and/or medicinal effect when inhaled. Suitable chemical and/or physiologically active volatile compounds include the group consisting of nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius, Arctostaphylos uva-ursi* (Bearberry), *Argemone mexicana, Amica, Artemisia vulgaris*, Yellow Tees, *Galea zacatechichi, Canavalia maritima* (Baybean), *Cecropia mexicana* (Guamura), *Cestrum noctumum, Cynoglossum virginianum* (wild comfrey), *Cytisus scoparius*, Damiana, *Entada rheedii, Eschscholzia californica* (California Poppy), *Fittonia albivenis, Hippobroma longiflora, Humulus japonica* (Japanese Hops), *Humulus lupulus* (Hops), *Lactuca virosa* (Lettuce Opium), *Laggera alata, Leonotis leonurus, Leonurus cardiaca* (Motherwort), *Leonurus sibiricus* (Honeyweed), *Lobelia cardinalis, Lobelia inflata* (Indian-tobacco), *Lobelia siphilitica, Nepeta cataria* (Catnip), *Nicotiana* species (Tobacco), *Nymphaea alba* (White Lily), *Nymphaea caerulea* (Blue Lily), Opium poppy, *Passiflora incamata* (Passionflower), *Pedicularis densiflora* (Indian Warrior), *Pedicularis groenlandica* (Elephant's Head), *Salvia divinorum, Salvia dorrii* (Tobacco Sage), *Salvia* species (Sage), *Scutellaria galericulata, Scutellaria lateriflora, Scutellaria nana, Scutellaria* species (Skullcap), *Sida acuta* (Wireweed), *Sida rhombifolia, Silene capensis, Syzygium aromaticum* (Clove), *Tagetes lucida* (Mexican Tarragon), *Tarchonanthus camphoratus, Tumera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above-mentioned tobaccos.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, and aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the article/consumable may comprise an aerosol-cooling element which is adapted to cool the aerosol generated from the aerosol-forming substrate (by heat exchange) before being inhaled by the user.

The article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

In some embodiments the system may be in the form of an e-cigarette system (i.e., rather than a heated tobacco system as described above). In such a system, the consumable may be in the form of an e-cigarette consumable. The e-cigarette system may be configured such that the consumable can be received and retained in the cavity of the device (i.e., so as to be engaged with the device). The consumable may be retained by way of, e.g., an interference fit, screwing one onto (or onto) the other, a bayonet fitting, or by way of a snap engagement mechanism.

The consumable may comprise a tank, which may define a reservoir for the storage of an aerosol former. The aerosol former may be in the form of an e-liquid (stored in the reservoir).

The consumable may be a "single-use" consumable. That is, upon exhausting the e-liquid in the tank, the intention may be that the user disposes of the entire consumable. Alternatively, the e-liquid may be the only part of the system that is truly "single-use". For example, the tank may be refillable with e-liquid or another component of the system (internal to the device or external to the device, e.g., a refillable cartomizer) may define a reservoir for the e-liquid.

As set forth above, the consumable may comprise a heater (i.e., instead of the heater forming part of the device) configured to heat and vaporize the e-liquid. The consumable may comprise a porous wick that conveys e-liquid from the tank to a heating element of the heater. The heating element may be a heating filament that is wound (e.g., helically) around at least a portion of the porous wick, such that when the heating element is heated (e.g., by the action of electrical current passing through the heating element), heat may be transferred from the heating element to the e-liquid conveyed by the wick. This transfer of heat may vaporize the e-liquid and the resultant vapor may be entrained in an airflow passing through the consumable.

The consumable may further comprise one or more heater connectors for connecting the heater (of the consumable) to the device. The heater connectors may be in the form of electrically conductive element or contacts (e.g., metal plates) and may be disposed on an in-use device-facing surface of the consumable. The heater connectors may be electrically connected to the heater of the consumable, such that electricity supplied via the heater connectors may pass to the heater. In other words, a voltage applied across the heater connectors may generally correspond to a voltage applied across the heating element of the heater.

The heater connectors may be arranged such that they contact corresponding device connectors of the device when the consumable is engaged with the device. The device connectors may be connected (e.g., electrically) to a power source (e.g., battery) of the device. Thus, electricity may be supplied from the power source to the heating element, via in-contact heater and device connectors. In this way, the heater forming part of the consumable may operate (and interact with, e.g., a controller) as otherwise described above with respect to a heater forming part of the device.

According to a third aspect of the tenth mode, there is provided a method of operating a smoking substitute device, the method comprising: receiving a command to enter a safety mode; and disabling at least one function of the device in response to the command.

Disabling at least one function of the device comprises disabling the operation one or more of a heater, display, light indicator, battery level indicator, and a haptic feedback module of the device.

The method may comprise transmitting the command in response to user input. The user input may be as set forth above with respect to the first aspect. For example, the user input may comprise a pattern of button presses.

The method may comprise transmitting the command in response to an operating condition of the device. The operating condition may be as described above with respect to the first aspect.

The method may comprise enabling the at least one function of the device in response to a command to leave the safety mode. The command to leave the safety mode may be as described above with respect to the first aspect. For example, the command may be the same as the command to enter safety mode. In this respect, the command may toggle safety mode (on and off).

According to a fourth aspect of the tenth mode, there is provided a method of operating a smoking substitute device, the method comprising entering the device into a safety mode (e.g., child safety mode) based upon a user input to a user interface of the device or based upon a pre-determined operating condition of the device being met.

The method of the fourth aspect may be as otherwise described with respect to the third aspect.

According to a fifth aspect of the tenth mode, there is provided a smoking substitute device comprising controller configured to enter a safety mode (e.g., child safety mode) based on a user input to a user interface of the device or based upon a predetermined condition of the device being met.

The device of the fifth aspect may be as otherwise described with respect to the first aspect.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Eleventh Mode: A Heated Tobacco Device Switching ON and OFF Based on Different User Inputs.

At its most general, the eleventh mode relates to a heated tobacco device switching ON and OFF based on different user inputs.

According to a first aspect of the eleventh mode, there is provided a heated tobacco device, including: a controller for controlling operation of the device; and a user input means operatively connected to the controller; wherein the controller is configured to: enter the device into an ON mode in response to a predetermined ON user input to the user input means; and enter the device into an OFF mode in response to a predetermined OFF user input to the user input means, and wherein the ON user input is different to the OFF user input.

Optional features will now be set out. These are applicable singly or in any combination with any aspect.

Optionally, the user input means includes a touch input means.

Optionally, the touch input means includes any one of a button, a switch, a touch sensor, or a touch screen.

Optionally, the ON user input includes any one of: a short press on the touch input means, a long press of the touch input means, multiple presses of the touch input means, multiple short presses of the touch input means, multiple long presses of the touch input means, or a combination of short and long presses of the touch input means.

Optionally, the ON user input includes multiple presses of the touch input means.

Optionally, the OFF user input includes any one of: a short press on the button, a long press on the button, multiple presses on the button, multiple short presses on the button, multiple long presses on the button, or a combination of short and long presses on the button.

Optionally, the OFF user input includes a long press of the touch input means for a duration equal to at least 2 seconds.

Optionally, the duration is equal to at least 4 seconds.

Optionally, the OFF user input includes only the long press of the touch input means. Optionally, the device comprises a memory for storing a user-settable ON user input. Optionally, the device comprises a memory for storing a user-settable ON user input and OFF user input.

According to a second aspect of the eleventh mode, there is provided a method of operating a heated tobacco device, including: entering the device into an ON mode in response to inputting an ON user input to a user input means of the device; and entering the device into an OFF mode in response to inputting an OFF user input to the user input means; wherein the ON user input is different to the OFF user input.

Optionally, the user input means includes a touch input means.

Optionally, the ON user input includes multiple presses of the touch input means.

Optionally, the OFF user input includes a long press of the touch input means for a duration equal to at least 2 seconds.

Optionally, the OFF user input includes only the long press of the touch input means.

The device may comprise an elongate body. An end of the elongate body may be configured for engagement with an aerosol-forming article. For example, the body may be configured for engagement with a heated tobacco (HT) consumable (or heat-not-burn (HNB) consumable). The terms "heated tobacco" and "heat-not-burn" are used interchangeably herein to describe a consumable that is of the type that is heated rather than combusted (or are used interchangeably to describe a device for use with such a consumable). The device may comprise a cavity that is configured for receipt of at least a portion of the consumable (i.e., for engagement with the consumable). The aerosol-forming article may be of the type that comprises an aerosol former (e.g., carried by an aerosol-forming substrate).

The device may comprise a heater for heating the aerosol-forming article. The heater may comprise a heating element, which may be in the form of a rod that extends from the body of the device. The heating element may extend from the end of the body that is configured for engagement with the aerosol-forming article.

The heater (and thus the heating element) may be rigidly mounted to the body. The heating element may be elongate so as to define a longitudinal axis and may, for example, have a transverse profile (i.e., transverse to a longitudinal axis of the heating element) that is substantially circular (i.e., the heating element may be generally cylindrical). Alternatively, the heating element may have a transverse profile that is rectangular (i.e., the heater may be a "blade heater"). The heating element may alternatively be in the shape of a tube (i.e., the heater may be a "tube heater"). The heating element may take other forms (e.g., the heating element may have an elliptical transverse profile). The shape and/or size (e.g., diameter) of the transverse profile of the heating element may be generally consistent for the entire length (or substantially the entire length) of the heating element.

The heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 µm and 220 µm, e.g., between 170 µm and 190 µm, e.g., around 180 µm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 µm.

The heating element may be located in the cavity (of the device), and may extend (e.g., along a longitudinal axis) from an internal base of the cavity towards an opening of the cavity. The length of the heating element (i.e., along the longitudinal axis of the heater) may be less than the depth of the cavity. Hence, the heating element may extend for only a portion of the length of the cavity. That is, the heating element may not extend through (or beyond) the opening of the cavity.

The heating element may be configured for insertion into an aerosol-forming article (e.g., a HT consumable) when an aerosol-forming article is received in the cavity. In that respect, a distal end (i.e., distal from a base of the heating element where it is mounted to the device) of the heating element may comprise a tapered portion, which may facilitate insertion of the heating element into the aerosol-forming article. The heating element may fully penetrate an aerosol-forming article when the aerosol-forming article is received in the cavity. That is, the entire length, or substantially the entire length, of the heating element may be received in the aerosol-forming article.

The heating element may have a length that is less than, or substantially the same as, an axial length of an aerosol-forming substrate forming part of an aerosol-forming article (e.g., a HT consumable). Thus, when such an aerosol-forming article is engaged with the device, the heating element may only penetrate the aerosol-forming substrate, rather than other components of the aerosol-forming article. The heating element may penetrate the aerosol-forming substrate for substantially the entire axial length of the aerosol forming-substrate of the aerosol-forming article. Thus, heat may be transferred from (e.g., an outer circumferential surface of) the heating element to the surrounding aerosol-forming substrate, when penetrated by the heating element. That is, heat may be transferred radially outwardly (in the case of a cylindrical heating element) or, e.g., radially inwardly (in the case of a tube heater).

Where the heater is a tube heater, the heating element of the tube heater may surround at least a portion of the cavity. When the portion of the aerosol-forming article is received in the cavity, the heating element may surround a portion of the aerosol-forming article (i.e., so as to heat that portion of the aerosol-forming article). In particular, the heating element may surround an aerosol forming substrate of the aerosol-forming article. That is, when an aerosol-forming article is engaged with the device, the aerosol forming substrate of the aerosol-forming article may be located adjacent an inner surface of the (tubular) heating element. When the heating element is activated, heat may be transferred radially inwardly from the inner surface of the heating element to heat the aerosol forming substrate.

The cavity may comprise a (e.g., circumferential) wall (or walls) and the (tubular) heating element may extend around at least a portion of the wall(s). In this way, the wall may be located between the inner surface of the heating element and an outer surface of the aerosol-forming article. The wall (or walls) of the cavity may be formed from a thermally conductive material (e.g., a metal) to allow heat conduction from the heating element to the aerosol-forming article. Thus, heat may be conducted from the heating element, through the cavity wall (or walls), to the aerosol-forming substrate of an aerosol-forming article received in the cavity.

In some embodiments the device may comprise a cap disposed at the end of the body that is configured for engagement with an aerosol-forming article. Where the device comprises a heater having a heating element, the cap may at least partially enclose the heating element. The cap may be moveable between an open position in which access is provided to the heating element, and a closed position in which the cap at least partially encloses the heating element. The cap may be slidably engaged with the body of the device and may be slidable between the open and closed positions.

The cap may define at least a portion of the cavity of the device. That is, the cavity may be fully defined by the cap, or each of the cap and body may define a portion of the cavity. Where the cap fully defines the cavity, the cap may comprise an aperture for receipt of the heating element into the cavity (when the cap is in the closed position). The cap may comprise an opening to the cavity. The opening may be configured for receipt of at least a portion of an aerosol-forming article. That is, an aerosol-forming article may be inserted through the opening and into the cavity (so as to be engaged with the device).

The cap may be configured such that when an aerosol-forming article is engaged with the device (e.g., received in the cavity), only a portion of the aerosol-forming article is received in the cavity. That is, a portion of the aerosol-forming article (not received in the cavity) may protrude from (i.e., extend beyond) the opening. This (protruding) portion of the aerosol-forming article may be a terminal (e.g., mouth) end of the aerosol-forming article, which may be received in a user's mouth for the purpose of inhaling aerosol formed by the device.

The device may comprise a power source or may be connectable to a power source (e.g., a power source separate to the device). The power source may be electrically connectable to the heater. In that respect, altering (e.g., toggling) the electrical connection of the power source to the heater may affect a state of the heater. For example, toggling the electrical connection of the power source to the heater may toggle the heater between an on state and an off state. The power source may be a power store. For example, the power source may be a battery or rechargeable battery (e.g., a lithium-ion battery).

The device may comprise an input connection (e.g., a USB port, Micro USB port, USB-C port, etc.). The input connection may be configured for connection to an external source of electrical power, such as a mains electrical supply outlet. The input connection may, in some cases, be used as a substitute for an internal power source (e.g., battery or rechargeable battery). That is, the input connection may be electrically connectable to the heater (for providing power to the heater). Hence, in some forms, the input connection may form at least part of the power source of the device.

Where the power source comprises a rechargeable power source (such as a rechargeable battery), the input connection may be used to charge and recharge the power source.

The device may comprise a user interface (UI). In some embodiments the UI may include input means to receive operative commands from the user. The input means of the UI may allow the user to control at least one aspect of the operation of the device. In some embodiments the input means may comprise a power button to switch the device between an on state and an off state. In some other embodiments, input means may comprise a switch. In yet another embodiment, the input means may comprise a touch button sensor. In further embodiment, input means may include a touch screen.

In some embodiments the UI may additionally or alternatively comprise output means to convey information to the user. In some embodiments the output means may comprise a light to indicate a condition of the device (and/or the aerosol-forming article) to the user. The condition of the device (and/or aerosol-forming article) indicated to the user may comprise a condition indicative of the operation of the heater. For example, the condition may comprise whether the heater is in an off state or an on state. In some embodiments, the UI unit may comprise at least one of a button, a display, a touchscreen, a switch, a light, and the like. For example, the output means may comprise one or more (e.g., two, three, four, etc.) light-emitting diodes ("LEDs") that may be located on the body of the device.

The device may further comprise a puff sensor (e.g., airflow sensor), which form part of the input means of the UI. The puff sensor may be configured to detect a user drawing on an end (i.e., a terminal (mouth) end) of the aerosol-forming article. The puff sensor may, for example, be a pressure sensor or a microphone. The puff sensor may be configured to produce a signal indicative of a puff state. The signal may be indicative of the user drawing (an aerosol from the aerosol-forming article) such that it is, e.g., in the form of a binary signal. Alternatively or additionally, the signal may be indicative of a characteristic of the draw (e.g., a flow rate of the draw, length of time of the draw, etc.).

The device may comprise a controller or may be connectable to a controller that may be configured to control at least one function of the device. The controller may comprise a microcontroller that may, e.g., be mounted on a printed circuit board (PCB). The controller may also comprise a memory, e.g., non-volatile memory. The memory may include instructions, which, when implemented, may cause the controller to perform certain tasks or steps of a method. Where the device comprises an input connection, the controller may be connected to the input connection.

The controller may be configured to control the operation of the heater (and, e.g., the heating element). Thus, the controller may be configured to control vaporization of an aerosol forming part of an aerosol-forming article engaged with the device. The controller may be configured to control the voltage applied by power source to the heater. For example, the controller may be configured to toggle between applying a full output voltage (of the power source) to the heater and applying no voltage to the heater. Alternatively or additionally, the control unit may implement a more complex heater control protocol.

The device may further comprise a voltage regulator to regulate the output voltage supplied by the power source to form a regulated voltage. The regulated voltage may subsequently be applied to the heater.

In some embodiments, where the device comprises a UI, the controller may be operatively connected to one or more components of the UI. The controller may be configured to receive command signals from an input means of the UI. The controller may be configured to control the heater in response to the command signals. For example, the controller may be configured to receive "on" and "off" command signals from the UI and, in response, may control the heater so as to be in a corresponding on or off state.

In an embodiment, the controller is configured to control ON and OFF operation of the device based on different user input commands.

The controller may be configured to send output signals to a component of the UI. The UI may be configured to convey information to a user, via an output means, in response to such output signals (received from the controller). For example, where the device comprises one or more LEDs, the LEDs may be operatively connected to the controller. Hence, the controller may be configured to control the illumination of the LEDs (e.g., in response to an output signal). For example, the controller may be configured to control the illumination of the LEDs according to (e.g., an on or off) state of the heater.

Where the device comprises a sensor (e.g., a puff/airflow sensor), the controller may be operatively connected to the sensor. The controller may be configured to receive a signal from the sensor (e.g., indicative of a condition of the device and/or engaged aerosol-forming article). The controller may be configured to control the heater, or an aspect of the output means, based on the signal from the sensor.

The device may comprise a wireless interface configured to communicate wirelessly (e.g., via Bluetooth (e.g., a Bluetooth low-energy connection) or Wi-Fi) with an external device. Similarly, the input connection may be configured for wired connection to an external device so as to provide communication between the device and the external device.

The external device may be a mobile device. For example, the external device may be a smart phone, tablet, smart watch, or smart car. An application (e.g., app) may be installed on the external device (e.g., mobile device). The application may facilitate communication between the device and the external device via the wired or wireless connection.

The wireless or wired interface may be configured to transfer signals between the external device and the controller of the device. In this respect, the controller may control an aspect of the device in response to a signal received from an external device. Alternatively or additionally, an external device may respond to a signal received from the device (e.g., from the controller of the device).

In a third aspect of the eleventh mode, there is provided a system (e.g., a smoking substitute system) comprising a device according to the first aspect or a device configured to perform the method of the second aspect, and an aerosol-forming article. The aerosol-forming article may comprise an aerosol-forming substrate at an upstream end of the aerosol-forming article. The article may be in the form of a smoking substitute article, e.g., heated tobacco (HT) consumable (also known as a heat-not-burn (HNB) consumable).

As used herein, the terms "upstream" and "downstream" are intended to refer to the flow direction of the vapor/aerosol, i.e., with the downstream end of the article/consumable being the mouth end or outlet where the aerosol exits the consumable for inhalation by the user. The upstream end of the article/consumable is the opposing end to the downstream end.

The aerosol-forming substrate is capable of being heated to release at least one volatile compound that can form an aerosol. The aerosol-forming substrate may be located at the upstream end of the article/consumable.

In order to generate an aerosol, the aerosol-forming substrate comprises at least one volatile compound that is intended to be vaporized/aerosolized and that may provide the user with a recreational and/or medicinal effect when inhaled. Suitable chemical and/or physiologically active volatile compounds include the group consisting of nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius*, *Arctostaphylos uva-ursi* (Bearberry), *Argemone mexicana*, *Amica*, *Artemisia vulgaris*, Yellow Tees, *Galea zacatechichi*, *Canavalia maritima* (Baybean), *Cecropia mexicana* (Guamura), *Cestrum noctumum*, *Cynoglossum virginianum* (wild comfrey), *Cytisus scoparius*, Damiana, *Entada rheedii*, *Eschscholzia californica* (California Poppy), *Fittonia albivenis*, *Hippobroma longiflora*, *Humulus japonica* (Japanese Hops), *Humulus lupulus* (Hops), *Lactuca virosa* (Lettuce Opium), *Laggera alata*, *Leonotis leonurus*, *Leonurus cardiaca* (Motherwort), *Leonurus sibiricus* (Honeyweed), *Lobelia cardinalis*, *Lobelia inflata* (Indian-tobacco), *Lobelia siphilitica*, *Nepeta cataria* (Catnip), *Nicotiana* species (Tobacco), *Nymphaea alba* (White Lily), *Nymphaea caerulea* (Blue Lily), Opium poppy, *Passiflora incamata* (Passionflower), *Pedicularis densiflora* (Indian Warrior), *Pedicularis groenlandica* (Elephant's Head), *Salvia divinorum*, *Salvia dorrii* (Tobacco Sage), *Salvia* species (Sage), *Scutellaria galericulata*, *Scutellaria lateriflora*, *Scutellaria nana*, *Scutellaria species* (Skullcap), *Sida acuta* (Wireweed), *Sida rhombifolia*, *Silene capensis*, *Syzygium aromaticum* (Clove), *Tagetes lucida* (Mexican Tarragon), *Tarchonanthus camphoratus*, *Tumera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above-mentioned tobaccos.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, and aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the article/consumable may comprise an aerosol-cooling element which is adapted to cool the aerosol generated from the aerosol-forming substrate (by heat exchange) before being inhaled by the user.

The article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

According to a fourth aspect of the eleventh mode, there is provided a method of using the system according to the third aspect, the method comprising inserting the aerosol-forming article into the device; and heating the article using the heater of the device.

In some embodiments the method may comprise inserting the article into a cavity within a body of the device and penetrating the article with the heating element of the device upon insertion of the article.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Twelfth Mode: A Heat-not-Burn Device which is Configured to Switch from a Locked Operating Mode to an Unlocked Operating Mode Based on Detecting the Occurrence of a Predetermined Event or Upon Receiving a Predetermined User Input.

At its most general, the twelfth mode relates to a heat-not-burn device which is configured to switch from a locked operating mode to an unlocked operating mode based on detecting the occurrence of a predetermined event or upon receiving a predetermined user input.

According to a first aspect of the twelfth mode, there is provided heat-not-burn device configured to switch from a locked operating mode to an unlocked operating mode based on detecting an occurrence of a predetermined event and/or upon receiving a predetermined user input, wherein a heater of the heat-not-burn device is configured to be disabled during said locked operating mode and enabled during said unlocked operating mode.

By providing a heat-not-burn device where a heater of the device remains disabled or deactivated in the locked mode, accidental or unwarranted activation of the device may be avoided during storage and/or shipping of the device. A more versatile device is provided which intelligently keeps the heater of the device disabled when being shipped and/or stored. Thus, even if an on button is pressed, unintentionally, during the locked mode and/or while shipping the device, the device would still not activate heater.

In the locked operating mode, the device as a whole may not be deactivated. That is, when put in the locked operating mode the heater may be deactivated but device may remain operationally, e.g., a controller and user interface of the device may remain operational. More specifically, in the locked operating mode a battery of the device, via the controller, may not energize the heater.

Optional features will now be set out. These are applicable singly or in any combination with any aspect.

Optionally, the device may comprise a controller configured to switch the device from the locked operating mode to the unlocked operating mode and enable the heater in the unlocked operating mode. For example, the heater of the device may not be energized in the unlocked operating mode and may require further user input to activate the heater of the device.

Optionally, the predetermined user input comprises a predetermined sequence of user presses at a user interface of the device. The user interface may be a button, or it may be other user interfaces such as a switch and a touch sensitive screen. The pre-determined sequence of user presses may minimize the chances of the device being switched from the locked operating mode to the unlocked operating mode due to random presses of the button during shipping/packaging of the device. For example, the pre-determined sequence of user presses is configured in a way that random presses on the user interface are unlikely to match with the pre-determined sequence of user presses. Thus, the device may intelligently prevent the unintentional activation of the device during storage and/or shipping. For example, the predetermined sequence of user presses, or button presses, may be any one of (i) pressing the button for a predetermined number of times, e.g., 5 times; (ii) pressing and holding the button for a predetermined period of time, e.g., 3 seconds or (iii) pressing the button for a predetermined number of times, wherein during each of the button presses keeping the button depressed for a predetermined period of time.

Optionally, the predetermined user input comprises a predetermined movement of the device, wherein the device further comprises a motion sensor for detecting said predetermined movement. The motion sensor may be configured to sense the movement or shaking of the device, whereby the controller may be configured to recognize a pattern of sensed movement and compares that with a predetermined movement. Upon matching the recognized pattern of sensed movement with the predetermined movement the controller may switch the device from a locked operating mode to an unlocked operating mode. Said predetermined movement comprises, for example, one or more of a swirling movement, sweeping or swaying movement and movement along the longitudinal direction.

Optionally, the heater is configured to be enabled in the unlocked operating mode upon receiving a further user input at the device, and wherein the predetermined user input is different from the further user input. This may provide an extra layer of security to avoid unwanted activation of the heater. For example, even if the device is unintentionally switched from a locked operating mode to an unlocked operating mode, the heater of the device may remain deactivated unless the further user input is entered at the device, e.g., at a user interface. The predetermined user input and the further user input may be inputted at the same user interface, or they can be inputted at different user interfaces.

Optionally, the predetermined event comprises one or more of: i) an electrical connection being established between the device and an external device, ii) relative movement between a cap of the device and a body of the device (for example wherein the cap of the device is lifted away from the device) and iii) a consumable being engaged with the device. This may provide the benefits of switching the device from locked operating mode to unlocked operating mode only by user intervention. That is, none of these event can occur without physical user intervention during storage and/or shipping of the device and therefore the device may be further prevented from being activated accidentally.

For example, said relative movement comprises moving or lifting the cap away from the body of the device. Such movement may be detected by a microswitch or trigger provided between the cap and the body of the device. For example, establishing said electrical connection comprises connecting the device with an external device such as a computing device or a power source. Advantageously, both of these predetermined events may indicate initiating the usage of the device by a user and thus upon detecting lifting of the cap and connecting the device with the external device or power source, the controller may switch the device from locked operating mode to unlocked operating mode.

For example, in some embodiments, a consumable may be packed separately from the device during storage and shipping, thus when the device detects that the consumable is engaged with the device, e.g., the consumable being inserted into a cavity of the device, the controller may determine the initiate use of the device by a user and the controller may thus switch the device from locked operating mode to unlocked operating mode.

Optionally, the device is configured to switch from the unlocked operating mode to the locked operating mode upon receiving a second predetermined user input, the second predetermined user input being a second predetermined sequence of user presses at a user interface of the device, wherein the second predetermined user input is different to the predetermined user input. Advantageously, this may allow the user to reactivate the locked operating mode, and thereby prevents the heater from being activated accidentally. This may be particularly beneficially when the device is being transported, e.g., during daily commute or when it is taken on a flight.

The device may comprise an elongate body. An end of the elongate body may be configured for engagement with an aerosol-forming article. For example, the body may be configured for engagement with a heated tobacco (HT) consumable (or heat-not-burn (HNB) consumable). The terms "heated tobacco" and "heat-not-burn" are used interchangeably herein to describe a consumable that is of the type that is heated rather than combusted (or are used interchangeably to describe a device for use with such a consumable). The device may comprise a cavity that is configured for receipt of at least a portion of the consumable (i.e., for engagement with the consumable). The aerosol-forming article may be of the type that comprises an aerosol former (e.g., carried by an aerosol-forming substrate).

The device may comprise a heater for heating the aerosol-forming article. The heater may comprise a heating element, which may be in the form of a rod that extends from the body of the device. The heating element may extend from the end of the body that is configured for engagement with the aerosol-forming article. In an embodiment, the heater of the device is configured to be disabled in locked mode and enabled in unlocked mode. Though, the heater of the device is enabled in the unlocked operating mode, however the heater of the device would still require a further user input to be activated.

The heater (and thus the heating element) may be rigidly mounted to the body. The heating element may be elongate so as to define a longitudinal axis and may, for example, have a transverse profile (i.e., transverse to a longitudinal axis of the heating element) that is substantially circular (i.e., the heating element may be generally cylindrical). Alternatively, the heating element may have a transverse profile that is rectangular (i.e., the heater may be a "blade heater"). The heating element may alternatively be in the shape of a tube (i.e., the heater may be a "tube heater"). The heating element may take other forms (e.g., the heating element may have an elliptical transverse profile). The shape and/or size (e.g., diameter) of the transverse profile of the heating element may be generally consistent for the entire length (or substantially the entire length) of the heating element.

The heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 μm and 220 μm, e.g., between 170 μm and 190 μm, e.g., around 180 μm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 μm.

The heating element may be located in the cavity (of the device), and may extend (e.g., along a longitudinal axis) from an internal base of the cavity towards an opening of the cavity. The length of the heating element (i.e., along the longitudinal axis of the heater) may be less than the depth of the cavity. Hence, the heating element may extend for only a portion of the length of the cavity. That is, the heating element may not extend through (or beyond) the opening of the cavity.

The heating element may be configured for insertion into an aerosol-forming article (e.g., a HT consumable) when an aerosol-forming article is received in the cavity. In that respect, a distal end (i.e., distal from a base of the heating element where it is mounted to the device) of the heating element may comprise a tapered portion, which may facilitate insertion of the heating element into the aerosol-forming article. The heating element may fully penetrate an aerosol-forming article when the aerosol-forming article is received in the cavity. That is, the entire length, or substantially the entire length, of the heating element may be received in the aerosol-forming article.

The heating element may have a length that is less than, or substantially the same as, an axial length of an aerosol-forming substrate forming part of an aerosol-forming article (e.g., a HT consumable). Thus, when such an aerosol-forming article is engaged with the device, the heating element may only penetrate the aerosol-forming substrate, rather than other components of the aerosol-forming article. The heating element may penetrate the aerosol-forming substrate for substantially the entire axial length of the aerosol forming-substrate of the aerosol-forming article. Thus, heat may be transferred from (e.g., an outer circumferential surface of) the heating element to the surrounding aerosol-forming substrate, when penetrated by the heating element. That is, heat may be transferred radially outwardly (in the case of a cylindrical heating element) or, e.g., radially inwardly (in the case of a tube heater).

Where the heater is a tube heater, the heating element of the tube heater may surround at least a portion of the cavity. When the portion of the aerosol-forming article is received in the cavity, the heating element may surround a portion of the aerosol-forming article (i.e., so as to heat that portion of the aerosol-forming article). In particular, the heating element may surround an aerosol forming substrate of the aerosol-forming article. That is, when an aerosol-forming article is engaged with the device, the aerosol forming substrate of the aerosol-forming article may be located adjacent an inner surface of the (tubular) heating element. When the heating element is activated, heat may be transferred radially inwardly from the inner surface of the heating element to heat the aerosol forming substrate.

The cavity may comprise a (e.g., circumferential) wall (or walls) and the (tubular) heating element may extend around at least a portion of the wall(s). In this way, the wall may be located between the inner surface of the heating element and an outer surface of the aerosol-forming article. The wall (or walls) of the cavity may be formed from a thermally conductive material (e.g., a metal) to allow heat conduction from the heating element to the aerosol-forming article. Thus, heat may be conducted from the heating element, through the cavity wall (or walls), to the aerosol-forming substrate of an aerosol-forming article received in the cavity.

In some embodiments the device may comprise a cap disposed at the end of the body that is configured for engagement with an aerosol-forming article. Where the device comprises a heater having a heating element, the cap may at least partially enclose the heating element. The cap may be moveable between an open position in which access is provided to the heating element, and a closed position in which the cap at least partially encloses the heating element. The cap may be slidably engaged with the body of the device and may be slidable between the open and closed positions.

The cap may define at least a portion of the cavity of the device. That is, the cavity may be fully defined by the cap, or each of the cap and body may define a portion of the cavity. Where the cap fully defines the cavity, the cap may comprise an aperture for receipt of the heating element into the cavity (when the cap is in the closed position). The cap may comprise an opening to the cavity. The opening may be configured for receipt of at least a portion of an aerosol-forming article. That is, an aerosol-forming article may be inserted through the opening and into the cavity (so as to be engaged with the device).

The cap may be configured such that when an aerosol-forming article is engaged with the device (e.g., received in the cavity), only a portion of the aerosol-forming article is received in the cavity. That is, a portion of the aerosol-forming article (not received in the cavity) may protrude from (i.e., extend beyond) the opening. This (protruding) portion of the aerosol-forming article may be a terminal (e.g., mouth) end of the aerosol-forming article, which may be received in a user's mouth for the purpose of inhaling aerosol formed by the device.

The device may comprise a power source or may be connectable to a power source (e.g., a power source separate to the device). The power source may be electrically connectable to the heater. In that respect, altering (e.g., toggling) the electrical connection of the power source to the heater may affect a state of the heater. For example, toggling the electrical connection of the power source to the heater may toggle the heater between an on state and an off state. The power source may be a power store. For example, the power source may be a battery or rechargeable battery (e.g., a lithium-ion battery).

The device may comprise an input connection (e.g., a USB port, Micro USB port, USB-C port, etc.). The input connection may be configured for connection to an external source of electrical power, such as a mains electrical supply outlet. The input connection may, in some cases, be used as a substitute for an internal power source (e.g., battery or rechargeable battery). That is, the input connection may be electrically connectable to the heater (for providing power to the heater). Hence, in some forms, the input connection may form at least part of the power source of the device.

Where the power source comprises a rechargeable power source (such as a rechargeable battery), the input connection may be used to charge and recharge the power source.

The device may comprise a user interface (UI). In some embodiments the UI may include input means to receive operative commands from the user. The input means of the UI may allow the user to control at least one aspect of the operation of the device. In some embodiments the input means may comprise a power button to switch the device between an on state and an off state. In an embodiment, the input means of the UI may be configured to receive a user input to switch the device from a locked operating mode to an unlocked operating mode. In one aspect of the twelfth mode, the user input to switch the device from locked operating mode to the unlocked operating mode may be a pre-determined sequence of button presses. In an example, the input means may also include a touch screen input, etc.

In some embodiments the UI may additionally or alternatively comprise output means to convey information to the user. In some embodiments, the output means may be configured to indicate the user about the current mode of operation of the device. For example, the output means may be one of haptic feedback means, audio feedback means, and visual feedback means, configured to indicate the user about the switching of the device from locked mode to unlocked mode based on at least one of detecting an occurrence of a predetermined event or upon receiving a predetermined user input. In some embodiments the output means may also comprise a light to indicate a condition of the device (and/or the aerosol-forming article) to the user. The condition of the device (and/or aerosol-forming article) indicated to the user may comprise a condition indicative of the operation of the heater. For example, the condition may comprise whether the heater is in an off state or an on state. In some embodiments, the UI unit may comprise at least one of a button, a display, a touchscreen, a switch, a light, and the like. For example, the output means may comprise one or more (e.g., two, three, four, etc.) light-emitting diodes ("LEDs") that may be located on the body of the device.

The device may further comprise a puff sensor (e.g., airflow sensor), which form part of the input means of the UI. The puff sensor may be configured to detect a user drawing on an end (i.e., a terminal (mouth) end) of the aerosol-forming article. The puff sensor may, for example, be a pressure sensor or a microphone. The puff sensor may be configured to produce a signal indicative of a puff state. The signal may be indicative of the user drawing (an aerosol from the aerosol-forming article) such that it is, e.g., in the form of a binary signal. Alternatively or additionally, the signal may be indicative of a characteristic of the draw (e.g., a flow rate of the draw, length of time of the draw, etc.).

The device may comprise a controller or may be connectable to a controller that may be configured to control at least one function of the device. The controller may comprise a microcontroller that may, e.g., be mounted on a printed circuit board (PCB). The controller may also comprise a memory, e.g., non-volatile memory. The memory may include instructions, which, when implemented, may cause the controller to perform certain tasks or steps of a method. Where the device comprises an input connection, the controller may be connected to the input connection.

The controller is coupled to the heater and is configured to control the operation of the heater (and, e.g., the heating element). In some embodiment, the controller may be configured to switch the device from the locked operating mode to the unlocked operating mode and enable the heater in the unlocked operating mode in response to receiving a further user input. Further, the controller may be configured to control vaporization of an aerosol forming part of an aerosol-forming article engaged with the device. The controller may be configured to control the voltage applied by power source to the heater. For example, the controller may be configured to toggle between applying a full output voltage (of the power source) to the heater and applying no voltage to the heater. Alternatively or additionally, the control unit may implement a more complex heater control protocol.

The device may further comprise a voltage regulator to regulate the output voltage supplied by the power source to form a regulated voltage. The regulated voltage may subsequently be applied to the heater. In some embodiment, the voltage regulator may be used to control the supply of voltage to the heater in the locked operating mode and the unlocked operating mode. For example, in locked operating mode the heater is not supplied with any voltage, whereas, in unlocked mode the heater is configured to receive voltage from the power source.

In some embodiments, where the device comprises a UI, the controller may be operatively connected to one or more components of the UI. The controller may be configured to receive command signals from an input means of the UI. The controller may be configured to control the heater in response to the command signals. For example, the controller may be configured to receive "on" and "off" command signals from the UI and, in response, may control the heater so as to be in a corresponding on or off state. Further, the controller may be configured to receive a command for switching the device from the locked operating mode to the unlocked operating mode via user input means and, in response indicate, through the output means, that the unlocked operating mode is disabled based on detecting an occurrence of a predetermined event or upon receiving a predetermined user input.

The controller may be configured to send output signals to a component of the UI. The UI may be configured to convey information to a user, via an output means, in response to such output signals (received from the controller). For example, where the device comprises one or more LEDs, the LEDs may be operatively connected to the controller. Hence, the controller may be configured to control the illumination of the LEDs (e.g., in response to an output signal). For example, the controller may be configured to control the illumination of the LEDs according to (e.g., an on or off) state of the heater. In another example, the controller may be configured to control the illumination of the LEDs indicating the device being switched to unlocked operating mode. Further, the controller may be configured to indicate the device has switched from the locked operating mode to the unlocked operating mode through other output means such as haptic sensor and audio sensor etc.

Where the device comprises a sensor (e.g., a puff/airflow sensor), the controller may be operatively connected to the sensor. The controller may be configured to receive a signal from the sensor (e.g., indicative of a condition of the device and/or engaged aerosol-forming article). The controller may be configured to control the heater, or an aspect of the output means, based on the signal from the sensor.

The device may comprise a wireless interface configured to communicate wirelessly (e.g., via Bluetooth (e.g., a Bluetooth low-energy connection) or Wi-Fi) with an external device. Similarly, the input connection may be configured for wired connection to an external device so as to provide communication between the device and the external device.

The external device may be a mobile device. For example, the external device may be a smart phone, tablet, smart watch, or smart car. An application (e.g., app) may be installed on the external device (e.g., mobile device). The application may facilitate communication between the device and the external device via the wired or wireless connection.

The wireless or wired interface may be configured to transfer signals between the external device and the controller of the device. In this respect, the controller may control an aspect of the device in response to a signal received from an external device. Alternatively or additionally, an external device may respond to a signal received from the device (e.g., from the controller of the device).

In a second aspect of the twelfth mode, there is provided a system (e.g., a smoking substitute system) comprising a device according to the first aspect and an aerosol-forming article. The aerosol-forming article may comprise an aerosol-forming substrate at an upstream end of the aerosol-forming article. The article may be in the form of a smoking substitute article, e.g., heated tobacco (HT) consumable (also known as a heat-not-burn (HNB) consumable).

As used herein, the terms "upstream" and "downstream" are intended to refer to the flow direction of the vapor/aerosol, i.e., with the downstream end of the article/consumable being the mouth end or outlet where the aerosol exits the consumable for inhalation by the user. The upstream end of the article/consumable is the opposing end to the downstream end.

The aerosol-forming substrate is capable of being heated to release at least one volatile compound that can form an aerosol. The aerosol-forming substrate may be located at the upstream end of the article/consumable.

In order to generate an aerosol, the aerosol-forming substrate comprises at least one volatile compound that is intended to be vaporized/aerosolized and that may provide the user with a recreational and/or medicinal effect when inhaled. Suitable chemical and/or physiologically active volatile compounds include the group consisting of nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius*, *Arctostaphylos uva-ursi* (Bearberry), *Argemone mexicana*, *Arnica*, *Artemisia vulgaris*, Yellow Tees, *Galea zacatechichi*, *Canavalia maritima* (Baybean), *Cecropia mexicana* (Guamura), *Cestrum nocturnum*, *Cynoglossum virginianum* (wild comfrey), *Cytisus scoparius*, Damiana, *Entada rheedii*, *Eschscholzia californica* (California Poppy), *Fittonia albivenis*, *Hippobroma longiflora*, *Humulus japonica* (Japanese Hops), *Humulus lupulus* (Hops), *Lactuca virosa* (Lettuce Opium), *Laggera alata*, *Leonotis leonurus*, *Leonurus cardiaca* (Motherwort), *Leonurus sibiricus* (Honeyweed), *Lobelia cardinalis*, *Lobelia inflata* (Indian-tobacco), *Lobelia siphilitica*, *Nepeta cataria* (Catnip), *Nicotiana* species (Tobacco), *Nymphaea alba* (White Lily), *Nymphaea caerulea* (Blue Lily), Opium poppy, *Passiflora incamata* (Passionflower), *Pedicularis densiflora* (Indian Warrior), *Pedicularis groenlandica* (Elephant's Head), *Salvia divinorum*, *Salvia dorrii* (Tobacco Sage), *Salvia* species (Sage), *Scutellaria galericulata*, *Scutellaria lateriflora*, *Scutellaria nana*, *Scutellaria* species (Skullcap), *Sida acuta* (Wireweed), *Sida rhombifolia*, *Silene capensis*, *Syzygium aromaticum* (Clove), *Tagetes lucida* (Mexican Tarragon), *Tarchonanthus camphoratus*, *Tumera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above-mentioned tobaccos.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, and aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the article/consumable may comprise an aerosol-cooling element which is adapted to cool the aerosol generated from the aerosol-forming substrate (by heat exchange) before being inhaled by the user.

The article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

According to a third aspect of the twelfth mode, there is provided a method of using the system according to the second aspect, the method comprising inserting the aerosol-forming article into the device; and heating the article using the heater of the device.

In some embodiments the method may comprise inserting the article into a cavity within a body of the device and penetrating the article with the heating element of the device upon insertion of the article.

According to a fourth aspect of the twelfth mode, there is provided a method of switching a heat-not-burn device from locked operating mode to unlocked operating mode, comprising: detecting an occurrence of a predetermined event and/or receiving a predetermined user input, switching a heat-not-burn device from locked operating mode to unlocked operating mode, wherein a heater of the heat-not-burn device is configured to be disabled during said locked operating mode and enabled during said unlocked operating mode.

Optionally, said receiving of predetermined user input comprises receiving a predetermined sequence of user presses at a user interface of the device and/or detecting a predetermined movement of the device at a motion sensor of the device.

Optionally, said detecting of an occurrence of the predetermined event comprises detecting one or more of: i) an electrical connection being established between the device and an external device, ii) a movement in a cap of the device and iii) a consumable being engaged with the device.

Optionally, the method further comprises, during the unlocked operating mode, receiving a further user input at the device to enable the heater, and wherein the predetermined user input is different from the further user input.

Optionally, the method further comprises switching from the unlocked operating mode to the locked operating mode upon receiving a second predetermined user input, the second predetermined user input being a second predetermined sequence of user presses at a user interface of the device, wherein the predetermined user input is different to the second predetermined user input.

According to a fifth aspect of the twelfth mode, there is provided a method of manufacturing a device, wherein the method includes putting the device in a locked operating mode; and packaging the device. By placing the device into a packaging in a locked operating mode, accidental or unwarranted activation of the device may be avoided during the storage and/or shipping of the device.

Optionally, said packaging comprises packaging the device in a product packaging, wherein a user interface of the device is configured to be assessable when the device is received in the product packaging.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Thirteenth Mode: A Smoking Substitute System Comprising a Smoking Substitute Device and a Rechargeable Power Source Configured to Charge the Smoking Substitute Device and to be Charged by a Power Source.

At its most general, the thirteenth mode relates to a smoking substitute system comprising a smoking substitute device and a rechargeable power source configured to charge the smoking substitute device and to be charged by a power source. More specifically, the device and the power source may advantageously be configured to communicate with each other to improve the reporting of their respective status to a user, and thereby it may improve the user's interaction with the device.

According to a first aspect of the thirteenth mode, there is provided a smoking substitute device comprising: a device visual output; a rechargeable battery configured to be charged using a rechargeable power source; and a device controller configured to communicate with the rechargeable power source and thereby controlling the device visual output to indicate a battery charge state and/or a charging status of the rechargeable battery.

More specifically, the rechargeable battery may have a smaller capacity than a rechargeable power source battery of the rechargeable power source. The rechargeable battery may be configured to cooperate with the rechargeable power source during the charging process. For example, the rechargeable battery may be configured received in a cavity of the rechargeable power source during the charging process. The rechargeable power source may be a case or a dock configured to receive a part of the device.

Battery charge state generally refers to the amount of energy stored or remaining in a battery, whereas charging status refers to whether the battery is being charged.

The rechargeable power source may be an external power source for the device, and it may not form a part of the device. The rechargeable power source, in turn, is chargeable by a power supply.

By providing a smoking substitute device of claim 1, the device may comprise means to display battery charge status and/or charging status of the device, with respect to power received from a rechargeable power source. For example, the device controller may communicate information, such as a status of the device visual output with the rechargeable power source. Advantageously, the device visual output may be able to cooperate with a power source visual output so as to provide a coordinated indication of a battery charge state and/or a charging status of the rechargeable battery, as well as a rechargeable power source battery of the power source. This may advantageously allow the user to better understand the charging process, and thereby it may significantly improve the interaction between the user and the system.

Optional features will now be set out. These are applicable singly or in any combination with any aspect.

Optionally, the device visual output may be located on an outer surface of body of the smoking substitute device. Optionally, the smoking substitute device is configured to be received in a cavity of the rechargeable power source, and wherein the device visual output is configured to be visible when the rechargeable battery is being charged by the rechargeable power source. Advantageously, such arrangement may allow both the device visual display and a power source visual display to remain visible for a user when the device is received in the cavity, when the device is being charged.

Optionally, the device visual output comprises a plurality of device lighting elements, wherein said plurality of device lighting elements are configured to display a light sequence for indicating the battery charge state and/or the charging status of the rechargeable battery. The plurality of device lighting elements may be arranged adjacent each other on the device. The plurality of device light elements may be arranged in a straight line or they may be arranged to form a pattern, e.g., circular pattern or any other suitable pattern. The plurality of device light elements may be arranged circumferentially around the surface of the device and spaced from each other. Together, the plurality of lighting elements may display a light sequence. Said light sequence may comprises one or more of sequential activation or deactivation of one or more of the lighting elements, or simultaneous activation or deactivation of one or more of the lighting elements. The plurality of lighting elements may each be dimmable such that when they are activated, their luminous flex or output intensity may be controlled individually to provide said light sequence.

Optionally, the plurality of device lighting elements comprises one of more of light emitting diode (LED), incandescent lamp, halogen lamp and fluoresce lamp. Preferably, the plurality of device lighting elements comprises LEDs.

Optionally, the device visual output comprises a device display screen; wherein the device display screen is configured to provide visual display for indicating the battery charge state and/or the charging status of the rechargeable battery. The device display screen may comprise an LED display or a liquid crystal display. For example, the device display screen may display the battery charge state and/or the charging status of the rechargeable battery with one or more of digits, characters, and graphics display.

The device may comprise an elongate body. An end of the elongate body may be configured for engagement with an aerosol-forming article. For example, the body may be configured for engagement with a heated tobacco (HT) consumable (or heat-not-burn (HNB) consumable) or an e-cigarette consumable. The terms "heated tobacco" and "heat-not-burn" are used interchangeably herein to describe a consumable that is of the type that is heated rather than combusted (or are used interchangeably to describe a device for use with such a consumable). The device may comprise a cavity that is configured for receipt of at least a portion of the consumable (i.e., for engagement with the consumable). The aerosol-forming article may be of the type that comprises an aerosol former (e.g., carried by an aerosol-forming substrate).

The device may comprise a heater for heating the aerosol-forming article. The heater may comprise a heating element, which may be in the form of a rod that extends from the body of the device. The heating element may extend from the end of the body that is configured for engagement with the aerosol-forming article.

The heater (and thus the heating element) may be rigidly mounted to the body. The heating element may be elongate so as to define a longitudinal axis and may, for example, have a transverse profile (i.e., transverse to a longitudinal axis of the heating element) that is substantially circular (i.e., the heating element may be generally cylindrical). Alternatively, the heating element may have a transverse profile that is rectangular (i.e., the heater may be a "blade heater"). The heating element may alternatively be in the shape of a tube (i.e., the heater may be a "tube heater"). The heating element may take other forms (e.g., the heating element may have an elliptical transverse profile). The shape and/or size (e.g., diameter) of the transverse profile of the heating element may be generally consistent for the entire length (or substantially the entire length) of the heating element.

The heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 μm and 220 μm, e.g., between 170 μm and 190 μm, e.g., around 180 μm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 μm.

The heating element may be located in the cavity (of the device), and may extend (e.g., along a longitudinal axis) from an internal base of the cavity towards an opening of the cavity. The length of the heating element (i.e., along the longitudinal axis of the heater) may be less than the depth of the cavity. Hence, the heating element may extend for only a portion of the length of the cavity. That is, the heating element may not extend through (or beyond) the opening of the cavity.

The heating element may be configured for insertion into an aerosol-forming article (e.g., a HT consumable) when an aerosol-forming article is received in the cavity. In that respect, a distal end (i.e., distal from a base of the heating element where it is mounted to the device) of the heating element may comprise a tapered portion, which may facilitate insertion of the heating element into the aerosol-forming article. The heating element may fully penetrate an aerosol-forming article when the aerosol-forming article is received in the cavity. That is, the entire length, or substantially the entire length, of the heating element may be received in the aerosol-forming article.

The heating element may have a length that is less than, or substantially the same as, an axial length of an aerosol-forming substrate forming part of an aerosol-forming article (e.g., a HT consumable). Thus, when such an aerosol-forming article is engaged with the device, the heating element may only penetrate the aerosol-forming substrate, rather than other components of the aerosol-forming article. The heating element may penetrate the aerosol-forming substrate for substantially the entire axial length of the aerosol forming-substrate of the aerosol-forming article. Thus, heat may be transferred from (e.g., an outer circumferential surface of) the heating element to the surrounding aerosol-forming substrate, when penetrated by the heating element. That is, heat may be transferred radially outwardly (in the case of a cylindrical heating element) or, e.g., radially inwardly (in the case of a tube heater).

Where the heater is a tube heater, the heating element of the tube heater may surround at least a portion of the cavity. When the portion of the aerosol-forming article is received in the cavity, the heating element may surround a portion of the aerosol-forming article (i.e., so as to heat that portion of the aerosol-forming article). In particular, the heating element may surround an aerosol forming substrate of the aerosol-forming article. That is, when an aerosol-forming article is engaged with the device, the aerosol forming substrate of the aerosol-forming article may be located adjacent an inner surface of the (tubular) heating element. When the heating element is activated, heat may be transferred radially inwardly from the inner surface of the heating element to heat the aerosol forming substrate.

The cavity may comprise a (e.g., circumferential) wall (or walls) and the (tubular) heating element may extend around at least a portion of the wall(s). In this way, the wall may be located between the inner surface of the heating element and an outer surface of the aerosol-forming article. The wall (or walls) of the cavity may be formed from a thermally conductive material (e.g., a metal) to allow heat conduction from the heating element to the aerosol-forming article. Thus, heat may be conducted from the heating element, through the cavity wall (or walls), to the aerosol-forming substrate of an aerosol-forming article received in the cavity.

In some embodiments the heater may form part of an aerosol-forming article for use with the device. In such cases the device may not comprise a heater. Rather, the aerosol-forming article may comprise a heater. Such arrangements may, for example, be suited to e-cigarette systems in which the aerosol-forming article comprises a tank containing an aerosol former (e.g., in liquid form). In such embodiments, the device may comprise means for connecting the device the heater of an aerosol-forming article engaged with the device. For example, the device may comprise one or more device connectors for (e.g., electrically) connecting the device to a corresponding heater connector of the aerosol-forming article. The connectors (i.e., of both the device and the aerosol-forming article) may be in the form of electrically conductive elements (e.g., plates) that contact when the aerosol-forming article is engaged with the device.

In some embodiments the device may comprise a cap disposed at the end of the body that is configured for engagement with an aerosol-forming article. Where the device comprises a heater having a heating element, the cap may at least partially enclose the heating element. The cap may be moveable between an open position in which access is provided to the heating element, and a closed position in which the cap at least partially encloses the heating element. The cap may be slidably engaged with the body of the device and may be slidable between the open and closed positions.

The cap may define at least a portion of the cavity of the device. That is, the cavity may be fully defined by the cap, or each of the cap and body may define a portion of the cavity. Where the cap fully defines the cavity, the cap may comprise an aperture for receipt of the heating element into the cavity (when the cap is in the closed position). The cap may comprise an opening to the cavity. The opening may be configured for receipt of at least a portion of an aerosol-forming article. That is, an aerosol-forming article may be inserted through the opening and into the cavity (so as to be engaged with the device).

The cap may be configured such that when an aerosol-forming article is engaged with the device (e.g., received in the cavity), only a portion of the aerosol-forming article is received in the cavity. That is, a portion of the aerosol-forming article (not received in the cavity) may protrude from (i.e., extend beyond) the opening. This (protruding) portion of the aerosol-forming article may be a terminal (e.g., mouth) end of the aerosol-forming article, which may be received in a user's mouth for the purpose of inhaling aerosol formed by the device.

The device may comprise a power source or may be connectable to a power source (e.g., a power source separate to the device). The power source may be electrically connectable to the heater. In that respect, altering (e.g., toggling) the electrical connection of the power source to the heater may affect a state of the heater. For example, toggling the electrical connection of the power source to the heater may toggle the heater between an on state and an off state. The power source may be a power store. For example, the power source may be a battery or rechargeable battery (e.g., a lithium-ion battery).

The device may comprise an input connection (e.g., a USB port, Micro USB port, USB-C port, etc.). The input connection may be configured for connection to an external source of electrical power, such as a mains electrical supply outlet. The input connection may, in some cases, be used as a substitute for an internal power source (e.g., battery or rechargeable battery). That is, the input connection may be electrically connectable to the heater (for providing power to the heater). Hence, in some forms, the input connection may form at least part of the power source of the device.

Where the power source comprises a rechargeable battery, the input connection may be used to charge and recharge the power source.

The device may comprise a user interface (UI). In some embodiments the UI may include input means to receive operative commands from the user. The input means of the UI may allow the user to control at least one aspect of the operation of the device. In some embodiments the input means may comprise a power button to switch the device between an on state and an off state.

In some embodiments the UI may additionally or alternatively comprise output means to convey information to the user. In some embodiments the output means may comprise a light to indicate a condition of the device (and/or the aerosol-forming article) to the user. The condition of the device (and/or aerosol-forming article) indicated to the user may comprise a condition indicative of the operation of the heater. For example, the condition may comprise whether the heater is in an off state or an on state. In some embodiments, the UI unit may comprise at least one of a button, a display, a touchscreen, a switch, a light, and the like. For example, the output means may comprise one or more (e.g., two, three, four, etc.) light-emitting diodes ("LEDs") that may be located on the body of the device.

The device may further comprise a puff sensor (e.g., airflow sensor), which form part of the input means of the UI. The puff sensor may be configured to detect a user drawing on an end (i.e., a terminal (mouth) end) of the aerosol-forming article. The puff sensor may, for example, be a pressure sensor or a microphone. The puff sensor may be configured to produce a signal indicative of a puff state. The signal may be indicative of the user drawing (an aerosol from the aerosol-forming article) such that it is, e.g., in the form of a binary signal. Alternatively or additionally, the signal may be indicative of a characteristic of the draw (e.g., a flow rate of the draw, length of time of the draw, etc.).

The device may comprise a device controller or may be connectable to a controller that may be configured to control at least one function of the device. The device controller may comprise a microcontroller that may, e.g., be mounted on a printed circuit board (PCB). The device controller may also comprise a memory, e.g., non-volatile memory. The memory may include instructions, which, when implemented, may cause the device controller to perform certain tasks or steps of a method. Where the device comprises an input connection, the device controller may be connected to the input connection.

The device controller may be configured to control the operation of the heater (and, e.g., the heating element). Thus, the device controller may be configured to control vaporization of an aerosol forming part of an aerosol-forming article engaged with the device. The device controller may be configured to control the voltage applied by power source to the heater. For example, the device controller may be configured to toggle between applying a full output voltage (of the power source) to the heater and applying no voltage to the heater. Alternatively or additionally, the control unit may implement a more complex heater control protocol.

The device may further comprise a voltage regulator to regulate the output voltage supplied by the power source to form a regulated voltage. The regulated voltage may subsequently be applied to the heater.

In some embodiments, where the device comprises a UI, the device controller may be operatively connected to one or more components of the UI. The device controller may be configured to receive command signals from an input means of the UI. The device controller may be configured to control the heater in response to the command signals. For example, the device controller may be configured to receive "on" and "off" command signals from the UI and, in response, may control the heater so as to be in a corresponding on or off state.

The device controller may be configured to send output signals to a component of the UI. The UI may be configured to convey information to a user, via an output means, in response to such output signals (received from the controller). For example, where the device comprises one or more LEDs, the LEDs may be operatively connected to the device controller. Hence, the controller may be configured to control the illumination of the LEDs (e.g., in response to an output signal). For example, the device controller may be configured to control the illumination of the LEDs according to (e.g., an on or off) state of the heater.

Where the device comprises a sensor (e.g., a puff/airflow sensor), the device controller may be operatively connected to the sensor. The device controller may be configured to receive a signal from the sensor (e.g., indicative of a condition of the device and/or engaged aerosol-forming article). The device controller may be configured to control the heater, or an aspect of the output means, based on the signal from the sensor.

In some embodiments, the device controller may be configured to communicate with the rechargeable power source. Based on the communication, the device controller may be configured to control the device visual output to indicate a battery charge state and/or a charging status of the rechargeable battery of the device. The device may therefore be able to indicate the battery charge state and/or the charging status of the device based on power received from the rechargeable power source.

The device may comprise a wireless interface configured to communicate wirelessly (e.g., via Bluetooth (e.g., a Bluetooth low-energy connection) or Wi-Fi) with an external device. Similarly, the input connection may be configured for wired connection to an external device so as to provide communication between the device and the external device.

The external device may be a mobile device. For example, the external device may be a smart phone, tablet, smart watch, or smart car. An application (e.g., app) may be installed on the external device (e.g., mobile device). The application may facilitate communication between the device and the external device via the wired or wireless connection.

The wireless or wired interface may be configured to transfer signals between the external device and the device controller of the device. In this respect, the device controller may control an aspect of the device in response to a signal received from an external device. Alternatively or additionally, an external device may respond to a signal received from the device (e.g., from the controller of the device).

Further, a second aspect of the thirteenth mode, there is provided a rechargeable power source comprising a power source visual output, a rechargeable power source battery and a power source controller. The rechargeable power source battery may be configured to charge a smoking substitute device and to be charged by a power supply. The power source controller may be configured to communicate with the smoking substitute device. Based on the communication, the power source controller may be configured to control the power source visual output to indicate a battery charge state and/or a discharging status of the rechargeable power source battery.

For example, the power source controller may communicate information, such as a status of the power source visual output with the smoking substitute device. Advantageously, the power source visual output may be able to cooperate with a device visual output so as to provide a coordinated indication of a battery charge state and/or a charging status of the rechargeable battery of the device, as well as a rechargeable power source battery of the power source. This may allow the user to better understand the charging process, and thereby it may significantly improve the interaction between the user and the system.

Optionally, the power source visual output comprises a plurality of power source lighting elements, wherein said plurality of power source lighting elements are configured to display a light sequence for indicating the battery charge state and/or the charging/discharging status of the rechargeable power source battery. Similar to the plurality of the device lighting elements, the plurality of power source lighting elements may be arranged adjacent each other on the power source. The plurality of power source light elements may be arranged in a straight line or they may be arranged to form a pattern, e.g., circular pattern or any other suitable pattern. The plurality of power source light elements may be arranged circumferentially around a surface of power source and spaced from each other. Together, the plurality of power source lighting elements may display a light sequence. Said light sequence may comprises one or more of sequential activation or deactivation of one or more of the power source lighting elements, or simultaneous activation or deactivation of one or more of the power source lighting elements. The plurality of power source lighting elements may each be dimmable such that when they are activated, their luminous flex may be controlled individually to provide said light sequence.

Optionally, the plurality of power source lighting elements comprises one of more of light emitting diode (LED), incandescent lamp, halogen lamp and fluoresce lamp. Preferably, the plurality of power source lighting elements comprises LEDs.

Optionally, the power source visual output comprises a power source display screen; wherein the power source display screen is configured to provide visual display for indicating the battery charge state and/or the charging status of the rechargeable power source battery. The power source display screen may comprise an LED display or a liquid crystal display. For example, the power source display screen may display the battery charge state and/or the charging/discharging status of the rechargeable power source battery with one or more of digits, characters, and graphics display.

In a third aspect of the thirteenth mode, there is provided a system (e.g., a smoking substitute system) comprising a smoking device according to the first aspect and a rechargeable power source according to the second aspect.

Optionally, the device visual output and the power source visual output are configured to cooperatively activate and/or deactivate when indicating battery charge state and/or charging or charging/discharging status of respective rechargeable battery and rechargeable power source battery. For example, based on the communication between the device controller and the power source controller, the device visual output and the power source visual output may provide coordinated display during said indication.

Optionally, said cooperative activation of the device visual output and the power source visual output comprises alternating the activation of the device visual output and the power source visual output when indicating battery charge state and/or charging or charging/discharging status of respective rechargeable battery and rechargeable power source battery. For example, the device visual output and the power source visual output may take turn to provide indication, e.g., in the form of a light sequence displayed on the visual output of each of the respective devices.

Optionally, said cooperative activation comprises coordinated activation of the device visual output and the power source visual output when indicating battery charge state and/or charging or charging/discharging status of respective rechargeable battery and rechargeable power source battery. For example, the device visual output and the power source visual output may provide indication simultaneously to display a coordinated light sequence on both of the device visual output and the power source visual output.

Optionally, wherein when the rechargeable power source is in electrical communication with both the power supply and the device, the rechargeable power source is configured to pass an electric current from the power supply to the device, so as to prioritize charging of the rechargeable battery over the rechargeable power source battery. For example, the rechargeable power source battery may only be charged by the power supply once the rechargeable battery has been charged. Advantageously, such arrangement may allow the device to be sufficiently charged at the earliest opportunity.

Optionally, the system may comprise an aerosol-forming article. The aerosol-forming article may comprise an aerosol-forming substrate at an upstream end of the aerosol-forming article. The article may be in the form of a smoking substitute article, e.g., heated tobacco (HT) consumable (also known as a heat-not-burn (HNB) consumable).

As used herein, the terms "upstream" and "downstream" are intended to refer to the flow direction of the vapor/aerosol, i.e., with the downstream end of the article/consumable being the mouth end or outlet where the aerosol exits the consumable for inhalation by the user. The upstream end of the article/consumable is the opposing end to the downstream end.

The aerosol-forming substrate is capable of being heated to release at least one volatile compound that can form an aerosol. The aerosol-forming substrate may be located at the upstream end of the article/consumable.

In order to generate an aerosol, the aerosol-forming substrate comprises at least one volatile compound that is intended to be vaporized/aerosolized and that may provide the user with a recreational and/or medicinal effect when inhaled. Suitable chemical and/or physiologically active volatile compounds include the group consisting of nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius, Arctostaphylos uva-ursi* (Bearberry), *Argemone mexicana, Arnica, Artemisia vulgaris,* Yellow Tees, *Galea zacatechichi, Canavalia maritima* (Baybean), *Cecropia mexicana* (Guamura), *Cestrum nocturnum, Cynoglossum virginianum* (wild comfrey), *Cytisus scoparius,* Damiana, *Entada rheedii, Eschscholzia californica* (California Poppy), *Fittonia albivenis, Hippobroma longiflora, Humulus japonica* (Japanese Hops), *Humulus lupulus* (Hops), *Lactuca virosa* (Lettuce Opium), *Laggera alata, Leonotis leonurus, Leonurus cardiaca* (Motherwort), *Leonurus sibiricus* (Honeyweed), *Lobelia cardinalis, Lobelia inflata* (Indian-tobacco), *Lobelia siphilitica, Nepeta cataria* (Catnip), *Nicotiana* species (Tobacco), *Nymphaea alba* (White Lily), *Nymphaea caerulea* (Blue Lily), Opium poppy, *Passiflora incamata* (Passionflower), *Pedicularis densiflora* (Indian Warrior), *Pedicularis groenlandica* (Elephant's Head), *Salvia divinorum, Salvia dorrii* (Tobacco Sage), *Salvia* species (Sage), *Scutellaria galericulata, Scutellaria lateriflora, Scutellaria nana, Scutellaria* species (Skullcap), *Sida acuta* (Wireweed), *Sida rhombifolia, Silene capensis, Syzygium aromaticum* (Clove), *Tagetes lucida* (Mexican Tarragon), *Tarchonanthus camphoratus, Turnera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above-mentioned tobaccos.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, and aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the article/consumable may comprise an aerosol-cooling element which is adapted to cool the aerosol generated from the aerosol-forming substrate (by heat exchange) before being inhaled by the user.

The article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

In some embodiments the system may be in the form of an e-cigarette system (i.e., rather than a heated tobacco system as described above). In such a system, the consumable may be in the form of an e-cigarette consumable. The e-cigarette system may be configured such that the consumable can be received and retained in the cavity of the device (i.e., so as to be engaged with the device). The consumable may be retained by way of, e.g., an interference fit, screwing one onto (or onto) the other, a bayonet fitting, or by way of a snap engagement mechanism.

The consumable may comprise a tank, which may define a reservoir for the storage of an aerosol former. The aerosol former may be in the form of an e-liquid (stored in the reservoir).

The consumable may be a "single-use" consumable. That is, upon exhausting the e-liquid in the tank, the intention may be that the user disposes of the entire consumable. Alternatively, the e-liquid may be the only part of the system that is truly "single-use". For example, the tank may be refillable with e-liquid or another component of the system (internal to the device or external to the device, e.g., a refillable cartomizer) may define a reservoir for the e-liquid.

As set forth above, the consumable may comprise a heater (i.e., instead of the heater forming part of the device) configured to heat and vaporize the e-liquid. The consumable may comprise a porous wick that conveys e-liquid from the tank to a heating element of the heater. The heating element may be a heating filament that is wound (e.g., helically) around at least a portion of the porous wick, such that when the heating element is heated (e.g., by the action of electrical current passing through the heating element), heat may be transferred from the heating element to the e-liquid conveyed by the wick. This transfer of heat may vaporize the e-liquid and the resultant vapor may be entrained in an airflow passing through the consumable.

The consumable may further comprise one or more heater connectors for connecting the heater (of the consumable) to the device. The heater connectors may be in the form of electrically conductive element or contacts (e.g., metal plates) and may be disposed on an in-use device-facing surface of the consumable. The heater connectors may be electrically connected to the heater of the consumable, such that electricity supplied via the heater connectors may pass to the heater. In other words, a voltage applied across the heater connectors may generally correspond to a voltage applied across the heating element of the heater.

The heater connectors may be arranged such that they contact corresponding device connectors of the device when the consumable is engaged with the device. The device connectors may be connected (e.g., electrically) to a power source (e.g., battery) of the device. Thus, electricity may be supplied from the power source to the heating element, via in-contact heater and device connectors. In this way, the heater forming part of the consumable may operate (and interact with, e.g., a controller) as otherwise described above with respect to a heater forming part of the device.

According to a fourth aspect of the thirteenth mode, there is provided a method of using the system according to the third aspect, the method comprising inserting the aerosol-forming article into the device; and heating the article using the heater of the device.

In some embodiments the method may comprise inserting the article into a cavity within a body of the device and penetrating the article with the heating element of the device upon insertion of the article.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Fourteenth Mode: Detecting the Receipt of a Consumable in a Cavity of a Smoking Substitute Device.

At its most general, the fourteenth mode relates to detecting the receipt of a consumable in a cavity of a smoking substitute device.

According to a first aspect of the fourteenth mode, there is provided a smoking substitute device comprising a cavity for receiving a consumable and a sensor that is configured to detect the receipt of the consumable in the cavity.

The sensor detects the insertion of a consumable into the cavity of the device. By providing a sensor which detects the receipt of a consumable in the cavity, the device has the ability to perform useful downstream functionality or provide useful information to the user based on this detection. For example, certain functions of the device may be disabled until insertion of a consumable is detected, improving safety, or a visual or audible output may be generated upon receipt of the consumable, improving the user experience. A more versatile device is provided which reacts intelligently to different scenarios.

Optional features will now be set out. These are applicable singly or in any combination with any aspect.

Optionally, the sensor is configured to detect the receipt of the consumable in the cavity based on determination of differential pressure generated during the insertion of the consumable in the cavity.

In some embodiments, the sensor is coupled with a controller. The controller may be adapted to receive an output from the sensor and perform control over device functions based on the output.

In some embodiments, the sensor comprises a pressure sensor coupled with a controller. The pressure sensor may be configured to determine differential pressure generated during the insertion of the consumable in the cavity.

In some embodiments, the sensor is configured to detect the receipt of the consumable in the cavity based on sound signals detected during the insertion of the consumable in the cavity.

Optionally, the device comprises a microphone configured to detect sound signals generated during the insertion of the consumable in the cavity.

In some embodiments, the sensor is further configured to detect inhalation through the consumable by the user. In this way, a versatile device is provided which is able to detect both the insertion of a consumable and the drawing on that consumable by the user during smoking. This can improve the user experience further by, e.g., providing feedback based on the detection of inhalation, such as visual or audible feedback.

Optionally, the device comprises a puff sensor to detect the inhalation.

In some embodiments, the sensor is configured to detect a first pressure differential created during insertion of the consumable into the cavity and a second pressure differential created due to inhalation through the consumable by the user, wherein the first pressure differential is different from the second pressure differential. In this way, the same sensor is able to distinguish between the insertion of a consumable into the device, and the drawing on that consumable by the user during smoking, based on the differing pressure differential detected. The pressure differential detected upon consumable insertion will have the opposite sense (e.g., a positive pressure difference) to the pressure differential detected upon inhalation (e.g., a negative pressure difference). The sensor can detect each, such that the device is able to distinguish the two scenarios and respond accordingly, improving the user experience.

Optionally, the first pressure differential and the second pressure differential are of opposite polarity.

In some embodiments, the sensor is configured to detect the withdrawal of the consumable from the cavity based on determination of a third pressure differential created due to withdrawal.

Optionally, the sensor communicates with a controller configured to activate a function of the device upon detecting the receipt of the consumable in the cavity. In some embodiments, the controller is configured to activate a heater upon detecting the receipt of the consumable in the cavity, e.g., to initiate a smoking cycle.

In some embodiments, the controller is configured to perform control action selected from one or more of (a) switching from child safety mode (CSM) to normal mode, (b) increasing power of the heater, and (c) indicating battery charge status, in response to detecting the receipt of the consumable in the cavity. In this way, the device provides an intelligent response to the insertion of a consumable into the cavity, improving functionality and user experience. Child safety mode (CSM) may be a mode in which certain functions of the device such as the heater are disabled and can only operate when the device is switched to normal mode. Providing a device which remains in CSM until the insertion of a consumable into the cavity is detected increases safety, because the heater cannot be activated when the device is in transit, e.g., in a bag or pocket, and cannot be activated if a child is playing with the device with no consumable in place. A device which indicates battery status when the insertion of a consumable is detected provides an improved user experience, since the user is made aware of the battery status when using the device and can charge the device if necessary.

In some embodiments, the sensor is further configured to detect the ongoing presence of the consumable within the cavity. In this way, the sensor may detect first the receipt/insertion of the consumable in the cavity, followed by the ongoing presence of the consumable within the cavity. The device may then be configured to provide feedback, e.g., visual or audible feedback, indicating the ongoing presence of the consumable within the cavity. This provides a more intelligent device which further improves the user experience.

The device may comprise an elongate body. An end of the elongate body may be configured for engagement with an aerosol-forming article. For example, the body may be configured for engagement with a heated tobacco (HT) consumable (or heat-not-burn (HNB) consumable). The terms "heated tobacco" and "heat-not-burn" are used interchangeably herein to describe a consumable that is of the type that is heated rather than combusted (or are used interchangeably to describe a device for use with such a consumable). The device may comprise a cavity that is configured for receipt of at least a portion of the consumable (i.e., for engagement with the consumable). The aerosol-forming article may be of the type that comprises an aerosol former (e.g., carried by an aerosol-forming substrate).

The device may comprise a heater for heating the aerosol-forming article. The heater may comprise a heating element, which may be in the form of a rod that extends from the body of the device. The heating element may extend from the end of the body that is configured for engagement with the aerosol-forming article.

The heater (and thus the heating element) may be rigidly mounted to the body. The heating element may be elongate so as to define a longitudinal axis and may, for example, have a transverse profile (i.e., transverse to a longitudinal axis of the heating element) that is substantially circular (i.e., the heating element may be generally cylindrical). Alternatively, the heating element may have a transverse profile that is rectangular (i.e., the heater may be a "blade heater"). The heating element may alternatively be in the shape of a tube (i.e., the heater may be a "tube heater"). The heating element may take other forms (e.g., the heating element may have an elliptical transverse profile). The shape and/or size (e.g., diameter) of the transverse profile of the heating element may be generally consistent for the entire length (or substantially the entire length) of the heating element.

The heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 µm and 220 µm, e.g., between 170 µm and 190 µm, e.g., around 180 µm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 µm.

The heating element may be located in the cavity (of the device), and may extend (e.g., along a longitudinal axis) from an internal base of the cavity towards an opening of the cavity. The length of the heating element (i.e., along the longitudinal axis of the heater) may be less than the depth of the cavity. Hence, the heating element may extend for only a portion of the length of the cavity. That is, the heating element may not extend through (or beyond) the opening of the cavity.

The heating element may be configured for insertion into an aerosol-forming article (e.g., a HT consumable) when an aerosol-forming article is received in the cavity. In that respect, a distal end (i.e., distal from a base of the heating element where it is mounted to the device) of the heating element may comprise a tapered portion, which may facilitate insertion of the heating element into the aerosol-forming article. The heating element may fully penetrate an aerosol-forming article when the aerosol-forming article is received in the cavity. That is, the entire length, or substantially the entire length, of the heating element may be received in the aerosol-forming article.

The heating element may have a length that is less than, or substantially the same as, an axial length of an aerosol-forming substrate forming part of an aerosol-forming article (e.g., a HT consumable). Thus, when such an aerosol-forming article is engaged with the device, the heating element may only penetrate the aerosol-forming substrate, rather than other components of the aerosol-forming article. The heating element may penetrate the aerosol-forming substrate for substantially the entire axial length of the aerosol forming-substrate of the aerosol-forming article. Thus, heat may be transferred from (e.g., an outer circumferential surface of) the heating element to the surrounding aerosol-forming substrate, when penetrated by the heating element. That is, heat may be transferred radially outwardly (in the case of a cylindrical heating element) or, e.g., radially inwardly (in the case of a tube heater).

Where the heater is a tube heater, the heating element of the tube heater may surround at least a portion of the cavity. When the portion of the aerosol-forming article is received in the cavity, the heating element may surround a portion of the aerosol-forming article (i.e., so as to heat that portion of the aerosol-forming article). In particular, the heating element may surround an aerosol forming substrate of the aerosol-forming article. That is, when an aerosol-forming article is engaged with the device, the aerosol forming substrate of the aerosol-forming article may be located adjacent an inner surface of the (tubular) heating element. When the heating element is activated, heat may be transferred radially inwardly from the inner surface of the heating element to heat the aerosol forming substrate.

The cavity may comprise a (e.g., circumferential) wall (or walls) and the (tubular) heating element may extend around at least a portion of the wall(s). In this way, the wall may be located between the inner surface of the heating element and an outer surface of the aerosol-forming article. The wall (or walls) of the cavity may be formed from a thermally conductive material (e.g., a metal) to allow heat conduction from the heating element to the aerosol-forming article. Thus, heat may be conducted from the heating element, through the cavity wall (or walls), to the aerosol-forming substrate of an aerosol-forming article received in the cavity.

In some embodiments the device may comprise a cap disposed at the end of the body that is configured for engagement with an aerosol-forming article. Where the device comprises a heater having a heating element, the cap may at least partially enclose the heating element. The cap may be moveable between an open position in which access is provided to the heating element, and a closed position in which the cap at least partially encloses the heating element. The cap may be slidably engaged with the body of the device and may be slidable between the open and closed positions.

The cap may define at least a portion of the cavity of the device. That is, the cavity may be fully defined by the cap, or each of the cap and body may define a portion of the cavity. Where the cap fully defines the cavity, the cap may comprise an aperture for receipt of the heating element into the cavity (when the cap is in the closed position). The cap may comprise an opening to the cavity. The opening may be configured for receipt of at least a portion of an aerosol-forming article. That is, an aerosol-forming article may be inserted through the opening and into the cavity (so as to be engaged with the device).

The cap may be configured such that when an aerosol-forming article is engaged with the device (e.g., received in the cavity), only a portion of the aerosol-forming article is received in the cavity. That is, a portion of the aerosol-forming article (not received in the cavity) may protrude from (i.e., extend beyond) the opening. This (protruding) portion of the aerosol-forming article may be a terminal (e.g., mouth) end of the aerosol-forming article, which may be received in a user's mouth for the purpose of inhaling aerosol formed by the device.

The device may comprise a power source or may be connectable to a power source (e.g., a power source separate to the device). The power source may be electrically connectable to the heater. In that respect, altering (e.g., toggling) the electrical connection of the power source to the heater may affect a state of the heater. For example, toggling the electrical connection of the power source to the heater may toggle the heater between an on state and an off state. The power source may be a power store. For example, the power source may be a battery or rechargeable battery (e.g., a lithium-ion battery).

The device may comprise an input connection (e.g., a USB port, Micro USB port, USB-C port, etc.). The input connection may be configured for connection to an external source of electrical power, such as a mains electrical supply outlet. The input connection may, in some cases, be used as a substitute for an internal power source (e.g., battery or rechargeable battery). That is, the input connection may be electrically connectable to the heater (for providing power to the heater). Hence, in some forms, the input connection may form at least part of the power source of the device.

Where the power source comprises a rechargeable power source (such as a rechargeable battery), the input connection may be used to charge and recharge the power source.

The device may comprise a user interface (UI). In some embodiments the UI may include input means to receive operative commands from the user. The input means of the UI may allow the user to control at least one aspect of the operation of the device. In some embodiments the input means may comprise a power button to switch the device between an on state and an off state.

In some embodiments the UI may additionally or alternatively comprise output means to convey information to the user. In some embodiments the output means may comprise a light to indicate a condition of the device (and/or the aerosol-forming article) to the user. The condition of the device (and/or aerosol-forming article) indicated to the user may comprise a condition indicative of the operation of the heater. For example, the condition may comprise whether the heater is in an off state or an on state. In some embodiments, the UI unit may comprise at least one of a button, a display, a touchscreen, a switch, a light, and the like. For example, the output means may comprise one or more (e.g., two, three, four, etc.) light-emitting diodes ("LEDs") that may be located on the body of the device.

The device may further comprise a puff sensor (e.g., airflow sensor), which form part of the input means of the UI. The puff sensor may be configured to detect a user drawing on an end (i.e., a terminal (mouth) end) of the aerosol-forming article. The puff sensor may, for example, be a pressure sensor or a microphone. The puff sensor may be configured to produce a signal indicative of a puff state. The signal may be indicative of the user drawing (an aerosol from the aerosol-forming article) such that it is, e.g., in the form of a binary signal. Alternatively or additionally, the signal may be indicative of a characteristic of the draw (e.g., a flow rate of the draw, length of time of the draw, etc.).

The device may comprise a controller or may be connectable to a controller that may be configured to control at least one function of the device. The controller may comprise a microcontroller that may, e.g., be mounted on a printed circuit board (PCB). The controller may also comprise a memory, e.g., non-volatile memory. The memory may include instructions, which, when implemented, may cause the controller to perform certain tasks or steps of a method. Where the device comprises an input connection, the controller may be connected to the input connection.

The controller may be configured to control the operation of the heater (and, e.g., the heating element). Thus, the controller may be configured to control vaporization of an aerosol forming part of an aerosol-forming article engaged with the device. The controller may be configured to control the voltage applied by power source to the heater. For example, the controller may be configured to toggle between applying a full output voltage (of the power source) to the heater and applying no voltage to the heater. Alternatively or additionally, the control unit may implement a more complex heater control protocol.

The device may further comprise a voltage regulator to regulate the output voltage supplied by the power source to form a regulated voltage. The regulated voltage may subsequently be applied to the heater.

In some embodiments, where the device comprises a UI, the controller may be operatively connected to one or more components of the UI. The controller may be configured to receive command signals from an input means of the UI. The controller may be configured to control the heater in response to the command signals. For example, the controller may be configured to receive "on" and "off" command signals from the UI and, in response, may control the heater so as to be in a corresponding on or off state.

The controller may be configured to send output signals to a component of the UI. The UI may be configured to convey information to a user, via an output means, in response to such output signals (received from the controller). For example, where the device comprises one or more LEDs, the LEDs may be operatively connected to the controller. Hence, the controller may be configured to control the illumination of the LEDs (e.g., in response to an output signal). For example, the controller may be configured to control the illumination of the LEDs according to (e.g., an on or off) state of the heater.

Where the device comprises a sensor (e.g., a puff/airflow sensor), the controller may be operatively connected to the sensor. The controller may be configured to receive a signal from the sensor (e.g., indicative of a condition of the device and/or engaged aerosol-forming article). The controller may be configured to control the heater, or an aspect of the output means, based on the signal from the sensor.

In some embodiments, the controller may be configured to perform one or more control actions in response to the detection of (i) the receipt of consumable in the cavity of the device, and/or (ii) inhalation through the consumable by the user and differentiate between the insertion of consumable in the cavity and inhalation by the user. The device may therefore be able to operate the device more efficiently.

The device may comprise a wireless interface configured to communicate wirelessly (e.g., via Bluetooth (e.g., a Bluetooth low-energy connection) or Wi-Fi) with an external device. Similarly, the input connection may be configured for wired connection to an external device so as to provide communication between the device and the external device.

The external device may be a mobile device. For example, the external device may be a smart phone, tablet, smart watch, or smart car. An application (e.g., app) may be installed on the external device (e.g., mobile device). The application may facilitate communication between the device and the external device via the wired or wireless connection.

The wireless or wired interface may be configured to transfer signals between the external device and the controller of the device. In this respect, the controller may control an aspect of the device in response to a signal received from an external device. Alternatively or additionally, an external device may respond to a signal received from the device (e.g., from the controller of the device).

In a second aspect of the fourteenth mode, there is provided a system (e.g., a smoking substitute system) comprising a device according to the first aspect and an aerosol-forming article. The aerosol-forming article may comprise an aerosol-forming substrate at an upstream end of the aerosol-forming article. The article may be in the form of a smoking substitute article, e.g., heated tobacco (HT) consumable (also known as a heat-not-burn (HNB) consumable).

As used herein, the terms "upstream" and "downstream" are intended to refer to the flow direction of the vapor/aerosol, i.e., with the downstream end of the article/consumable being the mouth end or outlet where the aerosol exits the consumable for inhalation by the user. The upstream end of the article/consumable is the opposing end to the downstream end.

The aerosol-forming substrate is capable of being heated to release at least one volatile compound that can form an aerosol. The aerosol-forming substrate may be located at the upstream end of the article/consumable.

In order to generate an aerosol, the aerosol-forming substrate comprises at least one volatile compound that is intended to be vaporized/aerosolized and that may provide the user with a recreational and/or medicinal effect when inhaled. Suitable chemical and/or physiologically active volatile compounds include the group consisting of nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius, Arctostaphylos uva-ursi* (Bearberry), *Argemone mexicana, Amica, Artemisia vulgaris*, Yellow Tees, *Galea zacatechichi, Canavalia maritima* (Baybean), *Cecropia mexicana* (Guamura), *Cestrum noctumum, Cynoglossum virginianum* (wild comfrey), *Cytisus scoparius*, Damiana, *Entada rheedii, Eschscholzia californica* (California Poppy), *Fittonia albivenis, Hippobroma longiflora, Humulus japonica* (Japanese Hops), *Humulus lupulus* (Hops), *Lactuca virosa* (Lettuce Opium), *Laggera alata, Leonotis leonurus, Leonurus cardiaca* (Motherwort), *Leonurus sibiricus* (Honeyweed), *Lobelia cardinalis, Lobelia inflata* (Indian-tobacco), *Lobelia siphilitica, Nepeta cataria* (Catnip), *Nicotiana* species (Tobacco), *Nymphaea alba* (White Lily), *Nymphaea caerulea* (Blue Lily), Opium poppy, *Passiflora incamata* (Passionflower), *Pedicularis densiflora* (Indian Warrior), *Pedicularis groenlandica* (Elephant's Head), *Salvia divinorum, Salvia dorrii* (Tobacco Sage), *Salvia* species (Sage), *Scutellaria galericulata, Scutellaria lateriflora, Scutellaria nana, Scutellaria species* (Skullcap), *Sida acuta* (Wireweed), *Sida rhombifolia, Silene capensis, Syzygium aromaticum* (Clove), *Tagetes lucida* (Mexican Tarragon), *Tarchonanthus camphoratus, Tumera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above-mentioned tobaccos.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, and aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the article/consumable may comprise an aerosol-cooling element which is adapted to cool the aerosol generated from the aerosol-forming substrate (by heat exchange) before being inhaled by the user.

The article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

According to a third aspect of the fourteenth mode, there is provided a method of using the system according to the second aspect, the method comprising inserting the consumable into the device; and heating the article using the heater of the device.

In some embodiments the method may comprise inserting the article into a cavity within a body of the device and penetrating the article with the heating element of the device upon insertion of the article.

According to a fourth aspect of the fourteenth mode, there is provided a method for detecting the receipt of a consumable in a cavity of a smoking substitute device, comprising the detection of receipt of the consumable into the cavity by a sensor.

Optionally, the detection comprises detection of a differential pressure created due to insertion of the consumable into the cavity.

Advantageously, the method further comprises detecting an inhalation through the consumable by the user by determining change in pressure caused by the inhalation.

Conveniently, the method comprises detecting a first pressure difference created due to insertion of consumable into the cavity and a second pressure difference created due to inhalation through the consumable by the user, wherein the first pressure difference is different from the second pressure difference.

Optionally, the method comprises detecting withdrawal of the consumable from the cavity of the device based on determination of third pressure difference created due to withdrawal of the consumable from the cavity.

Conveniently, the method comprises activating a function of the device upon detecting the receipt of the consumable in the cavity.

Optionally, the method comprises performing control action selected from one or more of (a) switching from child safety mode (CSM) to normal mode, (b) increasing the power of heater, and (c) indicating battery charging status, in response to detecting the receipt of the consumable in the cavity.

The disclosure includes the combination of the aspects and preferred features described except where such a combination is clearly impermissible or expressly avoided.

The skilled person will appreciate that except where mutually exclusive, a feature or parameter described in Fifteenth Mode: A Heat-not-Burn Device Configured to Enter Either a Locked Operating Mode or a Standby Operating Mode Based on a User Selection.

At its most general, the fifteenth mode relates to a heat-not-burn device configured to enter either a locked operating mode or a standby operating mode based on a user selection. To activate the heater from the locked operating mode, it may require a more complicated set of user input than a single user press, and thereby it may be childproofed or be able to provide an extra layer of protection against inadvertent activation of the device. However at the same time, it may be inconvenient for the user to input such a complicated set of user input before each and every use of the device. Therefore advantageously, the fifteenth mode may allow the user to select between the locked operating mode and the standby operation mode according to the user's preferences.

According to a first aspect of the fifteenth mode, there is provided heat-not-burn device, comprising: a controller; a heater; and a user interface; wherein the controller is configured to, based on a user selection received at the user interface, selectively enter into a locked operating mode or a standby operating mode, whereby the heater is deactivated in both operating modes; and wherein the controller is further configured to activate the heater upon receiving, at the user interface: i) a first predetermined user input when the device is entered in the locked operating mode or ii) a second predetermined user input different to the first predetermined user input when the device is entered in the standby operating mode.

Generally, the heater may be deactivated when the device is entered into both the locked operating mode and the standby operating mode. However the controller, as well as other electronic components of the device such as the user interface may remain active or in operation when the device is entered into the locked operating mode and the standby operating mode.

For example, whilst the heater is deactivated in both of the operating modes, they may each require a specific predetermined user input to reactivate the heater. More specifically, the first predetermined user input may be a set of user input that involve a more complicated technique than the second predetermined user input so as to avoid activating the heater in an unwarranted manner, e.g., the user may have to unlock the device to activate the heater. The second predetermined user input on the other hand, may be a much simpler input technique such that the user may activate the heater in a convenient manner.

The heater may or may not activate upon receiving the first predetermined user input in the standby operating mode. For example, the heater may nevertheless activate upon receiving the first predetermined user input if the second predetermined user input (e.g., a single user press) forms part of the first predetermined user input (e.g., a plurality of user presses). Alternatively, the heater may not activate upon receiving the first predetermined user input, even if the second predetermined user input (e.g., a single user press within a given time frame) forms part of the first predetermined user input (e.g., a plurality of user presses within a given time frame).

The heater may not activate upon receiving the second predetermined user input, or any other user input other than the first predetermined user input, in the locked operating mode. Advantageously, this may prevent the heater from activating unless it receives the particular first predetermined user input.

Depending on the type of predetermined user input being applied, the user interface may comprise one or more of a user button, a keypad, a camera, or a fingerprint reader. This may allow the predetermined user input to be inputted in one or more possible ways.

Optional features will now be set out. These are applicable singly or in any combination with any aspect.

Optionally, said user selection comprises a predetermined user selection, and wherein the controller is configured to deactivate the heater upon detecting an occurrence of a predetermined event to enter the device into either the locked operating mode or the standby operating mode.

For example, the predetermined user selection may be a user selection received prior to activation of the heater and may be stored in a device memory. Therefore upon detecting an occurrence of the predetermined event, the controller may retrieve the predetermined user selection form the memory and upon deactivating the heater, the controller may enter the device into one of the locked or standby operating mode based on said predetermined user selection. Such predetermined user selection as stored in the memory may be overwritten once the user inputs a new user selection at the user interface. For example, the user may select the standby operating mode as default and as such the device may enter standby operating mode every time the heater has been deactivated. The user may occasionally select the locked operating mode and thereby overwrites the previous user selection, as desired.

Advantageously, such arrangement simplifies the operating of the device because the user does not require inputting the user selection with every use.

Optionally, the predetermined event comprises one or more of i) exhaustion or depletion of the consumable, ii) removal of the consumable from the device, iii) retraction of a cap of the device, and iv) elapse of a predetermined period of time since heater activation.

The predetermined event may correspond to the expiry of a user session or a smoking session. For example, the controller may be configured to deactivate the heater automatically. Advantageously, this may allow the device to avoid overheating the heater or consumable and thereby reduced the associated risk, as well as reducing energy drain at the battery.

The device may comprise one or more detectors for detecting said predetermined events. A microswitch or other means may be provided to detect relative movement between the cap, the consumable and the device and thereby signals the controller to deactivate the heater. A puff sensor may be provided to count the number of puffs taken and/or remaining before the consumable is exhausted. For example, the controller may be configured to deactivate the heater once the number of puffs taken reaches a predetermined number of puffs allowable for a consumable. The controller may determine the time elapsed since heater activation or the last time a puff was taken and may deactivate the heater once the time elapsed reaches a predetermined period of time.

Alternatively or additionally, upon receiving the user selection at the user interface, the controller is configured to deactivate the heater and enter the device into either the locked operating mode or the standby operating mode. More specifically, the user selection may be received when the heater is activated, e.g., during a user session. That is, the user selection received during a user session may deactivate the heater, e.g., the session may not terminate with the detection of an occurrence of a predetermined event as described but may terminate based on receiving the user selection. Alternatively, the user selection received during a user session may not deactivate the heater, e.g., the session may continue and only terminates with the detection of an occurrence of a predetermined event as described. Furthermore, the user selection received during heater activation may overwrite the predetermined user selection as stored in the device memory.

Optionally, the user selection comprises different selection inputs each for entering the device into a respective locked operation mode and a standby operation mode. For example, the selection input for entering into the locking operating mode may be holding a user press at the user interface for a given amount of time, e.g., at least two second, whereas the selection input for entering into the standby operating mode may be a plurality of shorter user press at the user interface each lasting less than a second, e.g., a number of taps on the user interface. The selection input may be inputted at the user interface before or during heater activation in a session.

Optionally, the first predetermined user input comprises a plurality of user presses at the user interface and the second predetermined user input comprises one or more user presses at the user interface; wherein the number of user presses in the second predetermined user input is less than the number of user presses in the first predetermined input. The user interface may be a button or a touchpad. The user presses may be inputted at the user interface within a predetermined period. The user presses may be inputted at the user interface as a user press sequence and at a predetermined frequency. For example, the number of user presses in the first predetermined sequence may be at least 3 presses, or in the range between 3 to 5 presses, preferably 5 presses. The number of user presses in the second predetermined sequence may be less than 3 presses, preferably a single user press. Advantageously, such arrangement results in a significant differentiation between the first predetermined user input and the second predetermined user input, and thereby it may reduce the likelihood of activating the heater when the other user input other than the first predetermined user input is inputted at the user interface.

Optionally, the first predetermined user input comprises at least one of a user password and a fingerprint input received at the interface. For example, the first predetermined user input may be a password or a code to be input at a keyboard or a keypad. The first predetermined user input may be a fingerprint recognizable at a fingerprint recognizer. Advantageously, this may allow the device to be locked from unauthorized users such as minors.

Optionally, the second predetermined user input comprises a single user press at the user interface. For example, the single user press may be a short user press at the user interface lasting less than a second, or it may require a user to hold onto a user press at the user interface and lasting more than a second. Preferable the single user press may comprise a user press lasting less than a second such that the user may promptly activate the heater from a standby operating mode.

Optionally, the device may comprise a user interface to receive the predetermined user input comprising at least one of user password, pressing of power button in a predetermined pattern for a predetermined time period and fingerprint detection.

The device may comprise an elongate body. An end of the elongate body may be configured for engagement with an aerosol-forming article. For example, the body may be configured for engagement with a heated tobacco (HT) consumable (or heat-not-burn (HNB) consumable). The terms "heated tobacco" and "heat-not-burn" are used interchangeably herein to describe a consumable that is of the type that is heated rather than combusted (or are used interchangeably to describe a device for use with such a consumable). The device may comprise a cavity that is configured for receipt of at least a portion of the consumable (i.e., for engagement with the consumable). The aerosol-forming article may be of the type that comprises an aerosol former (e.g., carried by an aerosol-forming substrate).

The device may comprise a heater for heating the aerosol-forming article. The heater may comprise a heating element, which may be in the form of a rod that extends from the body of the device. The heating element may extend from the end of the body that is configured for engagement with the aerosol-forming article.

The heater (and thus the heating element) may be rigidly mounted to the body. The heating element may be elongate so as to define a longitudinal axis and may, for example, have a transverse profile (i.e., transverse to a longitudinal axis of the heating element) that is substantially circular (i.e., the heating element may be generally cylindrical). Alternatively, the heating element may have a transverse profile that is rectangular (i.e., the heater may be a "blade heater"). The heating element may alternatively be in the shape of a tube (i.e., the heater may be a "tube heater"). The heating element may take other forms (e.g., the heating element may have an elliptical transverse profile). The shape and/or size (e.g., diameter) of the transverse profile of the heating element may be generally consistent for the entire length (or substantially the entire length) of the heating element.

The heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 µm and 220 µm, e.g., between 170 µm and 190 µm, e.g., around 180 µm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 µm.

The heating element may be located in the cavity (of the device), and may extend (e.g., along a longitudinal axis) from an internal base of the cavity towards an opening of the cavity. The length of the heating element (i.e., along the longitudinal axis of the heater) may be less than the depth of the cavity.

Hence, the heating element may extend for only a portion of the length of the cavity. That is, the heating element may not extend through (or beyond) the opening of the cavity.

The heating element may be configured for insertion into an aerosol-forming article (e.g., a HT consumable) when an aerosol-forming article is received in the cavity. In that respect, a distal end (i.e., distal from a base of the heating element where it is mounted to the device) of the heating element may comprise a tapered portion, which may facilitate insertion of the heating element into the aerosol-forming article. The heating element may fully penetrate an aerosol-forming article when the aerosol-forming article is received in the cavity. That is, the entire length, or substantially the entire length, of the heating element may be received in the aerosol-forming article.

The heating element may have a length that is less than, or substantially the same as, an axial length of an aerosol-forming substrate forming part of an aerosol-forming article (e.g., a HT consumable). Thus, when such an aerosol-forming article is engaged with the device, the heating element may only penetrate the aerosol-forming substrate, rather than other components of the aerosol-forming article. The heating element may penetrate the aerosol-forming substrate for substantially the entire axial length of the aerosol forming-substrate of the aerosol-forming article. Thus, heat may be transferred from (e.g., an outer circumferential surface of) the heating element to the surrounding aerosol-forming substrate, when penetrated by the heating element. That is, heat may be transferred radially outwardly (in the case of a cylindrical heating element) or, e.g., radially inwardly (in the case of a tube heater).

Where the heater is a tube heater, the heating element of the tube heater may surround at least a portion of the cavity. When the portion of the aerosol-forming article is received in the cavity, the heating element may surround a portion of the aerosol-forming article (i.e., so as to heat that portion of the aerosol-forming article). In particular, the heating element may surround an aerosol forming substrate of the aerosol-forming article. That is, when an aerosol-forming article is engaged with the device, the aerosol forming substrate of the aerosol-forming article may be located adjacent an inner surface of the (tubular) heating element. When the heating element is activated, heat may be transferred radially inwardly from the inner surface of the heating element to heat the aerosol forming substrate.

The cavity may comprise a (e.g., circumferential) wall (or walls) and the (tubular) heating element may extend around at least a portion of the wall(s). In this way, the wall may be located between the inner surface of the heating element and an outer surface of the aerosol-forming article. The wall (or walls) of the cavity may be formed from a thermally conductive material (e.g., a metal) to allow heat conduction from the heating element to the aerosol-forming article. Thus, heat may be conducted from the heating element, through the cavity wall (or walls), to the aerosol-forming substrate of an aerosol-forming article received in the cavity.

In some embodiments the device may comprise a cap disposed at the end of the body that is configured for engagement with an aerosol-forming article. Where the device comprises a heater having a heating element, the cap may at least partially enclose the heating element. The cap may be moveable between an open position in which access is provided to the heating element, and a closed position in which the cap at least partially encloses the heating element. The cap may be slidably engaged with the body of the device and may be slidable between the open and closed positions.

The cap may define at least a portion of the cavity of the device. That is, the cavity may be fully defined by the cap, or each of the cap and body may define a portion of the cavity. Where the cap fully defines the cavity, the cap may comprise an aperture for receipt of the heating element into the cavity (when the cap is in the closed position). The cap may comprise an opening to the cavity. The opening may be configured for receipt of at least a portion of an aerosol-forming article. That is, an aerosol-forming article may be inserted through the opening and into the cavity (so as to be engaged with the device).

The cap may be configured such that when an aerosol-forming article is engaged with the device (e.g., received in the cavity), only a portion of the aerosol-forming article is received in the cavity. That is, a portion of the aerosol-forming article (not received in the cavity) may protrude from (i.e., extend beyond) the opening. This (protruding) portion of the aerosol-forming article may be a terminal (e.g., mouth) end of the aerosol-forming article, which may be received in a user's mouth for the purpose of inhaling aerosol formed by the device.

The device may comprise a power source or may be connectable to a power source (e.g., a power source separate to the device). The power source may be electrically connectable to the heater. In that respect, altering (e.g., toggling) the electrical connection of the power source to the heater may affect a state of the heater. For example, toggling the electrical connection of the power source to the heater may toggle the heater between an on state and an off state. The power source may be a power store. For example, the power source may be a battery or rechargeable battery (e.g., a lithium-ion battery).

The device may comprise an input connection (e.g., a USB port, Micro USB port, USB-C port, etc.). The input connection may be configured for connection to an external source of electrical power, such as a mains electrical supply outlet. The input connection may, in some cases, be used as a substitute for an internal power source (e.g., battery or rechargeable battery). That is, the input connection may be electrically connectable to the heater (for providing power to the heater). Hence, in some forms, the input connection may form at least part of the power source of the device.

Where the power source comprises a rechargeable power source (such as a rechargeable battery), the input connection may be used to charge and recharge the power source.

The device may comprise a user interface (UI). In some embodiments the UI may include input means to receive operative commands from the user. For example, the UI may be configured to receive user input or user presses, i.e., the first predetermined user input, the second predetermined user input and/or the user selection, e.g., selection input. Specifically, the user input comprises at least one of user password, pressing of power button (user press) and fingerprint detection. The input means of the UI may also allow the user to control at least one aspect of the operation of the device. In some embodiments the input means may comprise a power button to switch the device between an on state and an off state.

In some embodiments the UI may additionally or alternatively comprise output means to convey information to the user. In some embodiments, the output means may be configured to indicate to the user the current operating mode of the device. In some embodiments the output means may comprise a light to indicate a condition of the device (and/or the aerosol-forming article) to the user. The condition of the device (and/or aerosol-forming article) indicated to the user may comprise a condition indicative of the operation of the heater. For example, the condition may comprise whether the heater is in an off state or an on state. In some embodiments, the UI unit may comprise at least one of a button, a display, a touchscreen, a switch, a light, and the like. For example, the output means may comprise one or more (e.g., two, three, four, etc.) light-emitting diodes ("LEDs") that may be located on the body of the device.

The device may further comprise a puff sensor (e.g., airflow sensor), which form part of the input means of the UI. The puff sensor may be configured to detect a user drawing on an end (i.e., a terminal (mouth) end) of the aerosol-forming article. The puff sensor may, for example, be a pressure sensor or a microphone. The puff sensor may be configured to produce a signal indicative of a puff state. The signal may be indicative of the user drawing (an aerosol from the aerosol-forming article) such that it is, e.g., in the form of a binary signal. Alternatively or additionally, the signal may be indicative of a characteristic of the draw (e.g., a flow rate of the draw, length of time of the draw, etc.). In some embodiment, the device may include one or more other type of detectors or sensors such as motion sensors, pressure sensors, microswitches etc. to detect an occurrence of a predetermined event. Said predetermined event may comprises one or more of (i) exhaustion or depletion of the consumable, (ii) removal of the consumable from the device, (iii) retraction of cap of the device, and (iv) elapse of a predetermined period of time since heater activation or the last puff taken.

The device may comprise a controller or may be connectable to a controller that may be configured to control at least one function of the device. The controller may comprise a microcontroller that may, e.g., be mounted on a printed circuit board (PCB). The controller may also comprise a memory, e.g., non-volatile memory. The memory may include instructions, which, when implemented, may cause the controller to perform certain tasks or steps of a method. Where the device comprises an input connection, the controller may be connected to the input connection.

The controller may be configured to control the operation of the heater (and, e.g., the heating element). Thus, the controller may be configured to control vaporization of an aerosol forming part of an aerosol-forming article engaged with the device. Further, the controller may be configured to, based on a user selection received at the user interface, selectively enter into a locked operating mode or a standby operating mode. Further, the controller may be configured to activate the heater upon receiving, at the user interface: i) a first predetermined user input when the device is entered in the locked operating mode or ii) a second predetermined user input different to the first predetermined user input when the device is entered in the standby operating mode.

In addition, the controller may be configured to control the voltage applied by power source to the heater. For example, the controller may be configured to toggle between applying a full output voltage (of the power source) to the heater and applying no voltage to the heater. Alternatively or additionally, the control unit may implement a more complex heater control protocol.

The device may further comprise a voltage regulator to regulate the output voltage supplied by the power source to form a regulated voltage. The regulated voltage may subsequently be applied to the heater. In some embodiment, the voltage regulator may be configured to regulate the output voltage supplied by the power source to the heater in both the locked operating mode and standby operating mode. For example, during the locked operating mode and the standby operating mode the voltage regulator may not permit the power source to supply any power to the heater.

In some embodiments, where the device comprises a UI, the controller may be operatively connected to one or more components of the UI. The controller may be configured to receive command signals from an input means of the UI. The controller may be configured to control the heater in response to the command signals. For example, the controller may be configured to receive "on" and "off" command signals from the UI and, in response, may control the heater so as to be in a corresponding on or off state.

The controller may be configured to send output signals to a component of the UI. The UI may be configured to convey information to a user, via an output means, in response to such output signals (received from the controller). For example, where the device comprises one or more LEDs, the LEDs may be operatively connected to the controller. Hence, the controller may be configured to control the illumination of the LEDs (e.g., in response to an output signal). For example, the controller may be configured to control the illumination of the LEDs according to (e.g., an on or off) state of the heater.

Where the device comprises a sensor (e.g., a puff/airflow sensor), the controller may be operatively connected to the sensor. The controller may be configured to receive a signal from the sensor (e.g., indicative of a condition of the device and/or engaged aerosol-forming article). The controller may be configured to control the heater, or an aspect of the output means, based on the signal from the sensor.

The device may comprise a wireless interface configured to communicate wirelessly (e.g., via Bluetooth (e.g., a Bluetooth low-energy connection) or Wi-Fi) with an external device. Similarly, the input connection may be configured for wired connection to an external device so as to provide communication between the device and the external device.

The external device may be a mobile device. For example, the external device may be a smart phone, tablet, smart watch, or smart car. An application (e.g., app) may be installed on the external device (e.g., mobile device). The application may facilitate communication between the device and the external device via the wired or wireless connection.

The wireless or wired interface may be configured to transfer signals between the external device and the controller of the device. In this respect, the controller may control an aspect of the device in response to a signal received from an external device. Alternatively or additionally, an external device may respond to a signal received from the device (e.g., from the controller of the device).

In a second aspect of the fifteenth mode, there is provided a system (e.g., a smoking substitute system) comprising a heat-not-burn device according to the first aspect and an aerosol-forming article. The aerosol-forming article may comprise an aerosol-forming substrate at an upstream end of the aerosol-forming article. The article may be in the form of a smoking substitute article, e.g., heated tobacco (HT) consumable (also known as a heat-not-burn (HNB) consumable).

As used herein, the terms "upstream" and "downstream" are intended to refer to the flow direction of the vapor/aerosol, i.e., with the downstream end of the article/consumable being the mouth end or outlet where the aerosol exits the consumable for inhalation by the user. The upstream end of the article/consumable is the opposing end to the downstream end.

The aerosol-forming substrate is capable of being heated to release at least one volatile compound that can form an aerosol. The aerosol-forming substrate may be located at the upstream end of the article/consumable.

In order to generate an aerosol, the aerosol-forming substrate comprises at least one volatile compound that is intended to be vaporized/aerosolized and that may provide the user with a recreational and/or medicinal effect when inhaled. Suitable chemical and/or physiologically active volatile compounds include the group consisting of nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius*, *Arctostaphylos uva-ursi* (Bearberry), *Argemone mexicana*, *Amica, Artemisia vulgaris*, Yellow Tees, *Galea zacatechichi*, *Canavalia maritima* (Baybean), *Cecropia mexicana* (Guamura), *Cestrum noctumum, Cynoglossum virginianum* (wild comfrey), *Cytisus scoparius*, Damiana, *Entada rheedii, Eschscholzia californica* (California Poppy), *Fittonia albivenis, Hippobroma longiflora, Humulus japonica* (Japanese Hops), *Humulus lupulus* (Hops), *Lactuca virosa* (Lettuce Opium), *Laggera alata, Leonotis leonurus, Leonurus cardiaca* (Motherwort), *Leonurus sibiricus* (Honeyweed), *Lobelia cardinalis, Lobelia inflata* (Indian-tobacco), *Lobelia siphilitica, Nepeta cataria* (Catnip), *Nicotiana* species (Tobacco), *Nymphaea alba* (White Lily), *Nymphaea caerulea* (Blue Lily), Opium poppy, *Passiflora incamata* (Passionflower), *Pedicularis densiflora* (Indian Warrior), *Pedicularis groenlandica* (Elephant's Head), *Salvia divinorum, Salvia dorrii* (Tobacco Sage), *Salvia* species (Sage), *Scutellaria galericulata, Scutellaria lateriflora, Scutellaria nana, Scutellaria* species (Skullcap), *Sida acuta* (Wireweed), *Sida rhombifolia, Silene capensis, Syzygium aromaticum* (Clove), *Tagetes lucida* (Mexican Tarragon), *Tarchonanthus camphoratus, Tumera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above-mentioned tobaccos.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, and aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the article/consumable may comprise an aerosol-cooling element which is adapted to cool the aerosol generated from the aerosol-forming substrate (by heat exchange) before being inhaled by the user.

The article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

According to a third aspect of the fifteenth mode, there is provided a method of using the system according to the second aspect, the method comprising inserting the aerosol-forming article into the device; and heating the article using the heater of the device.

Optionally, the method may comprise inserting the article into a cavity within a body of the device and penetrating the article with the heating element of the device upon insertion of the article.

According to a fourth aspect of the fifteenth mode, there is provided a method for operating the heat-not-burn device according to the first aspect, comprising: i) receiving the user selection; ii) entering into the locked operating mode or the standby operating mode based on said user selection; and iii) activating the heater upon receiving the first predetermined user input when the device is entered in the locked operating mode, or the second predetermined user when the device is entered in the standby operating mode.

Optionally the method further comprises: i) detecting the occurrence of the predetermined event; and ii) deactivating the heater to enter the device into either the locked operating mode or the standby operating mode.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Sixteenth Mode: A Smoking Substitute Device which is Configured to Detect an Error Event and an Event of User Misuse and Alert the User of the Same.

At its most general, the sixteenth mode relates to a smoking substitute device which is configured to detect an error event and an event of user misuse and alert the user of the same.

According to a first aspect of the sixteenth mode, there is provided a smoking substitute device comprising a controller and an output device. The controller is configured to detect an error event of the device and an event of user misuse of the device, whereby upon detecting an occurrence of said error event or event of user misuse, the controller is configured to alert the user of said error event or event of user misuse via the output device.

By providing a device comprising a controller that is configured to detect an error event and an event of user misuse of the device, a versatile device is provided which is able to monitor a range of adverse events which may be detrimental to normal device operation and alert the user so that they can take necessary corrective steps. Since the device monitors both device error events and user misuse it is able to inform the user when either of these occurs but also may distinguish between them so that a user is better informed of the root cause of a device malfunction so that appropriate corrective action may be taken.

Optional features will now be set out. These are applicable singly or in any combination with any aspect.

Optionally, the event of user misuse the event of user misuse comprises one or more of: (a) physical tampering with a cap of the device; (b) tampering with a user interface of the device; and (c) inappropriate selection of a mode of the device. In some embodiments the device comprises a cap which provides access to internal components of the device, such as a heater. Tampering with this cap (e.g., moving, lifting, or removing the cap) during device operation may risk damaging the device and may be dangerous for the user, so alerting the user to this provides a valuable device function. Similarly, it is beneficial for the user to be alerted to tampering with a user interface (e.g., pressing of buttons on the user interface in an unauthorized or unrecognized manner). Further, alerting the user to an inappropriate mode selection allows them to change to an appropriate mode, for example where the mode selection was made inadvertently.

In some embodiments, the event of user misuse comprises at least one of: (a) lifting a cap of the device when the device is in use; (b) one or more attempts to unlock the device with an incorrect user input, as determined by the controller by comparing the user input with a predetermined unlock pattern; and (c) an attempt to switch the device into a high temperature mode when the ambient temperature is determined by the controller to be above a predetermined threshold temperature. In some embodiments, if the controller detects that any of said events have occurred in may consider it as user misuse. For example, if the user lifts the cap of the device when the device is in operational mode, which may be dangerous for the user, the controller detects it as user misuse. In another example, if the repeated attempts to unlock the device with the incorrect sequence of button presses is made, which may be because of device being operated by anyone other than the rightful user (e.g., a child), the controller may conclude this as user misuse. Further in another example, if an attempt is made to switch the device into a high temperature mode (i.e., increase the power supply to the device heater to increase the level of heat provided by the heater) when the ambient temperature is detected to be above a predetermined threshold temperature, which may lead to overheating of the device, the controller may register this as user misuse. The controller may further be configured to alert the user when one or more of any of said events occur.

In some embodiments, the error event comprises at least one of: (a) electrical short-circuit; (b) electrical open-circuit; (c) microcontroller error; (d) overheating of one or more components of the device; (e) a detection of ambient temperature determined by the controller to be above a predetermined threshold temperature; (f) sensor error; and (g) user interface error. In some embodiments, overheating is determined based on a predetermined threshold temperature. The controller may be configured to detect an overheating error when a temperature sensor detects that the temperature within the device (e.g., adjacent the rod heater) exceeds a predetermined threshold. The skilled person is aware of suitable sensors and components which may be used to detect the above scenarios and pass information to the controller.

In some embodiments, the error event may comprise the following events (i) short circuit on heater rod, (ii) open circuit detection, (iii) microcontroller error, (iv) battery overheat, (v) heater overheats, (vi) ambient temperature too high or too low, (vii) puff sensor error and (viii) user interface error. A more versatile device is provided which can react intelligently to different scenarios. For example, the device is intelligent enough to detect one or more of the above listed error events and alert the user of such error or misuse.

In some embodiments, the controller is coupled to a heater and is configured to disable the heater in response to detecting an occurrence of one or more error events or one or more events of user misuse. In some embodiments, the device intelligently monitors all the activities performed on the device and intelligently reacts to these activities. For example, if the controller of the device detects that one or more of above error events or user misuse events has occurred, it may immediately disable the heater which prevents any harm being caused to the device or to the user.

Optionally, the output device is configured to generate one or more of visual, audio, and haptic feedback to alert the user to the error event or the event of user misuse. The output device may be selected from one or more of (i) one or more light sources, e.g., LEDs, (ii) one or more haptic feedback devices, (iii) one or more audio feedback devices, e.g., speakers. Said output means may be used by the output device to alert the user of the error event or event of user misuse. Thus, the device keeps the user well informed if any of the error event or event of user misuse occurs. In some embodiments, the output device comprises one or more LEDs. In some embodiments, the output device comprises one or more color change LEDs. In some embodiments, the output device is configured to generate visual feedback comprising a change in color of one or more LEDs for a predetermined period of time to alert the user to the error event or the event of user misuse. In some embodiments, the output device is configured to generate visual feedback comprising flashing of one or more LEDs for a predetermined period of time to alert the user to the error event or the event of user misuse. In some embodiments, the output device comprises a haptic feedback device, for example a vibrating device. In some embodiments, the output device is configured to vibrate for a predetermined period of time to alert the user to the error event or the event of user misuse. The feedback may be provided for a predetermined period of time (e.g., programmed within the device or chosen by the user), or until the error is determined to be rectified. In some embodiments, the output device is configured to generate two or more of (a) visual feedback comprising a change in color of one or more LEDs, (b) visual feedback comprising flashing of one or more LEDs, and (c) vibration, for a predetermined period of time, to alert the user to the error event or the event of user misuse. The two or more outputs may be generated simultaneously or sequentially.

For example, an LED on the user interface of the device may be lit up during normal use of the device in a first color (such as green) but will change to a second color (such as red) if the device detects one or more error events or events of user misuse. In another embodiment, an LED on the user interface of the device may be unlit during normal use of the device and may light up if the device detects one or more error events or events of user misuse. Alternatively, a first LED may be lit up during normal use of the device, and if the device detects one or more error events or events of user misuse a second LED will light up, wherein the first LED optionally extinguishes when the device detects the one or more error events or events of user misuse, and the first and second LEDs are optionally differently colored. In some embodiments, the LED output is steady. In some embodiments, the LED output is flashing. Optionally, simultaneously with the above LED outputs, the device may vibrate to provide haptic feedback when the device detects one or more error events or events of user misuse.

Such device output provides a clear indication to the user than an error or misuse has occurred.

In some embodiments, the controller is coupled to a memory configured to store data generated by the error event or event of user misuse. In this way the device is able to record instances of error or user misuse which may be used later, for example to identify any problems with the functioning of the device and troubleshoot them.

In some embodiments, the device is connectable to a further device to which the data generated by the error event or event of user misuse is transferable. For example, the device may be connectable, by wired connection or wirelessly, to a computer, the computer including software which is able to interpret the data to provide useful advice to the user.

In some embodiments, the output device is configured to provide distinct alerts for each of the error event and the event of user misuse. For example, the output device may be configured to provide a first type of alert for an error event and a second type of alert for an event of user misuse. This provides a clear indication to the user as to whether the error event has occurred or event of user misuse has occurred. Based on said indication the user may then take a decision whether he can fix the device himself or he needs to take the device to a technician for more extensive repair. In some embodiments, the output device is configured to provide distinct alerts for each of two or more error events. For example, the output device may be configured to provide a first alert for a first error event (such as a short-circuit) and a second alert for a second error event (such as overheating of the heater), wherein the first and second alerts are different. For example, the first alert may be a visual alert and the second alert may be a haptic alert. Similarly in some embodiments, the output device is configured to provide distinct alerts for each of two or more events of user misuse.

The device may comprise an elongate body. An end of the elongate body may be configured for engagement with an aerosol-forming article. For example, the body may be configured for engagement with a heated tobacco (HT) consumable (or heat-not-burn (HNB) consumable). The terms "heated tobacco" and "heat-not-burn" are used interchangeably herein to describe a consumable that is of the type that is heated rather than combusted (or are used interchangeably to describe a device for use with such a consumable). The device may comprise a cavity that is configured for receipt of at least a portion of the consumable (i.e., for engagement with the consumable). The aerosol-forming article may be of the type that comprises an aerosol former (e.g., carried by an aerosol-forming substrate).

The device may comprise a heater for heating the aerosol-forming article. The heater may comprise a heating element, which may be in the form of a rod that extends from the body of the device. The heating element may extend from the end of the body that is configured for engagement with the aerosol-forming article. In an embodiment, the heater of the device is configured to be disabled in response to the controller detecting an occurrence of one or more error events or one or more events of user misuse of the device.

The heater (and thus the heating element) may be rigidly mounted to the body. The heating element may be elongate so as to define a longitudinal axis and may, for example, have a transverse profile (i.e., transverse to a longitudinal axis of the heating element) that is substantially circular (i.e., the heating element may be generally cylindrical). Alternatively, the heating element may have a transverse profile that is rectangular (i.e., the heater may be a "blade heater"). The heating element may alternatively be in the shape of a tube (i.e., the heater may be a "tube heater"). The heating element may take other forms (e.g., the heating element may have an elliptical transverse profile). The shape and/or size (e.g., diameter) of the transverse profile of the heating element may be generally consistent for the entire length (or substantially the entire length) of the heating element.

The heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 μm and 220 μm, e.g., between 170 μm and 190 μm, e.g., around 180 μm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 μm.

The heating element may be located in the cavity (of the device), and may extend (e.g., along a longitudinal axis) from an internal base of the cavity towards an opening of the cavity. The length of the heating element (i.e., along the longitudinal axis of the heater) may be less than the depth of the cavity. Hence, the heating element may extend for only a portion of the length of the cavity. That is, the heating element may not extend through (or beyond) the opening of the cavity.

The heating element may be configured for insertion into an aerosol-forming article (e.g., a HT consumable) when an aerosol-forming article is received in the cavity. In that respect, a distal end (i.e., distal from a base of the heating element where it is mounted to the device) of the heating element may comprise a tapered portion, which may facilitate insertion of the heating element into the aerosol-forming article. The heating element may fully penetrate an aerosol-forming article when the aerosol-forming article is received in the cavity. That is, the entire length, or substantially the entire length, of the heating element may be received in the aerosol-forming article.

The heating element may have a length that is less than, or substantially the same as, an axial length of an aerosol-forming substrate forming part of an aerosol-forming article (e.g., a HT consumable). Thus, when such an aerosol-forming article is engaged with the device, the heating element may only penetrate the aerosol-forming substrate, rather than other components of the aerosol-forming article. The heating element may penetrate the aerosol-forming substrate for substantially the entire axial length of the aerosol forming-substrate of the aerosol-forming article. Thus, heat may be transferred from (e.g., an outer circumferential surface of) the heating element to the surrounding aerosol-forming substrate, when penetrated by the heating element. That is, heat may be transferred radially outwardly (in the case of a cylindrical heating element) or, e.g., radially inwardly (in the case of a tube heater).

Where the heater is a tube heater, the heating element of the tube heater may surround at least a portion of the cavity. When the portion of the aerosol-forming article is received in the cavity, the heating element may surround a portion of the aerosol-forming article (i.e., so as to heat that portion of the aerosol-forming article). In particular, the heating element may surround an aerosol forming substrate of the aerosol-forming article. That is, when an aerosol-forming article is engaged with the device, the aerosol forming substrate of the aerosol-forming article may be located adjacent an inner surface of the (tubular) heating element. When the heating element is activated, heat may be transferred radially inwardly from the inner surface of the heating element to heat the aerosol forming substrate.

The cavity may comprise a (e.g., circumferential) wall (or walls) and the (tubular) heating element may extend around at least a portion of the wall(s). In this way, the wall may be located between the inner surface of the heating element and an outer surface of the aerosol-forming article. The wall (or walls) of the cavity may be formed from a thermally conductive material (e.g., a metal) to allow heat conduction from the heating element to the aerosol-forming article. Thus, heat may be conducted from the heating element, through the cavity wall (or walls), to the aerosol-forming substrate of an aerosol-forming article received in the cavity.

In some embodiments the device may comprise a cap disposed at the end of the body that is configured for engagement with an aerosol-forming article. Where the device comprises a heater having a heating element, the cap may at least partially enclose the heating element. The cap may be moveable between an open position in which access is provided to the heating element, and a closed position in which the cap at least partially encloses the heating element. The cap may be slidably engaged with the body of the device and may be slidable between the open and closed positions.

The cap may define at least a portion of the cavity of the device. That is, the cavity may be fully defined by the cap, or each of the cap and body may define a portion of the cavity. Where the cap fully defines the cavity, the cap may comprise an aperture for receipt of the heating element into the cavity (when the cap is in the closed position). The cap may comprise an opening to the cavity. The opening may be configured for receipt of at least a portion of an aerosol-forming article. That is, an aerosol-forming article may be inserted through the opening and into the cavity (so as to be engaged with the device).

The cap may be configured such that when an aerosol-forming article is engaged with the device (e.g., received in the cavity), only a portion of the aerosol-forming article is received in the cavity. That is, a portion of the aerosol-forming article (not received in the cavity) may protrude from (i.e., extend beyond) the opening. This (protruding) portion of the aerosol-forming article may be a terminal (e.g., mouth) end of the aerosol-forming article, which may be received in a user's mouth for the purpose of inhaling aerosol formed by the device.

The device may comprise a power source or may be connectable to a power source (e.g., a power source separate to the device). The power source may be electrically connectable to the heater. In that respect, altering (e.g., toggling) the electrical connection of the power source to the heater may affect a state of the heater. For example, toggling the electrical connection of the power source to the heater may toggle the heater between an on state and an off state. The power source may be a power store. For example, the power source may be a battery or rechargeable battery (e.g., a lithium-ion battery).

The device may comprise an input connection (e.g., a USB port, Micro USB port, USB-C port, etc.). The input connection may be configured for connection to an external source of electrical power, such as a mains electrical supply outlet. The input connection may, in some cases, be used as a substitute for an internal power source (e.g., battery or rechargeable battery). That is, the input connection may be electrically connectable to the heater (for providing power to the heater). Hence, in some forms, the input connection may form at least part of the power source of the device.

Where the power source comprises a rechargeable power source (such as a rechargeable battery), the input connection may be used to charge and recharge the power source.

The device may comprise a user interface (UI). In some embodiments the UI may include input means to receive operative commands from the user. The input means of the UI may allow the user to control at least one aspect of the operation of the device. In some embodiments the input means may comprise a power button to switch the device between an on state and an off state.

In some embodiments the UI may additionally or alternatively comprise output means to convey information to the user. In some embodiments the output means may also comprise a light to indicate a condition of the device (and/or the aerosol-forming article) to the user. The condition of the device (and/or aerosol-forming article) indicated to the user may comprise a condition indicative of the operation of the heater. For example, the condition may comprise whether the heater is in an off state or an on state. In some embodiments, the UI unit may comprise at least one of a button, a display, a touchscreen, a switch, a light, and the like. For example, the output means may comprise one or more (e.g., two, three, four, etc.) light-emitting diodes ("LEDs") that may be located on the body of the device.

The device may further comprise a puff sensor (e.g., airflow sensor), which form part of the input means of the UI. The puff sensor may be configured to detect a user drawing on an end (i.e., a terminal (mouth) end) of the aerosol-forming article. The puff sensor may, for example, be a pressure sensor or a microphone. The puff sensor may be configured to produce a signal indicative of a puff state. The signal may be indicative of the user drawing (an aerosol from the aerosol-forming article) such that it is, e.g., in the form of a binary signal. Alternatively or additionally, the signal may be indicative of a characteristic of the draw (e.g., a flow rate of the draw, length of time of the draw, etc.).

The device may comprise a controller or may be connectable to a controller that may be configured to control at least one function of the device. The controller may comprise a microcontroller that may, e.g., be mounted on a printed circuit board (PCB). The controller may also comprise a memory, e.g., non-volatile memory. The memory may include instructions, which, when implemented, may cause the controller to perform certain tasks or steps of a method.

Where the device comprises an input connection, the controller may be connected to the input connection.

The controller may be coupled to the heater and configured to control the operation of the heater (and, e.g., the heating element). The controller is configured to detect an error event and an event of user misuse of the device and provide an alert to the user of said error event or event of user misuse via an output device. Thus the controller is capable of detecting both an error event and an event of user misuse, providing more useful monitoring of device function. Further, the controller may be configured to control vaporization of an aerosol forming part of an aerosol-forming article engaged with the device. The controller may be configured to control the voltage applied by power source to the heater. For example, the controller may be configured to toggle between applying a full output voltage (of the power source) to the heater and applying no voltage to the heater. Alternatively or additionally, the control unit may implement a more complex heater control protocol.

The device may further comprise a voltage regulator to regulate the output voltage supplied by the power source to form a regulated voltage. The regulated voltage may subsequently be applied to the heater. In some embodiment, the voltage regulator may be used to control the supply of voltage to the heater when an error event or an event of user misuse is detected. For example, when an error event or an event of user misuse is detected, the voltage may be reduced to reduce the power supplied to the heater, in some embodiments to zero, thereby disabling the heater.

In some embodiments, where the device comprises a UI, the controller may be operatively connected to one or more components of the UI. The controller may be configured to receive command signals from an input means of the UI. The controller may be configured to control the heater in response to the command signals. For example, the controller may be configured to receive "on" and "off" command signals from the UI and, in response, may control the heater so as to be in a corresponding on or off state.

The controller may be configured to send output signals to a component of the UI. The UI may be configured to convey information to a user, via an output means, in response to such output signals (received from the controller). For example, where the device comprises one or more LEDs, the LEDs may be operatively connected to the controller. Hence, the controller may be configured to control the illumination of the LEDs (e.g., in response to an output signal). For example, the controller may be configured to control the illumination of the LEDs according to (e.g., an on or off) state of the heater.

Where the device comprises a sensor (e.g., a puff/airflow sensor), the controller may be operatively connected to the sensor. The controller may be configured to receive a signal from the sensor (e.g., indicative of a condition of the device and/or engaged aerosol-forming article). The controller may be configured to control the heater, or an aspect of the output means, based on the signal from the sensor.

The device may comprise a wireless interface configured to communicate wirelessly (e.g., via Bluetooth (e.g., a Bluetooth low-energy connection) or Wi-Fi) with an external device. Similarly, the input connection may be configured for wired connection to an external device so as to provide communication between the device and the external device.

The external device may be a mobile device. For example, the external device may be a smart phone, tablet, smart watch, or smart car. An application (e.g., app) may be installed on the external device (e.g., mobile device). The application may facilitate communication between the device and the external device via the wired or wireless connection.

The wireless or wired interface may be configured to transfer signals between the external device and the controller of the device. In this respect, the controller may control an aspect of the device in response to a signal received from an external device. Alternatively or additionally, an external device may respond to a signal received from the device (e.g., from the controller of the device).

In a second aspect of the sixteenth mode, there is provided a system (e.g., a smoking substitute system) comprising a device according to the first aspect and an aerosol-forming article. The aerosol-forming article may comprise an aerosol-forming substrate at an upstream end of the aerosol-forming article. The article may be in the form of a smoking substitute article, e.g., heated tobacco (HT) consumable (also known as a heat-not-burn (HNB) consumable).

As used herein, the terms "upstream" and "downstream" are intended to refer to the flow direction of the vapor/aerosol, i.e., with the downstream end of the article/consumable being the mouth end or outlet where the aerosol exits the consumable for inhalation by the user. The upstream end of the article/consumable is the opposing end to the downstream end.

The aerosol-forming substrate is capable of being heated to release at least one volatile compound that can form an aerosol. The aerosol-forming substrate may be located at the upstream end of the article/consumable.

In order to generate an aerosol, the aerosol-forming substrate comprises at least one volatile compound that is intended to be vaporized/aerosolized and that may provide the user with a recreational and/or medicinal effect when inhaled. Suitable chemical and/or physiologically active volatile compounds include the group consisting of nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius, Arctostaphylos uva-ursi* (Bearberry), *Argemone mexicana, Amica, Artemisia vulgaris*, Yellow Tees, *Galea zacatechichi, Canavalia maritima* (Baybean), *Cecropia mexicana* (Guamura), *Cestrum noctumum, Cynoglossum virginianum* (wild comfrey), *Cytisus scoparius*, Damiana, *Entada rheedii, Eschscholzia californica* (California Poppy), *Fittonia albivenis, Hippobroma longiflora, Humulus japonica* (Japanese Hops), *Humulus lupulus* (Hops), *Lactuca virosa* (Lettuce Opium), *Laggera alata, Leonotis leonurus, Leonurus cardiaca* (Motherwort), *Leonurus sibiricus* (Honeyweed), *Lobelia cardinalis, Lobelia inflata* (Indian-tobacco), *Lobelia siphilitica, Nepeta cataria* (Catnip), *Nicotiana* species (Tobacco), *Nymphaea alba* (White Lily), *Nymphaea caerulea* (Blue Lily), Opium poppy, *Passiflora incamata* (Passionflower), *Pedicularis densiflora* (Indian Warrior), *Pedicularis groenlandica* (Elephant's Head), *Salvia divinorum, Salvia dorrii* (Tobacco Sage), *Salvia* species (Sage), *Scutellaria galericulata, Scutellaria lateriflora, Scutellaria nana, Scutellaria* species (Skullcap), *Sida acuta* (Wireweed), *Sida rhombifolia, Silene capensis, Syzygium aromaticum* (Clove), *Tagetes lucida* (Mexican Tarragon), *Tarchonanthus camphoratus, Tumera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above-mentioned tobaccos.

The tobacco may comprise one or more of: leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, and aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the article/consumable may comprise an aerosol-cooling element which is adapted to cool the aerosol generated from the aerosol-forming substrate (by heat exchange) before being inhaled by the user.

The article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

According to a third aspect of the sixteenth mode, there is provided a method of using the system according to the second aspect, the method comprising inserting the consumable into the device; and heating the article using the heater of the device.

In some embodiments the method may comprise inserting the article into a cavity within a body of the device and penetrating the article with the heating element of the device upon insertion of the article.

According to a fourth aspect of the sixteenth mode, there is provided a method of operating a smoking substitute device, said smoking substitute device being configured to detect an error event of the device and an event of user misuse of the device, the method comprising: detecting an occurrence of an error event or an event of user misuse; and alerting the user to said error event or event of user misuse.

In some embodiments, the event of user misuse comprises one or more of: (a) physical tampering with a cap of the device; (b) tampering with a user interface of the device; and (c) inappropriate selection of a mode of the device. In some embodiments, the event of user misuse comprises at least one of: (a) lifting a cap of the device when the device is in use; (b) one or more attempts to unlock the device with an incorrect user input, as determined by the controller by comparing the user input with a predetermined unlock pattern; and (c) an attempt to switch the device into a high temperature mode when the ambient temperature is determined by the controller to be above a predetermined threshold temperature.

In some embodiments, the error event comprises at least one of: (a) electrical short-circuit; (b) electrical open-circuit; (c) microcontroller error; (d) overheating of one or more components of the device; (e) a detection of ambient temperature determined by the controller to be above a predetermined threshold temperature; (f) sensor error; and (g) user interface error. In some embodiments, the error event comprises at least one of: short circuit on a heater, open circuit detection, microcontroller error, battery overheat, overheating of a heater, ambient temperature too high or too low, puff sensor error and user interface error.

In some embodiments, the method further comprises disabling the heater of the device when the occurrence of an error event or an event of user misuse is detected.

In some embodiments, alerting comprises generating one of visual, audio, or haptic feedback to alert the user of the error event or event of user misuse.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Seventeenth Mode: A Smoking Substitute Device Having a Controller Configured to Indicate to the User the Amount Energy Stored in the Battery, Regardless the Heater is Operation or Inactive.

At its most general, the seventeenth mode relates to a smoking substitute device having a controller configured to indicate to the user the amount energy stored in the battery, regardless the heater is operation or inactive. This may advantageously allow the user to learn the amount of energy remaining in the battery and thereby the user may be able to schedule the next charging cycle.

According to a first aspect of the seventeenth mode, there is provided a smoking substitute device comprising a heater, a battery for energizing said heater, an outputting means, and a controller that is configured to measure the amount of energy stored in the battery and indicate to a user, via the outputting means, said amount of stored energy, upon receiving a user input when the smoking substitute device is operating in either i) a standby operating mode when the heater is deactivated or ii) a standard operating mode when the heater is activated.

The amount of energy stored in the battery may otherwise be known as the charge or remaining charge of the battery. Said stored energy may deplete with every use of the device when the heater is energized. The outputting means may provide one or more visual, audio, haptic output to indicate to the user the amount of energy stored in the battery automatically, e.g., when the device is operational or upon detecting an interaction between the user and the device, periodically, or upon receiving a user's input.

More specifically, when the device is put in a standby operating mode, the controller may remain operational, e.g., in the standby operating mode the controller may receive a user's input, with the heater or heating element deactivated. In the standard operating mode, the heater may be activated to heat an aerosol-forming substrate for forming an aerosol.

By providing a device comprising a controller that may configure to measure and indicate to the user the amount of energy stored in the battery during standby mode and/or standard mode, the user may be kept better informed of the status of the battery, e.g., the user may be provided with information such as an estimation on the remaining useable time or the number of consumables that may be consumed before the battery charge runs out. Furthermore, a more versatile device may be provided which intelligently monitors the battery energy status of the device irrespective of the fact that the heater of the device is operational or inactive. For example, the controller may be configured to measure and indicate the energy status of the battery when the battery is still energizing the heater, i.e., during standard operational mode. In further example, the controller may be configured to measure and indicate the energy status of the battery when the battery is not providing power to the heater, i.e., during standby mode. A device with capabilities of keeping the user informed of battery energy status irrespective of operation of heater is provided.

Optional features will now be set out. These are applicable singly or in any combination with any aspect.

Optionally, the controller is configured to alert the user, via the outputting means, when the stored energy is measured less than a predetermined threshold. Optionally, the pre-determined threshold represents insufficient stored energy on the battery and corresponds to a condition where the battery requires immediate charging. Optionally, the pre-determined threshold may comprise a plurality of pre-determined thresholds each represents a different amount of stored energy, e.g., 5%, 10%, 15% and 20% of the total amount of energy storable in the battery. Optionally, the outputting means is configured to alert the user when the stored energy is measured less than each of the plurality of predetermined threshold with different outputs. Advantageously, the user may be actively reminded of the urgency of recharging the battery and thereby reduces the risk of insufficient stored energy.

Optionally, the controller is configured to terminate energizing the heater when the stored energy is measured less than the predetermined threshold. For example, the controller may not start heating a consumable, or it may terminate heating during heating of said consumable. Either way, the controller may remain operational for receiving the user input. Advantageously, this prevent the battery from being completely depleted of stored energy.

Optionally, the outputting means comprises one or more of i) one or more light emitters for providing visual indication, ii) an audio indicator for providing audio indication, and iii) a haptic output for providing haptic indication to a user. Optionally, the user may select one or more of the visual indication, audio indication and haptic indication for outputting the indication of energy stored in the battery. Advantageously, this allows a desired form of output according to the user's preferences.

Optionally, the outputting means comprises a plurality of light emitters configured to indicate the amount of energy stored in the battery with one or more illumination patterns. For example, the controller may be configured to illuminate the plurality of light emitters or LEDs in different patterns each indicating different energy level of the battery. In another example, the controller may be configured to cause one or more of the plurality of LEDs to flash when indicating that the stored energy level of battery is measured less than a predetermined threshold. This helps the user in having a clear indication as to when the device is operating with low power and when with sufficient power, thus the decision of charging the device may be taken on time.

Optionally, the plurality of light emitters comprises four light emitters for providing said illumination patterns, wherein in said illumination patterns the four light emitters are configured to indicate the amount of stored energy at 25% intervals. For example, the controller may cause one or more of the plurality of light emitters or LEDs to illuminate or flash when indicating the stored energy level of battery. That is, the controller may cause a single LED to illuminate or flash when the stored energy is measured to be between 1% to 25% of full capacity of the battery, the controller may cause two LEDs to illuminate or flash when the stored energy is measured to be between 26% to 50% of full capacity of the battery, the controller may cause three LEDs to illuminate or flash when the stored energy is measured to be between 51% to 75% of full capacity of the battery, and the controller may cause all of the four LEDs to illuminate or flash when the stored energy is measured to be between 76% to 100% of full capacity of the battery. Advantageously, this allows the approximate level of stored energy to be clearly indicated to the user.

The one or more light emitters may be one or more of an incandescent bulb, a halogen bulb and light emitting diode. Optionally, the one or more light emitters comprise light emitting diode (LED). Advantageously, the use of LEDs reduces the space and energy required to operate, as well as extending the longevity of the device.

Optionally, the device comprises a Heat Not Burn (HNB) device. Advantageously, such arrangement may be particularly suited for HNB device due to it high energy consumption.

The device may comprise an elongate body. An end of the elongate body may be configured for engagement with an aerosol-forming article. For example, the body may be configured for engagement with a heated tobacco (HT) consumable (or heat-not-burn (HNB) consumable) or an e-cigarette consumable. The terms "heated tobacco" and "heat-not-burn" are used interchangeably herein to describe a consumable that is of the type that is heated rather than combusted (or are used interchangeably to describe a device for use with such a consumable). The device may comprise a cavity that is configured for receipt of at least a portion of the consumable (i.e., for engagement with the consumable). The aerosol-forming article may be of the type that comprises an aerosol former (e.g., carried by an aerosol-forming substrate).

The device may comprise a heater for heating the aerosol-forming article. The heater may comprise a heating element, which may be in the form of a rod that extends from the body of the device. The heating element may extend from the end of the body that is configured for engagement with the aerosol-forming article. In an embodiment, the heater of the device is configured to be disabled in response to detecting that the stored energy is measured less than the pre-determined threshold.

The heater (and thus the heating element) may be rigidly mounted to the body. The heating element may be elongate so as to define a longitudinal axis and may, for example, have a transverse profile (i.e., transverse to a longitudinal axis of the heating element) that is substantially circular (i.e., the heating element may be generally cylindrical). Alternatively, the heating element may have a transverse profile that is rectangular (i.e., the heater may be a "blade heater"). The heating element may alternatively be in the shape of a tube (i.e., the heater may be a "tube heater"). The heating element may take other forms (e.g., the heating element may have an elliptical transverse profile). The shape and/or size (e.g., diameter) of the transverse profile of the heating element may be generally consistent for the entire length (or substantially the entire length) of the heating element.

The heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 µm and 220 µm, e.g., between 170 µm and 190 µm, e.g., around 180 µm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 µm.

The heating element may be located in the cavity (of the device), and may extend (e.g., along a longitudinal axis) from an internal base of the cavity towards an opening of the cavity. The length of the heating element (i.e., along the longitudinal axis of the heater) may be less than the depth of the cavity. Hence, the heating element may extend for only a portion of the length of the cavity. That is, the heating element may not extend through (or beyond) the opening of the cavity.

The heating element may be configured for insertion into an aerosol-forming article (e.g., a HT consumable) when an aerosol-forming article is received in the cavity. In that respect, a distal end (i.e., distal from a base of the heating element where it is mounted to the device) of the heating element may comprise a tapered portion, which may facilitate insertion of the heating element into the aerosol-forming article. The heating element may fully penetrate an aerosol-forming article when the aerosol-forming article is received in the cavity. That is, the entire length, or substantially the entire length, of the heating element may be received in the aerosol-forming article.

The heating element may have a length that is less than, or substantially the same as, an axial length of an aerosol-forming substrate forming part of an aerosol-forming article (e.g., a HT consumable). Thus, when such an aerosol-forming article is engaged with the device, the heating element may only penetrate the aerosol-forming substrate, rather than other components of the aerosol-forming article. The heating element may penetrate the aerosol-forming substrate for substantially the entire axial length of the aerosol forming-substrate of the aerosol-forming article. Thus, heat may be transferred from (e.g., an outer circumferential surface of) the heating element to the surrounding aerosol-forming substrate, when penetrated by the heating element. That is, heat may be transferred radially outwardly (in the case of a cylindrical heating element) or, e.g., radially inwardly (in the case of a tube heater).

Where the heater is a tube heater, the heating element of the tube heater may surround at least a portion of the cavity. When the portion of the aerosol-forming article is received in the cavity, the heating element may surround a portion of the aerosol-forming article (i.e., so as to heat that portion of the aerosol-forming article). In particular, the heating element may surround an aerosol forming substrate of the aerosol-forming article. That is, when an aerosol-forming article is engaged with the device, the aerosol forming substrate of the aerosol-forming article may be located adjacent an inner surface of the (tubular) heating element. When the heating element is activated, heat may be transferred radially inwardly from the inner surface of the heating element to heat the aerosol forming substrate.

The cavity may comprise a (e.g., circumferential) wall (or walls) and the (tubular) heating element may extend around at least a portion of the wall(s). In this way, the wall may be located between the inner surface of the heating element and an outer surface of the aerosol-forming article. The wall (or walls) of the cavity may be formed from a thermally conductive material (e.g., a metal) to allow heat conduction from the heating element to the aerosol-forming article. Thus, heat may be conducted from the heating element, through the cavity wall (or walls), to the aerosol-forming substrate of an aerosol-forming article received in the cavity.

In some embodiments the heater may form part of an aerosol-forming article for use with the device. In such cases the device may not comprise a heater. Rather, the aerosol-forming article may comprise a heater. Such arrangements may, for example, be suited to e-cigarette systems in which the aerosol-forming article comprises a tank containing an aerosol former (e.g., in liquid form). In such embodiments, the device may comprise means for connecting the device the heater of an aerosol-forming article engaged with the device. For example, the device may comprise one or more device connectors for (e.g., electrically) connecting the device to a corresponding heater connector of the aerosol-forming article. The connectors (i.e., of both the device and the aerosol-forming article) may be in the form of electrically conductive elements (e.g., plates) that contact when the aerosol-forming article is engaged with the device.

In some embodiments the device may comprise a cap disposed at the end of the body that is configured for engagement with an aerosol-forming article. Where the device comprises a heater having a heating element, the cap may at least partially enclose the heating element. The cap may be moveable between an open position in which access is provided to the heating element, and a closed position in which the cap at least partially encloses the heating element. The cap may be slidably engaged with the body of the device and may be slidable between the open and closed positions.

The cap may define at least a portion of the cavity of the device. That is, the cavity may be fully defined by the cap, or each of the cap and body may define a portion of the cavity. Where the cap fully defines the cavity, the cap may comprise an aperture for receipt of the heating element into the cavity (when the cap is in the closed position). The cap may comprise an opening to the cavity. The opening may be configured for receipt of at least a portion of an aerosol-forming article. That is, an aerosol-forming article may be inserted through the opening and into the cavity (so as to be engaged with the device).

The cap may be configured such that when an aerosol-forming article is engaged with the device (e.g., received in the cavity), only a portion of the aerosol-forming article is received in the cavity. That is, a portion of the aerosol-forming article (not received in the cavity) may protrude from (i.e., extend beyond) the opening. This (protruding) portion of the aerosol-forming article may be a terminal (e.g., mouth) end of the aerosol-forming article, which may be received in a user's mouth for the purpose of inhaling aerosol formed by the device.

The device may comprise a power source or may be connectable to a power source (e.g., a power source separate to the device). The power source may be electrically connectable to the heater. In that respect, altering (e.g., toggling) the electrical connection of the power source to the heater may affect a state of the heater. For example, toggling the electrical connection of the power source to the heater may toggle the heater between an on state and an off state. The power source may be a power store. For example, the power source may be a battery or rechargeable battery (e.g., a lithium-ion battery).

The device may comprise an input connection (e.g., a USB port, Micro USB port, USB-C port, etc.). The input connection may be configured for connection to an external source of electrical power, such as a mains electrical supply outlet. The input connection may, in some cases, be used as a substitute for an internal power source (e.g., battery or rechargeable battery). That is, the input connection may be electrically connectable to the heater (for providing power to the heater). Hence, in some forms, the input connection may form at least part of the power source of the device.

Where the power source comprises a rechargeable power source (such as a rechargeable battery), the input connection may be used to charge and recharge the power source.

The device may comprise a user interface (UI). In some embodiments the UI may include input means to receive operative commands from the user. The input means of the UI may allow the user to control at least one aspect of the operation of the device. For example, the UI may allow a user to understand the amount of energy stored in the battery during a standby mode, i.e., when the heater is in a deactivated state and during a standard operating mode when the heater is in activated state. In some embodiments the input means may comprise a power button to switch the device between an on state and an off state.

In some embodiments the UI may additionally or alternatively comprise output means to convey information to the user. In some embodiments the output means may also comprise a light to indicate a condition of the device (and/or the aerosol-forming article) to the user. The condition of the device (and/or aerosol-forming article) indicated to the user may comprise a condition indicative of the operation of the heater. For example, the condition may comprise whether the heater is in an off state or an on state. In some embodiments, the UI unit may comprise at least one of a button, a display, a touchscreen, a switch, a light, and the like. For example, the output means may comprise one or more (e.g., two, three, four, etc.) light-emitting diodes ("LEDs") that may be located on the body of the device.

The device may further comprise a puff sensor (e.g., airflow sensor), which form part of the input means of the UI. The puff sensor may be configured to detect a user drawing on an end (i.e., a terminal (mouth) end) of the aerosol-forming article. The puff sensor may, for example, be a pressure sensor or a microphone. The puff sensor may be configured to produce a signal indicative of a puff state. The signal may be indicative of the user drawing (an aerosol from the aerosol-forming article) such that it is, e.g., in the form of a binary signal. Alternatively or additionally, the signal may be indicative of a characteristic of the draw (e.g., a flow rate of the draw, length of time of the draw, etc.).

The device may comprise a controller or may be connectable to a controller that may be configured to control at least one function of the device. The controller may comprise a microcontroller that may, e.g., be mounted on a printed circuit board (PCB). The controller may also comprise a memory, e.g., non-volatile memory. The memory may include instructions, which, when implemented, may cause the controller to perform certain tasks or steps of a method. Where the device comprises an input connection, the controller may be connected to the input connection.

The controller may be coupled to the heater and the battery (power source) and is configured to control the operation of the heater (and, e.g., the heating element). In some embodiment, the controller may be configured to measure and indicate to a user the amount of energy stored in the battery when the smoking substitute device is operating in one of a standby operating mode where the heater is deactivated and a standard operating mode where the heater is activated. Further, the controller may be configured to control vaporization of an aerosol forming part of an aerosol-forming article engaged with the device. The controller may be configured to control the voltage applied by power source to the heater. For example, the controller may be configured to toggle between applying a full output voltage (of the power source) to the heater and applying no voltage to the heater. Alternatively or additionally, the control unit may implement a more complex heater control protocol.

The device may further comprise a voltage regulator to regulate the output voltage supplied by the power source to form a regulated voltage. The regulated voltage may subsequently be applied to the heater. In some embodiment, the voltage regulator may be used to control the supply of voltage to the heater when the amount of energy stored in the battery is found to be below a pre-determined threshold. For example, if the stored energy is found to be below a pre-determined threshold the voltage regulator is configured to supply zero voltage to the heater.

In some embodiments, where the device comprises a UI, the controller may be operatively connected to one or more components of the UI. The controller may be configured to receive command signals from an input means of the UI. The controller may be configured to control the heater in response to the command signals. For example, the controller may be configured to receive "on" and "off" command signals from the UI and, in response, may control the heater so as to be in a corresponding on or off state.

The controller may be configured to send output signals to a component of the UI. The UI may be configured to convey information to a user, via an output means, in response to such output signals (received from the controller). For example, where the device comprises one or more LEDs, the LEDs may be operatively connected to the controller. Hence, the controller may be configured to control the illumination of the LEDs (e.g., in response to an output signal). For example, the controller may be configured to control the illumination of the LEDs according to (e.g., an on or off) state of the heater. In another example, the controller may be configured to control the illumination of the LEDs to (i). indicate the amount of energy stored in the battery and (ii). alert the user when the stored energy measured less than a pre-determined threshold, using different illumination patterns.

Where the device comprises a sensor (e.g., a puff/airflow sensor), the controller may be operatively connected to the sensor. The controller may be configured to receive a signal from the sensor (e.g., indicative of a condition of the device and/or engaged aerosol-forming article). The controller may be configured to control the heater, or an aspect of the output means, based on the signal from the sensor.

In some embodiments, the controller may be configured to measure and indicate to the user the amount of energy stored in the battery. Further, the controller is also configured to deactivate the heater of the device when the energy stored in the battery reduces below a pre-determined threshold.

The device may comprise a wireless interface configured to communicate wirelessly (e.g., via Bluetooth (e.g., a Bluetooth low-energy connection) or Wi-Fi) with an external device. Similarly, the input connection may be configured for wired connection to an external device so as to provide communication between the device and the external device.

The external device may be a mobile device. For example, the external device may be a smart phone, tablet, smart watch, or smart car. An application (e.g., app) may be installed on the external device (e.g., mobile device). The application may facilitate communication between the device and the external device via the wired or wireless connection.

The wireless or wired interface may be configured to transfer signals between the external device and the controller of the device. In this respect, the controller may control an aspect of the device in response to a signal received from an external device. Alternatively or additionally, an external device may respond to a signal received from the device (e.g., from the controller of the device).

In a second aspect of the seventeenth mode, there is provided a system (e.g., a smoking substitute system) comprising a device according to the first aspect and an aerosol-forming article. The aerosol-forming article may comprise an aerosol-forming substrate at an upstream end of the aerosol-forming article. The article may be in the form of a smoking substitute article, e.g., heated tobacco (HT) consumable (also known as a heat-not-burn (HNB) consumable).

As used herein, the terms "upstream" and "downstream" are intended to refer to the flow direction of the vapor/aerosol, i.e., with the downstream end of the article/consumable being the mouth end or outlet where the aerosol exits the consumable for inhalation by the user. The upstream end of the article/consumable is the opposing end to the downstream end.

The aerosol-forming substrate is capable of being heated to release at least one volatile compound that can form an aerosol. The aerosol-forming substrate may be located at the upstream end of the article/consumable.

In order to generate an aerosol, the aerosol-forming substrate comprises at least one volatile compound that is intended to be vaporized/aerosolized and that may provide the user with a recreational and/or medicinal effect when inhaled. Suitable chemical and/or physiologically active volatile compounds include the group consisting of nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius, Arctostaphylos uva-ursi* (Bearberry), *Argemone mexicana, Arnica, Artemisia vulgaris*, Yellow Tees, *Galea zacatechichi, Canavalia maritima* (Baybean), *Cecropia mexicana* (Guamura), *Cestrum nocturnum, Cynoglossum virginianum* (wild comfrey), *Cytisus scoparius*, Damiana, *Entada rheedii, Eschscholzia californica* (California Poppy), *Fittonia albivenis, Hippobroma longiflora, Humulus japonica* (Japanese Hops), *Humulus lupulus* (Hops), *Lactuca virosa* (Lettuce Opium), *Laggera alata, Leonotis leonurus, Leonurus cardiaca* (Motherwort), *Leonurus sibiricus* (Honeyweed), *Lobelia cardinalis, Lobelia inflata* (Indian-tobacco), *Lobelia siphilitica, Nepeta cataria* (Catnip), *Nicotiana* species (Tobacco), *Nymphaea alba* (White Lily), *Nymphaea caerulea* (Blue Lily), Opium poppy, *Passiflora incamata* (Passionflower), *Pedicularis densiflora* (Indian Warrior), *Pedicularis groenlandica* (Elephant's Head), *Salvia divinorum, Salvia dorrii* (Tobacco Sage), *Salvia* species (Sage), *Scutellaria galericulata, Scutellaria lateriflora, Scutellaria nana, Scutellaria* species (Skullcap), *Sida acuta* (Wireweed), *Sida rhombifolia, Silene capensis, Syzygium aromaticum* (Clove), *Tagetes lucida* (Mexican Tarragon), *Tarchonanthus camphoratus, Turnera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above-mentioned tobaccos.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, and aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the article/consumable may comprise an aerosol-cooling element which is adapted to cool the aerosol generated from the aerosol-forming substrate (by heat exchange) before being inhaled by the user.

The article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

In some embodiments the system may be in the form of an e-cigarette system (i.e., rather than a heated tobacco system as described above). In such a system, the consumable may be in the form of an e-cigarette consumable. The e-cigarette system may be configured such that the consumable can be received and retained in the cavity of the device (i.e., so as to be engaged with the device). The consumable may be retained by way of, e.g., an interference fit, screwing one onto (or onto) the other, a bayonet fitting, or by way of a snap engagement mechanism.

The consumable may comprise a tank, which may define a reservoir for the storage of an aerosol former. The aerosol former may be in the form of an e-liquid (stored in the reservoir).

The consumable may be a "single-use" consumable. That is, upon exhausting the e-liquid in the tank, the intention may be that the user disposes of the entire consumable. Alternatively, the e-liquid may be the only part of the system that is truly "single-use". For example, the tank may be refillable with e-liquid or another component of the system (internal to the device or external to the device, e.g., a refillable cartomizer) may define a reservoir for the e-liquid.

As set forth above, the consumable may comprise a heater (i.e., instead of the heater forming part of the device) configured to heat and vaporize the e-liquid. The consumable may comprise a porous wick that conveys e-liquid from the tank to a heating element of the heater. The heating element may be a heating filament that is wound (e.g., helically) around at least a portion of the porous wick, such that when the heating element is heated (e.g., by the action of electrical current passing through the heating element), heat may be transferred from the heating element to the e-liquid conveyed by the wick. This transfer of heat may vaporize the e-liquid and the resultant vapor may be entrained in an airflow passing through the consumable.

The consumable may further comprise one or more heater connectors for connecting the heater (of the consumable) to the device. The heater connectors may be in the form of electrically conductive element or contacts (e.g., metal plates) and may be disposed on an in-use device-facing surface of the consumable. The heater connectors may be electrically connected to the heater of the consumable, such that electricity supplied via the heater connectors may pass to the heater. In other words, a voltage applied across the heater connectors may generally correspond to a voltage applied across the heating element of the heater.

The heater connectors may be arranged such that they contact corresponding device connectors of the device when the consumable is engaged with the device. The device connectors may be connected (e.g., electrically) to a power source (e.g., battery) of the device. Thus, electricity may be supplied from the power source to the heating element, via in-contact heater and device connectors. In this way, the heater forming part of the consumable may operate (and interact with, e.g., a controller) as otherwise described above with respect to a heater forming part of the device.

According to a third aspect of the seventeenth mode, there is provided a method of using the system according to the second aspect, the method comprising inserting the aerosol-forming article into the device; and heating the article using the heater of the device.

In some embodiments the method may comprise inserting the article into a cavity within a body of the device and penetrating the article with the heating element of the device upon insertion of the article.

According to a fourth aspect of the seventeenth mode, there is provided a method of operating a smoking substitute device having a heater, a battery for energizing the heater and an outputting means, the method comprising: receiving a user input when the smoking substitute device is operating in either i) a standby operating mode when the heater is deactivated or ii) a standard operating mode when the heater is activated; measuring the amount of energy stored in the battery; and indicating to a user, via the outputting means, said amount of stored energy.

Optionally, said indicating comprises indicating the amount of energy stored in the battery and providing an alert to the user when the stored energy is measured below a pre-determined threshold, via one or more illumination patterns.

Optionally, the method further comprises terminating said energizing of the heater when the stored energy is measured less than the predetermined threshold.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Eighteenth Mode: The Inclusion of a Controller in the Smoking Substitute Device to Determine the Amount of Consumable Available in a Session.

At its most general, the eighteenth mode relates to the inclusion of a controller in the smoking substitute device to determine the amount of consumable available in a session.

According to a first aspect of the eighteenth mode, there is provided a smoking substitute device for consuming a consumable in a session. The device comprises a display and a controller, the controller being configured to determine the remaining usable lifetime of the consumable, and display said remaining usable lifetime of the consumable in predetermined intervals at the display.

By providing a device comprising a controller which may be configured to determine the remaining usable lifetime of the consumable, the device has the ability to perform useful downstream functionality or provide useful information to the user. For example, one function that may be performed by the device includes determining the remaining usable lifetime of the consumable and alerting the user to the remaining usable lifetime. This may help is providing useful information to the user. Thus, an intuitive device is provided which can intelligently monitor the remaining usable lifetime of a consumable in an active smoking session.

The "remaining usable lifetime" of a consumable indicates the time remaining before the consumable is considered to be "used", or "depleted" to such an extent that replacement with a fresh consumable is required or recommended to maintain a certain level of user experience.

"Predetermined intervals" refers to the discrete intervals of time in which the device displays the remaining usable lifetime of the consumable. A predetermined interval may be any discrete time interval and may be in terms of absolute remaining usable lifetime (e.g., in seconds, or minutes) or in terms of remaining usable lifetime relative to total usable lifetime (e.g., as a fraction, decimal or percentage). For instance, the predetermined intervals may be 25% intervals based on the total usable lifetime, such that the display shows the remaining usable lifetime of the consumable in discrete 25% units, starting with 100% and continuing in 25% intervals until 0% when the consumable is fully depleted and replacement with a fresh consumable is required.

Optional features will now be set out. These are applicable singly or in any combination with any aspect.

Optionally, the controller is configured to receive a user input and determine the remaining usable lifetime of the consumable in response to receiving user input. This gives an additional advantage to the user allowing the user to monitor the remaining usable lifetime at a time of their choosing during the session.

In some embodiments, the device comprises one or more user input means for providing user input. In one example, the user input means comprises a power button which when pressed allows the user to determine the remaining usable lifetime of the consumable. In another example, the user input means includes a sensor, wherein the sensor may be a motion sensor, audio sensor or any other like sensor that indicates the remaining consumable left upon receiving corresponding input from the user.

In some embodiments, the user input comprises one or more presses of a button on the device. When the controller detects that the button has been pressed, it determined the current usable lifetime of the consumable and displays this information on the display in a predetermined interval.

In some embodiments, the display comprises a visual representation of the remaining usable lifetime of the consumable. For example, the display may comprise a discrete number of display regions corresponding with the number of predetermined intervals, wherein the number of active display regions indicates the remaining usable lifetime. In some embodiments, the display comprises a number of LEDs, wherein the number of active (lit) LEDs corresponds with the remaining usable lifetime in predetermined intervals. For example, the display may comprise N LEDs (indicating predetermined intervals of (100/N) %), wherein the number of LEDs lit indicates the remaining usable lifetime; thus when n LEDs are lit the remaining usable lifetime shown on the display is [(100/N)×n]% of the total usable lifetime.

In some embodiments, the display regions (e.g., LEDs) become active simultaneously to indicate the remaining usable lifetime. For example, where four display regions are present to indicate remaining usable lifetime in 25% intervals, a number (e.g., two, three or four) of the display regions will become active simultaneously to indicate the remaining usable lifetime of the consumable. For example, three of the four display regions being active may indicate 75% remaining usable lifetime. Alternatively, the display regions may become active sequentially to indicate the remaining usable lifetime of the consumable. For example, two, three of four display regions (e.g., LEDs) may become active sequentially. In other embodiments, a single one of a number of display regions will become active to indicate the remaining usable lifetime of the consumable, where each individual display region is associated with a corresponding interval of remaining usable lifetime (e.g., four LEDs associated with 0%, 25%, 50% and 100% remaining usable lifetime respectively).

In some embodiments the indication of the remaining usable lifetime on the display remains active for a predetermined period of time before becoming inactive again. In some embodiments, the period of time is at least 1 second, for example at least 1.5 seconds or at least 2 seconds, to provide sufficient time for the user to observe and digest the information.

In some embodiments, the controller may be configured to determine the remaining usable lifetime of the consumable based on a pre-determined total usable lifetime. The pre-determined total usable lifetime may be stored, e.g., by a memory coupled with the controller. The pre-determined total usable lifetime may be a duration of time which is equivalent to an expected usable lifetime of a consumable. In some embodiments the device memory is pre-programmed to include this duration. The duration may be, for example, an average duration based on knowledge of the usable lifetime of consumables.

Optionally, the controller may be configured to determine the remaining usable lifetime of the consumable based on remaining time left in the smoking session. In other words, in some embodiments remaining usable lifetime is determined based on a determination of the remaining time in a smoking session, wherein the duration of a smoking session is a predetermined parameter. In some embodiments, the controller is configured to begin a smoking session when this is requested by appropriate user input, e.g., the pressing of a power button. The controller then determines the remaining time in the smoking session and displays this as the remaining usable lifetime of the consumable when requested by the user. In such embodiments, the duration of a smoking session may be predetermined based on a known period of time corresponding to, e.g., an average usable lifetime of a consumable.

In some embodiments, the controller is configured to determine the remaining usable lifetime of the consumable in proportion to total duration of the smoking session. As a result, the remaining usable lifetime may be determined and displayed as a remaining fraction, decimal or percentage of the total duration of a smoking session. For example, the display may show "75%", indicating that 75% of the usable lifetime of the consumable remains.

In some embodiment, the controller may be configured to detect and display the remaining usable lifetime of the consumable on the display during an active smoking session. For example, the controller may be configured to indicate to the user the amount of remaining consumable during an active smoking session, i.e., when the device is switched on or the heater is being supplied with power. Thus, the user may not have to switch to any other mode to determine the amount of remaining consumable available for consumption during said active smoking session.

In some embodiments, the controller may be configured to measure ambient temperature and incorporate the ambient temperature into the determination of the remaining usable lifetime of the consumable. In some embodiments, the controller may be configured to measure the ambient temperature using a temperature sensor and calculate the amount of consumable remaining, at least partially, on the basis of detected ambient temperature.

In some embodiments, the controller may be configured to generate an alert to the user to indicate that the user is entering a final time period of usable lifetime of the consumable based on the determination of the remaining usable lifetime of the consumable. For example, if the controller has determined that the remaining usable lifetime of the consumable has fallen below a predetermined threshold, the controller may be configured to alert the user in the form of audio, video, or haptic feedback. In some embodiments, the final time period is the final 30 seconds of the usable lifetime of the consumable. In some embodiments, the controller may be configured to generate an alert to the user when user input is received requesting an indication of the remaining usable lifetime of the consumable. For example, haptic feedback (e.g., vibration of the device) may be provided to confirm to the user that the user input has been detected.

In some embodiments, the controller is configured to determine the number of puff inhalations made by the user during an active smoking session and incorporate this number into the determination of the remaining usable lifetime of the consumable. To achieve this, the controller may know the total number of puffs provided by a consumable until it is depleted and ready for replacement and monitor the number of puffs inhaled by the user in a predetermined time interval. Since the controller is aware of the amount of consumable consumed in one puff, the controller may be able to determine the amount of remaining usable lifetime at any point.

In some embodiments, the controller is configured to determine the magnitude of one or more puff inhalations made by the user during an active smoking session and incorporate this magnitude into the determination of the remaining usable lifetime of the consumable. For example, a puff of greater magnitude (e.g., a longer puff, or a puff drawn with greater force/pressure) will deplete the consumable to a greater extent than a lighter puff, and thus the total number off puffs available before the consumable is fully depleted will be smaller. A device which recognizes the magnitude of one or more puffs may therefore provide a more accurate indication of the remaining usable lifetime of the consumable than a device which merely counts the number of puffs. In some embodiments, the controller is configured to determine both the number of puff inhalations and magnitude of each puff inhalation made by the user during an active smoking session and incorporate these parameters into the determination of the remaining usable lifetime of the consumable. This provides even greater accuracy.

In some embodiments, the controller is configured to determine the type of consumable present and to incorporate this information into the determination of the remaining usable lifetime of the consumable. This will take into account any differing total usable lifetimes between different types of consumable. For example, the controller may determine that the consumable is a type with a longer total usable lifetime, adjust the length of smoking session accordingly and thereby adjust the indication of remaining usable lifetime of the consumable provided to the user. The identification of the type of consumable may be based on any suitable parameter measurable or detectable by the controller, such as a visual indicator on the surface of the consumable (e.g., a barcode), a readable medium within the consumable (e.g., a chip), measurement of the makeup of the aerosol generated by the consumable, measurement of the size/length of the consumable etc. Such a predetermined measurable parameter may be associated with a given type of consumable and the device pre-programmed accordingly.

In some embodiments, the controller is further configured, when the device is in a standby mode, to determine the remaining battery life of the device and display said battery life on the display. In some embodiments, the same display which is adapted to indicate the remaining usable lifetime of the consumable during a smoking session also indicates the remaining battery life during device standby. A standby mode may include any mode in which power is not being delivered to the heating element, e.g., before or after a smoking session. The same display or display regions may be adapted to indicate both the remaining usable lifetime of the consumable during a smoking session and the remaining battery life during device standby. Alternatively, different displays or display regions may be used.

The device may comprise an elongate body. An end of the elongate body may be configured for engagement with an aerosol-forming article. For example, the body may be configured for engagement with a heated tobacco (HT) consumable (or heat-not-burn (HNB) consumable). The terms "heated tobacco" and "heat-not-burn" are used interchangeably herein to describe a consumable that is of the type that is heated rather than combusted (or are used interchangeably to describe a device for use with such a consumable). The device may comprise a cavity that is configured for receipt of at least a portion of the consumable (i.e., for engagement with the consumable). The aerosol-forming article may be of the type that comprises an aerosol former (e.g., carried by an aerosol-forming substrate).

The device may comprise a heater for heating the aerosol-forming article. The heater may comprise a heating element, which may be in the form of a rod that extends from the body of the device. The heating element may extend from the end of the body that is configured for engagement with the aerosol-forming article.

The heater (and thus the heating element) may be rigidly mounted to the body. The heating element may be elongate so as to define a longitudinal axis and may, for example, have a transverse profile (i.e., transverse to a longitudinal axis of the heating element) that is substantially circular (i.e., the heating element may be generally cylindrical). Alternatively, the heating element may have a transverse profile that is rectangular (i.e., the heater may be a "blade heater"). The heating element may alternatively be in the shape of a tube (i.e., the heater may be a "tube heater"). The heating element may take other forms (e.g., the heating element may have an elliptical transverse profile). The shape and/or size (e.g., diameter) of the transverse profile of the heating element may be generally consistent for the entire length (or substantially the entire length) of the heating element.

The heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 µm and 220 µm, e.g., between 170 µm and 190 µm, e.g., around 180 µm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 µm.

The heating element may be located in the cavity (of the device), and may extend (e.g., along a longitudinal axis) from an internal base of the cavity towards an opening of the cavity. The length of the heating element (i.e., along the longitudinal axis of the heater) may be less than the depth of the cavity. Hence, the heating element may extend for only a portion of the length of the cavity. That is, the heating element may not extend through (or beyond) the opening of the cavity.

The heating element may be configured for insertion into an aerosol-forming article (e.g., a HT consumable) when an aerosol-forming article is received in the cavity. In that respect, a distal end (i.e., distal from a base of the heating element where it is mounted to the device) of the heating element may comprise a tapered portion, which may facilitate insertion of the heating element into the aerosol-forming article. The heating element may fully penetrate an aerosol-forming article when the aerosol-forming article is received in the cavity. That is, the entire length, or substantially the entire length, of the heating element may be received in the aerosol-forming article.

The heating element may have a length that is less than, or substantially the same as, an axial length of an aerosol-forming substrate forming part of an aerosol-forming article (e.g., a HT consumable). Thus, when such an aerosol-forming article is engaged with the device, the heating element may only penetrate the aerosol-forming substrate, rather than other components of the aerosol-forming article. The heating element may penetrate the aerosol-forming substrate for substantially the entire axial length of the aerosol forming-substrate of the aerosol-forming article. Thus, heat may be transferred from (e.g., an outer circumferential surface of) the heating element to the surrounding aerosol-forming substrate, when penetrated by the heating element. That is, heat may be transferred radially outwardly (in the case of a cylindrical heating element) or, e.g., radially inwardly (in the case of a tube heater).

Where the heater is a tube heater, the heating element of the tube heater may surround at least a portion of the cavity. When the portion of the aerosol-forming article is received in the cavity, the heating element may surround a portion of the aerosol-forming article (i.e., so as to heat that portion of the aerosol-forming article). In particular, the heating element may surround an aerosol forming substrate of the aerosol-forming article. That is, when an aerosol-forming article is engaged with the device, the aerosol forming substrate of the aerosol-forming article may be located adjacent an inner surface of the (tubular) heating element. When the heating element is activated, heat may be transferred radially inwardly from the inner surface of the heating element to heat the aerosol forming substrate.

The cavity may comprise a (e.g., circumferential) wall (or walls) and the (tubular) heating element may extend around at least a portion of the wall(s). In this way, the wall may be located between the inner surface of the heating element and an outer surface of the aerosol-forming article. The wall (or walls) of the cavity may be formed from a thermally conductive material (e.g., a metal) to allow heat conduction from the heating element to the aerosol-forming article. Thus, heat may be conducted from the heating element, through the cavity wall (or walls), to the aerosol-forming substrate of an aerosol-forming article received in the cavity.

In some embodiments the device may comprise a cap disposed at the end of the body that is configured for engagement with an aerosol-forming article. Where the device comprises a heater having a heating element, the cap may at least partially enclose the heating element. The cap may be moveable between an open position in which access is provided to the heating element, and a closed position in which the cap at least partially encloses the heating element. The cap may be slidably engaged with the body of the device and may be slidable between the open and closed positions.

The cap may define at least a portion of the cavity of the device. That is, the cavity may be fully defined by the cap, or each of the cap and body may define a portion of the cavity. Where the cap fully defines the cavity, the cap may comprise an aperture for receipt of the heating element into the cavity (when the cap is in the closed position). The cap may comprise an opening to the cavity. The opening may be configured for receipt of at least a portion of an aerosol-forming article. That is, an aerosol-forming article may be inserted through the opening and into the cavity (so as to be engaged with the device).

The cap may be configured such that when an aerosol-forming article is engaged with the device (e.g., received in the cavity), only a portion of the aerosol-forming article is received in the cavity. That is, a portion of the aerosol-forming article (not received in the cavity) may protrude from (i.e., extend beyond) the opening. This (protruding) portion of the aerosol-forming article may be a terminal (e.g., mouth) end of the aerosol-forming article, which may be received in a user's mouth for the purpose of inhaling aerosol formed by the device.

The device may comprise a power source or may be connectable to a power source (e.g., a power source separate to the device). The power source may be electrically connectable to the heater. In that respect, altering (e.g., toggling) the electrical connection of the power source to the heater may affect a state of the heater. For example, toggling the electrical connection of the power source to the heater may toggle the heater between an on state and an off state. The power source may be a power store. For example, the power source may be a battery or rechargeable battery (e.g., a lithium-ion battery).

The device may comprise an input connection (e.g., a USB port, Micro USB port, USB-C port, etc.). The input connection may be configured for connection to an external source of electrical power, such as a mains electrical supply outlet. The input connection may, in some cases, be used as a substitute for an internal power source (e.g., battery or rechargeable battery). That is, the input connection may be electrically connectable to the heater (for providing power to the heater). Hence, in some forms, the input connection may form at least part of the power source of the device.

Where the power source comprises a rechargeable power source (such as a rechargeable battery), the input connection may be used to charge and recharge the power source.

The device may comprise a user interface (UI). In some embodiments the UI may include input means to receive operative commands from the user. The input means of the UI may allow the user to control at least one aspect of the operation of the device. In some embodiments the input means may comprise a power button to switch the device between an on state and an off state. In some embodiment, the user input means may be configured to receive a user input/command to detect the amount of consumable remaining to be consumed in the session. For example, the user input means may be the power button that allows the user to determine the amount of consumable remaining in the session when pressed once or in a predetermined manner. In other example, the user input means may include a sensor, wherein the sensor may be a pressure sensor, motion sensor, audio sensor or any other like sensor.

In some embodiments the UI may additionally or alternatively comprise output means to convey information to the user. In some embodiments the output means may comprise a light to indicate a condition of the device (and/or the aerosol-forming article) to the user. The condition of the device (and/or aerosol-forming article) indicated to the user may comprise a condition indicative of the operation of the heater. For example, the condition may comprise whether the heater is in an off state or an on state. In some embodiments, the UI unit may comprise at least one of a button, a display, a touchscreen, a switch, a light, and the like. For example, the output means may comprise one or more (e.g., two, three, four, etc.) light-emitting diodes ("LEDs") that may be located on the body of the device.

The device may further comprise a puff sensor (e.g., airflow sensor), which form part of the input means of the UI. The puff sensor may be configured to detect a user drawing on an end (i.e., a terminal (mouth) end) of the aerosol-forming article. The puff sensor may, for example, be a pressure sensor or a microphone. The puff sensor may be configured to produce a signal indicative of a puff state. The signal may be indicative of the user drawing (an aerosol from the aerosol-forming article) such that it is, e.g., in the form of a binary signal. Alternatively or additionally, the signal may be indicative of a characteristic of the draw (e.g., a flow rate of the draw, length of time of the draw, etc.).

The device may comprise a controller or may be connectable to a controller that may be configured to control at least one function of the device. The controller may comprise a microcontroller that may, e.g., be mounted on a printed circuit board (PCB). The controller may also comprise a memory, e.g., non-volatile memory. The memory may include instructions, which, when implemented, may cause the controller to perform certain tasks or steps of a method. Where the device comprises an input connection, the controller may be connected to the input connection.

The controller may be configured to control the operation of the heater (and, e.g., the heating element). Thus, the controller may be configured to control vaporization of an aerosol forming part of an aerosol-forming article engaged with the device. Further, the controller may be configured to determine the amount of remaining consumable to be consumed in a session and intimate to the user about the remaining consumable either at a predetermined interval or on user request. In addition, the controller may be configured to control the voltage applied by power source to the heater. For example, the controller may be configured to toggle between applying a full output voltage (of the power source) to the heater and applying no voltage to the heater. Alternatively or additionally, the control unit may implement a more complex heater control protocol.

The device may further comprise a voltage regulator to regulate the output voltage supplied by the power source to form a regulated voltage. The regulated voltage may subsequently be applied to the heater.

In some embodiments, where the device comprises a UI, the controller may be operatively connected to one or more components of the UI. The controller may be configured to receive command signals from an input means of the UI. The controller may be configured to control the heater in response to the command signals. For example, the controller may be configured to receive "on" and "off" command signals from the UI and, in response, may control the heater so as to be in a corresponding on or off state.

The controller may be configured to send output signals to a component of the UI. The UI may be configured to convey information to a user, via an output means, in response to such output signals (received from the controller). For example, where the device comprises one or more LEDs, the LEDs may be operatively connected to the controller. Hence, the controller may be configured to control the illumination of the LEDs (e.g., in response to an output signal). For example, the controller may be configured to control the illumination of the LEDs according to (e.g., an on or off) state of the heater.

Where the device comprises a sensor (e.g., a puff/airflow sensor), the controller may be operatively connected to the sensor. The controller may be configured to receive a signal from the sensor (e.g., indicative of a condition of the device and/or engaged aerosol-forming article). The controller may be configured to control the heater, or an aspect of the output means, based on the signal from the sensor.

The device may further include a display connected to the controller. Said display may be configured to display the amount of remaining consumable in the session, as determined by the controller. In one embodiment, the display may be configured to display the amount of remaining consumable in the session, at a predetermined interval of time. In another embodiment, the display may be configured to display the amount of remaining consumable in the session, in response to receiving user input. In an aspect of the eighteenth mode, the display device may be a separate unit within the smoking substitute device or may form a part of output means of the UI.

The device may comprise a wireless interface configured to communicate wirelessly (e.g., via Bluetooth (e.g., a Bluetooth low-energy connection) or Wi-Fi) with an external device. Similarly, the input connection may be configured for wired connection to an external device so as to provide communication between the device and the external device.

The external device may be a mobile device. For example, the external device may be a smart phone, tablet, smart watch, or smart car. An application (e.g., app) may be installed on the external device (e.g., mobile device). The application may facilitate communication between the device and the external device via the wired or wireless connection.

The wireless or wired interface may be configured to transfer signals between the external device and the controller of the device. In this respect, the controller may control an aspect of the device in response to a signal received from an external device. Alternatively or additionally, an external device may respond to a signal received from the device (e.g., from the controller of the device).

In a third aspect of the eighteenth mode, there is provided a system (e.g., a smoking substitute system) comprising a device according to the first and second aspects and an aerosol-forming article. The aerosol-forming article may comprise an aerosol-forming substrate at an upstream end of the aerosol-forming article. The article may be in the form of a smoking substitute article, e.g., heated tobacco (HT) consumable (also known as a heat-not-burn (HNB) consumable).

As used herein, the terms "upstream" and "downstream" are intended to refer to the flow direction of the vapor/aerosol, i.e., with the downstream end of the article/consumable being the mouth end or outlet where the aerosol exits the consumable for inhalation by the user. The upstream end of the article/consumable is the opposing end to the downstream end.

The aerosol-forming substrate is capable of being heated to release at least one volatile compound that can form an aerosol. The aerosol-forming substrate may be located at the upstream end of the article/consumable.

In order to generate an aerosol, the aerosol-forming substrate comprises at least one volatile compound that is intended to be vaporized/aerosolized and that may provide the user with a recreational and/or medicinal effect when inhaled. Suitable chemical and/or physiologically active volatile compounds include the group consisting of nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius*, *Arctostaphylos uva-ursi* (Bearberry), *Argemone mexicana*, *Arnica*, *Artemisia vulgaris*, Yellow Tees, *Galea zacatechichi*, *Canavalia maritima* (Baybean), *Cecropia mexicana* (Guamura), *Cestrum nocturnum*, *Cynoglossum virginianum* (wild comfrey), *Cytisus scoparius*, Damiana, *Entada rheedii*, *Eschscholzia californica* (California Poppy), *Fittonia albivenis*, *Hippobroma longiflora*, *Humulus japonica* (Japanese Hops), *Humulus lupulus* (Hops), *Lactuca virosa* (Lettuce Opium), *Laggera alata*, *Leonotis leonurus*, *Leonurus cardiaca* (Motherwort), *Leonurus sibiricus* (Honeyweed), *Lobelia cardinalis*, *Lobelia inflata* (Indian-tobacco), *Lobelia siphilitica*, *Nepeta cataria* (Catnip), *Nicotiana* species (Tobacco), *Nymphaea alba* (White Lily), *Nymphaea caerulea* (Blue Lily), Opium poppy, *Passiflora incarnata* (Passionflower), *Pedicularis densiflora* (Indian Warrior), *Pedicularis groenlandica* (Elephant's Head), *Salvia divinorum*, *Salvia dorrii* (Tobacco Sage), *Salvia* species (Sage), *Scutellaria galericulata*, *Scutellaria lateriflora*, *Scutellaria nana*, *Scutellaria species* (Skullcap), *Sida acuta* (Wireweed), *Sida rhombifolia*, *Silene capensis*, *Syzygium aromaticum* (Clove), *Tagetes lucida* (Mexican Tarragon), *Tarchonanthus camphoratus*, *Turnera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above-mentioned tobaccos.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, and aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal filter element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the article/consumable may comprise an aerosol-cooling element which is adapted to cool the aerosol generated from the aerosol-forming substrate (by heat exchange) before being inhaled by the user.

The article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

According to a third aspect of the eighteenth mode, there is provided a smoking substitute device configured to consume a consumable in a session. The device comprises a display and a controller, the controller being configured to determine the remaining usable lifetime of the consumable in said session based on the type of consumable, and display said remaining usable lifetime at the display.

All of the options described above in relation to the first aspect apply equally to the third aspect, mutatis mutandis.

According to a fourth aspect of the eighteenth mode, there is provided a method of using the system according to the second aspect, the method comprising inserting the aerosol-forming article into the device; and heating the article using the heater of the device.

In some embodiments the method may comprise inserting the article into a cavity within a body of the device and penetrating the article with the heating element of the device upon insertion of the article.

According to a fifth aspect of the eighteenth mode, there is provided a method of consuming a consumable in a session with a smoking substitute device comprising a display and a controller, the method comprising determining remaining usable lifetime of the consumable to be consumed in said session and displaying said remaining usable lifetime of the consumable in predetermined intervals on the display.

In some embodiments, the method comprises determining the remaining usable lifetime of the consumable in response to a user input, wherein the user input optionally comprises pressing of at least one button in a predetermined pattern for a predetermined time period.

Optionally, the method comprises measuring ambient temperature, and incorporating the ambient temperature into the determination of the remaining usable lifetime of the consumable.

In some embodiments, the method comprises determining the amount of remaining usable lifetime of the consumable based on remaining time left in the smoking session.

In some embodiments, the method comprises determining the remaining usable lifetime of the consumable in proportion to total duration of the consumable cycle.

According to a sixth aspect of the eighteenth mode, there is provided a method of consuming a consumable in a session with a smoking substitute device comprising a display and a controller, the method comprising determining the remaining usable lifetime of the consumable to be consumed in said session in response to determining type of consumable and displaying said remaining usable lifetime of the consumable on the display.

In some embodiments, the method comprises determining the remaining usable lifetime of the consumable in response to a user input, wherein the user input optionally comprises pressing of at least one button in a predetermined pattern for a predetermined time period.

Optionally, the method comprises measuring ambient temperature, and incorporating the ambient temperature into the determination of the remaining usable lifetime of the consumable.

In some embodiments, the method comprises determining the amount of remaining usable lifetime of the consumable based on remaining time left in the smoking session.

In some embodiments, the method comprises determining the remaining usable lifetime of the consumable in proportion to total duration of the consumable cycle.

Options and preferences set out above in respect of the first aspect apply equally to the fifth and sixth aspect, mutatis mutandis.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

SUMMARY OF THE FIGURES

So that the disclosure may be understood, and so that further aspects and features thereof may be appreciated, embodiments illustrating the principles of the disclosure will now be discussed in further detail with reference to the accompanying figures, in which:

FIG. 5A is a front view of a first embodiment of the second mode of the smoking substitute system with the consumable engaged with the device;

FIG. 5B is a front view of the first embodiment of the second mode of the smoking substitute system with the consumable disengaged from the device;

FIG. 5C is a section view of the consumable of the first embodiment of the second mode of the smoking substitute system;

FIG. 5D is a detailed view of an end of the device of the first embodiment of the second mode of the smoking substitute system;

FIG. 5E is a section view of the first embodiment of the second mode of the smoking substitute system;

FIG. 30A is a front view of a second embodiment of the tenth mode of the smoking substitute system with the consumable engaged with the device;

FIG. 30B is a front view of a second embodiment of the tenth mode of the smoking substitute system with the consumable disengaged from the device;

FIG. 40C is a section view of the consumable of the first embodiment of the fourteenth mode of the smoking substitute system;

FIG. 40D is a detailed view of an end of the device of the first embodiment of the fourteenth mode of the smoking substitute system;

FIG. 40E is a section view of the first embodiment of the fourteenth mode of the smoking substitute system;

FIG. 41 is a flowchart illustrating method of detecting presence of a consumable in the cavity of the device in accordance with an aspect of the fourteenth mode;

FIG. 42A is a schematic of a fifteenth mode of the smoking substitute system;

FIG. 42B is a schematic of a variation of the fifteenth mode of the smoking substitute system of FIG. 42A;

FIG. 43A is a front view of a first embodiment of the fifteenth mode of the smoking substitute system with the consumable engaged with the device;

FIG. 43B is a front view of the first embodiment of the fifteenth mode of the smoking substitute system with the consumable disengaged from the device;

FIG. 43C is a section view of the consumable of the first embodiment of the fifteenth mode of the smoking substitute system;

FIG. 43D is a detailed view of an end of the device of the first embodiment of the fifteenth mode of the smoking substitute system;

FIG. 43E is a section view of the first embodiment of the fifteenth mode of the smoking substitute system;

FIG. 44 is a flowchart illustrating a method of operating the fifteenth mode of the smoking substitute device;

Figure 45A:
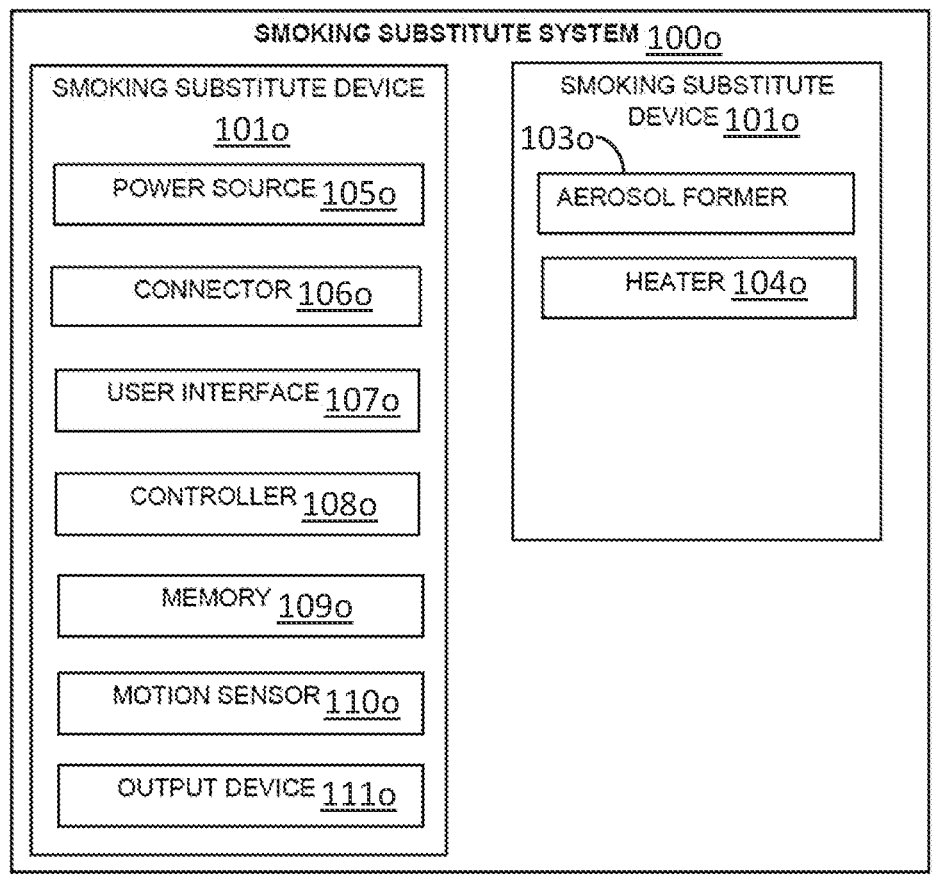
Figure 45B:
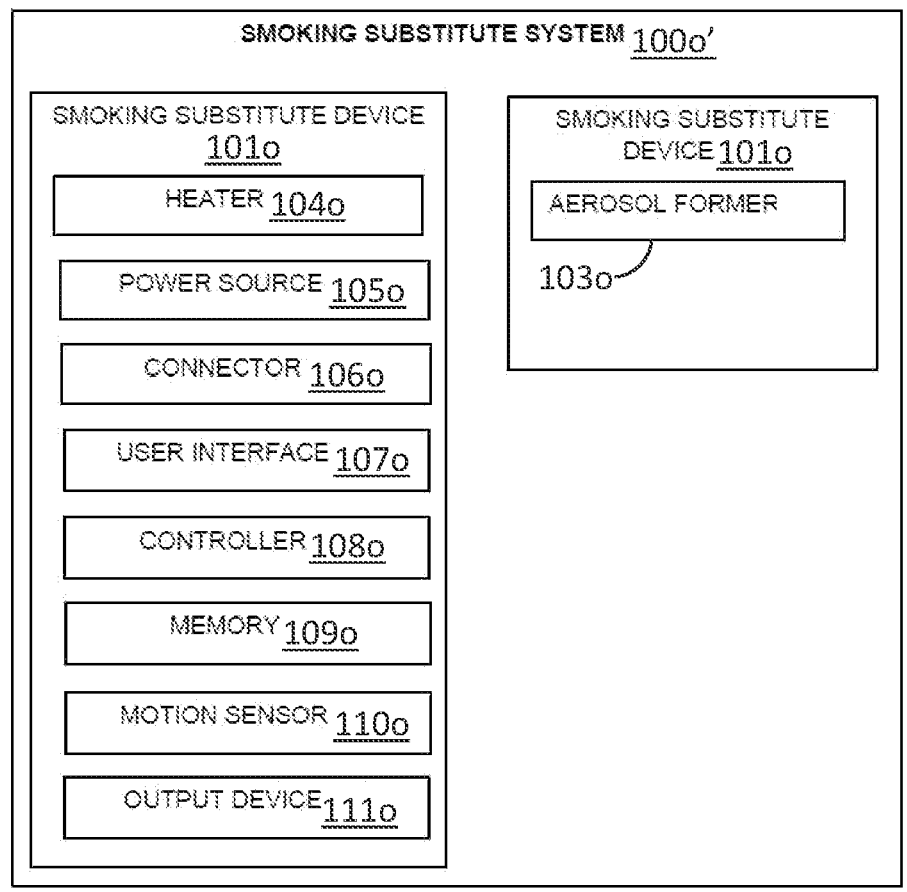
Figure 46A:
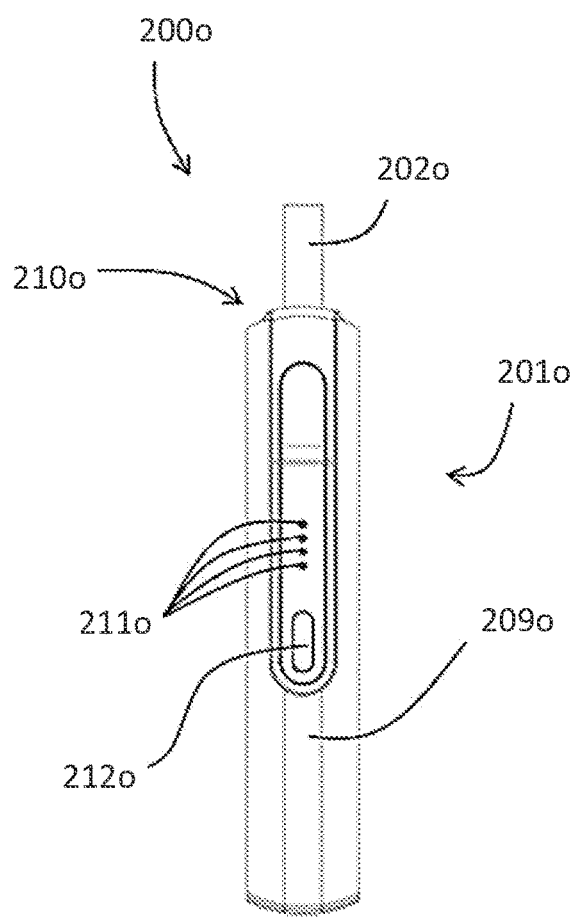
Figure 46B:
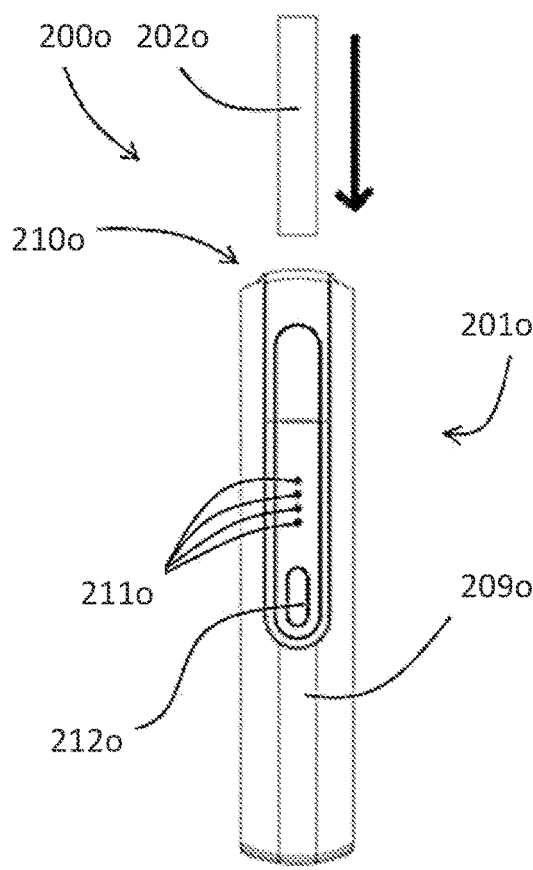
Figure 46C:
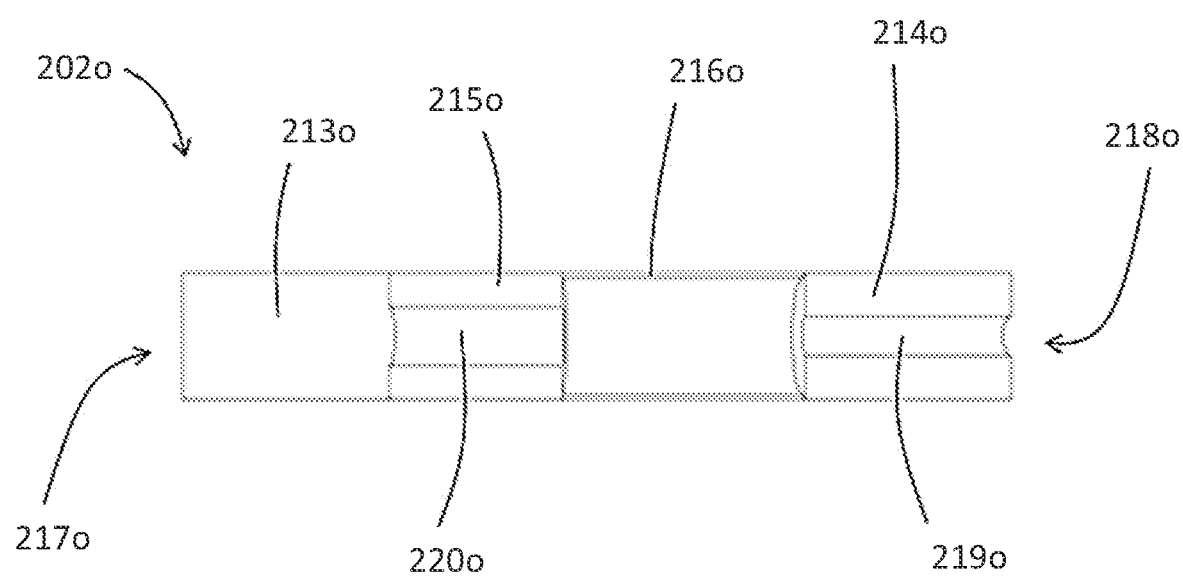
Figure 46D:
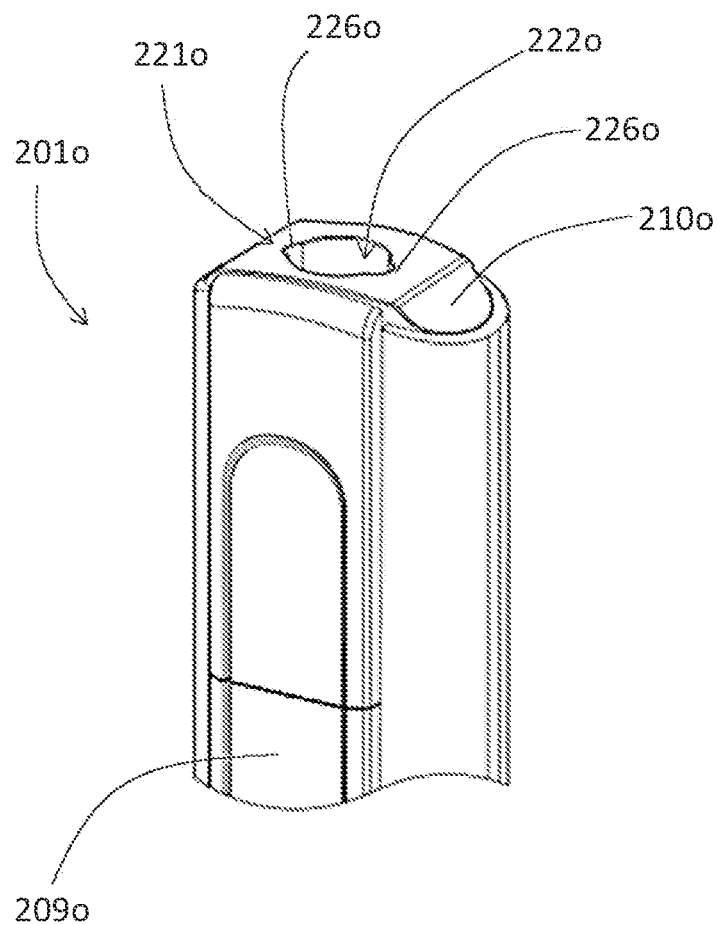
Figure 46E:
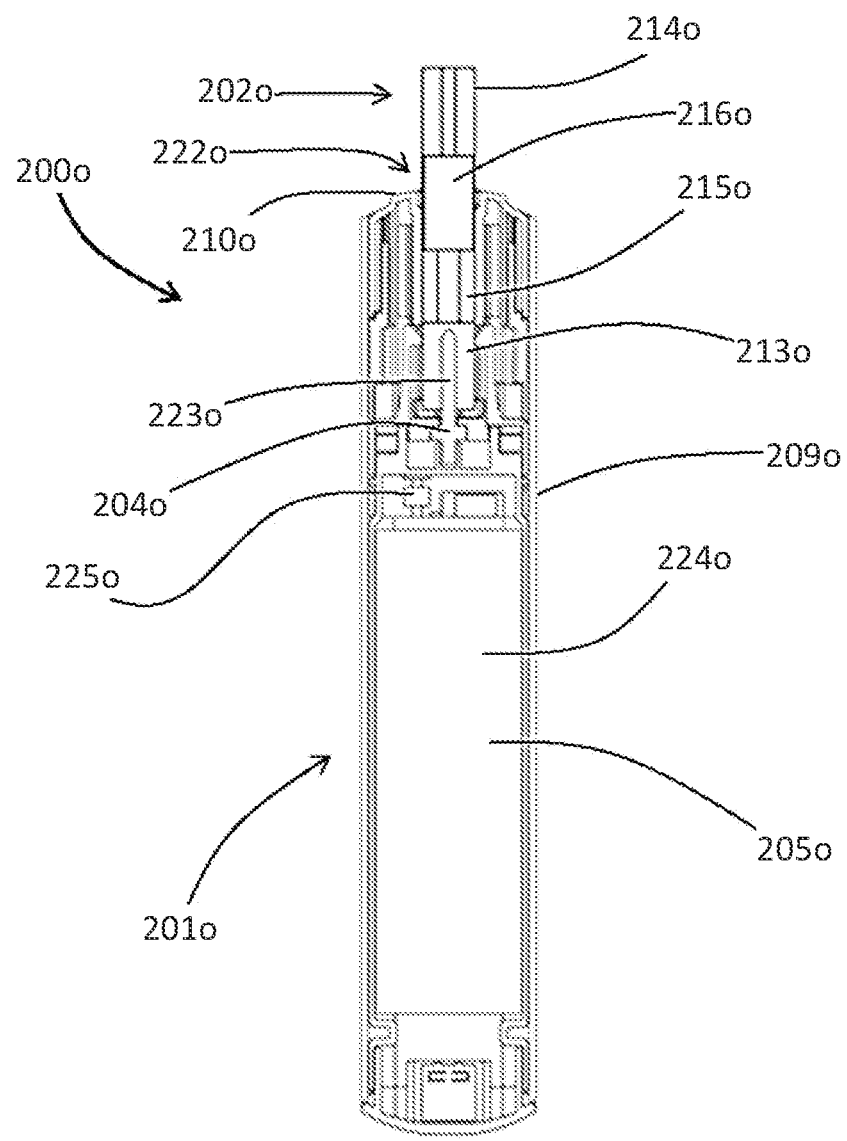
Figure 47:
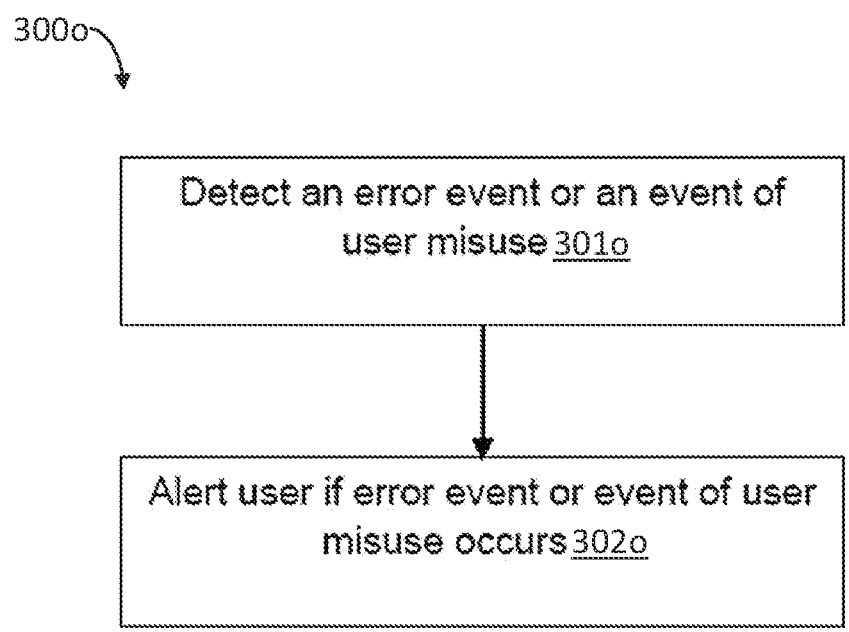
Figure 48A:
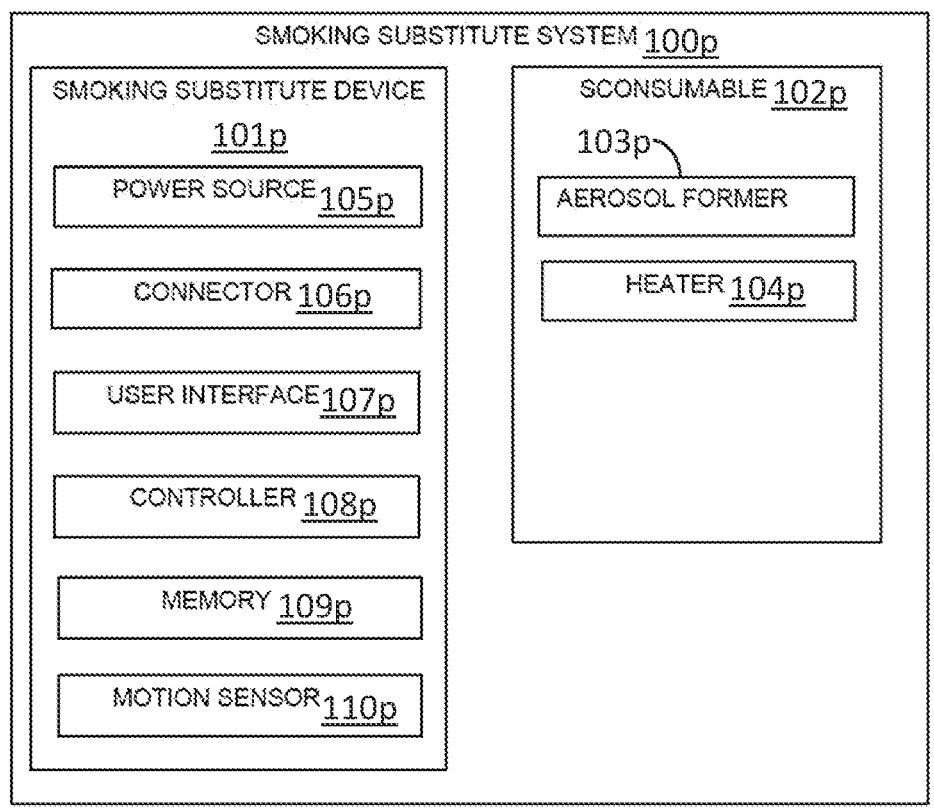
Figure 48B:
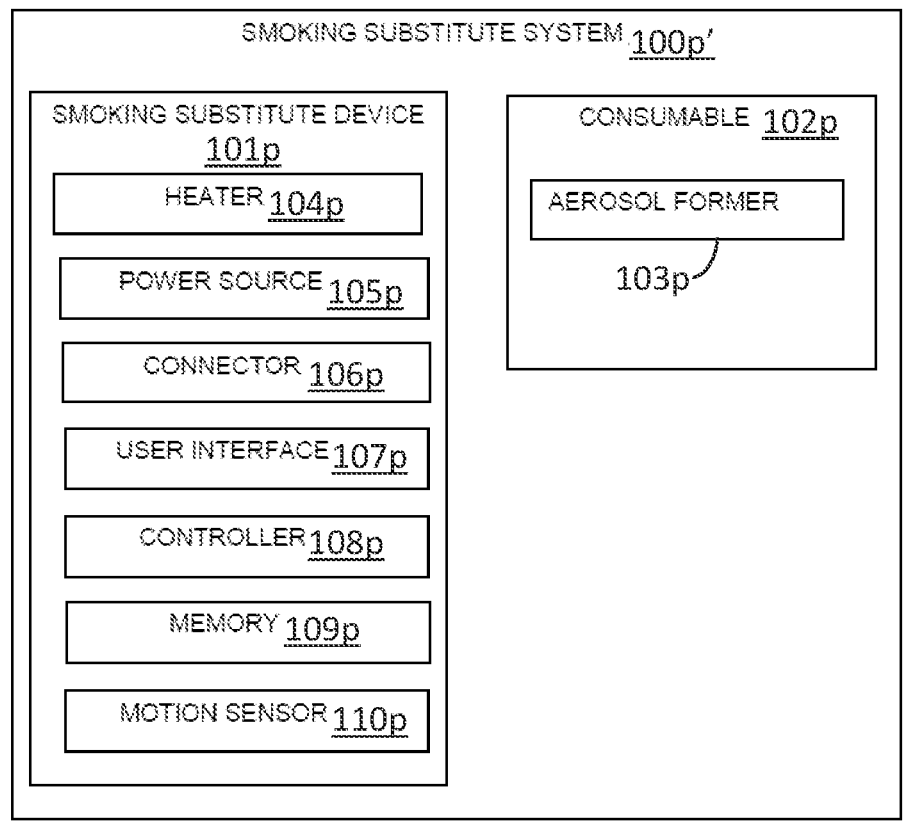
Figure 49A:
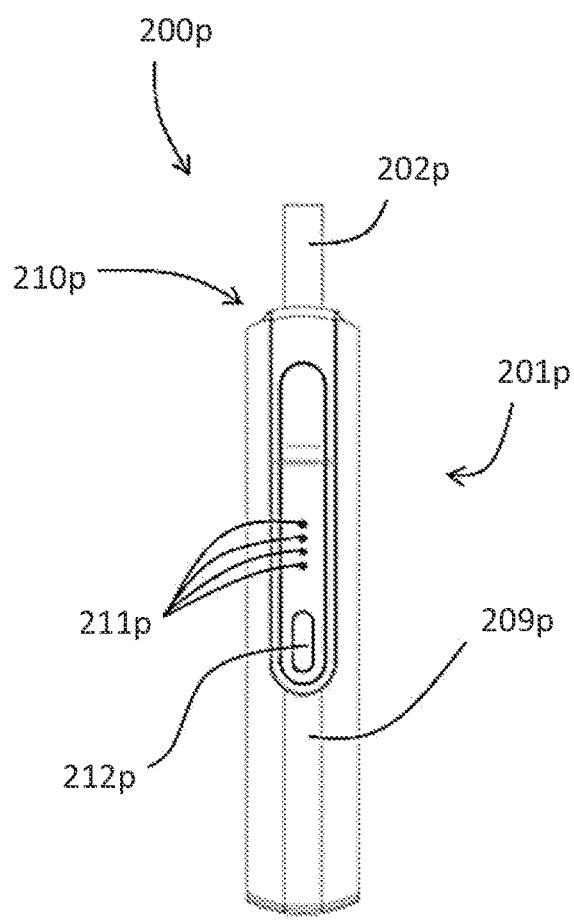
Figure 49B:
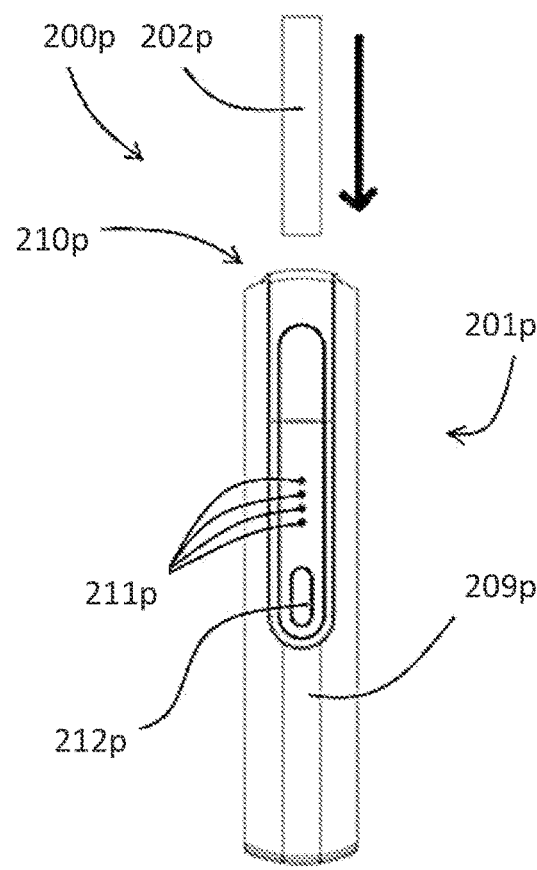
Figure 49C:
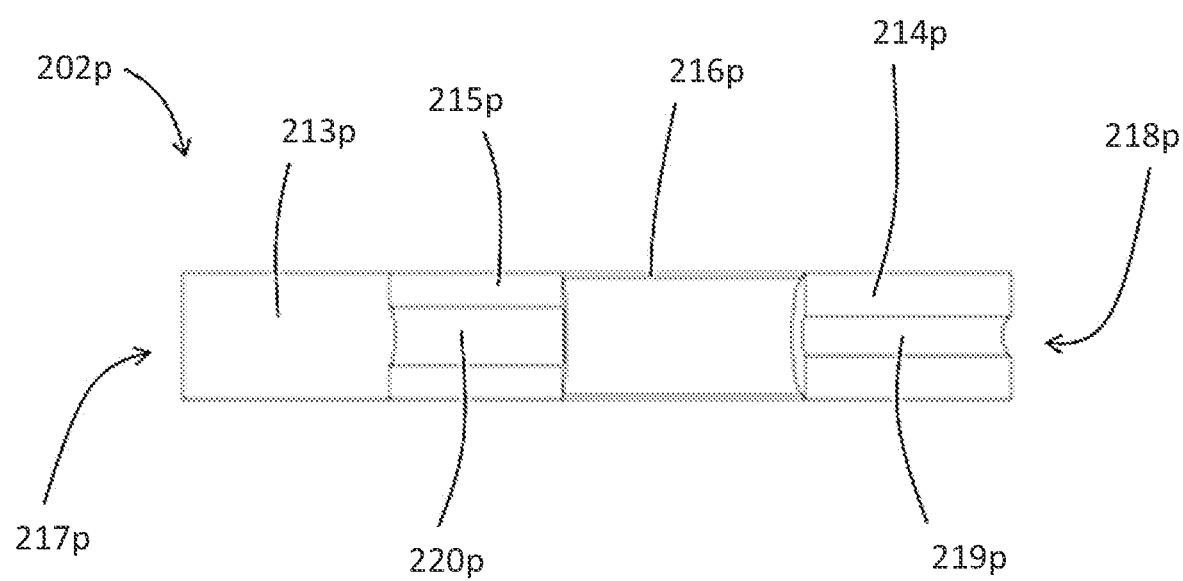
Figure 49D:
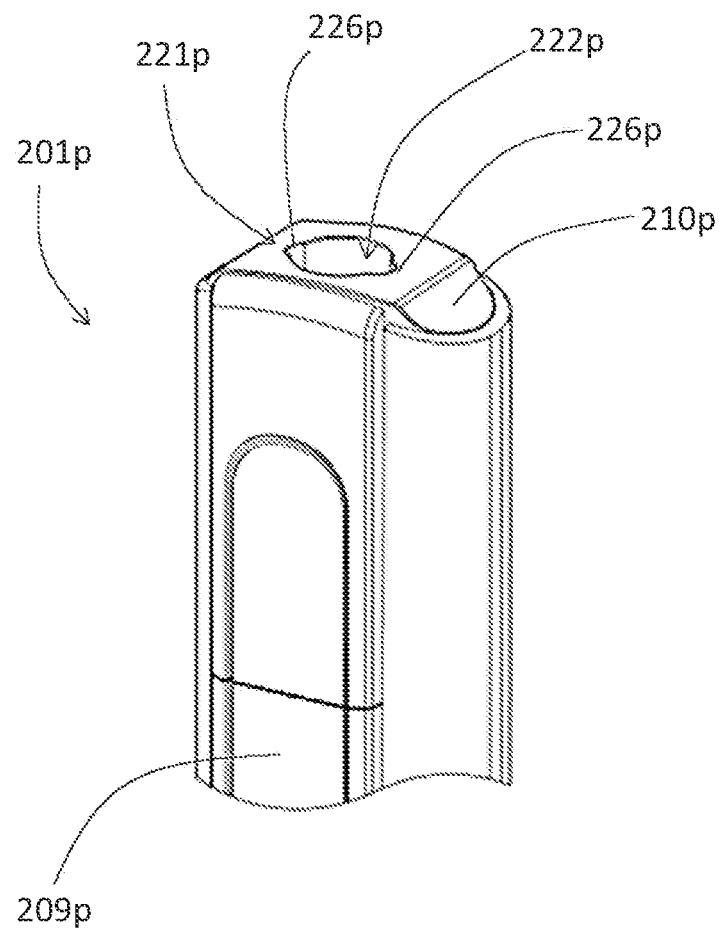
Figure 49E:
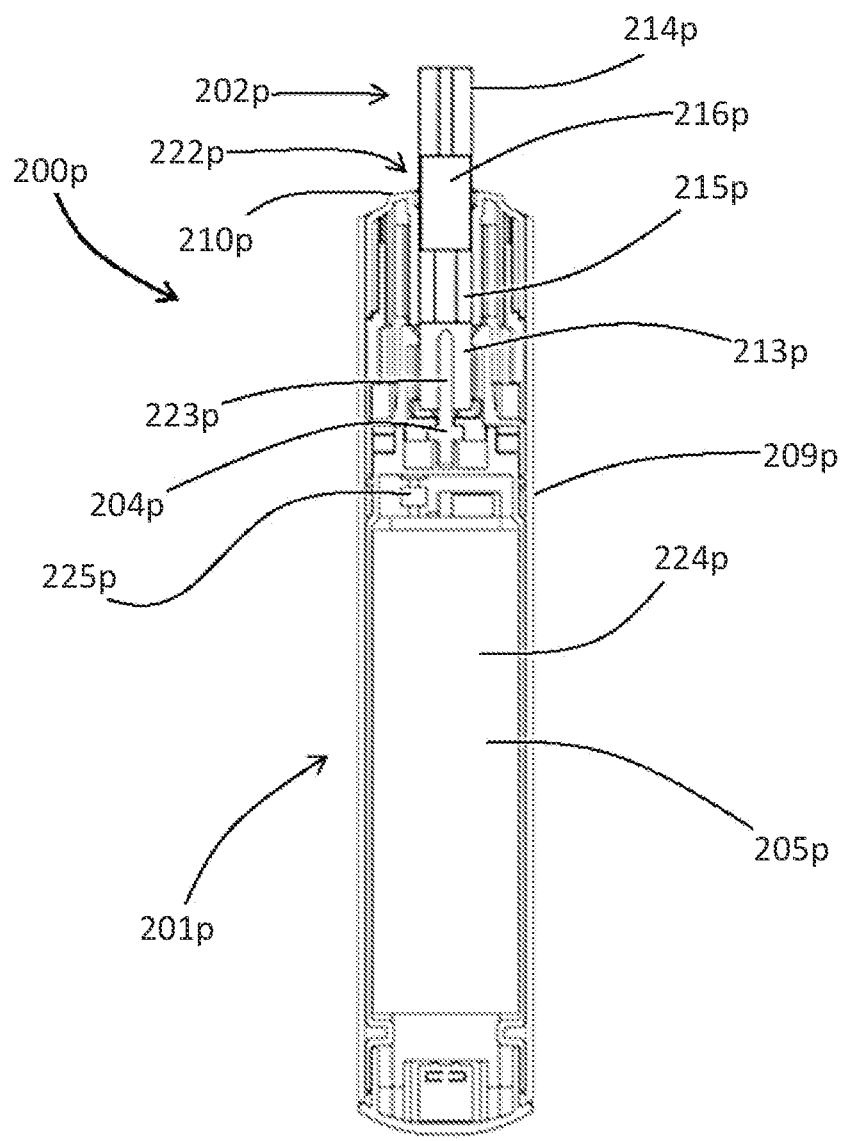
Figure 51:
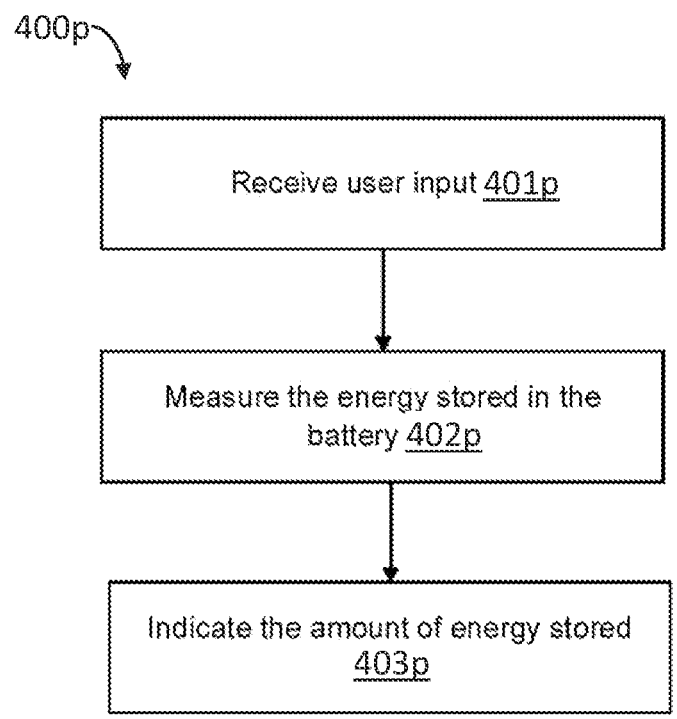
Figure 52A:
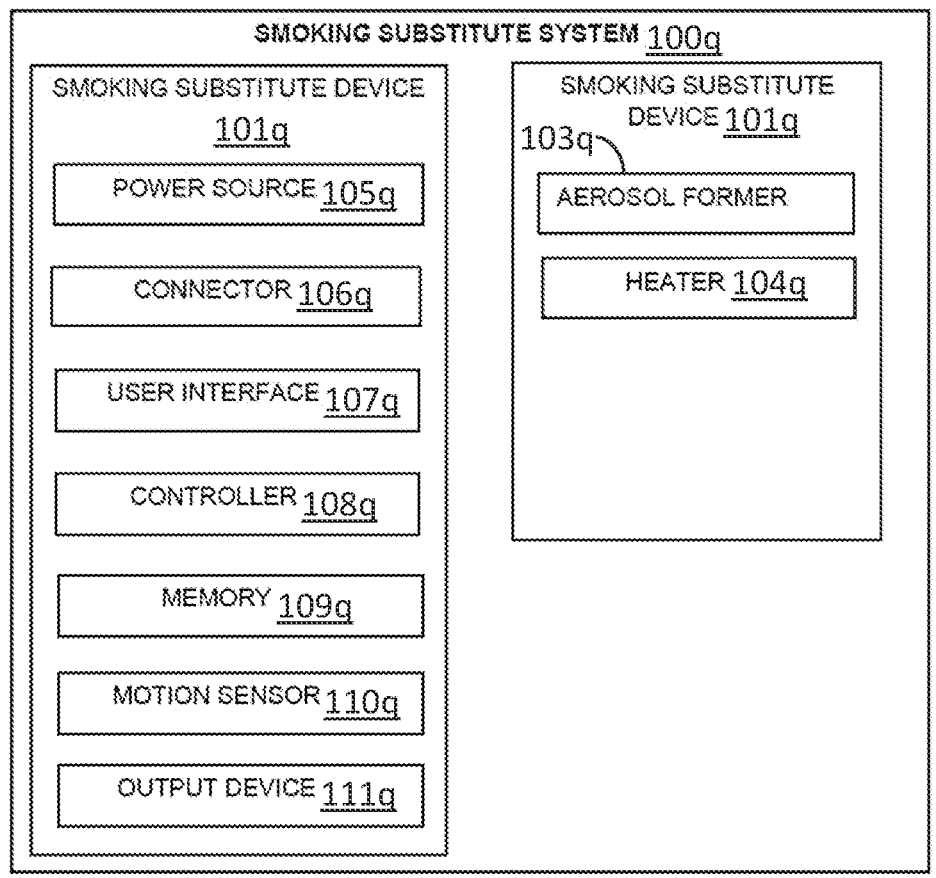
Figure 52B:
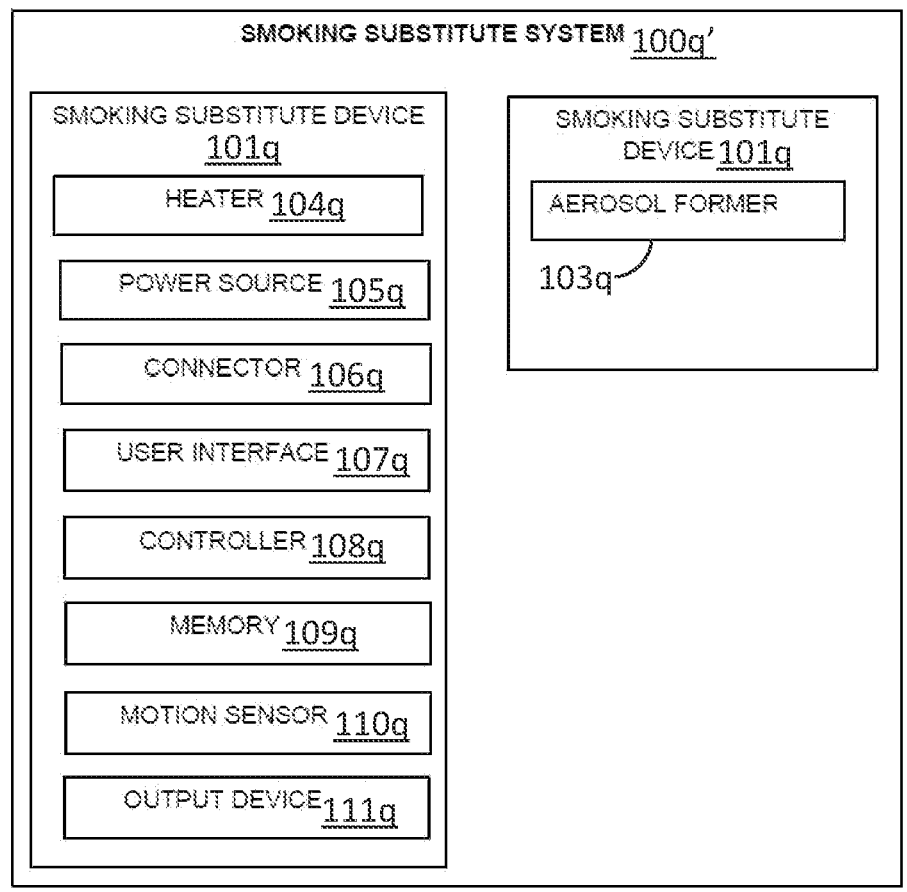
Figure 53A:
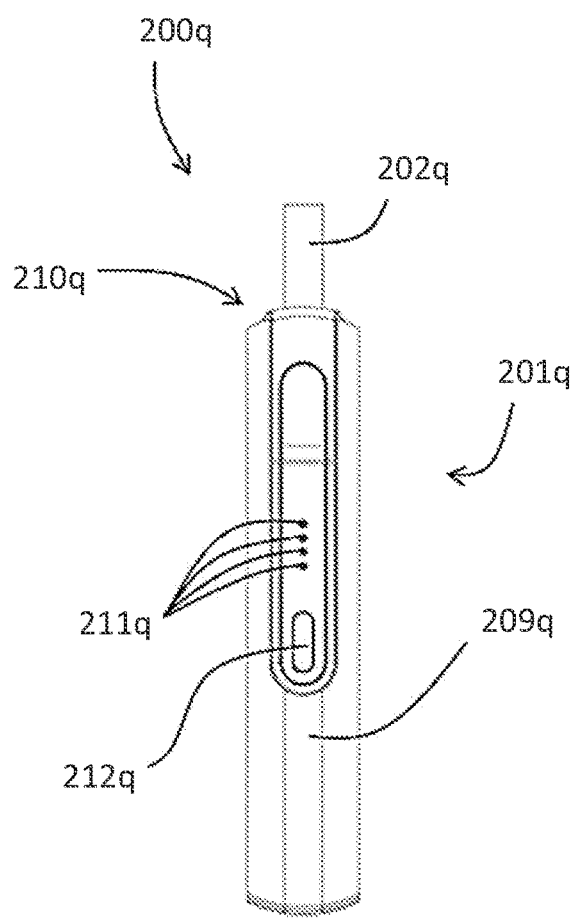
Figure 53B:
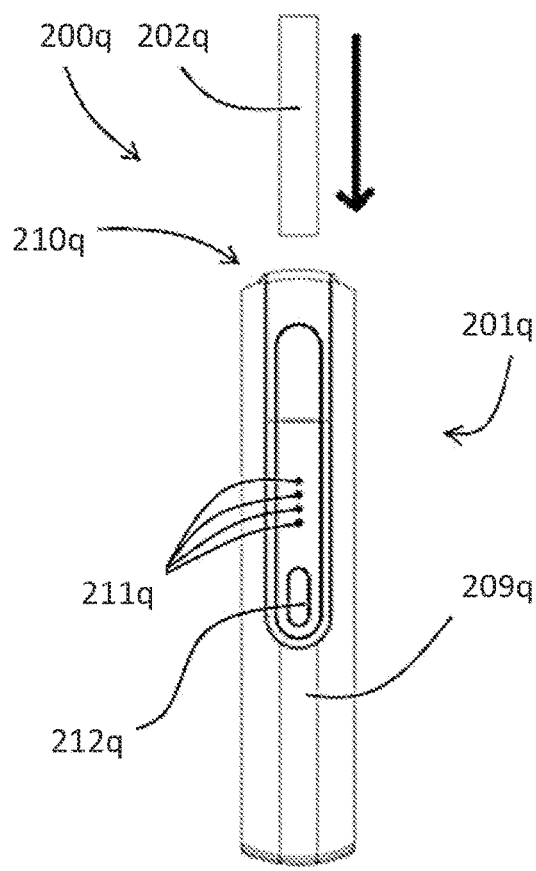
Figure 53C:
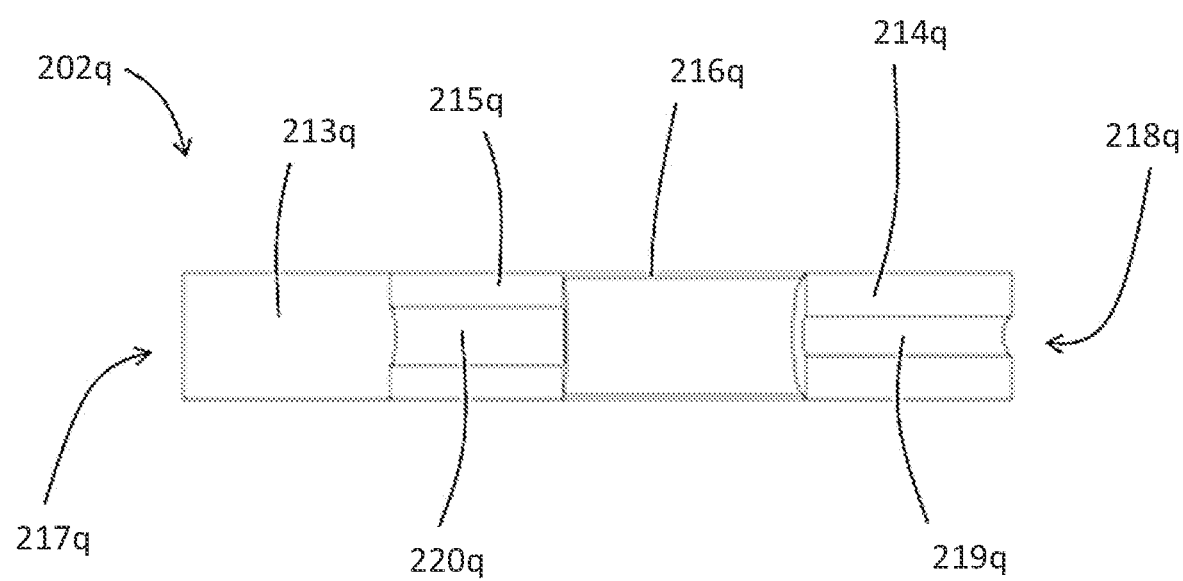
Figure 53D:
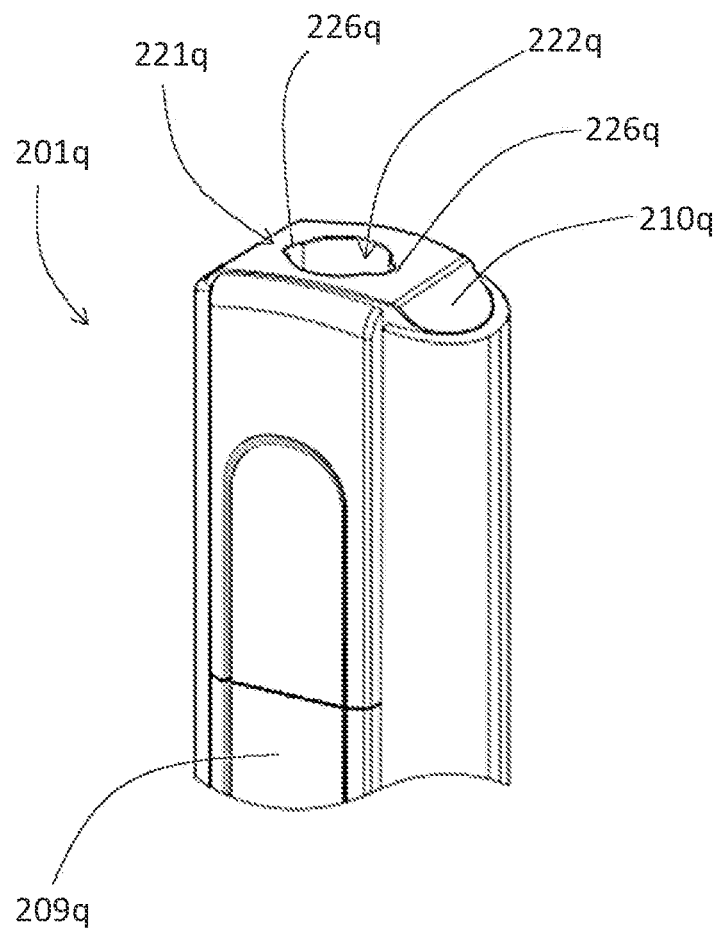
Figure 53E:
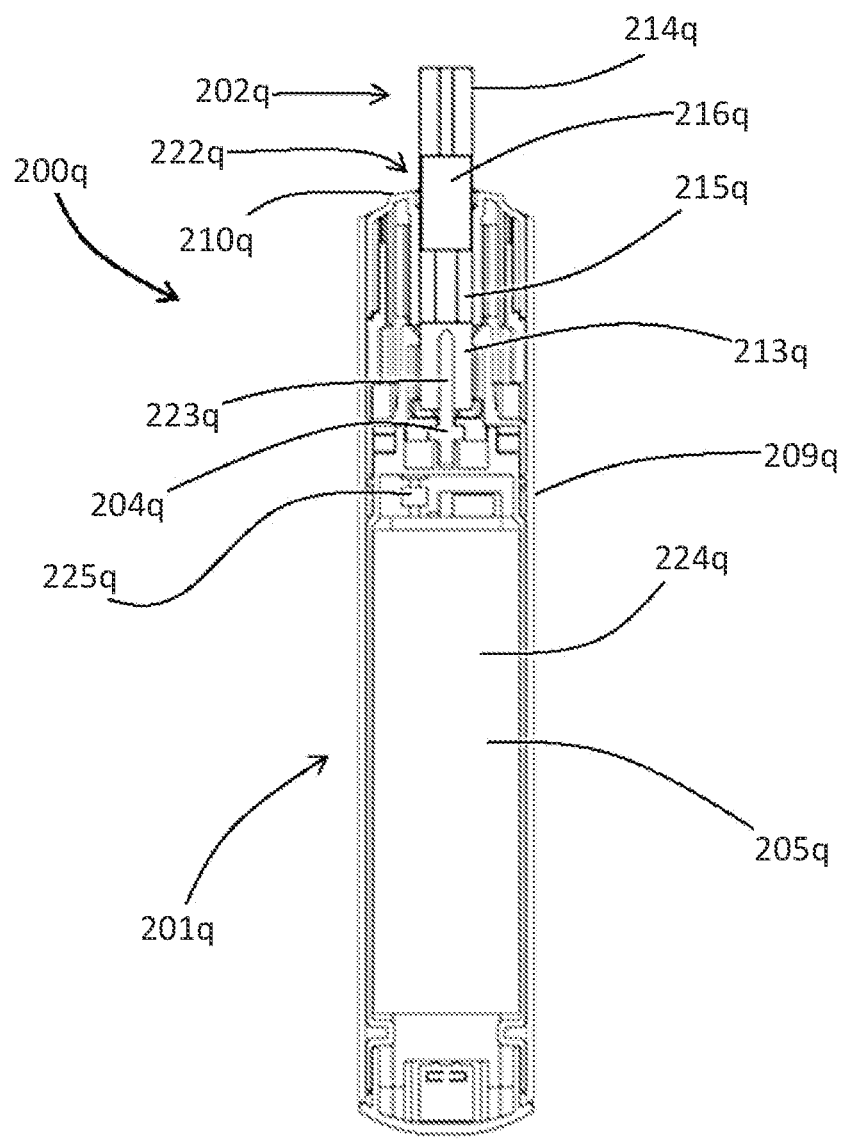
Figure 54A:
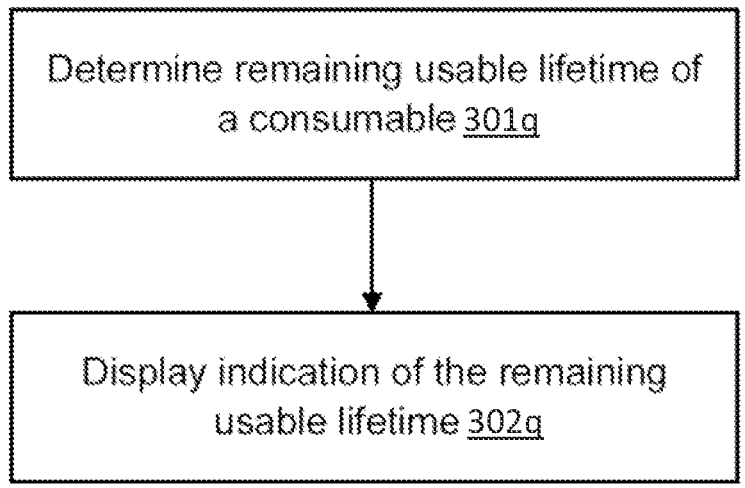
Figure 54B:
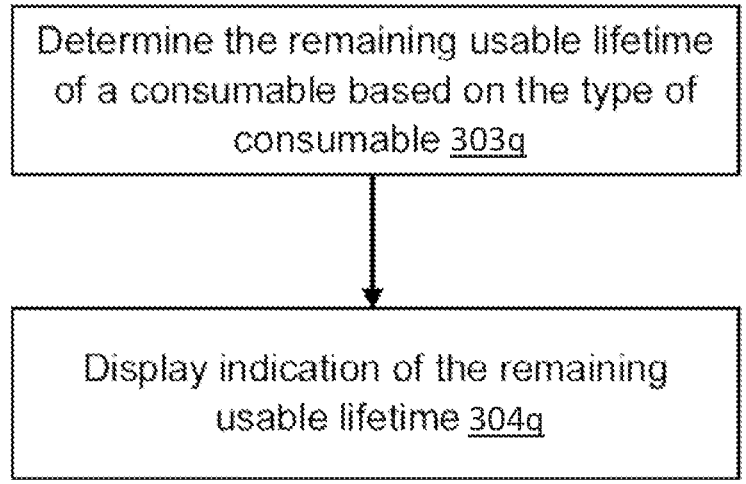

FIG. 45A is a schematic of a sixteenth mode of the smoking substitute system;

FIG. 45B is a schematic of a variation of the sixteenth mode of the smoking substitute system of FIG. 45A;

FIG. 46A is a front view of a first embodiment of the sixteenth mode of the smoking substitute system with the consumable engaged with the device;

FIG. 46B is a front view of the first embodiment of the sixteenth mode of the smoking substitute system with the consumable disengaged from the device;

FIG. 46C is a section view of the consumable of the first embodiment of the sixteenth mode of the smoking substitute system;

FIG. 46D is a detailed view of an end of the device of the first embodiment of the sixteenth mode of the smoking substitute system;

FIG. 46E is a section view of the first embodiment of the sixteenth mode of the smoking substitute system;

FIG. 47 is a flowchart illustrating method for detecting an occurrence of an error event or an event of user misuse in accordance with an aspect of the sixteenth mode;

FIG. 48A is a schematic of a seventeenth mode of the smoking substitute system;

FIG. 48B is a schematic of a variation of the seventeenth mode of the smoking substitute system of FIG. 48A;

FIG. 49A is a front view of a first embodiment of the seventeenth mode of the smoking substitute system with the consumable engaged with the device;

FIG. 49B is a front view of the first embodiment of the seventeenth mode of the smoking substitute system with the consumable disengaged from the device;

FIG. 49C is a section view of the consumable of the first embodiment of the seventeenth mode of the smoking substitute system;

FIG. 49D is a detailed view of an end of the device of the first embodiment of the seventeenth mode of the smoking substitute system;

FIG. 49E is a section view of the first embodiment of the seventeenth mode of the smoking substitute system;

FIG. 50A is a front view of a second embodiment of the seventeenth mode of the smoking substitute system with the consumable engaged with the device;

FIG. 50B is a front view of a second embodiment of the seventeenth mode of the smoking substitute system with the consumable disengaged from the device;

FIG. 51 is a flowchart illustrating a method for operating the device in accordance with an aspect of the seventeenth mode;

FIG. 52A is a schematic of an eighteenth mode of the smoking substitute system;

FIG. 52B is a schematic of a variation of the eighteenth mode of the smoking substitute system of FIG. 52A;

FIG. 53A is a front view of a first embodiment of the eighteenth mode of the smoking substitute system with the consumable engaged with the device;

FIG. 53B is a front view of the first embodiment of the eighteenth mode of the smoking substitute system with the consumable disengaged from the device;

FIG. 53C is a section view of the consumable of the first embodiment of the eighteenth mode of the smoking substitute system;

FIG. 53D is a detailed view of an end of the device of the first embodiment of the eighteenth mode of the smoking substitute system;

FIG. 53E is a section view of the first embodiment of the eighteenth mode of the smoking substitute system;

FIG. 54A is a flowchart illustrating method of determining the amount of remaining consumable in a session in accordance with an aspect of the eighteenth mode; and FIG. 54B is a flowchart illustrating method of determining the amount of remaining consumable in a session, based on type of consumable, in accordance with an aspect of the eighteenth mode.

DETAILED DESCRIPTION OF THE FIGURES

First Mode: A Smoking Substitute Device Adapted to Operate while Receiving Power from an External Rechargeable Power Source Device.

Aspects and embodiments of the first mode of the present disclosure will now be discussed with reference to the accompanying figures. Further aspects and embodiments will be apparent to those skilled in the art. All documents mentioned in this text are incorporated herein by reference.

Figure 1A:
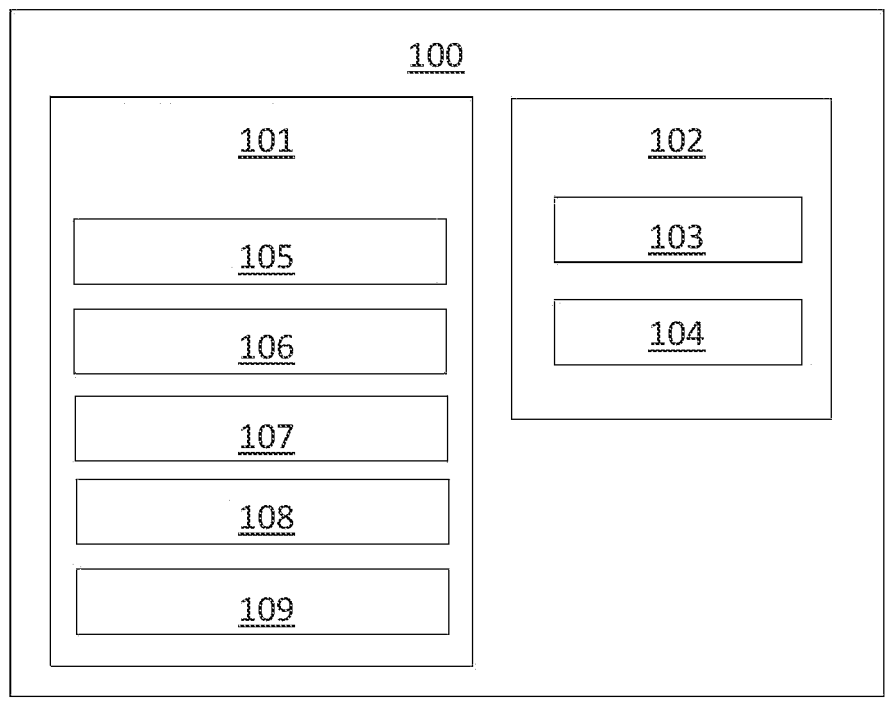
FIG. 1A is a schematic of a first mode of a smoking substitute system.

FIG. 1A is a schematic providing a general overview of a smoking substitute system 100. The system 100 includes a substitute smoking device 101 and an aerosol-forming article in the form of a consumable 102, which comprises an aerosol former 103. The system is configured to vaporize the aerosol former by heating the aerosol former 103 (so as to form a vapor/aerosol for inhalation by a user).

In the illustrated system, the heater 104 forms part of the consumable 102 and is configured to heat the aerosol former 103. Heat from the heater 104 vaporizes the aerosol former 103 to produce a vapor. The vapor subsequently condenses to form an aerosol, which is ultimately inhaled by the user.

The system 100 further comprises a power source 105 that forms part of the device 101. In other embodiments the power source 105 may be external to (but connectable to) the device 101 via a port. The power source 105 is electrically connectable to the heater 104 such that the power source 105 is able to supply power to the heater 104 (i.e., for the purpose of heating the aerosol former 103). Thus, control of the electrical connection of the power source 105 to the heater 104 provides control of the state of the heater 104. The power source 105 may be a power store, for example a battery or rechargeable battery (e.g., a lithium-ion battery).

The system 100 further comprises an I/O module comprising a connector 106 (e.g., in the form of a USB port, Micro USB port, USB-C port, etc.). The connector 106 is configured for connection to an external source of electrical power, e.g., a mains electrical supply outlet. The connector 106 may be used in substitution for the power source 105. That is the connector 106 may be electrically connectable to the heater 104 so as to supply electricity to the heater 104. In such embodiments, the device may not include a power source, and the power source of the system may instead comprise the connector 106 and an external source of electrical power (to which the connector 106 provides electrical connection).

In some embodiments, the connector 106 may be used to charge and recharge the power source 105 where the power source 105 includes a rechargeable battery. The power source 105 may receive power from the port or the connector 106 to supply the power to the heater 104.

The system 100 also comprises a user interface (UI) 107. Although not shown, the UI 107 may include input means to receive commands from a user. The input means of the UI 107 allows the user to control at least one aspect of the operation of the system 100. The input means may, for example, be in the form of a button, touchscreen, switch, microphone, etc.

The UI 107 also comprises output means to convey information to the user. The output means may, for example, comprise lights (e.g., LEDs), a display screen, speaker, vibration generator, etc.

The system 100 further comprises a controller 108 that is configured to control at least one function of the device 101. In the illustrated embodiment, the controller 108 is a component of the device 101, but in other embodiments may be separate from (but connectable to) the device 101. The controller 108 is coupled to a memory 109 that stores instructions of the controller 108 in controlling at least one function of the device 101 while receiving power from the port.

The controller 108 is configured to control the operation of the heater 104 and, for example, may be configured to control the voltage applied from the power source 105 to the heater 104. The controller 108 may be configured to toggle the supply of power to the heater 105 between an on state, in which the full output voltage of the power source 105 is applied to the heater 104, and an off state, in which the no voltage is applied to the heater 104. In one aspect, the controller 108 is configured to control output power to the heater 104 while still receiving power from the port.

Although not shown, the system 100 may also comprise a voltage regulator to regulate the output voltage from the power source 105 to form a regulated voltage. The regulated voltage may then be applied to the heater 104.

In addition to being connected to the heater 104, the controller 108 is operatively connected to the UI 107. Thus, the controller 108 may receive an input signal from the input means of the UI 107. Similarly the controller 108 may transmit output signals to the UI 107. In response, the output means of the UI 107 may convey information, based on the output signals, to a user.

Figure 1B:
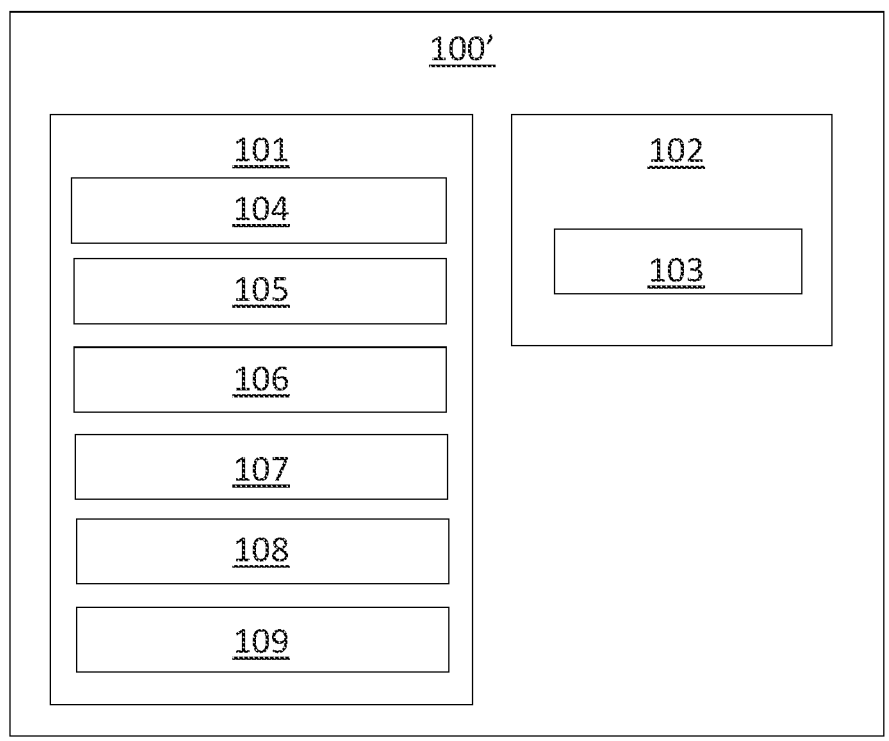
FIG. 1B is a schematic of a variation of the first mode of the smoking substitute system of FIG. 1A.

FIG. 1B is a schematic showing a variation of the system 100 of FIG. 1A. In the system 100' of FIG. 1B, the heater 104 forms part of the consumable 102, rather than the device 101. In this variation, the heater 104 is electrically connectable to the power source 105, for example, when the consumable 102 is engaged with the device 101.

Figure 2A:
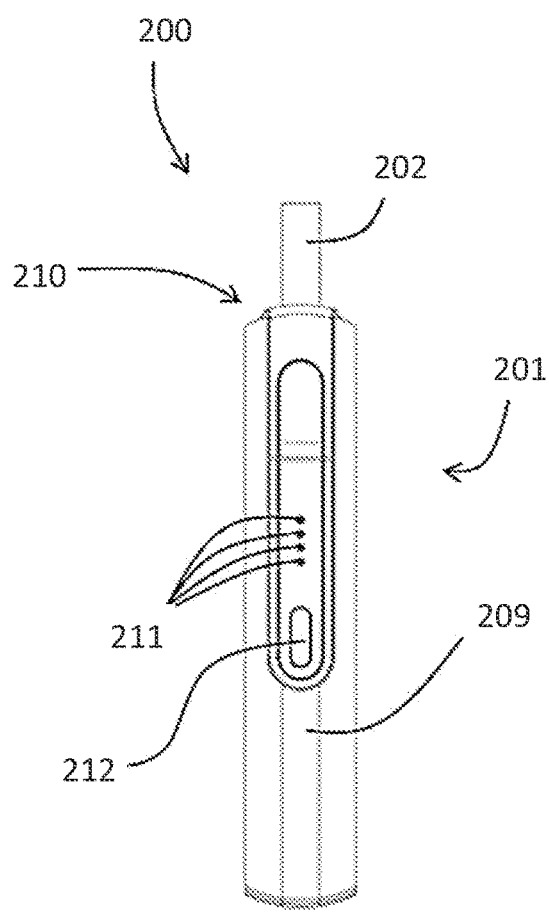
FIG. 2A is a front view of a first embodiment of the first mode of a smoking substitute system with the consumable engaged with the device.
Figure 2B:
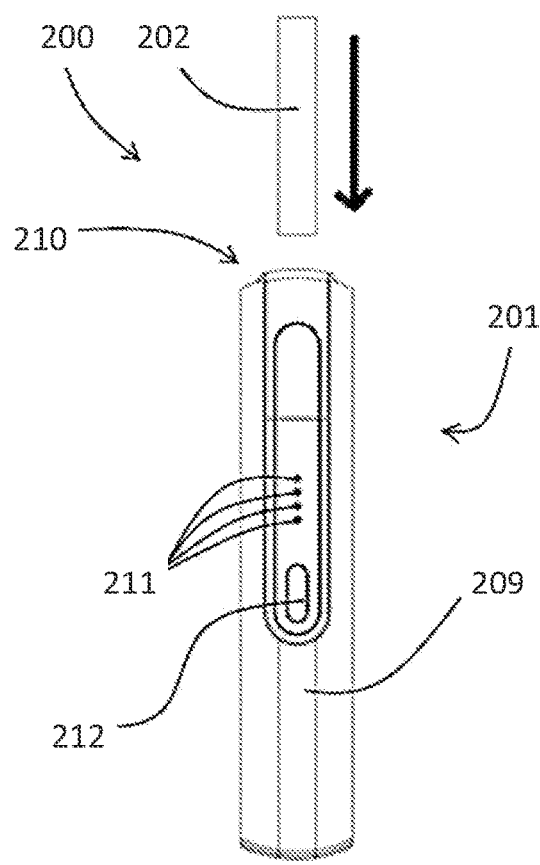
FIG. 2B is a front view of the first embodiment of the first mode of the smoking substitute system with the consumable disengaged from the device.

FIGS. 2A and 2B illustrate a heated-tobacco (HT) smoking substitute system 200. The system 200 is an example of the systems 100, 100' described in relation to FIG. 1A or 1B. System 200 includes an HT device 201 and an HT consumable 202. The description of FIGS. 1A and 1B above is applicable to the system 200 of FIGS. 2A and 2B and will not be repeated.

The device 201 and the consumable 202 are configured such that the consumable 202 can be engaged with the device 201. FIG. 2A shows the device 201 and the consumable 202 in an engaged state, whilst FIG. 2B shows the device 201 and the consumable 202 in a disengaged state.

The device 201 comprises a body 209 and cap 210. In one aspect, the body 209 is an elongate body with one end of the body 209 configured for engagement with an aerosol-forming article (e.g., a heated tobacco (HT) consumable. The other end of the body 209 may be configured with the port for engagement with the rechargeable power source device in a sealed alignment position. In use the cap 210 is engaged at an end of the body 209. Although not apparent from the figures, the cap 210 is moveable relative to the body 209. In particular, the cap 210 is slidable and can slide along a longitudinal axis of the body 209.

The device 201 comprises an output means (forming part of the UI of the device 201) in the form of a plurality of light-emitting diodes (LEDs) 211 arranged linearly along the longitudinal axis of the device 201 and on an outer surface of the body 209 of the device 201. A button 212 is also arranged on an outer surface of the body 209 of the device 201 and is axially spaced (i.e., along the longitudinal axis) from the plurality of LEDs 211.

Figure 2C:
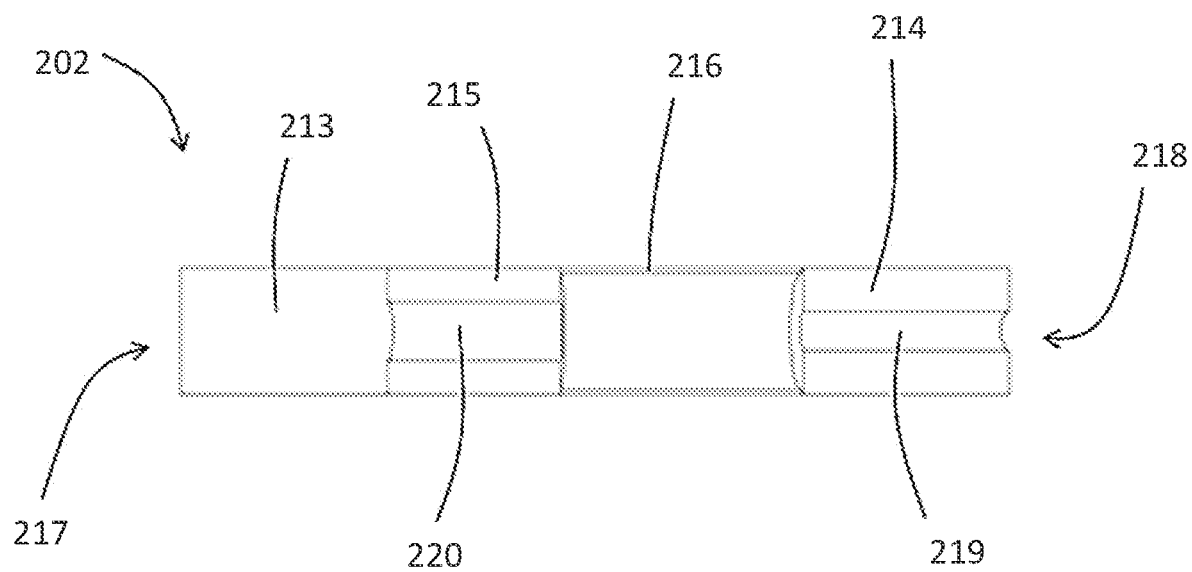
FIG. 2C is a section view of the consumable of the first embodiment of the first mode of the smoking substitute system.

FIG. 2C show a detailed section view of the consumable 202 of the system 200. The consumable 202 generally resembles a cigarette. In that respect, the consumable 202 has a generally cylindrical form with a diameter of 7 mm and an axial length of 70 mm. The consumable 202 comprises an aerosol forming substrate 213, a terminal filter element 214, an upstream filter element 215 and a spacer element 216. In other embodiments, the consumable may further comprise a cooling element. A cooling element may exchange heat with vapor that is formed by the aerosol-forming substrate 213 in order to cool the vapor so as to facilitate condensation of the vapor.

The aerosol-forming substrate 213 is substantially cylindrical and is located at an upstream end 217 of the consumable 202 and comprises the aerosol former of the system 200. In that respect, the aerosol forming substrate 213 is configured to be heated by the device 201 to release a vapor. The released vapor is subsequently entrained in an airflow flowing through the aerosol-forming substrate 213. The airflow is produced by the action of the user drawing on a downstream end 218 (i.e., terminal or mouth end) of the consumable 202.

In the present embodiment, the aerosol forming substrate 213 comprises tobacco material that may, for example, include any suitable parts of the tobacco plant (e.g., leaves, stems, roots, bark, seeds, and flowers). The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon). For example, the aerosol-forming substrate 213 may comprise a gathered sheet of homogenized (e.g., paper/slurry recon) tobacco or gathered shreds/strips formed from such a sheet.

In order to generate an aerosol, the aerosol forming substrate 213 comprises at least one volatile compound that is intended to be vaporized/aerosolized and that may provide the user with a recreational and/or medicinal effect when inhaled. The aerosol-forming substrate 213 may further comprise one or more additives. For example, such additives may be in the form of humectants (e.g., propylene glycol and/or vegetable glycerin), flavorants, fillers, aqueous/non-aqueous solvents and/or binders.

The terminal filter element 214 is also substantially cylindrical and is located downstream of the aerosol forming substrate 213 at the downstream end 218 of the consumable 202. The terminal filter element 214 is in the form of a hollow bore filter element having a bore 219 (e.g., for airflow) formed therethrough. The diameter of the bore 219 is 2 mm. The terminal filter element 214 is formed of a porous (e.g., monoacetate) filter material. As set forth above, the downstream end 218 of the consumable 202 (i.e., where the terminal filter 214 is located) forms a mouthpiece portion of the consumable 202 upon which the user draws. Airflow is drawn from the upstream end 217, thorough the components of the consumable 202, and out of the downstream end 218. The airflow is driven by the user drawing on the downstream end 218 (i.e., the mouthpiece portion) of the consumable 202.

The upstream filter element 215 is located axially adjacent to the aerosol-forming substrate 213, between the aerosol-forming substrate 213 and the terminal filter element 214. Like the terminal filter 214, the upstream filter element 215 is in the form of a hollow bore filter element, such that it has a bore 220 extending axially therethrough. In this way, the upstream filter 215 may act as an airflow restrictor. The upstream filter element 215 is formed of a porous (e.g., monoacetate) filter material. The bore 220 of the upstream filter element 214 has a larger diameter (3 mm) than the terminal filter element 214.

The spacer 216 is in the form of a cardboard tube, which defines a cavity or chamber between the upstream filter element 215 and the terminal filter element 214. The spacer 216 acts to allow both cooling and mixing of the vapor/aerosol from the aerosol-forming substrate 213. The spacer has an external diameter of 7 mm and an axial length of 14 mm.

Although not apparent from the figure, the aerosol-forming substrate 213, upstream filter 215 and spacer 216 are circumscribed by a paper wrapping layer. The terminal filter 214 is circumscribed by a tipping layer that also circumscribes a portion of the paper wrapping layer (so as to connect the terminal filter 214 to the remaining components of the consumable 202). The upstream filter 215 and terminal filter 214 are circumscribed by further wrapping layers in the form of plug wraps.

Figure 2D:
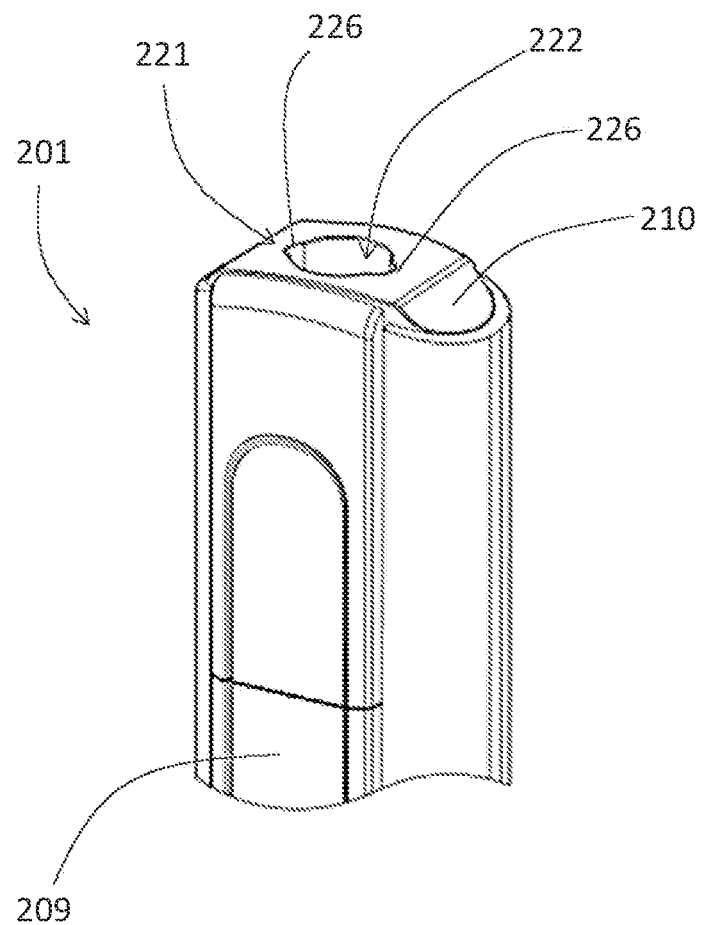
FIG. 2D is a detailed view of an end of the device of the first embodiment of the first mode of the smoking substitute system.

Returning now to the device 201, FIG. 2D illustrates a detailed view of the end of the device 201 that is configured to engage with the consumable 202. The cap 210 of the device 201 includes an opening 221 to an internal cavity 222 (more apparent from FIG. 2D) defined by the cap 210. The opening 221 and the cavity 222 are formed so as to receive at least a portion of the consumable 202.

During engagement of the consumable 202 with the device 201, a portion of the consumable 202 is received through the opening 221 and into the cavity 222. After engagement (see FIG. 2B), the downstream end 218 of the consumable 202 protrudes from the opening 221 and thus protrudes also from the device 201. The opening 221 includes laterally disposed notches 226. When a consumable 202 is received in the opening 221, these notches 226 remain open and could, for example, be used for retaining a cover to cover the end of the device 201.

Figure 2E:
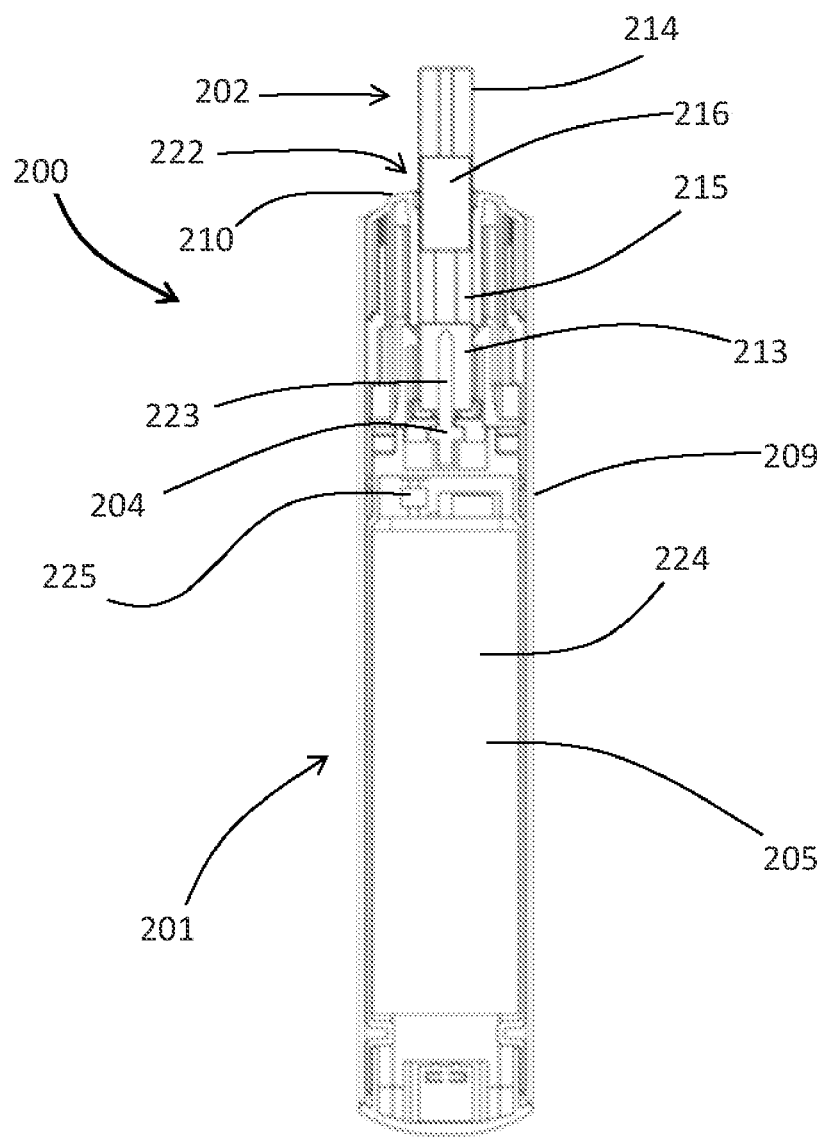
FIG. 2E is a section view of the first embodiment of the first mode of the smoking substitute system.

FIG. 2E shows a cross section through a central longitudinal plane through the device 201. The device 201 is shown with the consumable 202 engaged therewith.

The device 201 comprises a heater 204 comprising heating element 223. The heater 204 forms part of the body 209 of the device 201 and is rigidly mounted to the body 209. In the illustrated embodiment, the heater 204 is a rod heater with a heating element 223 having a circular transverse profile. In other embodiments the heater may be in the form of a blade heater (e.g., heating element with a rectangular transverse profile) or a tube heater (e.g., heating element with a tubular form).

The heating element 223 of the heater 204 projects from an internal base of the cavity 222 along a longitudinal axis towards the opening 221. As is apparent from the figure, the length (i.e., along the longitudinal axis) of the heating element is less than a depth of the cavity 222. In this way, the heating element 223 does not protrude from or extend beyond the opening 221.

When the consumable 202 is received in the cavity 222 (as is shown in FIG. 2E), the heating element 223 penetrates the aerosol-forming substrate 213 of the consumable 202. In particular, the heating element 223 extends for nearly the entire axial length of the aerosol-forming substrate 213 when inserted therein. Thus, when the heater 204 is activated, heat is transferred radially from an outer circumferential surface the heating element 223 to the aerosol-forming substrate 213.

The device 201 further comprises an electronics cavity 224. A power source, in the form of a rechargeable battery 205 (a lithium-ion battery), is located in electronics cavity 224.

The device 201 includes a connector (i.e., forming part of an IO module of the device 201) in the form of a USB port 206. The connector may alternatively be, for example, a micro-USB port or a USB-C port for examples. The USB port 206 may be used to recharge the rechargeable battery 205.

The device 201 includes the controller (not shown) located in the electronics cavity 224. The controller comprises a microcontroller mounted on a printed circuit board (PCB). The USB port 206 is also connected to the controller (i.e., connected to the PCB and microcontroller).

The controller is configured to control at least one function of the device 201. For example, the controller is configured to control the operation of the heater 204. Such control of the operation of the heater 204 may be accomplished by the controller toggling the electrical connection of the rechargeable battery 205 to the heater 204. For example, the controller is configured to control the heater 204 in response to a user depressing the button 212. Depressing the button 212 may cause the controller to allow a voltage (from the rechargeable battery 205) to be applied to the heater 204 (so as to cause the heating element 223 to be heated).

In one aspect, the controller is configured to receive power from the port and control operation of the device such as allowing consumption of consumable by the user or supplying power to the heater for heating operation while still receiving the power from the rechargeable power source device. Further, the controller is configured to determine if the received power is sufficient to permit usage of the device.

Based on the determination, the controller enables extended usage of the device during receiving power from the rechargeable power source device. The controller is also configured to control the LEDs 211 in response to (e.g., a detected) a condition of the device 201 or the consumable 202. For example, the controller may control the LEDs to indicate whether the device 201 is in an on state or an off state (e.g., one or more of the LEDs may be illuminated by the controller when the device is in an on state). In another example, the controller may control the LEDs 211 to indicate the condition of the device such as usage of the device, present charge level or charging status or when the device is in a preferred charging orientation or aligned position for engagement with the external rechargeable power source device. In yet another example, the controller may control the LEDs 211 to may indicate the beginning, progressing, and ending of the charging operation.

The device 201 comprises a further input means (i.e., in addition to the button 212) in the form of a puff sensor 225. The puff sensor 225 is configured to detect a user drawing (i.e., inhaling) at the downstream end 218 of the consumable 202. The puff sensor 225 may, for example, be in the form of a pressure sensor, a flowmeter, or a microphone. The puff sensor 225 is operatively connected to the controller in the electronics cavity 224, such that a signal from the puff sensor 225, indicative of a puff state (i.e., drawing or not drawing), forms an input to the controller (and can thus be responded to by the controller 20).

An exemplary smoking substitute device (hereinafter referred to as device) 301 with extended usage capability while charging is disclosed. The device 301 is configured to continuously operate without any interruption while receiving power, thereby providing continuous or extended operation of the device.

Figure 3A:
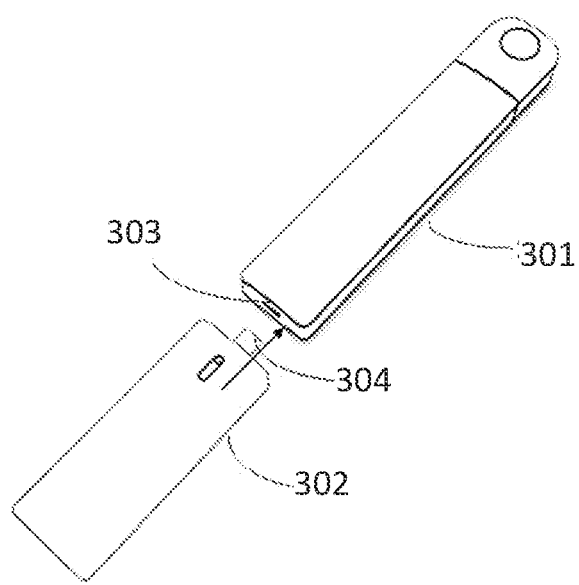
FIG. 3A is a perspective view of a smoking substitute device of the first mode of the smoking substitute system and a rechargeable power source device engageable to the first mode of the smoking substitute device.

The device 301 allows continuous power supply to the heater without any interruption due to charging process, thus enabling continuous consumption of the consumable by the user without affecting user experience. Further, the device 301 allows charging of the power source 105 with the received power. Furthermore, the device 301 allows continuous operation of the device 301 and charging of the power source 105 while receiving power, thereby providing extended operation of the device and extended vaping experience to the user. One example of the device 301 is a heat-not-burn device. FIG. 3A is a perspective view of the smoking substitute device 301 of a smoking substitute system in accordance with an aspect of the first mode.

As shown, the device 301 is engageable with a rechargeable power source device (hereinafter referred to as charging device) 302 via port 303 of the device 301. The port 303, may be configured as the port 206. The charging device 302 is adapted to be connectable to the port 303. In one aspect, the charging device 302 is adapted to abut with a surface of the device 301 when connected with the port 303. The charging device 302 may be engageable with the device 301 via a connector 304. The connector 304 is extendable from a cavity formed in an end wall of the charging device 302 and connectable to the port 303. The connector 304 is configured as an extendable connector so as to extend from the cavity only when needed to connect with port 303 and retain within the cavity when not connected, thereby preventing exposure to the environment, wear and tear stresses and external actions. Connector 304 may be used to charge the rechargeable power source device 302 itself. The port may be, e.g., a USB-C port, usable for both receiving and providing energy.

The charging device 302 further comprises a switch 305 located on outer surface of the cavity and coupled with the connector 304 to facilitate the extension of the connector 304 for engaging with the port 303 of the device 301. It is advantageous to include the switch or knob 305 so as to effectively control the extension of the connector 30, thereby preventing accidental extension when not required.

The charging device 302 includes alignment means (not shown) such as for example, guides to keep the device 301 aligned with the charging device 302 thereby achieving a sealed alignment between the device 301 and the charging device 302. In one aspect, the guides of the alignment means directs the engagement of the port 303 with the connector 304 so as to achieve sealed engagement of the device 301 and the charging device 302 in an air-tight or liquid-tight manner. The term sealed may be defined as air-tight or liquid-tight engagement in one aspect. The sealed alignment also would enable the rechargeable power source device to aesthetically fit with the smoking substitute device so that the connector and port do not get disengaged during the charging process or device operation or both. This would also enable so that the user to enjoys the smoking experience without any interruption due to lack of power and without being unaware that the smoking substitute device is being charged.

Figure 3B:
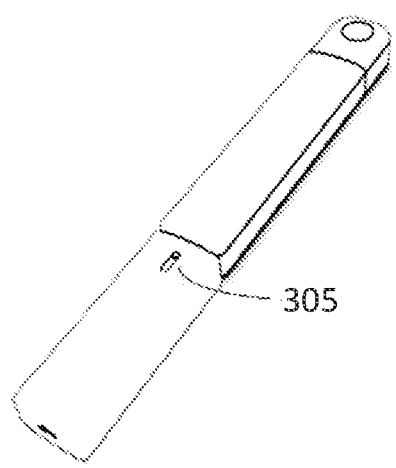
FIG. 3B is a perspective view of the first mode of the smoking substitute device and the rechargeable power source device of FIG. 3A in engaged position.

FIG. 3B illustrates a perspective view of the device 301 engaged with the charging device 302 for charging. As shown, the shape of the charging device 302 is adapted to abut with the surface of the device 301 when connected with the port 303 results in increased stability to the engagement during charging. In one aspect, the shape of the charging device 302 is selected so as to geometrically match with the surface of the device 301 thereby being able to abut with the surface of the device 301. In one example, the shape of the charging device 302 and the surface of the device 301 may be geometrically matching shapes known in the art. By adapting the shape of the charging device 302 and the device 301, the stability of the connection of the rechargeable power source device 302 with the port 303 is maintained.

Figure 3C:
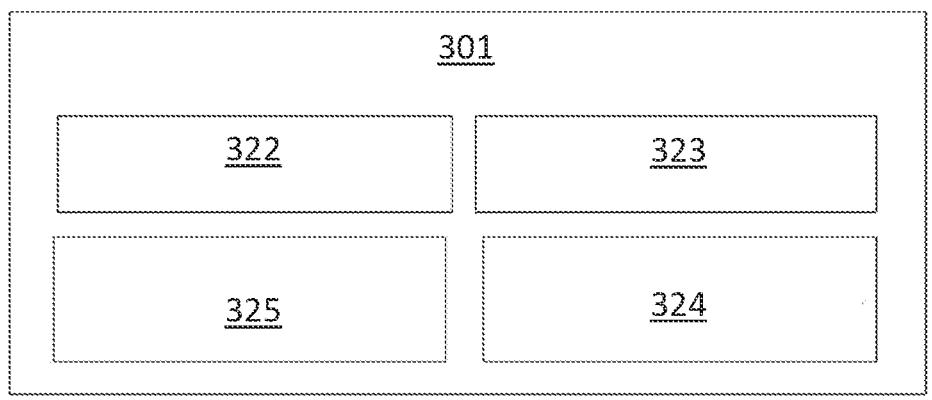
FIG. 3C is a schematic of the first mode of the smoking substitute device.

FIG. 3C illustrates a schematic of the device 301. The device 301 comprises a controller 322 (interchangeably referred to as controller 104), memory 323, a rechargeable battery 324 and a feedback means 325. The controller 322 enables operation of the device 301 while still receiving the power from the charging device 302 via the port 303. In one aspect, the device 301 is adapted to operate including allowing consumption of a consumable by a user of the device 301. The controller 322 allows usage of the power received while charging the device 301 for device operation in addition to charging the rechargeable battery 324. The controller 322 allows continuous power supply to the heater without any interruption due to charging process, thus enabling continued usage of the device 301 without affecting user experience.

The controller 322 is further configured to determine if the received power is sufficient to permit usage of the device 301 and allow extended operation of the device 301 during charging, based on the determination. In one aspect, if the controller 322 determines that the received power is sufficient to allow operation of the device 301 such as heater operation allowing consumption of the consumable by the user, then the controller 322 supplies the received power to perform the operation while still charging the rechargeable battery 324. The rechargeable battery 324 is the power source 105 as illustrated in FIG. 1A. By continuous monitoring of the received power during the charging process, the controller 322 is able to determine the possibility of usage of the device 301 for device operation and allow the device 301 to operate only if there is sufficient power, thereby preventing any short circuit within the components of the device 301 due to insufficient power.

The feedback output means 325 is capable of providing one of haptic feedback, audio, and visual feedback to indicate usage of the device during charging, or to indicate availability of power required for usage of the device.

A smoking substitute system comprising the device 301 and the charging device 302 is also disclosed.

It is more advantageous to allow the device 301 to operate while receiving power for charging the device 301, thereby providing extended vaping experience for the user. Further, the shape of the charging device 302 is configured so as to abut with the surface of the device 301, thereby providing an aesthetically comfortable experience to the user while holding the device 301 along with the charging device 302.

Second Mode: An Aerosol Delivery Device or Smoking Substitute Device Configured to Wirelessly Communicate with a User Compute Device.

Aspects and embodiments of the second mode of the present disclosure will now be discussed with reference to the accompanying figures. Further aspects and embodiments will be apparent to those skilled in the art. All documents mentioned in this text are incorporated herein by reference.

Figure 4B:
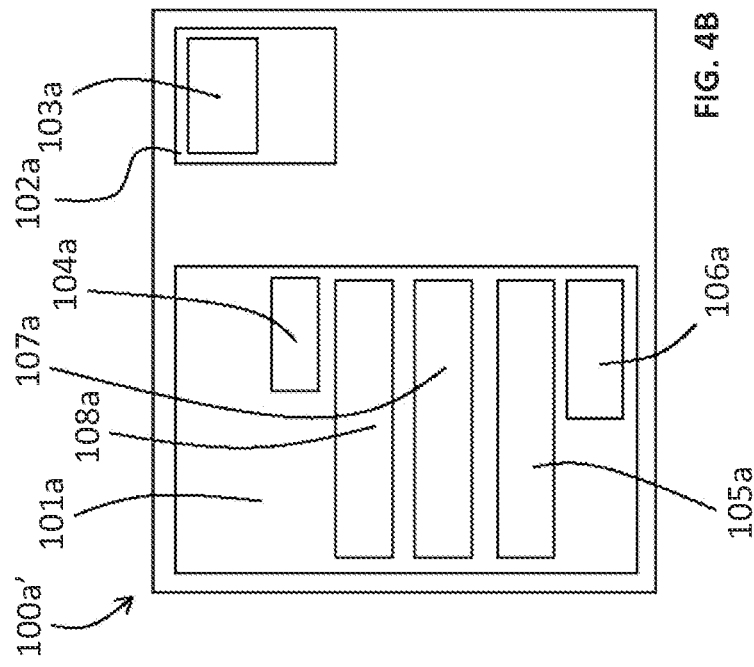
FIG. 4B is a schematic of a variation of the second mode of the smoking substitute system of FIG. 4A.
Figure 4A:
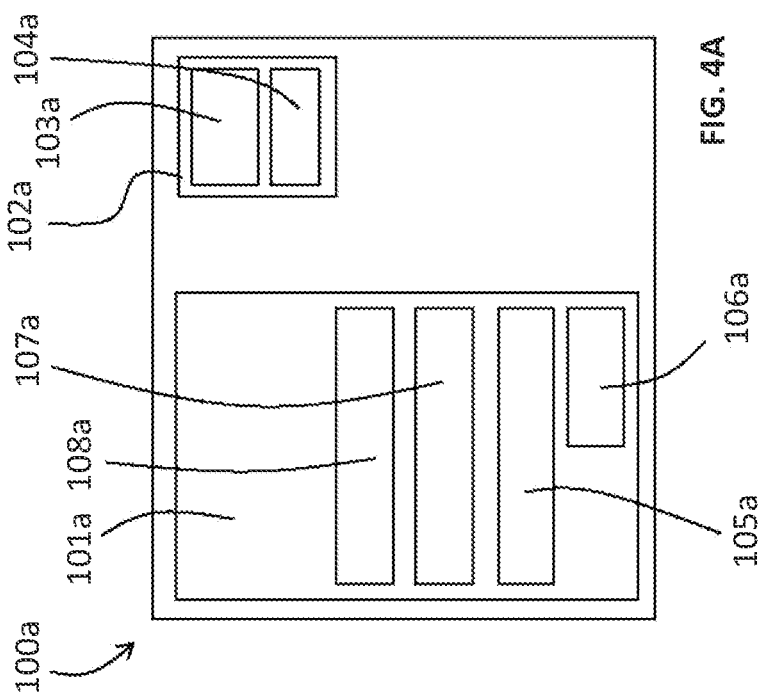
FIG. 4A is a schematic of a second mode of the smoking substitute system.

FIG. 4A is a schematic providing a general overview of a smoking substitute system 100a. The system 100a includes a substitute smoking device 101a and an aerosol-forming article in the form of a consumable 102a, which comprises an aerosol former 103a. The system is configured to vaporize the aerosol former by heating the aerosol former 103a (so as to form a vapor/aerosol for inhalation by a user).

In the illustrated system, the heater 104a forms part of the consumable 102a and is configured to heat the aerosol former 103a. In this variation, the heater 104a is electrically connectable to the power source 105a, for example, when the consumable 102a is engaged with the device 101a. Heat from the heater 104a vaporizes the aerosol former 103a to produce a vapor. The vapor subsequently condenses to form an aerosol, which is ultimately inhaled by the user.

The system 100a further comprises a power source 105a that forms part of the device 101a. In other embodiments the power source 105a may be external to (but connectable to) the device 101a. The power source 105a is electrically connectable to the heater 104a such that it is able to supply power to the heater 104a (i.e., for the purpose of heating the aerosol former 103a). Thus, control of the electrical connection of the power source 105a to the heater 104a provides control of the state of the heater 104a. The power source 105a may be a power store, for example a battery or rechargeable battery (e.g., a lithium-ion battery).

The system 100a further comprises an I/O module comprising a connector 106a (e.g., in the form of a USB port, Micro USB port, USB-C port, etc.). The connector 106a is configured for connection to an external source of electrical power, e.g., a mains electrical supply outlet. The connector 106a may be used in substitution for the power source 105a. That is the connector 106a may be electrically connectable to the heater 104a so as to supply electricity to the heater 104a. In such embodiments, the device may not include a power source, and the power source of the system may instead comprise the connector 106a and an external source of electrical power (to which the connector 106a provides electrical connection).

In some embodiments, the connector 106a may be used to charge and recharge the power source 105a where the power source 105a includes a rechargeable battery.

The system 100a also comprises a user interface (UI) 107a. Although not shown, the UI 107a may include input means to receive commands from a user. The input means of the UI 107a allows the user to control at least one aspect of the operation of the system 100a. The input means may, for example, be in the form of a button, touchscreen, switch, microphone, etc.

The UI 107a also comprises output means to convey information to the user. The output means may, for example, comprise lights (e.g., LEDs), a display screen, speaker, vibration generator, etc.

The system 100a further comprises a controller 108a that is configured to control at least one function of the device 101a. In the illustrated embodiment, the controller 108a is a component of the device 101a, but in other embodiments may be separate from (but connectable to) the device 101a. The controller 108a is configured to control the operation of the heater 104a and, for example, may be configured to control the voltage applied from the power source 105a to the heater 104a. The controller 108a may be configured to toggle the supply of power to the heater 104a between an on state, in which the full output voltage of the power source 105a is applied to the heater 104a, and an off state, in which the no voltage is applied to the heater 104a.

Although not shown, the system 100a may also comprise a voltage regulator to regulate the output voltage from the power source 105a to form a regulated voltage. The regulated voltage may then be applied to the heater 104a.

In addition to being connected to the heater 104a, the controller 108a is operatively connected to the UI 107a. Thus, the controller 108a may receive an input signal from the input means of the UI 107a. Similarly, the controller 108a may transmit output signals to the UI 107a. In response, the output means of the UI 107a may convey information, based on the output signals, to a user. The controller also comprises a memory 109a, which is a non-volatile memory. The memory 109a includes instructions, which, when implemented, cause the controller to perform certain tasks or steps of a method.

FIG. 4B is a schematic showing a variation of the system 100a of FIG. 4A. In the system 100a' of FIG. 4B, the heater 104a forms part of the device 101a, rather than the consumable 102a. In this variation, the heater 104a is electrically connected to the power source 105a.

FIG. 5A and FIG. 5B illustrate a heated-tobacco (HT) smoking substitute system 200a. The system 200a is an example of the systems 100a, 100a' described in relation to FIG. 4A or FIG. 4B. System 200a includes an HT device 201a and an HT consumable 202a. The description of FIG. 4A and FIG. 4B above is applicable to the system 200a of FIG. 5A and FIG. 5B and will not be repeated.

The device 201a and the consumable 202a are configured such that the consumable 202a can be engaged with the device 201a. FIG. 5A shows the device 201a and the consumable 202a in an engaged state, whilst FIG. 5B shows the device 201a and the consumable 202a in a disengaged state.

The device 201a comprises a body 209a and cap 210a. In use the cap 210a is engaged at an end of the body 209a. Although not apparent from the figures, the cap 210a is moveable relative to the body 209a. In particular, the cap 210a is slidable and can slide along a longitudinal axis of the body 209a.

The device 201a comprises an output means (forming part of the UI of the device 201a) in the form of a plurality of light-emitting diodes (LEDs) 211a arranged linearly along the longitudinal axis of the device 201a and on an outer surface of the body 209a of the device 201a. A button 212a is also arranged on an outer surface of the body 209a of the device 201a and is axially spaced (i.e., along the longitudinal axis) from the plurality of LEDs 211a.

FIG. 5C show a detailed section view of the consumable 202a of the system 200a. The consumable 202a generally resembles a cigarette. In that respect, the consumable 202a has a generally cylindrical form with a diameter of 7 mm and an axial length of 70 mm. The consumable 202a comprises an aerosol forming substrate 213a, a terminal filter element 214a, an upstream filter element 215a and a spacer element 216a. In other embodiments, the consumable may further comprise a cooling element. A cooling element may exchange heat with vapor that is formed by the aerosol-forming substrate 213a in order to cool the vapor so as to facilitate condensation of the vapor.

The aerosol-forming substrate 213a is substantially cylindrical and is located at an upstream end 217a of the consumable 202a and comprises the aerosol former of the system 200a. In that respect, the aerosol forming substrate 213a is configured to be heated by the device 201a to release a vapor. The released vapor is subsequently entrained in an airflow flowing through the aerosol-forming substrate 213a. The airflow is produced by the action of the user drawing on a downstream end 218a (i.e., terminal or mouth) end of the consumable 202a.

In the present embodiment, the aerosol forming substrate 213a comprises tobacco material that may, for example, include any suitable parts of the tobacco plant (e.g., leaves, stems, roots, bark, seeds, and flowers). The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon). For example, the aerosol-forming substrate 213a may comprise a gathered sheet of homogenized (e.g., paper/slurry recon) tobacco or gathered shreds/strips formed from such a sheet.

In order to generate an aerosol, the aerosol forming substrate 213a comprises at least one volatile compound that is intended to be vaporized/aerosolized and that may provide the user with a recreational and/or medicinal effect when inhaled. The aerosol-forming substrate 213a may further comprise one or more additives. For example, such additives may be in the form of humectants (e.g., propylene glycol and/or vegetable glycerin), flavorants, fillers, aqueous/non-aqueous solvents and/or binders.

The terminal filter element 214a is also substantially cylindrical and is located downstream of the aerosol forming substrate 213a at the downstream end 218a of the consumable 202a. The terminal filter element 214a is in the form of a hollow bore filter element having a bore 219a (e.g., for airflow) formed therethrough. The diameter of the bore 219a is 2 mm. The terminal filter element 214a is formed of a porous (e.g., monoacetate) filter material. As set forth above, the downstream end 218a of the consumable 202a (i.e., where the terminal filter 214a is located) forms a mouthpiece portion of the consumable 202a upon which the user draws. Airflow is drawn from the upstream end 217a, thorough the components of the consumable 202a, and out of the downstream end 218a. The airflow is driven by the user drawing on the downstream end 218a (i.e., the mouthpiece portion) of the consumable 202a.

The upstream filter element 215a is located axially adjacent to the aerosol-forming substrate 213a, between the aerosol-forming substrate 213a and the terminal filter element 214a. Like the terminal filter 214a, the upstream filter element 215a is in the form of a hollow bore filter element, such that it has a bore 220a extending axially therethrough. In this way, the upstream filter 215a may act as an airflow restrictor. The upstream filter element 215a is formed of a porous (e.g., monoacetate) filter material. The bore 220a of the upstream filter element 215a has a larger diameter (3 mm) than the terminal filter element 214a.

The spacer 216a is in the form of a cardboard tube, which defines a cavity or chamber between the upstream filter element 215a and the terminal filter element 214a. The spacer 216a acts to allow both cooling and mixing of the vapor/aerosol from the aerosol-forming substrate 213a. The spacer has an external diameter of 7 mm and an axial length of 14 mm.

Although not apparent from the figure, the aerosol-forming substrate 213a, upstream filter 215a and spacer 216a are circumscribed by a paper wrapping layer. The terminal filter 214a is circumscribed by a tipping layer that also circumscribes a portion of the paper wrapping layer (so as to connect the terminal filter 214a to the remaining components of the consumable 202a). The upstream filter 215a and terminal filter 214a are circumscribed by further wrapping layers in the form of plug wraps.

Returning now to the device 201a, FIG. 5D illustrates a detailed view of the end of the device 201a that is configured to engage with the consumable 202a. The cap 210a of the device 201a includes an opening 221a to an internal cavity 222a (more apparent from FIG. 5D) defined by the cap 210a. The opening 221a and the cavity 222a are formed so as to receive at least a portion of the consumable 202a. During engagement of the consumable 202a with the device 201a, a portion of the consumable 202a is received through the opening 221a and into the cavity 222a. After engagement (see FIG. 5B), the downstream end 218a of the consumable 202a protrudes from the opening 221a and thus also protrudes from the device 201a. The opening 221a includes laterally disposed notches 226a. When a consumable 202a is received in the opening 221a, these notches 226a remain open and could, for example, be used for retaining a cover in order to cover the end of the device 201a.

FIG. 5E shows a cross section through a central longitudinal plane through the device 201a. The device 201a is shown with the consumable 202a engaged therewith.

The device 201a comprises a heater 204a comprising heating element 223a. The heater 204a forms part of the body 209a of the device 201a and is rigidly mounted to the body 209a. In the illustrated embodiment, the heater 204a is a rod heater with a heating element 223a having a circular transverse profile. In other embodiments the heater may be in the form of a blade heater (e.g., heating element with a rectangular transverse profile) or a tube heater (e.g., heating element with a tubular form).

The heating element 223a of the heater 204a projects from an internal base of the cavity 222a along a longitudinal axis towards the opening 221a. As is apparent from the figure, the length (i.e., along the longitudinal axis) of the heating element is less than a depth of the cavity 222a. In this way, the heating element 223a does not protrude from or extend beyond the opening 221a.

When the consumable 202a is received in the cavity 222a (as is shown in FIG. 5E), the heating element 223a penetrates the aerosol-forming substrate 213a of the consumable 202a. In particular, the heating element 223a extends for nearly the entire axial length of the aerosol-forming substrate 213a when inserted therein. Thus, when the heater 204a is activated, heat is transferred radially from an outer circumferential surface the heating element 223a to the aerosol-forming substrate 213a.

The device 201a further comprises an electronics cavity 224a. A power source, in the form of a rechargeable battery 205a (a lithium-ion battery), is located in electronics cavity 224a.

The device 201a includes a connector (i.e., forming part of an IO module of the device 201a) in the form of a USB port 206a. The connector may alternatively be, for example, a micro-USB port or a USB-C port for examples. The USB port 206a may be used to recharge the rechargeable battery 205a.

The device 201a includes a controller (not shown) located in the electronics cavity 224a. The controller comprises a microcontroller mounted on a printed circuit board (PCB). The USB port 206a is also connected to the controller (i.e., connected to the PCB and microcontroller).

The controller is configured to control at least one function of the device 202a. For example, the controller is configured to control the operation of the heater 204a. Such control of the operation of the heater 204a may be accomplished by the controller toggling the electrical connection of the rechargeable battery 205a to the heater 204a. For example, the controller is configured to control the heater 204a in response to a user depressing the button 212a. Depressing the button 212a may cause the controller to allow a voltage (from the rechargeable battery 205a) to be applied to the heater 204a (so as to cause the heating element 223a to be heated).

The controller is also configured to control the LEDs 211a in response to (e.g., a detected) a condition of the device 201a or the consumable 202a. For example, the controller may control the LEDs to indicate whether the device 201a is in an on state or an off state (e.g., one or more of the LEDs may be illuminated by the controller when the device is in an on state).

The device 201a comprises a further input means (i.e., in addition to the button 212a) in the form of a puff sensor 225a. The puff sensor 225a is configured to detect a user drawing (i.e., inhaling) at the downstream end 218a of the consumable 202a. The puff sensor 225a may, for example, be in the form of a pressure sensor, a flowmeter, or a microphone. The puff sensor 225a is operatively connected to the controller in the electronics cavity 224a, such that a signal from the puff sensor 225a, indicative of a puff state (i.e., drawing or not drawing), forms an input to the controller (and can thus be responded to by the controller).

Figure 6:
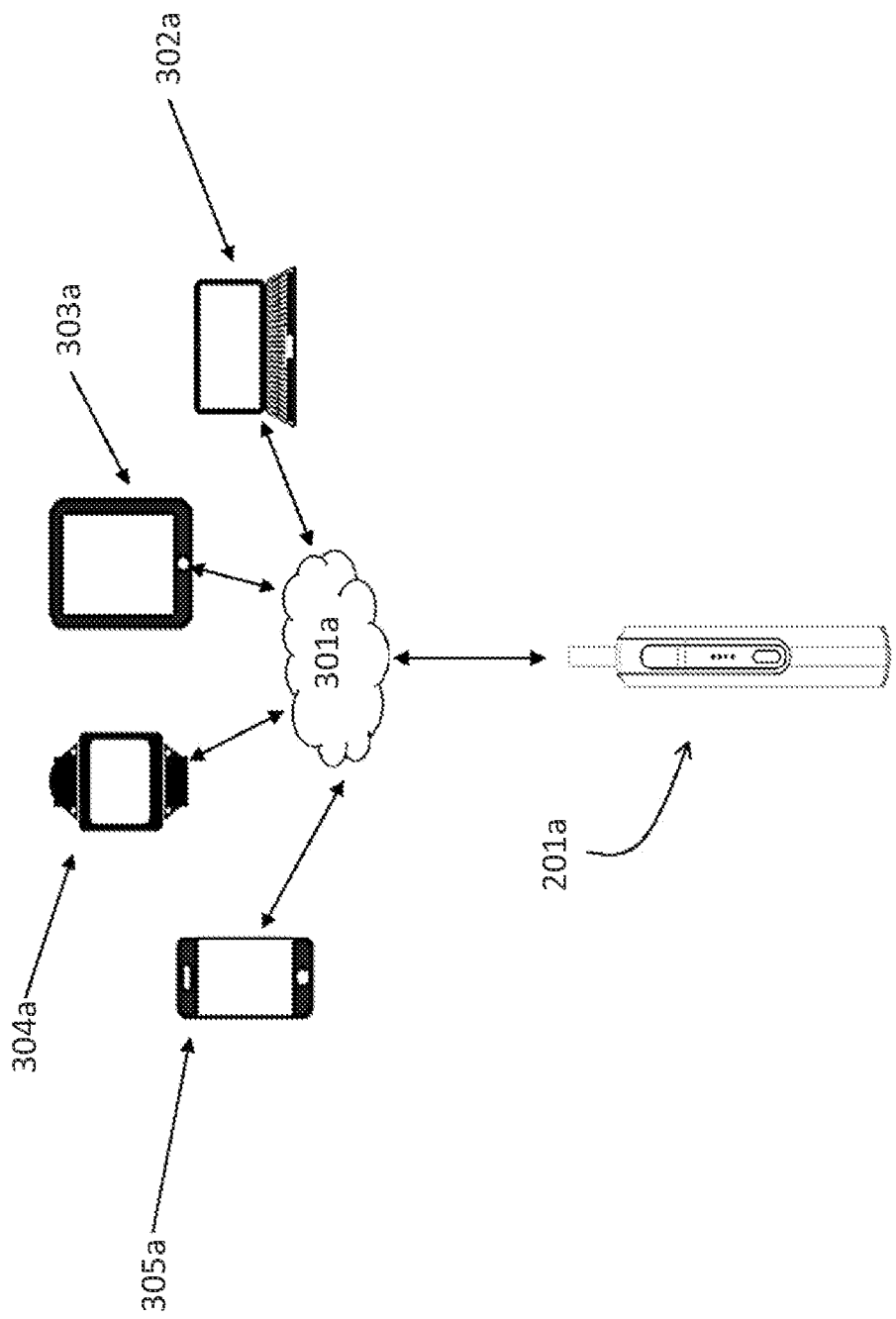
FIG. 6 is a wireless communication system with the device and one or more user compute devices in accordance with an aspect of the second mode of the smoking substitute system.

Further, the device 201a includes a wireless interface to wirelessly communicate with a user compute device. In some embodiments, the device 201a may include an I/O interface to enable wireless communication with the user compute device. The I/O interface may be a wireless interface. FIG. 6 is a wireless communication system with the device 201a and one or more user compute devices 302a, 303a, 304a, 305a (hereafter referred to as one or more user compute device 302a). The device 201a may communicate with each of the one or more user compute devices 302a via a communication network 301a. Each of the one or more user devices 302a may be associated with a user. In some embodiments, a user may be capable of communicating with the device 201a using any of the one or more user compute devices 302a. In some embodiments, the communication network 301a may include, without limitation, Bluetooth connection, wireless network (e.g., using Wireless Application Protocol), Wi-Fi, the Internet, and the like. One or more other wireless communication means, known to a person skilled in the art, may be implemented as the communication network 301a for the device 201a.

Each of the one or more user compute devices 302a may be associated with dedicated communication network (not shown in the figure). A user compute device from the one or more user compute devices 302a may be an external device handled by a user. In some embodiments, the user compute device may be at least one of a smart phone, a tablet, a smart watch, laptop, PC, smart car, so on. The user compute device may be any device which is capable of communicating with the device 201a. In some embodiments, the user compute device includes a heated tobacco device related application to provide an interface to the user, to communicate with the device 201a.

In some embodiments, the wireless communication between the device 201a and the user compute device may be established by pairing the device 201a with the user compute device. In some embodiments, the wireless communication between the device 201a and the user compute device may be established by installing the heated tobacco device related application (hereinafter referred to as application) in the user compute device. The wireless communication may be set-up between the device 201a and the user compute device by one or more other means known to a person skilled in the art.

In some embodiments, the user may be able, via the application and the wireless interface, to provide one or more instructions to the device 201a. Information with respect to the one or more instructions may be communicated with the device 201a, wirelessly. For example, the information may be instructions to control the heating element 223a, instructions to change a mode of operation of the device, instructions to lock/unlock the device and so on. Upon receiving the information, the device 201a may be configured to control one or more functions of the device 201a.

In some embodiments, the information may be communicated to the controller of the device 201a via the wireless interface. The controller may be configured to control the one or more functions of the device 201a.

In some embodiments, the one or more functions may be associated with the heating element 223a of the device 201a. The user may be provisioned to control the operating temperature or heating temperature of the heating element 223a, using the user compute device. The user may provide instructions to increase or decrease the heating temperature of the heating element 223a using the user compute device. For example, when the user provides information related to increasing the heating temperature via the user compute device, the information indicating the increase may be wirelessly communicated to the controller of the device 201a. In response to receiving the information, via the wireless interface, the device 201a may be configured to control the heating temperature of the device 201a. In some embodiments, the user may control the duration of heating of the heating element 223a. For example, if the user prefers to heat the consumable for a longer duration, instructions related to increase in heat-up time may be provided as information via the user compute device. The information indicating the increase in the heat-up time may be communicated to the controller. Accordingly, the controller may be configured to control heating duration of the device 201a.

In some embodiments, the one or more functions may be associated with the battery of the device 201a. The user may choose mode of operation of the device 201a via the user compute device. In some embodiments, the mode of operation may include, but is not limited to, low power mode, high power mode and so on. The information indicating the mode of operation chosen by the user may be communicated to the controller of the device 201a. The controller, upon receiving said information, may be configured to control performance of the battery of the device 201a.

In some embodiments, the user may lock and/or unlock the device 201a using the user compute device. When the device 201a is locked, the user may provide credential information, via the application of the user compute device to unlock the device 201a. The credential information may be verified by the user compute device. When the credential information is verified, the user compute device may provide information to unlock the device 201a to the controller. The controller may, accordingly, be configured to unlock the device 201a. Similarly, locking of the device 201a may also be performed via the user compute device.

In some embodiments, the user may provide may alter the performance of feedback system of the device 201a via the user compute device. For example, configuration of the UI of the device 201a may be altered. Performance of the plurality of LEDs of the device 201a or haptic feedback system of the device 201a may be altered.

In some embodiments, the device 201a may be configured to provide output device information to the user compute device through the wireless interface. In some embodiments, the device information may include analytical data relating to the device 201a. For example, the device 201a may be configured to notify the user about the number of consumables that are consumed in a predetermined time period, via the user compute device.

In some embodiments, the device information may include fault data relating to the device. The fault data may include one or more technical defects associated with the device. The one or more technical defects of the device 201a may be notified to the user via the user compute device. In some embodiments, diagnosis of the fault may also be communicated by the user, to the device 201a, via the user compute device. Based on the information indicating the diagnosis from the user, the controller may be configured to diagnose the one or more defects in the device 201a. Fault data may also be sent from the application on the compute device to a remote server (e.g., over the internet) for remote diagnosis or fault monitoring.

In some embodiments, the device information may include statistical data relating to the device 201a. For example, may include, but is not limited to, puff pattern, device usage time, device usage pattern and so on. Such statistical data may be determined by the controller and communicated to the user compute device in real-time.

In some embodiments, the device information may include monitored data relating to the device 201a. For example, temperature performance of the device 201a may be monitored and notified to the user via the user compute device. The user may accordingly have a need to clean the device 201a, based on the monitored temperature performance. In some embodiments, the device 201a may be configured to monitor locking and unlocking attempts of the device 201a, and accordingly, notify the user via the user compute device about the misuse of the device 201a.

In some embodiments, the device information may include real-time performance data relating to the device 201a. For example, operating temperature of the device, battery status, amount of consumable remaining and so on, may be indicated to the user, via the user compute device.

In some embodiments, the output device information may include an identifier of the device 201a. This may be of particular use where data is further sent beyond the compute device to a remote server. For example, error/fault received from the device may be sent to a remote server where issues with the device can monitored and diagnosed. Having a device identifier associated with the output information enables a user of the remote server to determine which device the output information came from.

Third Mode: A Heated Tobacco Device with Wireless Charging Capability.

Aspects and embodiments of the third mode of the present disclosure will now be discussed with reference to the accompanying figures. Further aspects and embodiments will be apparent to those skilled in the art. All documents mentioned in this text are incorporated herein by reference.

Figure 7A:
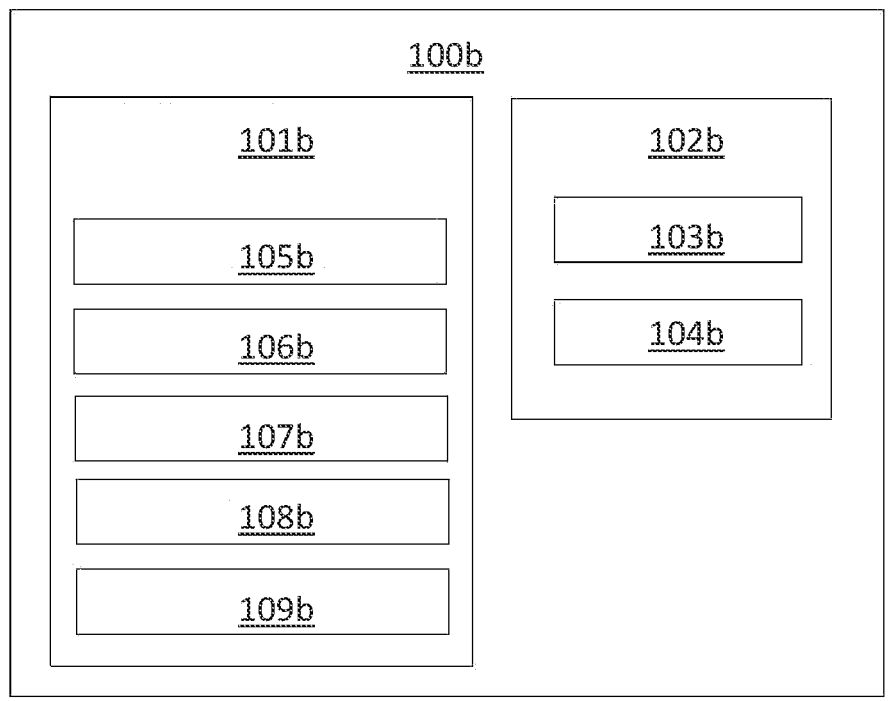
FIG. 7A is a schematic of a third mode of the smoking substitute system.

Detailed description: Generic System FIG. 7A is a schematic providing a general overview of a smoking substitute system 100b. The system 100b includes a substitute smoking device 101b and an aerosol-forming article in the form of a consumable 102b, which comprises an aerosol former 103b. The system is configured to vaporize the aerosol former by heating the aerosol former 103b (so as to form a vapor/aerosol for inhalation by a user).

In the illustrated system, the heater 104b forms part of the consumable 102b and is configured to heat the aerosol former 103b. Heat from the heater 104b vaporizes the aerosol former 103b to produce a vapor. The vapor subsequently condenses to form an aerosol, which is ultimately inhaled by the user.

The system 100b further comprises a power source 105b that forms part of the device 101b. In other embodiments the power source 105b may be external to (but connectable to) the device 101b. The power source 105b is electrically connectable to the heater 104b such that the power source 105b is able to supply power to the heater 104b (i.e., for the purpose of heating the aerosol former 103b). Thus, control of the electrical connection of the power source 105b to the heater 104b provides control of the state of the heater 104b. The power source 105b may be a power store, for example a battery or rechargeable battery (e.g., a lithium-ion battery). The power source 105b may wirelessly receive energy to supply the power to the heater 104b.

The system 100b further comprises an I/O module comprising a connector 106b (e.g., in the form of a USB port, Micro USB port, USB-C port, etc.). The connector 106b is configured for connection to an external source of electrical power, e.g., a mains electrical supply outlet. The connector 106b may be used in substitution for the power source 105b. That is the connector 106b may be electrically connectable to the heater 104b so as to supply electricity to the heater 104b. In such embodiments, the device may not include a power source, and the power source of the system may instead comprise the connector 106b and an external source of electrical power (to which the connector 106b provides electrical connection).

In some embodiments, the connector 106b may be used to charge and recharge the power source 105b where the power source 105b includes a rechargeable battery.

In another aspect, the system 100b receives energy wirelessly from the external power source without using the connector 106b. For example, the system 100b may not include the input connector 106b or any input power ports other than the wireless charging capability, such as a USB port, Micro USB port, USB-C port, etc. The system 100b thus directly and exclusively receives energy from the external power source via a first plurality of coils, without receiving through the connector 106b or any input power ports for charging the power source 105b.

The system 100b also comprises a user interface (UI) 107b. Although not shown, the UI 107b may include input means to receive commands from a user. The input means of the UI 107b allows the user to control at least one aspect of the operation of the system 100b. The input means may, for example, be in the form of a button, touchscreen, switch, microphone, etc.

The UI 107b also comprises output means to convey information to the user. The output means may, for example, comprise lights (e.g., LEDs), a display screen, speaker, vibration generator, etc.

The system 100b further comprises a controller 108b that is configured to control at least one function of the device 101b. In the illustrated embodiment, the controller 108b is a component of the device 101b, but in other embodiments may be separate from (but connectable to) the device 101b. The controller 108b is coupled to a memory 109b that stores instructions of the controller 108b in controlling at least one function of the device 101b.

The controller 108b is configured to control the operation of the heater 104b and, for example, may be configured to control the voltage applied from the power source 105b to the heater 104b. The controller 108b may be configured to toggle the supply of power to the heater 105b between an on state, in which the full output voltage of the power source 105b is applied to the heater 104b, and an off state, in which the no voltage is applied to the heater 104b. In one aspect, the controller 108b is configured to control output power from a wireless charging module (not shown) to the power source 105b for supplying power to the heater 104b.

Although not shown, the system 100b may also comprise a voltage regulator to regulate the output voltage from the power source 105b to form a regulated voltage. The regulated voltage may then be applied to the heater 104b.

In addition to being connected to the heater 104b, the controller 108b is operatively connected to the UI 107b. Thus, the controller 108b may receive an input signal from the input means of the UI 107b. Similarly, the controller 108b may transmit output signals to the UI 107b. In response, the output means of the UI 107b may convey information, based on the output signals, to a user.

Figure 7B:
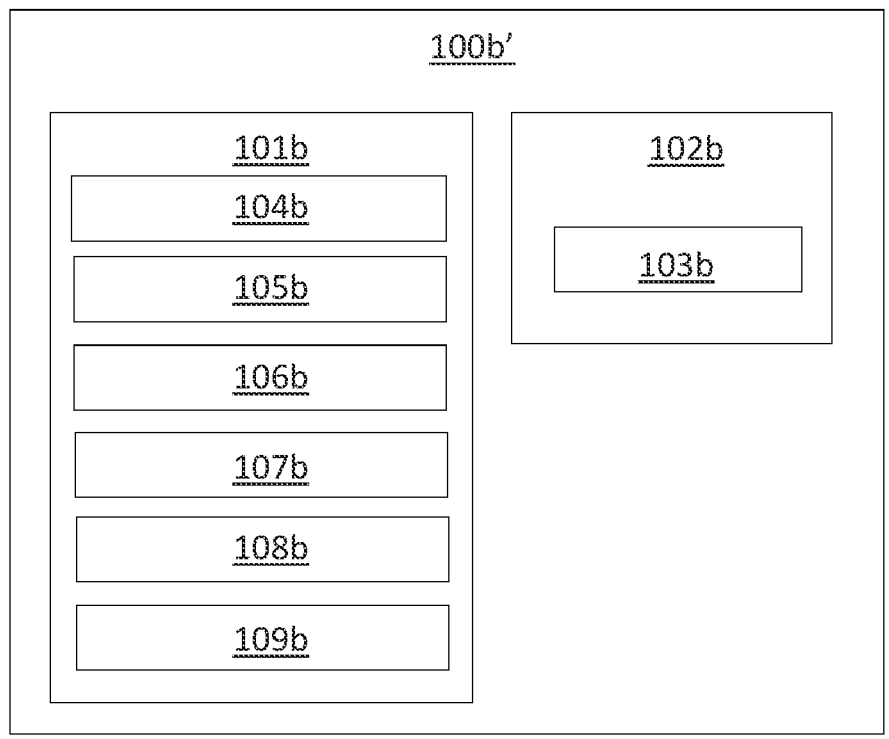
FIG. 7B is a schematic of a variation of the third mode of the smoking substitute system of FIG. 7A.

FIG. 7B is a schematic showing a variation of the system 100b of FIG. 7A. In the system 100b' of FIG. 7B, the heater 104b forms part of the consumable 102b, rather than the device 101b. In this variation, the heater 104b is electrically connectable to the power source 105b, for example, when the consumable 102b is engaged with the device 101b.

Figure 8A:
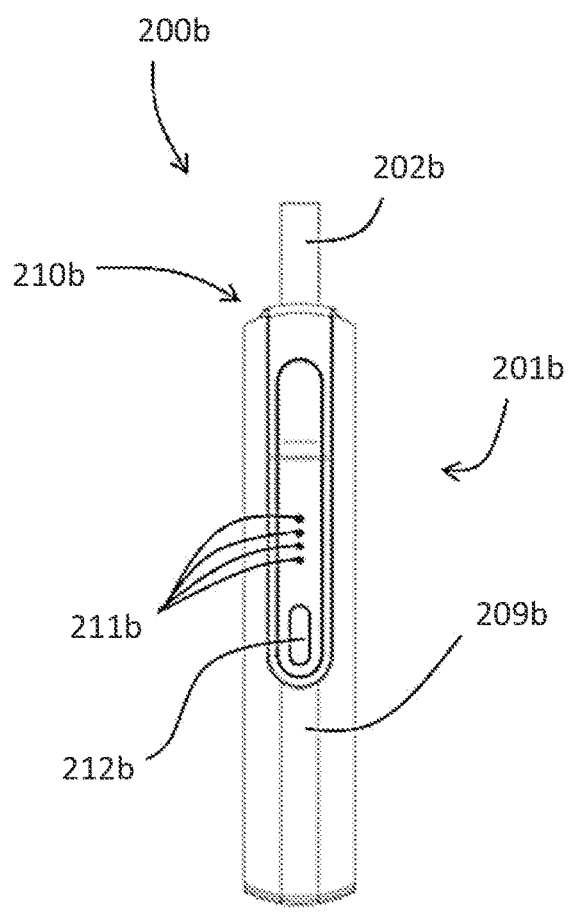
FIG. 8A is a front view of a first embodiment of the third mode of the smoking substitute system with the consumable engaged with the device.
Figure 8B:
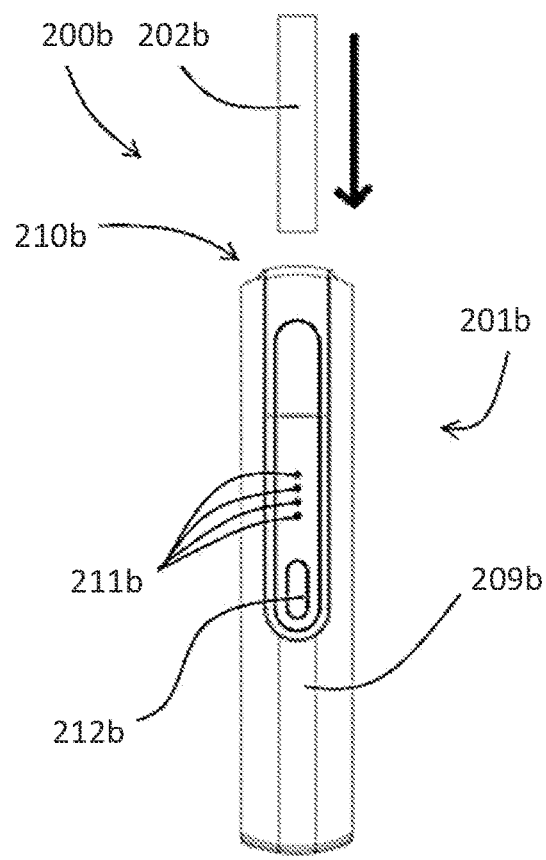
FIG. 8B is a front view of the first embodiment of the third mode of the smoking substitute system with the consumable disengaged from the device.

FIG. 8A and FIG. 8B illustrate a heated-tobacco (HT) smoking substitute system 200b. The system 200b is an example of the systems 100b, 100b' described in relation to FIG. 7A or FIG. 7B. System 200b includes an HT device 201b and an HT consumable 202b. The description of FIG. 7A and FIG. 7B above is applicable to the system 200b of FIG. 8A and FIG. 8B and will not be repeated.

The device 201b and the consumable 202b are configured such that the consumable 202b can be engaged with the device 201b. FIG. 8A shows the device 201b and the consumable 202b in an engaged state, whilst FIG. 8B shows the device 201b and the consumable 202b in a disengaged state.

The device 201b comprises a body 209b and cap 210b. In one aspect, the body 209b is an elongate body with one end of the body 209b configured for engagement with an aerosol-forming article (e.g., a heated tobacco (HT) consumable. The other end of the body 209b may be configured for engagement with a wireless charging dock or a wireless charging system that enables wireless transmission of power to charge the device. Outer surface of the other end of the body 209b may be configured to be flat with increased surface density so as to wirelessly receive abundant energy in less charging time. In use the cap 210b is engaged at an end of the body 209b. Although not apparent from the figures, the cap 210b is moveable relative to the body 209b. In particular, the cap 210b is slidable and can slide along a longitudinal axis of the body 209b.

The device 201b comprises a wireless charging module (not shown) configured to wirelessly receive energy for charging the rechargeable battery. In one aspect, the wireless charging module is located on an inner surface of the device 201b. The wireless charging module comprises a first plurality of coils located adjacent to the power source, with at least one of the first plurality of coils being located at a predetermined distance from the outer surface of the device.

The device 201b comprises an output means (forming part of the UI of the device 201b) in the form of a plurality of light-emitting diodes (LEDs) 211b arranged linearly along the longitudinal axis of the device 201b and on an outer surface of the body 209b of the device 201b. A button 212b is also arranged on an outer surface of the body 209b of the device 201b and is axially spaced (i.e., along the longitudinal axis) from the plurality of LEDs 211b. In another aspect, the button 212b may be located on side opposite to the first plurality of coils, for user interaction.

Figure 8C:
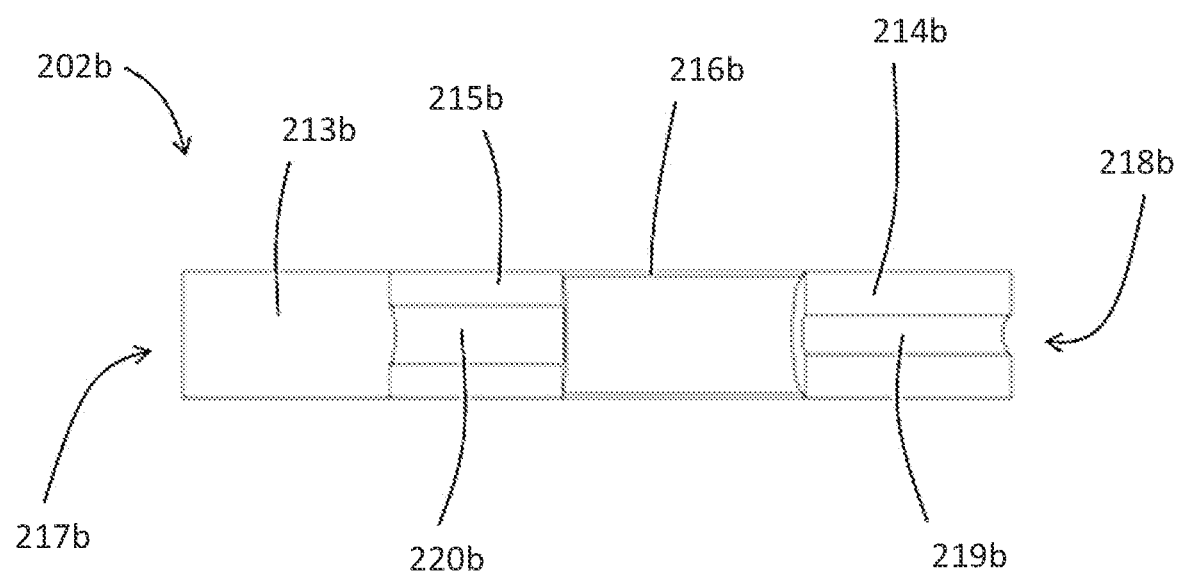
FIG. 8C is a section view of the consumable of the first embodiment of the third mode of the smoking substitute system.

FIG. 8C show a detailed section view of the consumable 202b of the system 200b. The consumable 202b generally resembles a cigarette. In that respect, the consumable 202b has a generally cylindrical form with a diameter of 7 mm and an axial length of 70 mm. The consumable 202b comprises an aerosol forming substrate 213b, a terminal filter element 214b, an upstream filter element 215b and a spacer element 216b. In other embodiments, the consumable may further comprise a cooling element. A cooling element may exchange heat with vapor that is formed by the aerosol-forming substrate 213b in order to cool the vapor so as to facilitate condensation of the vapor.

The aerosol-forming substrate 213b is substantially cylindrical and is located at an upstream end 217b of the consumable 202b and comprises the aerosol former of the system 200b. In that respect, the aerosol forming substrate 213b is configured to be heated by the device 201b to release a vapor. The released vapor is subsequently entrained in an airflow flowing through the aerosol-forming substrate 213b. The airflow is produced by the action of the user drawing on a downstream end 218b (i.e., terminal or mouth end) of the consumable 202b.

In the present embodiment, the aerosol forming substrate 213b comprises tobacco material that may, for example, include any suitable parts of the tobacco plant (e.g., leaves, stems, roots, bark, seeds, and flowers). The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon). For example, the aerosol-forming substrate 213b may comprise a gathered sheet of homogenized (e.g., paper/slurry recon) tobacco or gathered shreds/strips formed from such a sheet.

In order to generate an aerosol, the aerosol forming substrate 213b comprises at least one volatile compound that is intended to be vaporized/aerosolized and that may provide the user with a recreational and/or medicinal effect when inhaled. The aerosol-forming substrate 213b may further comprise one or more additives. For example, such additives may be in the form of humectants (e.g., propylene glycol and/or vegetable glycerin), flavorants, fillers, aqueous/non-aqueous solvents and/or binders.

The terminal filter element 214b is also substantially cylindrical and is located downstream of the aerosol forming substrate 213b at the downstream end 218b of the consumable 202b. The terminal filter element 214b is in the form of a hollow bore filter element having a bore 219b (e.g., for airflow) formed therethrough. The diameter of the bore 219b is 2 mm. The terminal filter element 214b is formed of a porous (e.g., monoacetate) filter material. As set forth above, the downstream end 218b of the consumable 202b (i.e., where the terminal filter 214b is located) forms a mouthpiece portion of the consumable 202b upon which the user draws. Airflow is drawn from the upstream end 217b, thorough the components of the consumable 202b, and out of the downstream end 218b. The airflow is driven by the user drawing on the downstream end 218b (i.e., the mouthpiece portion) of the consumable 202b.

The upstream filter element 215b is located axially adjacent to the aerosol-forming substrate 213b, between the aerosol-forming substrate 213b and the terminal filter element 214b. Like the terminal filter 214b, the upstream filter element 215*b* is in the form of a hollow bore filter element, such that it has a bore 220*b* extending axially therethrough. In this way, the upstream filter 215*b* may act as an airflow restrictor. The upstream filter element 215*b* is formed of a porous (e.g., monoacetate) filter material. The bore 220*b* of the upstream filter element 214*b* has a larger diameter (3 mm) than the terminal filter element 214*b*.

The spacer 216*b* is in the form of a cardboard tube, which defines a cavity or chamber between the upstream filter element 215*b* and the terminal filter element 214*b*. The spacer 216*b* acts to allow both cooling and mixing of the vapor/aerosol from the aerosol-forming substrate 213*b*. The spacer has an external diameter of 7 mm and an axial length of 14 mm.

Although not apparent from the figure, the aerosol-forming substrate 213*b*, upstream filter 215*b* and spacer 216*b* are circumscribed by a paper wrapping layer. The terminal filter 214*b* is circumscribed by a tipping layer that also circumscribes a portion of the paper wrapping layer (so as to connect the terminal filter 214*b* to the remaining components of the consumable 202*b*). The upstream filter 215*b* and terminal filter 214*b* are circumscribed by further wrapping layers in the form of plug wraps.

Figure 8D:
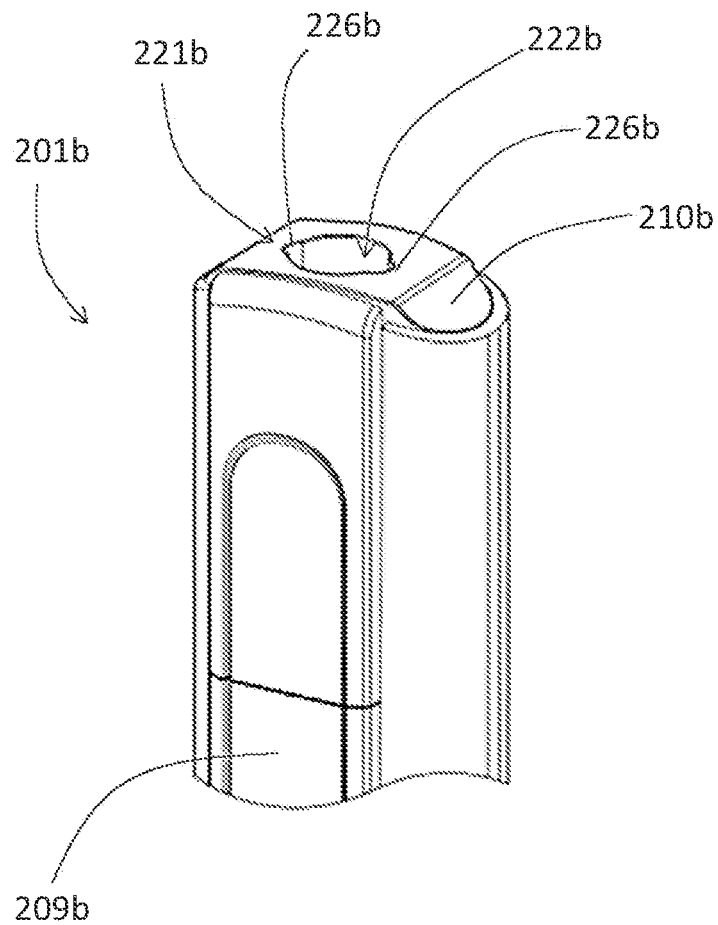
FIG. 8D is a detailed view of an end of the device of the first embodiment of the third mode of the smoking substitute system.

Returning now to the device 201*b*, FIG. 8D illustrates a detailed view of the end of the device 201*b* that is configured to engage with the consumable 202*b*. The cap 210*b* of the device 201*b* includes an opening 221*b* to an internal cavity 222*b* (more apparent from FIG. 8D) defined by the cap 210*b*. The opening 221*b* and the cavity 222*b* are formed so as to receive at least a portion of the consumable 202*b*. During engagement of the consumable 202*b* with the device 201*b*, a portion of the consumable 202*b* is received through the opening 221*b* and into the cavity 222*b*. After engagement (see FIG. 8B), the downstream end 218*b* of the consumable 202*b* protrudes from the opening 221*b* and thus protrudes also from the device 201*b*. The opening 221*b* includes laterally disposed notches 226*b*. When a consumable 202*b* is received in the opening 221*b*, these notches 226*b* remain open and could, for example, be used for retaining a cover to cover the end of the device 201*b*.

Figure 8E:
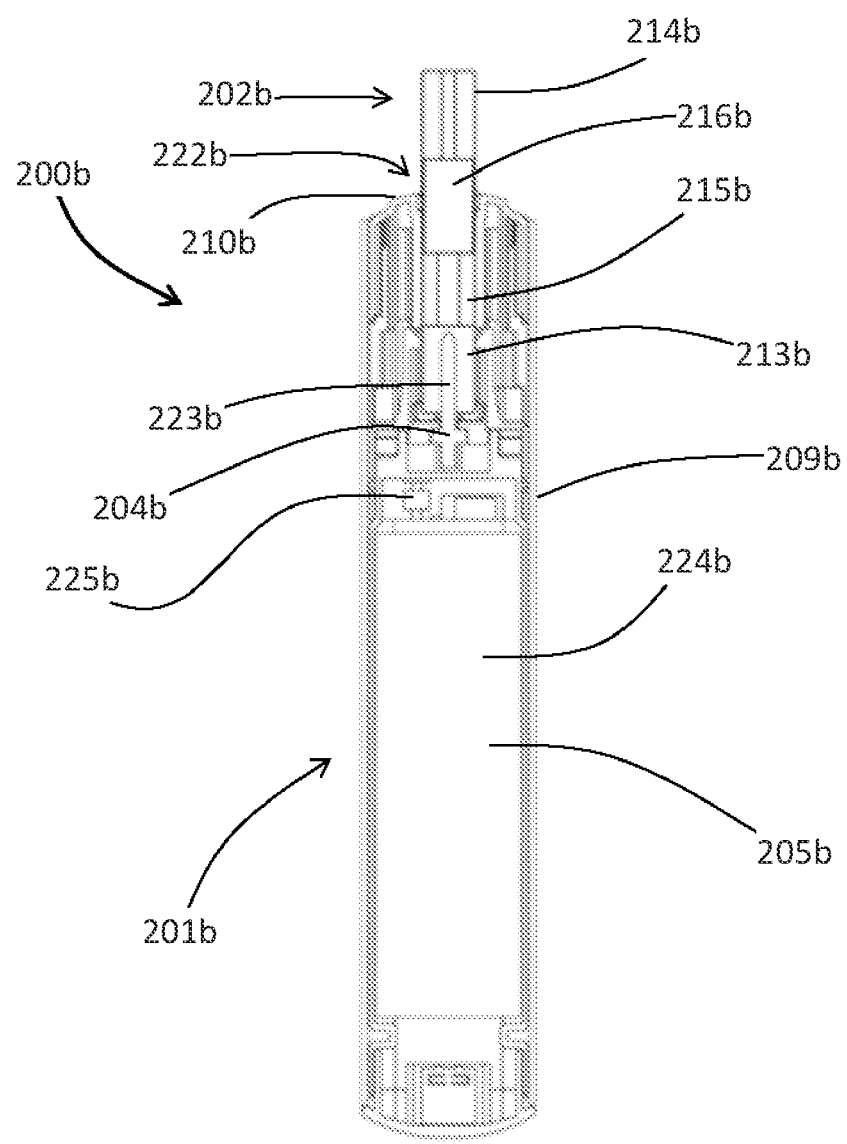
FIG. 8E is a section view of the first embodiment of the third mode of the smoking substitute system.

FIG. 8E shows a cross section through a central longitudinal plane through the device 201*b*. The device 201*b* is shown with the consumable 202*b* engaged therewith.

The device 201*b* comprises a heater 204*b* comprising heating element 223*b*. The heater 204*b* forms part of the body 209*b* of the device 201*b* and is rigidly mounted to the body 209*b*. In the illustrated embodiment, the heater 204*b* is a rod heater with a heating element 223*b* having a circular transverse profile. In other embodiments the heater may be in the form of a blade heater (e.g., heating element with a rectangular transverse profile) or a tube heater (e.g., heating element with a tubular form).

The heating element 223*b* of the heater 204*b* projects from an internal base of the cavity 222*b* along a longitudinal axis towards the opening 221*b*. As is apparent from the figure, the length (i.e., along the longitudinal axis) of the heating element is less than a depth of the cavity 222*b*. In this way, the heating element 223*b* does not protrude from or extend beyond the opening 221*b*.

When the consumable 202*b* is received in the cavity 222*b* (as is shown in FIG. 8E), the heating element 223*b* penetrates the aerosol-forming substrate 213*b* of the consumable 202*b*. In particular, the heating element 223*b* extends for nearly the entire axial length of the aerosol-forming substrate 213*b* when inserted therein. Thus, when the heater 204*b* is activated, heat is transferred radially from an outer circumferential surface the heating element 223*b* to the aerosol-forming substrate 213*b*.

The device 201*b* further comprises an electronics cavity 224*b*. A power source, in the form of a rechargeable battery 205*b* (a lithium-ion battery), is located in electronics cavity 224*b*. The electronics cavity 224*b* may also comprise a first plurality of coils coupled to the rechargeable battery 205*b* for receiving the power and charging the rechargeable battery 205*b*. The rechargeable battery 205*b* or the electronics cavity/compartment may be sealed.

The controller (not shown) is configured to control at least one function of the device 201*b*. For example, the controller is configured to control the operation of the heater 204*b*. Such control of the operation of the heater 204*b* may be accomplished by the controller toggling the electrical connection of the rechargeable battery 205*b* to the heater 204*b*. For example, the controller is configured to control the heater 204*b* in response to a user depressing the button 212*b*. Depressing the button 212*b* may cause the controller to allow a voltage (from the rechargeable battery 205*b*) to be applied to the heater 204*b* (so as to cause the heating element 223*b* to be heated). In one aspect, the controller is configured to control output power from a wireless charging module (not shown) to the power source 105*b* for supplying power to the heater 104*b*.

The controller is also configured to control the LEDs 211*b* in response to (e.g., a detected) a condition of the device 201*b* or the consumable 202*b*. For example, the controller may control the LEDs to indicate whether the device 201*b* is in an on state or an off state (e.g., one or more of the LEDs may be illuminated by the controller when the device is in an on state). In another example, the controller may control the LEDs 211*b* to indicate the condition of the device such as present charge level or charging status or when the device is in a preferred charging orientation. In yet another example, the controller may control the LEDs 211*b* to may indicate the beginning, progressing, and ending of the wireless charging operation.

Figure 9A:
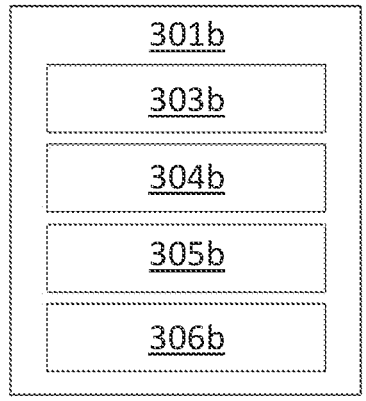
FIG. 9A is a schematic of a heated tobacco device of the third mode of the smoking substitute system.

The device 201*b* comprises a further input means (i.e., in addition to the button 212*b*) in the form of a puff sensor 225*b*. The puff sensor 225*b* is configured to detect a user drawing (i.e., inhaling) at the downstream end 218*b* of the consumable 202*b*. The puff sensor 225*b* may, for example, be in the form of a pressure sensor, a flowmeter, or a microphone. The puff sensor 225*b* is operatively connected to the controller in the electronics cavity 224*b*, such that a signal from the puff sensor 225*b*, indicative of a puff state (i.e., drawing or not drawing), forms an input to the controller (and can thus be responded to by the controller). An exemplary device 301*b* with wireless charging capability is disclosed. The device 301*b* may wirelessly receive energy from a wireless charging dock 302*b* to charge the device 301*b*. FIG. 9A is a schematic of a device 301*b* of a smoking substitute system in accordance with an aspect of the third mode.

The device 301*b* (hereinafter referred to as device 301*b*) comprises a device controller 303*b*, a device memory 304*b*, a rechargeable battery 305*b* and a wireless charging module 306*b*. In one aspect, the device controller 303*b* may be interchangeably referred to the controller 108*b*. The device controller 303*b* is configured to control at least one function of the device 301*b*. In one example, the device controller 303*b* is configured to control an output power received from the wireless charging module 306*b*.

The device memory 304*b* may be interchangeably referred to the memory 109*b*, for storing instructions that are executable by the device controller 303*b* to control at least one function of the device 301b. For example, the function of the device 301b include charging of the rechargeable battery 305b with power received via the wireless charging module 306b and to supply necessary power to the heater (not shown). The rechargeable battery 305b may be interchangeably referred as the power source 105b.

The wireless charging module 306b is located on an inner surface of the device 301b. Alternatively, the wireless charging module 306b is located within an electronic compartment (not shown) located on the inner surface of the device 301b. The rechargeable battery 305b or the electronic compartment may be sealed. The wireless charging module 306b comprises a first plurality of coils (not shown) located adjacent to the rechargeable battery 305b so as to efficiently charge the rechargeable battery 305b without any power loss. In one aspect, at least one of the first plurality of coils is located at a predetermined distance from the outer surface of the device 301b to efficiently and wirelessly receive the energy for charging the rechargeable battery 305b. One example of the predetermined distance may be less than 5 mm. The outer surface of the device 301b may be configured to be flat with increased surface density on the outer surface so as to wirelessly receive abundant amount of energy in less charging time.

The device 301b further comprises at least one light (not shown), located on a side opposite to the first plurality of coils, for indicating charge level or charging status to a user or when the device 301b is in a preferred charging orientation. The light may comprise the one or more LEDs 211b to indicate the charging level or status to the user. In one example, the device controller 303b may light the one or more LEDs 211b in progressive pattern to show the charging level. In another example, the device controller 303b may light at least one LED in flashing pattern to indicate the charging status of the device 301b. In yet another example, the device controller 303b may light the same LED or another LED to indicate whether the device 301b is placed in the preferred orientation to receive the power. This would enhance intuitive user experience.

The device 301b further comprises at least one button (not shown), located on a side opposite to the first plurality of coils, for user interaction. User interaction may include user request to know the charging level or charging state of the device.

Optionally, the device 301b further comprises at least one feedback means (not shown) to generate one of a haptic feedback, an audio feedback, and a visual feedback to indicate the user about one of beginning, progressing, and ending of the wireless charging operation. This would keep the user informed about the progress of charging and restrict the user from using the device.

Figure 9B:
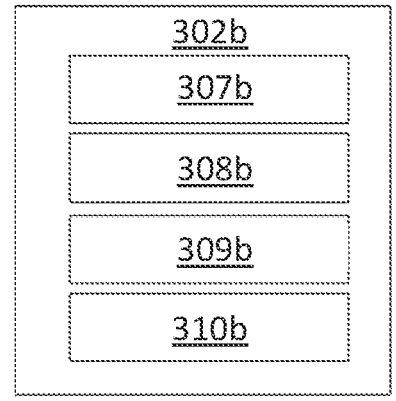
FIG. 9B is a schematic of a wireless charging dock for wirelessly charging the heated tobacco device of FIG. 9A in accordance with an aspect of the third mode.

FIG. 9B is a schematic of the wireless charging dock 302b for wirelessly charging the device 301b of FIG. 9A.

The wireless charging dock (hereinafter referred to as dock) 302b comprises a dock controller 307b, a dock memory 308b, a power supply 309b and a dock wireless charging module 310b. The dock controller 307b is configured to control at least one function of the dock 302b. In one example, the dock controller 307b is configured to control an output power supplied to the device 301b from the power supply 309b, in particular when the presence of a device 301b for charging has been determined.

The dock memory 308b may be configured for storing instructions that are executable by the dock controller 307b to control at least one function of the dock 302b. For example, the function of the dock 302b include wirelessly transmitting power to wireless charging module 306b of the device 301b. The dock controller 307b may also detect as to whether the device 301b is arranged in the preferred orientation with the dock 302b. Preferred orientation, may be for example, include engagement at the correct location of the device 301b on the dock 302b.

The dock 302b comprises a second plurality of coils coupled to the power supply 309b. Optionally, at least one of the second plurality of coils is positioned proximate to the device 301b so as to wirelessly connect during the charging operation. In one aspect, the body of the dock 302b is configured in a predetermined shape so as to arrange the device 301b in the preferred orientation for wireless charging with the dock 302b. In one aspect, the preferred orientation is a preferred charging orientation provided by an engagement means (not shown) to arrange the device 301b at the correct location on the dock 302b.

In one aspect, the engagement means is a magnetic means capable of providing magnetic coupling of the device 301b with the dock 302b. The magnetic means enables desired coupling of the device 301b at the correct location on the dock 302b. The engagement means would provide the necessary engagement of the device 301b with the dock 302b so as to arrange the device 301b in the preferred orientation for wireless charging.

The dock wireless charging module 310b is configured to operate in synchronization with the wireless charging module 306b of the device 301b. The dock wireless charging module 310b controls the output power of the power supply 309b via the second plurality of coils to the first plurality of coils of the wireless charging module 306b of the device 301b. The second plurality of coils is placed in proximate distance with at least one of first plurality of coils so as to wirelessly transmit the power from the power supply 309b. The wireless charging module 306b of the device 301b continuously monitors the charging level and charging state of the rechargeable battery 305b and upon determining that the rechargeable battery 305b is fully charged, the wireless charging module 306b wirelessly transmits a confirmation message to the dock 302b. The dock wireless charging module 310b of the dock 302b receives the confirmation message and in response, terminates the power supply to the second plurality of coils thereby disabling the operation of the dock wireless charging module 310b.

Figure 9C:
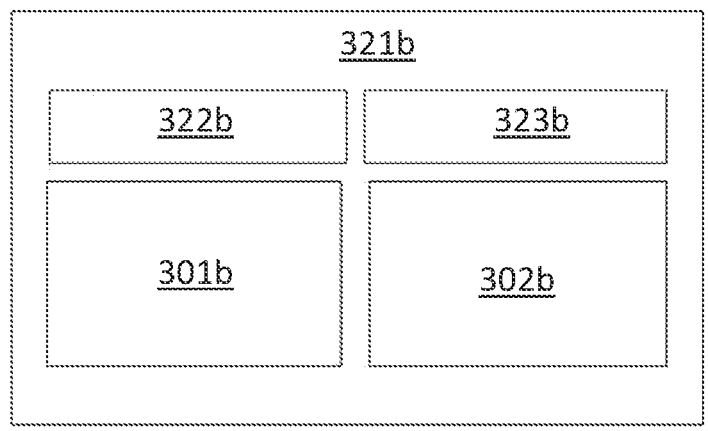
FIG. 9C is a schematic of the third mode of the smoking substitute system.

FIG. 9C is a schematic of a smoking substitute system in accordance with an aspect of the third mode.

The system 321b comprises the device 301b and the dock 302b. The dock 302b is configured to wirelessly charge the device 301b. The system further comprises a system controller 322b, coupled to the dock 302b, and configured to control the output power from the dock 302b to the device 301b. The system controller 322b, in one aspect, performs the functionality of the dock controller 307b.

In operation, the device 301b is arranged in the preferred orientation with the dock 302b via the engagement means. The dock wireless charging module 310b activates the power supply to the second plurality of coils, that in turn wirelessly transmits the power to the first plurality of coils of the device 301b. The device controller 303b monitors the charging level and charging status of the rechargeable battery 305b of the device 301b. Upon determining that the rechargeable battery 305b is fully charged, the wireless charging module 306b wirelessly transmits a confirmation message to the dock 302b. The dock wireless charging module 310b of the dock 302b receives the confirmation message and in response, terminates the power supply to the second plurality of coils thereby disabling the operation of the dock wireless charging module 310b. In another aspect, the system controller 322b receives the confirmation message and in response, control the output power from the dock 302b. Thus, enabling the device 301b with wireless charging capability without using wires, easy to use, and portable.

Fourth Mode: A Location of a User Input Means in a Smoking Substitute Device.

Aspects and embodiments of the fourth mode of the present disclosure will now be discussed with reference to the accompanying figures. Further aspects and embodiments will be apparent to those skilled in the art. All documents mentioned in this text are incorporated herein by reference.

Figure 10A:
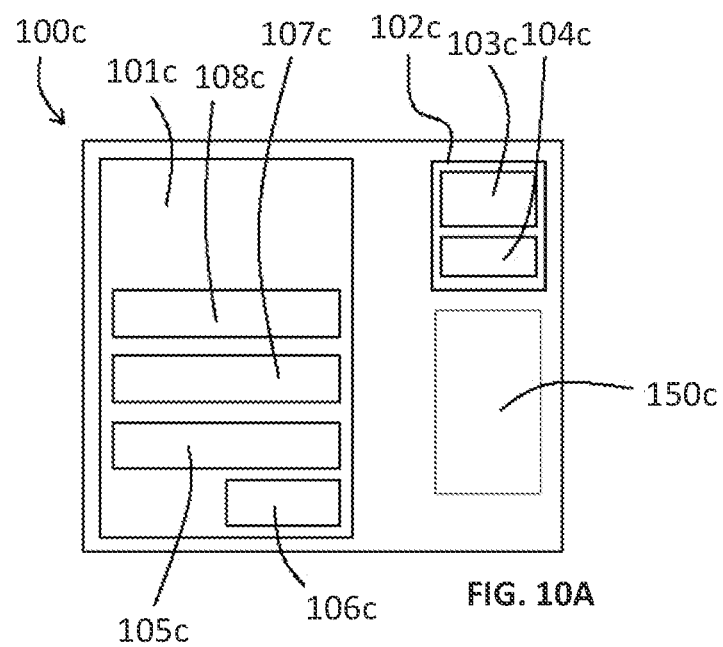
FIG. 10A is a schematic of a fourth mode of the smoking substitute system.

FIG. 10A is a schematic providing a general overview of a smoking substitute system 100c. The system 100c includes a substitute smoking device 101c and an aerosol-forming article in the form of a consumable 102c, which comprises an aerosol former 103c. The system is configured to vaporize the aerosol former by heating the aerosol former 103c (so as to form a vapor/aerosol for inhalation by a user).

In the illustrated system, the heater 104c forms part of the consumable 102c and is configured to heat the aerosol former 103c. Heat from the heater 104c vaporizes the aerosol former 103c to produce a vapor. The vapor subsequently condenses to form an aerosol, which is ultimately inhaled by the user.

The system 100c further comprises a power source 105c that forms part of the device 101c. In other embodiments the power source 105c may be external to (but connectable to) the device 101c. The power source 105c is electrically connectable to the heater 104c such that it is able to supply power to the heater 104c (i.e., for the purpose of heating the aerosol former 103c). Thus, control of the electrical connection of the power source 105c to the heater 104c provides control of the state of the heater 104c. The power source 105c may be a power store, for example a battery or rechargeable battery (e.g., a lithium-ion battery).

The system 100c further comprises an I/O module comprising a connector 106c (e.g., in the form of a USB port, Micro USB port, USB-C port, etc.). The connector 106c is configured for connection to an external source of electrical power, e.g., a mains electrical supply outlet. The connector 106c may be used in substitution for the power source 105c. That is the connector 106c may be electrically connectable to the heater 104c so as to supply electricity to the heater 104c. In such embodiments, the device may not include a power source, and the power source of the system may instead comprise the connector 106c and an external source of electrical power (to which the connector 106c provides electrical connection).

In some embodiments, the connector 106c may be used to charge and recharge the power source 105c where the power source 104c includes a rechargeable battery.

The system 100c also comprises a user interface (UI) 107c. Although not shown, the UI 107c may include input means to receive commands from a user. The input means of the UI 107c allows the user to control at least one aspect of the operation of the system 100c. The input means may, for example, be in the form of a button, touchscreen, switch, microphone, etc.

The UI 107c also comprises output means to convey information to the user. The output means may, for example, comprise lights (e.g., LEDs), a display screen, speaker, vibration generator, etc.

The system 100c further comprises a controller 108c that is configured to control at least one function of the device 101c. In the illustrated embodiment, the controller 108c is a component of the device 101c, but in other embodiments may be separate from (but connectable to) the device 101c.

The controller 108c is configured to control the operation of the heater 104c and, for example, may be configured to control the voltage applied from the power source 105c to the heater 104c. The controller 108c may be configured to toggle the supply of power to the heater 105c between an on state, in which the full output voltage of the power source 105c is applied to the heater 104c, and an off state, in which the no voltage is applied to the heater 104c.

Although not shown, the system 100c may also comprise a voltage regulator to regulate the output voltage from the power source 105c to form a regulated voltage. The regulated voltage may then be applied to the heater 104c.

In addition to being connected to the heater 104c, the controller 108c is operatively connected to the UI 107c. Thus, the controller 108c may receive an input signal from the input means of the UI 107c. Similarly, the controller 108c may transmit output signals to the UI 107c. In response, the output means of the UI 107c may convey information, based on the output signals, to a user.

Figure 10B:
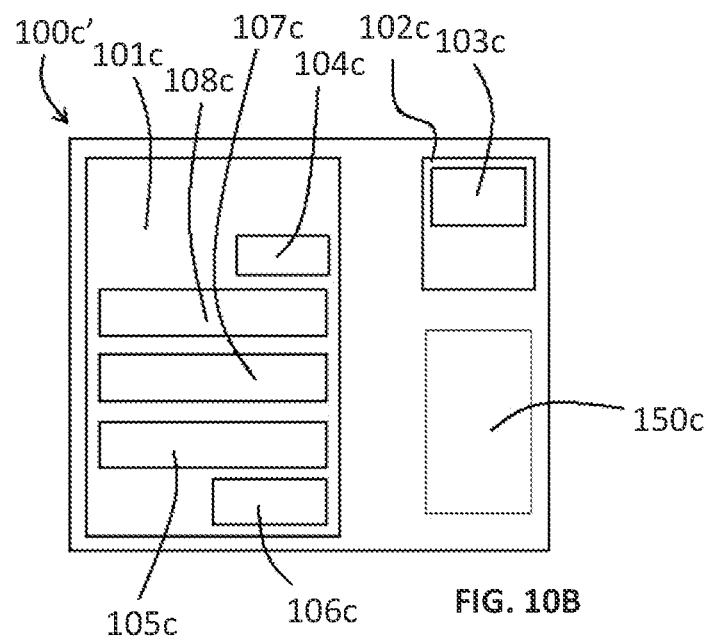
FIG. 10B is a schematic of a variation of the fourth mode of the smoking substitute system of FIG. 10A.

FIG. 10B is a schematic showing a variation of the system 100c of FIG. 10A. In the system 100c' of FIG. 10B, the heater 104c forms part of the consumable 102c, rather than the device 101c. In this variation, the heater 104c is electrically connectable to the power source 105c, for example, when the consumable 102c is engaged with the device 101c.

The systems 100c, 100c' of FIG. 10A and FIG. 10B may be implemented as one of two broad categories of system, each in accordance with an aspect of the fourth mode: a heated tobacco (HT) system or an e-cigarette system. A description of each category of system follows.

Figure 11A:
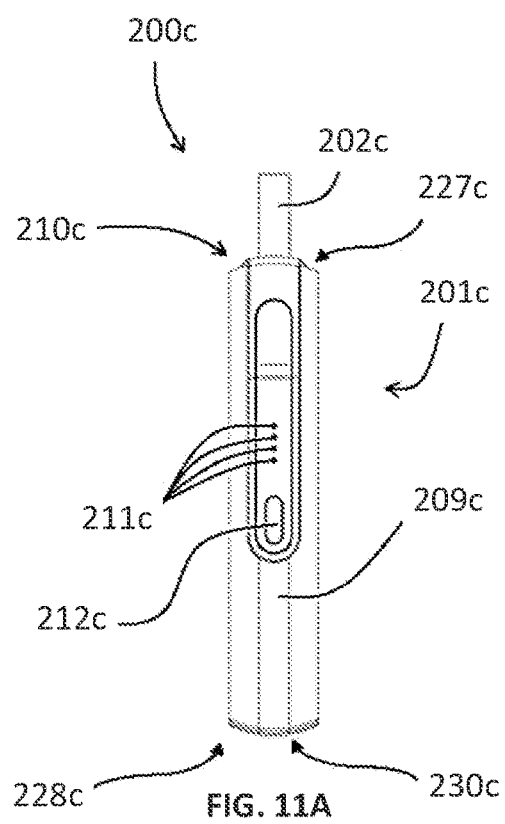
FIG. 11A is a front view of a first embodiment of the fourth mode of the smoking substitute system with the consumable engaged with the device.
Figure 11B:
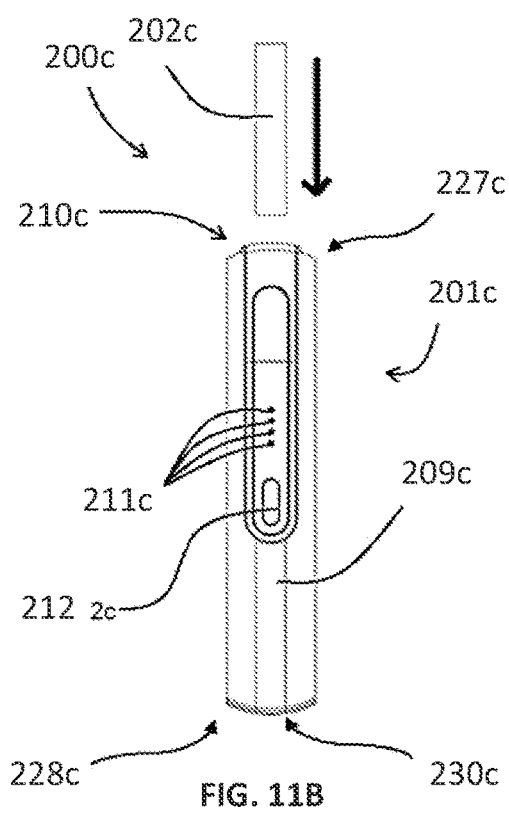
FIG. 11B is a front view of the first embodiment of the fourth mode of the smoking substitute system with the consumable disengaged from the device.

FIG. 11A and FIG. 11B illustrate a heated-tobacco (HT) smoking substitute system 200c. The system 200c is an example of the systems 100c, 100c' described in relation to FIG. 10A or FIG. 10B. System 200c includes an HT device 201c and an HT consumable 202c. The description of FIG. 10A and FIG. 10B above is applicable to the system 200c of FIG. 11A and FIG. 11B and will not be repeated.

The device 201c and the consumable 202c are configured such that the consumable 202c can be engaged with the device 201c. FIG. 11A shows the device 201c and the consumable 202c in an engaged state, whilst FIG. 11B shows the device 201c and the consumable 202c in a disengaged state.

The device 201c comprises a body 209c and cap 210c. In use the cap 210c is engaged at an end of the body 209c. Although not apparent from the figures, the cap 210c is moveable relative to the body 209c. In particular, the cap 210c is slidable and can slide along a longitudinal axis of the body 209c.

The device 201c comprises an output means (forming part of the UI of the device 201c) in the form of a plurality of light-emitting diodes (LEDs) 211c arranged linearly along the longitudinal axis of the device 201c and on an outer surface of the body 209c of the device 201c. A button 212c is also arranged on an outer surface of the body 209c of the device 201c and is axially spaced (i.e., along the longitudinal axis) from the plurality of LEDs 211c.

Figure 11C:
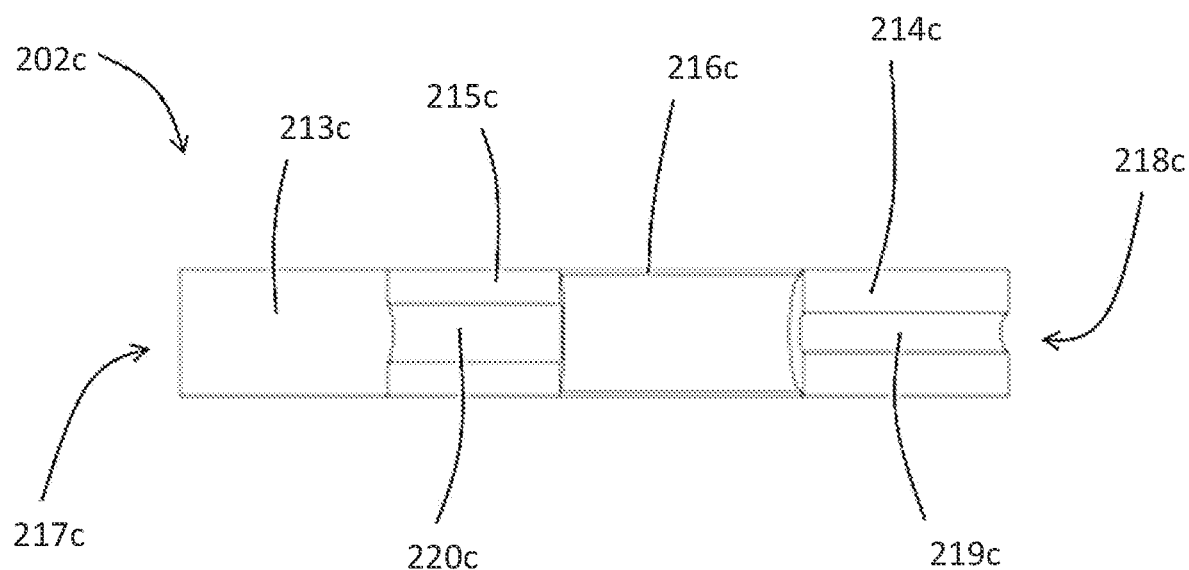
FIG. 11C is a section view of the consumable of the first embodiment of the fourth mode of the smoking substitute system.

FIG. 11C show a detailed section view of the consumable 202c of the system 200c. The consumable 202c generally resembles a cigarette. In that respect, the consumable 202c has a generally cylindrical form with a diameter of 7 mm and an axial length of 70 mm. The consumable 202c comprises an aerosol forming substrate 213c, a terminal filter element 214c, an upstream filter element 215c and a spacer element 216c. In other embodiments, the consumable may further comprise a cooling element. A cooling element may exchange heat with vapor that is formed by the aerosol-forming substrate 213c in order to cool the vapor so as to facilitate condensation of the vapor.

The aerosol-forming substrate 213c is substantially cylindrical and is located at an upstream end 217c of the consumable 202c and comprises the aerosol former of the system 200c. In that respect, the aerosol forming substrate 213c is configured to be heated by the device 201c to release a vapor. The released vapor is subsequently entrained in an airflow flowing through the aerosol-forming substrate 213c. The airflow is produced by the action of the user drawing on a downstream end 218c (i.e., terminal or mouth end) of the consumable 202c.

In the present embodiment, the aerosol forming substrate 213c comprises tobacco material that may, for example, include any suitable parts of the tobacco plant (e.g., leaves, stems, roots, bark, seeds, and flowers). The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon). For example, the aerosol-forming substrate 213c may comprise a gathered sheet of homogenized (e.g., paper/slurry recon) tobacco or gathered shreds/strips formed from such a sheet.

In order to generate an aerosol, the aerosol forming substrate 213c comprises at least one volatile compound that is intended to be vaporized/aerosolized and that may provide the user with a recreational and/or medicinal effect when inhaled. The aerosol-forming substrate 213c may further comprise one or more additives. For example, such additives may be in the form of humectants (e.g., propylene glycol and/or vegetable glycerin), flavorants, fillers, aqueous/non-aqueous solvents and/or binders.

The terminal filter element 214c is also substantially cylindrical and is located downstream of the aerosol forming substrate 213c at the downstream end 218c of the consumable 202c. The terminal filter element 214c is in the form of a hollow bore filter element having a bore 219c (e.g., for airflow) formed therethrough. The diameter of the bore 219c is 2 mm. The terminal filter element 214c is formed of a porous (e.g., monoacetate) filter material. As set forth above, the downstream end 218c of the consumable 202c (i.e., where the terminal filter 214c is located) forms a mouthpiece portion of the consumable 202c upon which the user draws. Airflow is drawn from the upstream end 217c, thorough the components of the consumable 202c, and out of the downstream end 218c. The airflow is driven by the user drawing on the downstream end 218c (i.e., the mouthpiece portion) of the consumable 202c.

The upstream filter element 215c is located axially adjacent to the aerosol-forming substrate 213c, between the aerosol-forming substrate 213c and the terminal filter element 214c. Like the terminal filter 214c, the upstream filter element 215c is in the form of a hollow bore filter element, such that it has a bore 220c extending axially therethrough. In this way, the upstream filter 215c may act as an airflow restrictor. The upstream filter element 215c is formed of a porous (e.g., monoacetate) filter material. The bore 220c of the upstream filter element 214c has a larger diameter (3 mm) than the terminal filter element 214c.

The spacer 216c is in the form of a cardboard tube, which defines a cavity or chamber between the upstream filter element 215c and the terminal filter element 214c. The spacer 216c acts to allow both cooling and mixing of the vapor/aerosol from the aerosol-forming substrate 213c. The spacer has an external diameter of 7 mm and an axial length of 14 mm.

Although not apparent from the figure, the aerosol-forming substrate 213c, upstream filter 215c and spacer 216c are circumscribed by a paper wrapping layer. The terminal filter 214c is circumscribed by a tipping layer that also circumscribes a portion of the paper wrapping layer (so as to connect the terminal filter 214c to the remaining components of the consumable 202c). The upstream filter 215c and terminal filter 214c are circumscribed by further wrapping layers in the form of plug wraps.

Figure 11D:
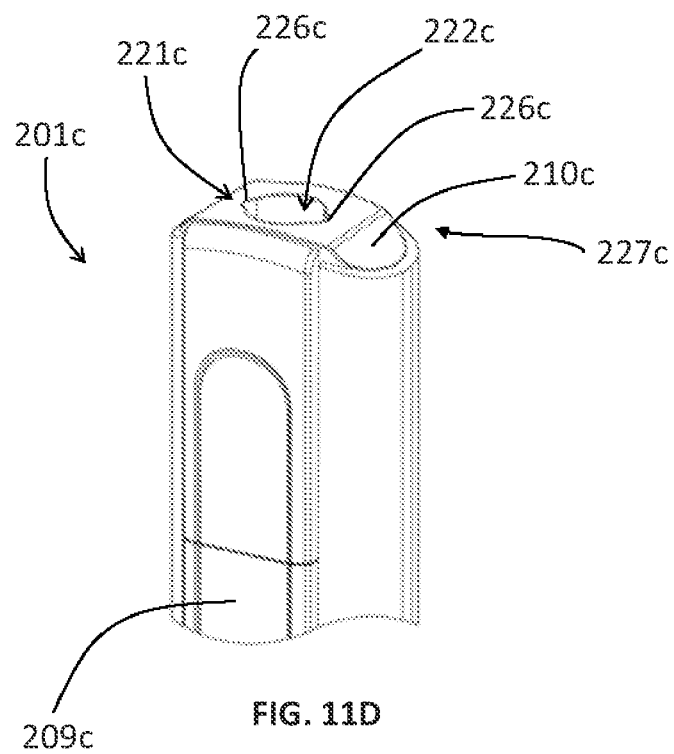
FIG. 11D is a detailed view of an end of the device of the first embodiment of the fourth mode of the smoking substitute system.

Returning now to the device 201c, FIG. 11D illustrates a detailed view of the end of the device 201c that is configured to engage with the consumable 202c. The cap 210c of the device 201c includes an opening 221c to an internal cavity 222c (more apparent from FIG. 11D) defined by the cap 210c. The opening 221c and the cavity 222c are formed so as to receive at least a portion of the consumable 202c. During engagement of the consumable 202c with the device 201c, a portion of the consumable 202c is received through the opening 221c and into the cavity 222c. After engagement (see FIG. 11B), the downstream end 218c of the consumable 202c protrudes from the opening 221c and thus also protrudes from the device 201c. The opening 221c includes laterally disposed notches 226c. When a consumable 202c is received in the opening 221c, these notches 226c remain open and could, for example, be used for retaining a cover in order to cover the end of the device 201c.

Figure 11E:
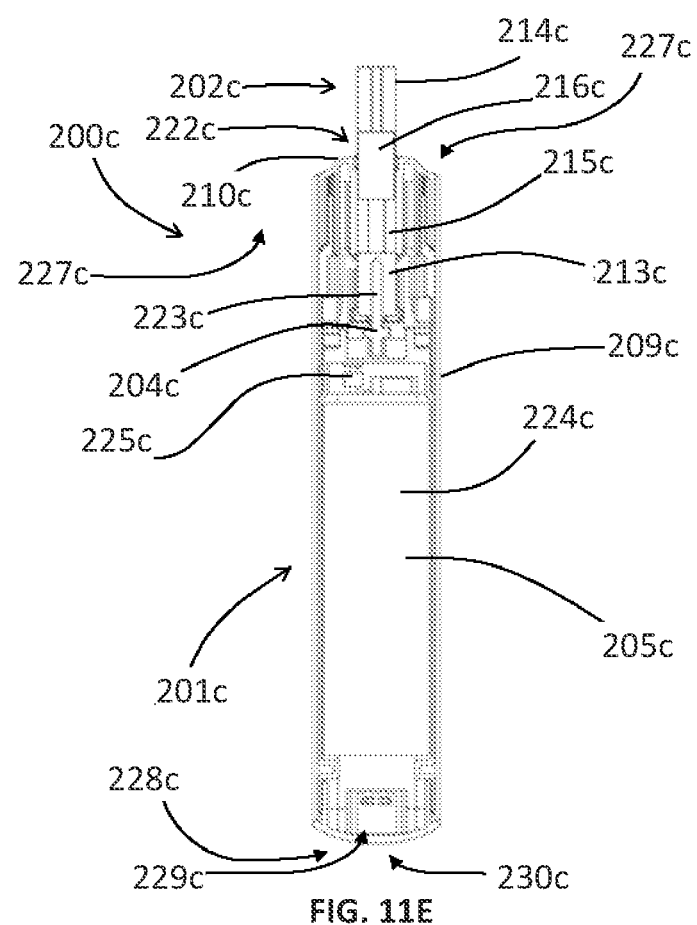
FIG. 11E is a section view of the first embodiment of the fourth mode of the smoking substitute system.

FIG. 11E shows a cross section through a central longitudinal plane through the device 201c. The device 201c is shown with the consumable 202c engaged therewith.

The device 201c comprises a heater 204c comprising heating element 223c. The heater 204c forms part of the body 209c of the device 201c and is rigidly mounted to the body 209c. In the illustrated embodiment, the heater 204c is a rod heater with a heating element 223c having a circular transverse profile. In other embodiments the heater may be in the form of a blade heater (e.g., heating element with a rectangular transverse profile) or a tube heater (e.g., heating element with a tubular form).

The heating element 223c of the heater 204c projects from an internal base of the cavity 222c along a longitudinal axis towards the opening 221c. As is apparent from the figure, the length (i.e., along the longitudinal axis) of the heating element is less than a depth of the cavity 222c. In this way, the heating element 223c does not protrude from or extend beyond the opening 221c.

When the consumable 202c is received in the cavity 222c (as is shown in FIG. 11E), the heating element 223c penetrates the aerosol-forming substrate 213c of the consumable 202c. In particular, the heating element 223c extends for nearly the entire axial length of the aerosol-forming substrate 213c when inserted therein. Thus, when the heater 204c is activated, heat is transferred radially from an outer circumferential surface the heating element 223c to the aerosol-forming substrate 213c.

The device 202c further comprises an electronics cavity 224c. A power source, in the form of a rechargeable battery 205c (a lithium-ion battery), is located in electronics cavity 224c.

The device 202c includes a connector (i.e., forming part of an IO module of the device 201c) in the form of a USB port 206c. The connector may alternatively be, for example, a micro-USB port or a USB-C port for examples. The USB port 206c may be used to recharge the rechargeable battery 205c.

The device 202c includes a controller (not shown) located in the electronics cavity 224c. The controller comprises a microcontroller mounted on a printed circuit board (PCB).

The USB port 206c is also connected to the controller 208c (i.e., connected to the PCB and microcontroller).

The controller 208c is configured to control at least one function of the device 202c. For example, the controller 208c is configured to control the operation of the heater 204c. Such control of the operation of the heater 204c may be accomplished by the controller toggling the electrical connection of the rechargeable battery 205c to the heater 204c. For example, the controller 208c is configured to control the heater 204c in response to a user depressing the button 212c. Depressing the button 212c may cause the controller to allow a voltage (from the rechargeable battery 205c) to be applied to the heater 204c (so as to cause the heating element 223c to be heated).

The controller is also configured to control the LEDs 211c in response to (e.g., a detected) a condition of the device 201c or the consumable 202c. For example, the controller may control the LEDs to indicate whether the device 201c is in an on state or an off state (e.g., one or more of the LEDs may be illuminated by the controller when the device is in an on state).

The device 202c comprises a further input means (i.e., in addition to the button 212c) in the form of a puff sensor 225c. The puff sensor 225c is configured to detect a user drawing (i.e., inhaling) at the downstream end 218c of the consumable 202c. The puff sensor 225c may, for example, be in the form of a pressure sensor, a flowmeter, or a microphone. The puff sensor 225c is operatively connected to the controller 208c in the electronics cavity 224c, such that a signal from the puff sensor 225c, indicative of a puff state (i.e., drawing or not drawing), forms an input to the controller 208c (and can thus be responded to by the controller 208c).

According to another aspect of the fourth mode, there is provided a heat-not-burn device 201c comprising a longitudinal body 209c having a first end 227c and a second end 228c. As illustrated in FIG. 11E, the first end 227c of the body 209c is configured to receive the consumable 202c, and a user input means is located at the second end 228c of the body 209c. The first end 227c and second end 228c are at opposite terminal longitudinal ends of the device 201c. The user input means is configured to control an aspect of the operation of heat-not-burn device 201c. Advantageously, the provision of the user input means at the second end 228c prevents inadvertent pressing and operation of the aspect of control of the heat-not-burn device 201c. As can be seen from FIG. 11C the first end 227c of the body 209c includes a cap 210c detachably connected to the body 209c. As shown in FIG. 11D, the cap 210c of the device 201c includes an opening 221c to an internal cavity 222c (see FIG. 11D) defined by the cap 210c. The opening 221c and the cavity 222c are formed so as to receive at least a portion of the consumable 202c. During engagement of the consumable 202c with the device 201c, a portion of the consumable 202c is received through the opening 221c and into the cavity 222c.

The second end 228c of the body 209c of the heat-not-burn device 202c may comprises a recess 229c to accommodate the user input means. In an embodiment, the user input means may be at least one of push button, switch, keypad, or toggle switch, to control operation of an aspect of the heat-not-burn device. In an embodiment, the operation controlled by the user input means may include controlling the mode of the device, e.g., ON or OFF mode, selecting between two or more operational modes, controlling the heater of the device, and the like. The recess 229c formed at the second end 228c may have configuration complementary to a configuration of the user input means, to house the user input means. Having a recessed user input means may reduce the chance of inadvertent activation of the user input means.

The user input means accommodated within the recess 229c is enclosed by a flexible covering means 230c. The flexible covering means 230c may be abutting to a surface of the user input means (not shown in Figures), which facilitates actuation of the user input means (not shown in Figures). Further, the flexible covering means 230c may include a silicone covering or any suitable soft material for ease of actuating (for example, pressing) the user input means. The flexible covering means 230c may be configured to enclose the user input means. Optionally, the flexible covering means 230c may have a tactile surface formed on an operative surface for providing the user a grip while pressing/actuating the user input means. An external surface of the flexible covering means 230c may be flush with an adjacent external surface of the second end 228c.

Optionally, the longitudinal body 209c of the heat-not-burn device 202c has a longitudinal length greater than a transverse width of the device. Optionally, the longitudinal width of the body 209c may be a factor of at least 3 greater than the transverse width of the body 209c. Optionally, the longitudinal width of the body 209c may be a factor of at least 4 greater than the transverse width of the body 209c. Optionally, the longitudinal width of the body 209c may be a factor of at least 5 greater than the transverse width of the body 209c. Optionally, the longitudinal width of the body 209c may be a factor of at least 6 greater than the transverse width of the body 209c. This may facilitate a user to hold the device 202c and simultaneously push a consumable within the provision of the cap 210c and press the user input means on the second end 228c of the device. In an embodiment, the longitudinal length of the body 209c may range from 10 cm to 14 cm in a longitudinal dimension. The location of the user input means reduces a likelihood of inadvertent activation of the user input means when the device 202c is located in a user's hand.

Figure 12A:
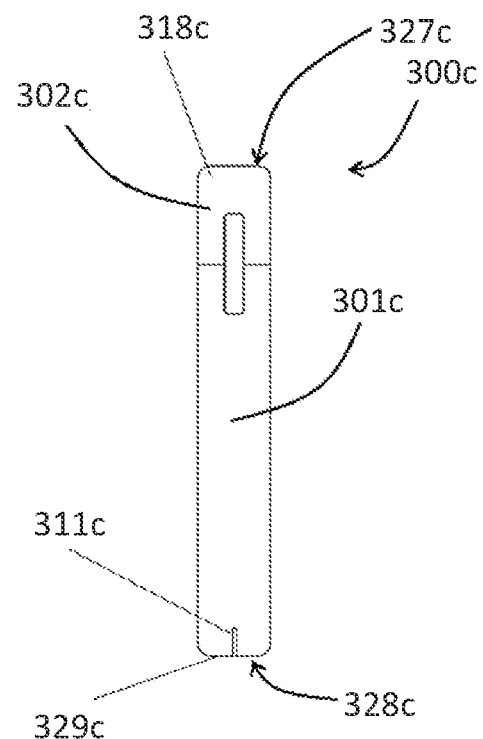
FIG. 12A is a front view of a second embodiment of the fourth mode of the smoking substitute system with the consumable engaged with the device.
Figure 12B:
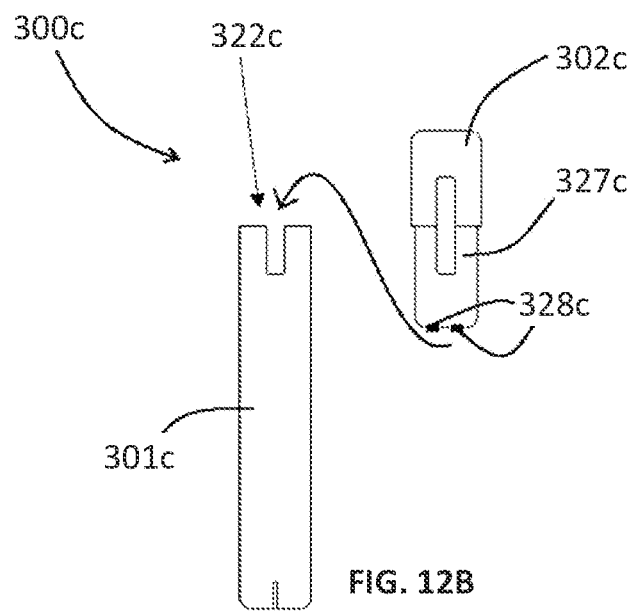
FIG. 12B is a front view of a second embodiment of the fourth mode of the smoking substitute system with the consumable disengaged from the device.

FIG. 12A and FIG. 12B illustrate an e-cigarette smoking substitute system 300c. The system 300c is an example of the systems 100c, 100c' of FIG. 10A and FIG. 10B and comprises an e-cigarette device 301c and an e-cigarette consumable 302c. The description of FIG. 10A and FIG. 10B above is applicable to the system of FIG. 12A and FIG. 12B and will not be repeated.

The device 301c and the consumable 302c are configured such that the consumable 302c can be engaged with the device 301c. FIG. 12A shows the device 301c and the consumable 302c in an engaged state, whilst FIG. 12B shows the device 301c and the consumable 302c in a disengaged state. During engagement a portion of the consumable 302c is received in a cavity 322c of the device 301c. The consumable 302c is retained in the device 301c via an interference fit (although in other embodiments, the device and consumable could be engaged by screwing one onto (or onto) the other, through a bayonet fitting, or by way of a snap engagement mechanism).

The consumable 302c includes a tank 327c. The tank 327c defines a reservoir for the storage of an aerosol-former, which in this embodiment, is in the form of e-liquid.

In this present embodiment, the consumable 302c is a "single-use" consumable. That is, upon exhausting the e-liquid in the tank 327c, the intention is that the user disposes of the whole consumable 302c. In other embodiments, the e-liquid (i.e., aerosol former) may be the only part of the system that is truly "single-use". In such embodiments, the tank may be refillable with e-liquid, or the e-liquid may be stored in a non-consumable component of the system. For example, the e-liquid may be stored in a tank located in the device or stored in another component that is itself not single-use (e.g., a refillable cartomizer).

In the illustrated system 300c, a heater 304c is located in the consumable 302c and is configured to heat and vaporize the e-liquid (stored in the tank 327c). Although not shown, the heater 304c comprises a porous wick and a resistive heating element. The porous wick conveys e-liquid from the tank 327c to the heating element. The heating element is a heating filament that is helically wound around a portion of the porous wick, such that when the heating element is heated (e.g., by the action of electrical current passing through the heating element), heat is transferred from the heating element to the e-liquid conveyed by the wick. This transfer of heat vaporizes the e-liquid, and the resultant vapor is entrained in an airflow passing through the consumable 302c (i.e., driven by a user drawing on a downstream end 318c of the consumable 302c). Between the vaporization point at the coil and the downstream end 318c (i.e., the mouth end), the vapor condenses into an aerosol, and is subsequently inhaled by the user.

Like the previously described embodiment, the device 301c comprises a power source in the form of a rechargeable battery (not shown) and a connector in the form of a USB port (not shown). The device 302c further comprises controller (also not shown). The rechargeable battery, connector and controller are similar (and operate in a similar manner) to the corresponding components of the embodiment described above with respect to FIG. 11A to FIG. 10E.

The consumable 302c includes a pair of heater electrical contacts 328c disposed on a device-facing end surface of the consumable 302c. The heater electrical contacts 328c are electrically connected to the heater 304c in the consumable 302c, such that a voltage applied across the heater electrical contacts 302c generally corresponds to a voltage applied across the resistive heating element of the heater 304c.

When the consumable 302c is engaged with the device 301c, the heater electrical contacts 328c are brought into electrical contact with corresponding device electrical contacts (not shown) on the device 301c. The device electrical contacts are electrically connected (directly or indirectly) to the rechargeable battery. The controller may thus be configured to control the voltage applied across the device electrical contacts from the rechargeable battery. By controlling the voltage applied across the device electrical contacts, the voltage applied to the heater 304c is correspondingly controlled.

The device 302c includes an output means (forming part of the UI of the system 300c) in the form of a single light-emitting diode ("LED") 311. The LED 311c is operatively connected to the controller, such that controller can control the illumination of the LED 311c. The controller is configured to illuminate the LED when then the heater 304c is active.

The device 301c also includes an input means in the form of a puff sensor (not shown). The puff sensor is the same as that described above with respect to the embodiment shown in FIG. 11A to FIG. 10E.

A user input means positioned at a second end 328c of the device, the second end 328c being opposite to a first end 327c of the device. In an embodiment the user input means is a toggle switch. The first end 327c of the device being configured for receiving an aerosol forming article, wherein the toggle switch is configured to control an aspect of the operation of the smoking substitute device 301c. In an embodiment, the operation controlled by the toggle switch may include controlling the mode of the device, i.e., ON or OFF mode, selecting an operating mode of the device, controlling the heater of the device, and the like. The toggle switch is disposed and accommodated within a recess 329c formed at a second end of the device. Optionally, the toggle switch is enclosed by a flexible covering means 329c. In an embodiment, the flexible covering means 329c is a silicone cover. Further, the size of the device may facilitate a user to simultaneously push the consumable into the cavity and actuate the toggle switch in the second end. In an embodiment, the longitudinal length of the device 301c may range from 10 cm to 14 cm in a longitudinal dimension. The action of simultaneous pushing of the consumable 302c and the toggle switch allows ease of operating the device 301c and thus may provide single handed utility. The substitute smoking device may form part of an e-cigarette smoking substitute system.

Fifth Mode: Operating a Smoking Substitute System Switchable Between Different States.

Aspects and embodiments of the fifth mode of the present disclosure will now be discussed with reference to the accompanying figures. Further aspects and embodiments will be apparent to those skilled in the art. All documents mentioned in this text are incorporated herein by reference.

Figure 13A:
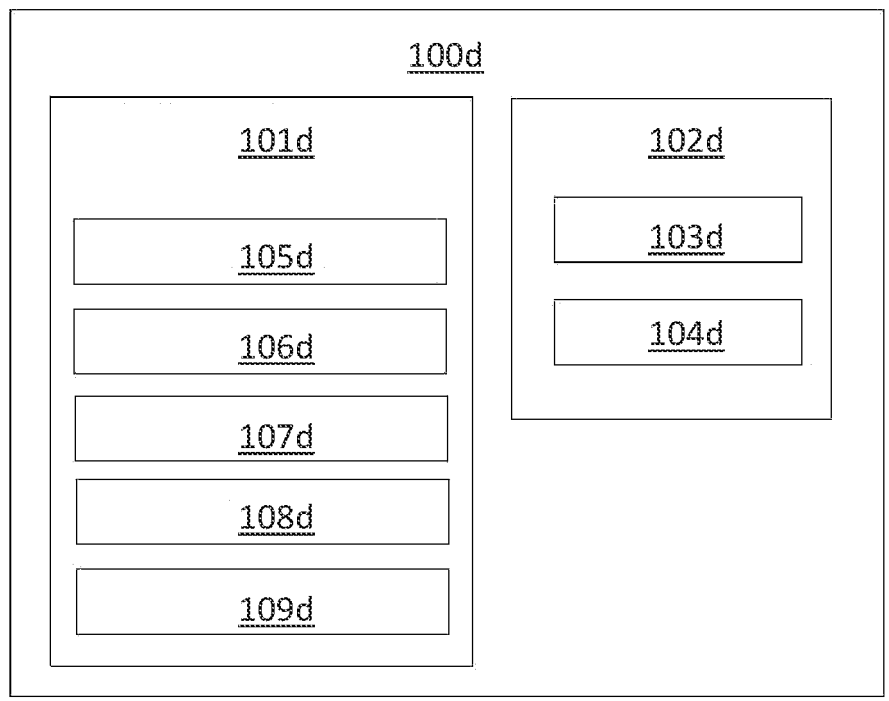
FIG. 13A is a schematic of a fifth mode of the smoking substitute system.

FIG. 13A is a schematic providing a general overview of a smoking substitute system 100d. The system 100d includes a substitute smoking device 101d and an aerosol-forming article in the form of a consumable 102d, which comprises an aerosol former 103d. The system is configured to vaporize the aerosol former by heating the aerosol former 103d (so as to form a vapor/aerosol for inhalation by a user).

In the illustrated system, the heater 104d forms part of the consumable 102d and is configured to heat the aerosol former 103d. Heat from the heater 104d vaporizes the aerosol former 103d to produce a vapor. The vapor subsequently condenses to form an aerosol, which is ultimately inhaled by the user.

The system 100d further comprises a power source 105d that forms part of the device 101d. In other embodiments the power source 105d may be external to (but connectable to) the device 101d. The power source 105d is electrically connectable to the heater 104d such that the power source 105d is able to supply power to the heater 104d (i.e., for the purpose of heating the aerosol former 103d). Thus, control of the electrical connection of the power source 105d to the heater 104d provides control of the state of the heater 104d. The power source 105d may be a power store, for example a battery or rechargeable battery (e.g., a lithium-ion battery).

The system 100d further comprises an I/O module comprising a connector 106d (e.g., in the form of a USB port, Micro USB port, USB-C port, etc.). The connector 106d is configured for connection to an external source of electrical power, e.g., a mains electrical supply outlet. The connector 106d may be used in substitution for the power source 105d. That is the connector 106d may be electrically connectable to the heater 104d so as to supply electricity to the heater 104d. In such embodiments, the device may not include a power source, and the power source of the system may instead comprise the connector 106d and an external source of electrical power (to which the connector 106d provides electrical connection).

In some embodiments, the connector 106d may be used to charge and recharge the power source 105d where the power source 104d includes a rechargeable battery.

The system 100d also comprises a user interface (UI) 107d. Although not shown, the UI 107d may include input means to receive commands from a user. The input means of the UI 107*d* allows the user to control at least one aspect of the operation of the system 100*d*. The input means may, for example, be in the form of a button, touchscreen, switch, microphone, etc.

The UI 107*d* also comprises output means to convey information to the user. The output means may, for example, comprise lights (e.g., LEDs), a display screen, speaker, vibration generator, etc.

The system 100*d* further comprises a controller 108*d* and a memory 109*d* coupled to the controller 108*d*. In the illustrated embodiment, the controller 108*d* is a component of the device 101*d*, but in other embodiments may be separate from (but connectable to) the device 101*d*. The controller 108*d* is configured to switch the device from ON state to OFF state and vice versa. The memory 109*d* stores controller-executable instructions that causes the controller 108*d* to perform one or more functions. The controller 108*d* is configured to control the operation of the heater 104*d* and, for example, may be configured to control the voltage applied from the power source 105*d* to the heater 104*d*. The controller 108*d* may be configured to toggle the supply of power to the heater 105*d* between an on state, in which the full output voltage of the power source 105*d* is applied to the heater 104*d*, and an off state, in which the no voltage is applied to the heater 104*d*.

Although not shown, the system 100*d* may also comprise a voltage regulator to regulate the output voltage from the power source 105*d* to form a regulated voltage. The regulated voltage may then be applied to the heater 104*d*.

In addition to being connected to the heater 104*d*, the controller 108*d* is operatively connected to the UI 107*d*. Thus, the controller 108*d* may receive an input signal from the input means of the UI 107*d*. Similarly, the controller 108*d* may transmit output signals to the UI 107*d*. In response, the output means of the UI 107*d* may convey information, based on the output signals, to a user.

Figure 13B:
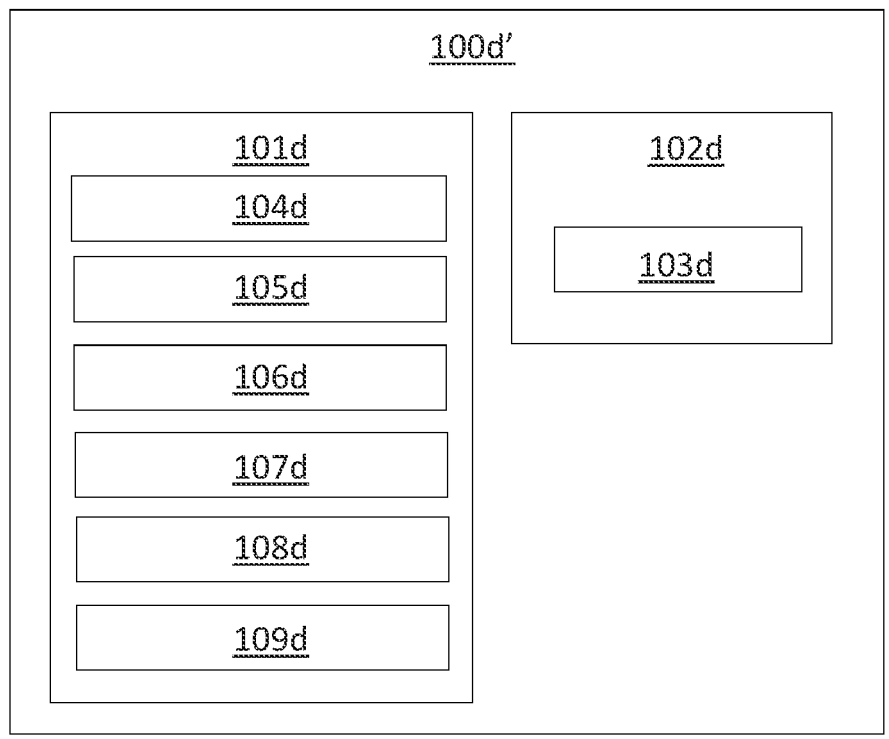
FIG. 13B is a schematic of a variation of the fifth mode of the smoking substitute system of FIG. 13A.

FIG. 13B is a schematic showing a variation of the system 100*d* of FIG. 13A. In the system 100*d'* of FIG. 13B, the heater 104*d* forms part of the consumable 102*d*, rather than the device 101*d*. In this variation, the heater 104*d* is electrically connectable to the power source 105*d*, for example, when the consumable 102*d* is engaged with the device 101*d*.

Figure 14A:
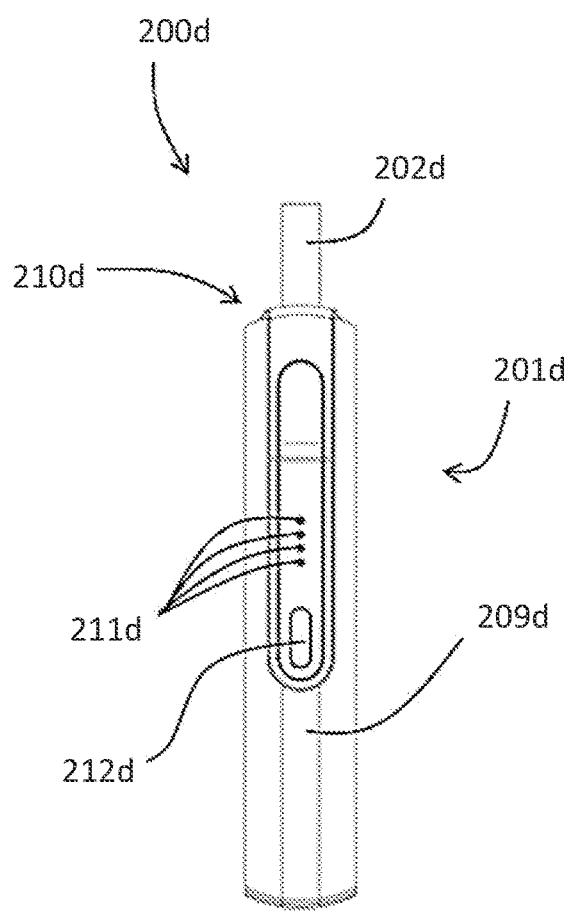
FIG. 14A is a front view of a first embodiment of the fifth mode of the smoking substitute system with the consumable engaged with the device.
Figure 14B:
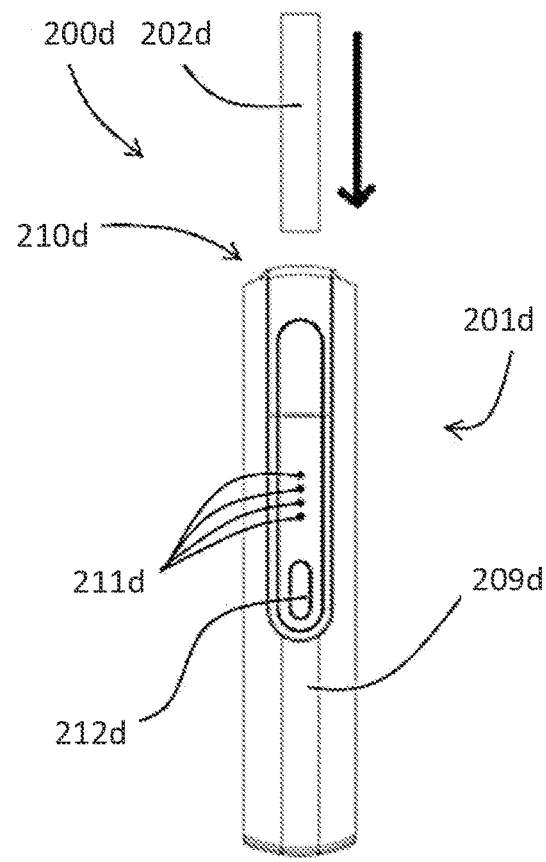
FIG. 14B is a front view of the first embodiment of the fifth mode of the smoking substitute system with the consumable disengaged from the device.

FIG. 14A and FIG. 14B illustrate a heated-tobacco (HT) smoking substitute system 200*d*. The system 200*d* is an example of the systems 100*d*, 100*d'* described in relation to FIG. 13A or FIG. 13B. System 200*d* includes an HT device 201*d* and an HT consumable 202*d*. The description of FIG. 13A and FIG. 13B above is applicable to the system 200*d* of FIG. 14A and FIG. 14B and will not be repeated.

The device 201*d* and the consumable 202*d* are configured such that the consumable 202*d* can be engaged with the device 201*d*. FIG. 14A shows the device 201*d* and the consumable 202*d* in an engaged state, whilst FIG. 14B shows the device 201*d* and the consumable 202*d* in a disengaged state.

The device 201*d* comprises a body 209*d* and cap 210*d*. In use the cap 209*d* is engaged at an end of the body 209*d*. Although not apparent from the figures, the cap 210*d* is moveable relative to the body 209*d*. In particular, the cap 210*d* is slidable and can slide along a longitudinal axis of the body 209*d*.

The device 201*d* comprises an output means (forming part of the UI of the device 201*d*) in the form of a plurality of light-emitting diodes (LEDs) 211*d* arranged linearly along the longitudinal axis of the device 201*d* and on an outer surface of the body 209*d* of the device 201*d*. A button 212*d* is also arranged on an outer surface of the body 209*d* of the device 201*d* and is axially spaced (i.e., along the longitudinal axis) from the plurality of LEDs 211*d*.

The device 201*d* optionally comprises a vibrating element (not shown) coupled to the controller (not shown). The controller activates the vibrating element to provide haptic feedback to the user operating the device in response to change in operating state of the device 201*d*, for example, when the device is switched ON from OFF state and vice versa.

Figure 14C:
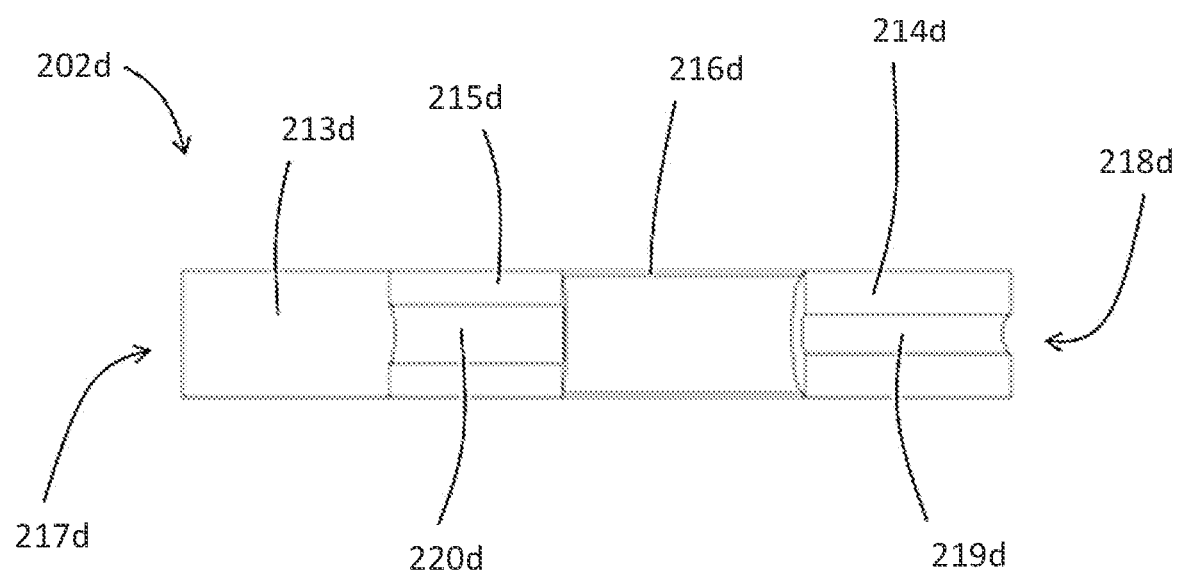
FIG. 14C is a section view of the consumable of the first embodiment of the fifth mode of the smoking substitute system.

FIG. 14C show a detailed section view of the consumable 202*d* of the system 200*d*. The consumable 202*d* generally resembles a cigarette. In that respect, the consumable 202*d* has a generally cylindrical form with a diameter of 7 mm and an axial length of 70 mm. The consumable 202*d* comprises an aerosol forming substrate 213*d*, a terminal filter element 214*d*, an upstream filter element 215*d* and a spacer element 216*d*. In other embodiments, the consumable may further comprise a cooling element. A cooling element may exchange heat with vapor that is formed by the aerosol-forming substrate 213*d* in order to cool the vapor so as to facilitate condensation of the vapor.

The aerosol-forming substrate 213*d* is substantially cylindrical and is located at an upstream end 217*d* of the consumable 202*d* and comprises the aerosol former of the system 200*d*. In that respect, the aerosol forming substrate 213*d* is configured to be heated by the device 201*d* to release a vapor. The released vapor is subsequently entrained in an airflow flowing through the aerosol-forming substrate 213*d*. The airflow is produced by the action of the user drawing on a downstream end 218*d* (i.e., terminal or mouth end) of the consumable 202*d*.

In the present embodiment, the aerosol forming substrate 213*d* comprises tobacco material that may, for example, include any suitable parts of the tobacco plant (e.g., leaves, stems, roots, bark, seeds, and flowers). The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon). For example, the aerosol-forming substrate 213*d* may comprise a gathered sheet of homogenized (e.g., paper/slurry recon) tobacco or gathered shreds/strips formed from such a sheet.

In order to generate an aerosol, the aerosol forming substrate 213*d* comprises at least one volatile compound that is intended to be vaporized/aerosolized and that may provide the user with a recreational and/or medicinal effect when inhaled. The aerosol-forming substrate 213*d* may further comprise one or more additives. For example, such additives may be in the form of humectants (e.g., propylene glycol and/or vegetable glycerin), flavorants, fillers, aqueous/non-aqueous solvents and/or binders.

The terminal filter element 214*d* is also substantially cylindrical and is located downstream of the aerosol forming substrate 213*d* at the downstream end 218*d* of the consumable 202*d*. The terminal filter element 214*d* is in the form of a hollow bore filter element having a bore 219*d* (e.g., for airflow) formed therethrough. The diameter of the bore 219*d* is 2 mm. The terminal filter element 214*d* is formed of a porous (e.g., monoacetate) filter material. As set forth above, the downstream end 218*d* of the consumable 202*d* (i.e., where the terminal filter 214*d* is located) forms a mouthpiece portion of the consumable 202*d* upon which the user draws. Airflow is drawn from the upstream end 217*d*, thorough the components of the consumable 202*d*, and out of the downstream end 218*d*. The airflow is driven by the user drawing on the downstream end 218d (i.e., the mouthpiece portion) of the consumable 202d.

The upstream filter element 215d is located axially adjacent to the aerosol-forming substrate 213d, between the aerosol-forming substrate 213d and the terminal filter element 214d. Like the terminal filter 214d, the upstream filter element 215d is in the form of a hollow bore filter element, such that it has a bore 220d extending axially therethrough. In this way, the upstream filter 215d may act as an airflow restrictor. The upstream filter element 215d is formed of a porous (e.g., monoacetate) filter material. The bore 220d of the upstream filter element 214d has a larger diameter (3 mm) than the terminal filter element 214d.

The spacer 216d is in the form of a cardboard tube, which defines a cavity or chamber between the upstream filter element 215d and the terminal filter element 214d. The spacer 216d acts to allow both cooling and mixing of the vapor/aerosol from the aerosol-forming substrate 213d. The spacer has an external diameter of 7 mm and an axial length of 14 mm.

Figure 14D:
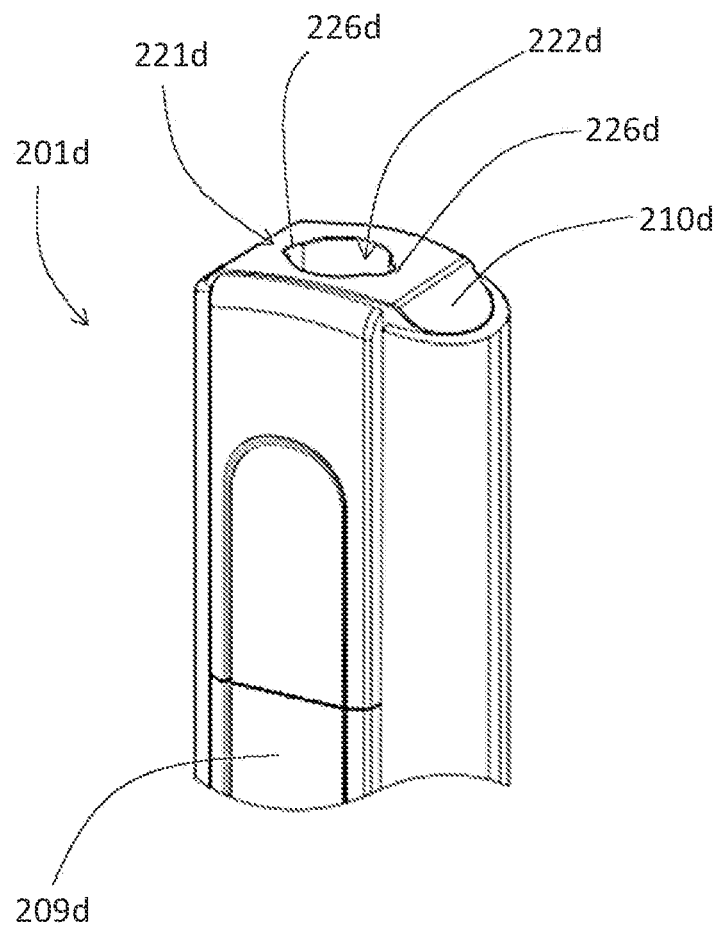
FIG. 14D is a detailed view of an end of the device of the first embodiment of the fifth mode of the smoking substitute system.

Although not apparent from the figure, the aerosol-forming substrate 213d, upstream filter 215d and spacer 216d are circumscribed by a paper wrapping layer. The terminal filter 214d is circumscribed by a tipping layer that also circumscribes a portion of the paper wrapping layer (so as to connect the terminal filter 214d to the remaining components of the consumable 202d). The upstream filter 215d and terminal filter 214d are circumscribed by further wrapping layers in the form of plug wraps. Returning now to the device 201d, FIG. 14D illustrates a detailed view of the end of the device 201d that is configured to engage with the consumable 202d. The cap 210d of the device 201d includes an opening 221d to an internal cavity 222d (more apparent from FIG. 14D) defined by the cap 210d. The opening 221d and the cavity 222d are formed so as to receive at least a portion of the consumable 202d. During engagement of the consumable 202d with the device 201d, a portion of the consumable 202d is received through the opening 221d and into the cavity 222d. After engagement (see FIG. 14B), the downstream end 218d of the consumable 202d protrudes from the opening 221d and thus protrudes also from the device 201d. The opening 221d includes laterally disposed notches 226d. When a consumable 202d is received in the opening 221d, these notches 226d remain open and could, for example, be used for retaining a cover to cover the end of the device 201d.

Figure 14E:
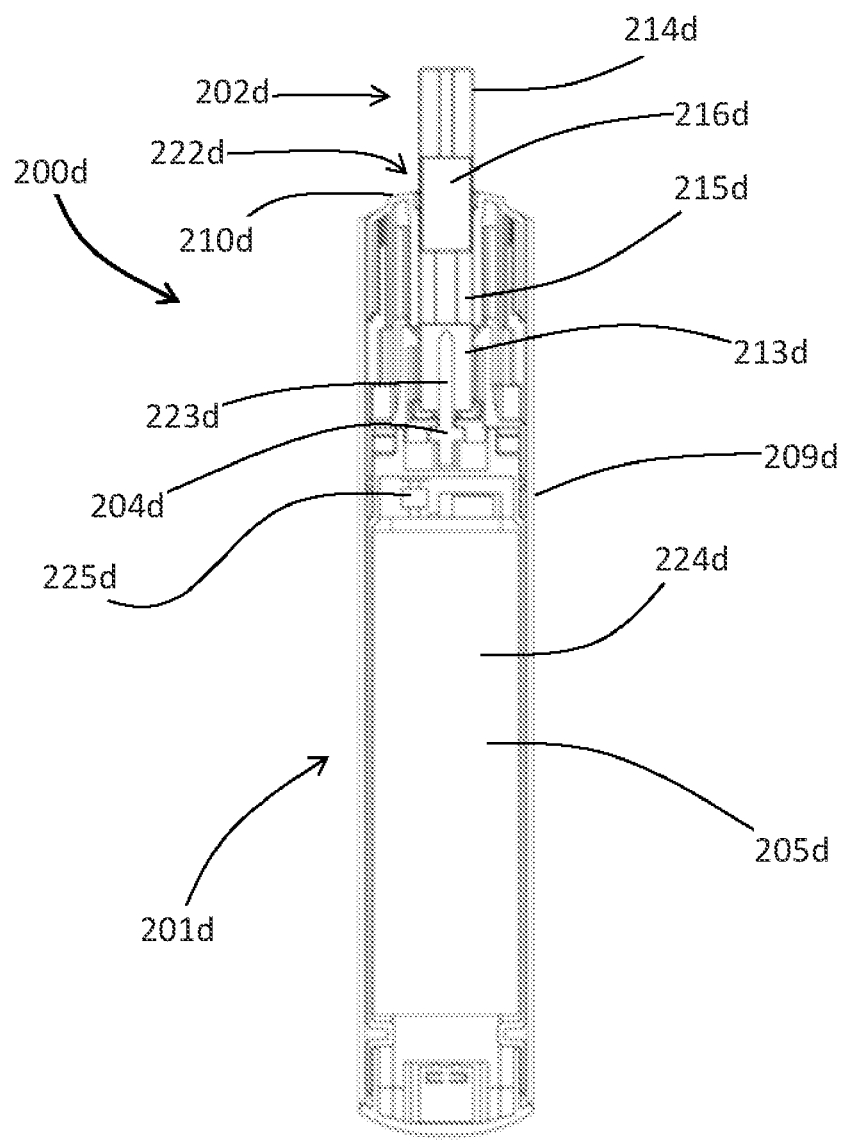
FIG. 14E is a section view of the first embodiment of the fifth mode of the smoking substitute system.

FIG. 14E shows a cross section through a central longitudinal plane through the device 201d. The device 201d is shown with the consumable 202d engaged therewith.

The device 201d comprises a heater 204d comprising heating element 223d. The heater 204d forms part of the body 209d of the device 201d and is rigidly mounted to the body 209d. In the illustrated embodiment, the heater 204d is a rod heater with a heating element 223d having a circular transverse profile. In other embodiments the heater may be in the form of a blade heater (e.g., heating element with a rectangular transverse profile) or a tube heater (e.g., heating element with a tubular form).

The heating element 223d of the heater 204d projects from an internal base of the cavity 222d along a longitudinal axis towards the opening 221d. As is apparent from the figure, the length (i.e., along the longitudinal axis) of the heating element is less than a depth of the cavity 222d. In this way, the heating element 223d does not protrude from or extend beyond the opening 221d.

When the consumable 202d is received in the cavity 222d (as is shown in FIG. 14DE), the heating element 223d penetrates the aerosol-forming substrate 213d of the consumable 202d. In particular, the heating element 223d extends for nearly the entire axial length of the aerosol-forming substrate 213d when inserted therein. Thus, when the heater 204d is activated, heat is transferred radially from an outer circumferential surface the heating element 223d to the aerosol-forming substrate 213d.

The device 202d further comprises an electronics cavity 224d. A power source, in the form of a rechargeable battery 205d (a lithium-ion battery), is located in electronics cavity 224d.

The device 202d includes a connector (i.e., forming part of an IO module of the device 201d) in the form of a USB port 206d. The connector may alternatively be, for example, a micro-USB port or a USB-C port for examples. The USB port 206d may be used to recharge the rechargeable battery 205d.

The device 202d includes the controller (not shown) located in the electronics cavity 224d. The controller comprises a microcontroller mounted on a printed circuit board (PCB). The USB port 206d is also connected to the controller (i.e., connected to the PCB and microcontroller).

The controller is configured to control at least one function of the device 202d. For example, the controller is configured to control the operation of the heater 204d. Such control of the operation of the heater 204d may be accomplished by the controller toggling the electrical connection of the rechargeable battery 205d to the heater 204d. For example, the controller is configured to control the heater 204d in response to an actuation sequence of input actuations provided by the user via the input means of the device 201d. The input means may include for example presses/touches of one or more buttons, switches, or capacitive touch sensors. The actuation sequence may be for example, a predetermined sequence of presses of the button 212d.

The actuation sequence includes at least one actuation of longer duration and at least one actuation of shorter actuation duration. The shorter actuation may be for example shorter than 1 second, optionally, shorter than 0.5 seconds, optionally shorter than 0.25 seconds. The longer actuation may be longer that 1 second, optionally between 1 second and 5 seconds, optionally between 1 second and 4 seconds, optionally between 1 second and 3 seconds, optionally between 1 second and 2 seconds, optionally between 2 seconds and 4 seconds, optionally between 2 seconds and 3 seconds, optionally between 3 seconds and 4 seconds, optionally between 4 seconds and 5 seconds, The controller may be configured to measure the duration of each actuation of the input means so that the input sequence may be compared to one or more predefined input sequences.

The controller may also trigger the vibrating element in response to completion of the actuation sequence. In one example, the feedback is a haptic feedback. In another example, the feedback is an audio feedback output by the speaker of the device 201d. In yet another example, the feedback is a visual feedback output by the display of the device 201d.

The controller receives the actuation sequence and determines the validity of the actuation sequence. The controller determines the validity based on comparison of the actuation sequence with at least one predetermined actuation sequence. In one embodiment the controller enables the user to previously set the at least one predetermined actuation sequence via the UI of the device 201d. In one example, the predetermined actuation sequence may be the same actuation sequence for switching the device back and forth between two states. For example, the same input actuation sequence may be used to switch the device ON and OFF.

In another example, the predetermined actuation sequence may be a different actuation sequence for switching the device to ON and OFF states. In another example, a different actuation sequence may be used to switch the device into a high/boost operational mode when compared to an actuation sequence to switch the device into a normal operational mode.

The actuation sequences may differ from one another in the order and/or number of long and short duration input actuations.

The device may alternatively or additionally be configured to change an operation mode of the device based on the input sequence. In some embodiments, the device is configured to switch between operational modes. For example, the device may have a first mode during which the heater of the device is heated to a first target temperature, and a second mode during which the heater is heated to a second, different, target temperature. The mode is selected according to the input sequence to the user input means from the user.

In some embodiments, the device may be configured to enter or exit a child safe mode based on the input sequence to the user input means from the user.

Based on the successful validation, the controller determines the current state of the device, for example, one of ON state and OFF state. If the controller determines that the current state is ON state, then the controller enables switching OFF the device 201d by terminating the supply of power to the heater 104d of the device 201d. If the controller determines that the current state is OFF state, then the controller enables switching ON the device 201d by allowing the supply of power to the heater 104d of the device 201d. The controller may also trigger the vibrating element so as to provide feedback indicating the user about the change in the state of the device 201d. In one example, the feedback is a haptic feedback. In another example, the feedback is an audio feedback output by the speaker of the device 201d. In yet another example, the feedback is a visual feedback output by the display of the device 201d.

Using an input actuation sequence requiring short and long duration input actuations may allow for a safer device because inadvertent input of the sequence is reduced in likelihood (e.g., when the device is a user's pocket). Furthermore, because the input actuation sequence requires a level complexity above a simple button press, it may be more difficult for children to use the device, which improves safety.

The controller is also configured to control the LEDs 211d in response to (e.g., a detected) a condition of the device 201d or the consumable 202d. For example, the controller may control the LEDs to indicate whether the device 201d is in an on state or an off state (e.g., one or more of the LEDs may be illuminated by the controller when the device is in an on state).

Figure 15:
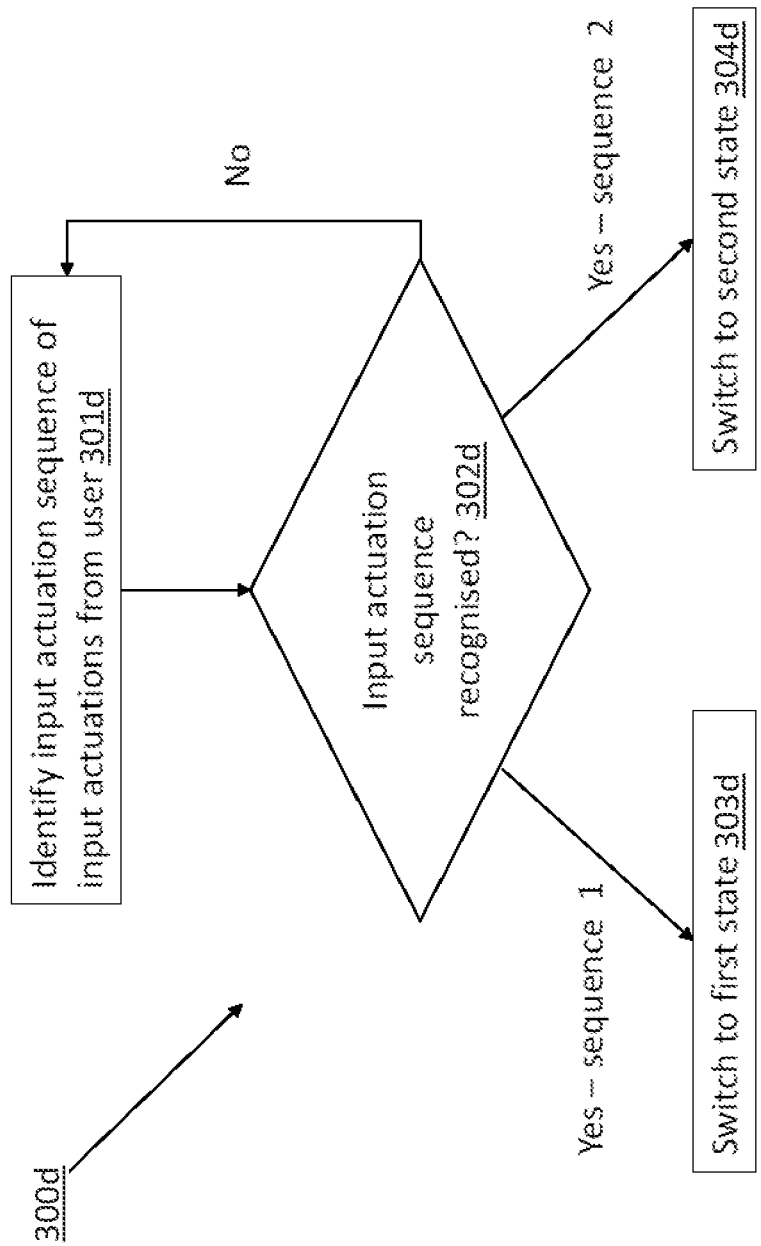
FIG. 15 is a flowchart illustrating method of switching the device from one state to another state in accordance with an aspect of the fifth mode.

The device 202d comprises a further input means (i.e., in addition to the button 212d) in the form of a puff sensor 225d. The puff sensor 225d is configured to detect a user drawing (i.e., inhaling) at the downstream end 218d of the consumable 202d. The puff sensor 225d may, for example, be in the form of a pressure sensor, a flowmeter, or a microphone. The puff sensor 225d is operatively connected to the controller in the electronics cavity 224d, such that a signal from the puff sensor 225d, indicative of a puff state (i.e., drawing or not drawing), forms an input to the controller (and can thus be responded to by the controller). FIG. 15 illustrates flowchart of method of operating the device in child-safety mode when configured.

As illustrated in FIG. 15, the method 300d includes one or more blocks implemented by the controller of the device 201d. The method 300d may be described in the general context of controller executable instructions. Generally, controller executable instructions can include routines, programs, objects, components, data structures, procedures, modules, and functions, which perform particular functions or implement particular abstract data types.

The order in which the method 300d is described is not intended to be construed as a limitation, and any number of the described method blocks can be combined in any order to implement the method 300d. Additionally, individual blocks may be deleted from the method 300d without departing from the scope of the subject matter described herein. Furthermore, the method 300d can be implemented in any suitable hardware, software, firmware, or combination thereof.

At block 301d, the controller identifies the actuation sequence of input actuations received from user via the UI of the device 201d. The actuation sequence includes at least one actuation of longer duration and at least one actuation of shorter actuation duration. In some embodiments, each "actuation" is a button press. In one example, the predetermined actuation sequence may be the same actuation sequence for switching the device to both ON and OFF states (a common actuation sequence). In another example, the predetermined actuation sequence may be a different actuation sequence for switching the device to ON and OFF states. The controller may also trigger the vibrating element in response to completion of the actuation sequence. In one example, the feedback is a haptic feedback. In another example, the feedback is an audio feedback output by the speaker of the device 201d. In yet another example, the feedback is a visual feedback output by the display of the device 201d. At block 302d, the controller validates the actuation sequence as a recognized input sequence by comparing the input sequence from the user to a list of predetermined potential input actuation sequences. The controller determines the validity of the actuation sequence based on comparison of the actuation sequence with a predetermined actuation sequence. If the controller determines the actuation sequence to be valid, then the method proceeds to state 1 block 303d or to state 2 block 304d along one of the "YES" paths. The state block into which the device is entered is based on the sequence that was identified in the validation block 302d. The state 1 block 303d may include activating the device in a first operational mode; the state 2 block 304d may include activating the device in a second operational mode. The state 1 block 303d may include turning the device ON; the state 2 block 304d may include turning the device OFF.

If the actuation sequence is determined not to correspond to any of the predetermined potential actuation sequences in validation block 302d, then the device may perform no action along the "No" path. If an actuation sequence is input by the user that does not correspond to any potential input in the predetermined list, the device may provide an indication to the user that the sequence is not a valid one (e.g., by a flash of a light of the device or a haptic feedback instance). In some embodiments, the controller enables the user to set the predetermined actuation sequence via the UI of the device 201d. In another embodiment, the first state may be a child-safe mode, the second state may be a non-child safe state (e.g., a normal state).

By using an actuation sequence of presses as user command to switch between states, the device may be able to determine when the user has completed the sequence and to know when the device is ready for use.

The potential for inadvertent switching between states is reduced because of including a longer actuation and a shorter actuation.

Sixth Mode: Operating a Smoking Substitute System Providing User Feedback.

Aspects and embodiments of the sixth mode of the present disclosure will now be discussed with reference to the accompanying figures. Further aspects and embodiments will be apparent to those skilled in the art. All documents mentioned in this text are incorporated herein by reference.

Figure 16A:
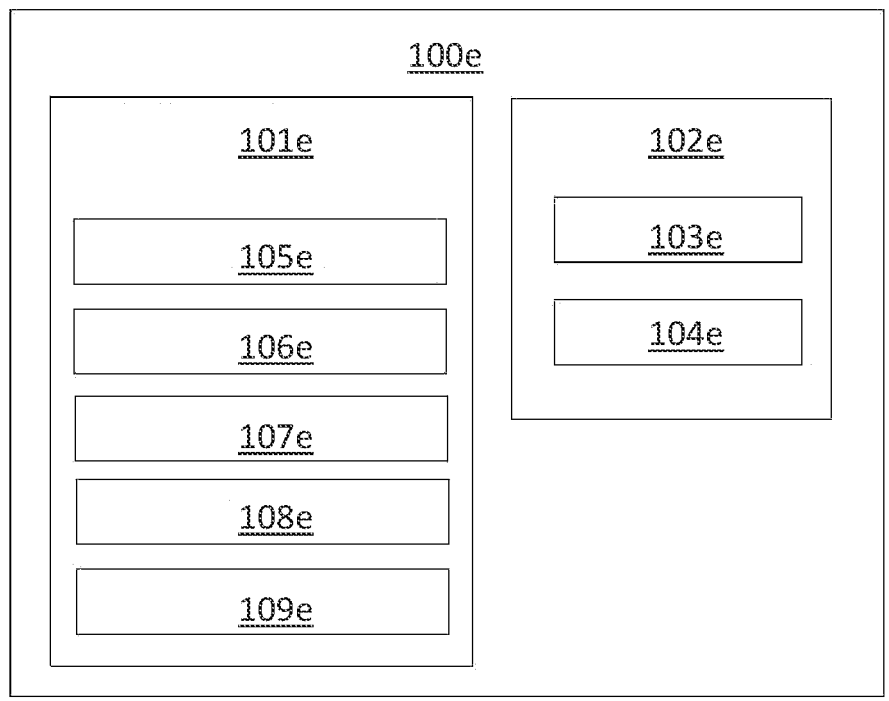
FIG. 16A is a schematic of a sixth mode of the smoking substitute system.

FIG. 16A is a schematic providing a general overview of a smoking substitute system 100e. The system 100e includes a substitute smoking device 101e and an aerosol-forming article in the form of a consumable 102e, which comprises an aerosol former 103e. The system is configured to vaporize the aerosol former by heating the aerosol former 103e (so as to form a vapor/aerosol for inhalation by a user).

In the illustrated system, the heater 104e forms part of the consumable 102e and is configured to heat the aerosol former 103e. Heat from the heater 104e vaporizes the aerosol former 103e to produce a vapor. The vapor subsequently condenses to form an aerosol, which is ultimately inhaled by the user.

The system 100e further comprises a power source 105e that forms part of the device 101e. In other embodiments the power source 105e may be external to (but connectable to) the device 101e. The power source 105e is electrically connectable to the heater 104e such that the power source 105e is able to supply power to the heater 104e (i.e., for the purpose of heating the aerosol former 103e). Thus, control of the electrical connection of the power source 105e to the heater 104e provides control of the state of the heater 104e. The power source 105e may be a power store, for example a battery or rechargeable battery (e.g., a lithium-ion battery).

The system 100e further comprises an I/O module comprising a connector 106e (e.g., in the form of a USB port, Micro USB port, USB-C port, etc.). The connector 106e is configured for connection to an external source of electrical power, e.g., a mains electrical supply outlet. The connector 106e may be used in substitution for the power source 105e. That is the connector 106e may be electrically connectable to the heater 104e so as to supply electricity to the heater 104e. In such embodiments, the device may not include a power source, and the power source of the system may instead comprise the connector 106e and an external source of electrical power (to which the connector 106e provides electrical connection).

In some embodiments, the connector 106e may be used to charge and recharge the power source 105e where the power source 104e includes a rechargeable battery.

The system 100e also comprises a user interface (UI) 107e. Although not shown, the UI 107e may include input means to receive commands from a user. The input means of the UI 107e allows the user to control at least one aspect of the operation of the system 100e. The input means may, for example, be in the form of a button, touchscreen, switch, microphone, etc.

The UI 107e also comprises output means to convey information to the user. The output means may, for example, comprise lights (e.g., LEDs), a display screen, speaker, vibration generator, etc.

The system 100e further comprises a controller 108e and a memory 109e coupled to the controller 108e. In the illustrated embodiment, the controller 108e is a component of the device 101e, but in other embodiments may be separate from (but connectable to) the device 101e. The controller 108e is configured to detect a predetermined condition of the device and provide appropriate feedback to the user about the predetermined condition to the user. The memory 109e stores controller-executable instructions that causes the controller 108e to perform one or more functions. The controller 108e is configured to control the operation of the heater 104e and, for example, may be configured to control the voltage applied from the power source 105e to the heater 104e. The controller 108e may be configured to toggle the supply of power to the heater 105e between an on state, in which the full output voltage of the power source 105e is applied to the heater 104e, and an off state, in which the no voltage is applied to the heater 104e.

Although not shown, the system 100e may also comprise a voltage regulator to regulate the output voltage from the power source 105e to form a regulated voltage. The regulated voltage may then be applied to the heater 104e.

In addition to being connected to the heater 104e, the controller 108e is operatively connected to the UI 107e. Thus, the controller 108e may receive an input signal from the input means of the UI 107e. Similarly, the controller 108e may transmit output signals to the UI 107e. In response, the output means of the UI 107e may convey information, based on the output signals, to a user.

Figure 16B:
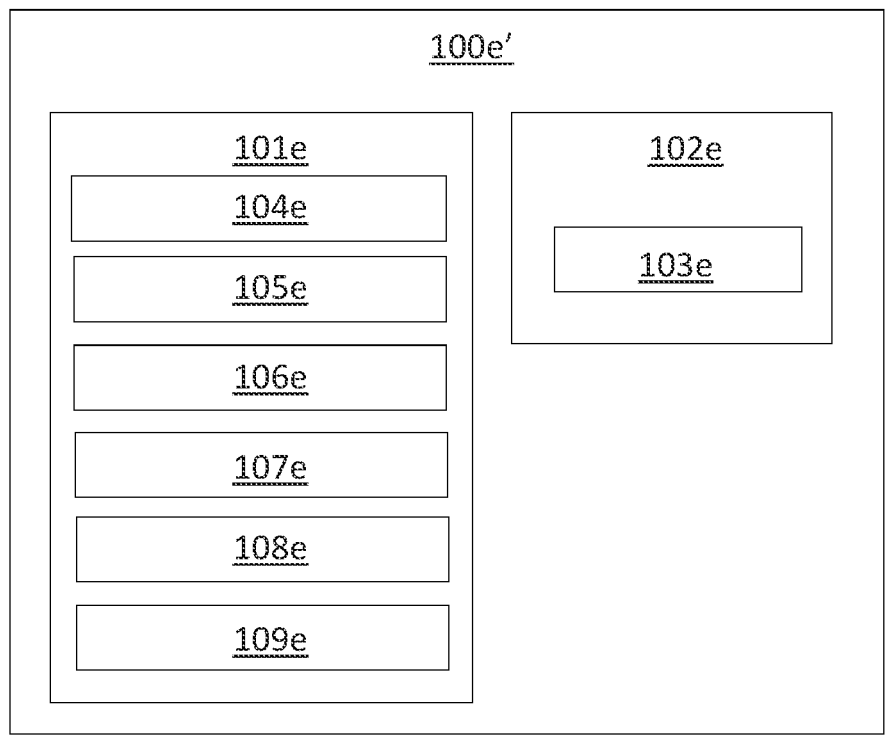
FIG. 16B is a schematic of a variation of the sixth mode of the smoking substitute system of FIG. 16A.

FIG. 16B is a schematic showing a variation of the system 100e of FIG. 16A. In the system 100e' of FIG. 16B, the heater 104e forms part of the consumable 102e, rather than the device 101e. In this variation, the heater 104e is electrically connectable to the power source 105e, for example, when the consumable 102e is engaged with the device 101e.

Figure 17A:
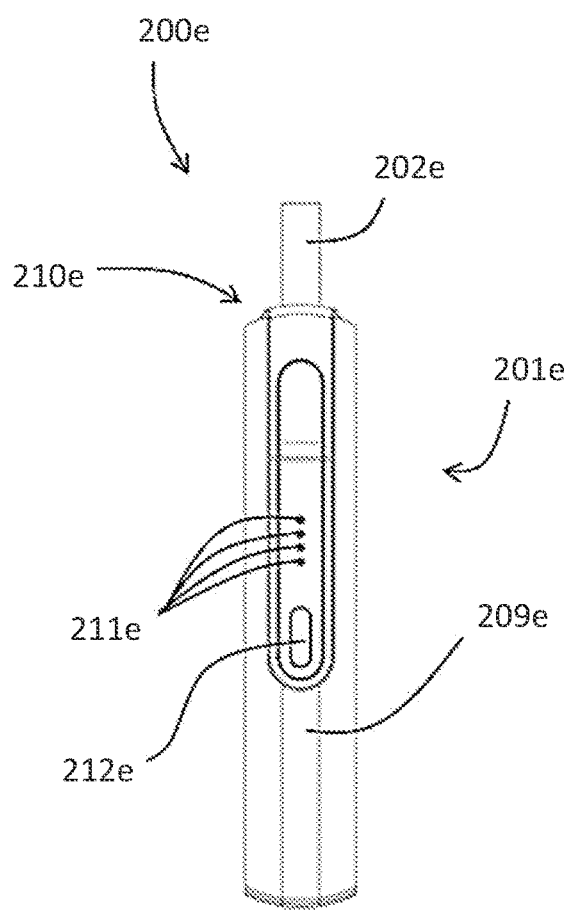
FIG. 17A is a front view of a first embodiment of the sixth mode of the smoking substitute system with the consumable engaged with the device.
Figure 17B:
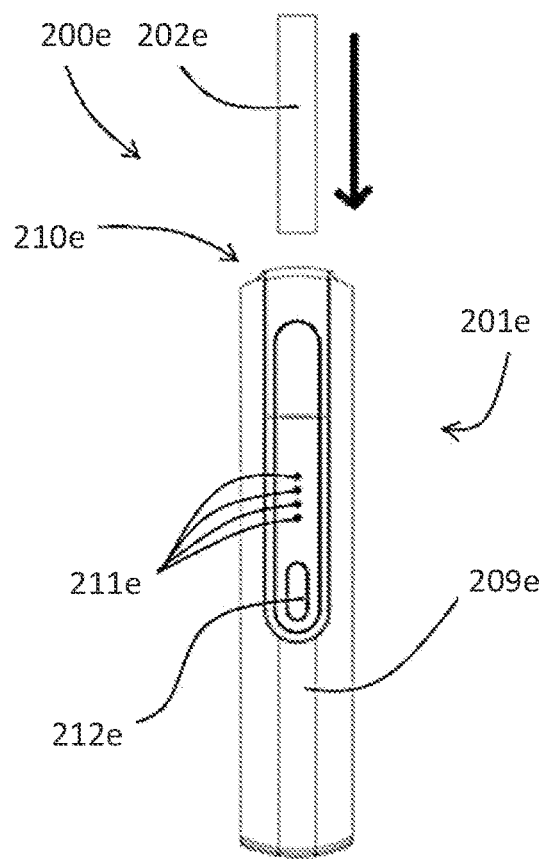
FIG. 17B is a front view of the first embodiment of the sixth mode of the smoking substitute system with the consumable disengaged from the device.

FIG. 17A and FIG. 17B illustrate a heated-tobacco (HT) smoking substitute system 200e. The system 200e is an example of the systems 100e, 100e' described in relation to FIG. 16A or FIG. 16B. System 200e includes an HT device 201e and an HT consumable 202e. The description of FIG. 16A and FIG. 16B above is applicable to the system 200e of FIG. 17A and FIG. 17B and will not be repeated.

The device 201e and the consumable 202e are configured such that the consumable 202e can be engaged with the device 201e. FIG. 17A shows the device 201e and the consumable 202e in an engaged state, whilst FIG. 17B shows the device 201e and the consumable 202e in a disengaged state.

The device 201e comprises a body 209e and cap 210e. In use the cap 209e is engaged at an end of the body 209e. Although not apparent from the figures, the cap 210e is moveable relative to the body 209e. In particular, the cap 210e is slidable and can slide along a longitudinal axis of the body 209e.

The device 201e comprises an output means (forming part of the UI of the device 201e) in the form of a plurality of light-emitting diodes (LEDs) 211e arranged linearly along the longitudinal axis of the device 201e and on an outer surface of the body 209e of the device 201e. A button 212e is also arranged on an outer surface of the body 209e of the device 201e and is axially spaced (i.e., along the longitudinal axis) from the plurality of LEDs 211e.

The device 201e includes a haptic feedback means that includes vibrating element (not shown) coupled to the controller 208e (not shown). The controller 208e activates the vibrating element to provide haptic feedback to the user of the device. The haptic feedback has different intensities in dependence on predetermined conditions of the device 201e.

Figure 17C:
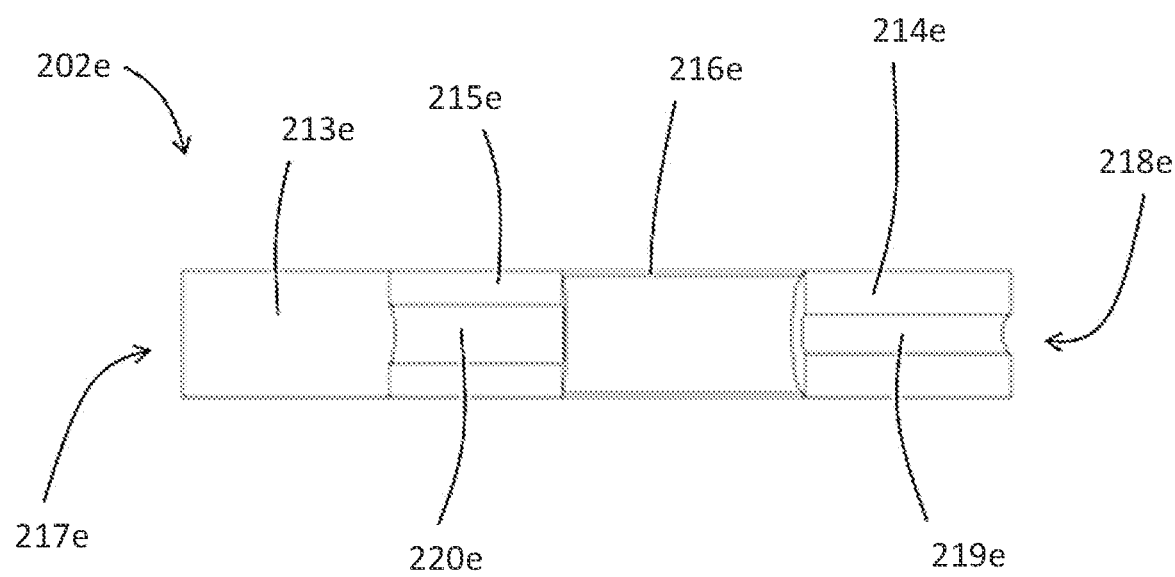
FIG. 17C is a section view of the consumable of the first embodiment of the sixth mode of the smoking substitute system.

FIG. 17C show a detailed section view of the consumable 202e of the system 200e. The consumable 202e generally resembles a cigarette. In that respect, the consumable 202e has a generally cylindrical form with a diameter of 7 mm and an axial length of 70 mm. The consumable 202e comprises an aerosol forming substrate 213e, a terminal filter element 214e, an upstream filter element 215e and a spacer element 216e. In other embodiments, the consumable may further comprise a cooling element. A cooling element may exchange heat with vapor that is formed by the aerosol-forming substrate 213e in order to cool the vapor so as to facilitate condensation of the vapor.

The aerosol-forming substrate 213e is substantially cylindrical and is located at an upstream end 217e of the consumable 202e and comprises the aerosol former of the system 200e. In that respect, the aerosol forming substrate 213e is configured to be heated by the device 201e to release a vapor. The released vapor is subsequently entrained in an airflow flowing through the aerosol-forming substrate 213e. The airflow is produced by the action of the user drawing on a downstream end 218e (i.e., terminal or mouth end) of the consumable 202e.

In the present embodiment, the aerosol forming substrate 213e comprises tobacco material that may, for example, include any suitable parts of the tobacco plant (e.g., leaves, stems, roots, bark, seeds, and flowers). The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon). For example, the aerosol-forming substrate 213e may comprise a gathered sheet of homogenized (e.g., paper/slurry recon) tobacco or gathered shreds/strips formed from such a sheet.

In order to generate an aerosol, the aerosol forming substrate 213e comprises at least one volatile compound that is intended to be vaporized/aerosolized and that may provide the user with a recreational and/or medicinal effect when inhaled. The aerosol-forming substrate 213e may further comprise one or more additives. For example, such additives may be in the form of humectants (e.g., propylene glycol and/or vegetable glycerin), flavorants, fillers, aqueous/non-aqueous solvents and/or binders.

The terminal filter element 214e is also substantially cylindrical and is located downstream of the aerosol forming substrate 213e at the downstream end 218e of the consumable 202e. The terminal filter element 214e is in the form of a hollow bore filter element having a bore 219e (e.g., for airflow) formed therethrough. The diameter of the bore 219e is 2 mm. The terminal filter element 214e is formed of a porous (e.g., monoacetate) filter material. As set forth above, the downstream end 218e of the consumable 202e (i.e., where the terminal filter 214e is located) forms a mouthpiece portion of the consumable 202e upon which the user draws. Airflow is drawn from the upstream end 217e, thorough the components of the consumable 202e, and out of the downstream end 218e. The airflow is driven by the user drawing on the downstream end 218e (i.e., the mouthpiece portion) of the consumable 202e.

The upstream filter element 215e is located axially adjacent to the aerosol-forming substrate 213e, between the aerosol-forming substrate 213e and the terminal filter element 214e. Like the terminal filter 214e, the upstream filter element 215e is in the form of a hollow bore filter element, such that it has a bore 220e extending axially therethrough. In this way, the upstream filter 215e may act as an airflow restrictor. The upstream filter element 215e is formed of a porous (e.g., monoacetate) filter material. The bore 220e of the upstream filter element 214e has a larger diameter (3 mm) than the terminal filter element 214e.

The spacer 216e is in the form of a cardboard tube, which defines a cavity or chamber between the upstream filter element 215e and the terminal filter element 214e. The spacer 216e acts to allow both cooling and mixing of the vapor/aerosol from the aerosol-forming substrate 213e. The spacer has an external diameter of 7 mm and an axial length of 14 mm.

Although not apparent from the figure, the aerosol-forming substrate 213e, upstream filter 215e and spacer 216e are circumscribed by a paper wrapping layer. The terminal filter 214e is circumscribed by a tipping layer that also circumscribes a portion of the paper wrapping layer (so as to connect the terminal filter 214e to the remaining components of the consumable 202e). The upstream filter 215e and terminal filter 214e are circumscribed by further wrapping layers in the form of plug wraps.

Figure 17D:
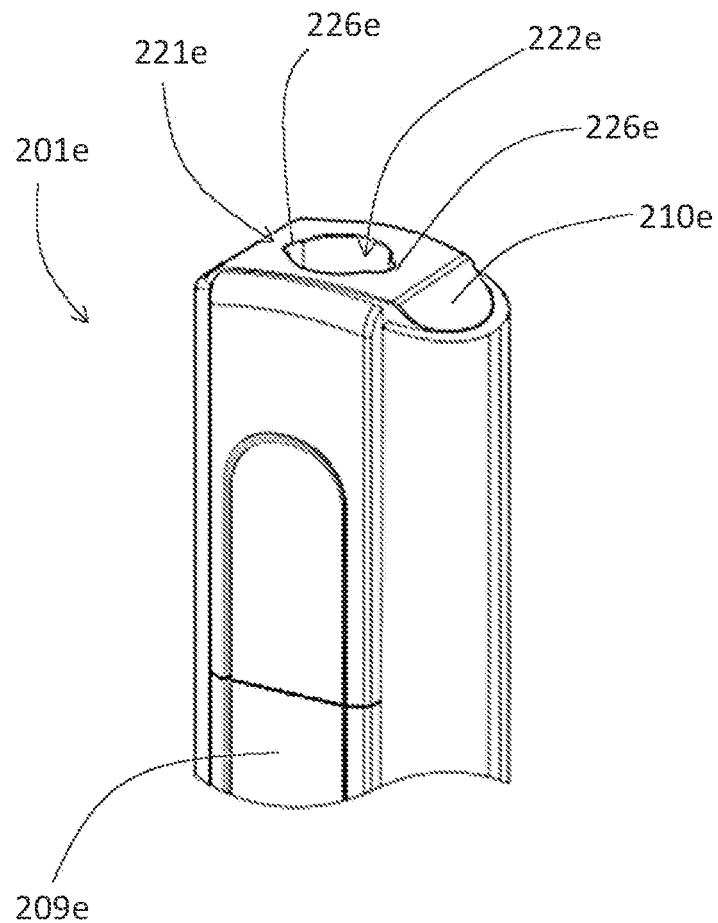
FIG. 17D is a detailed view of an end of the device of the first embodiment of the sixth mode of the smoking substitute system.

Returning now to the device 201e, FIG. 17D illustrates a detailed view of the end of the device 201e that is configured to engage with the consumable 202e. The cap 210e of the device 201e includes an opening 221e to an internal cavity 222e (more apparent from FIG. 17D) defined by the cap 210e. The opening 221e and the cavity 222e are formed so as to receive at least a portion of the consumable 202e. During engagement of the consumable 202e with the device 201e, a portion of the consumable 202e is received through the opening 221e and into the cavity 222e. After engagement (see FIG. 17B), the downstream end 218e of the consumable 202e protrudes from the opening 221e and thus protrudes also from the device 201e. The opening 221e includes laterally disposed notches 226e. When a consumable 202e is received in the opening 221e, these notches 226e remain open and could, for example, be used for retaining a cover to cover the end of the device 201e.

Figure 17E:
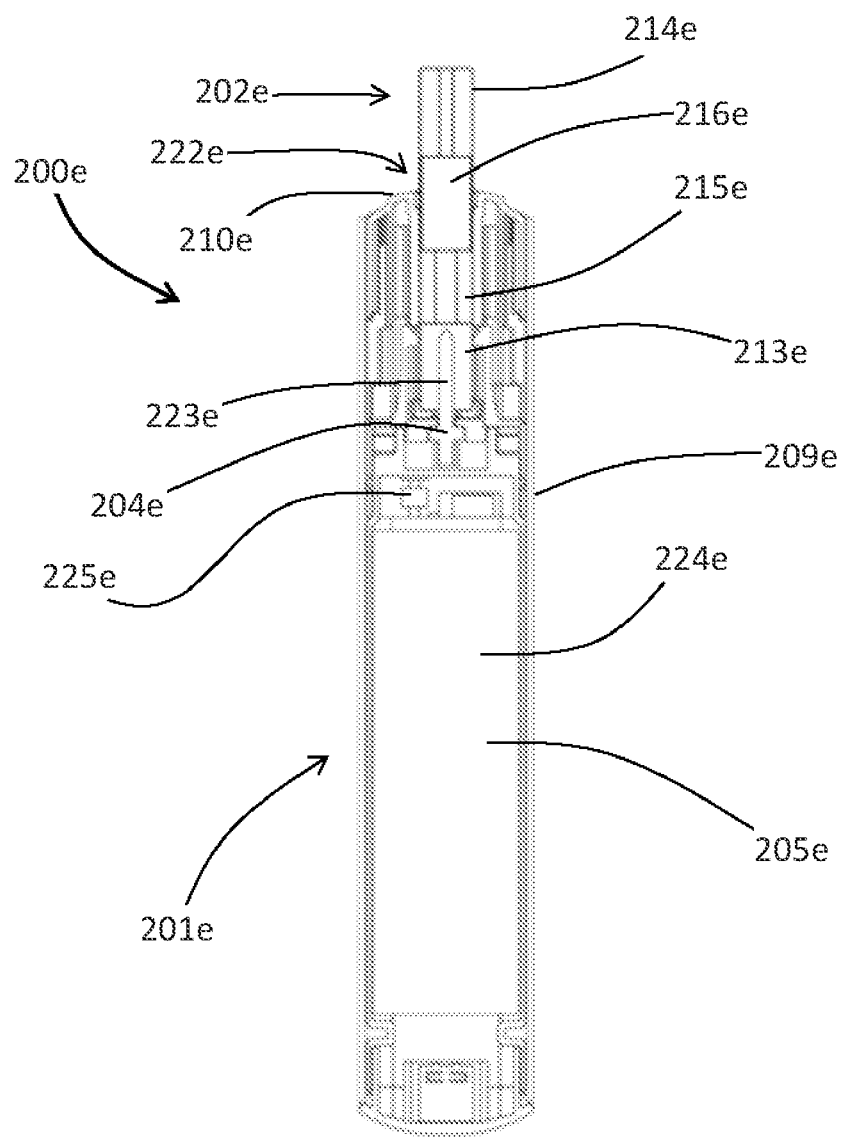
FIG. 17E is a section view of the first embodiment of the sixth mode of the smoking substitute system.

FIG. 17E shows a cross section through a central longitudinal plane through the device 201e. The device 201e is shown with the consumable 202e engaged therewith.

The device 201e comprises a heater 204e comprising heating element 223e. The heater 204e forms part of the body 209e of the device 201e and is rigidly mounted to the body 209e. In the illustrated embodiment, the heater 204e is a rod heater with a heating element 223e having a circular transverse profile. In other embodiments the heater may be in the form of a blade heater (e.g., heating element with a rectangular transverse profile) or a tube heater (e.g., heating element with a tubular form).

The heating element 223e of the heater 204e projects from an internal base of the cavity 222e along a longitudinal axis towards the opening 221e. As is apparent from the figure, the length (i.e., along the longitudinal axis) of the heating element is less than a depth of the cavity 222e. In this way, the heating element 223e does not protrude from or extend beyond the opening 221e.

When the consumable 202e is received in the cavity 222e (as is shown in FIG. 17E), the heating element 223e penetrates the aerosol-forming substrate 213e of the consumable 202e. In particular, the heating element 223e extends for nearly the entire axial length of the aerosol-forming substrate 213e when inserted therein. Thus, when the heater 204e is activated, heat is transferred radially from an outer circumferential surface the heating element 223e to the aerosol-forming substrate 213e.

The device 201e further comprises an electronics cavity 224e. A power source, in the form of a rechargeable battery 205e (a lithium-ion battery), is located in electronics cavity 224e.

The device 201e includes a connector (i.e., forming part of an IO module of the device 201e) in the form of a USB port 206e. The connector may alternatively be, for example, a micro-USB port or a USB-C port for examples. The USB port 206e may be used to recharge the rechargeable battery 205e.

The device 201e includes the controller 208e (not shown) located in the electronics cavity 224e. The controller comprises a microcontroller mounted on a printed circuit board (PCB). The USB port 206e is also connected to the controller 208e (i.e., connected to the PCB and microcontroller).

The controller 208e is configured to control at least one function of the device 202e. For example, the controller 208e is configured to control the operation of the heater 204e. Such control of the operation of the heater 204e may be accomplished by the controller toggling the electrical connection of the rechargeable battery 205e to the heater 204e. For example, the controller 208e is configured to control the heater 204e in response to a user depressing the button 212e. Depressing the button 212e may cause the controller to allow a voltage (from the rechargeable battery 205e) to be applied to the heater 204e (so as to cause the heating element 223e to be heated).

In one aspect, the controller 208e detects a predetermined condition of the device 202e and generates a haptic feedback output in response to the detected predetermined condition. In one example, the predetermined condition may be low, average, and high usage of the device. The haptic feedback is provided with an intensity dependent on the condition or state of the device. A predetermined condition may include a normal operation of the device, a device error condition, a device malfunction, or a misuse of the device. If the controller 208e detects a first predetermined condition, the controller 208e activates the vibrating element of the haptic feedback means with a first intensity. If the controller 208e detects a second predetermined condition, the controller 208e activates the vibrating element of the haptic feedback means with a second intensity different from the first intensity. In another example, each of the first intensity and second intensity is defined by a parameter including one or more of amplitude and frequency of vibrations, and number of vibrations generated by the device. In yet another example, the first intensity is greater than the second intensity. In still another example, the first intensity is lower than the second intensity. The device may also include audible and or visual feedback means (e.g., a speaker and light(s) respectively). The audible and or visual feedback means may provide substantially simultaneous audible or visual feedback with the haptic feedback.

For example, during operation, if the controller 208e detects a high usage of the device, then the controller 208e may activate the haptic feedback means with a high intensity. In another example, if the controller 208e detects active hours of operating the device 201e lower than a threshold active hours, then the controller 208e detects a low usage of the device 201e, thereby activates the haptic feedback means with a lower intensity. In another example, the feedback includes an audio feedback output by the speaker of the device 201e. In yet another example, the feedback includes a visual feedback output by the display of the device 201e.

The controller is also configured to control the LEDs 211e in response to (e.g., a detected) a condition of the device 201e or the consumable 202e. For example, the controller may control the LEDs to indicate the usage of the device 201e (e.g., one or more of the LEDs may be illuminated by the controller when the device is in an on state). By providing haptic feedback with different intensities, the user is aware of the operation of the device without needing visual or audio feedback. This may be useful when environmental conditions do not allow for conclusive audible or visual feedback (e.g., bright or loud environments).

The device 202e comprises a further input means (i.e., in addition to the button 212e) in the form of a puff sensor 225e. The puff sensor 225e is configured to detect a user drawing (i.e., inhaling) at the downstream end 218e of the consumable 202e. The puff sensor 225e may, for example, be in the form of a pressure sensor, a flowmeter, or a microphone. The puff sensor 225e is operatively connected to the controller 208e in the electronics cavity 224e, such that a signal from the puff sensor 225e, indicative of a puff state (i.e., drawing or not drawing), forms an input to the controller 208e (and can thus be responded to by the controller 208e).

Figure 18:
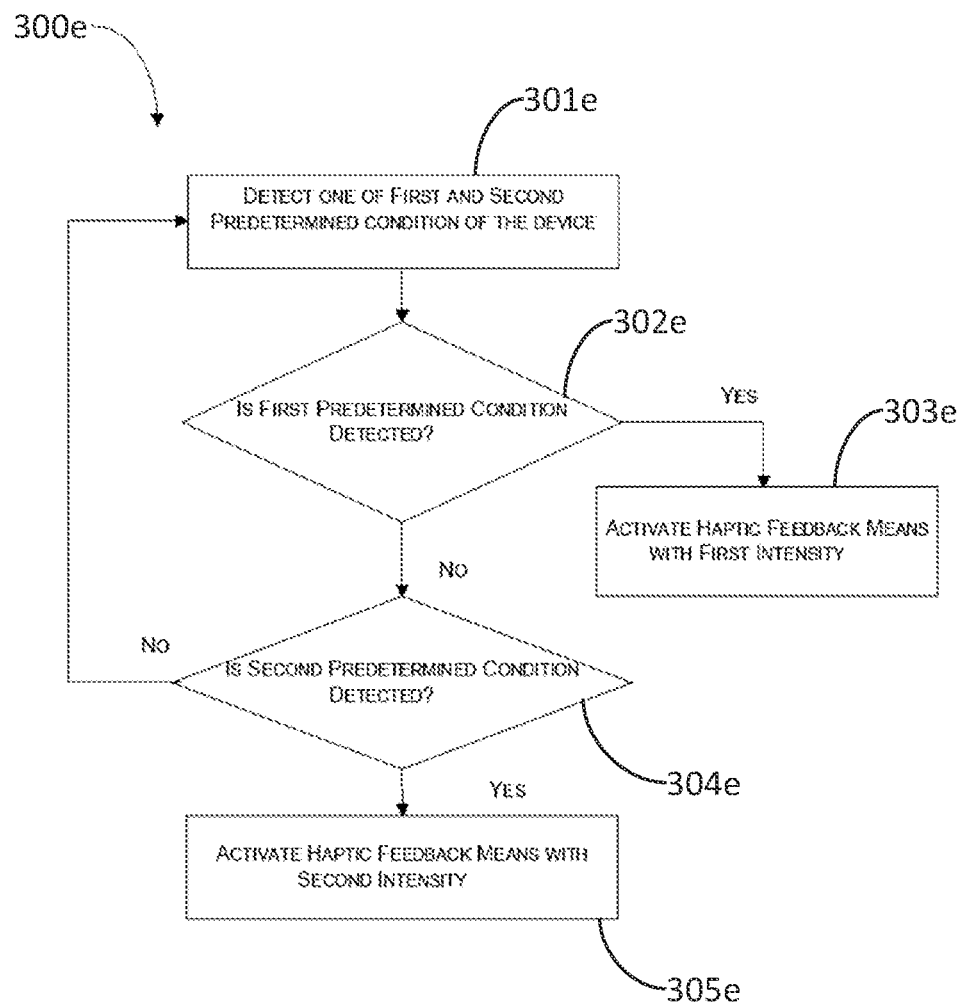
FIG. 18 is a flowchart illustrating method of operating the smoking substitute device for providing appropriate feedback about user's smoking experience in accordance with an aspect of the sixth mode.

FIG. 18 illustrates flowchart of method of operating the device according to an embodiment for providing useful feedback to the user.

As illustrated in FIG. 18, the method 300e includes one or more blocks implemented by the controller 208e of the device 201e. The method 300e may be described in the general context of controller executable instructions. Generally, controller executable instructions can include routines, programs, objects, components, data structures, procedures, modules, and functions, which perform particular functions or implement particular abstract data types.

The order in which the method 300e is described is not intended to be construed as a limitation, and any number of the described method blocks can be combined in any order to implement the method 300e. Additionally, individual blocks may be deleted from the method 300e without departing from the scope of the subject matter described herein. Furthermore, the method 300e can be implemented in any suitable hardware, software, firmware, or combination thereof.

At block 301e, the controller 208e detects one of a predetermined condition of the device 201e. In one aspect, the controller 208e detects at least one predetermined conditions of the device 202e and generates an appropriate haptic feedback in response to the detected predetermined conditions. In one example, one of the predetermined condition may be low, average, and high usage of the device. The haptic feedback is provided with an intensity dependent on the condition or state of the device. A predetermined condition may include a normal operation of the device, a device error condition, a device malfunction, or a misuse of the device. At block 302e, the controller 208e determines if a first predetermined condition is detected. If the controller 208e detects the first predetermined condition, then the method proceeds to block 303e along the "YES" path. Otherwise, the method proceeds to block 304e along the "NO" path.

At block 303e, the controller 208e activates the haptic feedback means with a first intensity. If the controller 208e detects the first predetermined condition, the controller 208e activates the vibrating element of the haptic feedback means with the first intensity. In one example, the first intensity is defined by a parameter including one or more of amplitude, and/or frequency of vibration, and/or number of vibrations generated by the device. In another example, the first intensity is greater than the second intensity. In still another example, the first intensity is lower than the second intensity.

For example, the first intensity may include 3 "buzzes" of the haptic feedback means; the second intensity may include 5 "buzzes" of the haptic feedback means. For example, the first intensity may include a longer buzz of the haptic feedback means; the second intensity may include a shorter buzz of the haptic feedback means. For example, the first intensity may include a "buzz" of the haptic feedback means with a first, higher, frequency (e.g., between 300 and 500 Hz); the second intensity may include a "buzz" of the haptic feedback means with a second, lower, frequency (e.g., 100 and 200 Hz).

At block 304e, the controller 208e determines if a second predetermined condition is detected. If the controller 208e detects the second predetermined condition, then the method proceeds to block 305e along the "YES" path. Otherwise, the method proceeds to block 301e along the "NO" path.

At block 305e, the controller 208e activates the haptic feedback means with a second intensity. If the controller 208e detects the second predetermined condition, the controller 208e activates the vibrating element of the haptic feedback means with the second intensity. In one example, the second intensity is defined by a parameter including one or more of amplitude and frequency of vibrations, and number of vibrations generated by the device. In another example, the second intensity is greater than the first intensity. In still another example, the first intensity is lower than the second intensity.

For example, during operation, if the controller 208e detects a high usage of the device, then the controller 208e may activate the haptic feedback means with a high intensity. In another example, if the controller 208e detects a lower usage of the device 201e, thereby activates the haptic feedback means with a lower intensity. In another example, the feedback includes an audio feedback output by the speaker of the device 201e. In yet another example, the feedback includes a visual feedback output by the display of the device 201e.

By providing haptic feedback with different intensities, the user is aware of the operation of the device without needing visual or audio feedback. This may be useful when environmental conditions do not allow for conclusive audible or visual feedback (e.g., bright or loud environments).

In some embodiments, the first condition is associated with a first operating mode of the device; the second condition is associated with a second operating mode of the device. For example, the first mode may be a mode in which the heater of the device is heated to a lower operating temperature; and the second operating mode may be mode in which the heater of the device is heated to a higher operating temperature. The respective haptic feedback outputs may be triggered at the commencement or conclusion of a pre-heating phase of the respective operating mode.

Seventh Mode: A Method of Controlling the Operation of a Substitute Smoking Device.

Aspects and embodiments of the seventh mode of the present disclosure will now be discussed with reference to the accompanying figures. Further aspects and embodiments will be apparent to those skilled in the art. All documents mentioned in this text are incorporated herein by reference.

Figure 19:
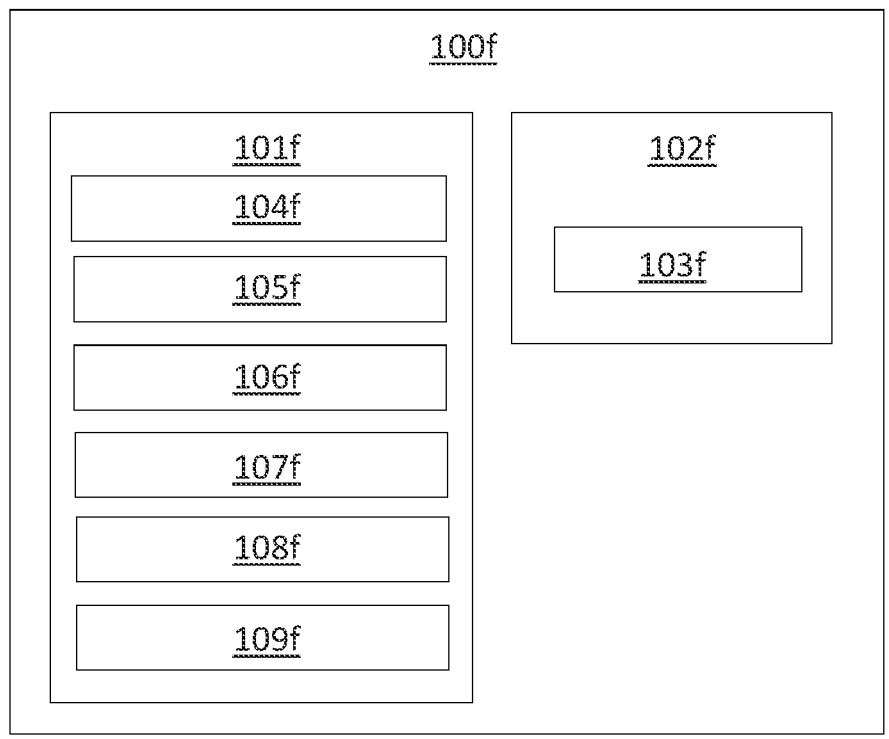
FIG. 19 is a schematic of a seventh mode of the smoking substitute system.

FIG. 19 is a schematic providing a general overview of a smoking substitute system 100f. The system 100f includes a substitute smoking device 101f and an aerosol-forming article in the form of a consumable 102f, which comprises an aerosol former 103f. The system is configured to vaporize the aerosol former by heating the aerosol former 103f (so as to form a vapor/aerosol for inhalation by a user).

The system 100f further comprises a power source 105f that forms part of the device 101f. In other embodiments the power source 105f may be external to (but connectable to) the device 101f. The power source 105f is electrically connected to a heater 104f of the device 101f for the purpose of heating the aerosol former 103f. Thus, control of the electrical connection of the power source 105f to the heater 104f provides control of the state of the heater 104f. The power source 105f may be a power store, for example a battery or rechargeable battery (e.g., a lithium-ion battery).

The system 100f further comprises an I/O module comprising a connector 106f (e.g., in the form of a USB port, Micro USB port, USB-C port, etc.). The connector 106f is configured for connection to an external source of electrical power, e.g., a mains electrical supply outlet. The connector 106f may be used in substitution for the power source 105f. That is the connector 106f may be electrically connectable to the heater 104f so as to supply electricity to the heater 104f. In such embodiments, the device may not include a power source, and the power source of the system may instead comprise the connector 106f and an external source of electrical power (to which the connector 106f provides electrical connection).

In some embodiments, the connector 106f may be used to charge and recharge the power source 105f where the power source 105f includes a rechargeable battery.

The system 100f also comprises a user interface (UI) 107f. Although not shown, the UI 107f may include input means to receive at least one operative command from a user. The input means of the UI 107f allows the user to control at least one aspect of the operation of the system 100f. The input means may, for example, be in the form of a button/dial, touchscreen, switch, microphone, etc.

The UI 107f also comprises output means to convey information to the user. The output means may, for example, comprise lights (e.g., LEDs), a display screen, speaker, vibration generator, etc.

The system 100f further comprises a controller 108f and a memory 109f coupled to the controller 108f. In the illustrated embodiment, the controller 108f is a component of the device 101f, but in other embodiments may be separate from (but connectable to) the device 101f. The memory 109f stores controller-executable instructions that causes the controller 108f to perform one or more functions. The controller 108f is configured to control the operation of the heater 104f and, for example, may be configured to control the voltage applied from the power source 105f to the heater 104f.

Although not shown, the system 100f may also comprise a voltage regulator to regulate the output voltage from the power source 105f to form a regulated voltage. The regulated voltage may then be applied to the heater 104f.

In addition to being connected to the heater 104f, the controller 108f is operatively connected to the UI 107f. Thus, the controller 108f may receive an input signal from the input means of the UI 107f. Similarly, the controller 108f may transmit output signals to the UI 107f. In response, the output means of the UI 107f may convey information, based on the output signals, to a user.

Figure 20A:
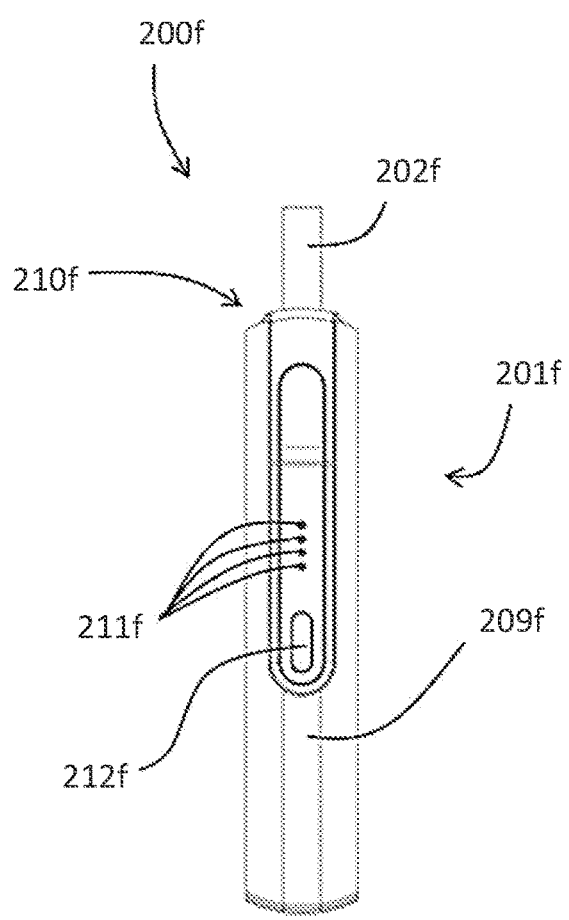
FIG. 20A is a front view of a first embodiment of a smoking substitute system with the consumable engaged with the device.
Figure 20B:
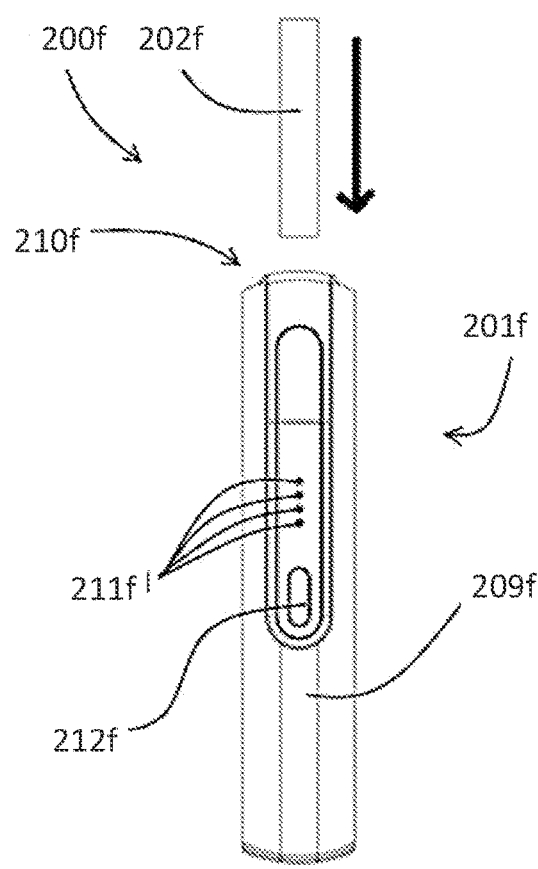
FIG. 20B is a front view of the first embodiment of the seventh mode of the smoking substitute system with the consumable disengaged from the device.

FIG. 20A and FIG. 20B illustrate a heated-tobacco (HT) smoking substitute system 200f. The system 200f is an example of the system 100f described in relation to FIG. 19. System 200f includes an HT device 201f and an HT consumable 202f. The description of FIG. 19 above is applicable to the system 200f of FIG. 20A and FIG. 20B and will not be repeated.

The device 201f and the consumable 202f are configured such that the consumable 202f can be engaged with the device 201f. FIG. 20A shows the device 201f and the consumable 202f in an engaged state, whilst FIG. 20B shows the device 201f and the consumable 202f in a disengaged state.

The device 201f comprises a body 209f and cap 210f. In use the cap 210f is engaged at an end of the body 209f. Although not apparent from the figures, the cap 210f is moveable relative to the body 209f. In particular, the cap 210f is slidable and can slide along a longitudinal axis of the body 209f.

The device 201f comprises an output means (forming part of the UI of the device 201f) in the form of a plurality of light-emitting diodes (LEDs) 211f arranged linearly along the longitudinal axis of the device 201f and on an outer surface of the body 209f of the device 201f. A button 212f is also arranged on an outer surface of the body 209f of the device 201f and is axially spaced (i.e., along the longitudinal axis) from the plurality of LEDs 211f.

The device 201f optionally comprises a vibrating element (not shown) coupled to the controller 208f (not shown). The controller 208f activates the vibrating element to provide haptic feedback to the user operating the device in response to activating the device based on valid input command detected by the controller 208f.

Figure 20C:
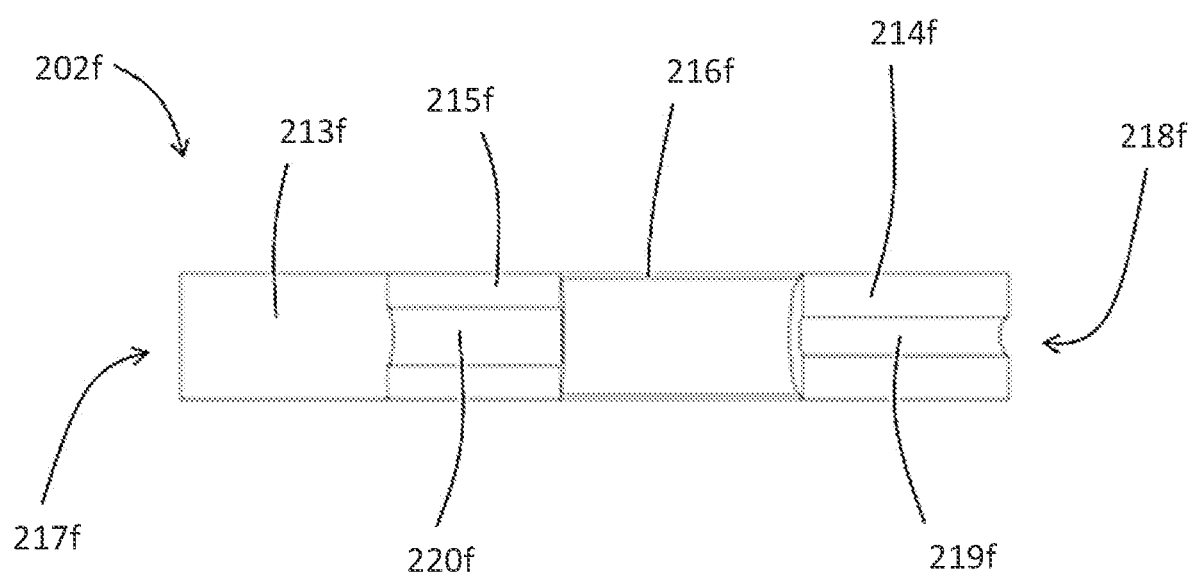
FIG. 20C is a section view of the consumable of the first embodiment of the seventh mode of the smoking substitute system.

FIG. 20C show a detailed section view of the consumable 202f of the system 200f. The consumable 202f generally resembles a cigarette. In that respect, the consumable 202f has a generally cylindrical form with a diameter of 7 mm and an axial length of 70 mm. The consumable 202f comprises an aerosol forming substrate 213f, a terminal filter element 215f, an upstream filter element 215f and a spacer element 216f. In other embodiments, the consumable may further comprise a cooling element. A cooling element may exchange heat with vapor that is formed by the aerosol-forming substrate 213f in order to cool the vapor so as to facilitate condensation of the vapor.

The aerosol-forming substrate 213f is substantially cylindrical and is located at an upstream end 217f of the consumable 202f and comprises the aerosol former of the system 200f. In that respect, the aerosol forming substrate 213f is configured to be heated by the device 201f to release a vapor. The released vapor is subsequently entrained in an airflow flowing through the aerosol-forming substrate 213f. The airflow is produced by the action of the user drawing on a downstream end 218f (i.e., terminal or mouth end) of the consumable 202f.

In the present embodiment, the aerosol forming substrate 213f comprises tobacco material that may, for example, include any suitable parts of the tobacco plant (e.g., leaves, stems, roots, bark, seeds, and flowers). The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon). For example, the aerosol-forming substrate 213f may comprise a gathered sheet of homogenized (e.g., paper/slurry recon) tobacco or gathered shreds/strips formed from such a sheet.

In order to generate an aerosol, the aerosol forming substrate 213f comprises at least one volatile compound that is intended to be vaporized/aerosolized and that may provide the user with a recreational and/or medicinal effect when inhaled. The aerosol-forming substrate 213f may further comprise one or more additives. For example, such additives may be in the form of humectants (e.g., propylene glycol and/or vegetable glycerin), flavorants, fillers, aqueous/non-aqueous solvents and/or binders.

The terminal filter element 214f is also substantially cylindrical and is located downstream of the aerosol forming substrate 213f at the downstream end 218f of the consumable 202f. The terminal filter element 214f is in the form of a hollow bore filter element having a bore 219f (e.g., for airflow) formed therethrough. The diameter of the bore 219f is 2 mm. The terminal filter element 214f is formed of a porous (e.g., monoacetate) filter material. As set forth above, the downstream end 218f of the consumable 202f (i.e., where the terminal filter 214f is located) forms a mouthpiece portion of the consumable 202f upon which the user draws. Airflow is drawn from the upstream end 217f, thorough the components of the consumable 202f, and out of the downstream end 218f. The airflow is driven by the user drawing on the downstream end 218f (i.e., the mouthpiece portion) of the consumable 202f.

The upstream filter element 215f is located axially adjacent to the aerosol-forming substrate 213f, between the aerosol-forming substrate 213f and the terminal filter element 214f. Like the terminal filter 214f, the upstream filter element 215f is in the form of a hollow bore filter element, such that it has a bore 220f extending axially therethrough. In this way, the upstream filter 215f may act as an airflow restrictor. The upstream filter element 215f is formed of a porous (e.g., monoacetate) filter material. The bore 220f of the upstream filter element 215f has a larger diameter (3 mm) than the terminal filter element 214f.

The spacer 216f is in the form of a cardboard tube, which defines a cavity or chamber between the upstream filter element 215f and the terminal filter element 214f. The spacer 216f acts to allow both cooling and mixing of the vapor/aerosol from the aerosol-forming substrate 213f. The spacer has an external diameter of 7 mm and an axial length of 14 mm.

Although not apparent from the figure, the aerosol-forming substrate 213f, upstream filter 215f and spacer 216f are circumscribed by a paper wrapping layer. The terminal filter 214f is circumscribed by a tipping layer that also circumscribes a portion of the paper wrapping layer (so as to connect the terminal filter 214f to the remaining components of the consumable 202f). The upstream filter 215f and terminal filter 214f are circumscribed by further wrapping layers in the form of plug wraps.

Figure 20D:
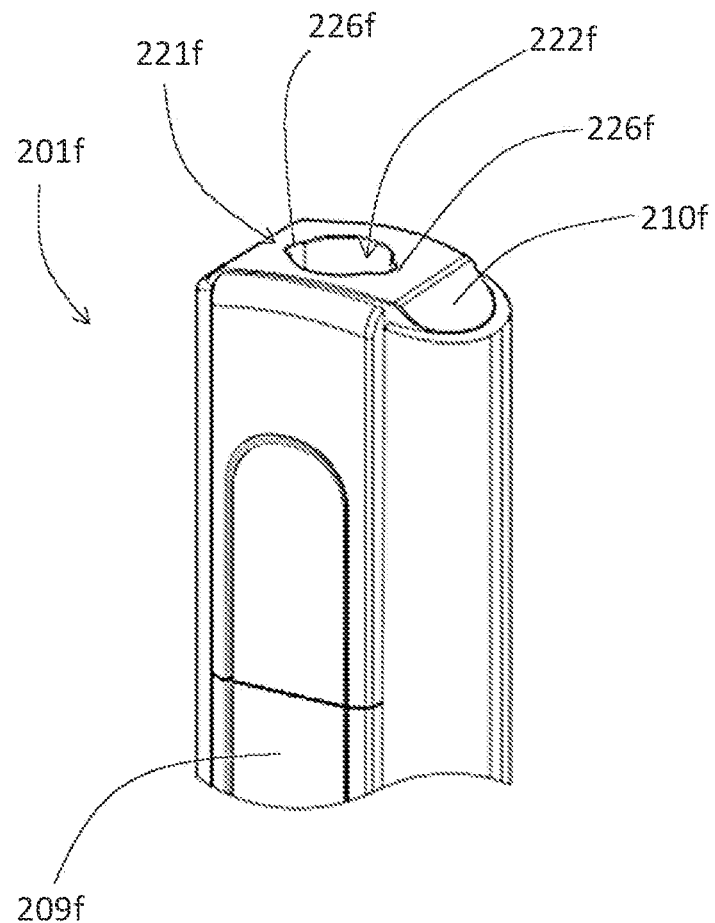
FIG. 20D is a detailed view of an end of the device of the first embodiment of the seventh mode of the smoking substitute system.

Returning now to the device 201f, FIG. 20D illustrates a detailed view of the end of the device 201f that is configured to engage with the consumable 202f. The cap 210f of the device 201f includes an opening 221f to an internal cavity 222f (more apparent from FIG. 20D) defined by the cap 210f. The opening 221f and the cavity 222f are formed so as to receive at least a portion of the consumable 202f. During engagement of the consumable 202f with the device 201f, a portion of the consumable 202f is received through the opening 221f and into the cavity 222f. After engagement (see FIG. 20B), the downstream end 218f of the consumable 202f protrudes from the opening 221f and thus protrudes also from the device 201f. The opening 221f includes laterally disposed notches 226f. When a consumable 202f is received in the opening 221f, these notches 226f remain open and could, for example, be used for retaining a cover to cover the end of the device 201f.

Figure 20E:
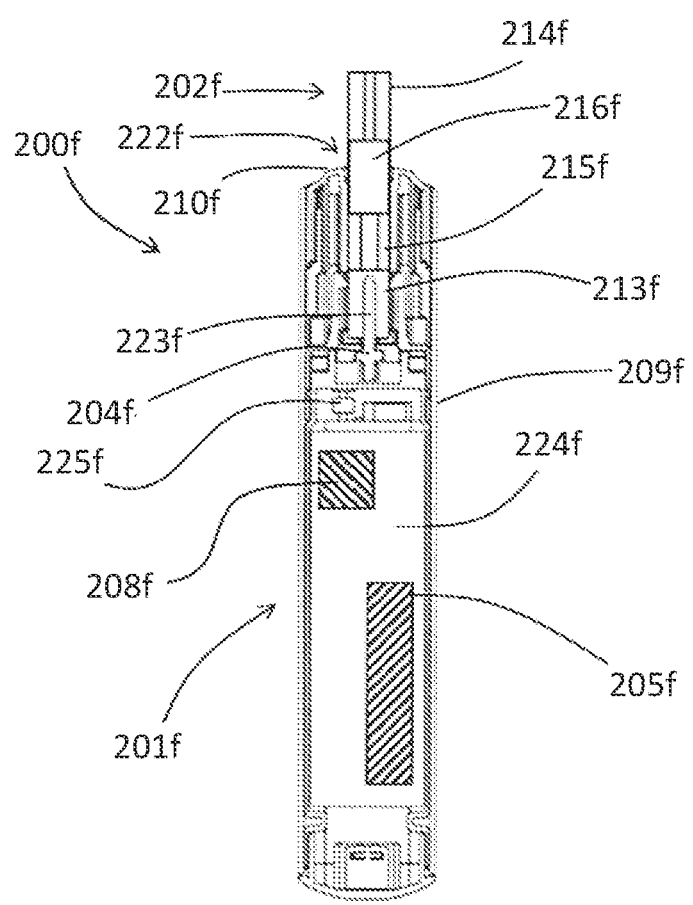
FIG. 20E is a section view of the first embodiment of the seventh mode of the smoking substitute system.

FIG. 20E shows a cross section through a central longitudinal plane through the device 201f. The device 201f is shown with the consumable 202f engaged therewith.

The device 201f comprises a heater 204f comprising heating element 223f. The heater 204f forms part of the body 209*f* of the device 201*f* and is rigidly mounted to the body 209*f*. In the illustrated embodiment, the heater 204*f* is a rod heater with a heating element 223*f* having a circular transverse profile. In other embodiments the heater may be in the form of a blade heater (e.g., heating element with a rectangular transverse profile) or a tube heater (e.g., heating element with a tubular form).

The heating element 223*f* of the heater 204*f* projects from an internal base of the cavity 222*f* along a longitudinal axis towards the opening 221*f*. As is apparent from the figure, the length (i.e., along the longitudinal axis) of the heating element is less than a depth of the cavity 222*f*. In this way, the heating element 223*f* does not protrude from or extend beyond the opening 221*f*.

When the consumable 202*f* is received in the cavity 222*f* (as is shown in FIG. 20E), the heating element 223*f* penetrates the aerosol-forming substrate 213*f* of the consumable 202*f*. In particular, the heating element 223*f* extends for nearly the entire axial length of the aerosol-forming substrate 213*f* when inserted therein. Thus, when the heater 204*f* is activated, heat is transferred radially from an outer circumferential surface the heating element 223*f* to the aerosol-forming substrate 213*f*.

The device 201*f* further comprises an electronics cavity 224*f*. A power source, in the form of a rechargeable battery 205*f* (a lithium-ion battery), is located in electronics cavity 224*f*.

The device 201*f* includes a connector (i.e., forming part of an IO module of the device 201*f*) in the form of a USB port 206*f*. The connector may alternatively be, for example, a micro-USB port or a USB-C port for examples. The USB port 206*f* may be used to recharge the rechargeable battery 205*f*.

The device 201*f* includes the controller 208*f* located in the electronics cavity 224*f*. The controller 208*f* comprises a microcontroller mounted on a printed circuit board (PCB). The USB port 206*f* is also connected to the controller 208*f* (i.e., connected to the PCB and microcontroller).

The controller 208*f* is configured to control at least one function of the device 201*f*. For example, the controller 208*f* is configured to control the operation of the heater 204*f*. Such control of the operation of the heater 204*f* may be accomplished by the controller toggling the electrical connection of the rechargeable battery 205*f* to the heater 204*f*. For example, the controller 208*f* is configured to control the heater 204*f* in response to detection of user taking puff or receiving a simultaneous user button press input from the user via the input means of the device 201*f*. The input means may include for examples a button, a switch, or a capacitive touch sensor.

The controller is also configured to control the LEDs 211*f* in response to (e.g., a detected) a condition of the device 201*f* or the consumable 202*f*. For example, the controller may control the LEDs to indicate whether the device 201*f* is in an on state or an off state (e.g., one or more of the LEDs may be illuminated by the controller when the device is in an on state).

The device 201*f* comprises a puff sensor 225*f*. The puff sensor 225*f* is configured to detect a user drawing (i.e., inhaling) at the downstream end 218*f* of the consumable 202*f* when the device is in the OFF state, i.e., when no power is being supplied to the heater 104*f*. The puff sensor 225*f* may, for example, be in the form of a pressure sensor, a flowmeter, or a microphone. The puff sensor 225*f* is operatively connected to the controller 208*f* in the electronics cavity 224*f*, such that a signal from the puff sensor 225*f*, indicative of a puff state (i.e., drawing or not drawing), forms an input to the controller 208*f* (and can thus be responded to by the controller 208*f*). The controller 208*f* receives the (puff) signal from puff sensor 225*f* when there is no power being supplied to the heater 204*f* of the device.

The controller 208*f* validates the detected user puff to activate the device. In one example, the controller 208*f* validates the detected puff by comparing with a predetermined test puff previously set by the user. If the controller 208*f* determines that the detected puff is valid, then the controller 208*f* activates the heater of the device 201*f* by allowing the power supply to the heater 204*f*. If the controller 208*f* determines that the detected puff is invalid, then the controller 208*f* do not activate the heater of the device 201*f* and proceeds to detect for the next puff or signal from the puff sensor 225*f*.

Alternatively, in addition to the puff detected by the puff sensor, the controller 208*f* may simultaneously receive a button press by the user as further user input. If the controller 208*f* determines that the detected puff is valid, and detects the simultaneous button press by the user, then the controller 208*f* activates the heater of the device 201*f* by allowing the power supply to the heater 204*f*. If the controller 208*f* determines that the detected puff is invalid, then the controller 208*f* do not activate the heater of the device 201*f* and proceeds to detect for the next puff or signal from the puff sensor 225*f*.

The controller 208*f* may also trigger the vibration generator to provide feedback indicating the user about the activation of the heater 204*f* of the device 201*f* in response to detection of puff. In one example, the feedback is a haptic feedback. In another example, the feedback is an audio feedback output by the speaker of the device 201*f*. In yet another example, the feedback is a visual feedback output by the display of the device 201*f*.

By validating the received input command, the device 201*f* allows only an authorized activation of the heater 204*f* of the device 201*f* for receiving a consumable thereby avoiding accidental activation of the device by child user or when the device 201*f* is inside the user's pocket or in transit.

Figure 21A:
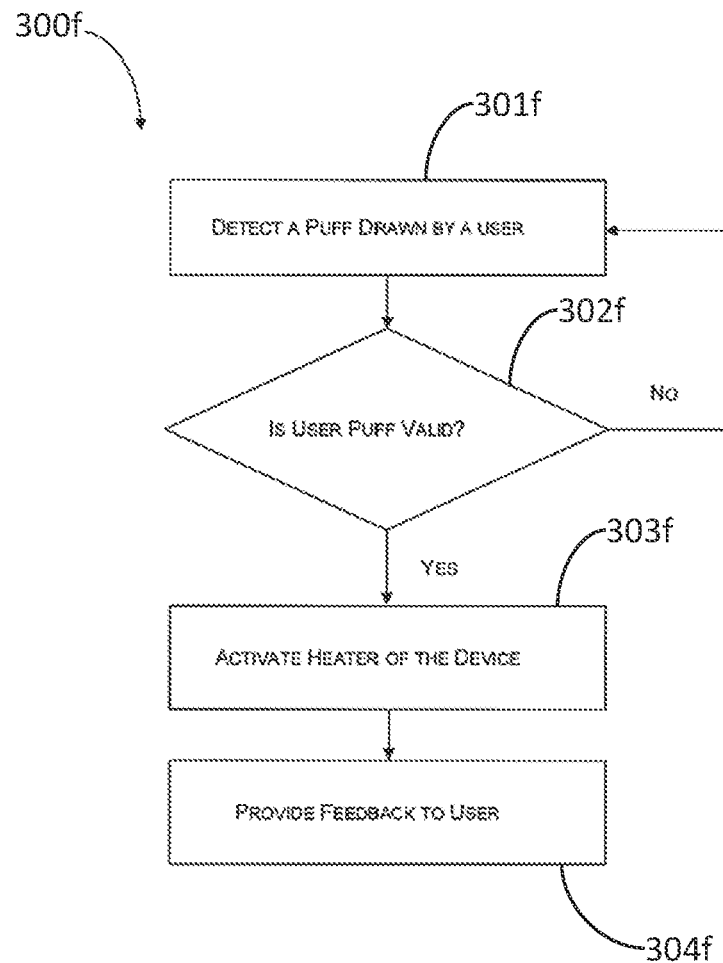
FIG. 21A is a flowchart illustrating method of operating a smoking substitute device for receiving a consumable in accordance with an aspect of the seventh mode.

FIG. 21A illustrates flowchart of method of operating a smoking substitute device for receiving a consumable in accordance with a first embodiment of the seventh mode.

As illustrated in FIG. 21A, the method 300*f* includes one or more blocks implemented by the controller 208*f* of the device 201*f*. The method 300*f* may be described in the general context of controller executable instructions. Generally, controller executable instructions can include routines, programs, objects, components, data structures, procedures, modules, and functions, which perform particular functions or implement particular abstract data types.

The order in which the method 300*f* is described is not intended to be construed as a limitation, and any number of the described method blocks can be combined in any order to implement the method 300*f*. Additionally, individual blocks may be deleted from the method 300*f* without departing from the scope of the subject matter described herein. Furthermore, the method 300*f* can be implemented in any suitable hardware, software, firmware, or combination thereof.

At block 301*f*, the controller 208*f* detects a puff drawn by a user. The controller 208*f* receives the signal or puff detected by the puff sensor 225*f* when there is no power being supplied to the heater 204*f* of the device, i.e., the device is in the OFF state with the heater at ambient temperature. At block 302*f*, the controller 208*f* validates the detected puff. The controller 208*f* validates the detected puff to activate the power supply to the heater of the device. In one example, the controller 208f validates the detected puff by comparing with a predetermined test puff previously set by the user. If the controller 208f determines that the detected puff is valid, then the method proceeds to block 303f along the "YES" path. Otherwise, if the controller 208f determines that the detected puff is invalid, then the controller 208f does not activate the heater of the device 201f and proceeds to detect for the next test puff or signal from the puff sensor 225f to block 301f along the "NO" path.

At block 303f, the controller 208f activates the heater of the device 201f. If the controller 208f determines that the detected puff is valid along the "YES" path, then the controller 208f activates the heater of the device 201f by allowing the power supply to the heater 204f.

At block 304f, the controller 208f provides feedback to the user about the activation of the device 201f. The controller 208f may also trigger the vibration generator to provide feedback indicating the user about the activation of the heater 204f of the device 201f in response to detection of puff. In one example, the feedback is a haptic feedback. In another example, the feedback is an audio feedback output by the speaker of the device 201f. In yet another example, the feedback is a visual feedback output by the display of the device 201f.

By validating the received input command, the device 201f allows only an authorized activation of the heater 204f of the device 201f for receiving a consumable thereby avoiding accidental activation of the device by child user or when the device 201f is inside the user's pocket or in transit.

Figure 21B:
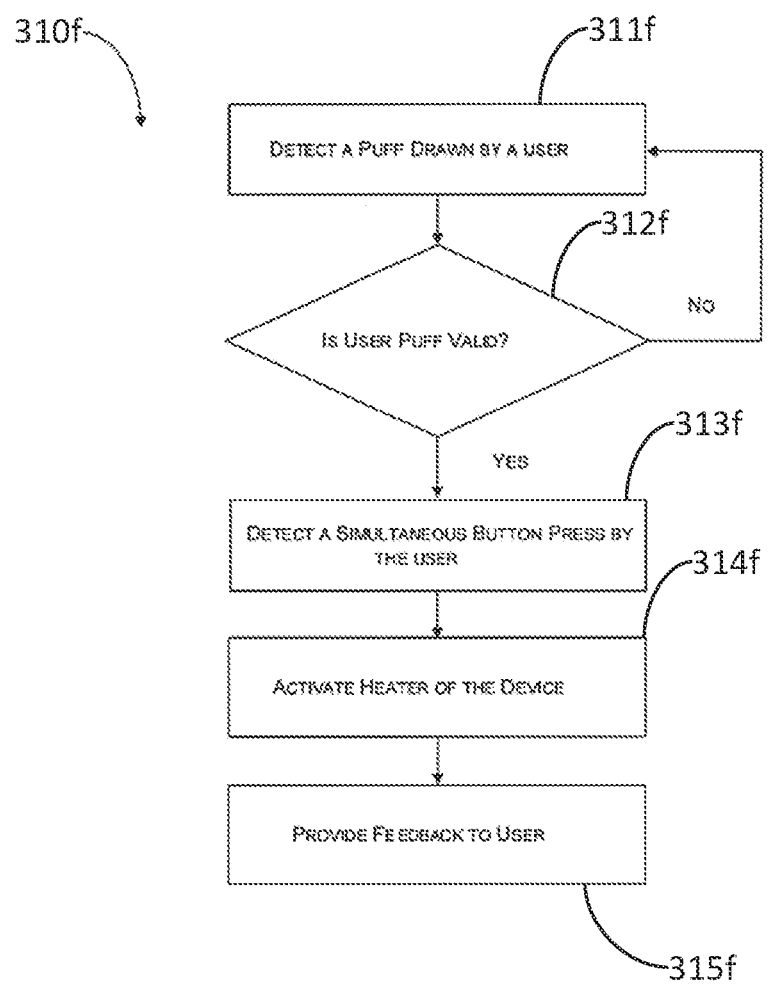
FIG. 21B is a flowchart illustrating method of operating a smoking substitute device for receiving a consumable in accordance with an aspect of the seventh mode.

FIG. 21B illustrates flowchart of method of operating a smoking substitute device for receiving a consumable in accordance with a second embodiment of the seventh mode.

As illustrated in FIG. 21B, the method 310f includes one or more blocks implemented by the controller 208f of the device 201f. The method 310f may be described in the general context of controller executable instructions. Generally, controller executable instructions can include routines, programs, objects, components, data structures, procedures, modules, and functions, which perform particular functions or implement particular abstract data types.

The order in which the method 310f is described is not intended to be construed as a limitation, and any number of the described method blocks can be combined in any order to implement the method 310f. Additionally, individual blocks may be deleted from the method 310f without departing from the scope of the subject matter described herein. Furthermore, the method 310f can be implemented in any suitable hardware, software, firmware, or combination thereof.

At block 311f, the controller 208f detects a puff by a user. The controller 208f receives the signal or puff detected by the puff sensor 225f when there is no power being supplied to the heater 204f of the device.

At block 312f, the controller 208f validates the detected puff. The controller 208f validates the detected puff to activate the power supply to the heater of the device. In one example, the controller 208f validates the detected puff by comparing with a predetermined test puff previously set by the user. If the controller 208f determines that the test puff is valid, then the method proceeds to block 313f along the "YES" path. Otherwise, if the controller 208f determines that the detected puff is invalid, then the controller 208f do not activate the heater of the device 201f and proceeds to detect for the next puff or signal from the puff sensor 225f to block 311f along the "NO" path.

At block 313f, the controller 208f detects a simultaneous button press by the user an operative command. In addition to the puff detected by the puff sensor, the controller 208f may simultaneously receive a button press by the user an operative command. If the controller 208f determines that the detected puff is valid, and detects the simultaneous button press by the user, then the controller 208f activates the heater of the device 201f by allowing the power supply to the heater 204f. If the controller 208f determines that the detected puff is invalid, then the controller 208f does not activate the heater of the device 201f and proceeds to detect for the next puff or signal from the puff sensor 225f.

At block 314f, the controller 208f activates the heater of the device 201f. If the controller 208f determines that the detected puff is valid at block 312f, then the controller 208f activates the heater of the device 201f by allowing the power supply to the heater 204f.

At block 315f, the controller 208f provides feedback to the user about the activation of the device 201f. Controller 208f may also trigger the vibration generator to provide feedback indicating the user about the activation of the heater 204f of the device 201f in response to detection of puff. In one example, the feedback is a haptic feedback. In another example, the feedback is an audio feedback output by the speaker of the device 201f. In yet another example, the feedback is a visual feedback output by the display of the device 201f.

By validating the received input command, the device 201f allows only an authorized activation of the heater 204f of the device 201f for receiving a consumable thereby avoiding accidental activation of the device by child user or when the device 201f is inside the user's pocket or in transit.

Eighth Mode: Operating a Smoking Substitute System to Convey a Current State of a Consumable Cycle.

Aspects and embodiments of the eighth mode of the present disclosure will now be discussed with reference to the accompanying figures. Further aspects and embodiments will be apparent to those skilled in the art. All documents mentioned in this text are incorporated herein by reference.

Figure 22A:
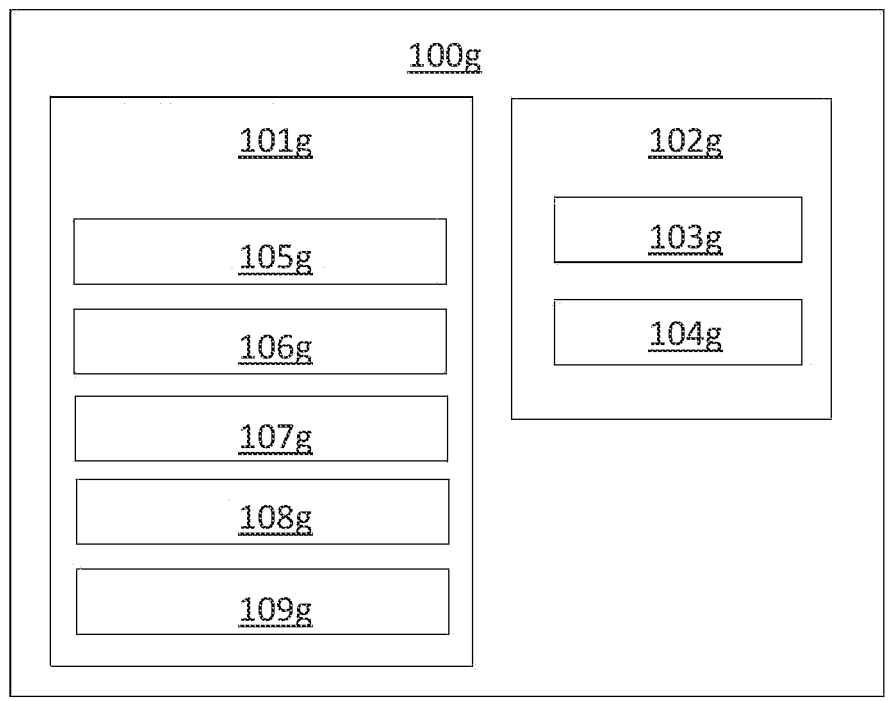
FIG. 22A is a schematic of an eighth mode of the smoking substitute system.

FIG. 22A is a schematic providing a general overview of a smoking substitute system 100g. The system 100g includes a substitute smoking device 101g and an aerosol-forming article in the form of a consumable 102g, which comprises an aerosol former 103g. The system is configured to vaporize the aerosol former by heating the aerosol former 103g (so as to form a vapor/aerosol for inhalation by a user).

In the illustrated system, the heater 104g forms part of the consumable 102g and is configured to heat the aerosol former 103g. Heat from the heater 104g vaporizes the aerosol former 103g to produce a vapor. The vapor subsequently condenses to form an aerosol, which is ultimately inhaled by the user.

The system 100g further comprises a power source 105g that forms part of the device 101g. In other embodiments the power source 105g may be external to (but connectable to) the device 101g. The power source 105g is electrically connectable to the heater 104g such that the power source 105g is able to supply power to the heater 104g (i.e., for the purpose of heating the aerosol former 103g). Thus, control of the electrical connection of the power source 105g to the heater 104g provides control of the state of the heater 104g. The power source 105g may be a power store, for example a battery or rechargeable battery (e.g., a lithium-ion battery).

The system 100g further comprises an I/O module comprising a connector 106g (e.g., in the form of a USB port, Micro USB port, USB-C port, etc.). The connector 106g is configured for connection to an external source of electrical power, e.g., a mains electrical supply outlet. The connector 106g may be used in substitution for the power source 105g.

That is the connector 106g may be electrically connectable to the heater 104g so as to supply electricity to the heater 104g. In such embodiments, the device may not include a power source, and the power source of the system may instead comprise the connector 106g and an external source of electrical power (to which the connector 106g provides electrical connection).

In some embodiments, the connector 106g may be used to charge and recharge the power source 105g where the power source 104g includes a rechargeable battery.

The system 100g also comprises a user interface (UI) 107g. Although not shown, the UI 107g may include input means to receive commands from a user. The input means of the UI 107g also allows the user to control at least one aspect of the operation of the system 100g. The input means may, for example, be in the form of a button, touchscreen, switch, microphone, etc.

The UI 107g also comprises output means to convey information to the user. The output means may, for example, comprise lights (e.g., LEDs), a display screen, speaker, vibration generator, etc.

The system 100g further comprises a controller 108g and a memory 109g coupled to the controller 108g. In the illustrated embodiment, the controller 108g is a component of the device 101g, but in other embodiments may be separate from (but connectable to) the device 101g. The controller 108g is configured to provide current state of the consumable cycle based on a user request or predetermined condition being detected. The memory 109g stores controller-executable instructions that causes the controller 108g to perform one or more functions. The controller 108g is configured to control the operation of the heater 104g and, for example, may be configured to control the voltage applied from the power source 105g to the heater 104g. The controller 108g may be configured to toggle the supply of power to the heater 105g between an on state, in which the full output voltage of the power source 105g is applied to the heater 104g, and an off state, in which the no voltage is applied to the heater 104g.

Although not shown, the system 100g may also comprise a voltage regulator to regulate the output voltage from the power source 105g to form a regulated voltage. The regulated voltage may then be applied to the heater 104g.

In addition to being connected to the heater 104g, the controller 108g is operatively connected to the UI 107g. Thus, the controller 108g may receive an input signal from the input means of the UI 107g. Similarly, the controller 108g may transmit output signals to the UI 107g. In response, the output means of the UI 107g may convey information, based on the output signals, to a user.

Figure 22B:
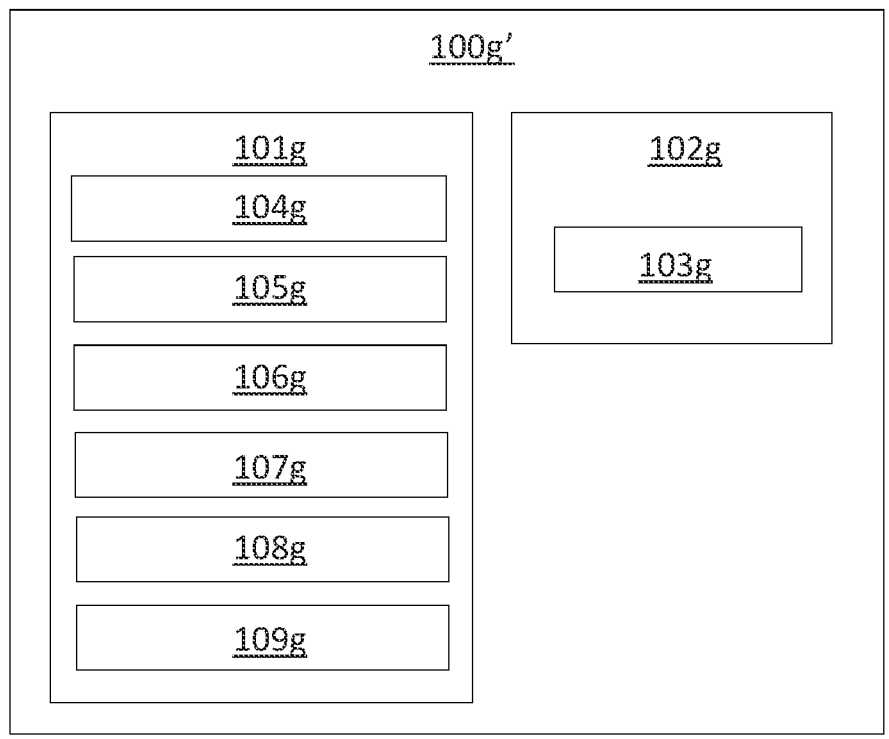
FIG. 22B is a schematic of a variation of the eighth mode of the smoking substitute system of FIG. 22A.

FIG. 22B is a schematic showing a variation of the system 100g of FIG. 22A. In the system 100g' of FIG. 22B, the heater 104g forms part of the consumable 102g, rather than the device 101g. In this variation, the heater 104g is electrically connectable to the power source 105g, for example, when the consumable 102g is engaged with the device 101g.

Figure 23A:
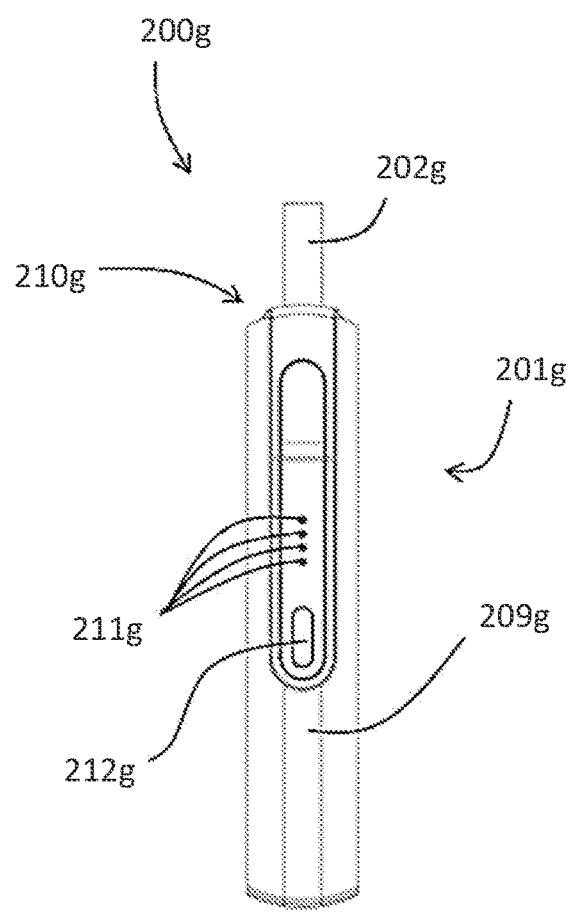
FIG. 23A is a front view of a first embodiment of the eighth mode of the smoking substitute system with the consumable engaged with the device.
Figure 23B:
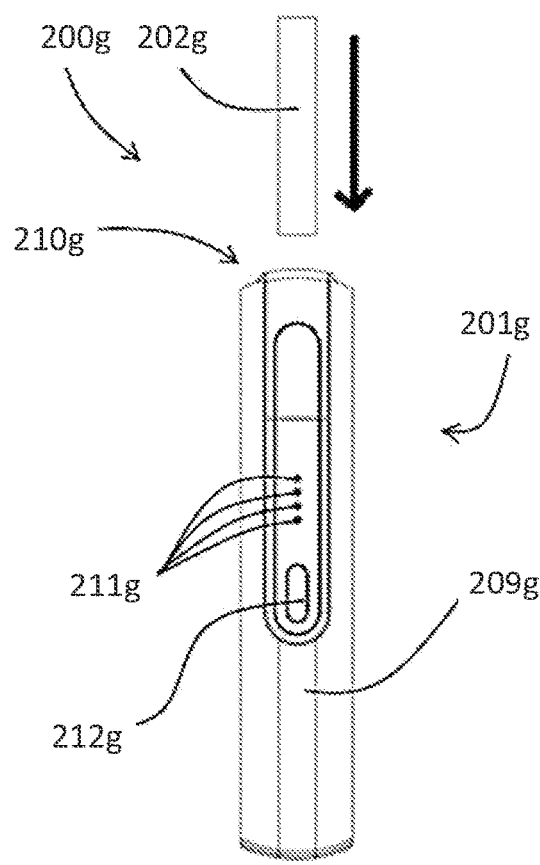
FIG. 23B is a front view of the first embodiment of the eighth mode of the smoking substitute system with the consumable disengaged from the device.

FIG. 23A and FIG. 23B illustrate a heated-tobacco (HT) smoking substitute system 200g. The system 200g is an example of the systems 100g, 100g' described in relation to FIG. 22A or FIG. 22B. System 200g includes an HT device 201g and an HT consumable 202g. The description of FIG. 22A and FIG. 22B above is applicable to the system 200g of FIG. 23A and FIG. 23B and will not be repeated.

The device 201g and the consumable 202g are configured such that the consumable 202g can be engaged with the device 201g. FIG. 23A shows the device 201g and the consumable 202g in an engaged state, whilst FIG. 23B shows the device 201g and the consumable 202g in a disengaged state.

The device 201g comprises a body 209g and cap 210g. In use the cap 209g is engaged at an end of the body 209g. Although not apparent from the figures, the cap 210g is moveable relative to the body 209g. In particular, the cap 210g is slidable and can slide along a longitudinal axis of the body 209g.

The device 201g comprises an output means (forming part of the UI of the device 201g) in the form of a plurality of light-emitting diodes (LEDs) 211g arranged linearly along the longitudinal axis of the device 201g and on an outer surface of the body 209g of the device 201g. A button 212g is also arranged on an outer surface of the body 209g of the device 201g and is axially spaced (i.e., along the longitudinal axis) from the plurality of LEDs 211g.

Figure 23C:
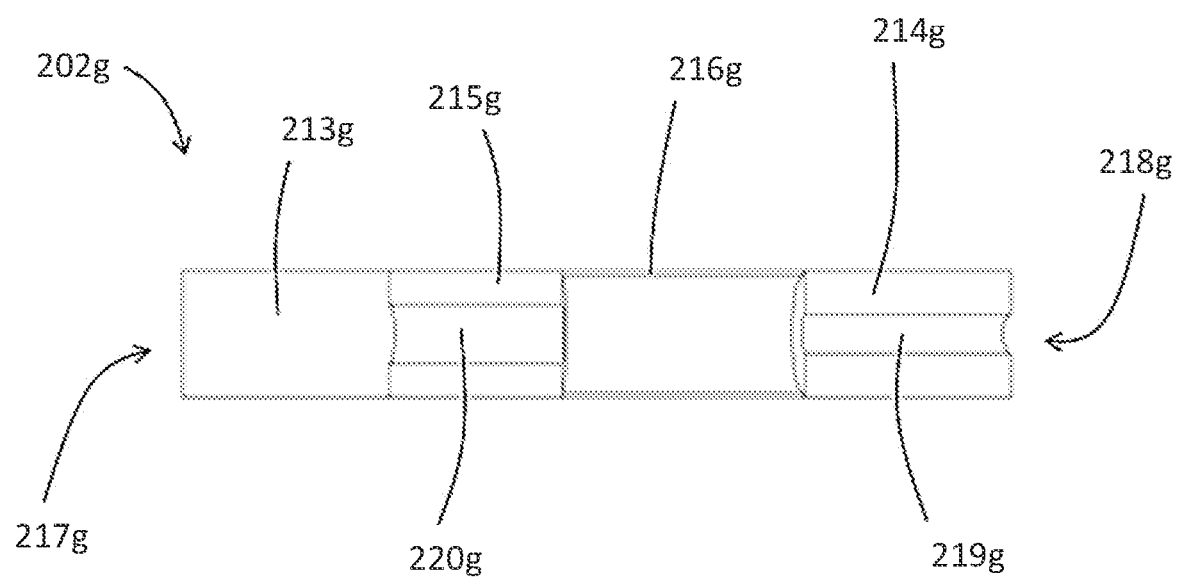
FIG. 23C is a section view of the consumable of the first embodiment of the eighth mode of the smoking substitute system.

FIG. 23C show a detailed section view of the consumable 202g of the system 200g. The consumable 202g generally resembles a cigarette. In that respect, the consumable 202g has a generally cylindrical form with a diameter of 7 mm and an axial length of 70 mm. The consumable 202g comprises an aerosol forming substrate 213g, a terminal filter element 214g, an upstream filter element 215g and a spacer element 216g. In other embodiments, the consumable may further comprise a cooling element. A cooling element may exchange heat with vapor that is formed by the aerosol-forming substrate 213g in order to cool the vapor so as to facilitate condensation of the vapor.

The aerosol-forming substrate 213g is substantially cylindrical and is located at an upstream end 217g of the consumable 202g and comprises the aerosol former of the system 200g. In that respect, the aerosol forming substrate 213g is configured to be heated by the device 201g to release a vapor. The released vapor is subsequently entrained in an airflow flowing through the aerosol-forming substrate 213g. The airflow is produced by the action of the user drawing on a downstream end 218g (i.e., terminal or mouth end) of the consumable 202g.

In the present embodiment, the aerosol forming substrate 213g comprises tobacco material that may, for example, include any suitable parts of the tobacco plant (e.g., leaves, stems, roots, bark, seeds, and flowers). The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon). For example, the aerosol-forming substrate 213g may comprise a gathered sheet of homogenized (e.g., paper/slurry recon) tobacco or gathered shreds/strips formed from such a sheet.

In order to generate an aerosol, the aerosol forming substrate 213g comprises at least one volatile compound that is intended to be vaporized/aerosolized and that may provide the user with a recreational and/or medicinal effect when inhaled. The aerosol-forming substrate 213g may further comprise one or more additives. For example, such additives may be in the form of humectants (e.g., propylene glycol and/or vegetable glycerin), flavorants, fillers, aqueous/non-aqueous solvents and/or binders.

The terminal filter element 214g is also substantially cylindrical and is located downstream of the aerosol forming substrate 213g at the downstream end 218g of the consumable 202g. The terminal filter element 214g is in the form of a hollow bore filter element having a bore 219g (e.g., for airflow) formed therethrough. The diameter of the bore 219g is 2 mm. The terminal filter element 214g is formed of a porous (e.g., monoacetate) filter material. As set forth above, the downstream end 218g of the consumable 202g (i.e., where the terminal filter 214g is located) forms a mouthpiece portion of the consumable 202g upon which the user draws. Airflow is drawn from the upstream end 217g, thorough the components of the consumable 202g, and out of the downstream end 218g. The airflow is driven by the user drawing on the downstream end 218g (i.e., the mouthpiece portion) of the consumable 202g.

The upstream filter element 215g is located axially adjacent to the aerosol-forming substrate 213g, between the aerosol-forming substrate 213g and the terminal filter element 214g. Like the terminal filter 214g, the upstream filter element 215g is in the form of a hollow bore filter element, such that it has a bore 220g extending axially therethrough. In this way, the upstream filter 215g may act as an airflow restrictor. The upstream filter element 215g is formed of a porous (e.g., monoacetate) filter material. The bore 220g of the upstream filter element 214g has a larger diameter (3 mm) than the terminal filter element 214g.

The spacer 216g is in the form of a cardboard tube, which defines a cavity or chamber between the upstream filter element 215g and the terminal filter element 214g. The spacer 216g acts to allow both cooling and mixing of the vapor/aerosol from the aerosol-forming substrate 213g. The spacer has an external diameter of 7 mm and an axial length of 14 mm.

Although not apparent from the figure, the aerosol-forming substrate 213g, upstream filter 215g and spacer 216g are circumscribed by a paper wrapping layer. The terminal filter 214g is circumscribed by a tipping layer that also circumscribes a portion of the paper wrapping layer (so as to connect the terminal filter 214g to the remaining components of the consumable 202g). The upstream filter 215g and terminal filter 214g are circumscribed by further wrapping layers in the form of plug wraps.

Figure 23D:
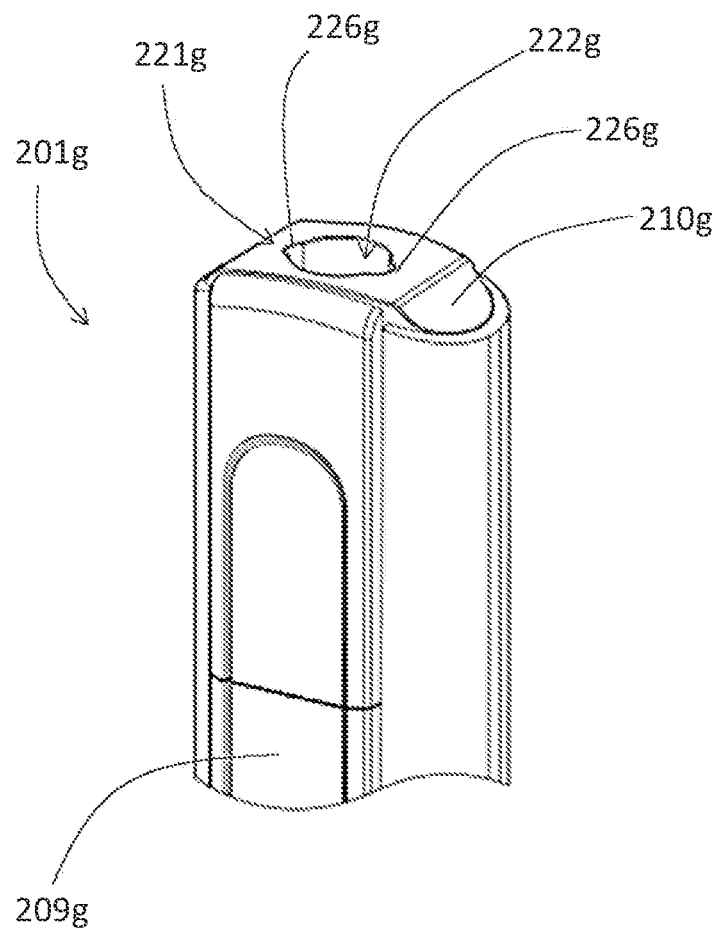
FIG. 23D is a detailed view of an end of the device of the first embodiment of the eighth mode of the smoking substitute system.
Figure 23E:
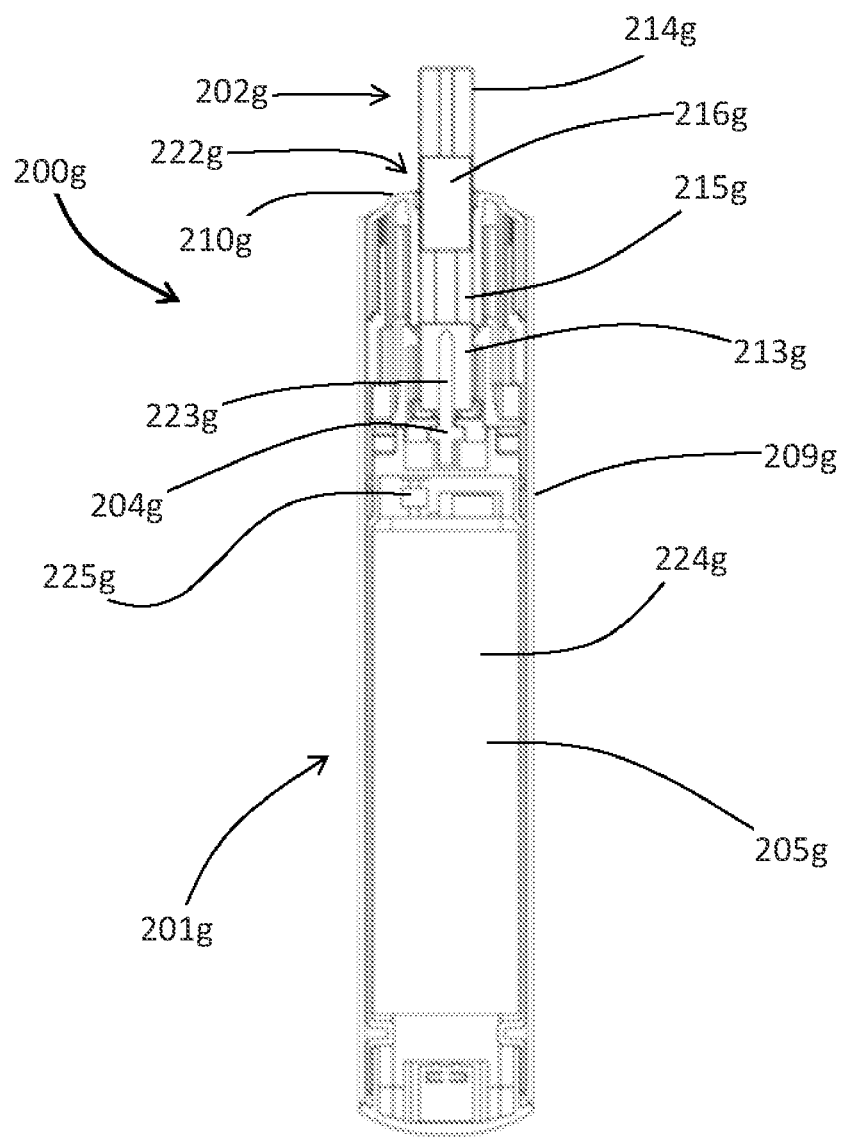
FIG. 23E is a section view of the first embodiment of the eighth mode of the smoking substitute system.

Returning now to the device 201g, FIG. 23D illustrates a detailed view of the end of the device 201g that is configured to engage with the consumable 202g. The cap 210g of the device 201g includes an opening 221g to an internal cavity 222g (more apparent from FIG. 23D) defined by the cap 210g. The opening 221g and the cavity 222g are formed so as to receive at least a portion of the consumable 202g. During engagement of the consumable 202g with the device 201g, a portion of the consumable 202g is received through the opening 221g and into the cavity 222g. After engagement (see FIG. 23B), the downstream end 218g of the consumable 202g protrudes from the opening 221g and thus protrudes also from the device 201g. The opening 221g includes laterally disposed notches 226g. When a consumable 202g is received in the opening 221g, these notches 226g remain open and could, for example, be used for retaining a cover to cover the end of the device 201g.

FIG. 23D shows a cross section through a central longitudinal plane through the device 201g. The device 201g is shown with the consumable 202g engaged therewith.

The device 201g comprises a heater 204g comprising heating element 223g. The heater 204g forms part of the body 209g of the device 201g and is rigidly mounted to the body 209g. In the illustrated embodiment, the heater 204g is a rod heater with a heating element 223g having a circular transverse profile. In other embodiments the heater may be in the form of a blade heater (e.g., heating element with a rectangular transverse profile) or a tube heater (e.g., heating element with a tubular form).

The heating element 223g of the heater 204g projects from an internal base of the cavity 222g along a longitudinal axis towards the opening 221g. As is apparent from the figure, the length (i.e., along the longitudinal axis) of the heating element is less than a depth of the cavity 222g. In this way, the heating element 223g does not protrude from or extend beyond the opening 221g.

When the consumable 202g is received in the cavity 222g (as is shown in FIG. 23D), the heating element 223g penetrates the aerosol-forming substrate 213g of the consumable 202g. In particular, the heating element 223g extends for nearly the entire axial length of the aerosol-forming substrate 213g when inserted therein. Thus, when the heater 204g is activated, heat is transferred radially from an outer circumferential surface the heating element 223g to the aerosol-forming substrate 213g.

The device 202g further comprises an electronics cavity 224g. A power source, in the form of a rechargeable battery 205g (a lithium-ion battery), is located in electronics cavity 224g.

The device 202g includes a connector (i.e., forming part of an IO module of the device 201g) in the form of a USB port 206g. The connector may alternatively be, for example, a micro-USB port or a USB-C port for examples. The USB port 206g may be used to recharge the rechargeable battery 205g.

The device 202g includes the controller 208g (not shown) located in the electronics cavity 224g. The controller comprises a microcontroller mounted on a printed circuit board (PCB). The USB port 206g is also connected to the controller 208g (i.e., connected to the PCB and microcontroller).

The controller 208g is configured to control at least one function of the device 202g. For example, the controller 208g is configured to control the operation of the heater 204g. Such control of the operation of the heater 204g may be accomplished by the controller toggling the electrical connection of the rechargeable battery 205g to the heater 204g. For example, the controller 208g is configured to control the heater 204g in response to a user depressing the button 212g. Depressing the button 212g may cause the controller to allow a voltage (from the rechargeable battery 205g) to be applied to the heater 204g (so as to cause the heating element 223g to be heated).

The controller 208g is configured to convey to the user a current state of the consumable cycle in response to a user request or in response to detecting a predetermined condition of the device 201g. In one example, the controller 208g receives a user request to detect the current state of the consumable cycle. The user request may be an input to a user input means of the device, for example a button press of the button 212g. The predetermined condition may be detecting that a predetermined portion of consumable remains left in the consumable cycle.

Examples of current state may include at least the beginning of a consumable, at least one partial completion middle state, and ending/conclusion of the consumable cycle. For example, the states may include progressive stages of consumable cycle completion, e.g., 0% completed (i.e., cycle beginning), 25 25% used, 50% used, 75% used, and 100% used (i.e., cycle completed). In some embodiments LEDs 211g are provided to convey these five stages.

In some embodiments, the number of LEDs 211g lit when the user presses the button 212g (a user input to a user input means) may be proportional to the amount of consumable cycle remaining. For example, if 75% of the consumable is remaining, three of four LEDs 211g may be lit when the user presses the button 212g.

In another embodiment, the number of LEDs 211g lit when the user presses the button 212g (a user input to a user input means) may be proportional to the amount of consumable used (or inversely proportional to the amount of consumable cycle remaining). For example, if 75% of the consumable cycle has been used, then three of four LEDs 211g may be lit when the user presses the button 212g.

By providing the current state, the user is aware of how far the smoking consumable cycle is complete and how much of the consumable cycle remains. Further, providing the current state only upon user request may conserve the battery rather than showing the current state at all times. Furthermore, the LEDs 211g may be used to convey other information when not being used to convey the current state of a consumable cycle. When the consumable cycle is not running, the LEDs 211g may be used to convey the charge state of a battery of the device.

In some embodiments, the LEDs 211g conveying the consumable cycle status remain illuminated only for a predetermined period, after which the LEDs 211g are extinguished. For example, the LEDs 211g may be illuminated for between 0.5 and 10 seconds, optionally between 2 and 5 seconds. This may save battery power.

In another aspect, the controller, during a smoking routing of a consumable, determines when a predetermined portion of the consumable remains. Upon determination that the predetermined portion of the consumable cycle remains, the controller 208g provides a haptic feedback output to the user of the device 201g. The haptic feedback output may be accompanied by a visual feedback provided by one or more of the LEDs 211g. In some embodiments, the haptic feedback may be provided when there is 10% of the consumable cycle remaining. This allows the user to know when the consumable is nearing completion, without having to look at the device 201g.

The progress of a consumable cycle may, for example, correspond to a fraction of time remaining of a consumable cycle of predetermined duration. In another example, the progress of a consumable may be based on a measured number of puffs taken on the consumable, relative to a predetermined number of puffs available in a full consumable cycle. In another example, the progress of a consumable may be based on a total puff duration taken on the consumable, relative to a predetermined total puff duration available in a full consumable cycle.

In some embodiments, the controller is also configured to control the LEDs 211g in response to (e.g., a detected) a condition of the device 201g or the consumable 202g. For example, the controller may control the LEDs to indicate whether the device 201g is in an on state or an off state (e.g., one or more of the LEDs may be illuminated by the controller when the device is in an on state).

The device 202g comprises a further input means (i.e., in addition to the button 212g) in the form of a puff sensor 225g. The puff sensor 225g is configured to detect a user drawing (i.e., inhaling) at the downstream end 218g of the consumable 202g. The puff sensor 225g may, for example, be in the form of a pressure sensor, a flowmeter, or a microphone. The puff sensor 225g is operatively connected to the controller 208g in the electronics cavity 224g, such that a signal from the puff sensor 225g, indicative of a puff state (i.e., drawing or not drawing), forms an input to the controller 208g (and can thus be responded to by the controller 208g).

Ninth Mode: A Heated Tobacco Device that Uses a Motion Sensor.

Aspects and embodiments of the ninth mode of the present disclosure will now be discussed with reference to the accompanying figures. Further aspects and embodiments will be apparent to those skilled in the art. All documents mentioned in this text are incorporated herein by reference.

Figure 24A:
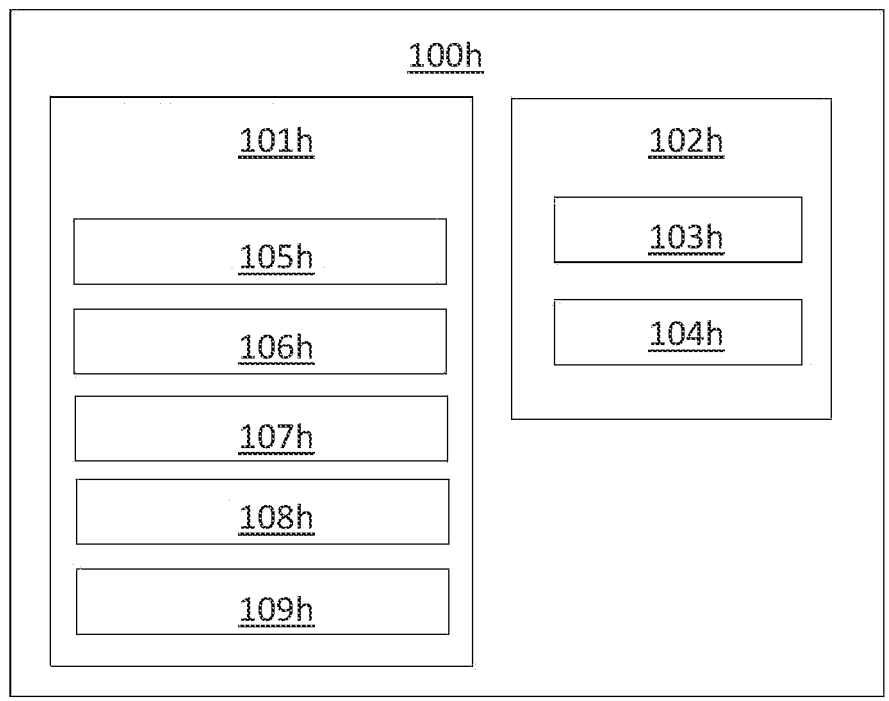
FIG. 24A is a schematic of a ninth mode of the smoking substitute system.

FIG. 24A is a schematic providing a general overview of a smoking substitute system 100h. The system 100h includes a substitute smoking device 101h and an aerosol-forming article in the form of a consumable 102h, which comprises an aerosol former 103h. The system is configured to vaporize the aerosol former by heating the aerosol former 103h (so as to form a vapor/aerosol for inhalation by a user).

In the illustrated system, the heater 104h forms part of the consumable 102h and is configured to heat the aerosol former 103h. In this variation, the heater 104h is electrically connectable to the power source 105h, for example, when the consumable 102h is engaged with the device 101h. Heat from the heater 104h vaporizes the aerosol former 103h to produce a vapor. The vapor subsequently condenses to form an aerosol, which is ultimately inhaled by the user.

The system 100h further comprises a power source 105h that forms part of the device 101h. In other embodiments the power source 105h may be external to (but connectable to) the device 101h. The power source 105h is electrically connectable to the heater 104h such that it is able to supply power to the heater 104h (i.e., for the purpose of heating the aerosol former 103h). Thus, control of the electrical connection of the power source 105h to the heater 104h provides control of the state of the heater 104h. The power source 105h may be a power store, for example a battery or rechargeable battery (e.g., a lithium-ion battery).

The system 100h further comprises an I/O module comprising a connector 106h (e.g., in the form of a USB port, Micro USB port, USB-C port, etc.). The connector 106h is configured for connection to an external source of electrical power, e.g., a mains electrical supply outlet. The connector 106h may be used in substitution for the power source 105h. That is the connector 106h may be electrically connectable to the heater 104h so as to supply electricity to the heater 104h. In such embodiments, the device may not include a power source, and the power source of the system may instead comprise the connector 106h and an external source of electrical power (to which the connector 106h provides electrical connection).

In some embodiments, the connector 106h may be used to charge and recharge the power source 105h where the power source 105h includes a rechargeable battery.

The system 100h also comprises a user interface (UI) 107h. Although not shown, the UI 107h may include input means to receive commands from a user. The input means of the UI 107h allows the user to control at least one aspect of the operation of the system 100h. The input means may, for example, be in the form of a button, touchscreen, switch, microphone, etc.

The UI 107h also comprises output means to convey information to the user. The output means may, for example, comprise lights (e.g., LEDs), a display screen, speaker, vibration generator, etc.

The system 100h further comprises a controller 108h that is configured to control at least one function of the device 101h. In the illustrated embodiment, the controller 108h is a component of the device 101h, but in other embodiments may be separate from (but connectable to) the device 101h. The controller 108h is configured to control the operation of the heater 104h and, for example, may be configured to control the voltage applied from the power source 105h to the heater 104h. The controller 108h may be configured to toggle the supply of power to the heater 104h between an on state, in which the full output voltage of the power source 105h is applied to the heater 104h, and an off state, in which the no voltage is applied to the heater 104h. The controller 108h is configured to activate the device upon detecting a movement of the device 101h by a motion sensor. The controller 108h upon detecting movement via the motion sensor is further configured, though not restricted to, to perform one or more functions, such as: switching on heater 104h, changing mode of operation, display a battery status, display a consumable cycle status, or enter or exit a locked mode. Additionally or alternatively the, the controller 108h is configured to deactivate the device 101h if no movement is detected for a predetermined time period. See FIG. 3 and associated description for further description.

Although not shown, the system 100h may also comprise a voltage regulator to regulate the output voltage from the power source 105h to form a regulated voltage. The regulated voltage may then be applied to the heater 104h.

In addition to being connected to the heater 104h, the controller 108h is operatively connected to the UI 107h. Thus, the controller 108h may receive an input signal from the input means of the UI 107h. Similarly, the controller 108h may transmit output signals to the UI 107h. In response, the output means of the UI 107h may convey information, based on the output signals, to a user. The controller also comprises a memory 109h, which is a non-volatile memory. The memory 109h includes instructions, which, when implemented, cause the controller to perform certain tasks or steps of a method.

Figure 24B:
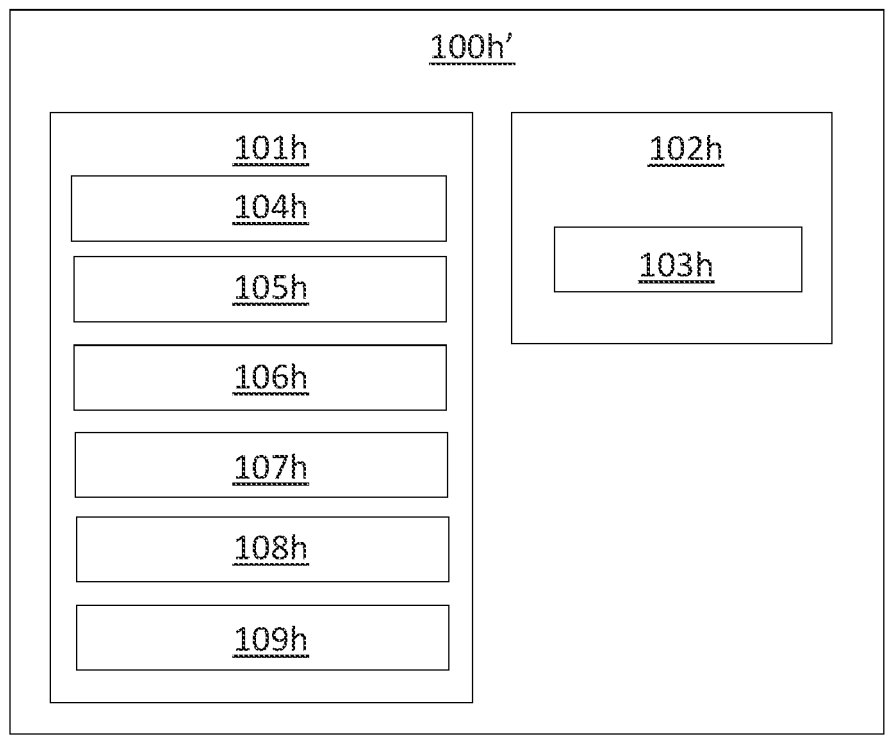
FIG. 24B is a schematic of a variation of the ninth mode of the smoking substitute system of FIG. 24A.

FIG. 24B is a schematic showing a variation of the system 100h of FIG. 24A. In the system 100h' of FIG. 24B, the heater 104h forms part of the device 101h, rather than the consumable 102h. In this variation, the heater 104h is electrically connected to the power source 105h.

Figure 25A:
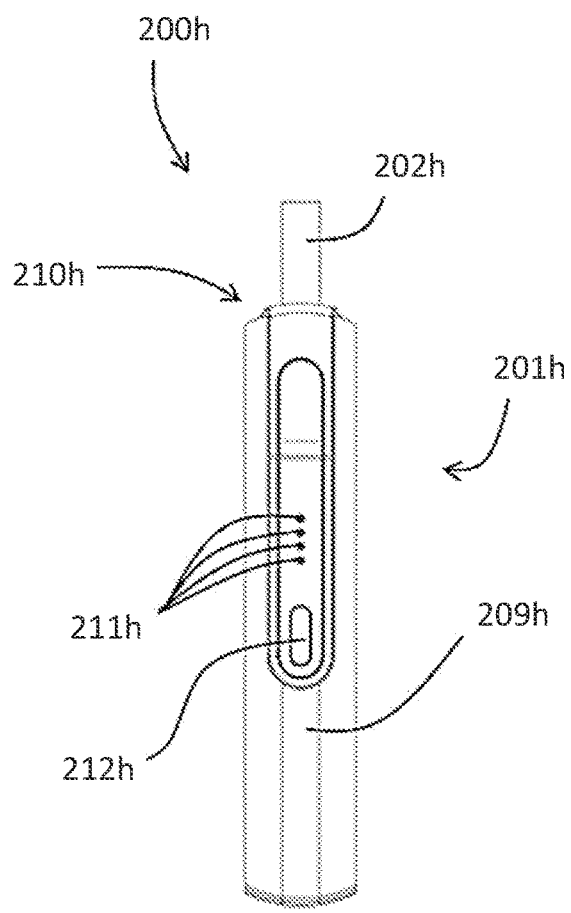
FIG. 25A is a front view of a first embodiment of the ninth mode of the smoking substitute system with the consumable engaged with the device.
Figure 25B:
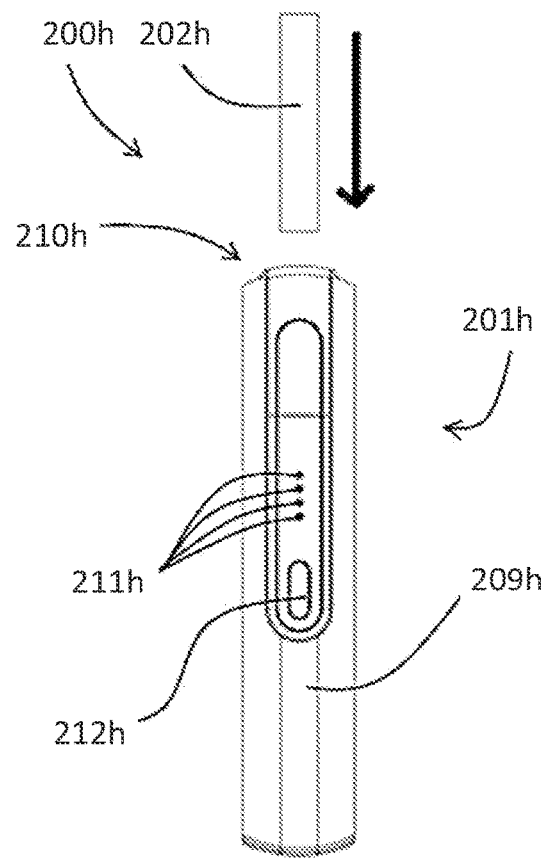
FIG. 25B is a front view of the first embodiment of the ninth mode of the smoking substitute system with the consumable disengaged from the device.

FIG. 25A and FIG. 25B illustrate a heated-tobacco (HT) smoking substitute system 200h. The system 200h is an example of the systems 100h, 100h' described in relation to FIG. 24A or FIG. 24B. System 200h includes an HT device 201h and an HT consumable 202h. The description of FIG. 24A and FIG. 24B above is applicable to the system 200h of FIG. 25A and FIG. 25B and will not be repeated.

The device 201h and the consumable 202h are configured such that the consumable 202h can be engaged with the device 201h. FIG. 25A shows the device 201h and the consumable 202h in an engaged state, whilst FIG. 25B shows the device 201h and the consumable 202h in a disengaged state.

The device 201h comprises a body 209h and cap 210h. In use the cap 210h is engaged at an end of the body 209h. Although not apparent from the figures, the cap 210h is moveable relative to the body 209h. In particular, the cap 210h is slidable and can slide along a longitudinal axis of the body 209h.

The device 201h comprises an output means (forming part of the UI of the device 201h) in the form of a plurality of light-emitting diodes (LEDs) 211h arranged linearly along the longitudinal axis of the device 201h and on an outer surface of the body 209h of the device 201h. A button 212h is also arranged on an outer surface of the body 209h of the device 201h and is axially spaced (i.e., along the longitudinal axis) from the plurality of LEDs 211h.

The controller 208h is configured to activate the device 201h upon detecting a movement of the device 201h by a motion sensor. The controller upon detecting movement via the motion sensor is further configured, though not restricted to, to perform one or more functions, such as: switching on heater 204h, changing mode of operation, display a battery status, display a consumable cycle status, or enter or exit a locked mode. Additionally or alternatively the, the controller 208h is configured to deactivate the device 201h if no movement is detected for a predetermined time period. See FIG. 3 and associated description for further description.

Figure 25C:
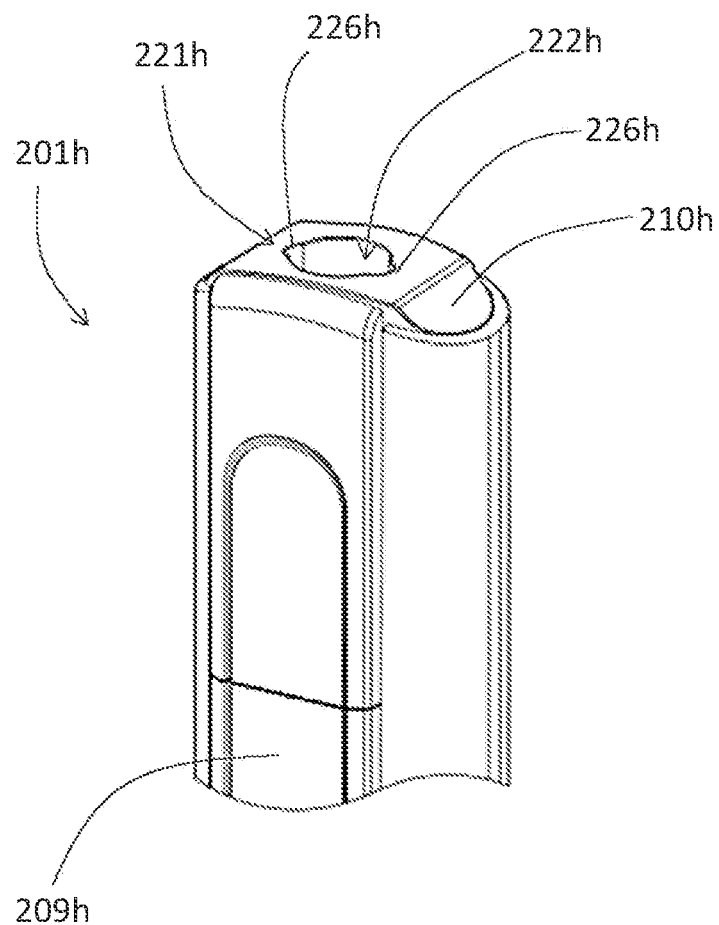
FIG. 25C is a detailed view of an end of the device of the first embodiment of the ninth mode of the smoking substitute system.

FIG. 25C show a detailed section view of the consumable 202h of the system 200h. The consumable 202h generally resembles a cigarette. In that respect, the consumable 202h has a generally cylindrical form with a diameter of 7 mm and an axial length of 70 mm. The consumable 202h comprises an aerosol forming substrate 213h, a terminal filter element 214h, an upstream filter element 215h and a spacer element 216h. In other embodiments, the consumable may further comprise a cooling element. A cooling element may exchange heat with vapor that is formed by the aerosol-forming substrate 213h in order to cool the vapor so as to facilitate condensation of the vapor.

The aerosol-forming substrate 213h is substantially cylindrical and is located at an upstream end 217h of the consumable 202h and comprises the aerosol former of the system 200h. In that respect, the aerosol forming substrate 213h is configured to be heated by the device 201h to release a vapor. The released vapor is subsequently entrained in an airflow flowing through the aerosol-forming substrate 213h. The airflow is produced by the action of the user drawing on a downstream end 218h (i.e., terminal or mouth) end of the consumable 202h.

In the present embodiment, the aerosol forming substrate 213h comprises tobacco material that may, for example, include any suitable parts of the tobacco plant (e.g., leaves, stems, roots, bark, seeds, and flowers). The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon). For example, the aerosol-forming substrate 213h may comprise a gathered sheet of homogenized (e.g., paper/slurry recon) tobacco or gathered shreds/strips formed from such a sheet.

In order to generate an aerosol, the aerosol forming substrate 213h comprises at least one volatile compound that is intended to be vaporized/aerosolized and that may provide the user with a recreational and/or medicinal effect when inhaled. The aerosol-forming substrate 213h may further comprise one or more additives. For example, such additives may be in the form of humectants (e.g., propylene glycol and/or vegetable glycerin), flavorants, fillers, aqueous/non-aqueous solvents and/or binders.

The terminal filter element 214h is also substantially cylindrical and is located downstream of the aerosol forming substrate 213h at the downstream end 218h of the consumable 202h. The terminal filter element 214h is in the form of a hollow bore filter element having a bore 219h (e.g., for airflow) formed therethrough. The diameter of the bore 219h is 2 mm. The terminal filter element 214h is formed of a porous (e.g., monoacetate) filter material. As set forth above, the downstream end 218h of the consumable 202h (i.e., where the terminal filter 214h is located) forms a mouthpiece portion of the consumable 202h upon which the user draws. Airflow is drawn from the upstream end 217h, thorough the components of the consumable 202h, and out of the downstream end 218h. The airflow is driven by the user drawing on the downstream end 218h (i.e., the mouthpiece portion) of the consumable 202h.

The upstream filter element 215h is located axially adjacent to the aerosol-forming substrate 213h, between the aerosol-forming substrate 213*h* and the terminal filter element 214*h*. Like the terminal filter 214*h*, the upstream filter element 215*h* is in the form of a hollow bore filter element, such that it has a bore 220*h* extending axially therethrough. In this way, the upstream filter 215*h* may act as an airflow restrictor. The upstream filter element 215*h* is formed of a porous (e.g., monoacetate) filter material. The bore 220*h* of the upstream filter element 215*h* has a larger diameter (3 mm) than the terminal filter element 214*h*.

The spacer 216*h* is in the form of a cardboard tube, which defines a cavity or chamber between the upstream filter element 215*h* and the terminal filter element 214*h*. The spacer 216*h* acts to allow both cooling and mixing of the vapor/aerosol from the aerosol-forming substrate 213*h*. The spacer has an external diameter of 7 mm and an axial length of 14 mm.

Although not apparent from the figure, the aerosol-forming substrate 213*h*, upstream filter 215*h* and spacer 216*h* are circumscribed by a paper wrapping layer. The terminal filter 214*h* is circumscribed by a tipping layer that also circumscribes a portion of the paper wrapping layer (so as to connect the terminal filter 214*h* to the remaining components of the consumable 202*h*). The upstream filter 215*h* and terminal filter 214*h* are circumscribed by further wrapping layers in the form of plug wraps.

Returning now to the device 201*h*, FIG. 25C illustrates a detailed view of the end of the device 201*h* that is configured to engage with the consumable 202*h*. The cap 210*h* of the device 201*h* includes an opening 221*h* to an internal cavity 222*h* (more apparent from FIG. 25C) defined by the cap 210*h*. The opening 221*h* and the cavity 222*h* are formed so as to receive at least a portion of the consumable 202*h*. During engagement of the consumable 202*h* with the device 201*h*, a portion of the consumable 202*h* is received through the opening 221*h* and into the cavity 222*h*. After engagement (see FIG. 25B), the downstream end 218*h* of the consumable 202*h* protrudes from the opening 221*h* and thus also protrudes from the device 201*h*. The opening 221*h* includes laterally disposed notches 226*h*. When a consumable 202*h* is received in the opening 221*h*, these notches 226*h* remain open and could, for example, be used for retaining a cover in order to cover the end of the device 201*h*.

Figure 25D:
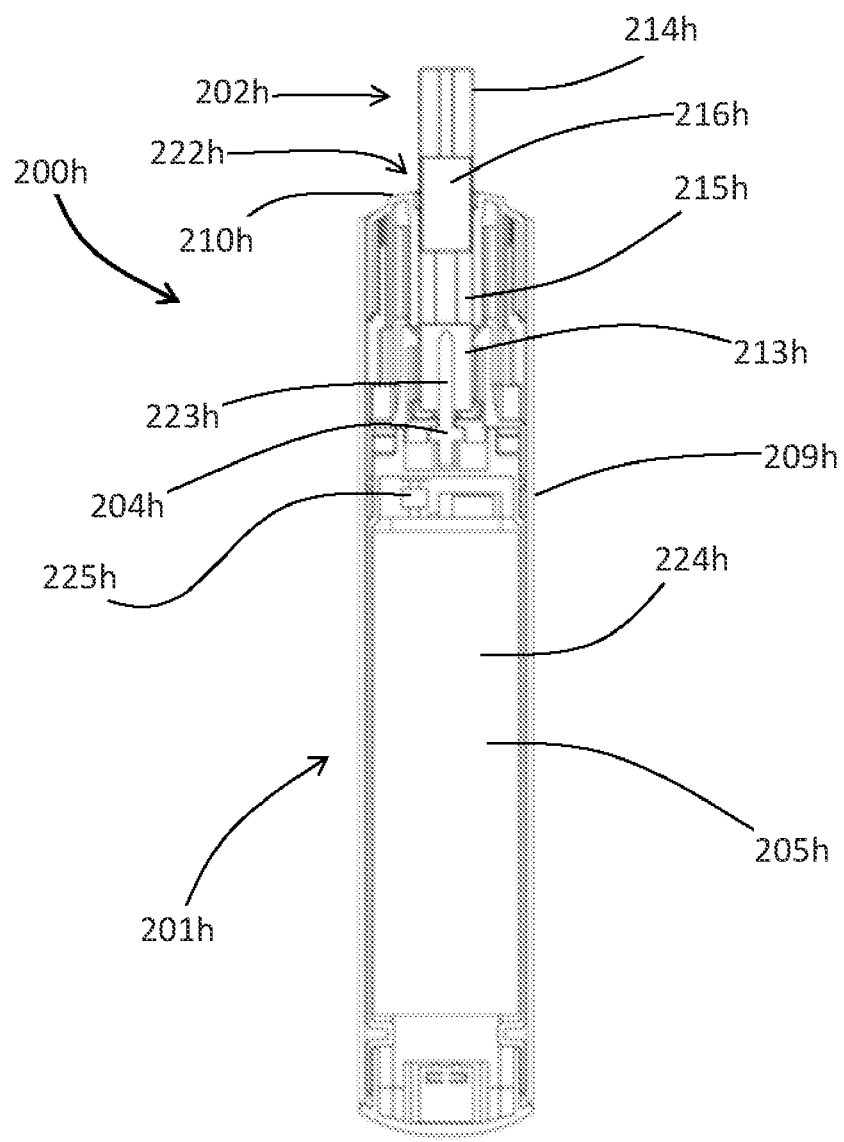
FIG. 25D is a section view of the device in accordance with an aspect of the ninth mode.

FIG. 25D shows a cross section through a central longitudinal plane through the device 201*h*. The device 201*h* is shown with the consumable 202*h* engaged therewith.

The device 201*h* comprises a heater 204*h* comprising heating element 223*h*. The heater 204*h* forms part of the body 209*h* of the device 201*h* and is rigidly mounted to the body 209*h*. In the illustrated embodiment, the heater 204*h* is a rod heater with a heating element 223*h* having a circular transverse profile. In other embodiments the heater may be in the form of a blade heater (e.g., heating element with a rectangular transverse profile) or a tube heater (e.g., heating element with a tubular form).

The heating element 223*h* of the heater 204*h* projects from an internal base of the cavity 222*h* along a longitudinal axis towards the opening 221*h*. As is apparent from the figure, the length (i.e., along the longitudinal axis) of the heating element is less than a depth of the cavity 222*h*. In this way, the heating element 223*h* does not protrude from or extend beyond the opening 221*h*.

When the consumable 202*h* is received in the cavity 222*h* (as is shown in FIG. 25E), the heating element 223*h* penetrates the aerosol-forming substrate 213*h* of the consumable 202*h*. In particular, the heating element 223*h* extends for nearly the entire axial length of the aerosol-forming substrate 213*h* when inserted therein. Thus, when the heater 204*h* is activated, heat is transferred radially from an outer circumferential surface the heating element 223*h* to the aerosol-forming substrate 213*h*.

The device 201*h* further comprises an electronics cavity 224*h*. A power source, in the form of a rechargeable battery 205*h* (a lithium-ion battery), is located in electronics cavity 224*h*.

The device 201*h* includes a connector (i.e., forming part of an IO module of the device 201*h*) in the form of a USB port 206*h*. The connector may alternatively be, for example, a micro-USB port or a USB-C port for examples. The USB port 206*h* may be used to recharge the rechargeable battery 205*h*.

The device 201*h* includes a controller 208*h* (not shown) located in the electronics cavity 224*h*. The controller comprises a microcontroller mounted on a printed circuit board (PCB). The USB port 206*h* is also connected to the controller 208*h* (i.e., connected to the PCB and microcontroller).

The controller 208*h* is configured to control at least one function of the device 202*h*. For example, the controller 208*h* is configured to control the operation of the heater 204*h*. Such control of the operation of the heater 204*h* may be accomplished by the controller toggling the electrical connection of the rechargeable battery 205*h* to the heater 204*h*. For example, the controller 208*h* is configured to control the heater 204*h* in response to a user depressing the button 212*h*. Depressing the button 212*h* may cause the controller to allow a voltage (from the rechargeable battery 205*h*) to be applied to the heater 204*h* (so as to cause the heating element 223*h* to be heated).

The controller is also configured to control the LEDs 211*h* in response to (e.g., a detected) a condition of the device 201*h* or the consumable 202*h*. For example, the controller may control the LEDs to indicate whether the device 201*h* is in an on state or an off state (e.g., one or more of the LEDs may be illuminated by the controller when the device is in an on state).

The device 201*h* comprises a further input means (i.e., in addition to the button 212*h*) in the form of a puff sensor 225*h*. The puff sensor 225*h* is configured to detect a user drawing (i.e., inhaling) at the downstream end 218*h* of the consumable 202*h*. The puff sensor 225*h* may, for example, be in the form of a pressure sensor, a flowmeter, or a microphone. The puff sensor 225*h* is operatively connected to the controller 208*h* in the electronics cavity 224*h*, such that a signal from the puff sensor 225*h*, indicative of a puff state (i.e., drawing or not drawing), forms an input to the controller 208*h* (and can thus be responded to by the controller 208*h*).

Figure 26:
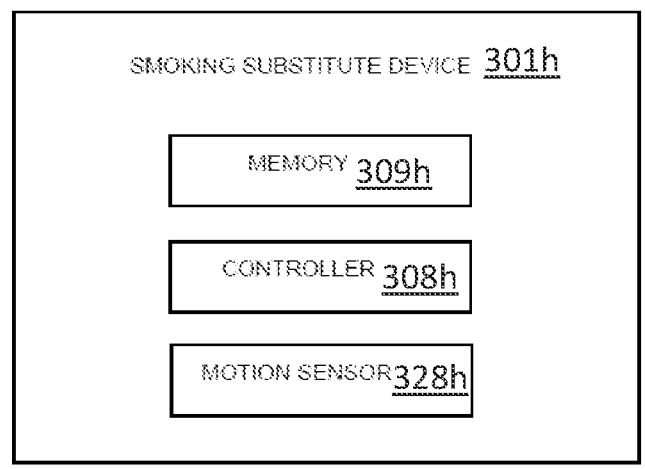
FIG. 26 illustrates a block diagram of the ninth mode of the smoking substitute device according to an embodiment.

FIG. 26 illustrates a smoking substitute device 301*h*. The device is an example of the device 101*h* of FIG. 24A and FIG. 24B and device 201*h* from FIGS. 2A to 2F. The device 301*h* includes a controller 308*h*, a memory 309*h*, and a motion sensor 328*h*.

The motion sensor 328*h* may include an accelerometer to detect movement of the device 301*h*. The accelerometer may be a micromachined microelectromechanical systems (MEMS) accelerometer. The motion sensor may detect movement in 1-, 2- or 3-dimensions. The movement detectable by the motion sensor 328*h* may include shaking, tapping on a surface, or any particular movement gestures of the device. Movement gestures may include moving the device in the air according to a particular shape ("drawing the shape in the air"). Shapes may include a circle, a cross, a tick. The motions may include a lift in an upward direction, which may correspond to a user lifting the device from a table towards his/her mouth.

The controller 308h is operatively connected to the motion sensor 328h for receiving input from motion sensor 328h whenever there is any movement. In some embodiments, the controller 308h switches the device ON or OFF (or into a standby state) device based on a movement input detected by the motion sensor.

The controller 308h is configured to activate the device upon detecting a predetermined movement pattern from the motion sensor 328h. In some embodiments, the controller 308h is configured to activate the heater upon receiving an input from the motion sensor 328h when a movement is detected.

The device 301h need not include a user input button. The input from the user can be received through movements only. The device 301h is operated based on inputs received in accordance with predetermined movement patterns.

The controller 308h is configured to allow the user to choose a mode of operation by making predetermined movements. There can be different modes the user can enable, including, but not limited to, boost mode, normal mode, standby mode, lock mode, vibration mode by activating a haptic sensor. The device 301h may switch between two or more operational modes of the device in response to inputs detected by the motion sensor. For example, the device may implement two operational modes, where each operational mode includes heating a heater to two different temperatures.

The Controller 308h is configured to display a battery status in response to a predetermined movement pattern and/or display a consumable cycle status. The Consumable cycle status can include, but not limited to, status of remaining consumable.

In some embodiments, the controller 308h can deactivates the heater if the device is not moved for a predetermined period of time. The device may put the device 301h into an off or standby mode when the device 301h is not moved for a predetermined period of time. Whenever a movement is detected by the motion sensor 328h, the device may start a timer. The value of the timer is compared to a threshold, and when the value matches of exceeds the threshold, the device may put the device into an off or standby mode. This may include reducing or cutting power to the heater. This may improve safety when the device is left unattended.

The predetermined movement pattern can be set by the user for various functioning and controlling of the device. The predetermined movement patterns will be stored in the memory 309h.

The device including a motion sensor will provide greater user interaction for user to control the functioning of the device.

The device 301h also includes an input means in the form of a puff sensor (not shown). The puff sensor is the same as that described above with respect to the embodiment shown in FIG. 24A to FIG. 24E.

Tenth Mode: A Smoking Substitute Device Having a Safety Mode (e.g., a Child Safety Mode).

Aspects and embodiments of the tenth mode of the present disclosure will now be discussed with reference to the accompanying figures. Further aspects and embodiments will be apparent to those skilled in the art. All documents mentioned in this text are incorporated herein by reference.

Figure 27A:
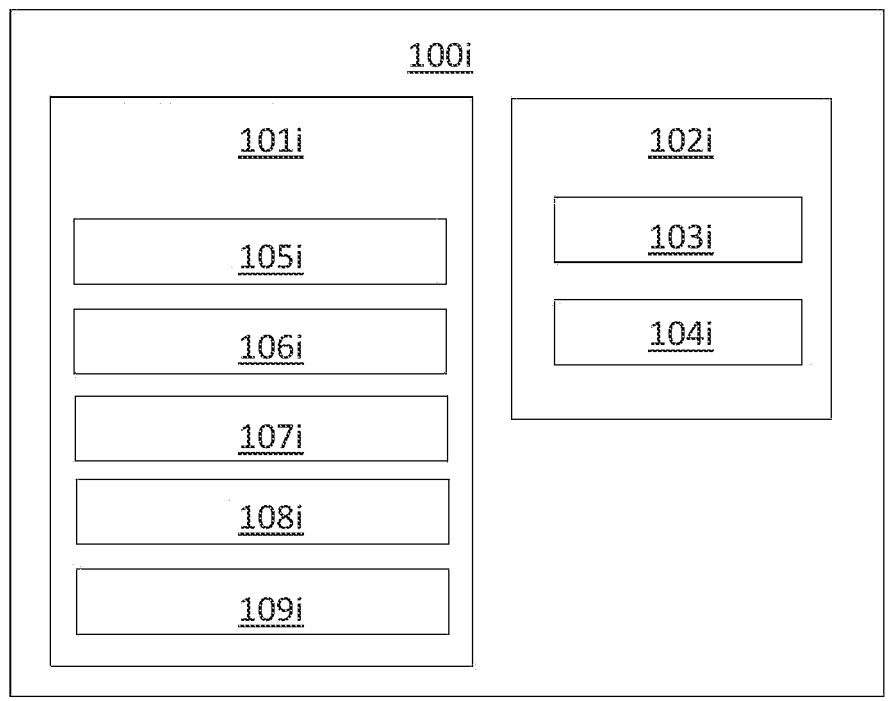
FIG. 27A is a schematic of a tenth mode of the smoking substitute system.

FIG. 27A is a schematic providing a general overview of a smoking substitute system 100i. The system 100i includes a substitute smoking device 101i and an aerosol-forming article in the form of a consumable 102i, which comprises an aerosol former 103i. The system is configured to vaporize the aerosol former by heating the aerosol former 103i (so as to form a vapor/aerosol for inhalation by a user).

In the illustrated system, the heater 104i forms part of the consumable 102i and is configured to heat the aerosol former 103i. Heat from the heater 104i vaporizes the aerosol former 103i to produce a vapor. The vapor subsequently condenses to form an aerosol, which is ultimately inhaled by the user.

The system 100i further comprises a power source 105i that forms part of the device 101i. In other embodiments the power source 105i may be external to (but connectable to) the device 101i. The power source 105i is electrically connectable to the heater 104i such that the power source 105i is able to supply power to the heater 104i (i.e., for the purpose of heating the aerosol former 103i). Thus, control of the electrical connection of the power source 105i to the heater 104i provides control of the state of the heater 104i. The power source 105i may be a power store, for example a battery or rechargeable battery (e.g., a lithium-ion battery).

The system 100i further comprises an I/O module comprising a connector 106i (e.g., in the form of a USB port, Micro USB port, USB-C port, etc.). The connector 106i is configured for connection to an external source of electrical power, e.g., a mains electrical supply outlet. The connector 106i may be used in substitution for the power source 105i. That is the connector 106i may be electrically connectable to the heater 104i so as to supply electricity to the heater 104i. In such embodiments, the device may not include a power source, and the power source of the system may instead comprise the connector 106i and an external source of electrical power (to which the connector 106i provides electrical connection).

In some embodiments, the connector 106i may be used to charge and recharge the power source 105i where the power source 104i includes a rechargeable battery.

The system 100i also comprises a user interface (UI) 107i. Although not shown, the UI 107i may include input means to receive commands from a user. The input means of the UI 107i allows the user to control at least one aspect of the operation of the system 100i. The input means may, for example, be in the form of a button, touchscreen, switch, microphone, etc.

The UI 107i also comprises output means to convey information to the user. The output means may, for example, comprise lights (e.g., LEDs), a display screen, speaker, vibration generator, etc.

The system 100i further comprises a controller 108i and a memory 109i coupled to the controller 108i. In the illustrated embodiment, the controller 108i is a component of the device 101i, but in other embodiments may be separate from (but connectable to) the device 101i. The controller 108i is configured to control at least one function of the device 101i. The memory 109i stores controller-executable instructions that causes the controller 109i to perform one or more functions. The controller 108i is configured to control the operation of the heater 104i and, for example, may be configured to control the voltage applied from the power source 105i to the heater 104i. The controller 108i may be configured to toggle the supply of power to the heater 105i between an on state, in which the full output voltage of the power source 105i is applied to the heater 104i, and an off state, in which the no voltage is applied to the heater 104i.

Although not shown, the system 100i may also comprise a voltage regulator to regulate the output voltage from the power source 105*i* to form a regulated voltage. The regulated voltage may then be applied to the heater 104*i*.

In addition to being connected to the heater 104*i*, the controller 108*i* is operatively connected to the UI 107*i*. Thus, the controller 108*i* may receive an input signal from the input means of the UI 107*i*.

Similarly, the controller 108*i* may transmit output signals to the UI 107*i*. In response, the output means of the UI 107*i* may convey information, based on the output signals, to a user.

Figure 27B:
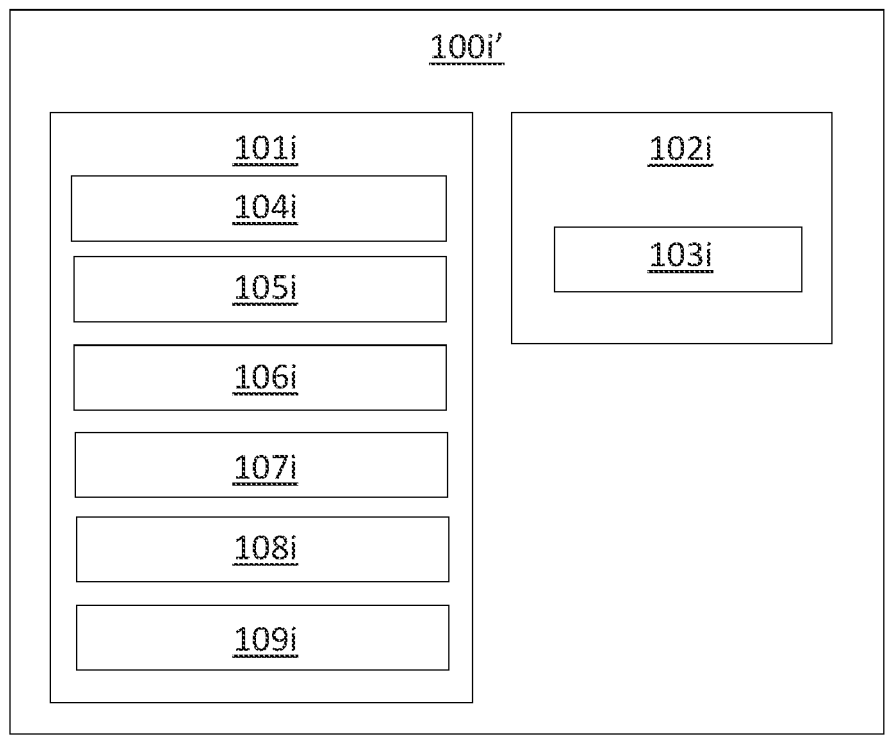
FIG. 27B is a schematic of a variation of the tenth mode of the smoking substitute system of FIG. 27A.

FIG. 27B is a schematic showing a variation of the system 100*i* of FIG. 27A. In the system 100*i'* of FIG. 27B, the heater 104*i* forms part of the device 101*i*, rather than the consumable 102*i*. In this variation, the heater 104*i* is electrically connected to the power source 105*i*.

Figure 28A:
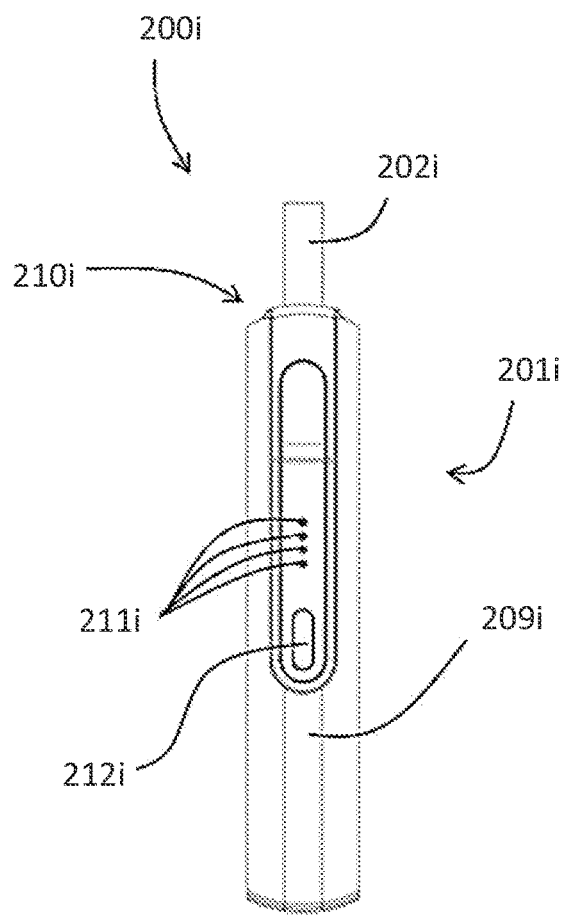
FIG. 28A is a front view of a first embodiment of the tenth mode of the smoking substitute system with the consumable engaged with the device.
Figure 28B:
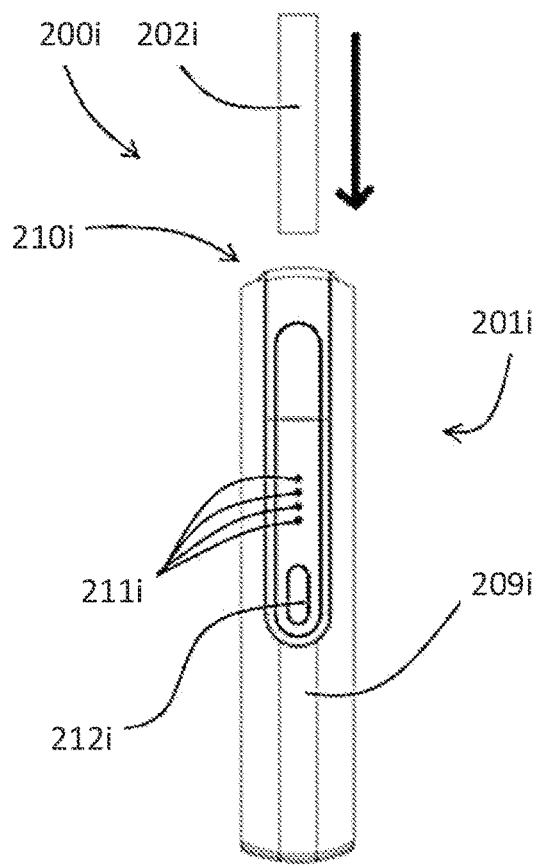
FIG. 28B is a front view of the first embodiment of the tenth mode of the smoking substitute system with the consumable disengaged from the device.

FIG. 28A and FIG. 28B illustrate a heated-tobacco (HT) smoking substitute system 200*i*. The system 200*i* is an example of the systems 100*i*, 100*i'* described in relation to FIG. 27A or FIG. 27B. System 200*i* includes an HT device 201*i* and an HT consumable 202*i*. The description of FIG. 27A and FIG. 27B above is applicable to the system 200*i* of FIG. 28A and FIG. 28B and will not be repeated.

The device 201*i* and the consumable 202*i* are configured such that the consumable 202*i* can be engaged with the device 201*i*. FIG. 28A shows the device 201*i* and the consumable 202*i* in an engaged state, whilst FIG. 28B shows the device 201*i* and the consumable 202*i* in a disengaged state.

The device 201*i* comprises a body 209*i* and cap 210*i*. In use the cap 209*i* is engaged at an end of the body 209*i*. Although not apparent from the figures, the cap 210*i* is moveable relative to the body 209*i*. In particular, the cap 210*i* is slidable and can slide along a longitudinal axis of the body 209*i*.

The device 201*i* comprises an output module (forming part of the UI of the device 201*i*) in the form of a plurality of light-emitting diodes (LEDs) 211*i* arranged linearly along the longitudinal axis of the device 201*i* and on an outer surface of the body 209*i* of the device 201*i*. A button 212*i* is also arranged on an outer surface of the body 209*i* of the device 201*i* and is axially spaced (i.e., along the longitudinal axis) from the plurality of LEDs 211*i*.

Figure 28C:
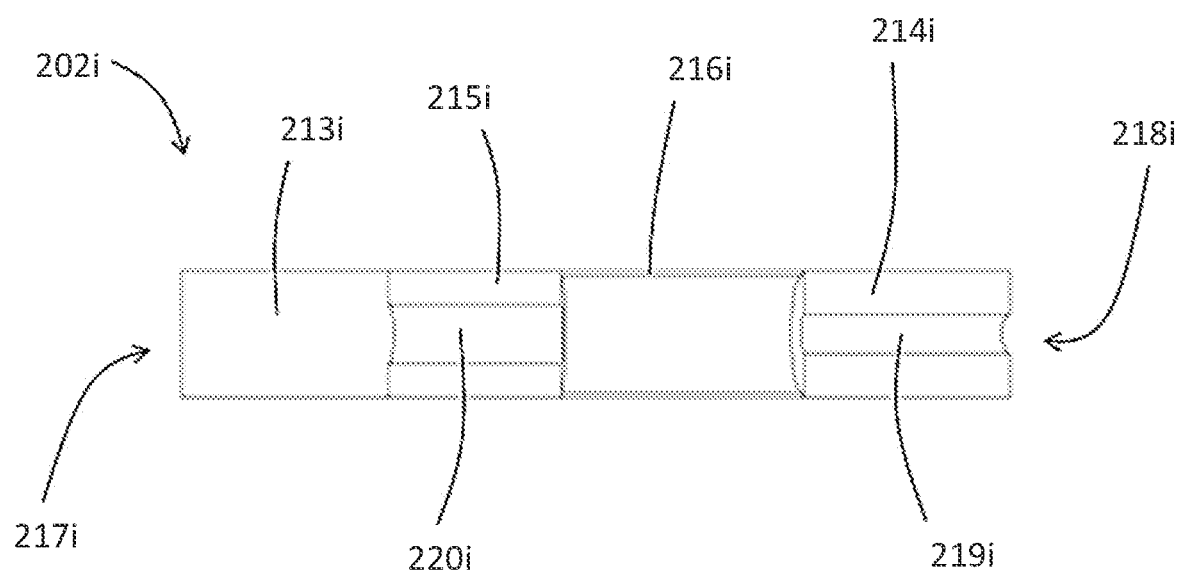
FIG. 28C is a section view of the consumable of the first embodiment of the tenth mode of the smoking substitute system.

FIG. 28C show a detailed section view of the consumable 202*i* of the system 200*i*. The consumable 202*i* generally resembles a cigarette. In that respect, the consumable 202*i* has a generally cylindrical form with a diameter of 7 mm and an axial length of 70 mm. The consumable 202*i* comprises an aerosol forming substrate 213*i*, a terminal filter element 214*i*, an upstream filter element 215*i* and a spacer element 216*i*. In other embodiments, the consumable may further comprise a cooling element. A cooling element may exchange heat with vapor that is formed by the aerosol-forming substrate 213*i* in order to cool the vapor so as to facilitate condensation of the vapor.

The aerosol-forming substrate 213*i* is substantially cylindrical and is located at an upstream end 217*i* of the consumable 202*i* and comprises the aerosol former of the system 200*i*. In that respect, the aerosol forming substrate 213*i* is configured to be heated by the device 201*i* to release a vapor. The released vapor is subsequently entrained in an airflow flowing through the aerosol-forming substrate 213*i*. The airflow is produced by the action of the user drawing on a downstream end 218*i* (i.e., terminal or mouth end) of the consumable 202*i*.

In the present embodiment, the aerosol forming substrate 213*i* comprises tobacco material that may, for example, include any suitable parts of the tobacco plant (e.g., leaves, stems, roots, bark, seeds, and flowers). The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon). For example, the aerosol-forming substrate 213*i* may comprise a gathered sheet of homogenized (e.g., paper/slurry recon) tobacco or gathered shreds/strips formed from such a sheet.

In order to generate an aerosol, the aerosol forming substrate 213*i* comprises at least one volatile compound that is intended to be vaporized/aerosolized and that may provide the user with a recreational and/or medicinal effect when inhaled. The aerosol-forming substrate 213*i* may further comprise one or more additives. For example, such additives may be in the form of humectants (e.g., propylene glycol and/or vegetable glycerin), flavorants, fillers, aqueous/non-aqueous solvents and/or binders.

The terminal filter element 214*i* is also substantially cylindrical and is located downstream of the aerosol forming substrate 213*i* at the downstream end 218*i* of the consumable 202*i*. The terminal filter element 214*i* is in the form of a hollow bore filter element having a bore 219*i* (e.g., for airflow) formed therethrough. The diameter of the bore 219*i* is 2 mm. The terminal filter element 214*i* is formed of a porous (e.g., monoacetate) filter material. As set forth above, the downstream end 218*i* of the consumable 202*i* (i.e., where the terminal filter 214*i* is located) forms a mouthpiece portion of the consumable 202*i* upon which the user draws. Airflow is drawn from the upstream end 217*i*, thorough the components of the consumable 202*i*, and out of the downstream end 218*i*. The airflow is driven by the user drawing on the downstream end 218*i* (i.e., the mouthpiece portion) of the consumable 202*i*.

The upstream filter element 215*i* is located axially adjacent to the aerosol-forming substrate 213*i*, between the aerosol-forming substrate 213*i* and the terminal filter element 214*i*. Like the terminal filter 214*i*, the upstream filter element 215*i* is in the form of a hollow bore filter element, such that it has a bore 220*i* extending axially therethrough. In this way, the upstream filter 215*i* may act as an airflow restrictor. The upstream filter element 215*i* is formed of a porous (e.g., monoacetate) filter material. The bore 220*i* of the upstream filter element 214*i* has a larger diameter (3 mm) than the terminal filter element 214*i*.

The spacer 216*i* is in the form of a cardboard tube, which defines a cavity or chamber between the upstream filter element 215*i* and the terminal filter element 214*i*. The spacer 216*i* acts to allow both cooling and mixing of the vapor/aerosol from the aerosol-forming substrate 213*i*. The spacer has an external diameter of 7 mm and an axial length of 14 mm.

Although not apparent from the figure, the aerosol-forming substrate 213*i*, upstream filter 215*i* and spacer 216*i* are circumscribed by a paper wrapping layer. The terminal filter 214*i* is circumscribed by a tipping layer that also circumscribes a portion of the paper wrapping layer (so as to connect the terminal filter 214*i* to the remaining components of the consumable 202*i*). The upstream filter 215*i* and terminal filter 214*i* are circumscribed by further wrapping layers in the form of plug wraps.

Figure 28D:
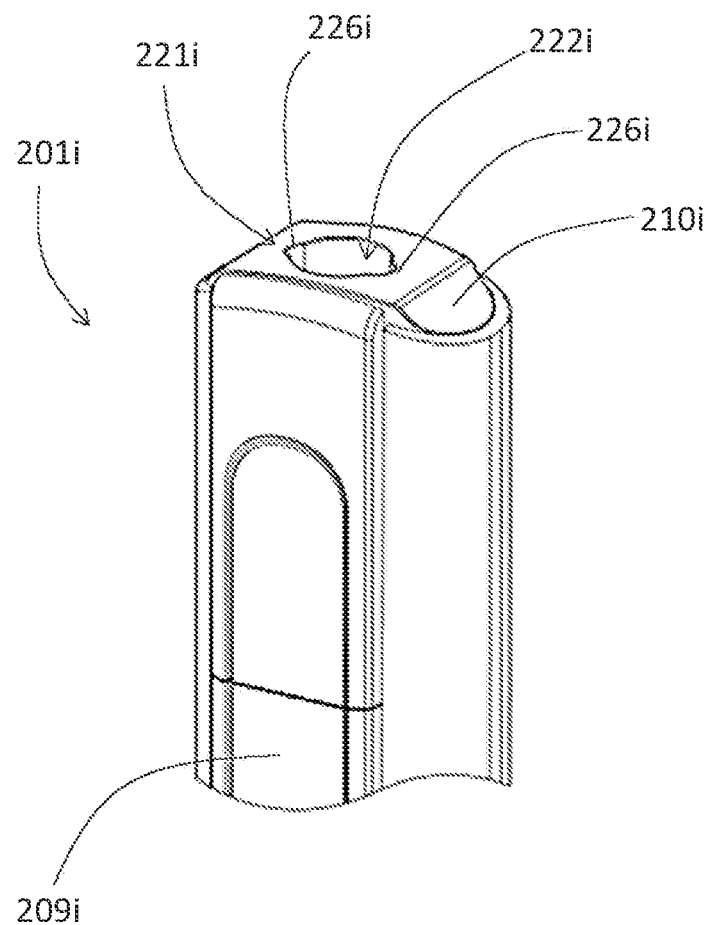
FIG. 28D is a detailed view of an end of the device of the first embodiment of the tenth mode of the smoking substitute system.

Returning now to the device 201*i*, FIG. 28D illustrates a detailed view of the end of the device 201*i* that is configured to engage with the consumable 202*i*. The cap 210*i* of the device 201*i* includes an opening 221*i* to an internal cavity 222*i* cavity 222*i* (more apparent from FIG. 28D) defined by the cap 210*i*. The opening 221*i* and the cavity 222*i* are formed so as to receive at least a portion of the consumable 202i. During engagement of the consumable 202i with the device 201i, a portion of the consumable 202i is received through the opening 221i and into the cavity 222i. After engagement (see FIG. 28B), the downstream end 218i of the consumable 202i protrudes from the opening 221i and thus protrudes also from the device 201i. The opening 221i includes laterally disposed notches 226i. When a consumable 202i is received in the opening 221i, these notches 226i remain open and could, for example, be used for retaining a cover to cover the end of the device 201i.

Figure 28E:
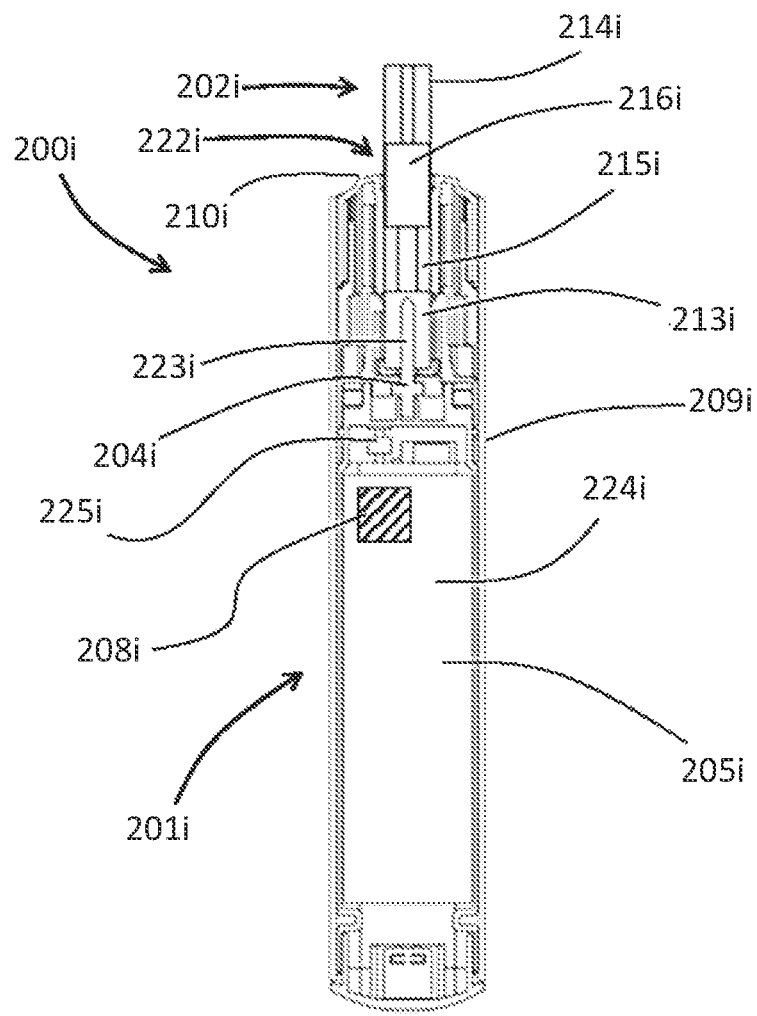
FIG. 28E is a section view of the first embodiment of the tenth mode of the smoking substitute system.

FIG. 28E shows a cross section through a central longitudinal plane through the device 201i. The device 201i is shown with the consumable 202i engaged therewith.

The device 201i comprises a heater 204i comprising heating element 223i. The heater 204i forms part of the body 209i of the device 201i and is rigidly mounted to the body 209i. In the illustrated embodiment, the heater 204i is a rod heater with a heating element 223i having a circular transverse profile. In other embodiments the heater may be in the form of a blade heater (e.g., heating element with a rectangular transverse profile) or a tube heater (e.g., heating element with a tubular form).

The heating element 223i of the heater 204i projects from an internal base of the cavity 222i along a longitudinal axis towards the opening 221i. As is apparent from the figure, the length (i.e., along the longitudinal axis) of the heating element is less than a depth of the cavity 222i. In this way, the heating element 223i does not protrude from or extend beyond the opening 221i.

When the consumable 202i is received in the cavity 222i (as is shown in FIG. 28D), the heating element 223i penetrates the aerosol-forming substrate 213i of the consumable 202i. In particular, the heating element 223i extends for nearly the entire axial length of the aerosol-forming substrate 213i when inserted therein. Thus, when the heater 204i is activated, heat is transferred radially from an outer circumferential surface the heating element 223i to the aerosol-forming substrate 213i.

The device 202i further comprises an electronics cavity 224i. A power source, in the form of a rechargeable battery 205i (a lithium-ion battery), is located in electronics cavity 224i.

The device 202i includes a connector (i.e., forming part of an IO module of the device 201i) in the form of a USB port 206i. The connector may alternatively be, for example, a micro-USB port or a USB-C port for examples. The USB port 206i may be used to recharge the rechargeable battery 205i.

The device 202i includes a controller 208i located in the electronics cavity 224i. The controller comprises a microcontroller mounted on a printed circuit board (PCB). The USB port 206i is also connected to the controller 208i (i.e., connected to the PCB and microcontroller).

As will be described in more detail below, the controller 208i is configured (among other functions) to enter a safety mode in response to a command. In the illustrated embodiment, this command is in the form of a series of presses (e.g., five successive presses) of the button 212i. When the controller 208i enters safety mode, the LEDs 111i flash to indicate that safety mode has been entered. In safety mode, the controller 208i disables the heater 204i of the device 201i, such that subsequent button presses (which would normally activate the heater 204i) do not activate the heater 204i. Instead, these subsequent button presses cause the controller 208i to control a vibration mechanism (not shown) of the device 201i to vibrate so as to provide haptic feedback to a user holding the device 201i. The controller 208i is further configured to leave safety mode when it receives a leave command in the form of a further series of button presses. Upon leaving safety mode, the controller enables the heater 204i, such that a further button press activates the heater 204i.

The controller 208i is also configured to enter safety mode when the cap 210i of the device 209i is slid from a closed position to an open position. Although not apparent from the figures, other operating conditions may also cause the controller 208i to enter safety mode, such as ambient temperature exceeding threshold temperature, overheating of the battery 205i or the heating element 223i, or non-usage of the device 201i for a predefined time period.

The controller 208i is configured to control further functions of the device 202i. For example, the controller 208i is configured to control the operation of the heater 204i. Such control of the operation of the heater 204i may be accomplished by the controller toggling the electrical connection of the rechargeable battery 205i to the heater 204i. For example, the controller 208i is configured to control the heater 204i in response to first user input received via the UI of the device 201i. The first user input may be for example, includes one of predetermined sequence of presses of the button 212i and combination of long and short button press sequence. The controller 208i receives the first user input and determines the validity of the first user input based on comparison of the first user input with a predetermined locking key. The controller 208i enables the user to previously set the predetermined locking key via the UI of the device 201i.

The device 202i comprises a further input means (i.e., in addition to the button 212i) in the form of a puff sensor 225i. The puff sensor 225i is configured to detect a user drawing (i.e., inhaling) at the downstream end 218i of the consumable 202i. The puff sensor 225i may, for example, be in the form of a pressure sensor, a flowmeter, or a microphone. The puff sensor 225i is operatively connected to the controller 208i in the electronics cavity 224i, such that a signal from the puff sensor 225i, indicative of a puff state (i.e., drawing or not drawing), forms an input to the controller 208i (and can thus be responded to by the controller 208i).

Figure 29:
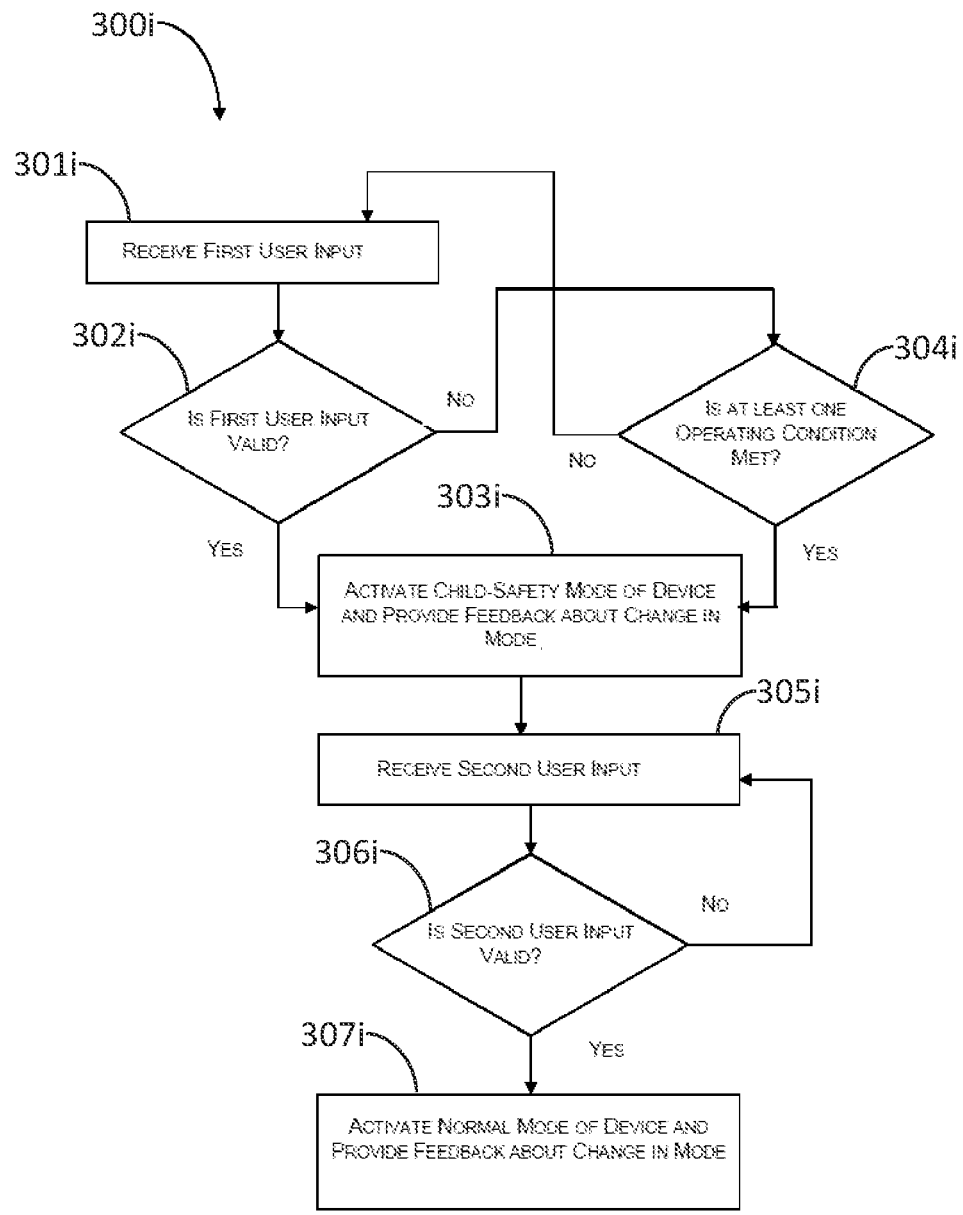
FIG. 29 is a flowchart illustrating method of operating a device in a safety mode in accordance with an aspect of the tenth mode.

FIG. 29 illustrates a flowchart providing an exemplary method of operating a device (such as a device similar to those described above and below) in child-safety mode when configured.

As illustrated in FIG. 29, the method 300i includes one or more blocks implemented by a controller of a device. The method 300i may be described in the general context of controller executable instructions. Generally, controller executable instructions can include routines, programs, objects, components, data structures, procedures, modules, and functions, which perform particular functions or implement particular abstract data types.

The order in which the method 300i is described is not intended to be construed as a limitation, and any number of the described method blocks can be combined in any order to implement the method 300i. Additionally, individual blocks may be deleted from the method 300i without departing from the scope of the subject matter described herein. Furthermore, the method 300i can be implemented in any suitable hardware, software, firmware, or combination thereof.

At block 301i, the controller receives the first user input via a UI of the device. The first user input includes one of predetermined sequence of presses of at least one button and combination of long and short button press sequence.

At block 302*i*, the controller validates the first user input. The controller validates the first user input by comparing the first user input with a predetermined sequence of presses for entering a safety mode. If the controller determines the first user input to be a command for entering safety mode (in this case a child safety mode), then the method proceeds to block 303*i* along the "YES" path. Otherwise, the method proceeds to block 304*i* along the "NO" path.

At block 303*i*, the controller activates the safety mode of the device and provides feedback indicative of the change in mode. The controller configures the device to enter into the safety mode. For example, the controller may disable the heater or a display of the device. The feedback may be a haptic feedback. In another example, the feedback may be an audio feedback output from a speaker of the device.

At block 304*i*, the controller determines whether at least one operating condition of the device is present. For example, the one or more operating conditions may include the cap being open, ambient temperature exceeding threshold temperature, overheating of battery or heating element, or non-usage of the device for a predefined time period. If the controller 208*i* determines that at least one of the operating conditions is present, then the method proceeds to block 303*i* along the "YES" path where the controller activates the safety mode of the device. Alternatively, if the controller determines that none of the operating conditions of the device are met, then the method proceeds to block 301*i* to receive the first user input, or where the input is, e.g., for control of the device, the controller may control the device accordingly.

At block 305*i*, the controller receives a second user input whilst the device 201*i* is operating in safety mode. This second input may cause the controller to leave the safety mode. The second user input may for example include an inhale pattern measured by a puff sensor of the device.

At block 306*i*, the controller 208*i* determines the validity of the second user input. The controller compares the second user input with a predetermined unlocking pattern (e.g., pattern of button presses) to determine the validity of the second user input. If the controller determines that the second user input is valid, then the method proceeds to block 307*i* along the "YES" path; otherwise, the method proceeds to block 305*i* to receive the second user input along the "NO" path.

At block 307*i*, the controller leaves safety mode and provides feedback regarding this change in mode. In this respect, the controller enables the previously disabled functions of the device. The controller also generates haptic feedback such as one or more vibrations to indicate to the user that the device has left the safety mode.

FIG. 30A and FIG. 30B illustrate an e-cigarette smoking substitute system 400*i*. The system 400*i* is an example of the systems 100*i*, 100*i'* of FIG. 27A and FIG. 27B and comprises an e-cigarette device 401*i* and an e-cigarette consumable 402*i*. The description of FIG. 27A and FIG. 27B above is applicable to the system of FIG. 30A and FIG. 30B and will not be repeated. It should be appreciated that this system 400*i* may be controlled in the same manner as the system described above with respect to FIG. 28A to FIG. 28E. That is, the system 400*i* may comprise a controller configured to enter a safety mode upon receipt of a command as is described above.

The device 401*i* and the consumable 402*i* are configured such that the consumable 402*i* can be engaged with the device 401*i*. FIG. 30A shows the device 401*i* and the consumable 402*i* in an engaged state, whilst FIG. 30B shows the device 401*i* and the consumable 402*i* in a disengaged state. During engagement a portion of the consumable 402*i* is received in a cavity 422*i* of the device 401*i*. The consumable 402*i* is retained in the device 401*i* via an interference fit (although in other embodiments, the device and consumable could be engaged by screwing one onto (or onto) the other, through a bayonet fitting, or by way of a snap engagement mechanism).

The consumable 402*i* includes a tank 427*i*. The tank 427*i* defines a reservoir for the storage of an aerosol-former, which in this embodiment, is in the form of e-liquid.

In this present embodiment, the consumable 402*i* is a "single-use" consumable. That is, upon exhausting the e-liquid in the tank 427*i*, the intention is that the user disposes of the whole consumable 402*i*. In other embodiments, the e-liquid (i.e., aerosol former) may be the only part of the system that is truly "single-use". In such embodiments, the tank may be refillable with e-liquid, or the e-liquid may be stored in a non-consumable component of the system. For example, the e-liquid may be stored in a tank located in the device or stored in another component that is itself not single-use (e.g., a refillable cartomizer).

In the illustrated system 400*i*, a heater 404*i* is located in the consumable 402*i* and is configured to heat and vaporize the e-liquid (stored in the tank 427*i*). Although not shown, the heater 404*i* comprises a porous wick and a resistive heating element. The porous wick conveys e-liquid from the tank 427*i* to the heating element. The heating element is a heating filament that is helically wound around a portion of the porous wick, such that when the heating element is heated (e.g., by the action of electrical current passing through the heating element), heat is transferred from the heating element to the e-liquid conveyed by the wick. This transfer of heat vaporizes the e-liquid, and the resultant vapor is entrained in an airflow passing through the consumable 402*i* (i.e., driven by a user drawing on a downstream end 418*i* of the consumable 402*i*). Between the vaporization point at the coil and the downstream end 418*i* (i.e., the mouth end), the vapor condenses into an aerosol, and is subsequently inhaled by the user.

Like the previously described embodiment, the device 401*i* comprises a power source in the form of a rechargeable battery (not shown) and a connector in the form of a USB port (not shown). The device 401*i* further comprises controller (also not shown). The rechargeable battery, connector and controller are similar (and operate in a similar manner) to the corresponding components of the embodiment described above with respect to FIG. 28A to FIG. 28E.

The consumable 402*i* includes a pair of heater electrical contacts 428*i* disposed on a device-facing end surface of the consumable 402*i*. The heater electrical contacts 428*i* are electrically connected to the heater 404*i* in the consumable 402*i*, such that a voltage applied across the heater electrical contacts 428*i* generally corresponds to a voltage applied across the resistive heating element of the heater 404*i*.

When the consumable 402*i* is engaged with the device 401*i*, the heater electrical contacts 428*i* are brought into electrical contact with corresponding device electrical contacts (not shown) on the device 401*i*. The device electrical contacts are electrically connected (directly or indirectly) to the rechargeable battery. The controller may thus be configured to control the voltage applied across the device electrical contacts from the rechargeable battery. By controlling the voltage applied across the device electrical contacts, the voltage applied to the heater 404*i* is correspondingly controlled.

The device 401*i* includes an output means (forming part of the UI of the system 300*i*) in the form of a single light-emitting diode ("LED") 411i. The LED 411i is operatively connected to the controller, such that controller can control the illumination of the LED 411i. The controller is configured to illuminate the LED when then the heater 404i is active.

The device 401i also includes an input means in the form of a puff sensor (not shown). The puff sensor is the same as that described above with respect to the embodiment shown in FIG. 28A to FIG. 28E.

Eleventh Mode: A Heated Tobacco Device Switching ON and OFF Based on Different User Inputs.

Aspects and embodiments of the eleventh mode of the present disclosure will now be discussed with reference to the accompanying figures. Further aspects and embodiments will be apparent to those skilled in the art. All documents mentioned in this text are incorporated herein by reference.

Figure 31A:
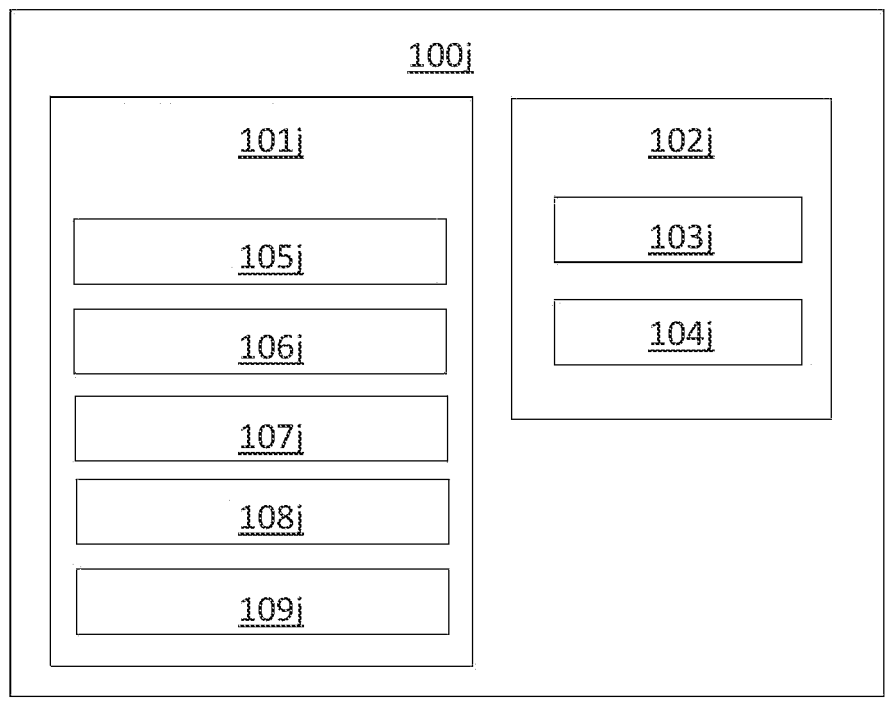
FIG. 31A is a schematic of an eleventh mode of the smoking substitute system.

FIG. 31A is a schematic providing a general overview of a smoking substitute system 100j. The system 100j includes a substitute smoking device 101j and an aerosol-forming article in the form of a consumable 102j, which comprises an aerosol former 103j. The system is configured to vaporize the aerosol former by heating the aerosol former 103j (so as to form a vapor/aerosol for inhalation by a user).

In the illustrated system, the heater 104j forms part of the consumable 102j and is configured to heat the aerosol former 103j. In this variation, the heater 104j is electrically connectable to the power source 105j, for example, when the consumable 102j is engaged with the device 101j. Heat from the heater 104j vaporizes the aerosol former 103j to produce a vapor. The vapor subsequently condenses to form an aerosol, which is ultimately inhaled by the user.

The system 100j further comprises a power source 105j that forms part of the device 101j. In other embodiments the power source 105j may be external to (but connectable to) the device 101j. The power source 105j is electrically connectable to the heater 104j such that it is able to supply power to the heater 104j (i.e., for the purpose of heating the aerosol former 103j). Thus, control of the electrical connection of the power source 105j to the heater 104j provides control of the state of the heater 104j. The power source 105j may be a power store, for example a battery or rechargeable battery (e.g., a lithium-ion battery).

The system 100j further comprises an I/O module comprising a connector 106j (e.g., in the form of a USB port, Micro USB port, USB-C port, etc.). The connector 106j is configured for connection to an external source of electrical power, e.g., a mains electrical supply outlet. The connector 106j may be used in substitution for the power source 105j. That is the connector 106j may be electrically connectable to the heater 104j so as to supply electricity to the heater 104j. In such embodiments, the device may not include a power source, and the power source of the system may instead comprise the connector 106j and an external source of electrical power (to which the connector 106j provides electrical connection).

In some embodiments, the connector 106j may be used to charge and recharge the power source 105j where the power source 105j includes a rechargeable battery.

The system 100j also comprises a user interface (UI) 107j. Although not shown, the UI 107j may include input means to receive commands from a user. The input means of the UI 107j allows the user to control at least one aspect of the operation of the system 100j. The input means may, for example, be in the form of a button, touch button, touch-screen, switch, microphone, etc.

The UI 107j also comprises output means to convey information to the user. The output means may, for example, comprise lights (e.g., LEDs), a display screen, speaker, vibration generator, etc.

The system 100j further comprises a controller 108j that is configured to control at least one function of the device 101j. In the illustrated embodiment, the controller 108j is a component of the device 101j, but in other embodiments may be separate from (but connectable to) the device 101j. The controller 108j is configured to control the operation of the heater 104j and, for example, may be configured to control the voltage applied from the power source 105j to the heater 104j. The controller 108j may be configured to toggle the supply of power to the heater 104j between an on state, in which the full output voltage of the power source 105j is applied to the heater 104j, and an off state, in which the no voltage is applied to the heater 104j.

Although not shown, the system 100j may also comprise a voltage regulator to regulate the output voltage from the power source 105j to form a regulated voltage. The regulated voltage may then be applied to the heater 104j.

In addition to being connected to the heater 104j, the controller 108j is operatively connected to the UI 107j. Thus, the controller 108j may receive an input signal from the input means of the UI 107j. Based on the input signal, controller 108j may either switch ON or OFF the device. The input for switching the device ON is different from the input for switch the device off. This may increase the safety of operation of the device.

The input signal for ON or OFF can include pressing the button or switch or touch button (examples of touch sensitive input means—"touch input means"). The pressing may include one of a short press, long press, multiple short press, multiple long press, and combination of short and long presses.

The input sequence for switching the device into the ON state includes more than one button press. In some embodiments, the input sequence for switching the device into the ON state includes at least one short press and at least one long press.

The input sequence for switch the device into an OFF state (or standby state) includes a single long press. The long press may be at least 2 seconds long; optionally at least 3 seconds long, optionally at least 4 seconds long.

Having a multiple press sequence for switching the device ON mitigates against inadvertent pressing (e.g., in the user's pocket). The single long press for switching the device OFF is an intuitive way to turn off the device when the user needs to switch off the device quickly.

The input signal can also be generated by means of a touch screen. The touch screen may comprise several unique pattern matching inputs such as numbers, colors, identifiers/nodes, alphabets, or any combination thereof.

Further, the input signal can also be generated by means of a microphone.

In certain embodiments, the pattern/command for enabling switching the device ON and OFF are set differently. This can be done anytime by a user or at the time of manufacture. Further, the user may be able to set and change the user input commands.

Similarly, the controller 108j may transmit output signals to the UI 107j. In response, the output means of the UI 107j may convey information, based on the output signals, to a user. The controller also comprises a memory 109j, which is a non-volatile memory. The memory 109j includes instructions, which, when implemented, cause the controller to perform certain tasks or steps of a method. The memory 109*j* stores different patterns/commands set by a user for switching the device ON and OFF.

Figure 31B:
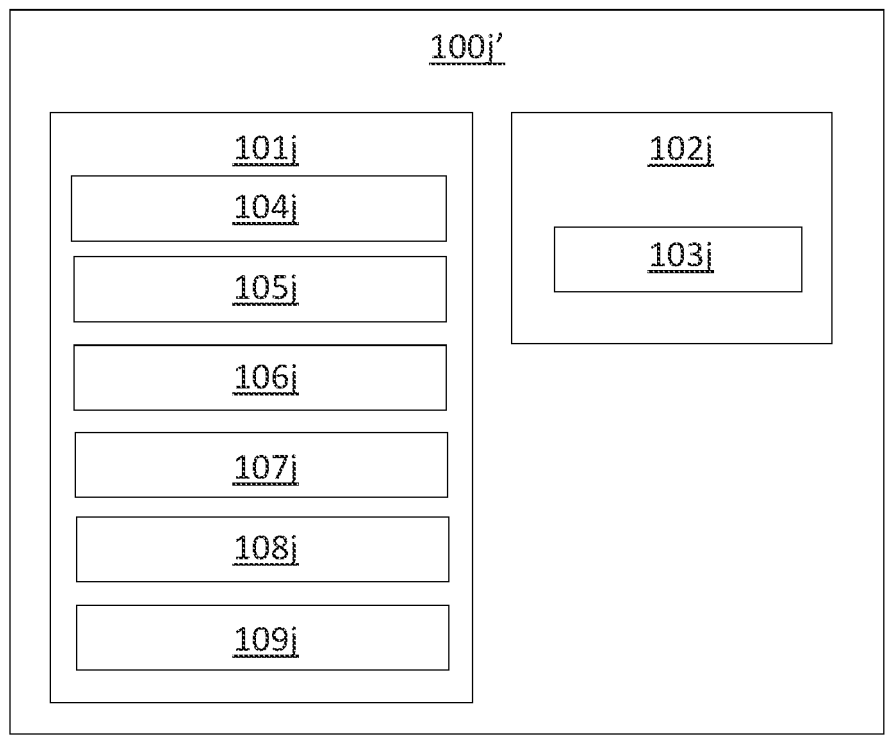
FIG. 31B is a schematic of a variation of the eleventh mode of the smoking substitute system of FIG. 31A.

FIG. 31B is a schematic showing a variation of the system 100*j* of FIG. 31A. In the system 100*j'* of FIG. 31B, the heater 104*j* forms part of the device 101*j*, rather than the consumable 102*j*. In this variation, the heater 104*j* is electrically connected to the power source 105*j*.

Figure 32A:
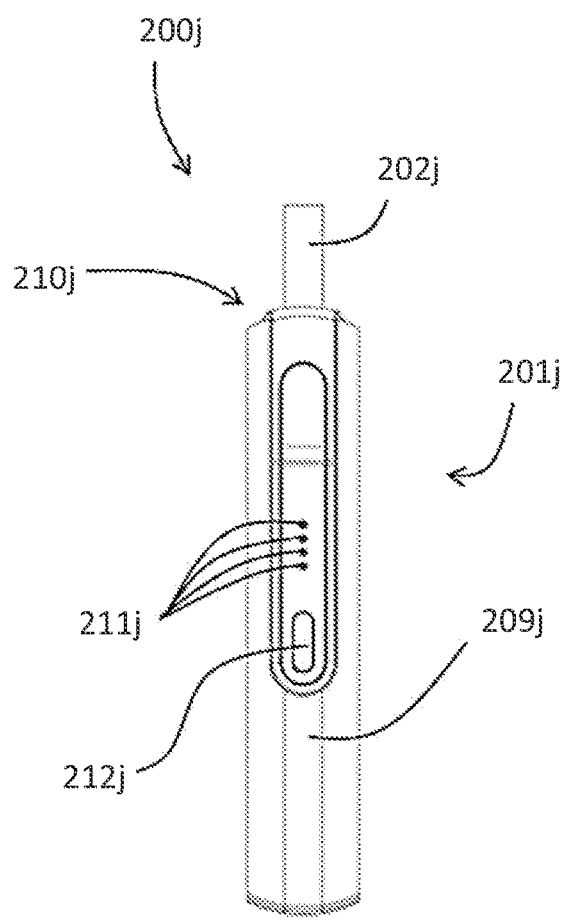
FIG. 32A is a front view of a first embodiment of the eleventh mode of the smoking substitute system with the consumable engaged with the device.
Figure 32B:
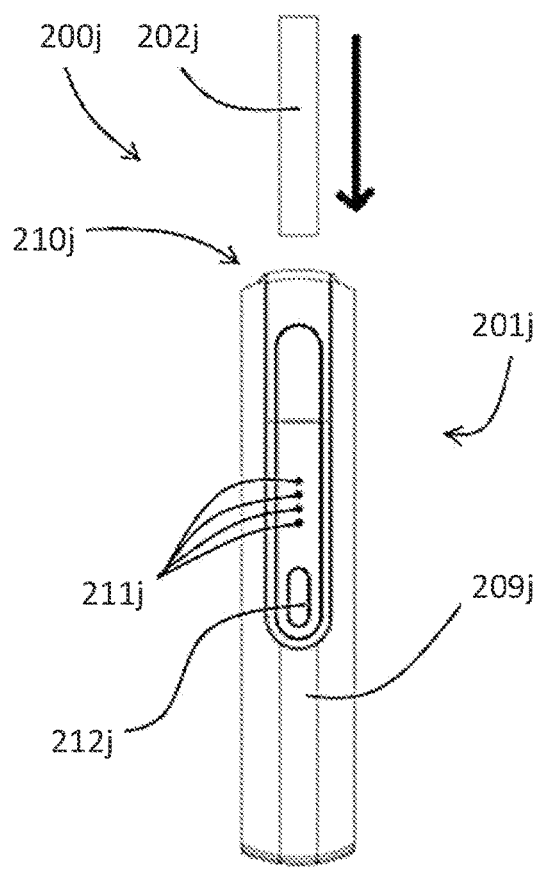
FIG. 32B is a front view of the first embodiment of the eleventh mode of the smoking substitute system with the consumable disengaged from the device.

FIG. 32A and FIG. 32B illustrate a heated-tobacco (HT) smoking substitute system 200*j*. The system 200*j* is an example of the systems 100*j*, 100*j'* described in relation to FIG. 31A or FIG. 31B. System 200*j* includes an HT device 201*j* and an HT consumable 202*j*. The description of FIG. 31A and FIG. 31B above is applicable to the system 200*j* of FIG. 32A and FIG. 32B and will not be repeated.

The device 201*j* and the consumable 202*j* are configured such that the consumable 202*j* can be engaged with the device 201*j*. FIG. 32A shows the device 201*j* and the consumable 202*j* in an engaged state, whilst FIG. 32B shows the device 201*j* and the consumable 202*j* in a disengaged state.

The device 201*j* comprises a body 209*j* and cap 210*j*. In use the cap 210*j* is engaged at an end of the body 209*j*. Although not apparent from the figures, the cap 210*j* is moveable relative to the body 209*j*. In particular, the cap 210*j* is slidable and can slide along a longitudinal axis of the body 209*j*.

The device 201*j* comprises an output means (forming part of the UI of the device 201*j*) in the form of a plurality of light-emitting diodes (LEDs) 211*j* arranged linearly along the longitudinal axis of the device 201*j* and on an outer surface of the body 209*j* of the device 201*j*. A button 212*j* is also arranged on an outer surface of the body 209*j* of the device 201*j* and is axially spaced (i.e., along the longitudinal axis) from the plurality of LEDs 211*j*.

Figure 32C:
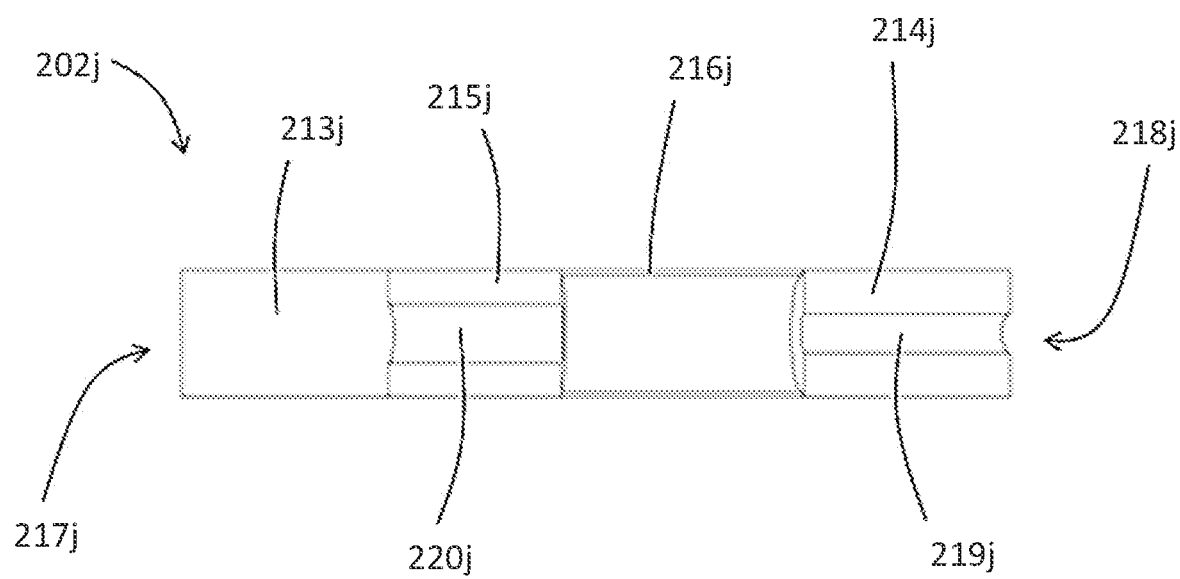
FIG. 32C is a section view of the consumable of the first embodiment of the eleventh mode of the smoking substitute system.

FIG. 32C show a detailed section view of the consumable 202*j* of the system 200*j*. The consumable 202*j* generally resembles a cigarette. In that respect, the consumable 202*j* has a generally cylindrical form with a diameter of 7 mm and an axial length of 70 mm. The consumable 202*j* comprises an aerosol forming substrate 213*j*, a terminal filter element 214*j*, an upstream filter element 215*j* and a spacer element 216*j*. In other embodiments, the consumable may further comprise a cooling element. A cooling element may exchange heat with vapor that is formed by the aerosol-forming substrate 213*j* in order to cool the vapor so as to facilitate condensation of the vapor.

The aerosol-forming substrate 213*j* is substantially cylindrical and is located at an upstream end 217*j* of the consumable 202*j* and comprises the aerosol former of the system 200*j*. In that respect, the aerosol forming substrate 213*j* is configured to be heated by the device 201*j* to release a vapor. The released vapor is subsequently entrained in an airflow flowing through the aerosol-forming substrate 213*j*. The airflow is produced by the action of the user drawing on a downstream end 218*j* (i.e., terminal or mouth) end of the consumable 202*j*.

In the present embodiment, the aerosol forming substrate 213*j* comprises tobacco material that may, for example, include any suitable parts of the tobacco plant (e.g., leaves, stems, roots, bark, seeds, and flowers). The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon). For example, the aerosol-forming substrate 213*j* may comprise a gathered sheet of homogenized (e.g., paper/slurry recon) tobacco or gathered shreds/strips formed from such a sheet.

In order to generate an aerosol, the aerosol forming substrate 213*j* comprises at least one volatile compound that is intended to be vaporized/aerosolized and that may provide the user with a recreational and/or medicinal effect when inhaled. The aerosol-forming substrate 213*j* may further comprise one or more additives. For example, such additives may be in the form of humectants (e.g., propylene glycol and/or vegetable glycerin), flavorants, fillers, aqueous/non-aqueous solvents and/or binders.

The terminal filter element 214*j* is also substantially cylindrical and is located downstream of the aerosol forming substrate 213*j* at the downstream end 218*j* of the consumable 202*j*. The terminal filter element 214*j* is in the form of a hollow bore filter element having a bore 219*j* (e.g., for airflow) formed therethrough. The diameter of the bore 219*j* is 2 mm. The terminal filter element 214*j* is formed of a porous (e.g., monoacetate) filter material. As set forth above, the downstream end 218*j* of the consumable 202*j* (i.e., where the terminal filter 214*j* is located) forms a mouthpiece portion of the consumable 202*j* upon which the user draws. Airflow is drawn from the upstream end 217*j*, thorough the components of the consumable 202*j*, and out of the downstream end 218*j*. The airflow is driven by the user drawing on the downstream end 218*j* (i.e., the mouthpiece portion) of the consumable 202*j*.

The upstream filter element 215*j* is located axially adjacent to the aerosol-forming substrate 213*j*, between the aerosol-forming substrate 213*j* and the terminal filter element 214*j*. Like the terminal filter 214*j*, the upstream filter element 215*j* is in the form of a hollow bore filter element, such that it has a bore 220*j* extending axially therethrough. In this way, the upstream filter 215*j* may act as an airflow restrictor. The upstream filter element 215*j* is formed of a porous (e.g., monoacetate) filter material. The bore 220*j* of the upstream filter element 215*j* has a larger diameter (3 mm) than the terminal filter element 214*j*.

The spacer 216*j* is in the form of a cardboard tube, which defines a cavity or chamber between the upstream filter element 215*j* and the terminal filter element 214*j*. The spacer 216*j* acts to allow both cooling and mixing of the vapor/aerosol from the aerosol-forming substrate 213*j*. The spacer has an external diameter of 7 mm and an axial length of 14 mm.

Although not apparent from the figure, the aerosol-forming substrate 213*j*, upstream filter 215*j* and spacer 216*j* are circumscribed by a paper wrapping layer. The terminal filter 214*j* is circumscribed by a tipping layer that also circumscribes a portion of the paper wrapping layer (so as to connect the terminal filter 214*j* to the remaining components of the consumable 202*j*). The upstream filter 215*j* and terminal filter 214*j* are circumscribed by further wrapping layers in the form of plug wraps.

Returning now to the device 201*j*, FIG. 32C illustrates a detailed view of the end of the device 201*j* that is configured to engage with the consumable 202*j*. The cap 210*j* of the device 201*j* includes an opening 221*j* to an internal cavity 222*j* (more apparent from FIG. 32C) defined by the cap 210*j*. The opening 221*j* and the cavity 222*j* are formed so as to receive at least a portion of the consumable 202*j*. During engagement of the consumable 202*j* with the device 201*j*, a portion of the consumable 202*j* is received through the opening 221*j* and into the cavity 222*j*. After engagement (see FIG. 32B), the downstream end 218*j* of the consumable 202*j* protrudes from the opening 221*j* and thus also protrudes from the device 201*j*. The opening 221*j* includes laterally disposed notches 226*j*. When a consumable 202*j* is received in the opening 221*j*, these notches 226*j* remain open and could, for example, be used for retaining a cover in order to cover the end of the device 201*j*.

Figure 32D:
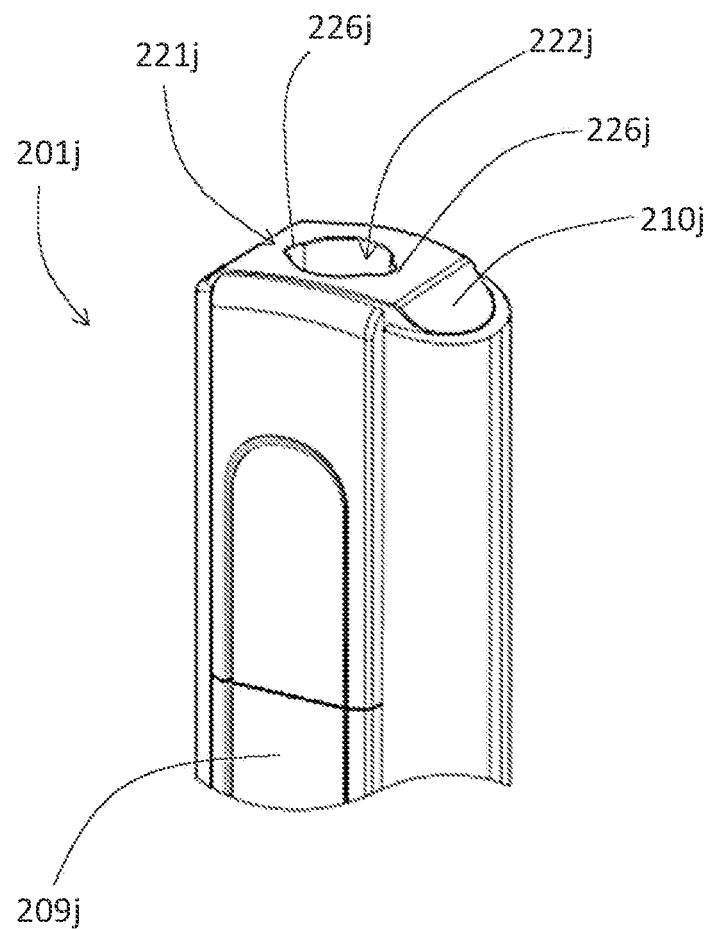
FIG. 32D is a detailed view of an end of the device of the first embodiment of the eleventh mode of the smoking substitute system.

FIG. 32D shows a cross section through a central longitudinal plane through the device 201*j*. The device 201*j* is shown with the consumable 202*j* engaged therewith.

The device 201*j* comprises a heater 204*j* comprising heating element 223*j*. The heater 204*j* forms part of the body 209*j* of the device 201*j* and is rigidly mounted to the body 209*j*. In the illustrated embodiment, the heater 204*j* is a rod heater with a heating element 223*j* having a circular transverse profile. In other embodiments the heater may be in the form of a blade heater (e.g., heating element with a rectangular transverse profile) or a tube heater (e.g., heating element with a tubular form).

The heating element 223*j* of the heater 204*j* projects from an internal base of the cavity 222*j* along a longitudinal axis towards the opening 221*j*. As is apparent from the figure, the length (i.e., along the longitudinal axis) of the heating element is less than a depth of the cavity 222*j*. In this way, the heating element 223*j* does not protrude from or extend beyond the opening 221*j*.

Figure 32E:
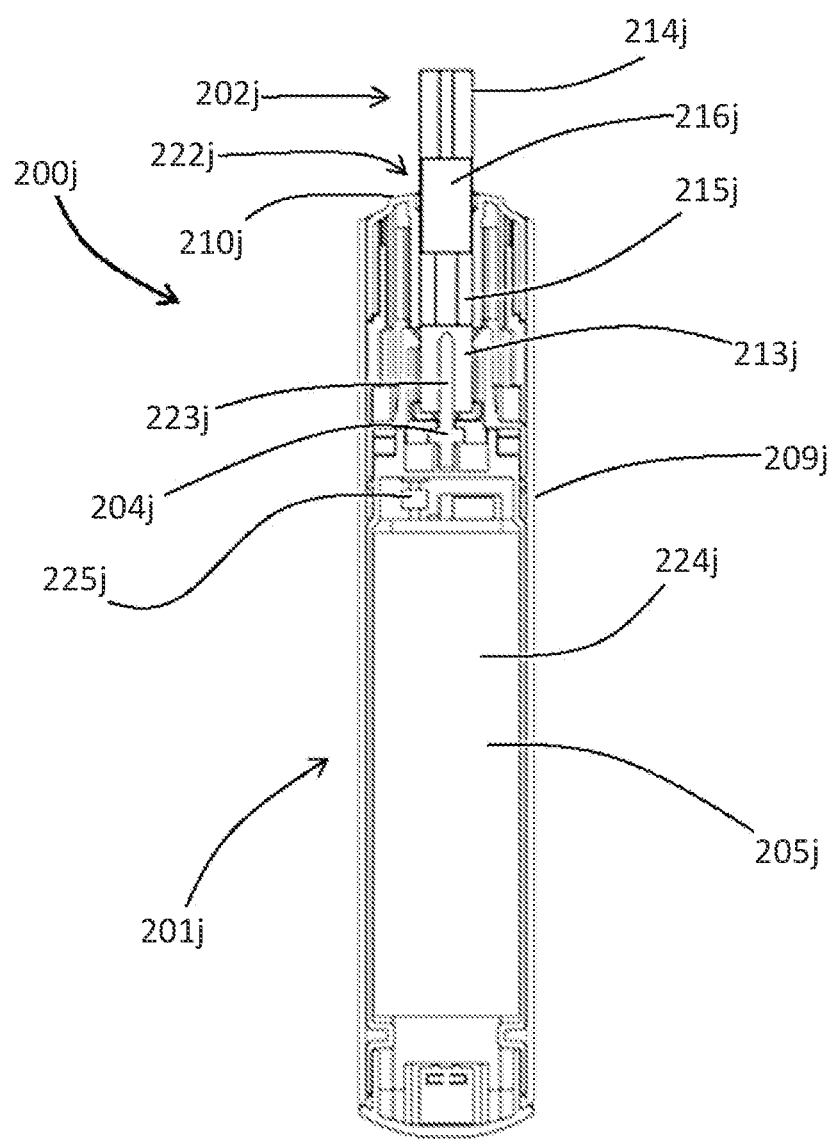
FIG. 32E is a section view of the first embodiment of the eleventh mode of the smoking substitute system.

When the consumable 202*j* is received in the cavity 222*j* (as is shown in FIG. 32E), the heating element 223*j* penetrates the aerosol-forming substrate 213*j* of the consumable 202*j*. In particular, the heating element 223*j* extends for nearly the entire axial length of the aerosol-forming substrate 213*j* when inserted therein. Thus, when the heater 204*j* is activated, heat is transferred radially from an outer circumferential surface the heating element 223*j* to the aerosol-forming substrate 213*j*.

The device 201*j* further comprises an electronics cavity 224*j*. A power source, in the form of a rechargeable battery 205*j* (a lithium-ion battery), is located in electronics cavity 224*j*.

The device 201*j* includes a connector (i.e., forming part of an IO module of the device 201*j*) in the form of a USB port 206*j*. The connector may alternatively be, for example, a micro-USB port or a USB-C port for examples. The USB port 206*j* may be used to recharge the rechargeable battery 205*j*.

The device 201*j* includes a controller 208*j* (not shown) located in the electronics cavity 224*j*. The controller comprises a microcontroller mounted on a printed circuit board (PCB). The USB port 206*j* is also connected to the controller 208*j* (i.e., connected to the PCB and microcontroller).

The controller 208*j* is configured to control at least one function of the device 202*j*. For example, the controller 208*j* is configured to control the operation of the heater 204*j*. Such control of the operation of the heater 204*j* may be accomplished by the controller toggling the electrical connection of the rechargeable battery 205*j* to the heater 204*j*. For example, the controller 208*j* is configured to control the heater 204*j* in response to a user depressing the button 212*j*. Depressing the button 212*j* may cause the controller to allow a voltage (from the rechargeable battery 205*j*) to be applied to the heater 204*j* (so as to cause the heating element 223*j* to be heated).

The controller is also configured to control the LEDs 211*j* in response to (e.g., a detected) a condition of the device 201*j* or the consumable 202*j*. For example, the controller may control the LEDs to indicate whether the device 201*j* is in an on state or an off state (e.g., one or more of the LEDs may be illuminated by the controller when the device is in an on state).

The device 201*j* comprises a further input means (i.e., in addition to the button 212*j*) in the form of a puff sensor 225*j*. The puff sensor 225*j* is configured to detect a user drawing (i.e., inhaling) at the downstream end 218*j* of the consumable 202*j*. The puff sensor 225*j* may, for example, be in the form of a pressure sensor, a flowmeter, or a microphone. The puff sensor 225*j* is operatively connected to the controller 208*j* in the electronics cavity 224*j*, such that a signal from the puff sensor 225*j*, indicative of a puff state (i.e., drawing or not drawing), forms an input to the controller 208*j* (and can thus be responded to by the controller 208*j*).

Twelfth Mode: A Heat-not-Burn Device which is Configured to Switch from a Locked Operating Mode to an Unlocked Operating Mode Based on Detecting the Occurrence of a Predetermined Event or Upon Receiving a Predetermined User Input.

Aspects and embodiments of the twelfth mode of the present disclosure will now be discussed with reference to the accompanying figures. Further aspects and embodiments will be apparent to those skilled in the art. All documents mentioned in this text are incorporated herein by reference.

Figure 33A:
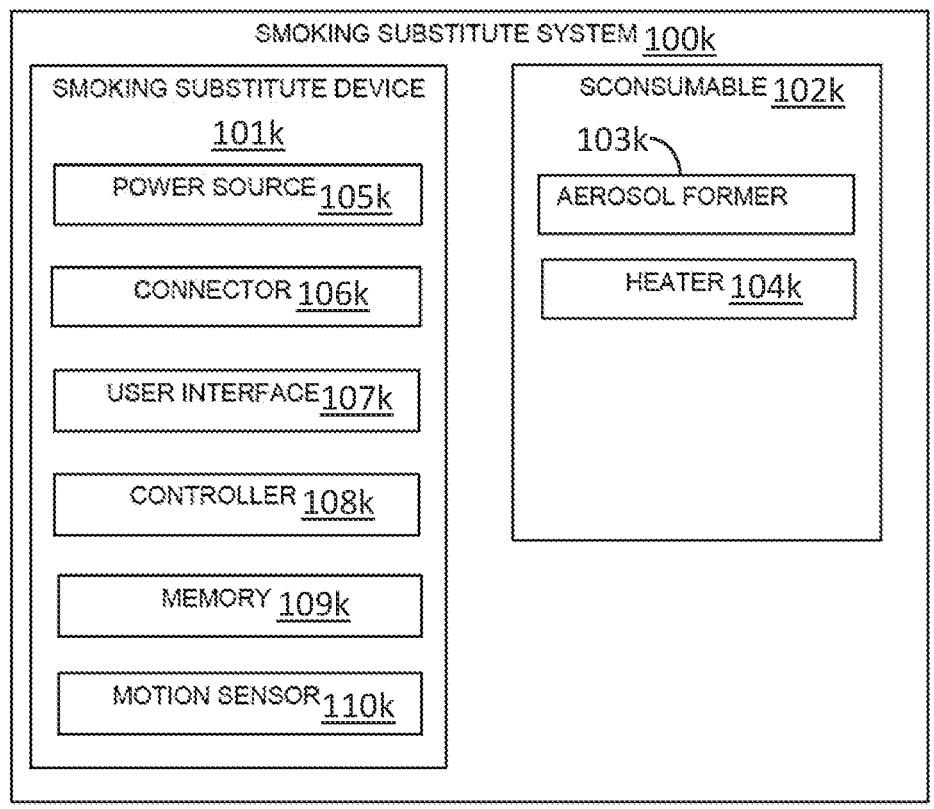
FIG. 33A is a schematic of a twelfth mode of the smoking substitute system.

FIG. 33A is a schematic providing a general overview of a smoking substitute system 100*k*. The system 100*k* includes a substitute smoking device 101*k* and an aerosol-forming article in the form of a consumable 102*k*, which comprises an aerosol former 103*k*. The system is configured to vaporize the aerosol former by heating the aerosol former 103*k* (so as to form a vapor/aerosol for inhalation by a user).

In the illustrated system, the heater 104*k* forms part of the consumable 102*k* and is configured to heat the aerosol former 103*k*. In this variation, the heater 104*k* is electrically connectable to the power source, for example, when the consumable 102*k* is engaged with the device 101*k*. Heat from the heater 104*k* vaporizes the aerosol former 103*k* to produce a vapor. The vapor subsequently condenses to form an aerosol, which is ultimately inhaled by the user. In some embodiment, the heater 104*k* is configured to be disabled in a locked operating mode and remain enabled in an unlocked operating mode.

The system 100*k* further comprises a power source 105*k* that forms part of the device 101*k*. In other embodiments the power source 105*k* may be external to (but connectable to) the device 101*k*. The power source 105*k* is electrically connectable to the heater 104*k* such that the power source 105*k* is able to supply power to the heater 104*k* (i.e., for the purpose of heating the aerosol former 103*k*). Thus, control of the electrical connection of the power source 105*k* to the heater 104*k* provides control of the state of the heater 104*k*. The power source 105*k* may be a power store, for example a battery or rechargeable battery (e.g., a lithium-ion battery).

The system 100*k* further comprises an I/O module comprising a connector 106*k* (e.g., in the form of a USB port, Micro USB port, USB-C port, etc.). The connector 106*k* is configured for connection to an external source of electrical power, e.g., a mains electrical supply outlet. The connector 106*k* may be used in substitution for the power source 105*k*. That is the connector 106*k* may be electrically connectable to the heater 104*k* so as to supply electricity to the heater 104*k*. In such embodiments, the device may not include a power source, and the power source of the system may instead comprise the connector 106*k* and an external source of electrical power (to which the connector 106*k* provides electrical connection).

In some embodiments, the connector 106*k* may be used to charge and recharge the power source 105*k* where the power source 105*k* includes a rechargeable battery.

The system 100k also comprises a user interface (UI) 107k. Although not shown, the UI 107k may include input means to receive commands from a user. The input means of the UI 107k allows the user to control at least one aspect of the operation of the system 100k. The input means may, for example, be in the form of a button, touchscreen, switch, microphone, etc.

The UI 107k also comprises output means to convey information to the user. The output means may, for example, comprise lights (e.g., LEDs), a display screen, speaker, vibration generator, etc.

The system 100k further comprises a controller 108k and a memory 109k operatively coupled to the controller 108k that is configured to control at least one function of the device 101k. In the illustrated embodiment, the controller 108k is a component of the device 101k, but in other embodiments may be separate from (but connectable to) the device 101k. The controller 108k is configured to switch the device from the locked operating mode to the unlocked operating mode based on detecting an occurrence of a predetermined event or upon receiving a predetermined user input. The controller 108k is configured to control the operation of the heater 104k, for example the controller may be configured to disable the heater 104k in locked operating mode and enable heater 104k in unlocked operating mode. The controller 108k may be further configured to control operation of the heater 104k, for example, may be configured to control the voltage applied from the power source 105k to the heater 104k. The controller 108k may be configured to toggle the supply of power to the heater 104k between an on state, in which the full output voltage of the power source 105k is applied to the heater 104k, and an off state, in which the no voltage is applied to the heater 104k. Further, in an example, the controller 108k may be configured to provide power to the heater 104k in unlocked mode, upon receiving a further user input, whereas the controller 108k is configured to provide no power to the heater 104k in locked mode.

Although not shown, the system 100k may also comprise a voltage regulator to regulate the output voltage from the power source 105k to form a regulated voltage. The regulated voltage may then be applied to the heater 104k.

In addition to being connected to the heater 104k, the controller 108k is operatively connected to the UI 107k. Thus, the controller 108k may receive an input signal from the input means of the UI 107k. Similarly, the controller 108k may transmit output signals to the UI 107k. In response, the output means of the UI 107k may convey information, based on the output signals, to a user. The controller also comprises a memory 109k, which is a non-volatile memory. The memory 109k includes instructions, which, when implemented, cause the controller to perform certain tasks or steps of a method.

Further, the system may also comprise a sensor 110k coupled with the controller 108k within the heat-not-burn device 101k. The sensor 110k may be a motion sensor mounted inside the device (not shown) and configured to generate an input in response to detection of movement of the device 101k. The controller 108k is configured to switch the device 101k from the locked operating mode to the unlocked operating mode in response to receiving said input from the sensor 110k.

Figure 33B:
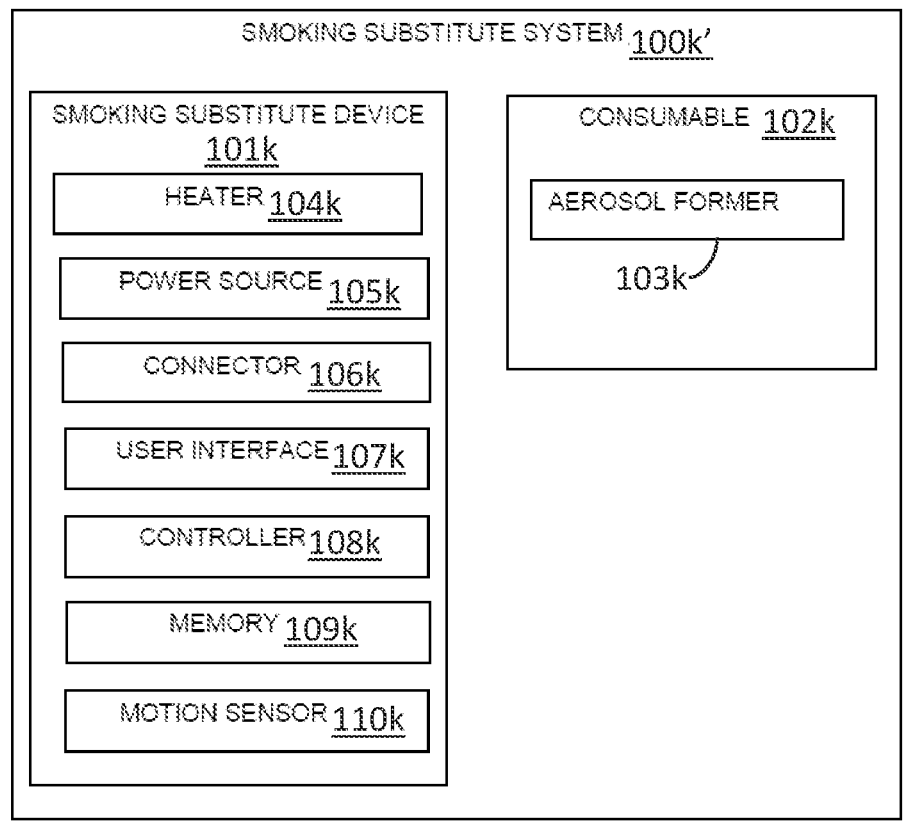
FIG. 33B is a schematic of a variation of the twelfth mode of the smoking substitute system of FIG. 33A.

FIG. 33B is a schematic showing a variation of the system 100k of FIG. 33A. In the system 100k' of FIG. 33B, the heater 104k forms part of the device 101k, rather than the consumable 102k. In this variation, the heater 104k is electrically connected to the power source 105k.

Figure 34A:
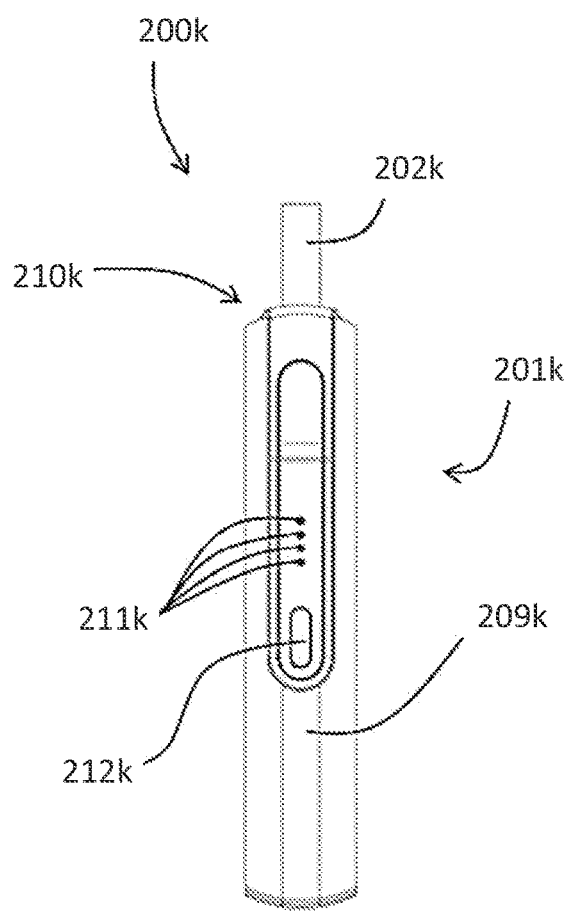
FIG. 34A is a front view of a first embodiment of the twelfth mode of the smoking substitute system with the consumable engaged with the device.
Figure 34B:
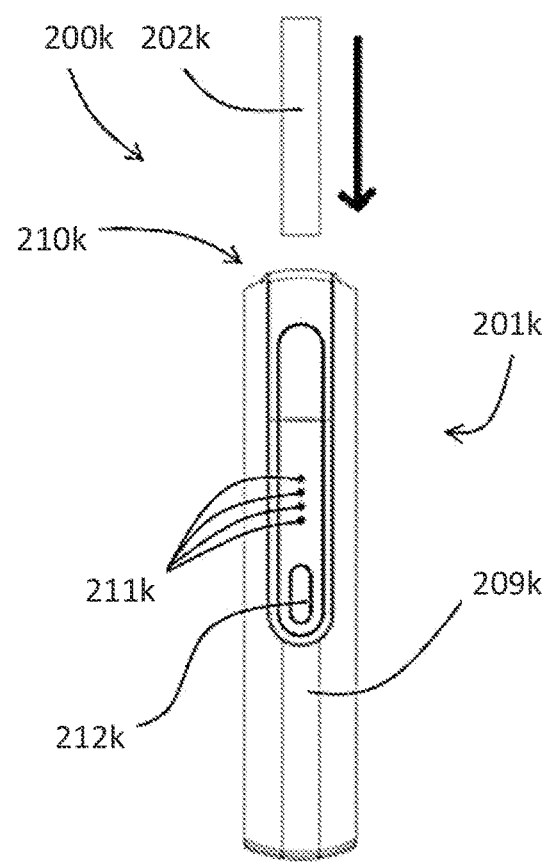
FIG. 34B is a front view of the first embodiment of the twelfth mode of the smoking substitute system with the consumable disengaged from the device.

FIG. 34A and FIG. 34B illustrate a heated-tobacco (HT) smoking substitute system 200k. The system 200k is an example of the systems 100k, 100k' described in relation to FIG. 33A or FIG. 33B. System 200k includes an HT device 201k that is configured to be switched from locked operating mode to unlocked operating mode based on detecting an occurrence of a predetermined event and/or upon receiving a predetermined user input, and an HT consumable 202k. The description of FIG. 33A and FIG. 33B above is applicable to the system 200k of FIG. 34A and FIG. 34B and will not be repeated.

The device 201k and the consumable 202k are configured such that the consumable 202k can be engaged with the device 201k. FIG. 34A shows the device 201k and the consumable 202k in an engaged state, whilst FIG. 34B shows the device 201k and the consumable 202k in a disengaged state.

The device 201k comprises a body 209k and cap 210k. In use the cap 210k is engaged at an end of the body 209k. Although not apparent from the figures, the cap 210k is moveable relative to the body 209k. In particular, the cap 210k is slidable and can slide along a longitudinal axis of the body 209k.

The device 201k comprises an output means (forming part of the UI of the device 201k) in the form of a plurality of light-emitting diodes (LEDs) 211 arranged linearly along the longitudinal axis of the device 201k and on an outer surface of the body 209k of the device 201k. A button 212k is also arranged on an outer surface of the body 209k of the device 201k and is axially spaced (i.e., along the longitudinal axis) from the plurality of LEDs 211k.

Figure 34C:
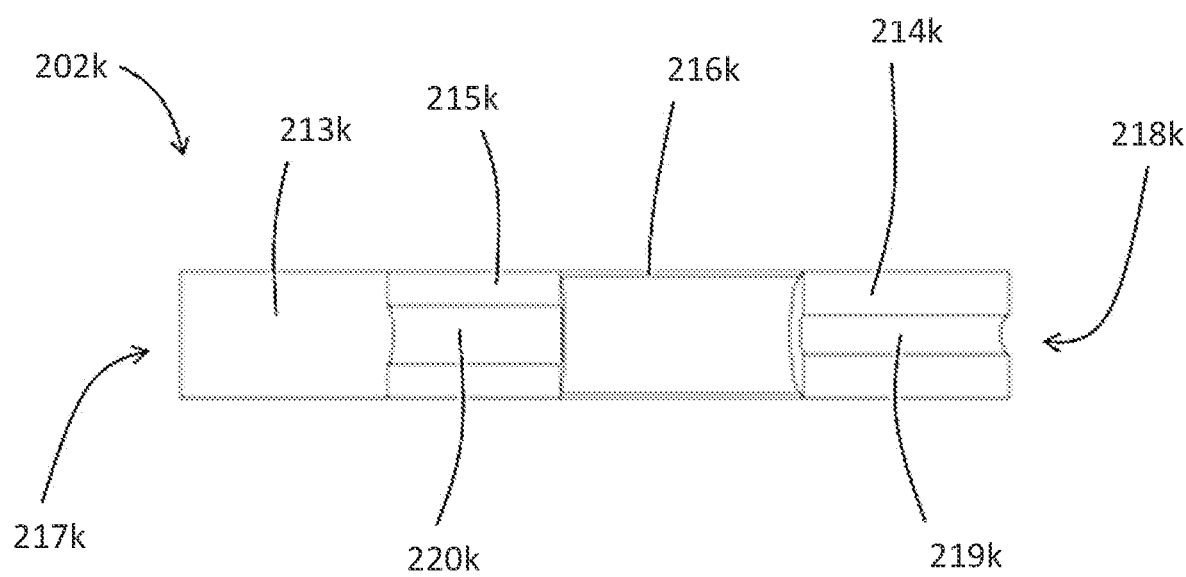
FIG. 34C is a section view of the consumable of the first embodiment of the twelfth mode of the smoking substitute system.

FIG. 34C show a detailed section view of the consumable 202k of the system 200k. The consumable 202k generally resembles a cigarette. In that respect, the consumable 202k has a generally cylindrical form with a diameter of 7 mm and an axial length of 70 mm. The consumable 202k comprises an aerosol forming substrate 213k, a terminal filter element 214k, an upstream filter element 215k and a spacer element 216k. In other embodiments, the consumable may further comprise a cooling element. A cooling element may exchange heat with vapor that is formed by the aerosol-forming substrate 213k in order to cool the vapor so as to facilitate condensation of the vapor.

The aerosol-forming substrate 213k is substantially cylindrical and is located at an upstream end 217k of the consumable 202k and comprises the aerosol former of the system 200k. In that respect, the aerosol forming substrate 213k is configured to be heated by the device 201k to release a vapor. The released vapor is subsequently entrained in an airflow flowing through the aerosol-forming substrate 213k. The airflow is produced by the action of the user drawing on a downstream end 218k (i.e., terminal or mouth end) of the consumable 202k.

In the present embodiment, the aerosol forming substrate 213k comprises tobacco material that may, for example, include any suitable parts of the tobacco plant (e.g., leaves, stems, roots, bark, seeds, and flowers). The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon). For example, the aerosol-forming substrate 213k may comprise a gathered sheet of homogenized (e.g., paper/slurry recon) tobacco or gathered shreds/strips formed from such a sheet.

In order to generate an aerosol, the aerosol forming substrate 213k comprises at least one volatile compound that is intended to be vaporized/aerosolized and that may provide the user with a recreational and/or medicinal effect when inhaled. The aerosol-forming substrate 213k may further comprise one or more additives. For example, such additives may be in the form of humectants (e.g., propylene glycol and/or vegetable glycerin), flavorants, fillers, aqueous/non-aqueous solvents and/or binders.

The terminal filter element 214k is also substantially cylindrical and is located downstream of the aerosol forming substrate 213k at the downstream end 218k of the consumable 202k. The terminal filter element 214k is in the form of a hollow bore filter element having a bore 219k (e.g., for airflow) formed therethrough. The diameter of the bore 219k is 2 mm. The terminal filter element 214k is formed of a porous (e.g., monoacetate) filter material. As set forth above, the downstream end 218k of the consumable 202k (i.e., where the terminal filter 214k is located) forms a mouthpiece portion of the consumable 202k upon which the user draws. Airflow is drawn from the upstream end 217k, thorough the components of the consumable 202k, and out of the downstream end 218k. The airflow is driven by the user drawing on the downstream end 218k (i.e., the mouthpiece portion) of the consumable 202k.

The upstream filter element 215k is located axially adjacent to the aerosol-forming substrate 213k, between the aerosol-forming substrate 213k and the terminal filter element 214k. Like the terminal filter 214k, the upstream filter element 215k is in the form of a hollow bore filter element, such that it has a bore 220k extending axially therethrough. In this way, the upstream filter 215k may act as an airflow restrictor. The upstream filter element 215k is formed of a porous (e.g., monoacetate) filter material. The bore 220k of the upstream filter element 215k has a larger diameter (3 mm) than the terminal filter element 214k.

The spacer 216k is in the form of a cardboard tube, which defines a cavity or chamber between the upstream filter element 215k and the terminal filter element 214k. The spacer 216k acts to allow both cooling and mixing of the vapor/aerosol from the aerosol-forming substrate 213k. The spacer has an external diameter of 7 mm and an axial length of 14 mm.

Although not apparent from the figure, the aerosol-forming substrate 213k, upstream filter 215k and spacer 216k are circumscribed by a paper wrapping layer. The terminal filter 214k is circumscribed by a tipping layer that also circumscribes a portion of the paper wrapping layer (so as to connect the terminal filter 214k to the remaining components of the consumable 202k). The upstream filter 215k and terminal filter 214k are circumscribed by further wrapping layers in the form of plug wraps.

Figure 34D:
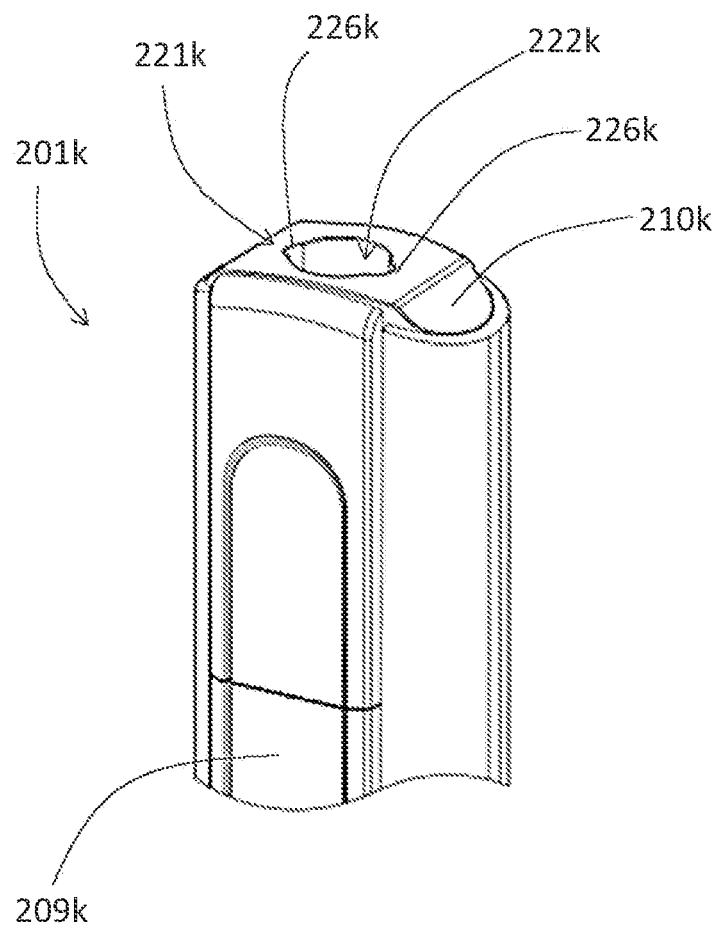
FIG. 34D is a detailed prospective view of an end of the device of the first embodiment of the twelfth mode of the smoking substitute system.

Returning now to the device 201k, FIG. 34D illustrates a detailed view of the end of the device 201k that is configured to engage with the consumable 202k. The cap 210k of the device 201k includes an opening 221k to an internal cavity 222k (more apparent from FIG. 34D) defined by the cap 210k. The opening 221k and the cavity 222k are formed so as to receive at least a portion of the consumable 202k. During engagement of the consumable 202k with the device 201k, a portion of the consumable 202k is received through the opening 221k and into the cavity 222k. After engagement (see FIG. 34B), the downstream end 218k of the consumable 202k protrudes from the opening 221k and thus also protrudes from the device 201k. The opening 221k includes laterally disposed notches 226k. When a consumable 202k is received in the opening 221k, these notches 226k remain open and could, for example, be used for retaining a cover in order to cover the end of the device 201k.

Figure 34E:
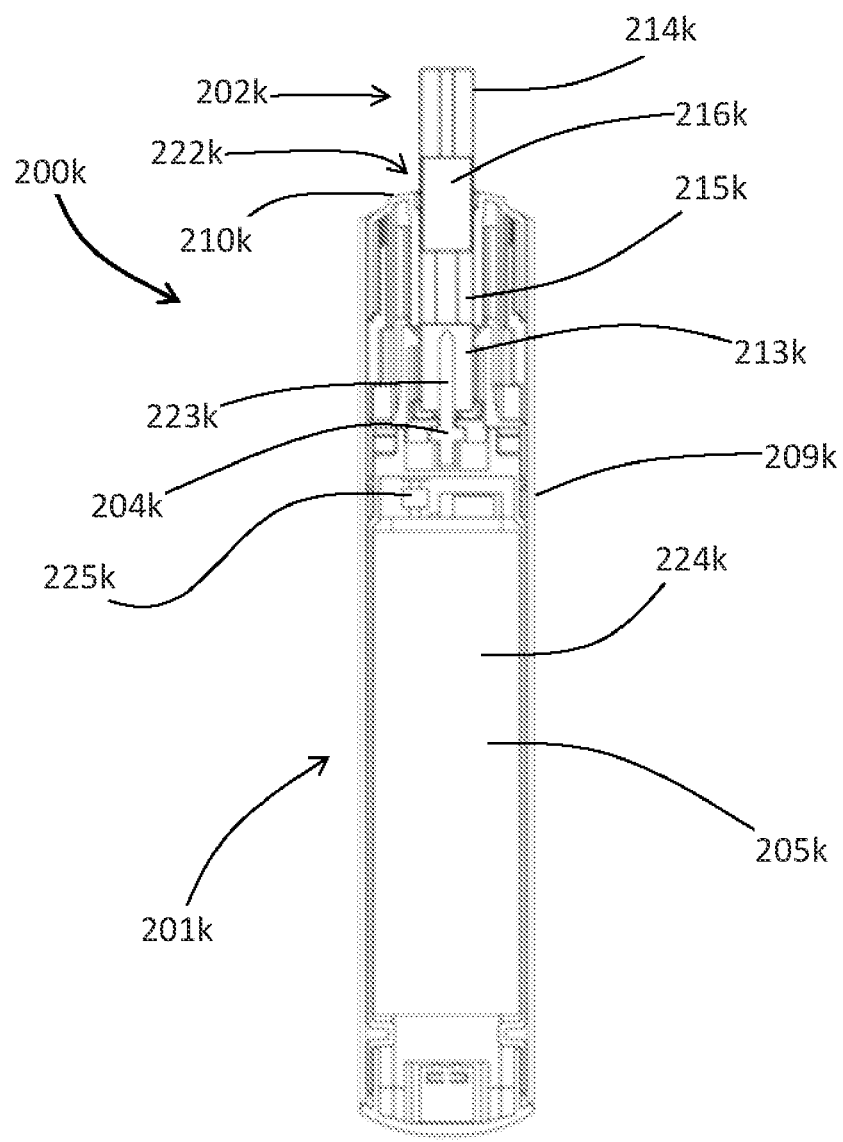
FIG. 34E is a section view of the first embodiment of the twelfth mode of the smoking substitute system.

FIG. 34E shows a cross section through a central longitudinal plane through the device 201k. The device 201k is shown with the consumable 202k engaged therewith.

The device 201k comprises a heater 204k comprising heating element 223k. The heater 204k forms part of the body 209k of the device 201k and is rigidly mounted to the body 209k. In the illustrated embodiment, the heater 204k is a rod heater with a heating element 223k having a circular transverse profile. In other embodiments the heater may be in the form of a blade heater (e.g., heating element with a rectangular transverse profile) or a tube heater (e.g., heating element with a tubular form).

The heating element 223k of the heater 204k projects from an internal base of the cavity 222k along a longitudinal axis towards the opening 221k. As is apparent from the figure, the length (i.e., along the longitudinal axis) of the heating element is less than a depth of the cavity 222k. In this way, the heating element 223k does not protrude from or extend beyond the opening 221k.

When the consumable 202k is received in the cavity 222k (as is shown in FIG. 34E), the heating element 223k penetrates the aerosol-forming substrate 213k of the consumable 202k. In particular, the heating element 223k extends for nearly the entire axial length of the aerosol-forming substrate 213k when inserted therein. Thus, when the heater 204k is activated, heat is transferred radially from an outer circumferential surface the heating element 223k to the aerosol-forming substrate 213k.

The device 201k further comprises an electronics cavity 224k. A power source, in the form of a rechargeable battery 205k (a lithium-ion battery), is located in electronics cavity 224k.

The device 201k includes a connector (i.e., forming part of an IO module of the device 201k) in the form of a USB port 206k. The connector may alternatively be, for example, a micro-USB port or a USB-C port for examples. The USB port 206k may be used to recharge the rechargeable battery 205k.

The device 201k includes a controller (not shown) located in the electronics cavity 224k. The controller comprises a microcontroller mounted on a printed circuit board (PCB). The USB port 206k is also connected to the controller 208k (i.e., connected to the PCB and microcontroller). The controller 208k is configured to control at least one function of the device 201k. For example, the controller 208k is configured to control the operation of the heater 204k. Such control of the operation of the heater 204k may be accomplished by the controller toggling the electrical connection of the rechargeable battery 205k to the heater 204k. For example, the controller 208k is configured to control the heater 204k in response to a user depressing the button 212k. Depressing the button 212k may cause the controller to allow a voltage (from the rechargeable battery 205k) to be applied to the heater 204k (so as to cause the heating element 223k to be heated).

In one aspect, the controller 208k is configured to switch the device 201k between two operating modes, i.e., a locked operating mode to an unlocked operating mode. In one embodiment, the controller 208k may be configured to switch the device 201k from the locked operating mode to the unlocked operating mode based on detecting an occurrence of a predetermined event and/or upon receiving a predetermined user input. In one example, the predetermined user input for switching the device 201k from the locked operating mode to an unlocked operating mode may include a pre-determined sequence of user presses, or button presses, on the button 212k. For example, the predetermined sequence of button presses may be any one of (i) pressing the button 212k for a predetermined number of times, e.g., 5 times; (ii) pressing and holding the button 212k for a predetermined period of time, e.g., 3 seconds or (iii) pressing the button 212k for a predetermined number of times, wherein during each of the button presses keeping the button 212k depressed for a predetermined period of time. The heater 204k of the device 201k remains disabled in a locked operating mode, e.g., the heater 204k is not energized during the locked operating mode. Thus, when the controller 208k switches the device 201k from the locked operating mode to the unlocked operating mode the controller 208k enables the heater 204k.

When the heater 204k is enabled during unlocked operating state may not necessarily mean that heater 204k is in the activated state (e.g., energized) but it may also include a state where the heater 204k is ready to receive power from the power source, provided a further user input for activating the heater 204k is received at the device 201k. Thus, in some embodiments the heater 204k only activates after receiving said further user input from the device 201k, e.g., via the UI. The predetermined user input to switch the device 201k from locked operating mode to the unlocked operating mode is different from the further user input required to activate the heater 204k in the unlocked operating mode.

The controller 208k is further configured to switch from the device 201k from the locked mode to the unlocked mode upon detecting the occurrence of a predetermined event, e.g., meeting one or more of predetermined conditions. For example, the controller 208k may be configured to switch the device 201k from the locked operating mode to the unlocked operating mode upon detecting that the cap 210k of the device 201k being lifted away from the device 201k. Such movement may be detected by an electronic or mechanical trigger provided between the cap 210k and the device 201k. In another example, the controller 208k may be configured to switch the device 201k from the locked operating mode to the unlocked operating mode upon detecting a connection being established between the device 201k with an external computing device, e.g., via a USB socket, or external power source, e.g., a wall socket. In another example, the controller 208k may be configured to switch the device 201k from the locked operating mode to the unlocked operating mode upon detecting a consumable 202k being inserted into the cavity 222k of the device 201k. Such engagement may be detected by an electronic or mechanical trigger provided within the cavity 222k.

The predetermined event may include the occurrence of a plurality of events. For example, the controller 208k may be configured to switch the device 201k from the locked operating mode to the unlocked operating mode upon detecting both a movement in the cap 210k and the insertion of the consumable 202k into the cavity 222k.

In some embodiments, the controller 208k is configured to switch the device 201k from the locked operating mode to the unlocked operating mode in response to receiving an input from the sensor 110k. The sensor 110k may be a motion sensor that generates said input in response to detection of movement of the device 201k. In an example, the sensor 110k may be configured to generate said input when the device is moved in a particular predetermined pattern. In another example, the controller 207k is configured to analyze and to match the movement of the device with a predetermined pattern stored in the memory, and thereby switches the device 201k from the locked operating mode to the unlocked operating mode upon registering a positive match. Said predetermined movement comprises, for example, one or more of a swirl movement, sweeping or swaying movement and movement along the longitudinal direction.

In another embodiment, the controller 208k is further configured to from the unlocked operating mode to the locked operating mode, e.g., reactivate the locked operating mode. In particular, the controller 208k reactivates the locked operating mode in response to receiving a second predetermined user input, e.g., a second predetermined sequence of user presses at the UI. In an embodiment, the second predetermined user input is different to the predetermined user input to reactivate the locked operating mode in the device 201k.

The controller 208k is also configured to control the LEDs 211k in response to (e.g., a detected) a condition of the device 201k or the consumable 202k. For example, the controller may control the LEDs to indicate whether the device 201k is in an on state or an off state (e.g., one or more of the LEDs may be illuminated by the controller when the device is in an on state). In addition, the controller 208k may control the LEDs to indicate that the device 201k has switched from locked operating mode to unlocked operating mode, e.g., whether the device is in the locked operating state or the unlocked operating state. The device 201k additionally includes other output means such as haptic sensor, audio sensors etc. to provide haptic/audio feedback indicating that the device 201k has switched from locked operating mode to unlocked operating mode.

The device 202k comprises a further input means (i.e., in addition to the button 212k) in the form of a puff sensor 225k. The puff sensor 225k is configured to detect a user drawing (i.e., inhaling) at the downstream end 218k of the consumable 202k. The puff sensor 225k may, for example, be in the form of a pressure sensor, a flowmeter, or a microphone. The puff sensor 225k is operatively connected to the controller 208k in the electronics cavity 224k, such that a signal from the puff sensor 225k, indicative of a puff state (i.e., drawing or not drawing), forms an input to the controller 208k (and can thus be responded to by the controller 208k).

Figure 35:
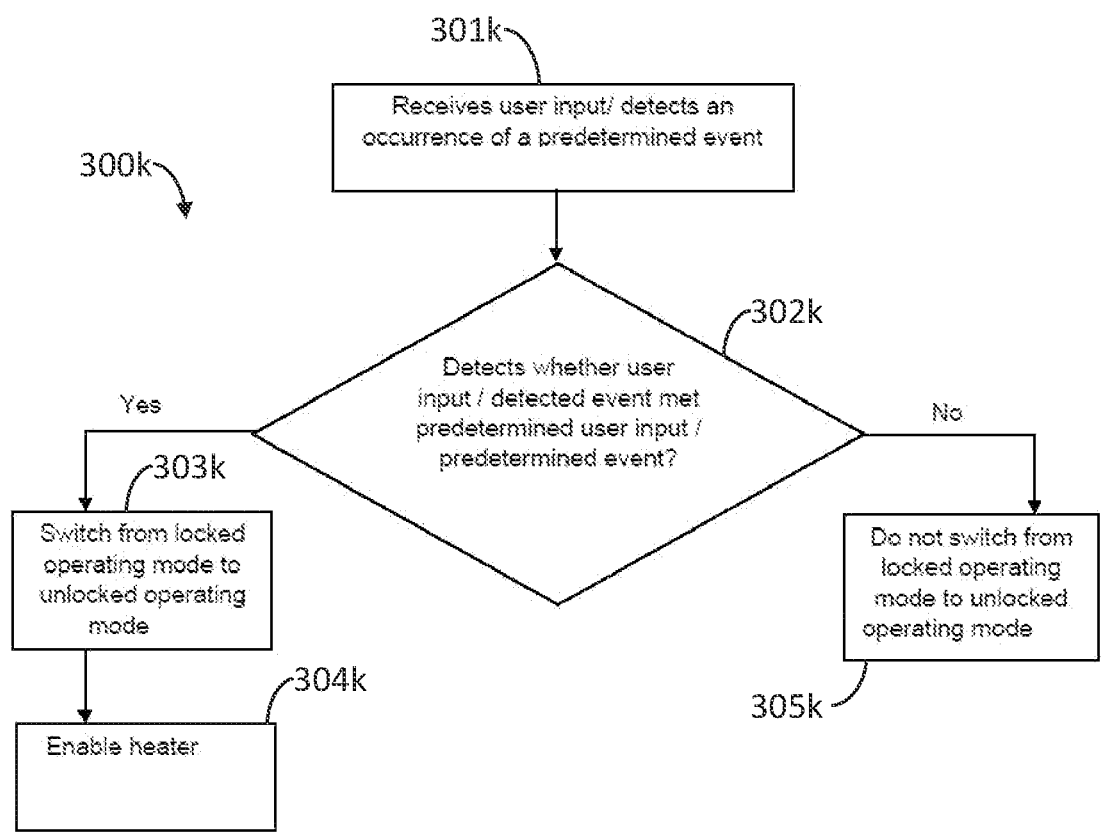
FIG. 35 is a flowchart illustrating a method for operating the system in accordance with an aspect of the twelfth mode.

FIG. 35 illustrates flowchart of method for switching the device from the locked operating mode to the unlocked operating mode.

As illustrated in FIG. 35, the method 300k includes one or more blocks implemented by the controller 208k of the device 201k. The method 300k may be described in general context of controller executable instructions. Generally, controller executable instructions may include routines, programs, objects, components, data structures, procedures, modules, and functions, which perform particular functions or implement particular abstract data types.

The order in which the method 300k is described is not intended to be construed as a limitation, and any number of the described method blocks can be combined in any order to implement the method 300k. Additionally, individual blocks may be deleted from the method 300k without departing from the scope of the subject matter described herein. Furthermore, the method 300k can be implemented in any suitable hardware, software, firmware, or combination thereof.

At block 301k, the controller 208k is configured to at least one of: receive a predetermined user input or detects an occurrence of a predetermined event that is required to switch the device from the locked operating mode to the unlocked operating mode.

In one exemplary embodiment, the predetermined user input, to be received by the controller 208k, for switching the device 201*k* from the locked operating mode to an unlocked operating mode may include predetermined sequence of button presses. For example, the predetermined sequence of button presses may be any one of (i) pressing the button 212*k* for a predetermined number of times, e.g., 5 times; (ii) pressing and holding the button 212*k* for a predetermined period of time, e.g., 3 seconds or (iii) pressing the button 212*k* for a predetermined number of times, wherein during each of the button presses keeping the button 212*k* depressed for a predetermined period of time.

In another exemplary embodiment, the predetermined event for switching the device 201*k* from the locked operating mode to the unlocked operating mode may include a number of events or conditions. For example, the controller 208*k* may be configured for switching the device 201*k* from the locked operating mode to the unlocked operating mode upon detecting that the cap 210*k* of the device 201*k* is lifted. In another example, the controller 208*k* may be configured for switching the device 201*k* from the locked operating mode to the unlocked operating mode upon detecting connection between the device 201*k* with one of an external computing device and external power source is established. In another example, the controller 208*k* may be configured for switching the device 201*k* from the locked operating mode to the unlocked operating mode upon detecting insertion of consumable 202*k* in the cavity 222*k* of the device 201*k*. At block 302*k*, the controller 208*k* detects whether (i) the user input matches with the pre-determined input stored in the memory 109*k* or (ii) the detected event matches the predetermined event registered/stored in the memory 109*k* previously.

At block 303*k*, the controller 208*k* moves along "yes" path to switch the device from locked operating mode to unlocked operating mode. The method proceeds to block 303*k* only after confirming that either (i) the received user input matches with the predetermined user input stored in the memory 109*k* or (ii) the detected event matches the predetermined event registered/stored in the memory 109*k*. The method then moves to block 304*k* wherein the controller 208*k* enables the heater 204*k* of the device 201*k*.

Whereas, at block 305*k*, the controller 208*k* moves along "No" path and does not switch the device from locked operating mode to the unlocked operating mode as either (i) the user input does not match with the predetermined user input stored in the memory 109*k* or (ii) the detected event does not match the predetermined event registered/stored in the memory 109*k*.

Thirteenth Mode: A Smoking Substitute System Comprising a Smoking Substitute Device and a Rechargeable Power Source Configured to Charge the Smoking Substitute Device and to be Charged by a Power Source.

Aspects and embodiments of the thirteenth mode of the present disclosure will now be discussed with reference to the accompanying figures. Further aspects and embodiments will be apparent to those skilled in the art. All documents mentioned in this text are incorporated herein by reference.

Figure 36A:
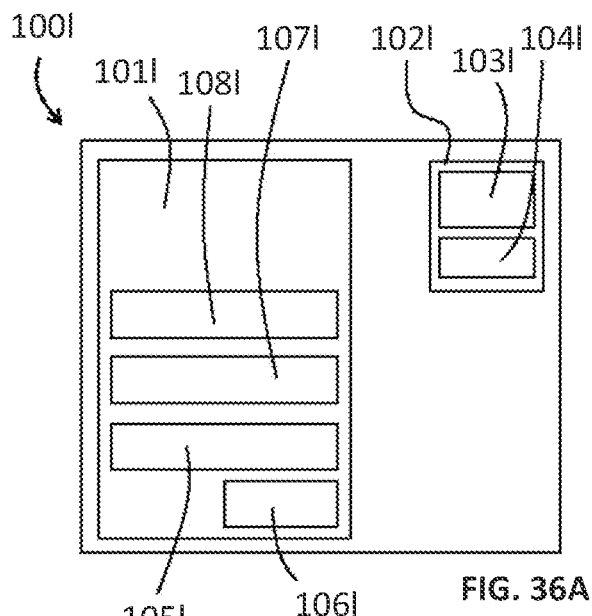
FIG. 36A is a schematic of a thirteenth mode of the smoking substitute system.

FIG. 36A is a schematic providing a general overview of a smoking substitute system 100*l*. The system 100*l* includes a substitute smoking device 101*l* and an aerosol-forming article in the form of a consumable 102*l*, which comprises an aerosol former 103*l*. The system is configured to vaporize the aerosol former by heating the aerosol former 103*l* (so as to form a vapor/aerosol for inhalation by a user).

In the illustrated system, the heater 104*l* forms part of the consumable 102*l* and is configured to heat the aerosol former 103*l*. In this variation, the heater 104*l* is electrically connectable to the power source 105*l*, for example, when the consumable 102*l* is engaged with the device 101*l*. Heat from the heater 104*l* vaporizes the aerosol former 103*l* to produce a vapor. The vapor subsequently condenses to form an aerosol, which is ultimately inhaled by the user.

The system 100*l* further comprises a power source 105*l* that forms part of the device 101*l*. In other embodiments the power source 105*l* may be external to (but connectable to) the device 101*l*. The power source 105*l* is electrically connectable to the heater 104*l* such that it is able to supply power to the heater 104*l* (i.e., for the purpose of heating the aerosol former 103*l*). Thus, control of the electrical connection of the power source 105*l* to the heater 104*l* provides control of the state of the heater 104*l*. The power source 105*l* may be a power store, for example a battery or rechargeable battery (e.g., a lithium-ion battery).

The system 100*l* further comprises an I/O module comprising a connector 106*l* (e.g., in the form of a USB port, Micro USB port, USB-C port, etc.). The connector 106*l* is configured for connection to an external source of electrical power, e.g., a mains electrical supply outlet. The connector 106*l* may be used in substitution for the power source 105*l*. That is the connector 106*l* may be electrically connectable to the heater 104*l* so as to supply electricity to the heater 104*l*. In such embodiments, the device may not include a power source, and the power source of the system may instead comprise the connector 106*l* and an external source of electrical power (to which the connector 106*l* provides electrical connection).

In some embodiments, the connector 106*l* may be used to charge and recharge the power source 105*l* where the power source 105*l* includes a rechargeable battery.

The system 100*l* also comprises a user interface (UI) 107*l*. Although not shown, the UI 107*l* may include input means to receive commands from a user. The input means of the UI 107*l* allows the user to control at least one aspect of the operation of the system 100*l*. The input means may, for example, be in the form of a button, touchscreen, switch, microphone, etc.

The UI 107*l* also comprises output means to convey information to the user. The output means may, for example, comprise lights (e.g., LEDs), a display screen, speaker, vibration generator, etc.

The system 100*l* further comprises a controller 108*l* that is configured to control at least one function of the device 101*l*. In the illustrated embodiment, the controller 108*l* is a component of the device 101*l*, but in other embodiments may be separate from (but connectable to) the device 101*l*. The controller 108*l* is configured to control the operation of the heater 104*l* and, for example, may be configured to control the voltage applied from the power source 105*l* to the heater 104*l*. The controller 108*l* may be configured to toggle the supply of power to the heater 104*l* between an on state, in which the full output voltage of the power source 105*l* is applied to the heater 104*l*, and an off state, in which the no voltage is applied to the heater 104*l*.

Although not shown, the system 100*l* may also comprise a voltage regulator to regulate the output voltage from the power source 105*l* to form a regulated voltage. The regulated voltage may then be applied to the heater 104*l*.

In addition to being connected to the heater 104*l*, the controller 108*l* is operatively connected to the UI 107*l*. Thus, the controller 108*l* may receive an input signal from the input means of the UI 107*l*. Similarly, the controller 108*l* may transmit output signals to the UI 107*l*. In response, the output means of the UI 107*l* may convey information, based on the output signals, to a user. The controller also comprises a memory 109*l*, which is a non-volatile memory. The memory 109*l* includes instructions, which, when implemented, cause the controller to perform certain tasks or steps of a method.

Figure 36B:
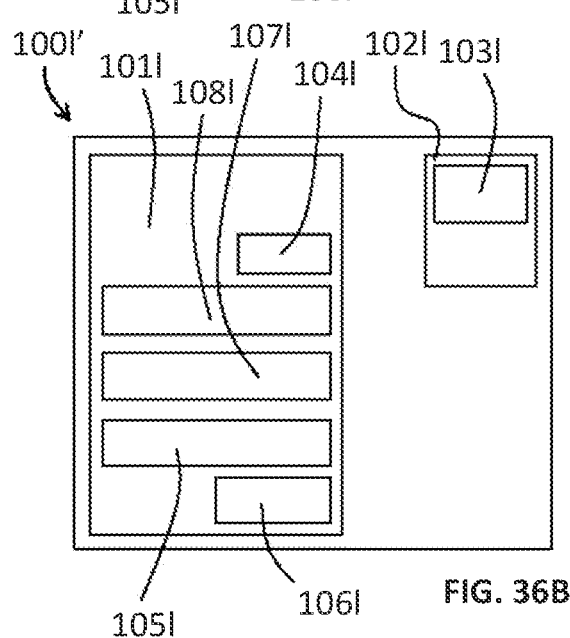
FIG. 36B is a schematic of a variation of the thirteenth mode of the smoking substitute system of FIG. 36A.

FIG. 36B is a schematic showing a variation of the system 100*l* of FIG. 36A. In the system 100*l'* of FIG. 36B, the heater 104*l* forms part of the device 101*l*, rather than the consumable 102*l*. In this variation, the heater 104*l* is electrically connected to the power source 105*l*.

The systems 100*l*, 100*l'* of FIG. 36A and FIG. 36B may be implemented as one of two broad categories of system, each in accordance with an aspect of the thirteenth mode: a heated tobacco (HT) system or an e-cigarette system. A description of each category of system follows.

Figure 37A:
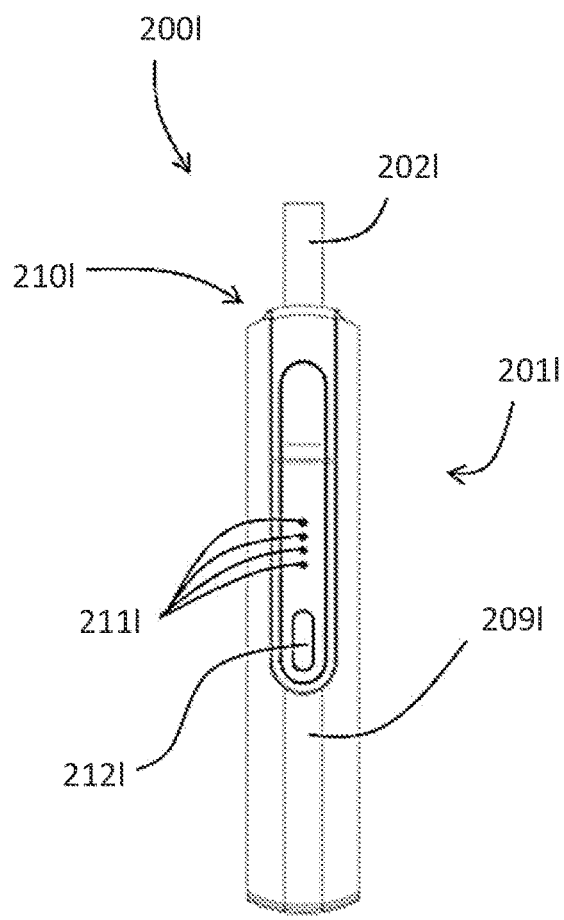
FIG. 37A is a front view of a first embodiment of the thirteenth mode of the smoking substitute system with the consumable engaged with the device.
Figure 37B:
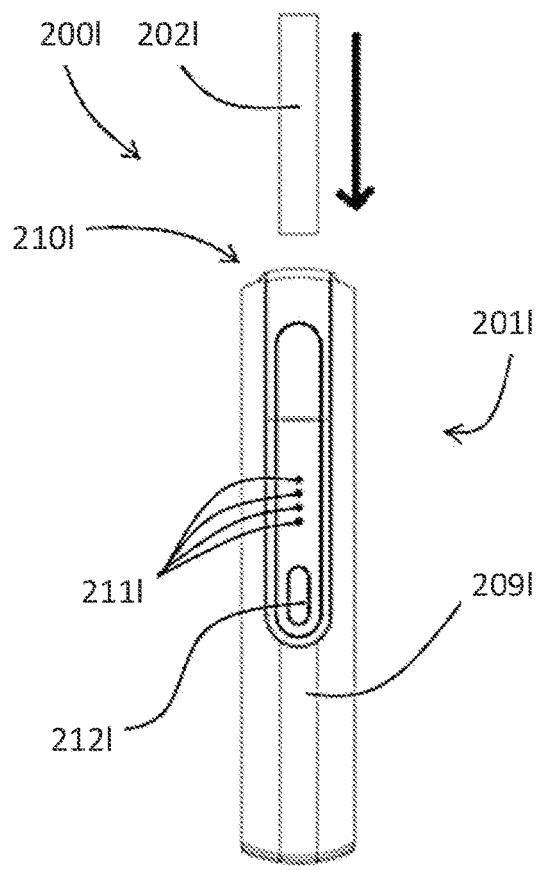
FIG. 37B is a front view of the first embodiment of the thirteenth mode of the smoking substitute system with the consumable disengaged from the device.

FIG. 37A and FIG. 37B illustrate a heated-tobacco (HT) smoking substitute system 200*l*. The system 200*l* is an example of the systems 100*l*, 100*l'* described in relation to FIG. 36A or FIG. 36B. System 200*l* includes an HT device 201*l* and an HT consumable 202*l*. The description of FIG. 36A and FIG. 36B above is applicable to the system 200*l* of FIG. 37A and FIG. 37B and will not be repeated.

The device 201*l* and the consumable 202*l* are configured such that the consumable 202*l* can be engaged with the device 201*l*. FIG. 37A shows the device 201*l* and the consumable 202*l* in an engaged state, whilst FIG. 37B shows the device 201*l* and the consumable 202*l* in a disengaged state.

The device 201*l* comprises a body 209*l* and cap 210*l*. In use the cap 210*l* is engaged at an end of the body 209*l*. Although not apparent from the figures, the cap 210*l* is moveable relative to the body 209*l*. In particular, the cap 210*l* is slidable and can slide along a longitudinal axis of the body 209*l*.

The device 201*l* comprises an output means (forming part of the UI of the device 201*l*) in the form of a plurality of light-emitting diodes (LEDs) 211*l* arranged linearly along the longitudinal axis of the device 201*l* and on an outer surface of the body 209*l* of the device 201*l*. A button 212*l* is also arranged on an outer surface of the body 209*l* of the device 201*l* and is axially spaced (i.e., along the longitudinal axis) from the plurality of LEDs 211*l*.

Figure 37C:
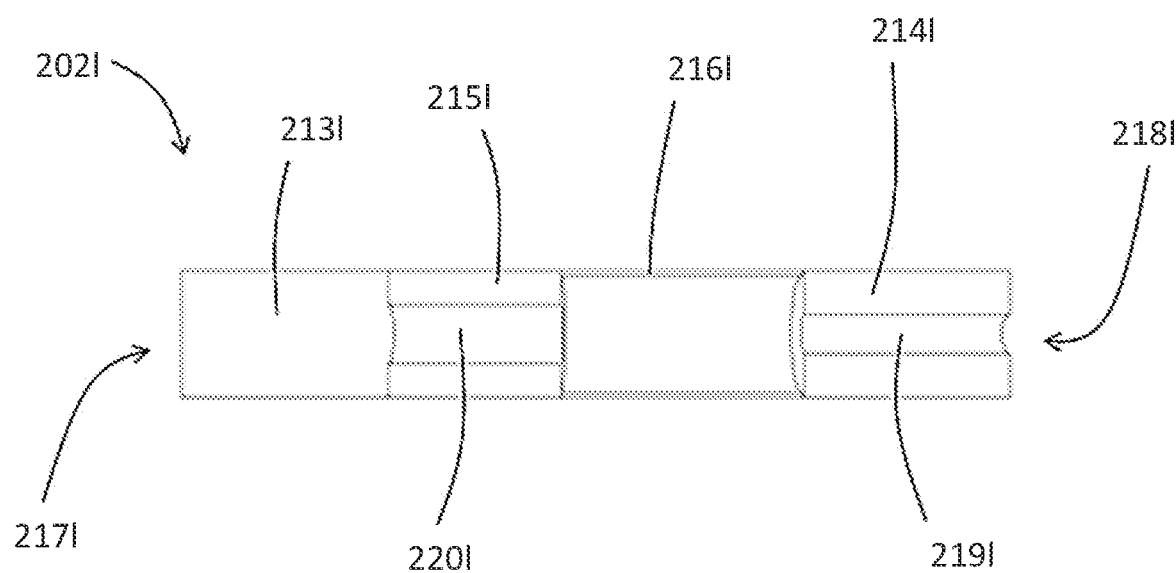
FIG. 37C is a section view of the consumable of the first embodiment of the thirteenth mode of the smoking substitute system.

FIG. 37C show a detailed section view of the consumable 202*l* of the system 200*l*. The consumable 202*l* generally resembles a cigarette. In that respect, the consumable 202*l* has a generally cylindrical form with a diameter of 7 mm and an axial length of 70 mm. The consumable 202*l* comprises an aerosol forming substrate 213*l*, a terminal filter element 214*l*, an upstream filter element 215*l* and a spacer element 216*l*. In other embodiments, the consumable may further comprise a cooling element. A cooling element may exchange heat with vapor that is formed by the aerosol-forming substrate 213*l* in order to cool the vapor so as to facilitate condensation of the vapor.

The aerosol-forming substrate 213*l* is substantially cylindrical and is located at an upstream end 217*l* of the consumable 202*l* and comprises the aerosol former of the system 200*l*. In that respect, the aerosol forming substrate 213*l* is configured to be heated by the device 201*l* to release a vapor. The released vapor is subsequently entrained in an airflow flowing through the aerosol-forming substrate 213*l*. The airflow is produced by the action of the user drawing on a downstream end 218*l* (i.e., terminal or mouth) end of the consumable 202*l*.

In the present embodiment, the aerosol forming substrate 213*l* comprises tobacco material that may, for example, include any suitable parts of the tobacco plant (e.g., leaves, stems, roots, bark, seeds, and flowers). The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon). For example, the aerosol-forming substrate 213*l* may comprise a gathered sheet of homogenized (e.g., paper/slurry recon) tobacco or gathered shreds/strips formed from such a sheet.

In order to generate an aerosol, the aerosol forming substrate 213*l* comprises at least one volatile compound that is intended to be vaporized/aerosolized and that may provide the user with a recreational and/or medicinal effect when inhaled. The aerosol-forming substrate 213*l* may further comprise one or more additives. For example, such additives may be in the form of humectants (e.g., propylene glycol and/or vegetable glycerin), flavorants, fillers, aqueous/non-aqueous solvents and/or binders.

The terminal filter element 214*l* is also substantially cylindrical and is located downstream of the aerosol forming substrate 213*l* at the downstream end 218*l* of the consumable 202*l*. The terminal filter element 214*l* is in the form of a hollow bore filter element having a bore 219*l* (e.g., for airflow) formed therethrough. The diameter of the bore 219*l* is 2 mm. The terminal filter element 214*l* is formed of a porous (e.g., monoacetate) filter material. As set forth above, the downstream end 218*l* of the consumable 202*l* (i.e., where the terminal filter 214*l* is located) forms a mouthpiece portion of the consumable 202*l* upon which the user draws. Airflow is drawn from the upstream end 217*l*, thorough the components of the consumable 202*l*, and out of the downstream end 218*l*. The airflow is driven by the user drawing on the downstream end 218*l* (i.e., the mouthpiece portion) of the consumable 202*l*.

The upstream filter element 215*l* is located axially adjacent to the aerosol-forming substrate 213*l*, between the aerosol-forming substrate 213*l* and the terminal filter element 214*l*. Like the terminal filter 214*l*, the upstream filter element 215*l* is in the form of a hollow bore filter element, such that it has a bore 220*l* extending axially therethrough. In this way, the upstream filter 215*l* may act as an airflow restrictor. The upstream filter element 215*l* is formed of a porous (e.g., monoacetate) filter material. The bore 220*l* of the upstream filter element 215*l* has a larger diameter (3 mm) than the terminal filter element 214*l*.

The spacer 216*l* is in the form of a cardboard tube, which defines a cavity or chamber between the upstream filter element 215*l* and the terminal filter element 214*l*. The spacer 216*l* acts to allow both cooling and mixing of the vapor/aerosol from the aerosol-forming substrate 213*l*. The spacer has an external diameter of 7 mm and an axial length of 14 mm.

Although not apparent from the figure, the aerosol-forming substrate 213*l*, upstream filter 215*l* and spacer 216*l* are circumscribed by a paper wrapping layer. The terminal filter 214*l* is circumscribed by a tipping layer that also circumscribes a portion of the paper wrapping layer (so as to connect the terminal filter 214*l* to the remaining components of the consumable 202*l*). The upstream filter 215*l* and terminal filter 214*l* are circumscribed by further wrapping layers in the form of plug wraps.

Figure 37D:
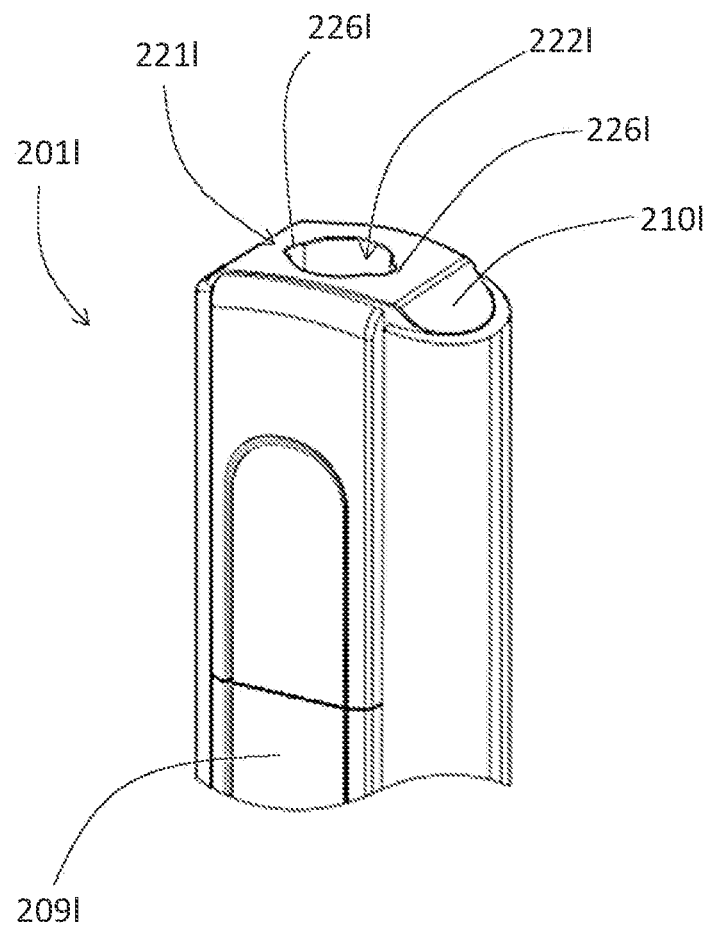
FIG. 37D is a detailed view of an end of the device of the first embodiment of the thirteenth mode of the smoking substitute system.

Returning now to the device 201*l*, FIG. 37D illustrates a detailed view of the end of the device 201*l* that is configured to engage with the consumable 202*l*. The cap 210*l* of the device 201*l* includes an opening 221*l* to an internal cavity 222*l* (more apparent from FIG. 37D) defined by the cap 210*l*. The opening 221*l* and the cavity 222*l* are formed so as to receive at least a portion of the consumable 202*l*. During engagement of the consumable 202*l* with the device 201*l*, a portion of the consumable 202*l* is received through the opening 221*l* and into the cavity 222*l*. After engagement (see FIG. 37B), the downstream end 218*l* of the consumable 202*l* protrudes from the opening 221*l* and thus also protrudes from the device 201*l*. The opening 221*l* includes laterally disposed notches 226*l*. When a consumable 202*l* is received in the opening 221*l*, these notches 226*l* remain open and could, for example, be used for retaining a cover in order to cover the end of the device 201*l*.

Figure 37E:
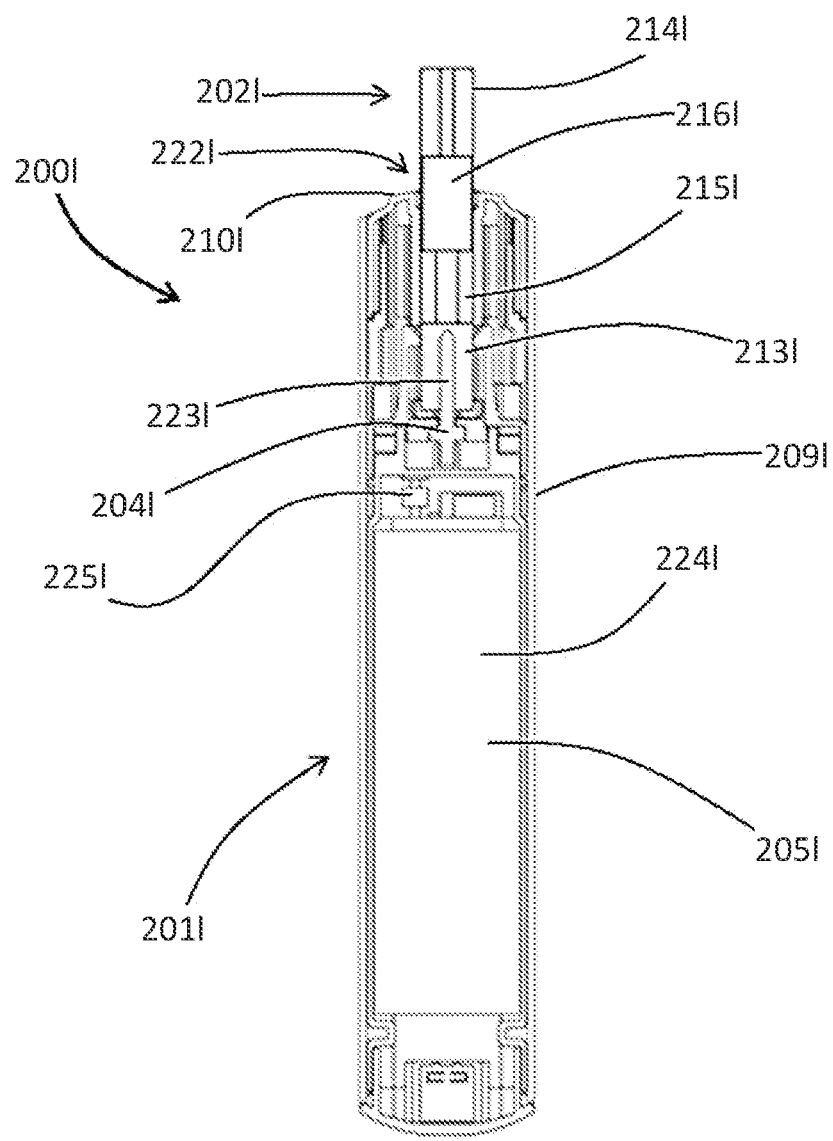
FIG. 37E is a section view of the first embodiment of the thirteenth mode of the smoking substitute system.

FIG. 37E shows a cross section through a central longitudinal plane through the device 201*l*. The device 201*l* is shown with the consumable 202*l* engaged therewith.

The device 201*l* comprises a heater 204*l* comprising heating element 223*l*. The heater 204*l* forms part of the body 209*l* of the device 201*l* and is rigidly mounted to the body 209*l*. In the illustrated embodiment, the heater 204*l* is a rod heater with a heating element 223*l* having a circular transverse profile. In other embodiments the heater may be in the form of a blade heater (e.g., heating element with a rectangular transverse profile) or a tube heater (e.g., heating element with a tubular form).

The heating element 223*l* of the heater 204*l* projects from an internal base of the cavity 222*l* along a longitudinal axis towards the opening 221*l*. As is apparent from the figure, the length (i.e., along the longitudinal axis) of the heating element is less than a depth of the cavity 222*l*. In this way, the heating element 223*l* does not protrude from or extend beyond the opening 221*l*.

When the consumable 202*l* is received in the cavity 222*l* (as is shown in FIG. 37E), the heating element 223*l* penetrates the aerosol-forming substrate 213*l* of the consumable 202*l*. In particular, the heating element 223*l* extends for nearly the entire axial length of the aerosol-forming substrate 213*l* when inserted therein. Thus, when the heater 204*l* is activated, heat is transferred radially from an outer circumferential surface the heating element 223*l* to the aerosol-forming substrate 213*l*.

The device 201*l* further comprises an electronics cavity 224*l*. A power source, in the form of a rechargeable battery 205*l* (a lithium-ion battery), is located in electronics cavity 224*l*. In some embodiments, the rechargeable battery may be configured to be charged using a rechargeable power source.

The device 201*l* includes a connector (i.e., forming part of an IO module of the device 201*l*) in the form of a USB port 206*l*. The connector may alternatively be, for example, a micro-USB port or a USB-C port for examples. The USB port 206*l* may be used to recharge the rechargeable battery 205*l*.

The device 201*l* includes a device controller (not shown) located in the electronics cavity 224*l*. The device controller comprises a microcontroller mounted on a printed circuit board (PCB). The USB port 206*l* is also connected to the controller 208*l* (i.e., connected to the PCB and microcontroller).

The device controller 208*l* is configured to control at least one function of the device 202*l*. For example, the device controller 208*l* is configured to control the operation of the heater 204*l*. Such control of the operation of the heater 204*l* may be accomplished by the device controller toggling the electrical connection of the rechargeable battery 205*l* to the heater 204*l*. For example, the device controller 208*l* is configured to control the heater 204*l* in response to a user depressing the button 212*l*. Depressing the button 212*l* may cause the device controller to allow a voltage (from the rechargeable battery 205*l*) to be applied to the heater 204*l* (so as to cause the heating element 223*l* to be heated).

The device controller is also configured to control the LEDs 211*l* in response to (e.g., a detected) a condition of the device 201*l* or the consumable 202*l*. For example, the device controller may control the LEDs to indicate whether the device 201*l* is in an on state or an off state (e.g., one or more of the LEDs may be illuminated by the device controller when the device is in an on state).

The device 201*l* comprises a further input means (i.e., in addition to the button 212*l*) in the form of a puff sensor 225*l*. The puff sensor 225*l* is configured to detect a user drawing (i.e., inhaling) at the downstream end 218*l* of the consumable 202*l*. The puff sensor 225*l* may, for example, be in the form of a pressure sensor, a flowmeter, or a microphone. The puff sensor 225*l* is operatively connected to the device controller 208*l* in the electronics cavity 224*l*, such that a signal from the puff sensor 225*l*, indicative of a puff state (i.e., drawing or not drawing), forms an input to the device controller 208*l* (and can thus be responded to by the device controller 208*l*).

Figure 37F:
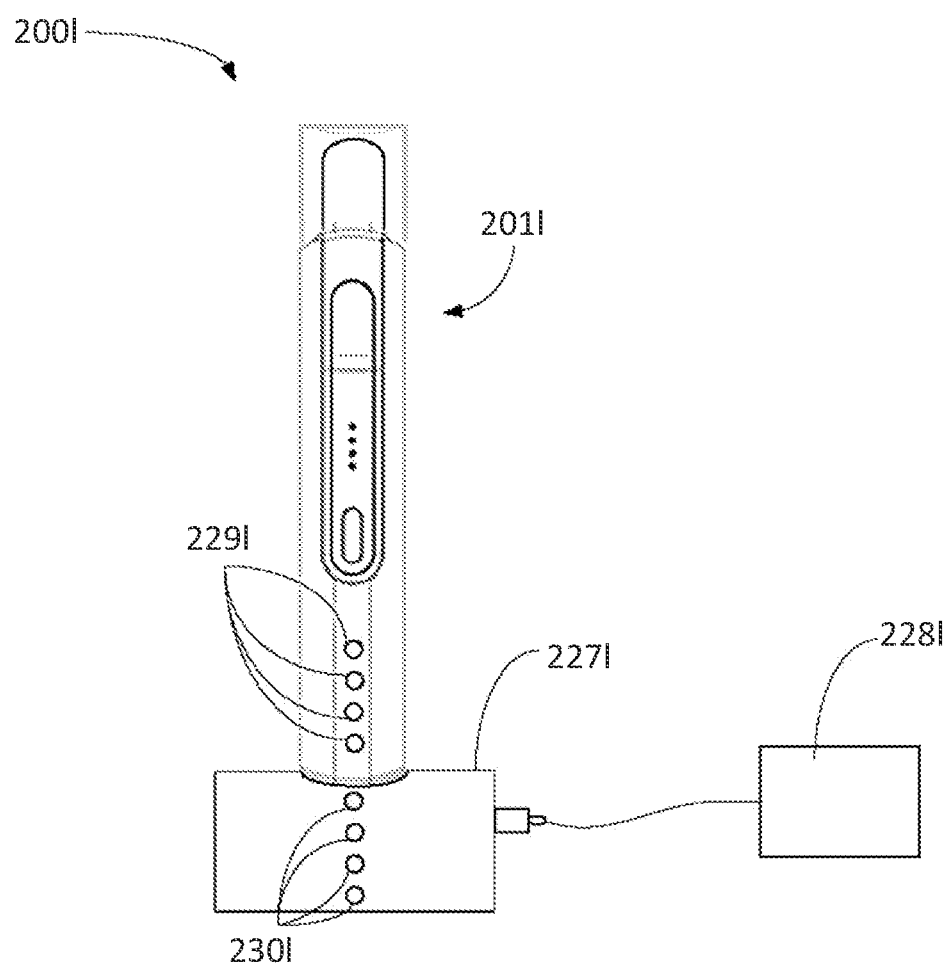
FIG. 37F is front view of second embodiment of the thirteenth mode of the smoking substitute system including a device and a rechargeable power source.

An embodiment 240*l* of the smoking substitute system comprising a smoking substitute device 201*l* and a rechargeable power source 227*l* is illustrated in FIG. 37F.

The smoking substitute device 201*l* comprises a device visual output 229*l* along with the rechargeable battery 205*l* and the device controller 208*l*. The device visual output 229*l* is located on the outer surface of the device 201*l*. As shown in FIG. 37F, the device visual output 229*l* is located on front face of the device 201*l*. In some embodiments, the device visual output 229*l* may be located on rear face or one of side faces of the device 201*l*. The device visual output 229*l* comprises a plurality of device lighting elements arranged in series, along the longitudinal axis of the device. In some embodiments, the device lighting elements comprises LEDs. Any lighting element, known to a person skilled in the art, may be implemented as the device visual output 229*l*.

The rechargeable battery 205*l* of the smoking substitute device 201*l* may be configured to receive power from the rechargeable power source 227*l*. The device controller 208*l* is configured to communicate with the rechargeable power source 227*l*. Based on the communication, the device controller is configured to control the device visual output 229*l* to indicate a battery charge state and/or a charging status of the rechargeable battery of the device 201*l*.

The rechargeable power source 227*l* comprises a power source visual output 230*l*, a rechargeable power source battery (not shown) and a power source controller (not shown). The power source visual output 230*l* is located on an outer surface of the rechargeable power source 227*l*. As shown in FIG. 37F, the power source visual output 230*l* is located on front face of the rechargeable power source 227*l*. In some embodiments, the power source visual output 230*l* may be located on rear face or one of side faces of the rechargeable power source 227*l*. The power source visual output 230*l* comprises a plurality of power source lighting elements arranged in series. In some embodiments, the power source lighting elements comprises LEDs. Any lighting element, known to a person skilled in the art, may be implemented as the power source visual output 230*l*.

In the illustrated embodiment, the device visual output 229*l* and the power source visual output 230*l* includes a predefined number of lighting elements. Number of illuminated lighting elements indicates percentage of charge in respective battery in 25% intervals. For example, the device visual output 229*l* comprises four lighting elements. When one lighting element is illuminated, it may be understood that the rechargeable battery of the device 201*l* is charged for 25%. Similarly, if two lighting elements are illuminated, the device 201*l* is 50% charged and so on. Similar way of understanding the charge percentage may be used for the rechargeable power source 227*l*, as well.

In the illustrated embodiments, the device visual output 229*l* and the power source visual output 230*l* may be located on the device 201*l* and the rechargeable power source 227*l*, respectively, such that the device visual output 229*l* and the power source visual output 230*l* are located on same side of the system. This allows the device visual output 229*l* and the power source visual output 230*l* to be viewed simultaneously.

In the illustrated embodiments, the rechargeable power source battery is configured to charge the device 201*l*. The rechargeable power source battery is configured to be charged using a power supply 228*l*. The power supply may be any external power source such as an electrical wall outlet. The power source controller in the rechargeable power source 227*l* is configured to communicate with the device 201*l*. Based on the communication, the power source controller is configured to control the power source visual output 230*l* to indicate a battery charge state and/or a discharging status of the rechargeable power source battery.

In the illustrated embodiments, the device controller and the power source controller may communication with each other to control the device visual output 229*l* and the power source visual output 230*l*, respectively.

Figure 37G:
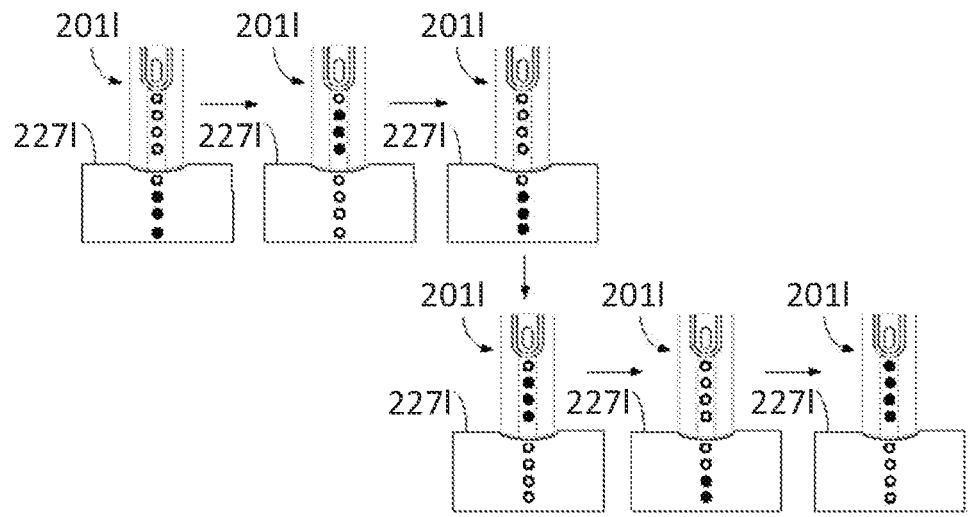
FIG. 37G illustrates alternate illumination of device lighting elements and power source lighting elements in accordance with an aspect of the thirteenth mode.

In the illustrated embodiment, the controlling of the device visual output 229*l* and the power source visual output 230*l* includes providing indication of respective battery charge state and/or respective discharging status in an alternating manner. Alternate illumination of the device lighting elements and the power source lighting elements may be provisioned in the system, to indicate respective battery charge state and/or respective charging/discharging status. FIG. 37G illustrates alternate illumination of the device lighting elements and the power source lighting elements. The device lighting elements of the device visual output 229*l* and the power source lighting elements of the power source visual output 230*l* do not illuminate simultaneously but alternatively. At a first instant, the power source visual output 230*l* indicates the battery charge status of the rechargeable power source battery. At this time, the device visual output 229*l* does not illuminate. At next instant, the device visual output 229*l* indicates the battery status of the rechargeable battery. At this instant, the power source visual output 230*l* does not illuminate. That is, by alternating illumination of the device visual output 229*l* and the power source visual output 230*l*, the battery status of the device 201*l* and the rechargeable power source 227*l* may be indicated.

Figure 37H:
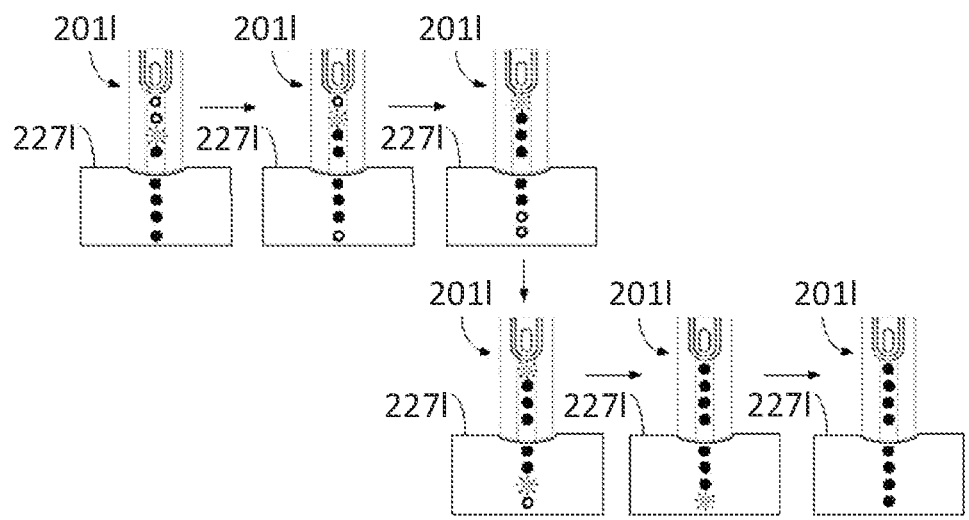
FIG. 37H illustrates sequential illumination of device lighting elements and power source lighting elements in accordance with an aspect of the thirteenth mode.

In some embodiment, the control of the device visual output 229*l* and the power source visual output 230*l* may include to provide indication of respective battery charge state and/or respective charging/discharging status in a sequential manner. Sequential illumination, or coordinated activation of the device lighting elements and the power source lighting elements, may be provided, so as to indicate respective battery charge state and/or respective charging/discharging status. FIG. 37H illustrates the coordinated illumination of the device lighting elements and the power source lighting elements. In the sequential or coordinated manner of illumination, one or more device lighting elements and one or more power source lighting elements are illuminated at same instant of time, based on battery status and/or charging/discharging state. In some embodiments, the illumination may include continuous illumination, where the lighting element illuminates continuously. The illumination may include flash illumination, where the lighting element switches between activated and deactivated illumination. The lighting element of the device visual output 229*l* flashes when the device 201*l* is charged by the rechargeable power source 227*l*. Similarly, the lighting element of the power source visual output 230*l* flashes when the rechargeable power source 227*l* is charged by the power supply 228*l*. In the sequential illumination, the battery status and the charging/discharging state are indicated, in accordance with flow of power from the rechargeable power source 227*l* to the device 201*l*, and from power supply 228*l* to the rechargeable power source 227*l*.

In addition, when the rechargeable power source 227*l* is in electrical communication with both the power supply 228*l* and the device 201*l*, the rechargeable power source 227*l* passes an electric current from the power supply 228*l* to the device 201*l*, so as to prioritize charging of the rechargeable battery over the rechargeable power source battery.

Another embodiment 242*l* of the smoking substitute system comprising a smoking substitute device 201*l* and a rechargeable power source 227*l* is illustrated in FIG. 37*l*.

Figure 37I:
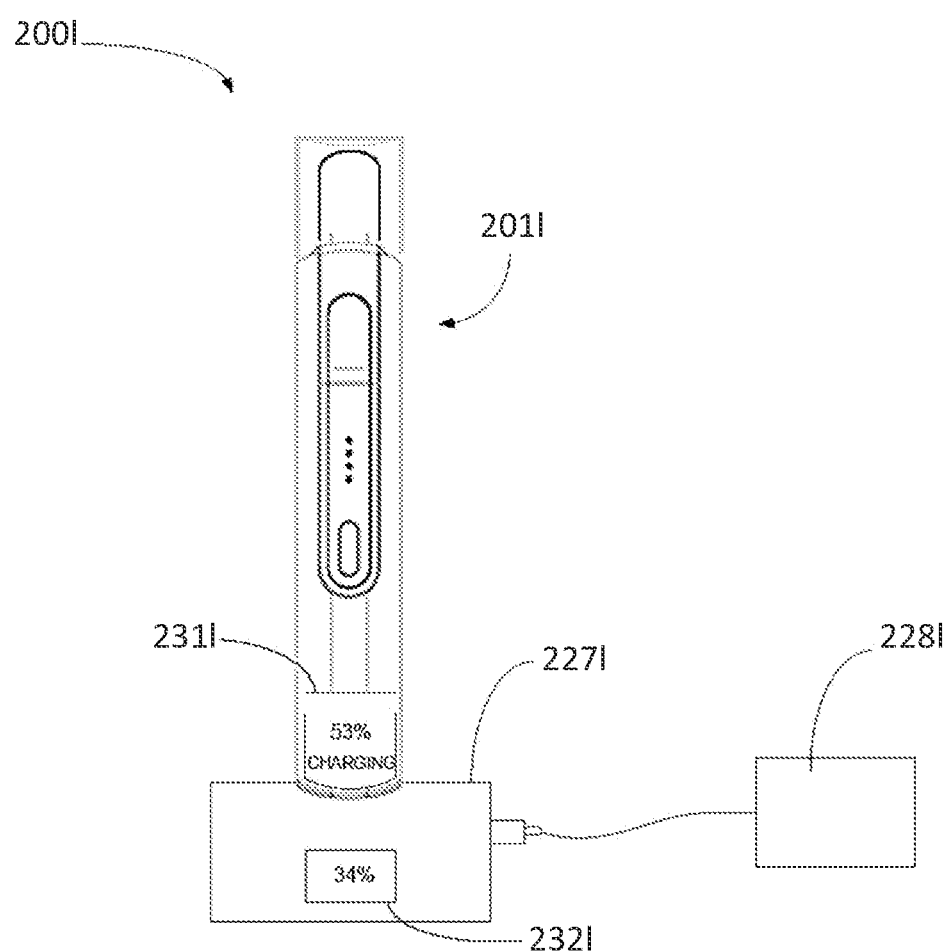
FIG. 37I illustrates operation of device display screen and power source display screen in accordance with an aspect of the thirteenth mode.

The smoking substitute device 201*l* comprises a device display screen 231*l* as the device visual output along with the rechargeable battery and the device controller. The device display screen 231*l* is located on the outer surface of the device 201*l*. As shown in FIG. 37I, the device display screen 231*l* is located on front face of the device 201*l*. In other embodiments, the device display screen 231*l* may be located on rear face or one of side faces of the device 201*l*. The device display screen 231*l* is configured to indicate the battery charge state and/or the charging status of the rechargeable battery of the device 201*l*. As shown in the figure, the battery charge state and/or the charging status may be indicated in form of percentage. The device controller is configured to communicate with the rechargeable power source 227*l*. Based on the communication, the device controller may be configured to control display of the device display screen 231*l*.

The rechargeable power source 227*l* comprises a power source display screen 232*l* along with a rechargeable power source battery and a power source controller. The power source display screen 232*l* is located on an outer surface of the rechargeable power source 227*l*. As shown in FIG. 37I, the power source display screen 232*l* is located on front face of the rechargeable power source 227*l*. In other embodiments, the power source display screen 231*l* may be located on rear face or one of side faces of the rechargeable power source 227*l*. The power source display screen 232*l* is configured to indicate the battery charge state and/or the discharging status of the power source rechargeable battery of the rechargeable power source 227*l*. As shown in the figure, the battery charge state and/or the discharging status are indicated in form of percentage. The power source controller is configured to communicate with the device 201*l*. Based on the communication, the power source controller is configured to control display of the power source display screen 232*l*. The charging state and the discharging state of the device 201*l* and the rechargeable power source are displayed in respective display screen.

Figure 37J:
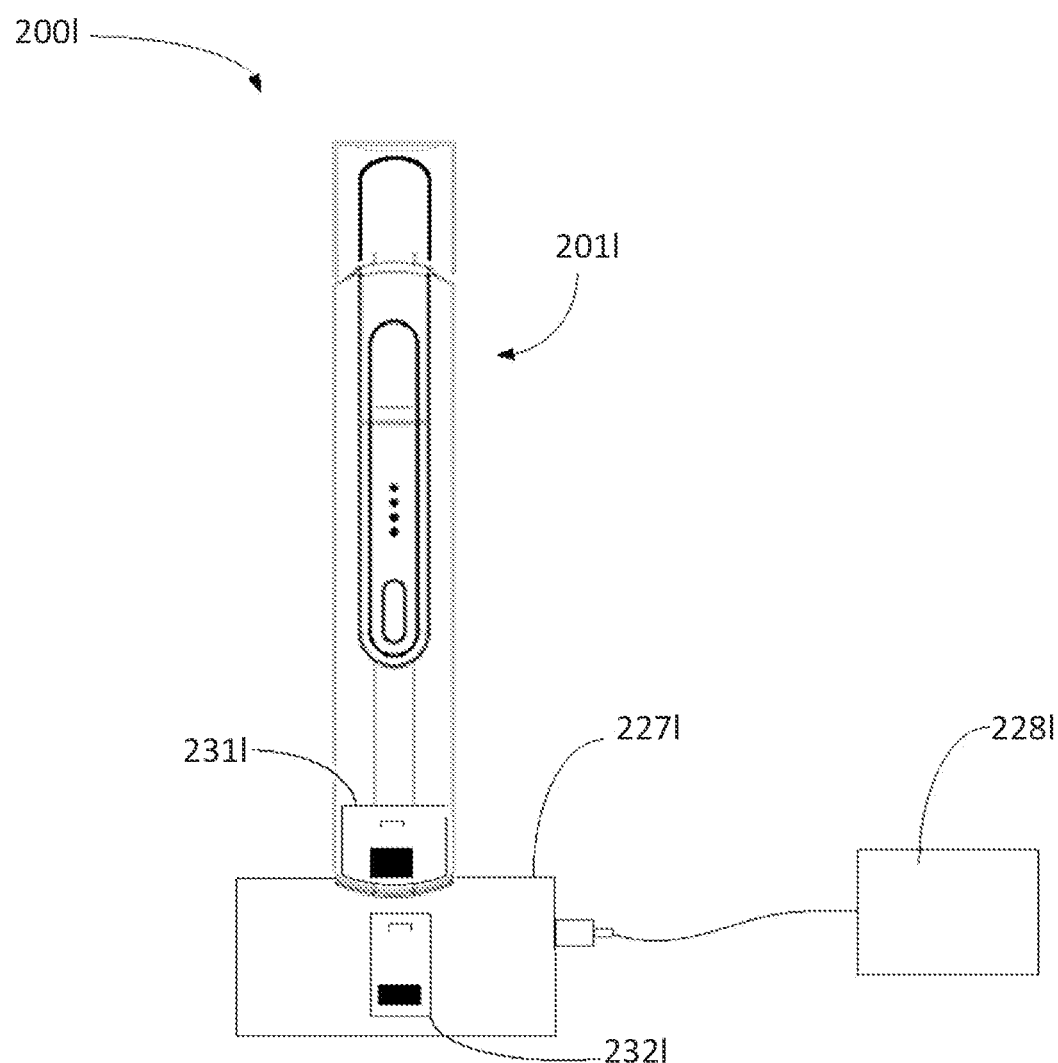
FIG. 37J illustrates operation of device display screen and power source display screen in accordance with an aspect of the thirteenth mode.

In some embodiments, the device display screen 231*l* and the power source display screen 232*l* may be configured to display the battery charge status and/or charging/discharging state using an indicator bar as shown in another embodiment 244*l* in FIG. 37J. The battery charge status is graphically displayed by percentage of region illuminated in the indicator bar. The charging state and discharging state may be understood when illumination is flashed.

In some embodiments, the device display screen 231*l* and the power source display screen 232*l* may be configured to display the battery charge status and/or charging/discharging state in one of the sequential manner or the alternating manner.

Figure 38A:
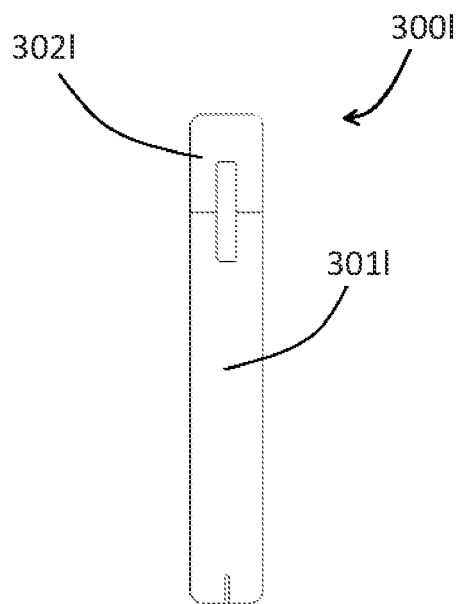
FIG. 38A is a front view of a second embodiment of the thirteenth mode of the smoking substitute system with the consumable engaged with the device.
Figure 38B:
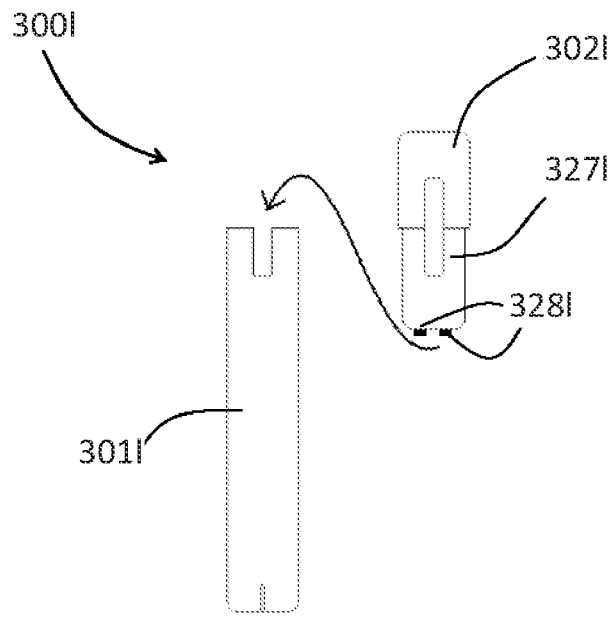
FIG. 38B is a front view of a second embodiment of the thirteenth mode of the smoking substitute system with the consumable disengaged from the device.

FIG. 38A and FIG. 38B illustrate an e-cigarette smoking substitute system 300*l*. The system 300*l* is an example of the systems 100*l*, 100*l*' of FIG. 36A and FIG. 36B and comprises an e-cigarette device 301*l* and an e-cigarette consumable 302*l*. The description of FIG. 36A and FIG. 36B above is applicable to the system of FIG. 38A and FIG. 38B and will not be repeated.

The device 301*l* and the consumable 302*l* are configured such that the consumable 302*l* can be engaged with the device 301*l*. FIG. 38A shows the device 301*l* and the consumable 302*l* in an engaged state, whilst FIG. 38B shows the device 301*l* and the consumable 302*l* in a disengaged state. During engagement a portion of the consumable 302*l* is received in a cavity 322*l* of the device 301*l*. The consumable 302*l* is retained in the device 301*l* via an interference fit (although in other embodiments, the device and consumable could be engaged by screwing one onto (or onto) the other, through a bayonet fitting, or by way of a snap engagement mechanism).

The consumable 302*l* includes a tank 327*l*. The tank 327*l* defines a reservoir for the storage of an aerosol-former, which in this embodiment, is in the form of e-liquid.

In this present embodiment, the consumable 302*l* is a "single-use" consumable. That is, upon exhausting the e-liquid in the tank 327*l*, the intention is that the user disposes of the whole consumable 302*l*. In other embodiments, the e-liquid (i.e., aerosol former) may be the only part of the system that is truly "single-use". In such embodiments, the tank may be refillable with e-liquid, or the e-liquid may be stored in a non-consumable component of the system. For example, the e-liquid may be stored in a tank located in the device or stored in another component that is itself not single-use (e.g., a refillable cartomizer).

In the illustrated system 300*l*, a heater 304*l* is located in the consumable 302*l* and is configured to heat and vaporize the e-liquid (stored in the tank 327*l*). Although not shown, the heater 304*l* comprises a porous wick and a resistive heating element. The porous wick conveys e-liquid from the tank 327*l* to the heating element. The heating element is a heating filament that is helically wound around a portion of the porous wick, such that when the heating element is heated (e.g., by the action of electrical current passing through the heating element), heat is transferred from the heating element to the e-liquid conveyed by the wick. This transfer of heat vaporizes the e-liquid, and the resultant vapor is entrained in an airflow passing through the consumable 302*l* (i.e., driven by a user drawing on a downstream end 318*l* of the consumable 302*l*). Between the vaporization point at the coil and the downstream end 318*l* (i.e., the mouth end), the vapor condenses into an aerosol, and is subsequently inhaled by the user.

Like the previously described embodiment, the device 301*l* comprises a power source in the form of a rechargeable battery (not shown) and a connector in the form of a USB port (not shown). The device 301*l* further comprises controller (also not shown). The rechargeable battery, connector and controller are similar (and operate in a similar manner) to the corresponding components of the embodiment described above with respect to FIG. 36A to FIG. 36E.

The consumable 302*l* includes a pair of heater electrical contacts 328*l* disposed on a device-facing end surface of the consumable 302*l*. The heater electrical contacts 328*l* are electrically connected to the heater 304*l* in the consumable 302*l*, such that a voltage applied across the heater electrical contacts 328*l* generally corresponds to a voltage applied across the resistive heating element of the heater 304*l*.

When the consumable 302*l* is engaged with the device 301*l*, the heater electrical contacts 328*l* are brought into electrical contact with corresponding device electrical contacts (not shown) on the device 301*l*. The device electrical contacts are electrically connected (directly or indirectly) to the rechargeable battery. The controller may thus be configured to control the voltage applied across the device electrical contacts from the rechargeable battery. By controlling the voltage applied across the device electrical contacts, the voltage applied to the heater 304*l* is correspondingly controlled.

The device 301*l* includes an output means (forming part of the UI of the system 300*l*) in the form of a single light-emitting diode ("LED") 311*l*. The LED 311*l* is operatively connected to the controller, such that controller can control the illumination of the LED 311*l*. The controller is configured to illuminate the LED when then the heater 304*l* is active.

The device 301*l* also includes an input means in the form of a puff sensor (not shown). The puff sensor is the same as that described above with respect to the embodiment shown in FIG. 36A to FIG. 36E.

Fourteenth Mode: Detecting the Receipt of a Consumable in a Cavity of a Smoking Substitute Device.

Aspects and embodiments of the fourteenth mode of the present disclosure will now be discussed with reference to the accompanying figures. Further aspects and embodiments will be apparent to those skilled in the art. All documents mentioned in this text are incorporated herein by reference.

Figure 39A:
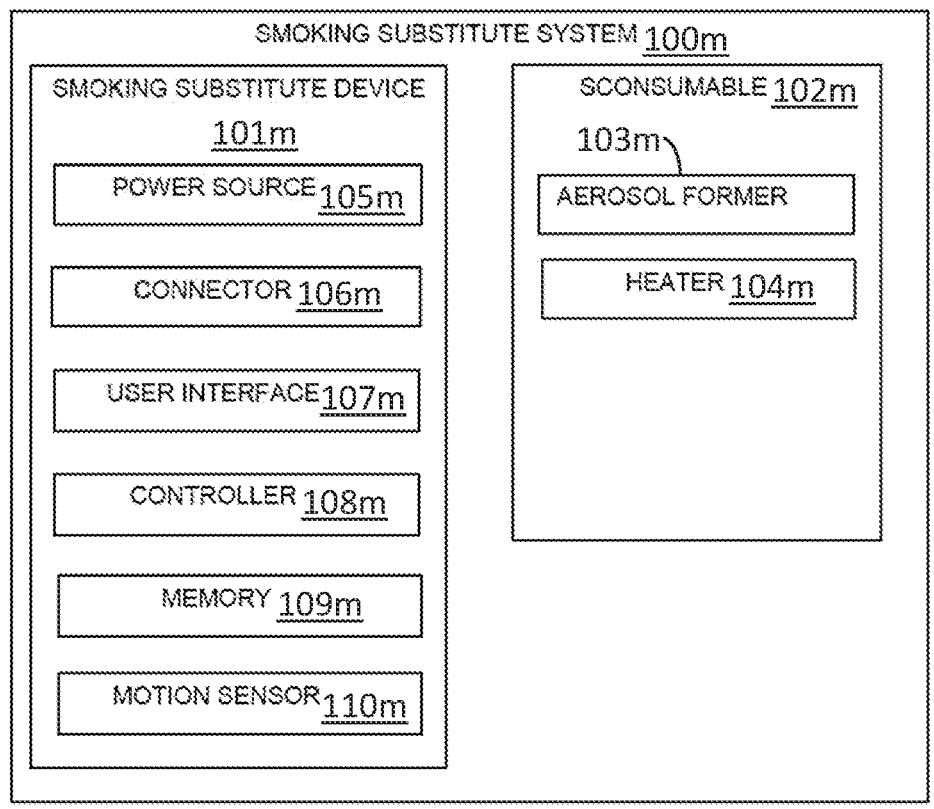
FIG. 39A is a schematic of a fourteenth mode of the smoking substitute system.

FIG. 39A is a schematic providing a general overview of a smoking substitute system 100*m*. The system 100*m* includes a substitute smoking device 101*m* and an aerosol-forming article in the form of a consumable 102*m*, which comprises an aerosol former 103*m*. The system is configured to vaporize the aerosol former by heating the aerosol former 103*m* (so as to form a vapor/aerosol for inhalation by a user).

In the illustrated system, the heater 104*m* forms part of the consumable 102*m* and is configured to heat the aerosol former 103*m*. In this variation, the heater 104*m* is electrically connectable to the power source 105*m*, for example, when the consumable 102*m* is engaged with the device 101*m*. Heat from the heater 104*m* vaporizes the aerosol former 103*m* to produce a vapor. The vapor subsequently condenses to form an aerosol, which is ultimately inhaled by the user.

The system 100*m* further comprises a power source 105*m* that forms part of the device 101*m*. In other embodiments the power source 105*m* may be external to (but connectable to) the device 101*m*. The power source 105*m* is electrically connectable to the heater 104*m* such that the power source 105*m* is able to supply power to the heater 104*m* (i.e., for the purpose of heating the aerosol former 103*m*). Thus, control of the electrical connection of the power source 105*m* to the heater 104*m* provides control of the state of the heater 104*m*. The power source 105*m* may be a power store, for example a battery or rechargeable battery (e.g., a lithium-ion battery).

The system 100*m* further comprises an I/O module comprising a connector 106*m* (e.g., in the form of a USB port, Micro USB port, USB-C port, etc.). The connector 106*m* is configured for connection to an external source of electrical power, e.g., a mains electrical supply outlet. The connector 106*m* may be used in substitution for the power source 105*m*. That is the connector 106*m* may be electrically connectable to the heater 104*m* so as to supply electricity to the heater 104*m*. In such embodiments, the device may not include a power source, and the power source of the system may instead comprise the connector 106*m* and an external source of electrical power (to which the connector 106*m* provides electrical connection).

In some embodiments, the connector 106*m* may be used to charge and recharge the power source 105*m* where the power source 105*m* includes a rechargeable battery.

The system 100*m* also comprises a user interface (UI) 107*m*. Although not shown, the UI 107*m* may include input means to receive commands from a user. The input means of the UI 107*m* allows the user to control at least one aspect of the operation of the system 100*m*. The input means may, for example, be in the form of a button, touchscreen, switch, microphone, etc.

The UI 107*m* also comprises output means to convey information to the user. The output means may, for example, comprise lights (e.g., LEDs), a display screen, speaker, vibration generator, etc.

The system 100*m* further comprises a controller 108*m* and a memory 109*m* operatively coupled to the controller 108*m*. In the illustrated embodiment, the controller 108*m* is a component of the device 101*m*, but in other embodiments may be separate from (but connectable to) the device 101*m*. The controller 108*m* is configured to detect, with the help of a sensor, the presence of a consumable 102*m* within a cavity (not shown) of the device 101*m*. Further, the memory stores controller-executable instructions that causes the controller 108*m* to perform one or more functions. The controller 108*m* is configured to control the operation of the heater 104*m* and, for example, may be configured to control the voltage applied from the power source 105*m* to the heater 104*m*. The controller 108*m* may be configured to toggle the supply of power to the heater 104*m* between an on state, in which the full output voltage of the power source 105*m* is applied to the heater 104*m*, and an off state, in which the no voltage is applied to the heater 104*m*.

Although not shown, the system 100*m* may also comprise a voltage regulator to regulate the output voltage from the power source 105*m* to form a regulated voltage. The regulated voltage may then be applied to the heater 104*m*.

In addition to being connected to the heater 104*m*, the controller 108*m* is operatively connected to the UI 107*m*. Thus, the controller 108*m* may receive an input signal from the input means of the UI 107*m*. Similarly, the controller 108*m* may transmit output signals to the UI 107*m*. In response, the output means of the UI 107*m* may convey information, based on the output signals, to a user.

Further, the system 100*m* also comprises a sensor 110*m* coupled with the controller 108*m* within the smoking substitute device 101*m*. Sensor 110*m* may be for example a pressure sensor or a microphone. In particular, the sensor 110*m* may be mounted inside the cavity (not shown) of the smoking substitute device 101*m* and operatively connected to the controller 108*m*. A pressure differential is established across the pressure sensor as a consumable is inserted into the cavity. The sensor detects this differential and communicates with the controller, which responds by activating the heater. The same sensor 110*m* also detects a pressure differential when the user inhales through the consumable, this pressure differential being in the opposite direction to the differential set up during insertion of the consumable. In this embodiment, the sensor communicates with the controller, which increases the power supplied to the heater for a short period when inhalation by the user is detected.

Figure 39B:
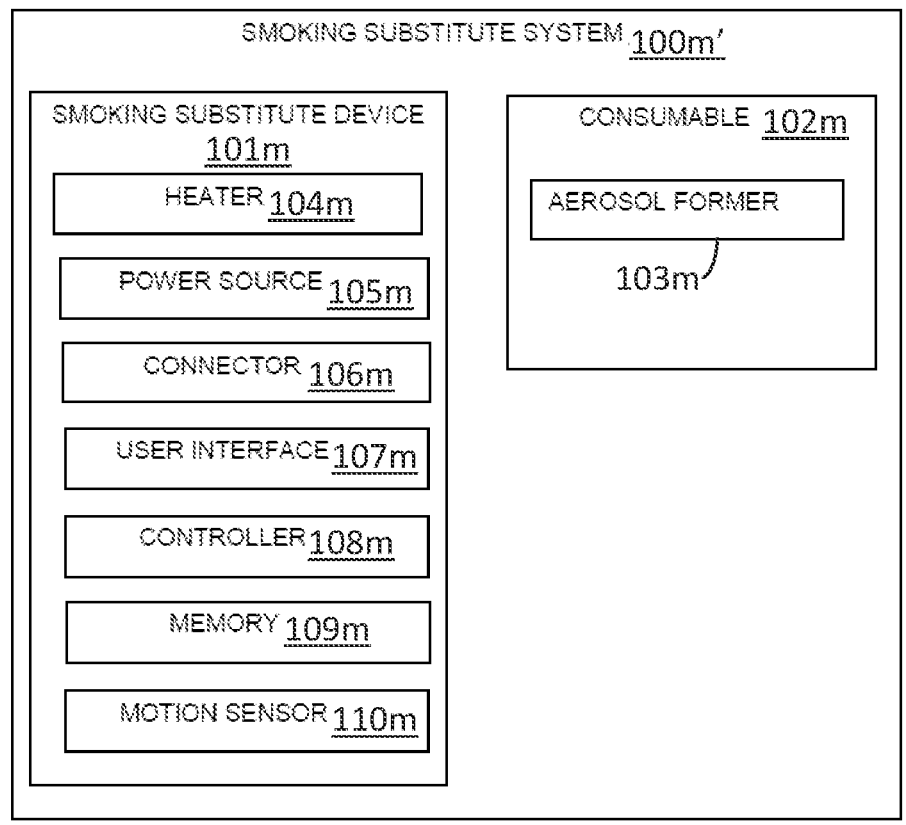
FIG. 39B is a schematic of a variation of the fourteenth mode of the smoking substitute system of FIG. 39A.

FIG. 39B is a schematic showing a variation of the system 100*m* of FIG. 39A. In the system 100*m*' of FIG. 39B, the heater 104*m* forms part of the device 101*m*, rather than the consumable 102*m*. In this variation, the heater 104*m* is electrically connected to the power source 105*m*.

Figure 40A:
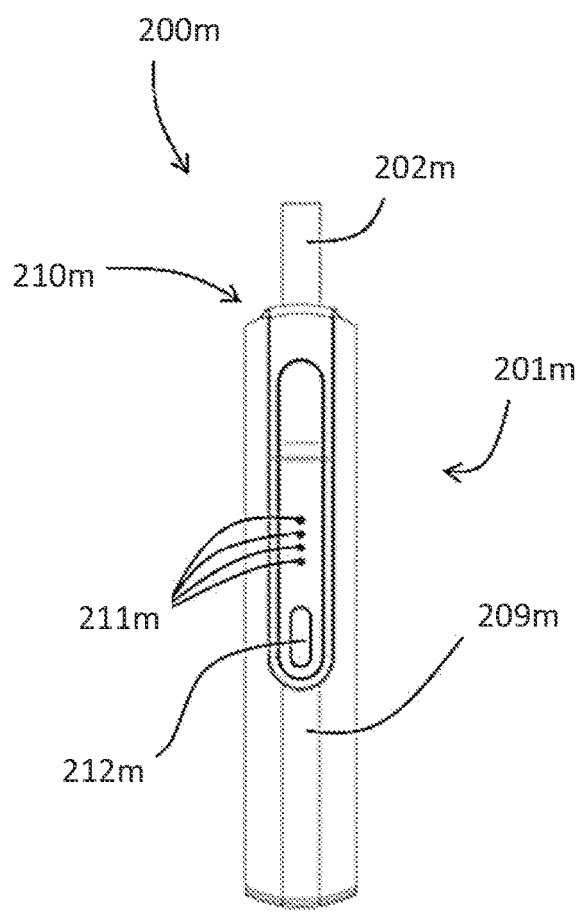
FIG. 40A is a front view of a first embodiment of the fourteenth mode of the smoking substitute system with the consumable engaged with the device.
Figure 40B:
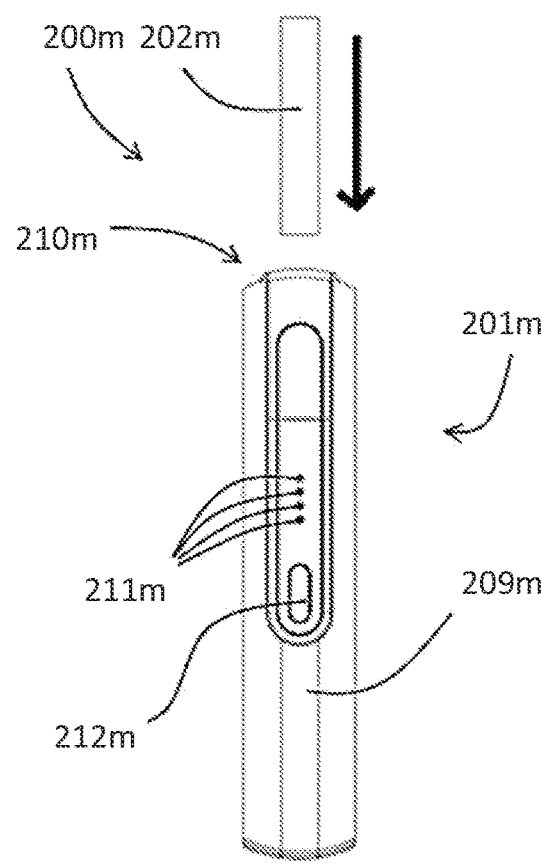
FIG. 40B is a front view of the first embodiment of the fourteenth mode of the smoking substitute system with the consumable disengaged from the device.

FIG. 40A and FIG. 40B illustrate a heated-tobacco (HT) smoking substitute system 200*m*. The system 200*m* is an example of the systems 100*m*, 100*m*' described in relation to FIG. 39A or FIG. 39B. System 200*m* includes an HT device 201*m* and an HT consumable 202*m*. The description of FIG. 39A and FIG. 39B above is applicable to the system 200*m* of FIG. 40A and FIG. 40B and will not be repeated.

The device 201*m* and the consumable 202*m* are configured such that the consumable 202*m* can be engaged with the device 201*m*. FIG. 40A shows the device 201*m* and the consumable 202*m* in an engaged state, whilst FIG. 40B shows the device 201*m* and the consumable 202*m* in a disengaged state.

The device 201*m* comprises a body 209*m* and cap 210*m*. In use the cap 210*m* is engaged at an end of the body 209*m*. Although not apparent from the figures, the cap 210*m* is moveable relative to the body 209*m*. In particular, the cap 210*m* is slidable and can slide along a longitudinal axis of the body 209*m*.

The device 201*m* comprises an output means (forming part of the UI of the device 201*m*) in the form of a plurality of light-emitting diodes (LEDs) 211*m* arranged linearly along the longitudinal axis of the device 201*m* and on an outer surface of the body 209*m* of the device 201*m*. A button 212*m* is also arranged on an outer surface of the body 209*m* of the device 201*m* and is axially spaced (i.e., along the longitudinal axis) from the plurality of LEDs 211*m*.

Figure 40C:
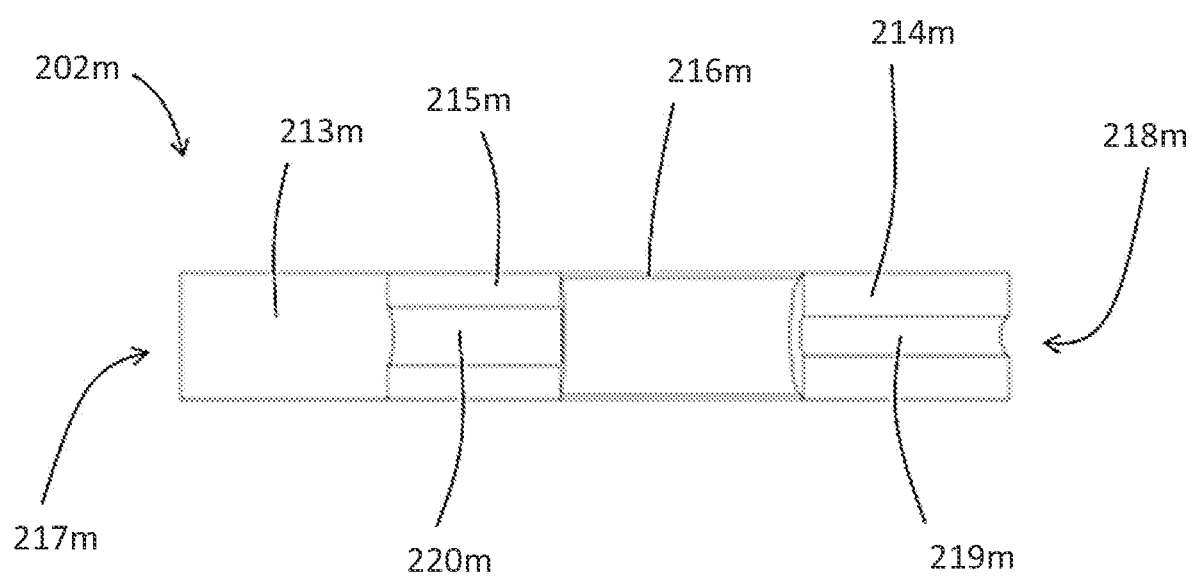

FIG. 40C show a detailed section view of the consumable 202*m* of the system 200*m*. The consumable 202*m* generally resembles a cigarette. In that respect, the consumable 202*m* has a generally cylindrical form with a diameter of 7 mm and an axial length of 70 mm. The consumable 202*m* comprises an aerosol forming substrate 213*m*, a terminal filter element 215*m*, an upstream filter element 215*m* and a spacer element 216*m*. In other embodiments, the consumable may further comprise a cooling element. A cooling element may exchange heat with vapor that is formed by the aerosol-forming substrate 213*m* in order to cool the vapor so as to facilitate condensation of the vapor.

The aerosol-forming substrate 213*m* is substantially cylindrical and is located at an upstream end 217*m* of the consumable 202*m* and comprises the aerosol former of the system 200*m*. In that respect, the aerosol forming substrate 213*m* is configured to be heated by the device 201*m* to release a vapor. The released vapor is subsequently entrained in an airflow flowing through the aerosol-forming substrate 213*m*. The airflow is produced by the action of the user drawing on a downstream end 218*m* (i.e., terminal or mouth end) of the consumable 202*m*.

In the present embodiment, the aerosol forming substrate 213*m* comprises tobacco material that may, for example, include any suitable parts of the tobacco plant (e.g., leaves, stems, roots, bark, seeds, and flowers). The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon). For example, the aerosol-forming substrate 213*m* may comprise a gathered sheet of homogenized (e.g., paper/slurry recon) tobacco or gathered shreds/strips formed from such a sheet.

In order to generate an aerosol, the aerosol forming substrate 213m comprises at least one volatile compound that is intended to be vaporized/aerosolized and that may provide the user with a recreational and/or medicinal effect when inhaled. The aerosol-forming substrate 213m may further comprise one or more additives. For example, such additives may be in the form of humectants (e.g., propylene glycol and/or vegetable glycerin), flavorants, fillers, aqueous/non-aqueous solvents and/or binders.

The terminal filter element 214m is also substantially cylindrical and is located downstream of the aerosol forming substrate 213m at the downstream end 218m of the consumable 202m. The terminal filter element 214m is in the form of a hollow bore filter element having a bore 219m (e.g., for airflow) formed therethrough. The diameter of the bore 219m is 2 mm. The terminal filter element 214m is formed of a porous (e.g., monoacetate) filter material. As set forth above, the downstream end 218m of the consumable 202m (i.e., where the terminal filter 214m is located) forms a mouthpiece portion of the consumable 202m upon which the user draws. Airflow is drawn from the upstream end 217m, thorough the components of the consumable 202m, and out of the downstream end 218m. The airflow is driven by the user drawing on the downstream end 218m (i.e., the mouthpiece portion) of the consumable 202m.

The upstream filter element 215m is located axially adjacent to the aerosol-forming substrate 213m, between the aerosol-forming substrate 213m and the terminal filter element 214m. Like the terminal filter 214m, the upstream filter element 215m is in the form of a hollow bore filter element, such that it has a bore 220m extending axially therethrough. In this way, the upstream filter 215m may act as an airflow restrictor. The upstream filter element 215m is formed of a porous (e.g., monoacetate) filter material. The bore 220m of the upstream filter element 214m has a larger diameter (3 mm) than the terminal filter element 214m.

The spacer 216m is in the form of a cardboard tube, which defines a cavity or chamber between the upstream filter element 215m and the terminal filter element 214m. The spacer 216m acts to allow both cooling and mixing of the vapor/aerosol from the aerosol-forming substrate 213m. The spacer has an external diameter of 7 mm and an axial length of 14 mm.

Although not apparent from the figure, the aerosol-forming substrate 213m, upstream filter 215m and spacer 216m are circumscribed by a paper wrapping layer. The terminal filter 214m is circumscribed by a tipping layer that also circumscribes a portion of the paper wrapping layer (so as to connect the terminal filter 214m to the remaining components of the consumable 202m). The upstream filter 215m and terminal filter 214m are circumscribed by further wrapping layers in the form of plug wraps.

Figure 40D:
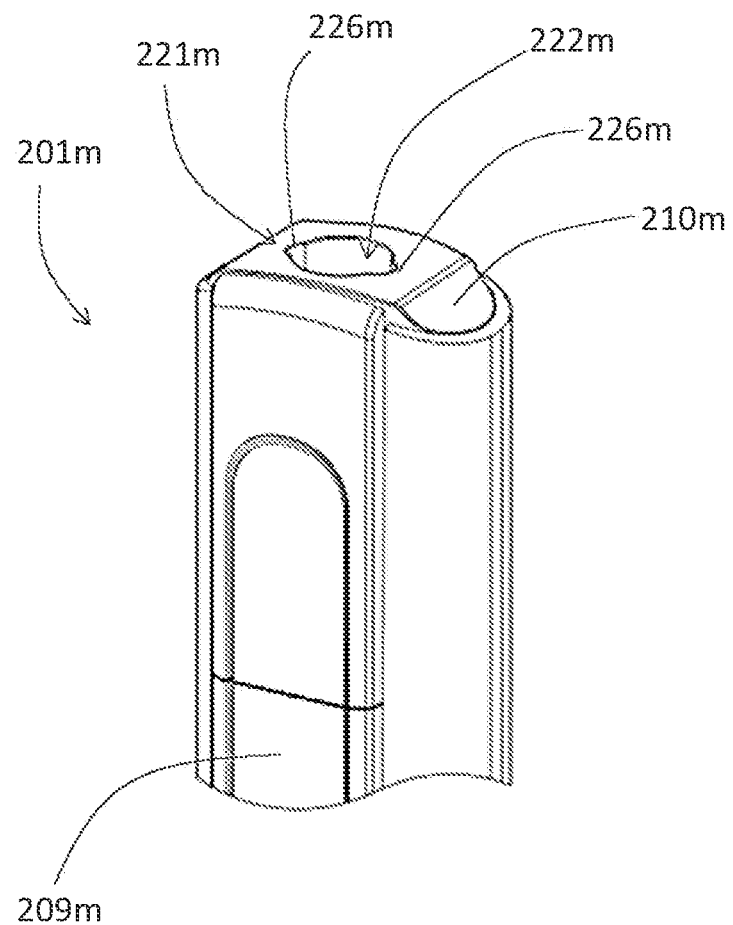

Returning now to the device 201m, FIG. 40D illustrates a detailed view of the end of the device 201m that is configured to engage with the consumable 202m. The cap 210m of the device 201m includes an opening 221m to an internal cavity 222m (more apparent from FIG. 40D) defined by the cap 210m. The opening 221m and the cavity 222m are formed so as to receive at least a portion of the consumable 202m. Precisely, the cavity 222m is configured for receiving the consumable 202m. During engagement of the consumable 202m with the device 201m, a portion of the consumable 202m is received through the opening 221m and into the cavity 222m. After engagement (see FIG. 40B), the downstream end 218m of the consumable 202m protrudes from the opening 221m and thus also protrudes from the device 201m. The opening 221m includes laterally disposed notches 226m. When a consumable 202m is received in the opening 221m, these notches 226m remain open and could, for example, be used for retaining a cover in order to cover the end of the device 201m.

Figure 40E:
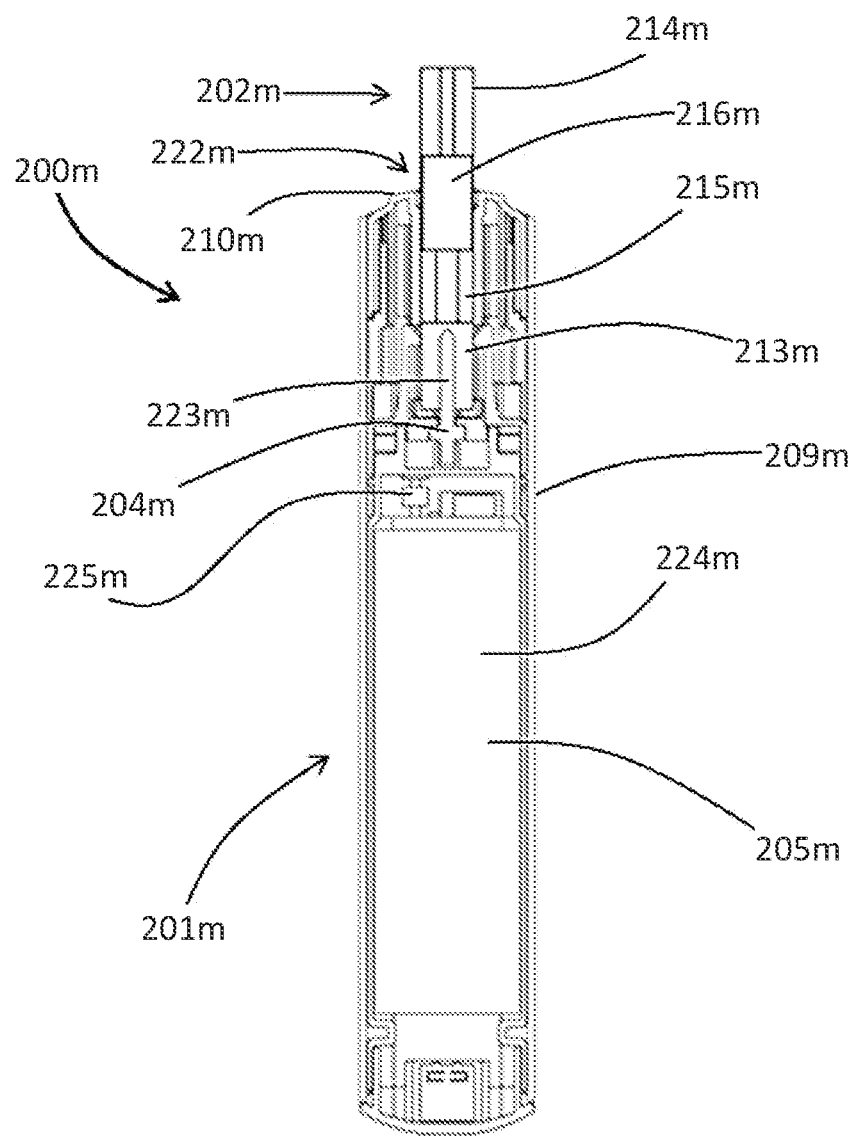

FIG. 40E shows a cross section through a central longitudinal plane through the device 201m. The device 201m is shown with the consumable 202m engaged therewith.

The device 201m comprises a heater 204m comprising heating element 223m. The heater 204m forms part of the body 209m of the device 201m and is rigidly mounted to the body 209m. In the illustrated embodiment, the heater 204m is a rod heater with a heating element 223m having a circular transverse profile. In other embodiments the heater may be in the form of a blade heater (e.g., heating element with a rectangular transverse profile) or a tube heater (e.g., heating element with a tubular form).

The heating element 223m of the heater 204m projects from an internal base of the cavity 222m along a longitudinal axis towards the opening 221m. As is apparent from the figure, the length (i.e., along the longitudinal axis) of the heating element is less than a depth of the cavity 222m. In this way, the heating element 223m does not protrude from or extend beyond the opening 221m.

When the consumable 202m is received in the cavity 222m (as is shown in FIG. 40E), the heating element 223m penetrates the aerosol-forming substrate 213m of the consumable 202m. In particular, the heating element 223m extends for nearly the entire axial length of the aerosol-forming substrate 213m when inserted therein. Thus, when the heater 204m is activated, heat is transferred radially from an outer circumferential surface the heating element 223m to the aerosol-forming substrate 213m.

The device 201m further comprises an electronics cavity 224m. A power source, in the form of a rechargeable battery 205m (a lithium-ion battery), is located in electronics cavity 224m.

The device 201m includes a connector (i.e., forming part of an IO module of the device 201m) in the form of a USB port 206m. The connector may alternatively be, for example, a micro-USB port or a USB-C port for examples. The USB port 206m may be used to recharge the rechargeable battery 205m.

The device 201m includes a controller (not shown) located in the electronics cavity 224m. The controller comprises a microcontroller mounted on a printed circuit board (PCB). The USB port 206m is also connected to the controller 208m (i.e., connected to the PCB and microcontroller).

The sensor 110m is configured to detect the receipt of the consumable 202m in the cavity 222m. In an exemplary embodiment, the sensor 110m may be configured to detect the receipt of the consumable 202m in the cavity 222m based on determination of differential pressure generated during the insertion of the consumable 202m in the cavity 222m. Such determination of differential pressure may be accomplished by the pressure sensor 110m mounted inside the cavity 222m. Precisely, the pressure differential created inside the cavity 222m across the pressure sensor 110m during the insertion of consumable 202m is detected by the pressure sensor 110m and is passed to the controller 208m. In another exemplary embodiment, the device 201m may further include a microphone (not shown) mounted within the cavity 222m for detecting insertion of consumable 202m in the cavity 222m. The microphone (not shown) is configured to detect the insertion of consumable 202m inside the cavity 222m by measuring the sound signals generated during the insertion of consumable 202m in the cavity 222m of the device 201m.

The sensor 110m is further configured to differentiate between the insertion of consumable 202m in the cavity 222m and inhalation through the consumable by user. It is well appreciated by the skilled person that both (i) insertion of consumable 202m in the cavity 222m and (ii) inhalation by the user, create a pressure differential across the pressure sensor inside the cavity 222m. To differentiate insertion of consumable 202m in the cavity 222m from inhalation by the user, the sensor 110m is able to detect the pressure differentials set up by both insertion of consumable 202m in the cavity 222m and inhalation through the consumable by the user. The pressure differential set up when inserting a consumable is in the opposite direction to the differential set up when the user puffs on the consumable, allowing the controller 208m to distinguish the two scenarios when it receives the signal from the sensor 110m.

For example, if the insertion of the consumable 202m inside the cavity 222m creates a positive pressure differential, then the inhalation of puff by the user creates a negative pressure differential. Therefore, the first pressure differential and the second pressure differential may be considered to have opposite polarity.

In another illustrative embodiment, the sensor 110m or a further sensor (not shown) may be configured to detect the withdrawal of consumable 202m from the cavity 222m. To detect the withdrawal of consumable 202m from the cavity 222m, the device 201m may use the pressure sensor 110m to detect a third pressure differential created, inside the cavity 222m, due to the withdrawal of the consumable 202m from the cavity 222m. In one aspect, to differentiate between the first, the second and the third pressure differentials created due to insertion of consumable 202m in the cavity 222m, puff inhalations drawn by user and withdrawal of consumable 202m from the cavity 222m respectively, the controller may utilize a reference pressure value stored in the memory (not shown).

The controller 208m is configured to control at least one function/control action of the device 201m. In one exemplary embodiment, the controller is configured to perform, in response to detecting the receipt of consumable 202m in the cavity 222m, at least one of the following control actions: switch the device 201m from child safety mode (CSM) to normal mode, increase the power supplied to the heater, indicate battery charge status, etc. Further, the controller 208m is configured to control the operation of the heater 204m. Such control of the operation of the heater 204m may be accomplished by the controller toggling the electrical connection of the rechargeable battery 205m to the heater 204m. For example, the controller 208m is configured to control the heater 204m in response to a user depressing the button 212m. Depressing the button 212m may cause the controller to allow a voltage (from the rechargeable battery 205m) to be applied to the heater 204m (so as to cause the heating element 223m to be heated). In addition, the controller (not shown) is configured to activate the heater 204m upon detecting the receipt of consumable 202m in the cavity 222m.

The controller is also configured to control the LEDs 211m in response to (e.g., a detected) a condition of the device 201m or the consumable 202m. In one example, the controller may control the LEDs to indicate whether the device 201m is in an on state or an off state (e.g., one or more of the LEDs may be illuminated by the controller when the device is in an on state). In another example, the controller may control the LEDs 211m to indicate the charge status of the device 201m upon detecting the receipt of consumable 202m in the cavity 222m.

The device 201m comprises a further input means (i.e., in addition to the button 212m) in the form of a puff sensor 225m. The puff sensor 225m is configured to detect a user drawing (i.e., inhaling) at the downstream end 218m of the consumable 202m. The puff sensor 225m may, for example, be in the form of a pressure sensor, a flowmeter, or a microphone. The puff sensor 225m is operatively connected to the controller 208m in the electronics cavity 224m, such that a signal from the puff sensor 225m, indicative of a puff state (i.e., drawing or not drawing), forms an input to the controller 208m (and can thus be responded to by the controller 208m). It is to be noted that the sensor 110m denoted in FIG. 39 and puff sensor 225m denoted in FIG. 40E are same and may be used interchangeably.

Figure 41:
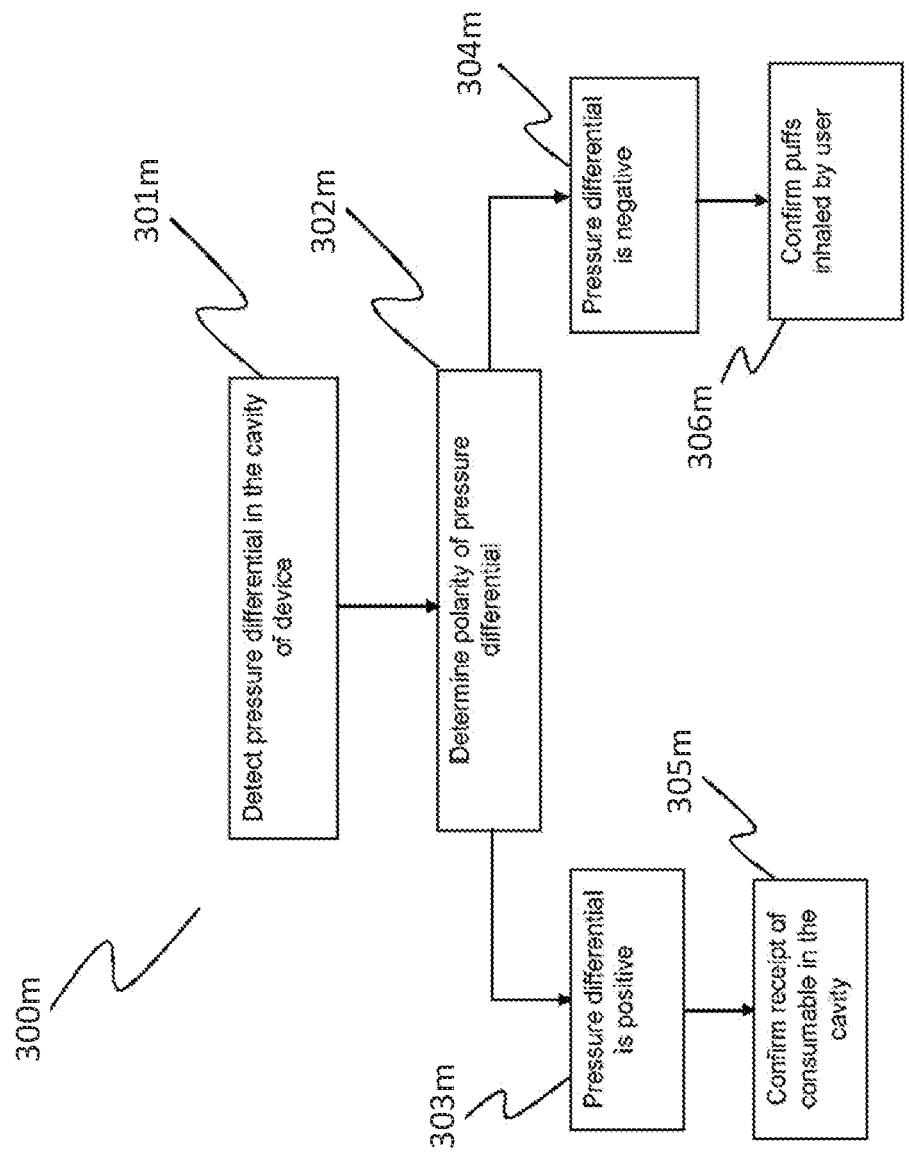

FIG. 41 illustrates flowchart of method of detecting the receipt of a consumable in the cavity.

As illustrated in FIG. 41, the method 300m includes one or more blocks implemented by the controller 208m of the device 201m. The method 300m may be described in the general context of controller executable instructions. Generally, controller executable instructions may include routines, programs, objects, components, data structures, procedures, modules, and functions, which perform particular functions or implement particular abstract data types.

The order in which the method 300m is described is not intended to be construed as a limitation, and any number of the described method blocks can be combined in any order to implement the method 300m. Additionally, individual blocks may be deleted from the method 300m without departing from the scope of the subject-matter described herein. Furthermore, the method 300m can be implemented in any suitable hardware, software, firmware, or combination thereof.

At block 301m, the sensor 110m detects a pressure differential in the cavity 222m of the device 201m. A pressure differential across the sensor may arise due to, e.g., insertion of the consumable 202m in the cavity 222m, or inhalation through the consumable by a user. The pressure differential measured by the sensor 110m is passed to the controller 208m for further processing.

At block 302m, the controller 208m determines whether the pressure differential detected at step 301m is in a first direction/sense ("positive") or in a second direction/sense ("negative"). In one exemplary embodiment, a positive differential may be created, in the cavity 222m, due to the insertion of a consumable 202m into the cavity 222m. A negative pressure differential may be created due to the inhalation of at least one puff by the user.

At block 303m, the controller 208m determines that the pressure differential created inside the cavity 222m is positive. In response, at block 305m, the controller 208m confirms the receipt of consumable 202m in the cavity 222m of the device.

At block 304m, the controller determines that the pressure differential created inside the cavity 222m is negative. In response, at block 306m the controllers 208m confirms that at least one puff is inhaled by the user.

Although not depicted in FIG. 41, the controller 208m is configured to perform, in response to detecting the receipt of consumable 202m in the cavity 222m, at least one of the following control actions: switching the device 201m from the child safety mode (CSM) to normal mode, increasing power of the heater, indicating battery charge status, etc.

Further the controller 208*m* is also configured for activating the heater 204*m* upon detecting the receipt of consumable 202*m* in the cavity 222*m*.

Although not explicitly mentioned in FIG. 41, the controller 208*m* is configured to detect the withdrawal of consumable 202*m* from the cavity 222*m*. For detecting the withdrawal of consumable 202*m* from the cavity 222*m* the device 201*m* may use the same pressure sensor 110*m* to detect a third differential created, inside the cavity 222*m*, due the withdrawal of the consumable 202*m* from the cavity 222*m*.

Fifteenth Mode: A Heat-not-Burn Device Configured to Enter Either a Locked Operating Mode or a Standby Operating Mode Based on a User Selection.

Aspects and embodiments of the fifteenth mode of the present disclosure will now be discussed with reference to the accompanying figures. Further aspects and embodiments will be apparent to those skilled in the art. All documents mentioned in this text are incorporated herein by reference.

Figure 42A:
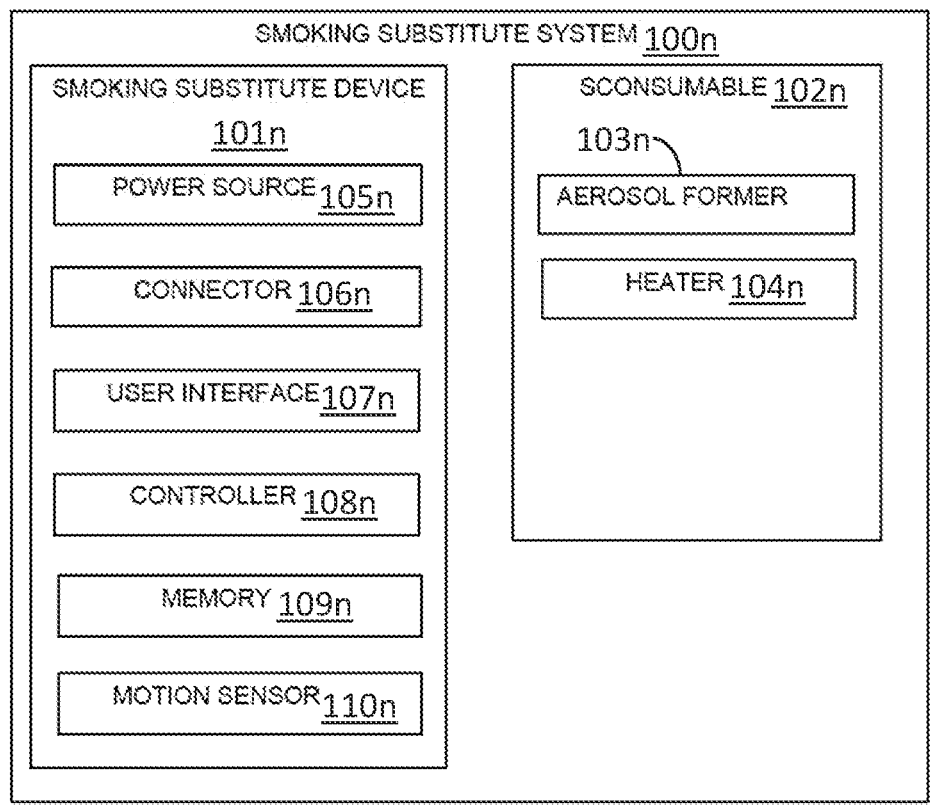

FIG. 42A is a schematic providing a general overview of a smoking substitute system 100*n*. The system 100*n* includes a substitute smoking device 101*n* and an aerosol-forming article in the form of a consumable 102*n*, which comprises an aerosol former 103*n*. The system is configured to vaporize the aerosol former by heating the aerosol former 103*n* (so as to form a vapor/aerosol for inhalation by a user).

In the illustrated system, the heater 104*n* forms part of the consumable 102*n* and is configured to heat the aerosol former 103*n*. In this variation, the heater 104*n* is electrically connectable to the power source 105*n*, for example, when the consumable 102*n* is engaged with the device 101*n*. Heat from the heater 104*n* vaporizes the aerosol former 103*n* to produce a vapor. The vapor subsequently condenses to form an aerosol, which is ultimately inhaled by the user.

The system 100*n* further comprises a power source 105*n* that forms part of the device 101*n*. In other embodiments the power source 105*n* may be external to (but connectable to) the device 101*n*. The power source 105*n* is electrically connectable to the heater 104*n* such that the power source 105*n* is able to supply power to the heater 104*n* (i.e., for the purpose of heating the aerosol former 103*n*). Thus, control of the electrical connection of the power source 105*n* to the heater 104*n* provides control of the state of the heater 104*n*. The power source 105*n* may be a power store, for example a battery or rechargeable battery (e.g., a lithium-ion battery).

The system 100*n* further comprises an I/O module comprising a connector 106*n* (e.g., in the form of a USB port, Micro USB port, USB-C port, etc.). The connector 106*n* is configured for connection to an external source of electrical power, e.g., a mains electrical supply outlet. The connector 106*n* may be used in substitution for the power source 105*n*. That is the connector 106*n* may be electrically connectable to the heater 104*n* so as to supply electricity to the heater 104*n*. In such embodiments, the device may not include a power source, and the power source of the system may instead comprise the connector 106*n* and an external source of electrical power (to which the connector 106*n* provides electrical connection).

In some embodiments, the connector 106*n* may be used to charge and recharge the power source 105*n* where the power source 105*n* includes a rechargeable battery.

The system 100*n* also comprises a user interface (UI) 107*n*. Although not shown, the UI 107*n* may include input means to receive commands from a user. The input means of the UI 107*n* allows the user to control at least one aspect of the operation of the system 100*n*. The input means may, for example, be in the form of a button, touchscreen, switch, microphone, etc.

The UI 107*n* also comprises output means to convey information to the user. The output means may, for example, comprise lights (e.g., LEDs), a display screen, speaker, vibration generator, etc.

The system 100*n* further comprises a controller 108*n* and a memory 109*n* operatively coupled to the controller 108*n* that is configured to control at least one function of the device 101*n*. In the illustrated embodiment, the controller 108*n* is a component of the device 101*n*, but in other embodiments may be separate from (but connectable to) the device 101*n*. Further, the controller 108*n* may be configured to, based on a user selection received at the user interface 107*n*, selectively enter into a locked operating mode or a standby operating mode. Further, the controller may be configured to activate the heater 104*n* upon receiving, at the user interface 107*n*: i) a first predetermined user input when the device 101*n* is entered in the locked operating mode or ii) a second predetermined user input different to the first predetermined user input when the device 101*n* is entered in the standby operating mode. Further, the controller 108*n* is configured to control the operation of the heater 104*n* and, for example, may be configured to control the voltage applied from the power source 105*n* to the heater 104*n*. The controller 108*n* may be configured to toggle the supply of power to the heater 104*n* between an on state, in which the full output voltage of the power source 105*n* is applied to the heater 104*n*, and an off state, in which the no voltage is applied to the heater 104*n*. In one example, the controller 108*n* may be configured to deactivate the heater 104*n*, when the device 101*n* is operating in both the locked operating mode and the standby operating mode.

Although not shown, the system 100*n* may also comprise a voltage regulator to regulate the output voltage from the power source 105*n* to form a regulated voltage. The regulated voltage may then be applied to the heater 104*n*. In some embodiment, the voltage regulator may allow a regulated voltage to be applied to the heater 104*n* to active the heater 104*n*. Further, the voltage regulator may disconnect the supply of voltage to the heater 104*n* when the device 101*n* is operating in the locked operating mode and the standby operating mode.

In addition to being connected to the heater 104*n*, the controller 108*n* is operatively connected to the UI 107*n*. Thus, the controller 108*n* may receive an input signal from the input means of the UI 107*n*. Similarly, the controller 108*n* may transmit output signals to the UI 107*n*. In response, the output means of the UI 107*n* may convey information, based on the output signals, to a user. The controller also comprises a memory 109*n*, which is a non-volatile memory. The memory 109*n* includes instructions, which, when implemented, cause the controller 108*n* to perform certain tasks or steps of a method. The memory also configured to store predetermined user selection, wherein the predetermined user selection stored in the memory 109*n* can be overwritten by more updated user selection received at the user interface 107*n*.

Further, the system 100*n* may comprise a detector or sensor 110*n* coupled with the controller 108*n* within the device 101*n*. The sensor 110*n* may be a microswitch, a puff sensor, a pressure sensor, a motion sensor, or any other similar sensor mounted inside the device 101*n*. The sensor 110*n* may be configured to detect at least one of the predetermined conditions including (i) exhaustion of a consumable 102*n*, e.g., full consumption of the consumable 102n, (ii) removal of the consumable 102n from the device 101n, (iii) retraction of a cap of the device 101n, and (iv) elapse of a predetermined period of time since heater 104n activation or the last puff taken, and thereby deactivating the heater 104n.

Figure 42B:
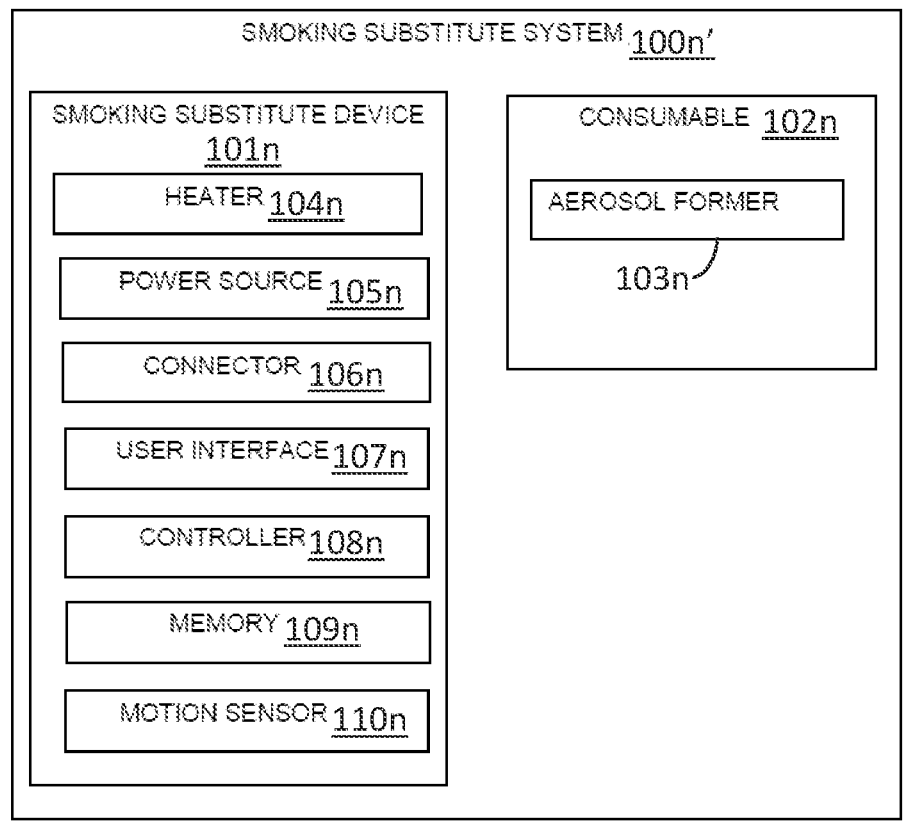

FIG. 42B is a schematic showing a variation of the system 100n of FIG. 42A. In the system 100n' of FIG. 42B, the heater 104n forms part of the device 101n, rather than the consumable 102n. In this variation, the heater 104n is electrically connected to the power source 105n.

Figure 43A:
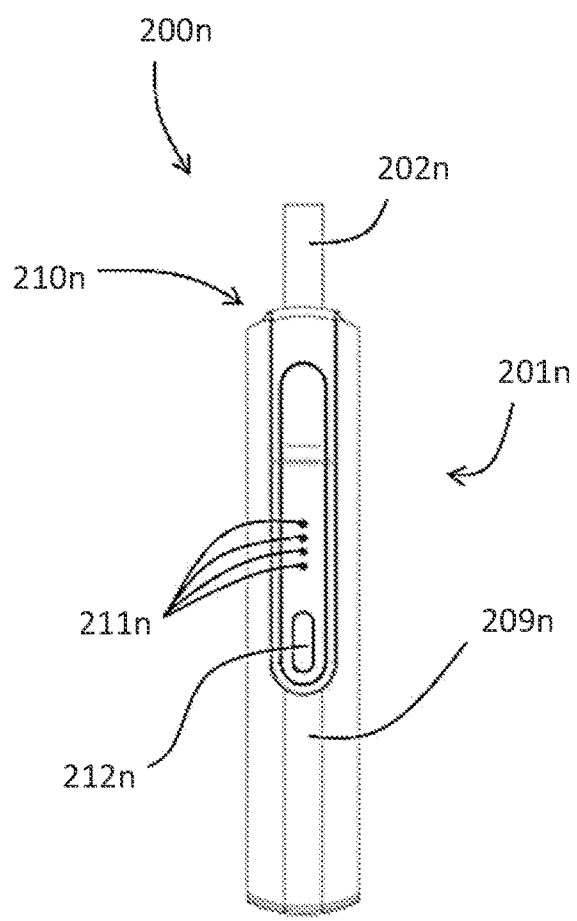
Figure 43B:
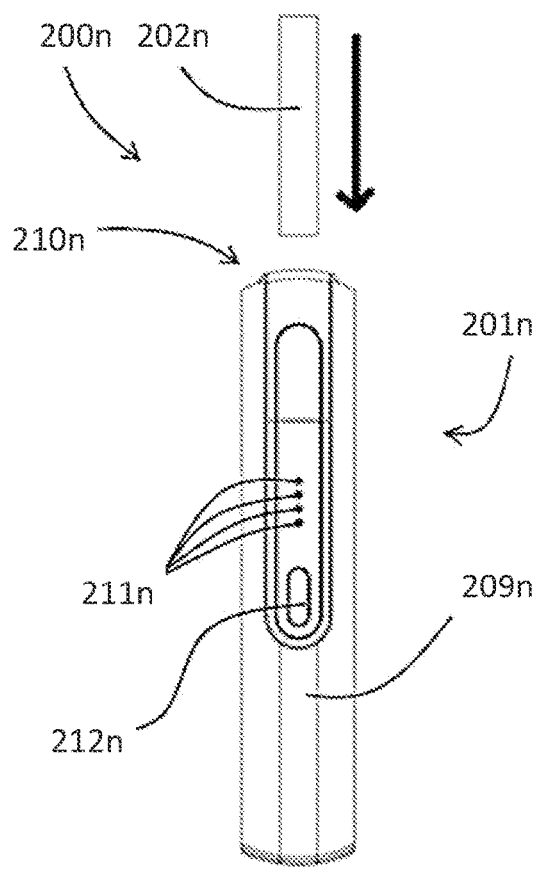

FIG. 43A and FIG. 43B illustrate a heated-tobacco (HT) smoking substitute system 200n. The system 200n is an example of the systems 100n, 100n' described in relation to FIG. 42A or FIG. 42B. System 200n includes an HT device 201n and an HT consumable 202n. The description of FIG. 42A and FIG. 42B above is applicable to the system 200n of FIG. 43A and FIG. 43B and will not be repeated.

The device 201n and the consumable 202n are configured such that the consumable 202n can be engaged with the device 201n. FIG. 43A shows the device 201n and the consumable 202n in an engaged state, whilst FIG. 43B shows the device 201n and the consumable 202n in a disengaged state.

The device 201n comprises a body 209n and cap 210n. In use the cap 210n is engaged at an end of the body 209n. Although not apparent from the figures, the cap 210n is moveable relative to the body 209n. In particular, the cap 210n is slidable and can slide along a longitudinal axis of the body 209n.

The device 201n comprises an output means (forming part of the UI of the device 201n) in the form of a plurality of light-emitting diodes (LEDs) 211n arranged linearly along the longitudinal axis of the device 201n and on an outer surface of the body 209n of the device 201n. A button 212n is also arranged on an outer surface of the body 209n of the device 201n and is axially spaced (i.e., along the longitudinal axis) from the plurality of LEDs 211n.

Figure 43C:
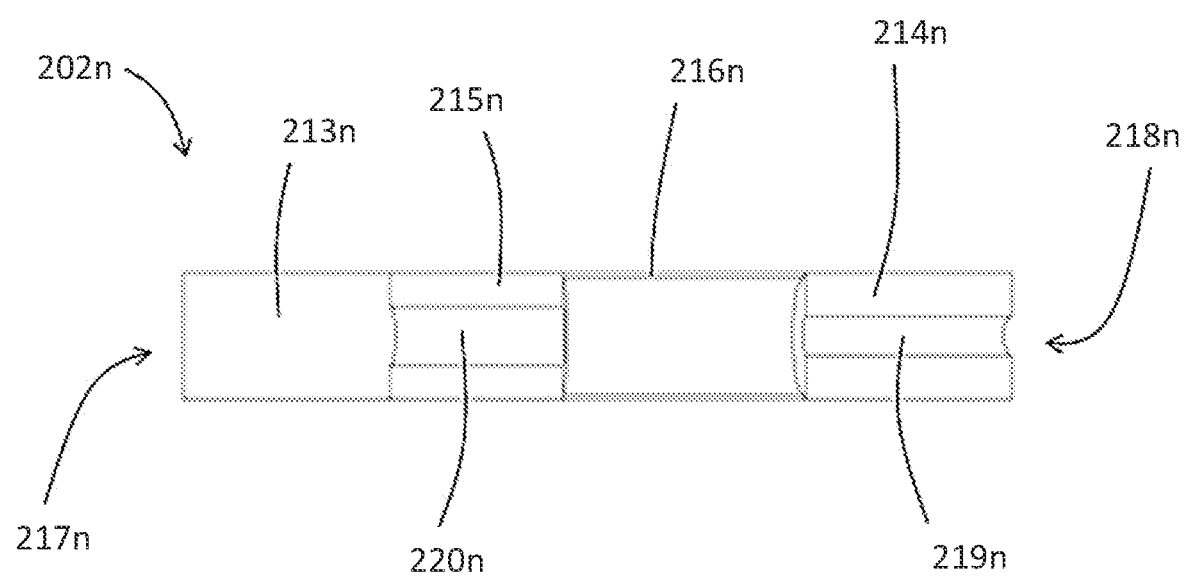

FIG. 43C show a detailed section view of the consumable 202n of the system 200n. The consumable 202n generally resembles a cigarette. In that respect, the consumable 202n has a generally cylindrical form with a diameter of 7 mm and an axial length of 70 mm. The consumable 202n comprises an aerosol forming substrate 213n, a terminal filter element 214n, an upstream filter element 215n and a spacer element 216n. In other embodiments, the consumable may further comprise a cooling element. A cooling element may exchange heat with vapor that is formed by the aerosol-forming substrate 213n in order to cool the vapor so as to facilitate condensation of the vapor.

The aerosol-forming substrate 213n is substantially cylindrical and is located at an upstream end 217n of the consumable 202n and comprises the aerosol former of the system 200n. In that respect, the aerosol forming substrate 213n is configured to be heated by the device 201n to release a vapor. The released vapor is subsequently entrained in an airflow flowing through the aerosol-forming substrate 213n. The airflow is produced by the action of the user drawing on a downstream end 218n (i.e., terminal or mouth end) of the consumable 202n.

In the present embodiment, the aerosol forming substrate 213n comprises tobacco material that may, for example, include any suitable parts of the tobacco plant (e.g., leaves, stems, roots, bark, seeds, and flowers). The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon). For example, the aerosol-forming substrate 213n may comprise a gathered sheet of homogenized (e.g., paper/slurry recon) tobacco or gathered shreds/strips formed from such a sheet.

In order to generate an aerosol, the aerosol forming substrate 213n comprises at least one volatile compound that is intended to be vaporized/aerosolized and that may provide the user with a recreational and/or medicinal effect when inhaled. The aerosol-forming substrate 213n may further comprise one or more additives. For example, such additives may be in the form of humectants (e.g., propylene glycol and/or vegetable glycerin), flavorants, fillers, aqueous/non-aqueous solvents and/or binders.

The terminal filter element 214n is also substantially cylindrical and is located downstream of the aerosol forming substrate 213n at the downstream end 218n of the consumable 202n. The terminal filter element 214n is in the form of a hollow bore filter element having a bore 219n (e.g., for airflow) formed therethrough. The diameter of the bore 219n is 2 mm. The terminal filter element 214n is formed of a porous (e.g., monoacetate) filter material. As set forth above, the downstream end 218n of the consumable 202n (i.e., where the terminal filter 214n is located) forms a mouthpiece portion of the consumable 202n upon which the user draws. Airflow is drawn from the upstream end 217n, thorough the components of the consumable 202n, and out of the downstream end 218n. The airflow is driven by the user drawing on the downstream end 218n (i.e., the mouthpiece portion) of the consumable 202n.

The upstream filter element 215n is located axially adjacent to the aerosol-forming substrate 213n, between the aerosol-forming substrate 213n and the terminal filter element 214n. Like the terminal filter 214n, the upstream filter element 215n is in the form of a hollow bore filter element, such that it has a bore 220n extending axially therethrough. In this way, the upstream filter 215n may act as an airflow restrictor. The upstream filter element 215n is formed of a porous (e.g., monoacetate) filter material. The bore 220n of the upstream filter element 215n has a larger diameter (3 mm) than the terminal filter element 214n.

The spacer 216n is in the form of a cardboard tube, which defines a cavity or chamber between the upstream filter element 215n and the terminal filter element 214n. The spacer 216n acts to allow both cooling and mixing of the vapor/aerosol from the aerosol-forming substrate 213n. The spacer has an external diameter of 7 mm and an axial length of 14 mm.

Although not apparent from the figure, the aerosol-forming substrate 213n, upstream filter 215n and spacer 216n are circumscribed by a paper wrapping layer. The terminal filter 214n is circumscribed by a tipping layer that also circumscribes a portion of the paper wrapping layer (so as to connect the terminal filter 214n to the remaining components of the consumable 202n). The upstream filter 215n and terminal filter 214n are circumscribed by further wrapping layers in the form of plug wraps.

Figure 43D:
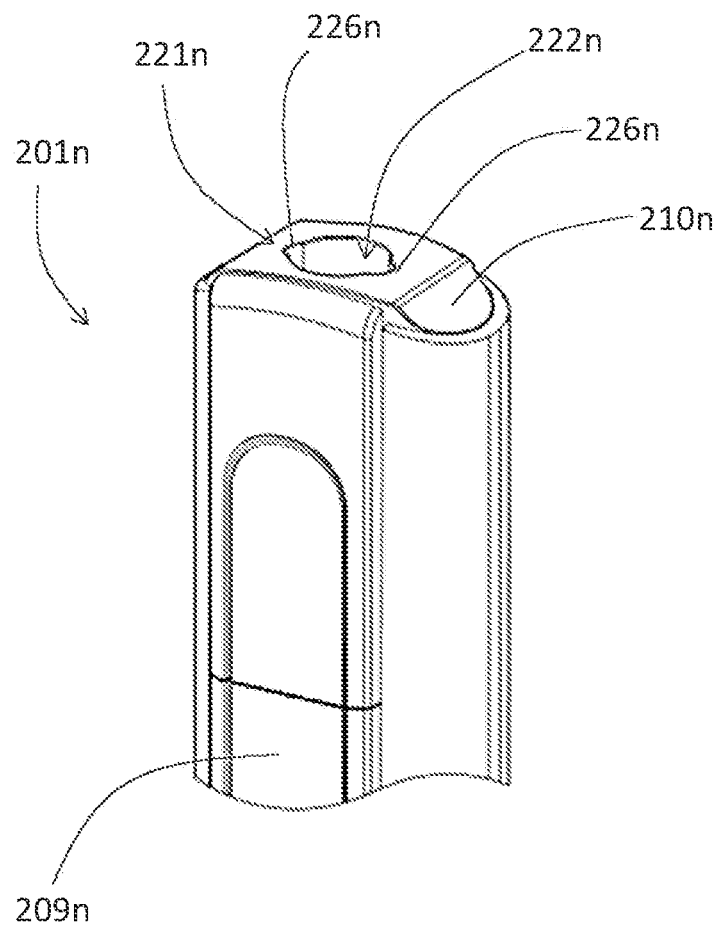

Returning now to the device 201n, FIG. 43D illustrates a detailed view of the end of the device 201n that is configured to engage with the consumable 202n. The cap 210n of the device 201n includes an opening 221n to an internal cavity 222n (more apparent from FIG. 43D) defined by the cap 210n. The opening 221n and the cavity 222n are formed so as to receive at least a portion of the consumable 202n. During engagement of the consumable 202n with the device 201n, a portion of the consumable 202n is received through the opening 221n and into the cavity 222n. After engagement (see FIG. 43B), the downstream end 218n of the consumable 202n protrudes from the opening 221n and thus also protrudes from the device 201n. The opening 221n includes laterally disposed notches 226n. When a consumable 202n is received in the opening 221n, these notches 226n remain open and could, for example, be used for retaining a cover in order to cover the end of the device 201n.

Figure 43E:
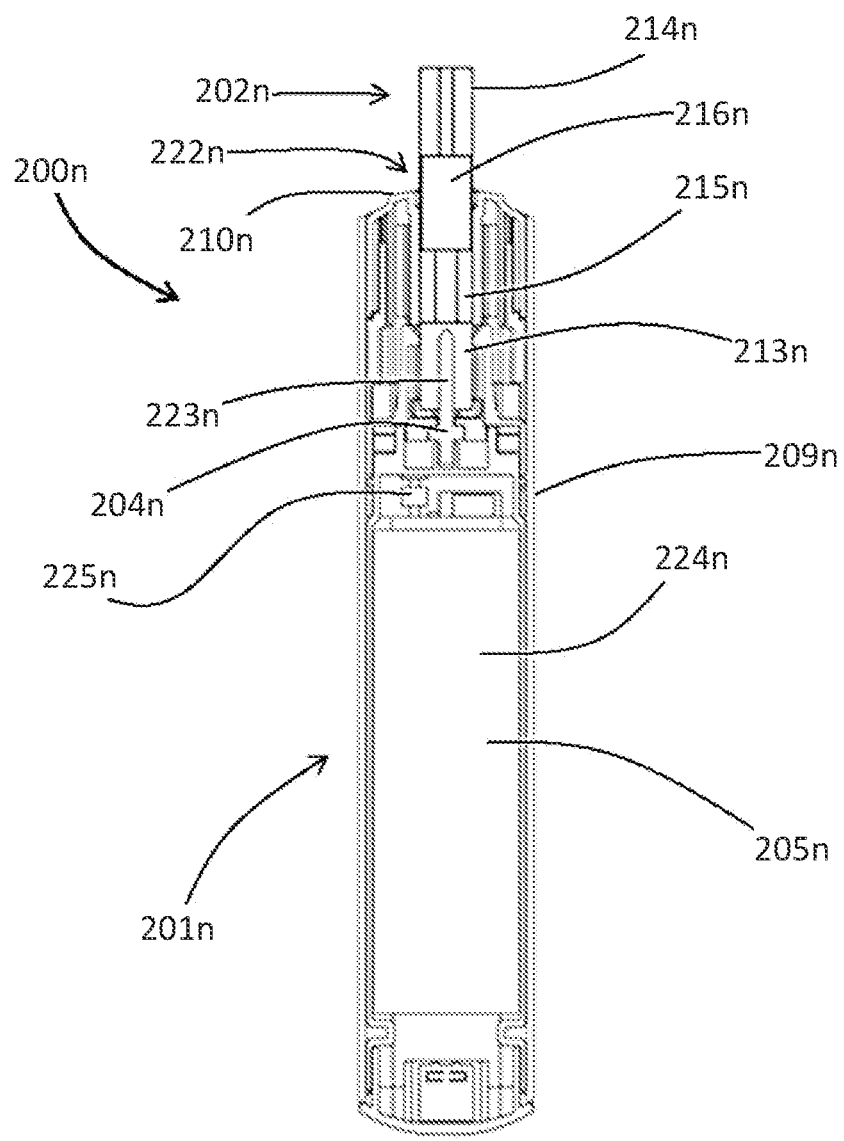

FIG. 43E shows a cross section through a central longitudinal plane through the device 201n. The device 201n is shown with the consumable 202n engaged therewith.

The device 201n comprises a heater 204n comprising heating element 223n. The heater 204n forms part of the body 209n of the device 201n and is rigidly mounted to the body 209n. In the illustrated embodiment, the heater 204n is a rod heater with a heating element 223n having a circular transverse profile. In other embodiments the heater may be in the form of a blade heater (e.g., heating element with a rectangular transverse profile) or a tube heater (e.g., heating element with a tubular form).

The heating element 223n of the heater 204n projects from an internal base of the cavity 222n along a longitudinal axis towards the opening 221n. As is apparent from the figure, the length (i.e., along the longitudinal axis) of the heating element is less than a depth of the cavity 222n. In this way, the heating element 223n does not protrude from or extend beyond the opening 221n.

When the consumable 202n is received in the cavity 222n (as is shown in FIG. 43E), the heating element 223n penetrates the aerosol-forming substrate 213n of the consumable 202n. In particular, the heating element 223n extends for nearly the entire axial length of the aerosol-forming substrate 213n when inserted therein. Thus, when the heater 204n is activated, heat is transferred radially from an outer circumferential surface the heating element 223n to the aerosol-forming substrate 213n.

The device 201n further comprises an electronics cavity 224n. A power source, in the form of a rechargeable battery 205n (a lithium-ion battery), is located in electronics cavity 224n.

The device 201n includes a connector (i.e., forming part of an IO module of the device 201n) in the form of a USB port 206n. The connector may alternatively be, for example, a micro-USB port or a USB-C port for examples. The USB port 206n may be used to recharge the rechargeable battery 205n.

The device 201n includes a controller (not shown) located in the electronics cavity 224n. The controller comprises a microcontroller mounted on a printed circuit board (PCB). The USB port 206n is also connected to the controller 208n (i.e., connected to the PCB and microcontroller).

The controller 208n is configured to control at least one function of the device 201n. For example, the controller 208n is configured to control the operation of the heater 204n. Such control of the operation of the heater 204n may be accomplished by the controller toggling the electrical connection of the rechargeable battery 205n to the heater 204n. For example, the controller 208n is configured to control the heater 204n in response to a user depressing the button 212n. Depressing the button 212n may cause the controller to allow a voltage (from the rechargeable battery 205n) to be applied to the heater 204n (so as to cause the heating element 223n to be heated).

In one aspect, the controller 208n is configured to, based on a user selection received at the user interface, selectively enter into a locked operating mode or a standby operating mode. Further, to activate the heater upon receiving, at the user interface: i) a first predetermined user input when the device is entered in the locked operating mode or ii) a second predetermined user input different to the first predetermined user input when the device is entered in the standby operating mode.

In the illustrated embodiment, the controller 208n is configured to deactivate the heater 204n upon detecting an occurrence of a predetermined event, at a detector or sensor, to enter the device 201n into either the locked operating mode or the standby operating mode, based on a predetermined user selection stored at the memory of the device 201n.

The predetermined event corresponds to the expiry of a user session or a smoking session. In the illustrated embodiment the predetermined event is any one of the i) exhaustion of the consumable 202n, ii) removal of the consumable 202n from the device 201n, iii) retraction of a cap 210n of the device 201n, and iv) elapse of a predetermined period of time since heater 204n activation. Upon detecting an occurrence of the predetermined event, the controller 208n is configured to deactivate the heater 204n automatically.

It is to be appreciated that some of the predetermined events may cause physical damage to the device 201n in one way or the other. For example, if the consumable 202n is removed when the heater 204n is still activated or energies, the heater 204n may overheat and thereby resulting in damage to the heater 204n or other components physically connected to the heater 204n. Similarly, retraction of cap 210n of the device 201n, and activation of the heater 204n more than a predetermined (i.e., prolonged) period of time may cause the heater 204n to overheat.

The predetermined user selection is a user selection received prior to activation of the heater 204n and thereby stored in the memory. Therefore upon detecting an occurrence of the predetermined event, the controller 208n is configured to retrieve the predetermined user selection form the memory and upon deactivating the heater 204n, enter into one of the locked or standby operating mode based on said predetermined user selection.

Such predetermined user selection as stored in the device 201n memory can be overwritten once the user inputs a new user selection at the user interface 212n. For example, the user may select the standby operating mode as a default operating mode and as such the device 201n enters standby operating mode every time the heater 204n is deactivated. The user may occasionally select the locked operating mode and thereby overwrites the previous user selection, as desired.

In the illustrated embodiment, the device 201n further comprise a detector or sensor 110n configured to detect an occurrence of one or more of the predetermined events when the heater 204n is activated. In one example, the sensor 110n may be pressure sensor (e.g., based on differential created inside the cavity 222n of the device 201n) or microswitch that is configured to detect movement of consumable 202n and/or cap 210n in relation to the device 201n, e.g., removal of the consumable 202n from the device 201n and/or retraction of cap 210n of the device 201n. In another example, the sensor 110n is a timer provided in the controller 208n configured to determine the elapsed time since heater 204n activation or last puff taken, or a puff sensor configured to detect the number of puff already taken out of an allowable number of puff for consumable 202n. The sensor 110n is configured to provide this information to the controller 208n. The controller 208n, based on said information, is configured to detect an occurrence of one or more of the predetermine events.

In other embodiments, upon receiving the user selection at the user interface, the controller 208n may be configured to deactivate the heater 204n and enter the device 201n into either the locked operating mode or the standby operating mode. More specifically, the user selection may be received when the heater 204n is activated, e.g., during a user session. That is, the user selection received during a user session may deactivate the heater 204n, e.g., the session may not terminate with the detection of an occurrence of a predetermined event but may terminate based on receiving the user selection. Furthermore, the user selection received during heater activation may overwrite the predetermined user selection as stored in the device memory.

In the illustrate embodiment, the user selection comprises different selection inputs each for entering into a respective locking operation mode and a standby operation mode. The selection input for entering into the locking operating mode is achieved by holding a user press at the user interface 212n for at least two seconds, whereas the selection input for entering into the standby operating mode is achieved by a plurality of shorter user presses at the user interface each lasting less than a second. The selection input can be inputted at the user interface before or during heater activation in a session.

In the illustrated embodiment, the first predetermined user input comprises a plurality of user presses at the user interface and the second predetermined user input comprises one or more user presses at the user interface; wherein the number of user presses in the second predetermined user input is less than the number of user presses in the first predetermined input. The user interface is a button 212n. The user presses are physical presses onto the button 212n within a predetermined period, e.g., 3 seconds. In this example, the number of user presses in the first predetermined sequence is 5 presses.

In other embodiments, the first predetermined user input may comprise at least one of a user password and a fingerprint input received at the interface 212n. The first predetermined user input may be a password or a code to be input at a keyboard or a keypad. The first predetermined user input may be a fingerprint recognizable at a fingerprint recognizer. Said user input provides additional layer of protection to the device 201n, as minors or any unauthorized person other than owner of the device 201n may not be able to activate the heater 204n, without having a knowledge of the predetermined user input, when the device 201n has entered into the locked operating mode.

The locked operating mode may be defined as child safe mechanism CSM, where the device 201n remains active but the heater 204n of the device 201n is disabled to prevent a child from using the device. The controller 208n is also configured to control the LEDs 211n in response to (e.g., a detected) a condition of the device 201n or the consumable 202n. For example, the controller may control the LEDs to indicate whether the device 201n is in an on state or an off state (e.g., one or more of the LEDs may be illuminated by the controller when the device is in an on state). In addition, the controller 208n may control the LEDs to indicate that the device 201n has entered into either one of the locked operating mode or the standby operating mode. In other embodiments, the device 201n may additionally include other output means such as haptic sensor, audio sensors, etc. to provide haptic/audio feedback indicating that the device 201n has entered into either one of the locked operating mode or the standby operating mode.

The device 201n comprises a further input means (i.e., in addition to the button 212n) in the form of a puff sensor 225n. The puff sensor 225n is configured to detect a user drawing (i.e., inhaling) at the downstream end 218n of the consumable 202n. The puff sensor 225n may, for example, be in the form of a pressure sensor, a flowmeter, or a microphone. The puff sensor 225n is operatively connected to the controller 208n in the electronics cavity 224n, such that a signal from the puff sensor 225n, indicative of a puff state (i.e., drawing or not drawing), forms an input to the controller 208n (and can thus be responded to by the controller 208n).

Figure 44:
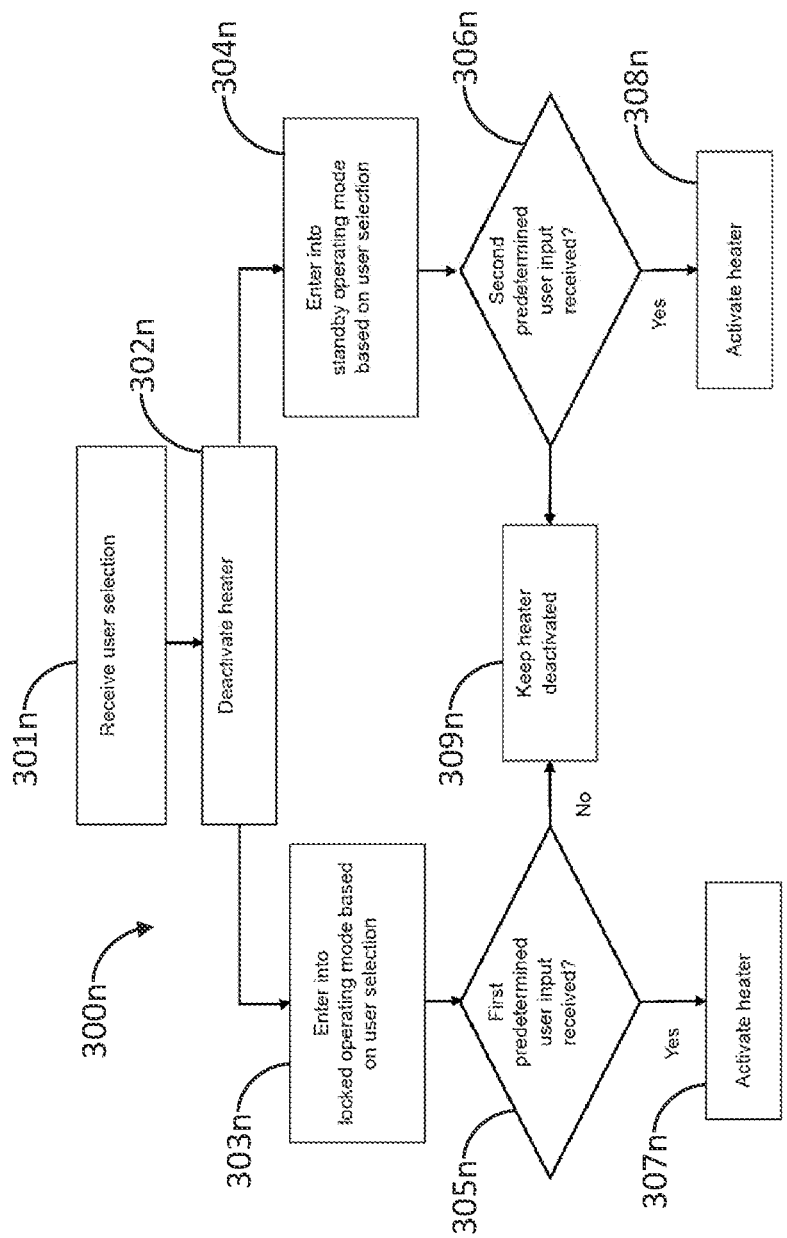

FIG. 44 illustrates flowchart of method of switching the device between an active operating mode and the deactivated operating mode.

As illustrated in FIG. 44, the method 300n includes one or more blocks implemented by the controller 208n of the device 201n. The method 300n may be described in general context of controller executable instructions. Generally, controller executable instructions may include routines, programs, objects, components, data structures, procedures, modules, and functions, which perform particular functions or implement particular abstract data types.

The order in which the method 300n is described is not intended to be construed as a limitation, and any number of the described method blocks can be combined in any order to implement the method 300n. Additionally, individual blocks may be deleted from the method 300n without departing from the scope of the subject matter described herein. Furthermore, the method 300n can be implemented in any suitable hardware, software, firmware, or combination thereof.

The method 300n comprises steps for deactivating an activated heater 204n, entering the device 201n in one of the two operating modes, and reactivating the heater 204n upon receiving different predetermined user inputs according to the operating mode that the device is entered into.

At block 301n, the controller 208n is configured to receive a user selection. The user selection is inputted at the user interface 212n and serve as an instruction for selecting between entering the device 201n into the locked operating mode and the standby operating mode once the heater 204n is deactivated. The user selection the user selection comprises different selection inputs each for entering the device 201n into a respective locked operation mode and a standby operation mode.

In the illustrated embodiment, the user selection is a predetermined user selection entered by a user at the user interface 212n prior to heater 204n activation and being stored in the memory. Upon detecting an occurrence of a predetermined event, by a detector or a sensor, the controller 208n is configured to deactivate the heater 204n at block 302n. As described, the predetermined events comprises one or more of (i) exhaustion or depletion of the consumable 202n, (ii) removal of the consumable 202n from the device 201n, (iii) retraction of the cap 209n from the device 201n and (iv) elapse of a predetermined period of time since heater 204n activation or the last puff taken.

In other embodiments, the controller 208n may receive the user selection when the heater 204n is activated, and upon receiving said user selection the heater 204n may be deactivated.

Based on the user selection, the controller 208n is configured to enter the device 201n into either the locked operating mode 303n or the standby operating mode 304n. The two operating modes differs to each other in that they each requires the user to input a particular predetermined user input at the user interface 212n in order to activate the heater 204n.

When the device 201n has entered into a locked operating mode 303n, the controller 208n only activates 307n the heater 204n when a first predetermined user input is received 305n at the user interface 212n. In said locked operating mode 303n, when the controller 208n detects a second predetermined user input or any other user input other than the first predetermined user input at the user interface 212n, the controller 208n is configured to keep the heater 204n in a deactivated state 309n.

On the other hand, when the device 201n has entered into a standby operating mode 304n, the controller 208n only activates 307n the heater 204n when a second predetermined user input is received 306n at the user interface 212n. In said standby operating mode 304n, when the controller 208n detects a first predetermined user input or any other user input other than the second predetermined user input at the user interface 212n, the controller 208n may configure to keep the heater 204n in a deactivated state 309n. However in some embodiments where the second predetermined user input forms part of the first predetermined user input, e.g., the second predetermined user input comprises a single user press whilst the first predetermined user input comprises a plurality of user presses, the controller 208n may nevertheless activate the heater upon receiving a first predetermined user input.

Sixteenth Mode: A Smoking Substitute Device which is Configured to Detect an Error Event and an Event of User Misuse and Alert the User of the Same.

Aspects and embodiments of the sixteenth mode of the present disclosure will now be discussed with reference to the accompanying figures. Further aspects and embodiments will be apparent to those skilled in the art. All documents mentioned in this text are incorporated herein by reference.

FIG. 45A is a schematic providing a general overview of a smoking substitute system 100o. The system 100o includes a substitute smoking device 101o and an aerosol-forming article in the form of a consumable 102o, which comprises an aerosol former 103o. The system is configured to vaporize the aerosol former by heating the aerosol former 103o (so as to form a vapor/aerosol for inhalation by a user).

In the illustrated system, the heater 104o forms part of the consumable 102o and is configured to heat the aerosol former 103o. Heat from the heater 104o vaporizes the aerosol former 103o to produce a vapor. The vapor subsequently condenses to form an aerosol, which is ultimately inhaled by the user. In some embodiments, the heater 104o is configured to be deactivated/disabled in the event of an error or user misuse being detected.

The system 100o further comprises a power source 105o that forms part of the device 101o. In other embodiments the power source 105o may be external to (but connectable to) the device 101o. The power source 105o is electrically connectable to the heater 104o such that the power source 105o is able to supply power to the heater 104o (i.e., for the purpose of heating the aerosol former 1030). Thus, control of the electrical connection of the power source 105o to the heater 104o provides control of the state of the heater 104o. The power source 105o may be a power store, for example a battery or rechargeable battery (e.g., a lithium-ion battery).

The system 100o further comprises an I/O module comprising a connector 106o (e.g., in the form of a USB port, Micro USB port, USB-C port, etc.). The connector 106o is configured for connection to an external source of electrical power, e.g., a mains electrical supply outlet. The connector 106o may be used in substitution for the power source 105o. That is the connector 106o may be electrically connectable to the heater 104o so as to supply electricity to the heater 104o. In such embodiments, the device may not include a power source, and the power source of the system may instead comprise the connector 106o and an external source of electrical power (to which the connector 106o provides electrical connection).

In some embodiments, the connector 106o may be used to charge and recharge the power source 105o where the power source 105o includes a rechargeable battery.

The system 100o also comprises a user interface (UI) 107o. Although not shown, the UI 107o may include input means to receive commands from a user. The input means of the UI 107o allows the user to control at least one aspect of the operation of the system 100o. The input means may, for example, be in the form of a button, touchscreen, switch, microphone, etc.

The UI 107o also comprises output means to convey information to the user. The output means may, for example, comprise lights (e.g., LEDs), a display screen, speaker, vibration generator, etc.

The system 100o further comprises a controller 108o and a memory 109o operatively coupled to the controller 108o that is configured to control at least one function of the device 101o. In the illustrated embodiment, the controller 108o is a component of the device 101o, but in other embodiments may be separate from (but connectable to) the device 101o. The controller 108o is configured to detect an error event and a user misuse event and alert the user about the occurrence of said event via an output device 111o. The controller 108o is further configured to control the operation of the heater 104o, for example the controller may be configured to disable the heater 104o when the error event or the user misuse event is detected. The controller 108o may be further configured to control operation of the heater 104o, for example, may be configured to control the voltage applied from the power source 105o to the heater 104o. The controller 108o may be configured to toggle the supply of power to the heater 104o between an on state, in which the full output voltage of the power source 105o is applied to the heater 104o, and an off state, in which the no voltage is applied to the heater 104o. Further, in an example, the controller 108o may be configured to disconnect the power supply to the heater 104o when at least one of the error events or the user misuse events is detected.

Although not shown, the system 100o may also comprise a voltage regulator to regulate the output voltage from the power source 105o to form a regulated voltage. The regulated voltage may then be applied to the heater 104o.

In addition to being connected to the heater 104o, the controller 108o is operatively connected to the UI 107o. Thus, the controller 108o may receive an input signal from the input means of the UI 107o. Similarly, the controller 108o may transmit output signals to the UI 107o. In response, the output means of the UI 107o may convey information, based on the output signals, to a user.

Further, the system may also comprise a sensor 110o coupled with the controller 108o within the smoking substitute device 101o. The sensor 110o may be a motion sensor, temperature sensor, puff sensor or any other similar sensor mounted inside the device and configured to generate an input in response to detection of one of the following events such as, lifting of cap in operating mode, attempt made to use the device at high temperature when the ambient temperature is detected too high, short circuit on heater rod, open circuit detection, microcontroller error, battery overheat, heater overheats, puff sensor error and user interface error and provide the said input to the controller 108o. The controller 108o is further configured to provide an alert to the user in response to detection of the error events and the event of user misuse of the device 101o.

FIG. 45B is a schematic showing a variation of the system 100o of FIG. 45A. In the system 100o' of FIG. 45B, the heater 104o forms part of the device 101o, rather than the consumable 102o. In this variation, the heater 104o is electrically connected to the power source 105o.

FIG. 46A and FIG. 46B illustrate a heated-tobacco (HT) smoking substitute system 200o. The system 200o is an example of the systems 100o, 100o' described in relation to FIG. 45A or FIG. 45B. System 200o includes an HT device 201o that is configured to detect an error event and an event of user misuse of the device and an HT consumable 202o. The description of FIG. 45A and FIG. 45B above is applicable to the system 200o of FIG. 46A and FIG. 46B and will thus not be repeated.

The device 201o and the consumable 202o are configured such that the consumable 202o can be engaged with the device 201o. FIG. 46A shows the device 201o and the consumable 202o in an engaged state, whilst FIG. 46B shows the device 201o and the consumable 202o in a disengaged state.

The device 201o comprises a body 209o and cap 210o. In use the cap 210o is engaged at an end of the body 209o. Although not apparent from the figures, the cap 210o is moveable relative to the body 209o. In particular, the cap 210o is slidable and can slide along a longitudinal axis of the body 209o.

The device 201o comprises an output means (forming part of the UI of the device 201o) in the form of a plurality of light-emitting diodes (LEDs) 211o arranged linearly along the longitudinal axis of the device 201o and on an outer surface of the body 209o of the device 201o. A button 212o is also arranged on an outer surface of the body 209o of the device 201o and is axially spaced (i.e., along the longitudinal axis) from the plurality of LEDs 211o.

FIG. 46C show a detailed section view of the consumable 202o of the system 200o. The consumable 202o generally resembles a cigarette. In that respect, the consumable 202o has a generally cylindrical form with a diameter of 7 mm and an axial length of 70 mm. The consumable 202o comprises an aerosol forming substrate 213o, a terminal filter element 214o, an upstream filter element 215o and a spacer element 216o. In other embodiments, the consumable may further comprise a cooling element. A cooling element may exchange heat with vapor that is formed by the aerosol-forming substrate 213o in order to cool the vapor so as to facilitate condensation of the vapor.

The aerosol-forming substrate 213o is substantially cylindrical and is located at an upstream end 217o of the consumable 202o and comprises the aerosol former of the system 200o. In that respect, the aerosol forming substrate 213o is configured to be heated by the device 201o to release a vapor. The released vapor is subsequently entrained in an airflow flowing through the aerosol-forming substrate 213o. The airflow is produced by the action of the user drawing on a downstream end 218o (i.e., terminal or mouth end) of the consumable 202o.

In the present embodiment, the aerosol forming substrate 213o comprises tobacco material that may, for example, include any suitable parts of the tobacco plant (e.g., leaves, stems, roots, bark, seeds, and flowers). The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon). For example, the aerosol-forming substrate 213o may comprise a gathered sheet of homogenized (e.g., paper/slurry recon) tobacco or gathered shreds/strips formed from such a sheet.

In order to generate an aerosol, the aerosol forming substrate 213o comprises at least one volatile compound that is intended to be vaporized/aerosolized and that may provide the user with a recreational and/or medicinal effect when inhaled. The aerosol-forming substrate 213o may further comprise one or more additives. For example, such additives may be in the form of humectants (e.g., propylene glycol and/or vegetable glycerin), flavorants, fillers, aqueous/non-aqueous solvents and/or binders.

The terminal filter element 214o is also substantially cylindrical and is located downstream of the aerosol forming substrate 213o at the downstream end 218o of the consumable 202o. The terminal filter element 214o is in the form of a hollow bore filter element having a bore 219o (e.g., for airflow) formed therethrough. The diameter of the bore 219o is 2 mm. The terminal filter element 214o is formed of a porous (e.g., monoacetate) filter material. As set forth above, the downstream end 218o of the consumable 202o (i.e., where the terminal filter 214o is located) forms a mouthpiece portion of the consumable 202o upon which the user draws. Airflow is drawn from the upstream end 217o, thorough the components of the consumable 202o, and out of the downstream end 218o. The airflow is driven by the user drawing on the downstream end 218o (i.e., the mouthpiece portion) of the consumable 202o.

The upstream filter element 215o is located axially adjacent to the aerosol-forming substrate 213o, between the aerosol-forming substrate 213o and the terminal filter element 214o. Like the terminal filter 214o, the upstream filter element 215o is in the form of a hollow bore filter element, such that it has a bore 220o extending axially therethrough. In this way, the upstream filter 215o may act as an airflow restrictor. The upstream filter element 215o is formed of a porous (e.g., monoacetate) filter material. The bore 220o of the upstream filter element 215o has a larger diameter (3 mm) than the terminal filter element 214o.

The spacer 216o is in the form of a cardboard tube, which defines a cavity or chamber between the upstream filter element 215o and the terminal filter element 214o. The spacer 216o acts to allow both cooling and mixing of the vapor/aerosol from the aerosol-forming substrate 213o. The spacer has an external diameter of 7 mm and an axial length of 14 mm.

Although not apparent from the figure, the aerosol-forming substrate 213o, upstream filter 215o and spacer 216o are circumscribed by a paper wrapping layer. The terminal filter 214o is circumscribed by a tipping layer that also circumscribes a portion of the paper wrapping layer (so as to connect the terminal filter 214o to the remaining components of the consumable 202o). The upstream filter 215o and terminal filter 214o are circumscribed by further wrapping layers in the form of plug wraps.

Returning now to the device 201o, FIG. 46D illustrates a detailed view of the end of the device 201o that is configured to engage with the consumable 202o. The cap 210o of the device 201o includes an opening 221o to an internal cavity 222o (more apparent from FIG. 46D) defined by the cap 210o. The opening 221o and the cavity 222o are formed so as to receive at least a portion of the consumable 202o. During engagement of the consumable 202o with the device 201o, a portion of the consumable 202o is received through the opening 221o and into the cavity 222o. After engagement (see FIG. 46B), the downstream end 218o of the consumable 202o protrudes from the opening 221o and thus also protrudes from the device 201o. The opening 221o includes laterally disposed notches 226o. When a consumable 202o is received in the opening 221o, these notches 226o remain open and could, for example, be used for retaining a cover in order to cover the end of the device 201o.

FIG. 46E shows a cross section through a central longitudinal plane through the device 201o. The device 201o is shown with the consumable 202o engaged therewith.

The device 201o comprises a heater 204o comprising heating element 223o. The heater 204o forms part of the body 209o of the device 201o and is rigidly mounted to the body 209o. In the illustrated embodiment, the heater 204o is a rod heater with a heating element 223o having a circular transverse profile. In other embodiments the heater may be in the form of a blade heater (e.g., heating element with a rectangular transverse profile) or a tube heater (e.g., heating element with a tubular form).

The heating element 223o of the heater 204o projects from an internal base of the cavity 222o along a longitudinal axis towards the opening 221o. As is apparent from the figure, the length (i.e., along the longitudinal axis) of the heating element is less than a depth of the cavity 222o. In this way, the heating element 223o does not protrude from or extend beyond the opening 221o.

When the consumable 202o is received in the cavity 222o (as is shown in FIG. 46E), the heating element 223o penetrates the aerosol-forming substrate 213o of the consumable 202o. In particular, the heating element 223o extends for nearly the entire axial length of the aerosol-forming substrate 213o when inserted therein. Thus, when the heater 204o is activated, heat is transferred radially from an outer circumferential surface the heating element 223o to the aerosol-forming substrate 213o.

The device 201o further comprises an electronics cavity 224o. A power source, in the form of a rechargeable battery 205o (a lithium-ion battery), is located in electronics cavity 224o.

The device 201o includes a connector (i.e., forming part of an IO module of the device 2010) in the form of a USB port 206o. The connector may alternatively be, for example, a micro-USB port or a USB-C port for examples. The USB port 206o may be used to recharge the rechargeable battery 205o.

The device 201o includes a controller (not shown) located in the electronics cavity 224o. The controller comprises a microcontroller mounted on a printed circuit board (PCB). The USB port 206o is also connected to the controller 208o (i.e., connected to the PCB and microcontroller). The controller 208o is configured to control at least one function of the device 201o. For example, the controller 208o is configured to control the operation of the heater 204o. Such control of the operation of the heater 204o may be accomplished by the controller toggling the electrical connection of the rechargeable battery 205o to the heater 204o. For example, the controller 208o is configured to control the heater 204o in response to a user depressing the button 212o. Depressing the button 212o may cause the controller to allow a voltage (from the rechargeable battery 2050) to be applied to the heater 204o (so as to cause the heating element 223o to be heated).

In one embodiment, the controller 208o is configured to detect an event of user misuse of the device 201o. For example, the controller 208o detects that the cap 210o of the device 201o has been lifted away from the body 209o of the device 201o during a smoking session when the device is operational. This is detected my means of a sensor (not shown) which detects the movement of the cap away from the body of the device. In an embodiment, this is a light sensor which detects the increase in ambient light level when the cap is opened. When the controller 208o detects this movement of the cap 210o, the controller is configured to send a signal to one of the LEDs 211o to light up. In an embodiment, the LEDs 211o are color change LEDs, and when the controller 208o detects the movement of the cap 210o, the controller is configured to send a signal to one of the LEDs 211o to light up in a particular color which differs from the usual color of the LED when indicating other device functions. In addition, the controller 208o is also configured to deactivate the heater 204o by preventing the supply of power to the heater 204o when the controller 208o detects that the cap 210o of the device 201o has been lifted away from the body 209o of the device 201o.

In another embodiment, the controller 208o detects tampering with the user interface of the device.

If a press of the button 212o does not match a predetermined, stored unlock pattern (e.g., duration of press, or number of discrete presses), then the controller is configured to send a signal to one of the LEDs 211o to light up. In addition, the controller 208o is configured to simultaneously activate a haptic feedback device (not shown) to generate vibration of the device. Thus the user is informed that the device has not been unlocked because the unlock pattern did not match a predetermined pattern.

In another embodiment, the controller 208o detects the ambient temperature, for example by means of a temperature sensor (not shown) within the body 209o of the device. If this ambient temperature is detected to be above a predetermined, stored threshold temperature value, then the controller 208o is configured to send a signal to one of the LEDs 211o to light up when the user attempts to increase the power supply to the heater (e.g., by attempting to switch the device into a "high power" or "high temperature" mode). In an embodiment, the LED which lights up is also configured to flash. This indicates to the user that the high temperature mode is currently inaccessible to preserve an acceptably low ambient temperature within the device.

The detection of said events may be detected by the controller 208o in response to receiving inputs from the sensor 110o, wherein the sensor 110o may be one of a temperature sensor, piezoelectric sensor, touch sensor, biometric sensor, or any other similar sensor.

In another embodiment, the controller 208o is configured to detect an error event of the device 201o. In an exemplary embodiment, the controller 208o is configured to detect a short-circuit across the heater 204o, e.g., through detection of a surge in current. When the controller 208o detects this short-circuit, the controller is configured to send a signal to one of the LEDs 211o to light up. The controller is simultaneously configured to cut power to the heater to protect sensitive electrical components within the device. In an embodiment, the LED remains lit until the short-circuit error has been rectified, for example by a technician. Thus the user is informed that an error has occurred which requires expert attention.

Similarly, in another embodiment the controller 208o is configured to detect an open circuit, e.g., caused by a broken wire. This may be detected by the controller through measurement of the resistance in the circuit. When the controller 208o detects this open circuit, the controller is configured to send a signal to one of the LEDs 211o to light up. In an embodiment, the LED remains lit until the open circuit error has been rectified, for example by a technician. Thus the user is informed that an error has occurred which requires expert attention.

In an exemplary embodiment, the controller 208$o$ is configured to detect overheating of the power source 205$o$ within the device 201$o$. This is detected by a temperature sensor (not shown) located close to the power source. The controller is configured to detect overheating of the power source when the temperature measured by the sensor exceeds a predetermined, stored temperature value. When the controller 208$o$ detects such overheating, the controller is configured to send a signal to one of the LEDs 211$o$ to light up. The controller is simultaneously configured to cut power supplied by the power source to prevent further overheating and prevent dangerous events such as battery fire.

Said detection of an error event may be achieved by the controller 208$o$ in response to receiving inputs from the sensor 110$o$, wherein the sensor 110$o$ may be one of a temperature sensor, piezoelectric sensor, puff sensor or any other similar sensor.

The controller 208$o$ upon detecting occurrence of any of the said error event or any of the said user misuse event, is configured to provide an alert to the user indicating that an error or misuse event has occurred in the device 201$o$. Precisely, the controller 208$o$ is configured to provide the alert signal to the output device 111$o$. The output device 111$o$ may be configured to generate one of visual, audio, and haptic feedbacks to alert the user of the error event or event of user misuse. To achieve this the output device 111$o$ may include a plurality of LEDs, audio sensor and haptic sensor embedded therein. In an embodiment, the output device 111$o$ comprises the LEDs 211$o$ on the user interface. In an embodiment, the output device 111$o$ further comprises an internal haptic feedback device (not shown) which generates vibration. In an embodiment, the output device 111$o$ comprises a speaker (not shown).

The controller 208$o$ may be further configured to disable the heater 204$o$ of the device 201$o$ upon detecting that one of error event and/or user misuse event has taken place. By disabling heater 204$o$ the controller 208$o$ ensures that the device 201$o$ may not be able to operate any further as the same can cause damage to the device or to the user.

In an embodiment, the output device 111$o$ is configured to provide distinct alerts for each of an error event and a user misuse event. In one example, the controller 208$o$ is configured, via the output device 111$o$, to generate a first alert comprising a steady LED 211$o$ when the controller 208$o$ detects a user misuse, whereas the controller 208$o$ is configured to generate a second alert comprising a flashing LED 211$o$ when the controller 208$o$ detects a device error event. Thus the user is informed of the type of event by the type of alert generated and is able to take appropriate action.

The controller 208$o$ is also configured to control the LEDs 211$o$ in response to (e.g., a detected) a condition of the device 201$o$ or the consumable 202$o$. For example, the controller may control the LEDs to indicate whether the device 201$o$ is in an on state or an off state (e.g., one or more of the LEDs may be illuminated by the controller when the device is in an on state).

The device 201$o$ comprises a further input means (i.e., in addition to the button 2120) in the form of a puff sensor 225$o$. The puff sensor 225$o$ is configured to detect a user drawing (i.e., inhaling) at the downstream end 218$o$ of the consumable 202$o$. The puff sensor 225$o$ may, for example, be in the form of a pressure sensor, a flowmeter, or a microphone. The puff sensor 225$o$ is operatively connected to the controller 208$o$ in the electronics cavity 224$o$, such that a signal from the puff sensor 225$o$, indicative of a puff state (i.e., drawing or not drawing), forms an input to the controller 208$o$ (and can thus be responded to by the controller 2080).

FIG. 47 illustrates flowchart of a method for detecting an occurrence of an error event or an event of user misuse.

As illustrated in FIG. 47, the method 300$o$ includes one or more blocks implemented by the controller 208$o$ of the device 201$o$. The method 300$o$ may be described in general context of controller executable instructions. Generally, controller executable instructions may include routines, programs, objects, components, data structures, procedures, modules, and functions, which perform particular functions or implement particular abstract data types.

The order in which the method 300$o$ is described is not intended to be construed as a limitation, and any number of the described method blocks can be combined in any order to implement the method 300$o$. Additionally, individual blocks may be deleted from the method 300$o$ without departing from the scope of the subject matter described herein. Furthermore, the method 300$o$ can be implemented in any suitable hardware, software, firmware, or combination thereof.

At block 301$o$, the controller 208$o$ is configured for detecting an error event and an event of user misuse of the device 201$o$. In an aspect, detecting discussed at block 301$o$ may comprise detecting both (i) error event and (ii) the event of user misuse, one at a time or simultaneously.

At block 302$o$, the output device 110$o$ is configured to alert the user that one of the error event or the user misuse event has occurred. In particular, upon detecting the occurrence of the error event or the user misuse event, as disclosed in block 301$o$, the controller 208$o$ is configured to provide a signal to the output device 111$o$. In response to said signal, the output device 111$o$ is configured to generate an alert indicating that an error event or user misuse event has occurred.

Although not explicitly disclosed in the flowchart, the output device 111$o$ may be configured to generate one of visual, audio, and haptic feedback to alert the user of the error event or event of user misuse. To achieve this the output device 111$o$ may include a plurality of LEDs, speaker or haptic feedback device embedded therein.

Seventeenth Mode: A Smoking Substitute Device Having a Controller Configured to Indicate to the User the Amount Energy Stored in the Battery, Regardless the Heater is Operation or Inactive.

Aspects and embodiments of the seventeenth mode of the present disclosure will now be discussed with reference to the accompanying figures. Further aspects and embodiments will be apparent to those skilled in the art. All documents mentioned in this text are incorporated herein by reference.

FIG. 48A is a schematic providing a general overview of a smoking substitute system 100$p$. The system 100$p$ includes a substitute smoking device 101$p$ and an aerosol-forming article in the form of a consumable 102$p$, which comprises an aerosol former 103$p$. The system is configured to vaporize the aerosol former by heating the aerosol former 103$p$ (so as to form a vapor/aerosol for inhalation by a user).

In the illustrated system, the heater 104$p$ forms part of the consumable 102$p$ and is configured to heat the aerosol former 103$p$. Heat from the heater 104$p$ vaporizes the aerosol former 103$p$ to produce a vapor. The vapor subsequently condenses to form an aerosol, which is ultimately inhaled by the user. In some embodiment, the heater 104$p$ is configured to be deactivated/disabled if the stored energy of the battery is found below a pre-determined threshold.

The system 100p further comprises a power source 105p that forms part of the device 101p. In other embodiments the power source 105p may be external to (but connectable to) the device 101p. The power source 105p is electrically connectable to the heater 104p such that the power source 105p is able to supply power to the heater 104p (i.e., for the purpose of heating the aerosol former 103p). Thus, control of the electrical connection of the power source 105p to the heater 104p provides control of the state of the heater 104p. The power source 105p may be a power store, for example a battery or rechargeable battery (e.g., a lithium-ion battery). Thus, in one exemplary embodiment, the power source 105p may be battery utilized for energizing the heater 104p.

The system 100p further comprises an I/O module comprising a connector 106p (e.g., in the form of a USB port, Micro USB port, USB-C port, etc.). The connector 106p is configured for connection to an external source of electrical power, e.g., a mains electrical supply outlet. The connector 106p may be used in substitution for the power source 105p. That is the connector 106p may be electrically connectable to the heater 104p so as to supply electricity to the heater 104p. In such embodiments, the device may not include a power source, and the power source of the system may instead comprise the connector 106p and an external source of electrical power (to which the connector 106p provides electrical connection).

In some embodiments, the connector 106p may be used to charge and recharge the power source 105p where the power source 104p includes a rechargeable battery.

The system 100p also comprises a user interface (UI) 107p. Although not shown, the UI 107p may include input means to receive commands from a user. The input means of the UI 107p allows the user to control at least one aspect of the operation of the system 100p. The input means may, for example, be in the form of a button, touchscreen, switch, microphone, etc.

The UI 107p also comprises output means to convey information to the user. The output means may, for example, comprise lights (e.g., LEDs), a display screen, speaker, vibration generator, etc.

The system 100p further comprises a controller 108p and a memory 109p operatively coupled to the controller 108p that is configured to control at least one function of the device 101p. In the illustrated embodiment, the controller 108p is a component of the device 101p, but in other embodiments may be separate from (but connectable to) the device 101p. The controller 108p is configured to measure and indicate to the user the energy stored in the battery, in response to receiving user input via the user interface (UI) 107p, during the standby mode and the standard mode. The controller 108p is further configured to control the operation of the heater 104p, for example the controller 108p may be configured to terminate energizing of the heater 104p by the battery, in response to detecting that the stored energy is measured less than the pre-determined threshold. The controller 108p may be further configured to control operation of the heater 104p, for example, may be configured to control the voltage applied from the power source 105p to the heater 104p. The controller 108p may be configured to toggle the supply of power to the heater 105p between an on state, in which the full output voltage of the power source 105p is applied to the heater 104p, and an off state, in which the no voltage is applied to the heater 104p.

Although not shown, the system 100p may also comprise a voltage regulator to regulate the output voltage from the power source 105p to form a regulated voltage. The regulated voltage may then be applied to the heater 104p.

In addition to being connected to the heater 104p, the controller 108p is operatively connected to the UI 107p. Thus, the controller 108p may receive an input signal from the input means of the UI 107p. Similarly, the controller 108p may transmit output signals to the UI 107p. In response, the output means of the UI 107p may convey information, based on the output signals, to a user.

Further, the system also comprise an output 110p coupled with the controller 108p within the smoking substitute device 101p. The output 110p may be a haptic device, audio outputting device or any other similar output device mounted inside the device and configured to (i). indicate the amount of energy stored in the battery and (ii). alert the user when the energy level is measured less than a pre-determined threshold. The output 110p may be configured to provide the indication/alert to the user though one of haptic or audio feedback.

FIG. 48B is a schematic showing a variation of the system 100p of FIG. 48A. In the system 100p' of FIG. 48B, the heater 104p forms part of the device 101p, rather than the consumable 102p. In this variation, the heater 104p is electrically connectable to the power source 105p.

FIG. 49A and FIG. 49B illustrate a heated-tobacco (HT) smoking substitute system 200p. The system 200p is an example of the systems 100p, 100p' described in relation to FIG. 48A or FIG. 48B. System 200p includes an HT device 201p that is configured to measure and indicate to the user the amount of energy stored in the battery during standby mode and standard operating mode and an HT consumable 202p. The description of FIG. 48A and FIG. 48B above is applicable to the system 200p of FIG. 49A and FIG. 49B and will thus not be repeated.

The device 201p and the consumable 202p are configured such that the consumable 202p can be engaged with the device 201p. FIG. 49A shows the device 201p and the consumable 202p in an engaged state, whilst FIG. 49B shows the device 201p and the consumable 202p in a disengaged state.

The device 201p comprises a body 209p and cap 210p. In use the cap 210p is engaged at an end of the body 209p. Although not apparent from the figures, the cap 210p is moveable relative to the body 209p. In particular, the cap 210p is slidable and can slide along a longitudinal axis of the body 209p.

The device 201p comprises an output means (forming part of the UI of the device 201p) in the form of a plurality of light-emitting diodes (LEDs) 211p arranged linearly along the longitudinal axis of the device 201p and on an outer surface of the body 209p of the device 201p. A button 212p is also arranged on an outer surface of the body 209p of the device 201p and is axially spaced (i.e., along the longitudinal axis) from the plurality of LEDs 211p.

FIG. 49C show a detailed section view of the consumable 202p of the system 200p. The consumable 202p generally resembles a cigarette. In that respect, the consumable 202p has a generally cylindrical form with a diameter of 7 mm and an axial length of 70 mm. The consumable 202p comprises an aerosol forming substrate 213p, a terminal filter element 214p, an upstream filter element 215p and a spacer element 216p. In other embodiments, the consumable may further comprise a cooling element. A cooling element may exchange heat with vapor that is formed by the aerosol-forming substrate 213p in order to cool the vapor so as to facilitate condensation of the vapor.

The aerosol-forming substrate 213p is substantially cylindrical and is located at an upstream end 217p of the consumable 202p and comprises the aerosol former of the system 200p. In that respect, the aerosol forming substrate 213p is configured to be heated by the device 201p to release a vapor. The released vapor is subsequently entrained in an airflow flowing through the aerosol-forming substrate 213p. The airflow is produced by the action of the user drawing on a downstream end 218p (i.e., terminal or mouth end) of the consumable 202p.

In the present embodiment, the aerosol forming substrate 213p comprises tobacco material that may, for example, include any suitable parts of the tobacco plant (e.g., leaves, stems, roots, bark, seeds, and flowers). The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon). For example, the aerosol-forming substrate 213p may comprise a gathered sheet of homogenized (e.g., paper/slurry recon) tobacco or gathered shreds/strips formed from such a sheet.

In order to generate an aerosol, the aerosol forming substrate 213p comprises at least one volatile compound that is intended to be vaporized/aerosolized and that may provide the user with a recreational and/or medicinal effect when inhaled. The aerosol-forming substrate 213p may further comprise one or more additives. For example, such additives may be in the form of humectants (e.g., propylene glycol and/or vegetable glycerin), flavorants, fillers, aqueous/non-aqueous solvents and/or binders.

The terminal filter element 214p is also substantially cylindrical and is located downstream of the aerosol forming substrate 213p at the downstream end 218p of the consumable 202p. The terminal filter element 214p is in the form of a hollow bore filter element having a bore 219p (e.g., for airflow) formed therethrough. The diameter of the bore 219p is 2 mm. The terminal filter element 214p is formed of a porous (e.g., monoacetate) filter material. As set forth above, the downstream end 218p of the consumable 202p (i.e., where the terminal filter 214p is located) forms a mouthpiece portion of the consumable 202p upon which the user draws. Airflow is drawn from the upstream end 217p, thorough the components of the consumable 202p, and out of the downstream end 218p. The airflow is driven by the user drawing on the downstream end 218p (i.e., the mouthpiece portion) of the consumable 202p.

The upstream filter element 215p is located axially adjacent to the aerosol-forming substrate 213p, between the aerosol-forming substrate 213p and the terminal filter element 214p. Like the terminal filter 214p, the upstream filter element 215p is in the form of a hollow bore filter element, such that it has a bore 220p extending axially therethrough. In this way, the upstream filter 215p may act as an airflow restrictor. The upstream filter element 215p is formed of a porous (e.g., monoacetate) filter material. The bore 220p of the upstream filter element 214p has a larger diameter (3 mm) than the terminal filter element 214p.

The spacer 216p is in the form of a cardboard tube, which defines a cavity or chamber between the upstream filter element 215p and the terminal filter element 214p. The spacer 216p acts to allow both cooling and mixing of the vapor/aerosol from the aerosol-forming substrate 213p. The spacer has an external diameter of 7 mm and an axial length of 14 mm.

Although not apparent from the figure, the aerosol-forming substrate 213p, upstream filter 215p and spacer 216p are circumscribed by a paper wrapping layer. The terminal filter 214p is circumscribed by a tipping layer that also circumscribes a portion of the paper wrapping layer (so as to connect the terminal filter 214p to the remaining components of the consumable 202p). The upstream filter 215p and terminal filter 214p are circumscribed by further wrapping layers in the form of plug wraps.

Returning now to the device 201p, FIG. 49D illustrates a detailed view of the end of the device 201p that is configured to engage with the consumable 202p. The cap 210p of the device 201p includes an opening 221p to an internal cavity 222p (more apparent from FIG. 49D) defined by the cap 210p. The opening 221p and the cavity 222p are formed so as to receive at least a portion of the consumable 202p. During engagement of the consumable 202p with the device 201p, a portion of the consumable 202p is received through the opening 221p and into the cavity 222p. After engagement (see FIG. 49B), the downstream end 218p of the consumable 202p protrudes from the opening 221p and thus also protrudes from the device 201p. The opening 221p includes laterally disposed notches 226p. When a consumable 202p is received in the opening 221p, these notches 226p remain open and could, for example, be used for retaining a cover in order to cover the end of the device 201p.

FIG. 49E shows a cross section through a central longitudinal plane through the device 201p. The device 201p is shown with the consumable 202p engaged therewith.

The device 201p comprises a heater 204p comprising heating element 223p. The heater 204p forms part of the body 209p of the device 201p and is rigidly mounted to the body 209p. In the illustrated embodiment, the heater 204p is a rod heater with a heating element 223p having a circular transverse profile. In other embodiments the heater may be in the form of a blade heater (e.g., heating element with a rectangular transverse profile) or a tube heater (e.g., heating element with a tubular form).

The heating element 223p of the heater 204p projects from an internal base of the cavity 222p along a longitudinal axis towards the opening 221p. As is apparent from the figure, the length (i.e., along the longitudinal axis) of the heating element is less than a depth of the cavity 222p. In this way, the heating element 223p does not protrude from or extend beyond the opening 221p.

When the consumable 202p is received in the cavity 222p (as is shown in FIG. 49E), the heating element 223p penetrates the aerosol-forming substrate 213p of the consumable 202p. In particular, the heating element 223p extends for nearly the entire axial length of the aerosol-forming substrate 213p when inserted therein. Thus, when the heater 204p is activated, heat is transferred radially from an outer circumferential surface the heating element 223p to the aerosol-forming substrate 213p.

The device 201p further comprises an electronics cavity 224p. A power source, in the form of a rechargeable battery 205p (a lithium-ion battery), is located in electronics cavity 224p.

The device 201p includes a connector (i.e., forming part of an IO module of the device 201p) in the form of a USB port 206p. The connector may alternatively be, for example, a micro-USB port or a USB-C port for examples. The USB port 206p may be used to recharge the rechargeable battery 205p.

The device 201p includes a controller (not shown) located in the electronics cavity 224p. The controller comprises a microcontroller mounted on a printed circuit board (PCB). The USB port 206p is also connected to the controller 208p (i.e., connected to the PCB and microcontroller). The controller 208p is configured to control various functions of the device 201p. For example, the controller 208p is configured to measure and indicate to a user the amount of energy stored in the battery in response to receiving a user input via the user interface (UI). In the illustrated embodiment, the controller 208p may be configured to measure and indicate the amount of energy stored in the battery during the standby mode, i.e., when the heater 204p of the device 201p is deactivated. The standby mode is a mode where the heater 204p is deactivated however, the device 201p is still in on state but not operational.

In addition, in the illustrated embodiment, the controller 208p is configured measure and indicate to the user the amount of energy stored in the battery, in response to receiving user input via user interface (UI), during standard operating mode. During the standard operating mode, the heater 204p of the device 201p is in the activated state, i.e., during the standard operating state the battery is continuously providing power to the heater 204p. Thus, the controller 208p is configured to measure and indicate to the user the amount of energy stored in the battery of the device 201p irrespective of the heater 204p being in activated state or deactivated state.

The controller 208p not only indicates to the user the amount of energy left in the battery but also provides alert to the user if the stored energy of the battery goes below a pre-determined threshold. The pre-determined threshold is an indication of the battery of the device 201p requiring immediate charging. Said alert indicates the user to stop using the device 201p to avoid switching off of the device 201p.

The controller 208p is connected to a plurality of LEDs (not shown). Said plurality of LEDs are configured to at least (i). indicate the amount of energy stored in the battery and (ii). alert the user when the stored is measured less than a pre-determined threshold. In the illustrated example, the controller 208p may be configured to control the illumination pattern of the LEDs to provide distinct illumination for (i). indicating the amount of energy stored in the battery and/or (ii). providing alert to the user when the stored energy is measured less than a pre-determined threshold. For example, the controller 208p may be configured to illuminate one or more LEDs among plurality of LEDs to indicate different levels of energy stored in the battery, e.g., at 25% intervals. In another example, the controller 208p may be configured to blink one or more LEDs among plurality of LEDs to alert the user that the stored energy is measured less than a pre-determined threshold.

The controller 208p may further connected to an output 110p. The output 110p is also configured to indicate the amount of energy stored in the battery and alert the user when the energy level is measured less than a pre-determined threshold through one of haptic and/or audio feedback. The output 110p may be a haptic device or an audio outputting device. Further the output 110p may be configured to provide distinct feedbacks for (i). indicating the amount of energy stored in the battery and (ii). providing alert to the user when the energy level is measured less than below a pre-determined threshold, so that the user may be able to differentiate between the two easily.

The controller 208p is configured to control other functions of the device 201p. For example, the controller 208p is configured to control the operation of the heater 204p. Such control of the operation of the heater 204p may be accomplished by the controller toggling the electrical connection of the rechargeable battery 205p to the heater 204p. For example, the controller 208p is configured to control the heater 204p in response to a user depressing the button 212p. Depressing the button 212p may cause the controller to allow a voltage (from the rechargeable battery 205p) to be applied to the heater 204p (so as to cause the heating element 223p to be heated). In another example, the controller 208p is configured to terminate energizing of the heater 204p by the battery, in response to detecting that the stored energy is measured less than the pre-determined threshold. For example, if the device 201p is in operational mode and the controller 208p receives a user input for measuring the amount of energy stored in the battery, the controller 208p detects the amount of energy stored in the battery. In case the amount of energy stored in the battery is found to be below a pre-determined threshold the controller 208p terminate the supply of power from the battery to the heater 204p, until the device 208p is sufficiently charged. To achieve this the controller 208p compares the measured energy level of the battery to a pre-determined threshold energy level stored in the memory.

The controller 208p is also configured to control the LEDs 211p in response to (e.g., a detected) a condition of the device 201p or the consumable 202p. For example, the controller may control the LEDs to indicate whether the device 201p is in an on state or an off state (e.g., one or more of the LEDs may be illuminated by the controller when the device is in an on state).

The device 201p comprises a further input means (i.e., in addition to the button 212p) in the form of a puff sensor 225p. The puff sensor 225p is configured to detect a user drawing (i.e., inhaling) at the downstream end 218p of the consumable 202p. The puff sensor 225p may, for example, be in the form of a pressure sensor, a flowmeter, or a microphone. The puff sensor 225p is operatively connected to the controller 208p in the electronics cavity 224p, such that a signal from the puff sensor 225p, indicative of a puff state (i.e., drawing or not drawing), forms an input to the controller 208p (and can thus be responded to by the controller 208p).

FIG. 50A and FIG. 50B illustrate an e-cigarette smoking substitute system 300p. The system 300p is an example of the systems 100p, 100p' of FIG. 48A and FIG. 48B and comprises an e-cigarette device 301p and an e-cigarette consumable 302p. The description of FIG. 48A and FIG. 48B above is applicable to the system of FIG. 50A and FIG. 50B and will not be repeated.

The device 301p and the consumable 302p are configured such that the consumable 302p can be engaged with the device 301p. FIG. 50A shows the device 301p and the consumable 302p in an engaged state, whilst FIG. 50B shows the device 301p and the consumable 302p in a disengaged state. During engagement a portion of the consumable 302p is received in a cavity 322p of the device 301p. The consumable 302p is retained in the device 301p via an interference fit (although in other embodiments, the device and consumable could be engaged by screwing one onto (or onto) the other, through a bayonet fitting, or by way of a snap engagement mechanism).

The consumable 302p includes a tank 327p. The tank 327p defines a reservoir for the storage of an aerosol-former, which in this embodiment, is in the form of e-liquid.

In this present embodiment, the consumable 302p is a "single-use" consumable. That is, upon exhausting the e-liquid in the tank 327p, the intention is that the user disposes of the whole consumable 302p. In other embodiments, the e-liquid (i.e., aerosol former) may be the only part of the system that is truly "single-use". In such embodiments, the tank may be refillable with e-liquid, or the e-liquid may be stored in a non-consumable component of the system. For example, the e-liquid may be stored in a tank located in the device or stored in another component that is itself not single-use (e.g., a refillable cartomizer).

In the illustrated system 300p, a heater 304p is located in the consumable 302p and is configured to heat and vaporize the e-liquid (stored in the tank 327p). Although not shown, the heater 304p comprises a porous wick and a resistive heating element. The porous wick conveys e-liquid from the tank 327p to the heating element. The heating element is a heating filament that is helically wound around a portion of the porous wick, such that when the heating element is heated (e.g., by the action of electrical current passing through the heating element), heat is transferred from the heating element to the e-liquid conveyed by the wick. This transfer of heat vaporizes the e-liquid, and the resultant vapor is entrained in an airflow passing through the consumable 302p (i.e., driven by a user drawing on a downstream end 318p of the consumable 302p). Between the vaporization point at the coil and the downstream end 318p (i.e., the mouth end), the vapor condenses into an aerosol, and is subsequently inhaled by the user.

Like the previously described embodiment, the device 301p comprises a power source in the form of a rechargeable battery (not shown) and a connector in the form of a USB port (not shown). The device 302p further comprises controller (also not shown). The rechargeable battery, connector and controller are similar (and operate in a similar manner) to the corresponding components of the embodiment described above with respect to FIG. 48A to FIG. 48E.

The consumable 302p includes a pair of heater electrical contacts 328p disposed on a device-facing end surface of the consumable 302p. The heater electrical contacts 328p are electrically connected to the heater 304p in the consumable 302p, such that a voltage applied across the heater electrical contacts 302p generally corresponds to a voltage applied across the resistive heating element of the heater 304p.

When the consumable 302p is engaged with the device 301p, the heater electrical contacts 328p are brought into electrical contact with corresponding device electrical contacts (not shown) on the device 301p. The device electrical contacts are electrically connected (directly or indirectly) to the rechargeable battery. The controller may thus be configured to control the voltage applied across the device electrical contacts from the rechargeable battery. By controlling the voltage applied across the device electrical contacts, the voltage applied to the heater 304p is correspondingly controlled.

The device 302p includes an output means (forming part of the UI of the system 300p) in the form of a single light-emitting diode ("LED") 311p. The LED 311p is operatively connected to the controller, such that controller can control the illumination of the LED 311p. The controller is configured to illuminate the LED when then the heater 304p is active.

The device 301p also includes an input means in the form of a puff sensor (not shown). The puff sensor is the same as that described above with respect to the embodiment shown in FIG. 48A to FIG. 48E.

FIG. 51 illustrates flowchart of method for measuring and indicating to a user the amount of energy stored in the battery.

As illustrated in FIG. 51, the method 400p includes one or more blocks implemented by the controller 208p of the device 201p. The method 400p may be described in general context of controller executable instructions. Generally, controller executable instructions may include routines, programs, objects, components, data structures, procedures, modules, and functions, which perform particular functions or implement particular abstract data types.

The order in which the method 400p is described is not intended to be construed as a limitation, and any number of the described method blocks can be combined in any order to implement the method 400p. Additionally, individual blocks may be deleted from the method 400p without departing from the scope of the subject matter described herein. Furthermore, the method 400p can be implemented in any suitable hardware, software, firmware, or combination thereof.

At block 401p, the controller 208p is configured for receiving user input to measure the amount of energy stored in the battery. Although not explicitly disclose in block 401p, however, the controller 208p is configured for receiving the user input in either a standby operating mode, i.e., with heater 204p deactivated or a standard operating mode where heater 204p is activated.

At block 402p, the controller 208p is configured for measuring the energy stored in the battery. To achieve this the controller 208p is connected to the battery through one or more sensors (not shown) indicating the amount of energy stored in the battery.

At block 403p, the controller 208p is configured to indicate to the user the amount of energy stored in the battery as detected at block 402p. In the illustrated embodiment, the controller 208p is configured to indicate the amount of energy in the battery to the user via a plurality of LEDs. In another embodiment, the controller 208p may be configured to indicate the amount of energy stored in the battery to the user via the output 110p.

The plurality of LEDs comprises four LEDs 211p for providing said illumination patterns, wherein in said illumination patterns the four LEDs are configured to indicate the amount of stored energy at 25% intervals. In the illustrated embodiment, the controller causes one or more of the plurality of light emitters or LEDs to illuminate or flash when indicating the stored energy level of battery. That is, the controller causes a single LED to illuminate or flash when the stored energy is measured to be between 1% to 25% of full capacity of the battery, the controller causes two LEDs to illuminate or flash when the stored energy is measured to be between 26% to 50% of full capacity of the battery, the controller causes three LEDs to illuminate or flash when the stored energy is measured to be between 51% to 75% of full capacity of the battery, and the controller causes all of the four LEDs to illuminate or flash when the stored energy is measured to be between 76% to 100% of full capacity of the battery.

Although not explicitly disclosed in the flowchart, however the controller 208p is further configured to alert the user when the stored energy is measured less than a pre-determined threshold. Further, upon detecting that the stored energy is measured less than the pre-determined threshold, the method discloses the step of terminating energizing of the heater 204p by the battery.

This prevents the battery from completely depleted of stored energy and the device 201p from shut down completely.

Eighteenth Mode: The Inclusion of a Controller in the Smoking Substitute Device to Determine the Amount of Consumable Available in a Session.

Aspects and embodiments of the eighteenth mode of the present disclosure will now be discussed with reference to the accompanying figures. Further aspects and embodiments will be apparent to those skilled in the art. All documents mentioned in this text are incorporated herein by reference.

FIG. 52A is a schematic providing a general overview of a smoking substitute system 100q. The system 100q includes a substitute smoking device 101q and an aerosol-forming article in the form of a consumable 102q, which comprises an aerosol former 103q. The system is configured to vaporize the aerosol former by heating the aerosol former 103q (so as to form a vapor/aerosol for inhalation by a user).

In the illustrated system, the heater 104q forms part of the consumable 102q and is configured to heat the aerosol former 103q. Heat from the heater 104q vaporizes the aerosol former 103q to produce a vapor. The vapor subsequently condenses to form an aerosol, which is ultimately inhaled by the user.

The system 100q further comprises a power source 105q that forms part of the device 101q. In other embodiments the power source 105q may be external to (but connectable to) the device 101q. The power source 105q is electrically connectable to the heater 104q such that the power source 105q is able to supply power to the heater 104q (i.e., for the purpose of heating the aerosol former 103q). Thus, control of the electrical connection of the power source 105q to the heater 104q provides control of the state of the heater 104q. The power source 105q may be a power store, for example a battery or rechargeable battery (e.g., a lithium-ion battery).

The system 100q further comprises an I/O module comprising a connector 106q (e.g., in the form of a USB port, Micro USB port, USB-C port, etc.). The connector 106q is configured for connection to an external source of electrical power, e.g., a mains electrical supply outlet. The connector 106q may be used in substitution for the power source 105q. That is the connector 106q may be electrically connectable to the heater 104q so as to supply electricity to the heater 104q. In such embodiments, the device may not include a power source, and the power source of the system may instead comprise the connector 106q and an external source of electrical power (to which the connector 106q provides electrical connection).

In some embodiments, the connector 106q may be used to charge and recharge the power source 105q where the power source 105q includes a rechargeable battery.

The system 100q also comprises a user interface (UI) 107q. Although not shown, the UI 107q may include input means to receive commands from a user. The input means of the UI 107q allows the user to control at least one aspect of the operation of the system 100q. The input means may, for example, be in the form of a button, touchscreen, switch, microphone, etc.

The UI 107q also comprises output means to convey information to the user. The output means may, for example, comprise lights (e.g., LEDs), a display screen, speaker, vibration generator, etc. The system 100q may further comprise a display 111q. The display 111q may be configured to display to the user the remaining usable lifetime of the consumable. In one embodiment, the display screen of the UI 107q may act as display 111q. In other embodiment, the display 111q may be a separate unit, i.e., outside the UI 107q, as depicted in FIG. 52A and FIG. 52B.

The system 100q further comprises a controller 108q and a memory 109q operatively coupled to the controller 108q. that is configured to control at least one function of the device 101q. In the illustrated embodiment, the controller 108q is a component of the device 101q, but in other embodiments may be separate from (but connectable to) the device 101q. The controller 108q may be configured to determine the remaining usable lifetime of a consumable to be consumed in a session. The controller 108q may be configured to determine the remaining usable lifetime of a consumable upon receiving user request. In addition, the controller 108q may be configured to determine the type of consumable 103q used with the device 101q and determine the remaining usable lifetime of a consumable based on type of consumable detected. The controller 108q is further configured to control the operation of the heater 104q and, for example, may be configured to control the voltage applied from the power source 105q to the heater 104q. The controller 108q may be configured to toggle the supply of power to the heater 104q between an on state, in which the full output voltage of the power source 105q is applied to the heater 104q, and an off state, in which the no voltage is applied to the heater 104q.

Although not shown, the system 100q may also comprise a voltage regulator to regulate the output voltage from the power source 105q to form a regulated voltage. The regulated voltage may then be applied to the heater 104q.

In addition to being connected to the heater 104q, the controller 108q is operatively connected to the UI 107q. Thus, the controller 108q may receive an input signal from the input means of the UI 107q. Similarly, the controller 108q may transmit output signals to the UI 107q. In response, the output means of the UI 107q may convey information, based on the output signals, to a user.

Further, the system 100q may comprise a sensor 110q coupled with the controller 108q within the device 101q. The sensor 110q may be a puff sensor mounted inside the device 101q and configured to keep a count of number and/or magnitude of puffs inhaled during a session. Further, the sensor 110q may be a temperature sensor configured to determine the ambient temperature.

FIG. 52B is a schematic showing a variation of the system 100q of FIG. 52A. In the system 100q' of FIG. 52B, the heater 104q forms part of the device 101q, rather than the consumable 102q. In this variation, the heater 104q is electrically connected to the power source 105q.

FIG. 53A and FIG. 53B illustrate a heated-tobacco (HT) smoking substitute system 200q. The system 200q is an example of the systems 100q, 100q' described in relation to FIG. 52A or FIG. 52B. System 200q includes an HT device 201q that is configured to determine the remaining usable lifetime of a consumable 202q left for consumption in a session and an HT consumable 202q. The description of FIG. 52A and FIG. 52B above is applicable to the system 200q of FIG. 53A and FIG. 53B and will not be repeated.

The device 201q and the consumable 202q are configured such that the consumable 202q can be engaged with the device 201q. FIG. 53A shows the device 201q and the consumable 202q in an engaged state, whilst FIG. 53B shows the device 201q and the consumable 202q in a disengaged state.

The device 201q comprises a body 209q and cap 210q. In use the cap 210q is engaged at an end of the body 209q. Although not apparent from the figures, the cap 210q is moveable relative to the body 209q. In particular, the cap 210q is slidable and can slide along a longitudinal axis of the body 209q.

The device 201q comprises an output means (forming part of the UI of the device 201q) in the form of a plurality of light-emitting diodes (LEDs) 211q arranged linearly along the longitudinal axis of the device 201q and on an outer surface of the body 209q of the device 201q. A button 212q is also arranged on an outer surface of the body 209q of the device 201q and is axially spaced (i.e., along the longitudinal axis) from the plurality of LEDs 211q.

FIG. 53C show a detailed section view of the consumable 202q of the system 200q. The consumable 202q generally resembles a cigarette. In that respect, the consumable 202q has a generally cylindrical form with a diameter of 7 mm and an axial length of 70 mm. The consumable 202q comprises an aerosol forming substrate 213q, a terminal filter element 214q, an upstream filter element 215q and a spacer element 216q. In other embodiments, the consumable may further comprise a cooling element. A cooling element may exchange heat with vapor that is formed by the aerosol-forming substrate 213q in order to cool the vapor so as to facilitate condensation of the vapor.

The aerosol-forming substrate 213q is substantially cylindrical and is located at an upstream end 217q of the consumable 202q and comprises the aerosol former of the system 200q. In that respect, the aerosol forming substrate 213q is configured to be heated by the device 201q to release a vapor. The released vapor is subsequently entrained in an airflow flowing through the aerosol-forming substrate 213q. The airflow is produced by the action of the user drawing on a downstream end 218q (i.e., terminal or mouth end) of the consumable 202q.

In the present embodiment, the aerosol forming substrate 213q comprises tobacco material that may, for example, include any suitable parts of the tobacco plant (e.g., leaves, stems, roots, bark, seeds, and flowers). The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon). For example, the aerosol-forming substrate 213q may comprise a gathered sheet of homogenized (e.g., paper/slurry recon) tobacco or gathered shreds/strips formed from such a sheet.

In order to generate an aerosol, the aerosol forming substrate 213q comprises at least one volatile compound that is intended to be vaporized/aerosolized and that may provide the user with a recreational and/or medicinal effect when inhaled. The aerosol-forming substrate 213q may further comprise one or more additives. For example, such additives may be in the form of humectants (e.g., propylene glycol and/or vegetable glycerin), flavorants, fillers, aqueous/non-aqueous solvents and/or binders.

The terminal filter element 214q is also substantially cylindrical and is located downstream of the aerosol forming substrate 213q at the downstream end 218q of the consumable 202q. The terminal filter element 214q is in the form of a hollow bore filter element having a bore 219q (e.g., for airflow) formed therethrough. The diameter of the bore 219q is 2 mm. The terminal filter element 214q is formed of a porous (e.g., monoacetate) filter material. As set forth above, the downstream end 218q of the consumable 202q (i.e., where the terminal filter 214q is located) forms a mouthpiece portion of the consumable 202q upon which the user draws. Airflow is drawn from the upstream end 217q, thorough the components of the consumable 202q, and out of the downstream end 218q. The airflow is driven by the user drawing on the downstream end 218q (i.e., the mouthpiece portion) of the consumable 202q.

The upstream filter element 215q is located axially adjacent to the aerosol-forming substrate 213q, between the aerosol-forming substrate 213q and the terminal filter element 214q. Like the terminal filter 214q, the upstream filter element 215q is in the form of a hollow bore filter element, such that it has a bore 220q extending axially therethrough. In this way, the upstream filter 215q may act as an airflow restrictor. The upstream filter element 215q is formed of a porous (e.g., monoacetate) filter material. The bore 220q of the upstream filter element 215q has a larger diameter (3 mm) than the terminal filter element 214q.

The spacer 216q is in the form of a cardboard tube, which defines a cavity or chamber between the upstream filter element 215q and the terminal filter element 214q. The spacer 216q acts to allow both cooling and mixing of the vapor/aerosol from the aerosol-forming substrate 213q. The spacer has an external diameter of 7 mm and an axial length of 14 mm.

Although not apparent from the figure, the aerosol-forming substrate 213q, upstream filter 215q and spacer 216q are circumscribed by a paper wrapping layer. The terminal filter 214q is circumscribed by a tipping layer that also circumscribes a portion of the paper wrapping layer (so as to connect the terminal filter 214q to the remaining components of the consumable 202q). The upstream filter 215q and terminal filter 214q are circumscribed by further wrapping layers in the form of plug wraps.

Returning now to the device 201q, FIG. 53D illustrates a detailed view of the end of the device 201q that is configured to engage with the consumable 202q. The cap 210q of the device 201q includes an opening 221q to an internal cavity 222q (more apparent from FIG. 53D) defined by the cap 210q. The opening 221q and the cavity 222q are formed so as to receive at least a portion of the consumable 202q. During engagement of the consumable 202q with the device 201q, a portion of the consumable 202q is received through the opening 221q and into the cavity 222q. After engagement (see FIG. 53B), the downstream end 218q of the consumable 202q protrudes from the opening 221q and thus also protrudes from the device 201q. The opening 221q includes laterally disposed notches 226q. When a consumable 202q is received in the opening 221q, these notches 226q remain open and could, for example, be used for retaining a cover in order to cover the end of the device 201q.

FIG. 53E shows a cross section through a central longitudinal plane through the device 201q. The device 201q is shown with the consumable 202q engaged therewith.

The device 201q comprises a heater 204q comprising heating element 223q. The heater 204q forms part of the body 209q of the device 201q and is rigidly mounted to the body 209q. In the illustrated embodiment, the heater 204q is a rod heater with a heating element 223q having a circular transverse profile. In other embodiments the heater may be in the form of a blade heater (e.g., heating element with a rectangular transverse profile) or a tube heater (e.g., heating element with a tubular form).

The heating element 223q of the heater 204q projects from an internal base of the cavity 222q along a longitudinal axis towards the opening 221q. As is apparent from the figure, the length (i.e., along the longitudinal axis) of the heating element is less than a depth of the cavity 222q. In this way, the heating element 223q does not protrude from or extend beyond the opening 221q.

When the consumable 202q is received in the cavity 222q (as is shown in FIG. 53E), the heating element 223q penetrates the aerosol-forming substrate 213q of the consumable 202q. In particular, the heating element 223q extends for nearly the entire axial length of the aerosol-forming substrate 213q when inserted therein. Thus, when the heater 204q is activated, heat is transferred radially from an outer circumferential surface the heating element 223q to the aerosol-forming substrate 213q.

The device 201q further comprises an electronics cavity 224q. A power source, in the form of a rechargeable battery 205q (a lithium-ion battery), is located in electronics cavity 224q.

The device 201q includes a connector (i.e., forming part of an IO module of the device 201q) in the form of a USB port 206q. The connector may alternatively be, for example, a micro-USB port or a USB-C port for examples. The USB port 206q may be used to recharge the rechargeable battery 205q.

The device 201q includes a controller (not shown) located in the electronics cavity 224q. The controller comprises a microcontroller mounted on a printed circuit board (PCB). The USB port 206q is also connected to the controller 208q (i.e., connected to the PCB and microcontroller).

The controller 208q is configured to control at least one function of the device 201q. For example, the controller 208q is configured to control the operation of the heater 204q. Such control of the operation of the heater 204q may be accomplished by the controller toggling the electrical connection of the rechargeable battery 205q to the heater 204q. For example, the controller 208q is configured to control the heater 204q in response to a user depressing the button 212q. Depressing the button 212q may cause the controller to allow a voltage (from the rechargeable battery 205q) to be applied to the heater 204q (so as to cause the heating element 223q to be heated).

In an aspect, the controller 208q may be configured to determine the remaining usable lifetime of a consumable 202q to be consumed in a session. The controller 208q may be configured to determine the remaining usable lifetime of a consumable 202q in response to receiving user request/input. The controller 208q may be configured to receive the user input/request via one of the input means of the UI 107q. For example, the controller 208q may be configured to determine the remaining usable lifetime in response to the user pressing the power button or a separate, bespoke usable lifetime status button.

In one aspect, to determine the remaining usable lifetime of a consumable 202q, the controller 208q may use remaining time left in the smoking session. To achieve this the controller 208q may be configured to provide a smoking session of a duration corresponding with the expected total lifetime of a consumable 202q. Simultaneously, the controller 208q may also keep a track of time elapsed during said session in which the consumable 202q was consumed. Based on this information the controller 208q may be configured to calculate the remaining usable lifetime of the consumable at any given point of time and present this information to the user in discrete intervals on the display.

In other aspect, to determine the remaining usable lifetime of the consumable 202q, the controller 208q may make use of total duration of the smoking session. To achieve this the controller 208q may be configured to first determine the total duration of the smoking session. The controller 208q may be further configured to track elapsed time in the smoking session. Based on said information the controller 208q may be configured to determine the remaining usable lifetime of the consumable.

In another aspect, the controller 208q may be configured to measure ambient temperature and incorporate the ambient temperature into the determination of the remaining usable lifetime of the consumable 202q. To achieve this, the controller 208q may be configured to measure the ambient temperature using the sensor 110q. The calculation to determine the amount of remaining usable lifetime of the consumable 202q may be based on the relationship of the consumable 202q with the ambient temperature, i.e., amount of consumable 202q that may get vaporized/used on a certain ambient temperature.

In another aspect, the controller 208q may make use of the number and/or magnitude of puffs inhaled by the user. In an example, the controller 208q may be configured to determine the remaining usable lifetime of the consumable 202q based on the number of puffs inhaled by the user. For this, the controller may keep a track of total puffs available during a session and the number of puffs inhaled by the user. Since, the controller 208q is aware of the amount of consumable consumed in one puff, the controller 208q may be able to determine the remaining usable lifetime.

To make this possible, the device 201q may comprise a puff sensor 225q connected to the controller 208q and configured to detect at least one puff inhaled by the user during a session. In one embodiment, the controller 208q may be configured to keep a track of each puff inhaled by the user and detected by the sensor 225q during said session. The puff sensor 225q is configured to pass on information to the controller 208q when a puff is detected, which may include (a) that a puff has been detected, and/or (b) the magnitude of that puff. The controller 208q uses said information to determine the remaining usable lifetime.

In another aspect, the controller 208q may be configured to determine the remaining usable lifetime based on the type of consumable 202q. The controller 208q may have pre-stored information about different type of consumable 202q that may be used in conjunction with the device 201q. In one example, the controller 208q may have information regarding each type of consumable 202q and the consumable cycle for each of these consumables 202q. Thus, the controller 208q first needs to determine the type of consumable 202q inserted in the device 201q, which may be detected by a sensor (not shown). The controller 208q may than use the prestored information to determine the remaining usable lifetime at a given point during the session.

Further, the controller 208q is connected to the display 111q. Said display 111q may be configured to display the remaining usable lifetime, as determined by the controller 208q. The display 111q may be configured to display the remaining usable lifetime in response to receiving user input/request, e.g., pressing of a button on the UI.

In some embodiment, the controller 208q may be configured to determine and display the remaining usable lifetime during an active smoking session, i.e., when the heater 204q of the device 201q is switched on. In some embodiments, the controller 208q may be configured to generate an alert to the user to indicate that the user has requested information on the remaining usable lifetime or is entering the final time period of the usable lifetime based on the determination.

In one example, to provide an alert the device 201q may include a haptic feedback device (not shown) connected to the controller 208q. The haptic feedback device may be configured to provide haptic feedback to the user.

The controller 208q is also configured to control the LEDs 211q in response to (e.g., a detected) a condition of the device 201q or the consumable 202q. For example, the controller may control the LEDs to indicate whether the device 201q is in an on state or an off state (e.g., one or more of the LEDs may be illuminated by the controller when the device is in an on state).

In an embodiment of the disclosure, the controller 208q is configured to determine the remaining usable lifetime of the consumable in said session, and display said remaining usable lifetime by means of the LEDs 211q. The four LEDs 211q indicate the remaining usable lifetime of the consumable in 25% intervals. When the user presses the button 212q during an active smoking session, a certain number of the LEDs 211q light up depending on the remaining usable lifetime of the consumable as determined by the controller and remain lit for 2 seconds. If the controller determines that the remaining usable lifetime of the consumable is greater than 75%, all four LEDs light up. If the controller determines that the remaining usable lifetime of the consumable is greater than 50% and up to and including 75%, three of the four LEDs 211q light up. If the controller determines that the remaining usable lifetime of the consumable is greater than 25% and up to and including 50%, two of the four LEDs light up. If the controller determines that the remaining usable lifetime of the consumable is greater than 0% and up to and including 25%, one of the four LEDs light up. If the controller determines that the remaining usable lifetime of the consumable is 0% (i.e., the consumable is fully depleted), none of the LEDs light up and the user becomes aware that replacement of the consumable is recommended to maintain a good user experience.

Moving upwards in FIG. 53A, the four LEDs 211q may be denoted 211q-1, 211q-2, 211q-3, and 211q-4 (not shown in the Figure). In another embodiment of the disclosure, when the user presses the button 212q during an active smoking session, a single one of the LEDs 211q lights up for 2 seconds, and the particular LED which lights up depends on the remaining usable lifetime of the consumable as determined by the controller. If the controller determines that the remaining usable lifetime of the consumable is greater than 75%, LED 211q-4 lights up. If the controller determines that the remaining usable lifetime of the consumable is greater than 50% and up to and including 75%, LED 211q-3 lights up. If the controller determines that the remaining usable lifetime of the consumable is greater than 25% and up to and including 50%, LED 211q-2 lights up. If the controller determines that the remaining usable lifetime of the consumable is greater than 0% and up to and including 25%, LED 211q-1 lights up. If the controller determines that the remaining usable lifetime of the consumable is 0% (i.e., the consumable is fully depleted), none of the LEDs light up and the user becomes aware that replacement of the consumable is recommended to maintain a good user experience. In this embodiment, each of the preceding LEDs in the sequence 211q-1, 211q-2, 211q-3, and 211q-4 may light up sequentially before the final indicative LED lights up. For example, if the controller determines that the remaining usable lifetime of the consumable is greater than 50% and up to and including 75%, LED 211q-1, LED 211q-2 and LED 211q-3 light up sequentially, with LED 211q-3 then remaining lit for 2 seconds.

Although not shown in the Figures, there may be an indicator on the display beside the LEDs 211q reflecting the remaining usable lifetime of the consumable indicated when that LED lights up. For example, the indicator "75%" may be printed on the device beside LED 211q-3.

When the device 201q is in standby mode, the controller 208q is configured instead to display the remaining battery life of the device 201q using the LEDs 211q. In one embodiment of the disclosure, when the device is in standby mode and the user presses the button 212q, if the controller determines that the remaining battery life is greater than 75%, all four LEDs light up. If the controller determines that the remaining battery life is 0% (i.e., the battery is fully depleted), none of the LEDs light up and the user becomes aware that recharging of the device is required.

The device 201q comprises a further input means (i.e., in addition to the button 212q) in the form of the puff sensor 225q. As discussed, the puff sensor 225q is configured to detect a user drawing (i.e., inhaling) at the downstream end 218q of the consumable 202q. The puff sensor 225q may, for example, be in the form of a pressure sensor, a flowmeter, or a microphone. The puff sensor 225q is operatively connected to the controller 208q in the electronics cavity 224q, such that a signal from the puff sensor 225q, indicative of a puff state (i.e., drawing or not drawing), forms an input to the controller 208q (and can thus be responded to by the controller 208q).

FIG. 54A and FIG. 54B illustrate flowcharts of methods 300q-1 and 300q-2 of determining the remaining usable lifetime of a consumable.

As illustrated in FIG. 54A and FIG. 54B, the methods 300q-1 and 300q-2 each include one or more blocks implemented by the controller 208q of the device 201q. The methods may be described in general context of controller executable instructions. Generally, controller executable instructions may include routines, programs, objects, components, data structures, procedures, modules, and functions, which perform particular functions or implement particular abstract data types.

The order in which the methods 300q-1 and 300q-2 are described is not intended to be construed as a limitation, and any number of the described method blocks can be combined in any order to implement the methods. Additionally, individual blocks may be deleted from the methods without departing from the scope of the subject matter described herein. Furthermore, the methods can be implemented in any suitable hardware, software, firmware, or combination thereof.

Referring to FIG. 54A, at block 301q, the controller 208q is configured for determining the remaining usable lifetime of a consumable during a smoking session. Although not explicitly disclosed in the flowchart, for determining the remaining usable lifetime of a consumable 202q in said session, the controller 208q may be configured to incorporate one or more of (i) known (e.g., average) usable lifetimes of consumables, (ii) remaining duration of the consumable cycle, (ii) ambient temperature, (iii) number and/or magnitude of puff inhalations made by the user, and (iv) type of consumable present in the device.

At block 302q, the controller 208q is configured for displaying, to the user, an indication of the remaining usable lifetime of the consumable 202q, as determined by the controller 208q at block 301q. In some embodiments, the controller 208q may be configured for determining and displaying the remaining usable lifetime of the consumable 202q in response to receiving user input/request.

Referring to FIG. 54B, at block 303q, the controller 208q is configured for determining the remaining usable lifetime of a consumable 202q during a smoking session based on the type of consumable. Although not explicitly disclosed in the flowchart, however, before determining the remaining usable lifetime based on the type of consumable, the controller 208q is configured for determining the type of consumable inserted into the device 201q. In some embodiments, the type of consumable may be determined by one or more different types of sensors placed inside the device 201q.

In some embodiments, for determining the remaining usable lifetime of a consumable 202q, the controller 208q may be configured to additionally use one or more of (i) known (e.g., average) usable lifetimes of consumables of the type detected, (ii) remaining duration of the consumable cycle, (iii) ambient temperature and (iv) number and/or magnitude of puff inhalations made by the user.

At block 304$q$, the controller 208$q$ is configured for displaying, to the user, the remaining usable lifetime of the consumable 202$q$, as determined by the controller 208$q$ at block 303$q$. In some embodiments, the controller 208$q$ may be configured for determining and displaying the remaining usable lifetime of the consumable 202$q$ in response to receiving user input/request.

CONCLUSION

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilized for realizing the disclosure in diverse forms thereof.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the words "have", "comprise", and "include", and variations such as "having", "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means, for example, +/−10%.

The words "preferred" and "preferably" are used herein refer to embodiments of the disclosure that may provide certain benefits under some circumstances. It is to be appreciated, however, that other embodiments may also be preferred under the same or different circumstances. The recitation of one or more preferred embodiments therefore does not mean or imply that other embodiments are not useful and is not intended to exclude other embodiments from the scope of the disclosure, or from the scope of the claims.

What is claimed is:

1. A smoking substitute device, comprising:
   a rechargeable battery;
   a port to receive power for charging the rechargeable battery, and,
   a controller configured to:
      determine if the received power is sufficient to permit usage of the substitute smoking device; and
      based on the determination, allow the substitute smoking device to vaporize an aerosol former while receiving power from the port.

2. The smoking substitute device according to claim 1, wherein operating the device includes consumption of a consumable by a user of the smoking substitute device.

3. The smoking substitute device according to claim 1, wherein the power received while operating the smoking substitute device is used for device operation or charging the rechargeable battery or both.

4. The smoking substitute device according to claim 1, wherein the smoking substitute device is a heat not burn device.

5. The smoking substitute device according to claim 1, further comprises a feedback output means capable of providing one of haptic feedback, audio and visual feedback to indicate usage of the smoking substitute device during charging, or to indicate availability of power required for usage of the smoking substitute device.

6. A substitute smoking system comprising:
   a smoking substitute device comprising a rechargeable battery; a port to receive power for charging the rechargeable battery; and a controller configured to determine if the received power is sufficient to permit usage of the substitute smoking device and,
   based on the determination, allow the substitute smoking device to vaporize an aerosol former while receiving power from the port; and a rechargeable power source for charging the smoking substitute device being adapted to be connectable to the port of the smoking substitute device, wherein the rechargeable power source device is adapted to abut with a surface of the smoking substitute device when connected with the port.

7. The substitute smoking system according to claim 6, the rechargeable power source device further comprising a connector extendable from a cavity formed in an end wall of the rechargeable power source device, and connectable in a port located on the smoking substitute device.

8. The substitute smoking system according to claim 7, the rechargeable power source further comprising a switch located on outer surface of the cavity and coupled with the connector to facilitate the extension of the connector for engaging with the smoking substitute device.

9. The substitute smoking system according to claim 6, wherein the rechargeable power source device is adapted to provide a sealed alignment with the smoking substitute device.

* * * * *